US012265533B2

(12) United States Patent
Arnold

(10) Patent No.: US 12,265,533 B2
(45) Date of Patent: Apr. 1, 2025

(54) DIMENSIONALITY REDUCTION AND MODEL TRAINING IN A DATABASE SYSTEM IMPLEMENTATION OF A K NEAREST NEIGHBORS MODEL

(71) Applicant: Ocient Holdings LLC, Chicago, IL (US)

(72) Inventor: Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 229 days.

(21) Appl. No.: 18/174,781

(22) Filed: Feb. 27, 2023

(65) Prior Publication Data

US 2024/0289331 A1 Aug. 29, 2024

Related U.S. Application Data

(60) Provisional application No. 63/374,819, filed on Sep. 7, 2022, provisional application No. 63/374,821, filed on Sep. 7, 2022.

(51) Int. Cl.

| | |
|---|---|
| ***G06F 16/2453*** | (2019.01) |
| ***G06F 16/28*** | (2019.01) |
| ***G06N 20/00*** | (2019.01) |

(52) U.S. Cl.

CPC .. *G06F 16/24532* (2019.01); *G06F 16/24537* (2019.01); *G06F 16/24542* (2019.01); *G06F 16/285* (2019.01); *G06N 20/00* (2019.01)

(58) Field of Classification Search

CPC ......... G06F 16/24532; G06F 16/24537; G06F 16/285; G06F 16/24542; G06N 20/00

See application file for complete search history.

(56) References Cited

U.S. PATENT DOCUMENTS

| | | | |
|---|---|---|---|
| 5,548,770 | A | 8/1996 | Bridges |
| 6,230,200 | B1 | 5/2001 | Forecast |
| 6,633,772 | B2 | 10/2003 | Ford |
| 7,499,907 | B2 | 3/2009 | Brown |
| 7,908,242 | B1 | 3/2011 | Achanta |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |

(Continued)

*Primary Examiner* — Etienne P Leroux
*Assistant Examiner* — Farhad Agharahimi
(74) *Attorney, Agent, or Firm* — Garlick & Markison; Katherine C. Stuckman; Bruce E. Stuckman

(57) ABSTRACT

A database system operates by: determining a first query that indicates a first request to generate a K nearest neighbors (KNN) model; executing the first query to generate KNN model data for the KNN model, wherein the KNN model data is set as a reduced dataset for one of a plurality of training iterations; determining a second query that indicates a second request to apply the KNN model to input data; and executing the second query to generate model output of the KNN model for the input data based on, for each row in the input data, identifying a classification label for the each row from the discrete set of labels based on performing the KNN classification algorithm to classify the each row in the input data by applying the reduced data set.

20 Claims, 124 Drawing Sheets

(56) References Cited

U.S. PATENT DOCUMENTS

| | | | | |
|---|---|---|---|---|
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | McWilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |
| 2021/0216443 | A1* | 7/2021 | Park .................... | G06F 11/3688 |

* cited by examiner database system 10 computing device 18 computing device 18 computing device 18 node 37 node 37 node 37 node 37 data set query processing system 2510 query execution module
2504 database system 10 database system 10 query execution module 2504 query processing module 2510 query processing module 2510 query execution module 2504 database system 10 database system 10 database system 10 model training request 2610 training set selection clause 2656 training parameter set 2658 model function call 2640 database system 10 query execution module 2504 query execution module 2504 query execution module 2504 query execution module 2504 query execution module 2504 iteration 2714.k.iof algorithm type 2701 for particle 2730.1 query execution module 2504 golden section search algorithm 2551 over dimension 2552.j for particle 2730.1 golden section search algorithm 2551 over dimension 2552.j+1 for particle 2730.1 query execution module 2504 query execution module 2504 database system 10 database system 10 trained model data 2620:

trained model data 2620:

operator flow generator module 2514 operator flow generator module 2514 database system 10 database system 10 query execution module 2504 query execution module 2504 query execution module 2504 database system 10 database system 10 database system 10 database system 10 database system 10 database system 10 database system 10 database system 10 database system 10 database system 10 database system 10 mixture model training process 3310 mixture model training process 3310 mixture model training process 3310 query execution module 2504 database system 10 database system 10

KNN training process 3410

KNN training process 3410

KNN training process 3410

KNN training process 3410

KNN training process 3410

KNN training process 3410 query execution module 2504 database system 10 database system 10 database system 10

Sammon mapping model training process 3510

Sammon mapping
model training process 3510

Sammon mapping model training process 3510 database system 10

2950

2950

DIMENSIONALITY REDUCTION AND MODEL TRAINING IN A DATABASE SYSTEM IMPLEMENTATION OF A K NEAREST NEIGHBORS MODEL

CROSS-REFERENCE TO RELATED APPLICATIONS

The present U.S. Utility Patent Application claims priority pursuant to 35 U.S.C. § 119(e) to U.S. Provisional Application No. 63/374,819, entitled "IMPLEMENTING MACHINE LEARNING FUNCTIONALITY IN RELATIONAL DATABASE SYSTEMS", filed Sep. 7, 2022; and U.S. Provisional Application No. 63/374,821, entitled "GENERATING AND APPLYING MACHINE LEARNING MODELS DURING QUERY EXECUTION", filed Sep. 7, 2022, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

Figure 27A:
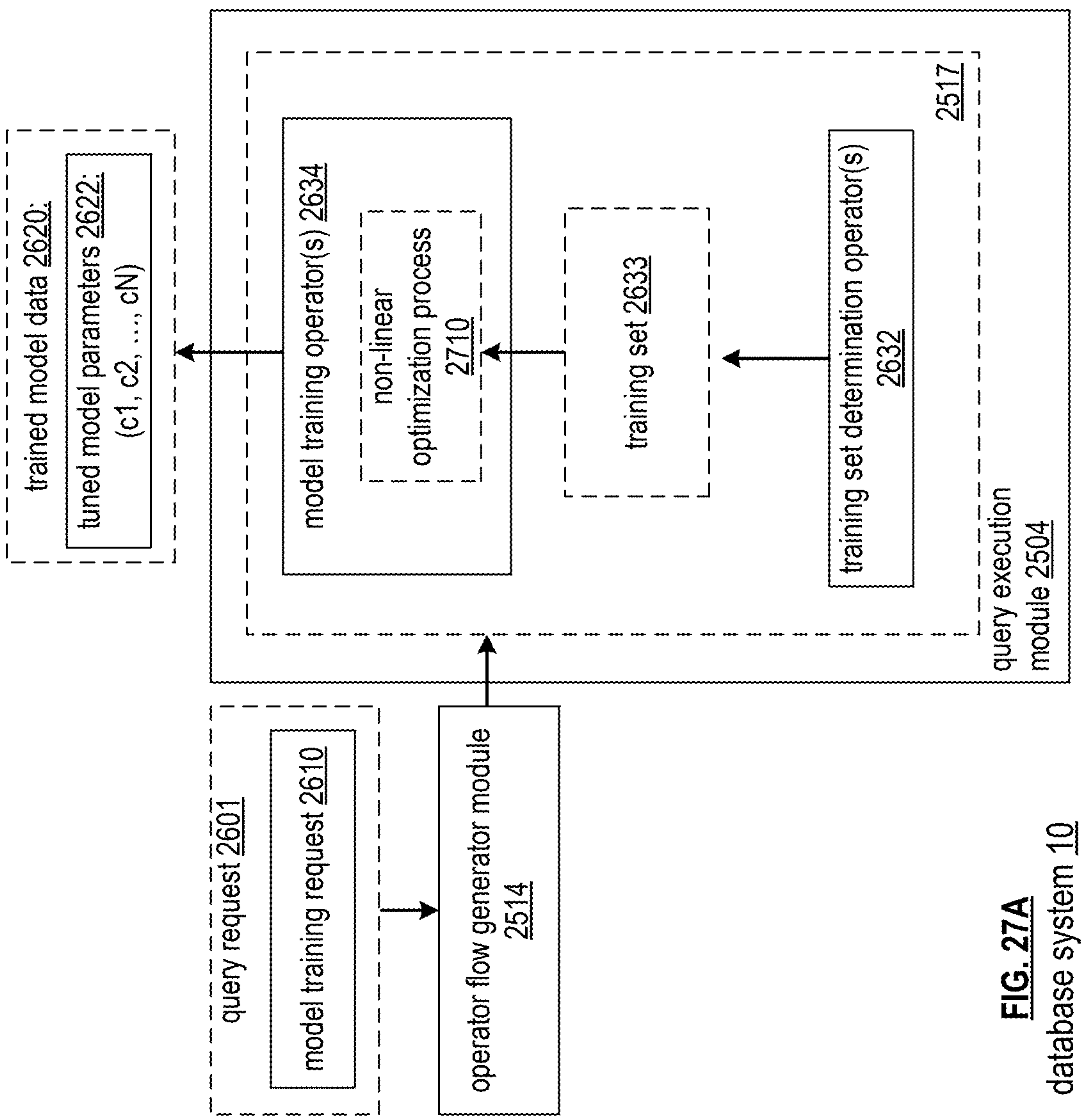
FIG. 27A is a schematic block diagram of a database system that performs a nonlinear optimization process during query execution in accordance with various embodiments.
Figure 27B:
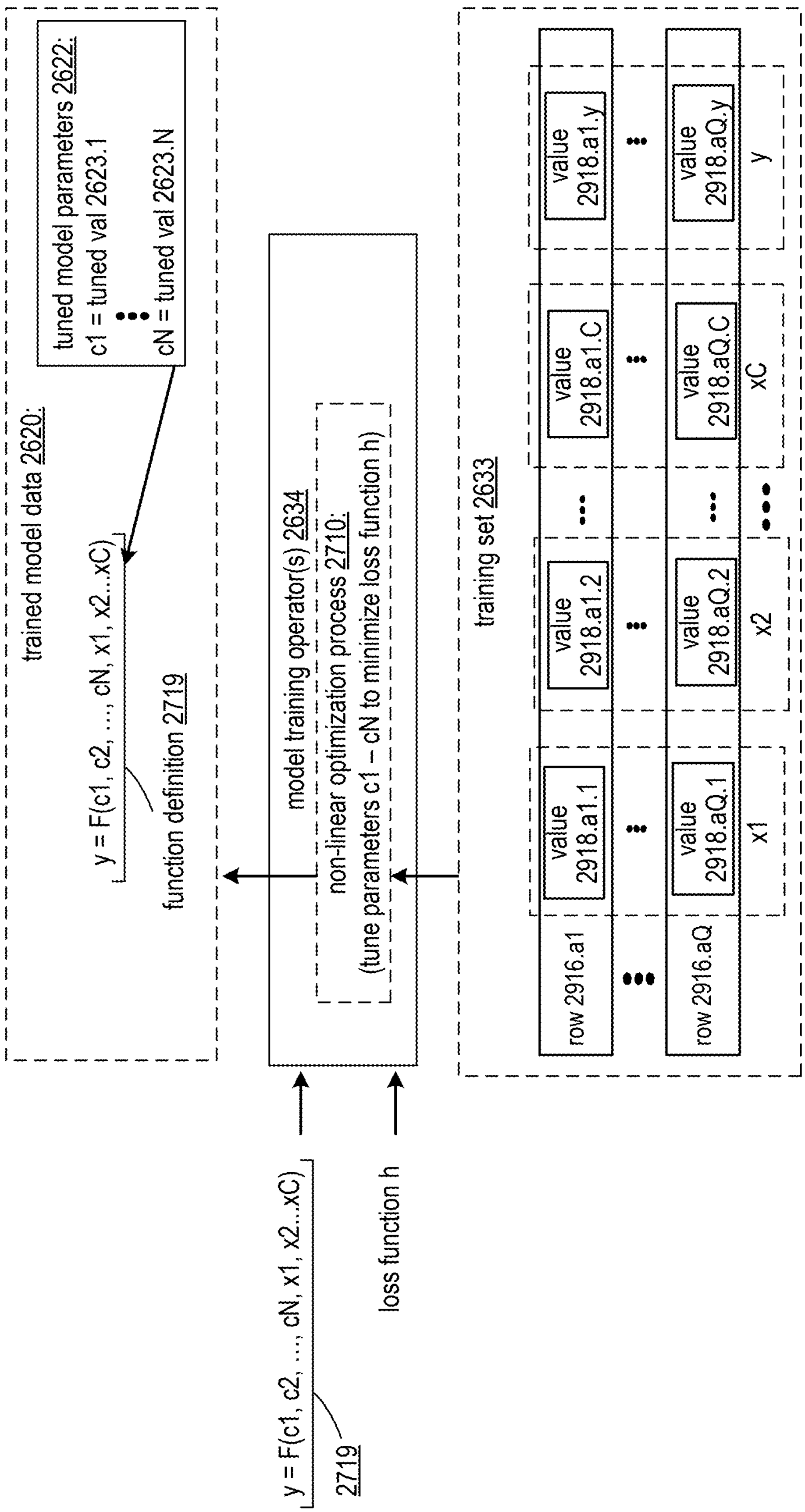
FIG. 27B is a schematic block diagram of a query execution model that generates trained model data that includes a function definition based on columns of a training set in accordance with various embodiments.
Figure 27C:
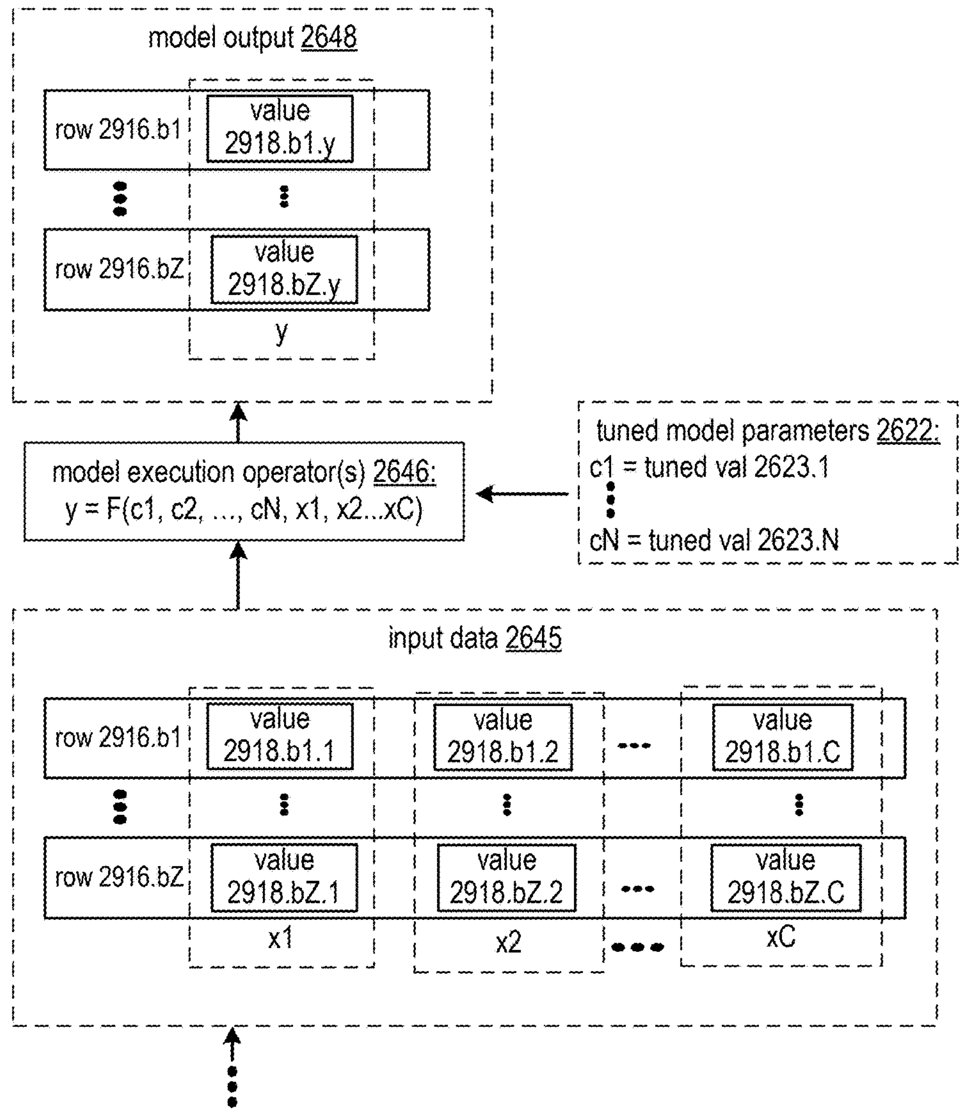
FIG. 27C illustrates a query execution model that generates model output by applying a function definition to columns of input data in accordance with various embodiments.
Figure 27D:
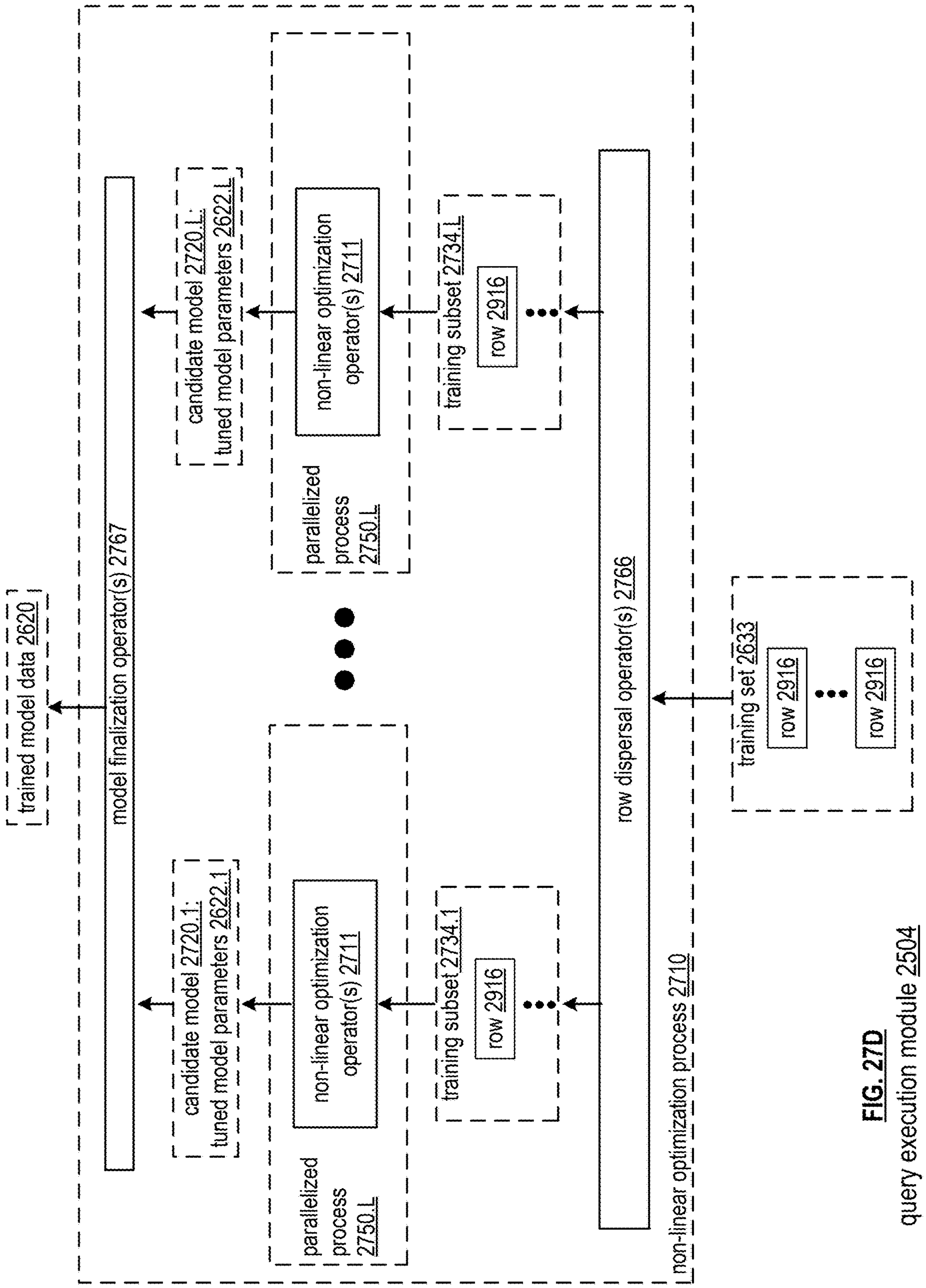
FIG. 27D illustrates execution of a nonlinear optimization process via a plurality of parallelized processes in accordance with various embodiments.
Figure 27E:
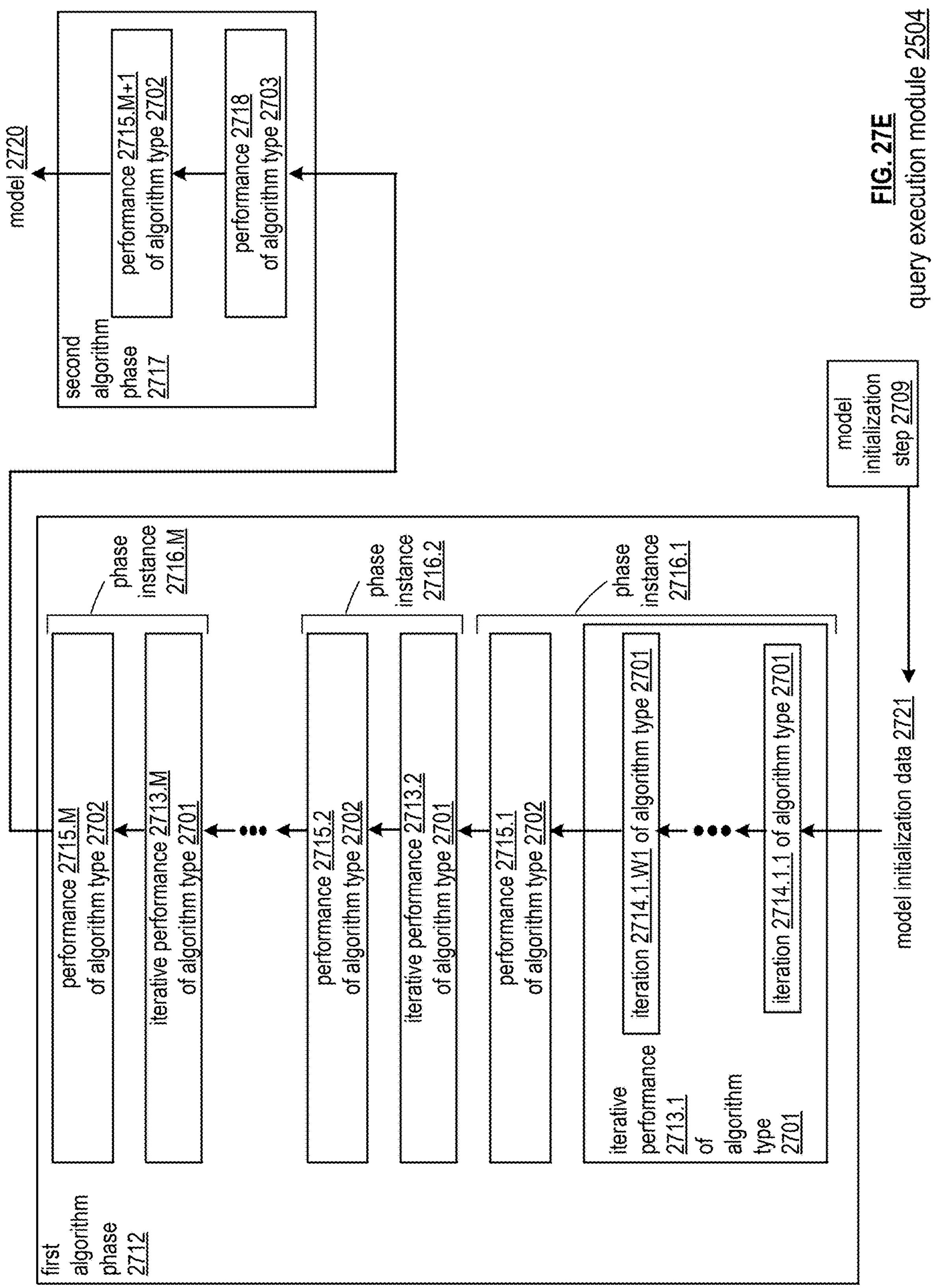
FIG. 27E illustrates execution of a nonlinear optimization process via performance of a first type of algorithm, a second type of algorithm, and a third type of algorithm in accordance with various embodiments.
Figure 27F:
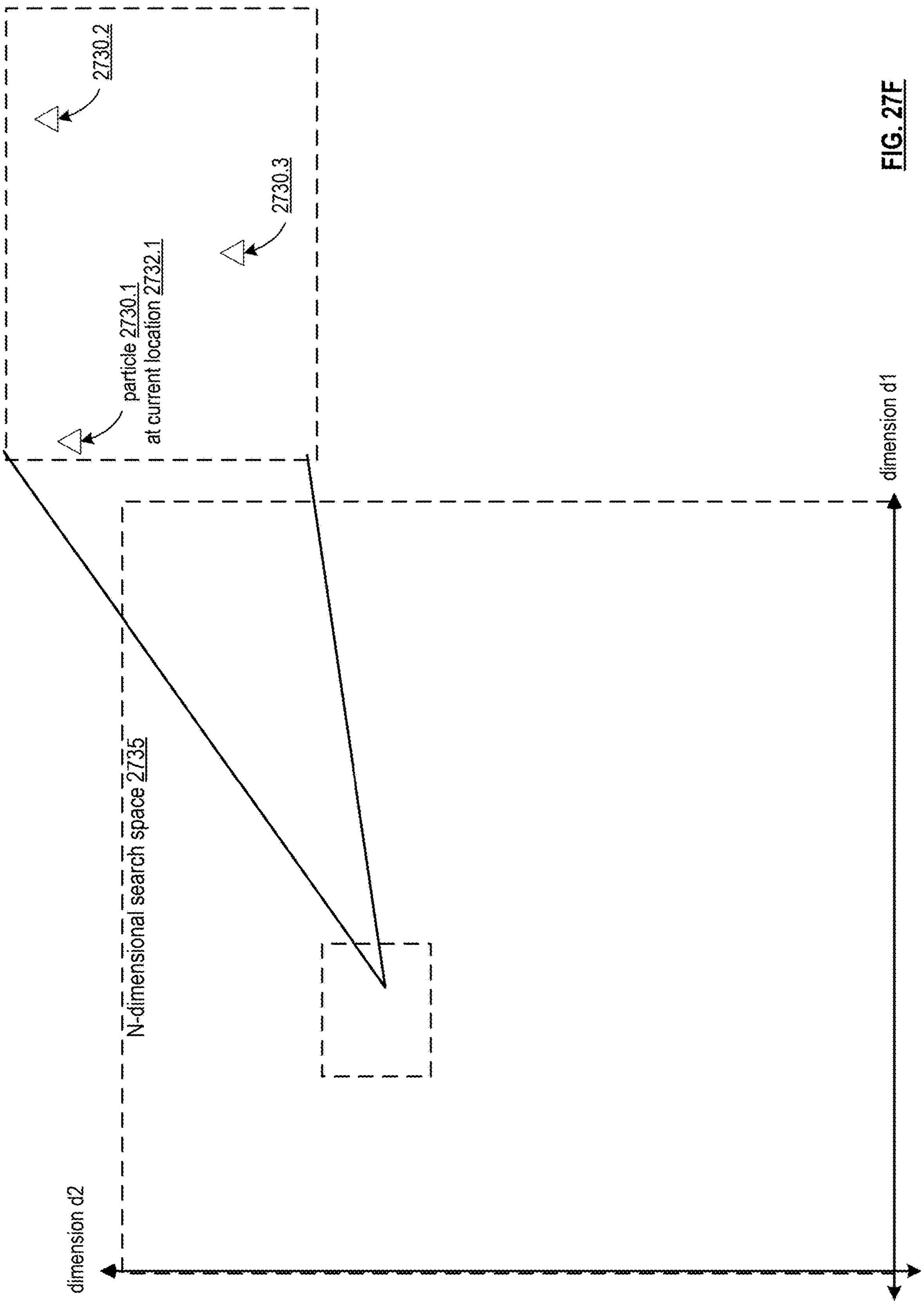
Figure 27G:
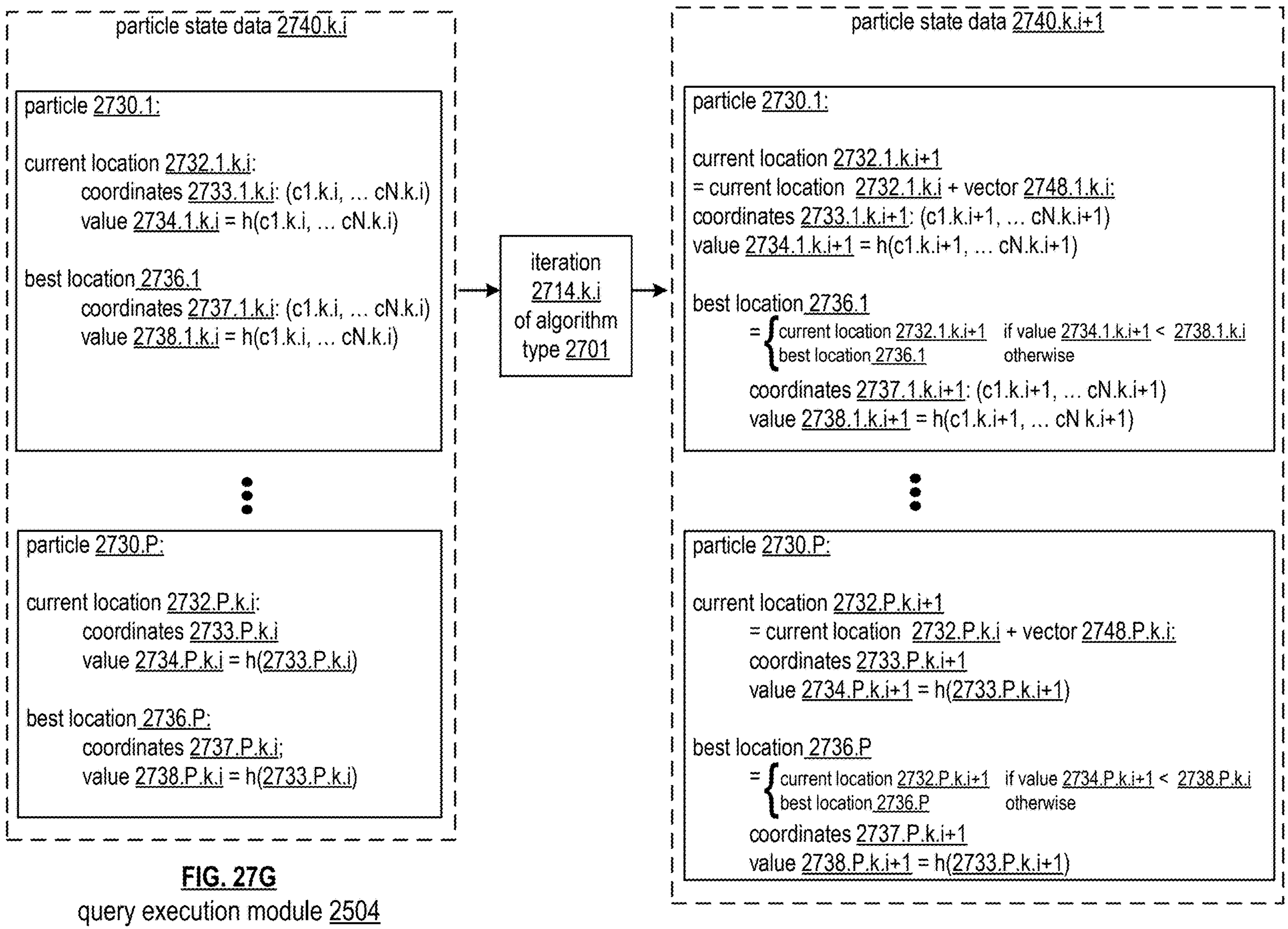
Figure 27H:
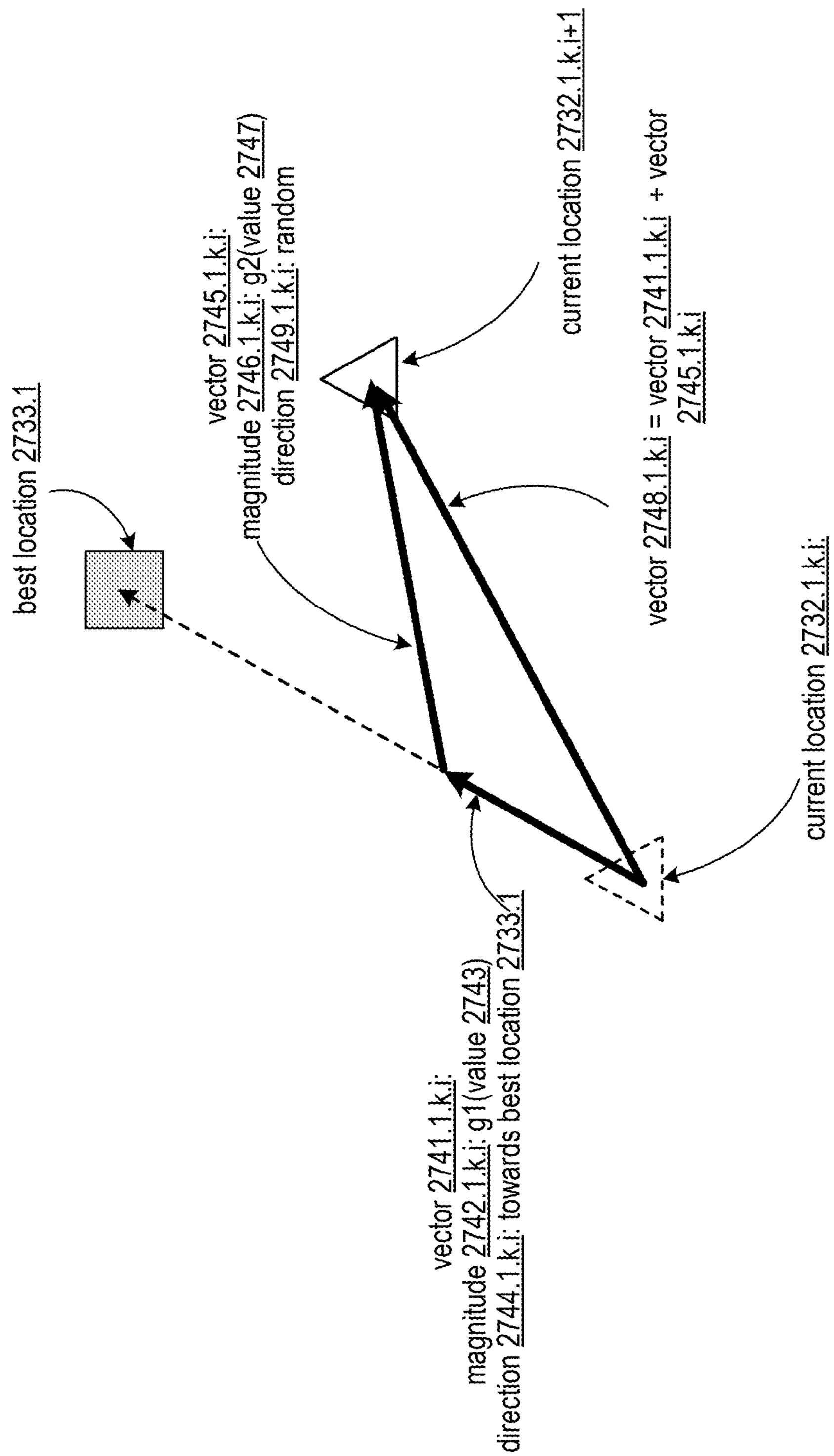
Figure 27I:
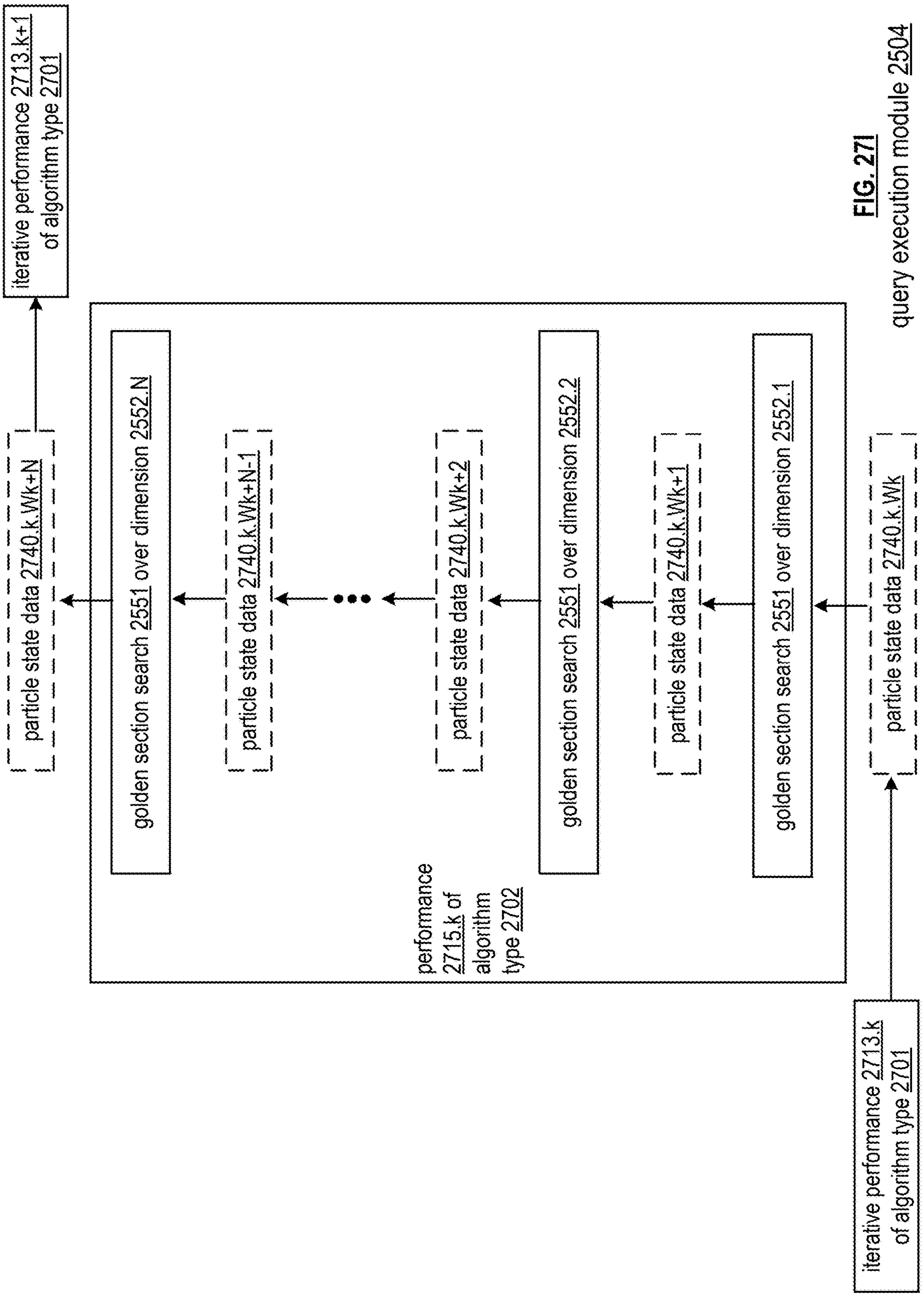
Figure 27J:
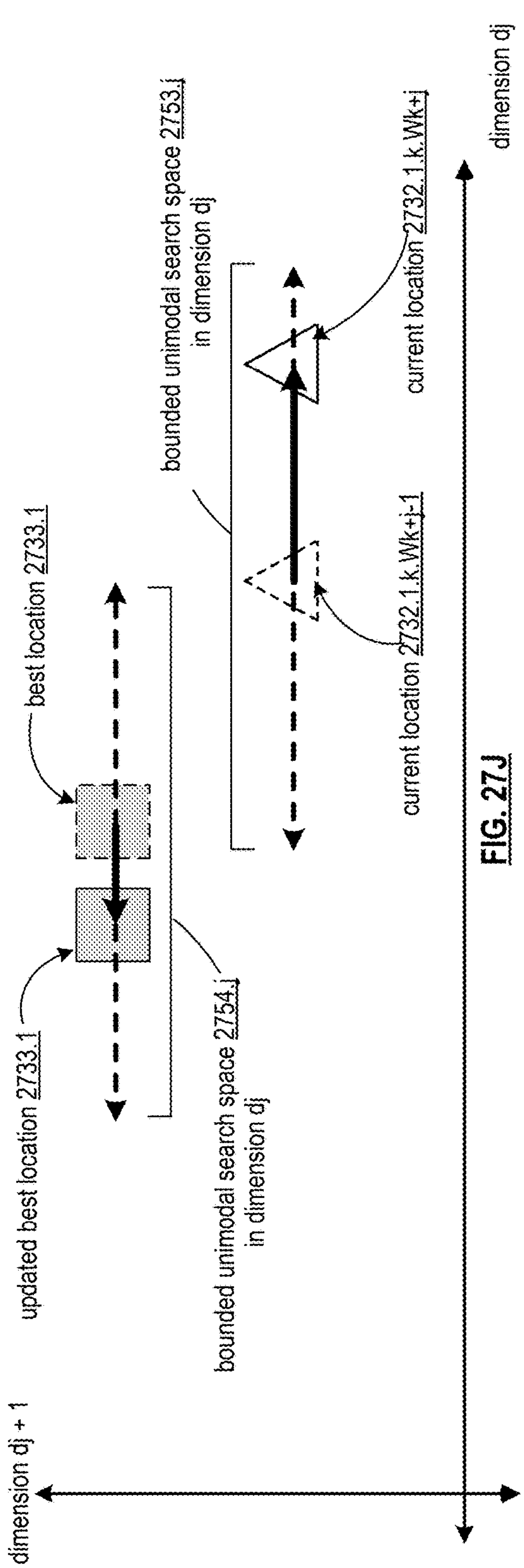
Figure 27K:
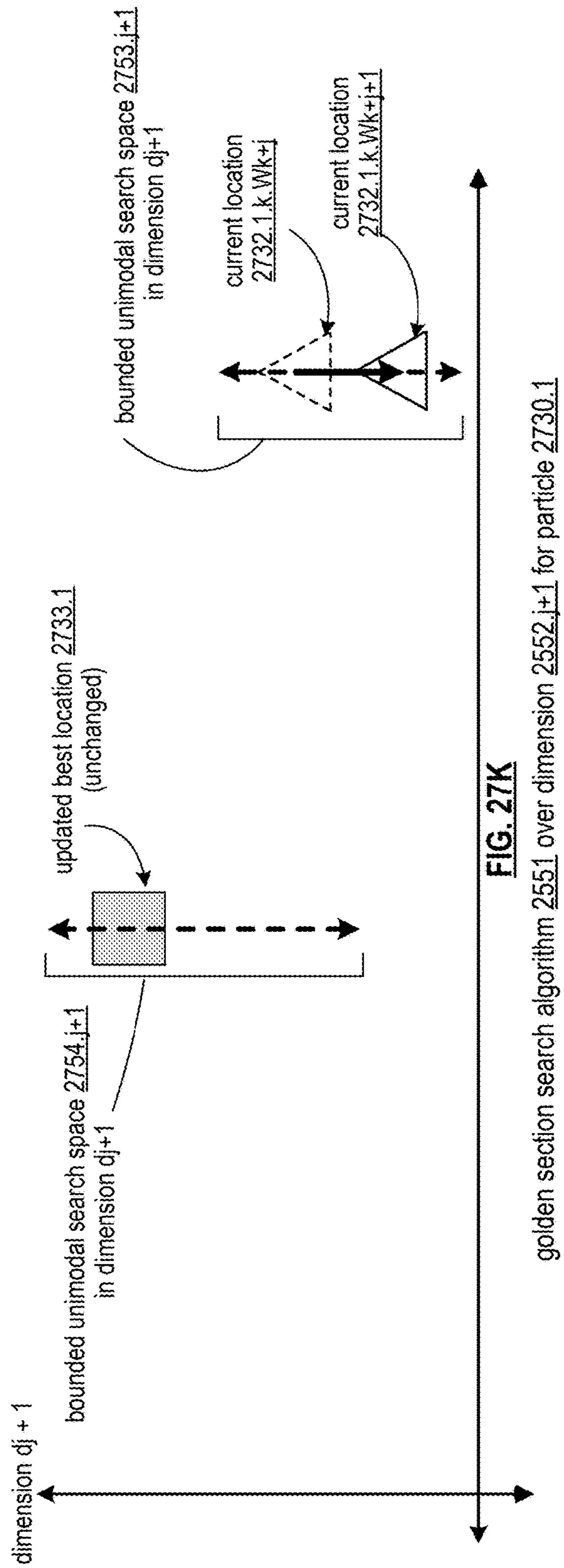
Figure 27L:
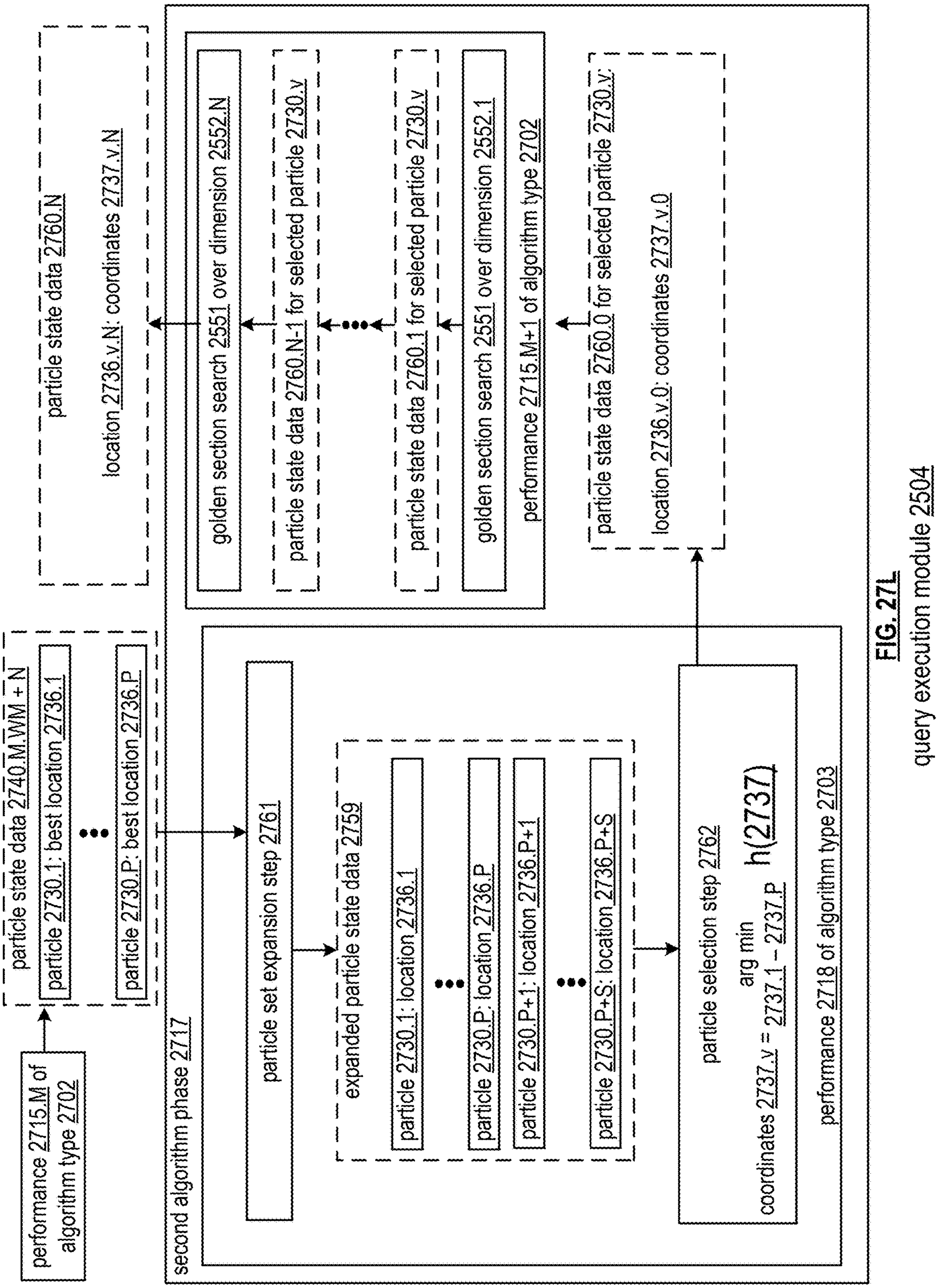
Figure 27M:
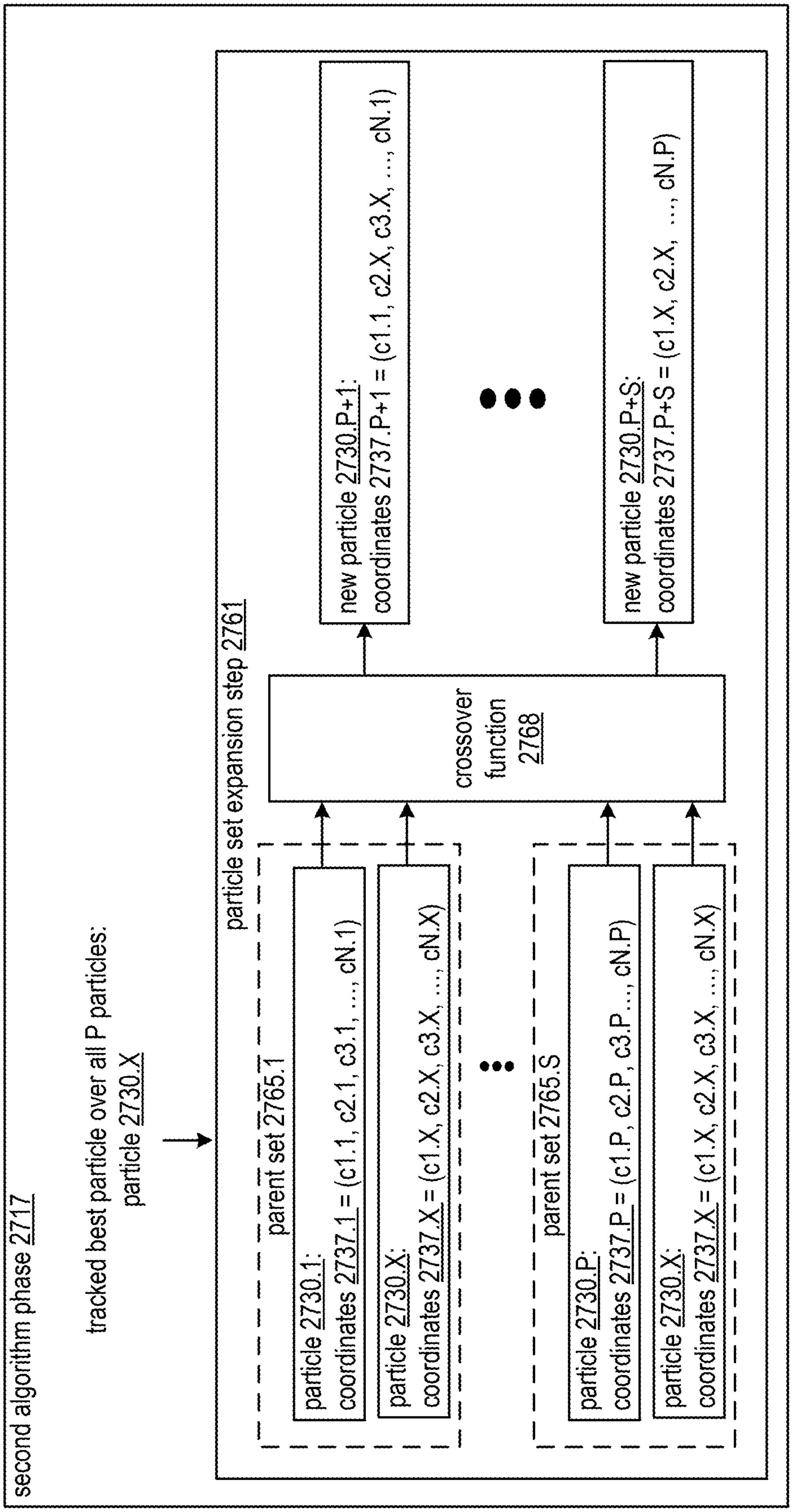
Figure 27N:
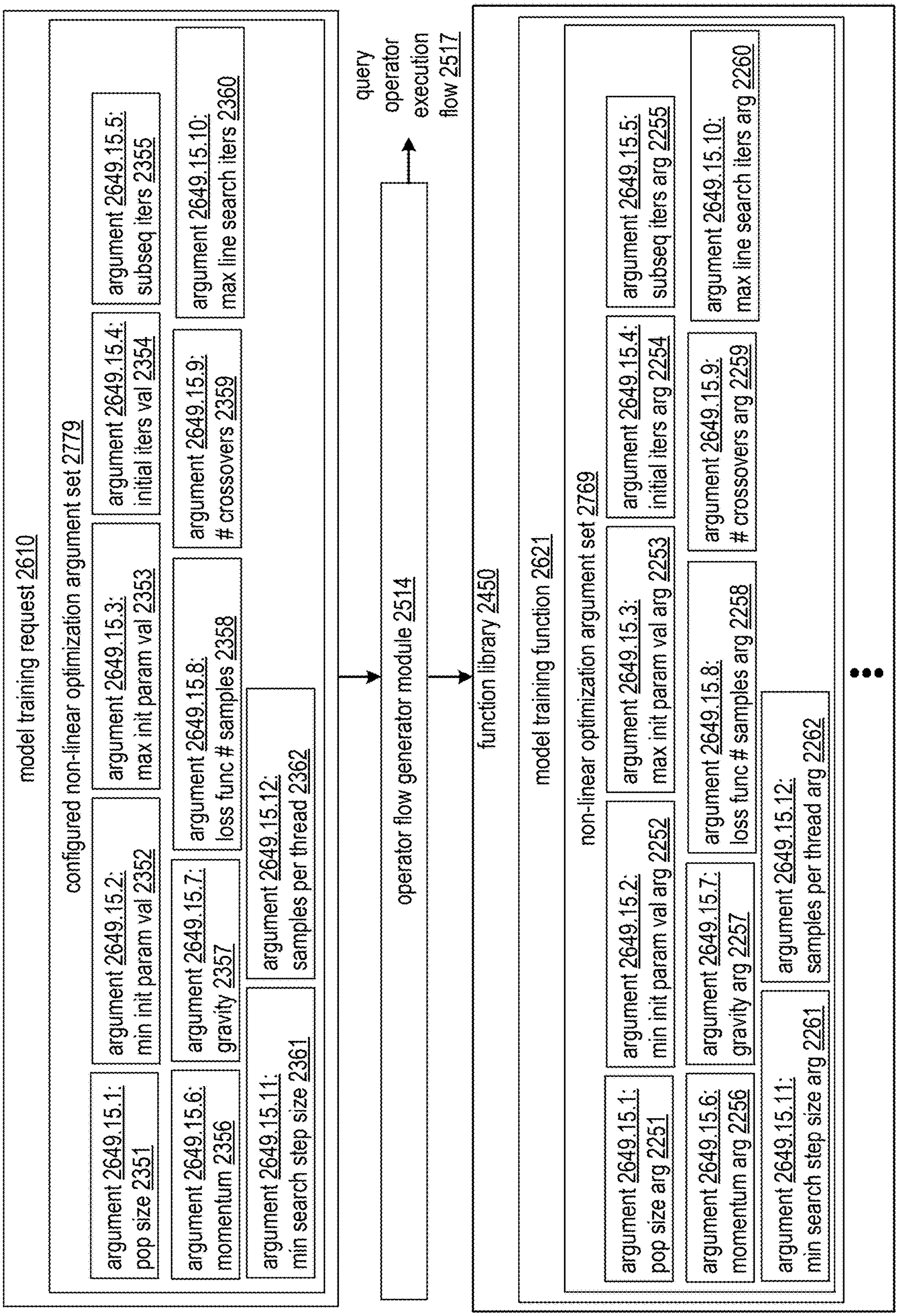
Figure 27O:
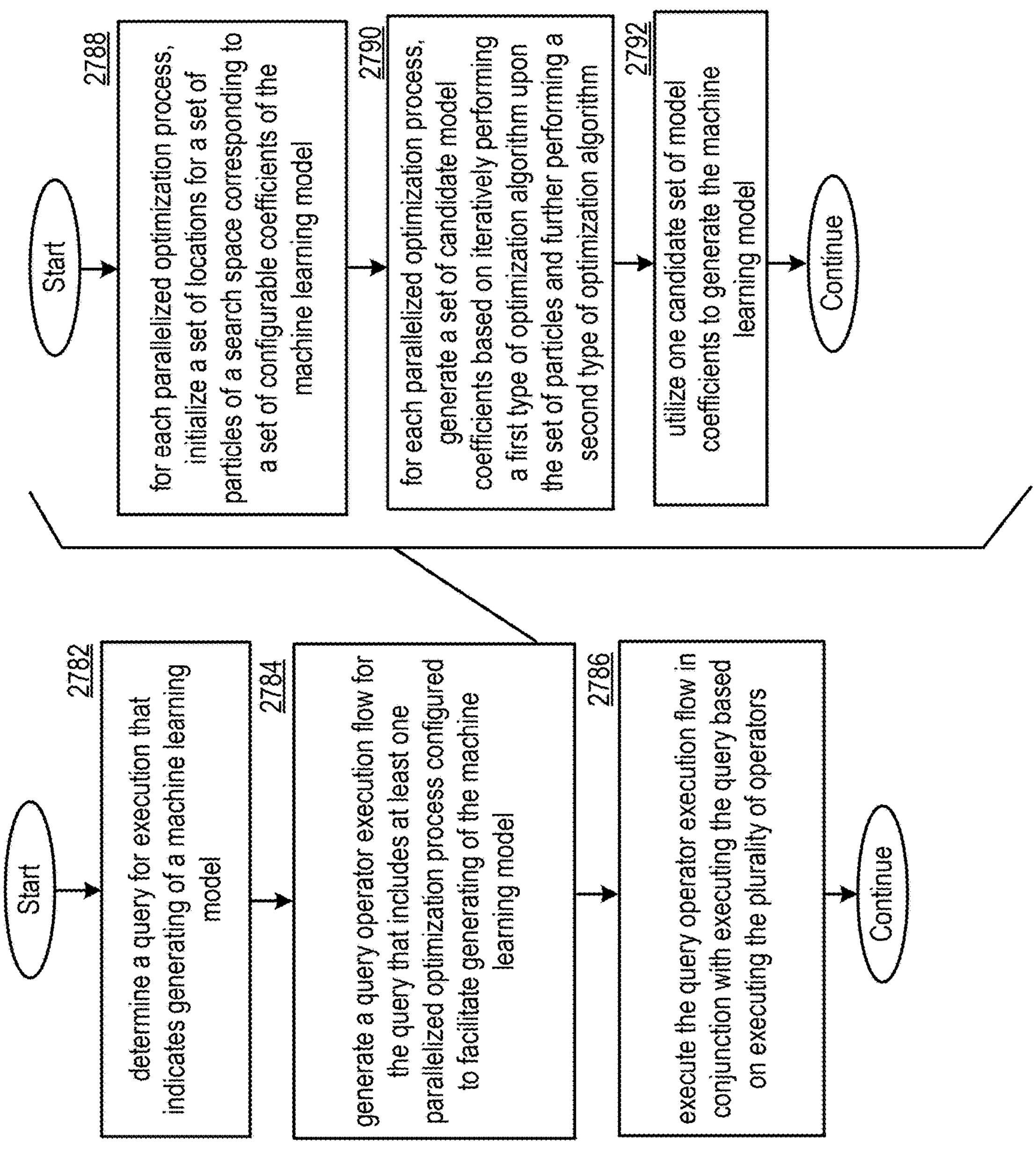
Figure 28A:
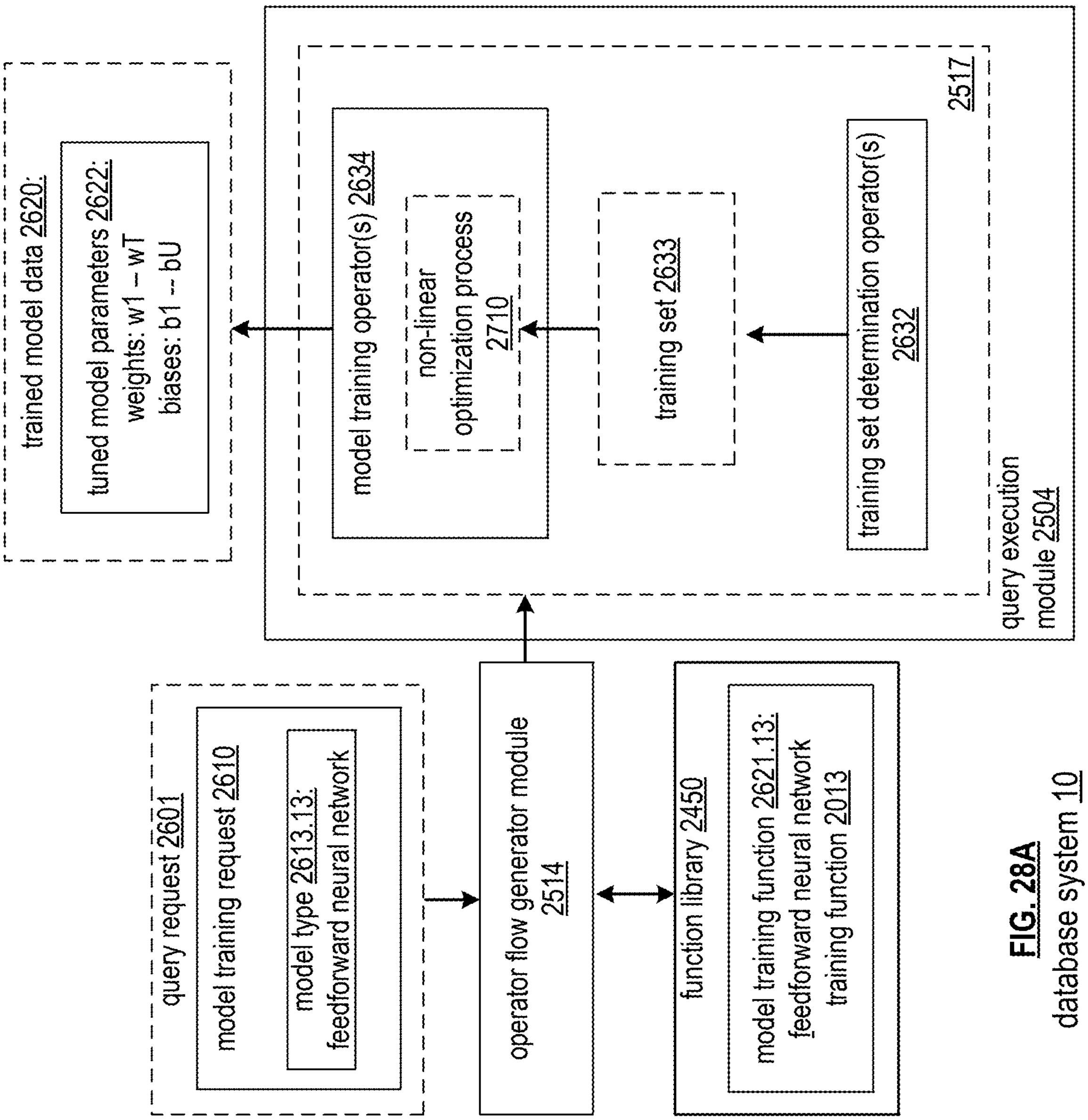
Figure 28B:
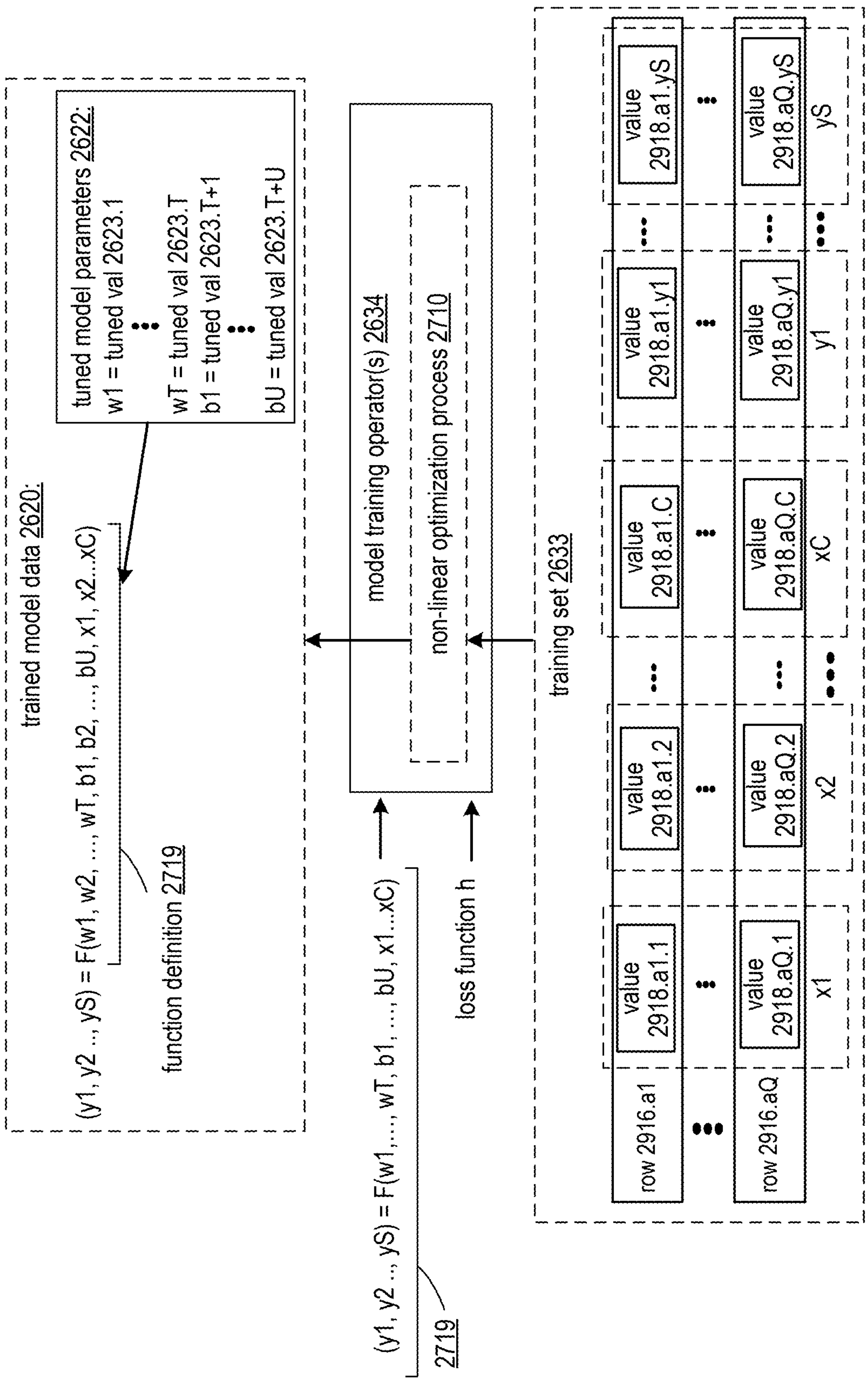
Figure 28C:
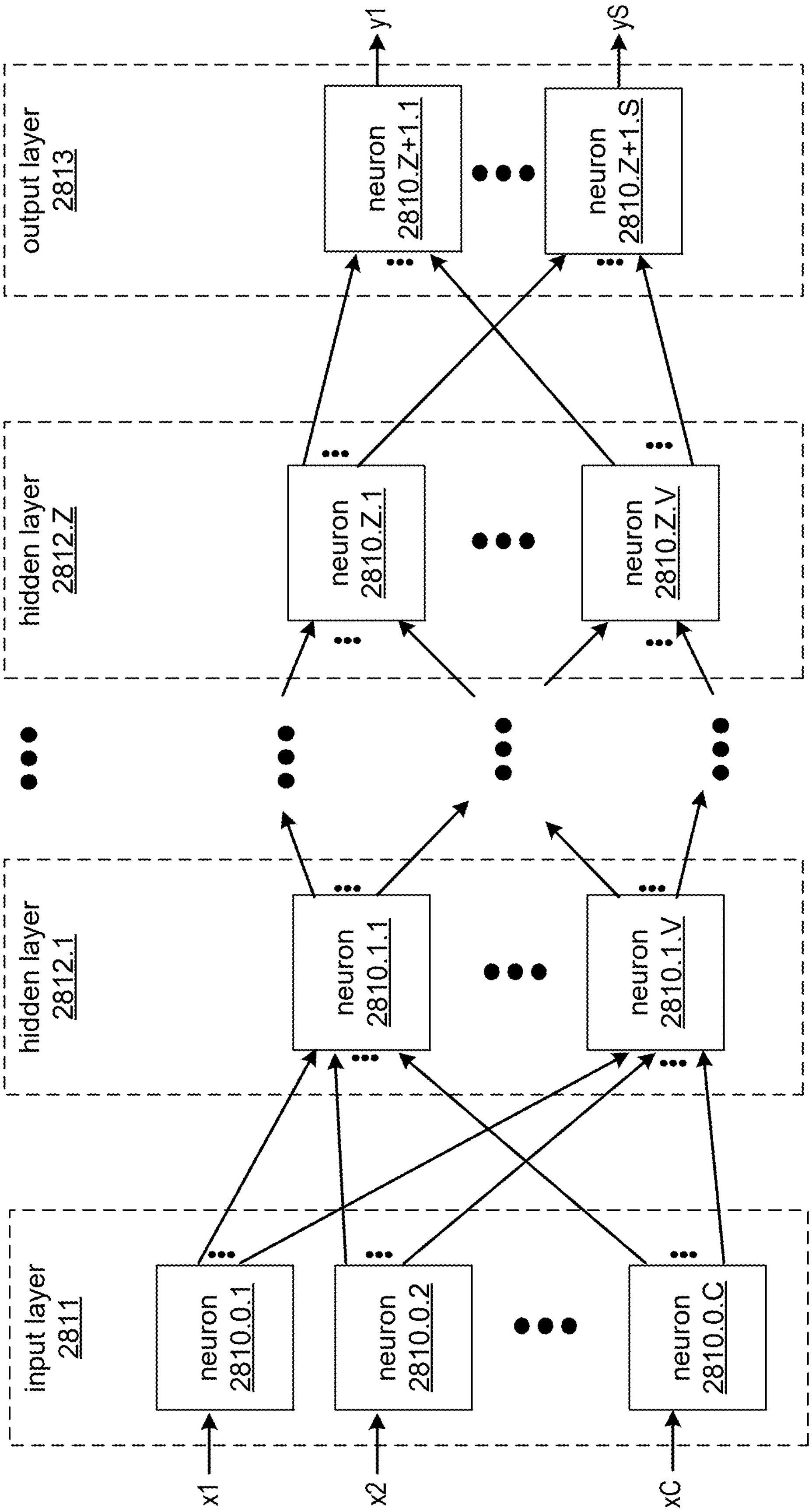

FIG. 27F presents a two dimensional depictions of an example N-dimensional search space in accordance with various embodiments;

FIG. 27G illustrates an iteration of a first type of algorithm to update particle state data in accordance with various embodiments;

FIG. 27H illustrates updating of a particle in an iteration of a first type of algorithm in accordance with various embodiments;

FIG. 27I illustrates performance of a second type of algorithm via a plurality of golden section searches in accordance with various embodiments;

FIGS. 27J and 27K illustrate performance of a golden section search for a particle in two dimensions in accordance with various embodiments;

FIG. 27L illustrates performance of a third type of algorithm via a particle expansion step in accordance with various embodiments;

FIG. 27M illustrates performance of a particle expansion step via performance of a crossover function in accordance with various embodiments;

FIG. 27N is a schematic block diagram of a database system that processes a model training request based on a set of configured arguments of a nonlinear optimization argument set;

FIG. 27O is a logic diagram illustrating a method for execution in accordance with various embodiments;

FIG. 28A is a schematic block diagram of a database system that generates trained model data for a feedback neural network model in accordance with various embodiments;

FIG. 28B is a schematic block diagram of a database system that generates trained model data that includes a function definition based on tuned weights and tuned biases in accordance with various embodiments;

FIG. 28C is an illustrative depiction of trained model data reflected as a plurality of neurons of a plurality of layers.

Figure 28D:
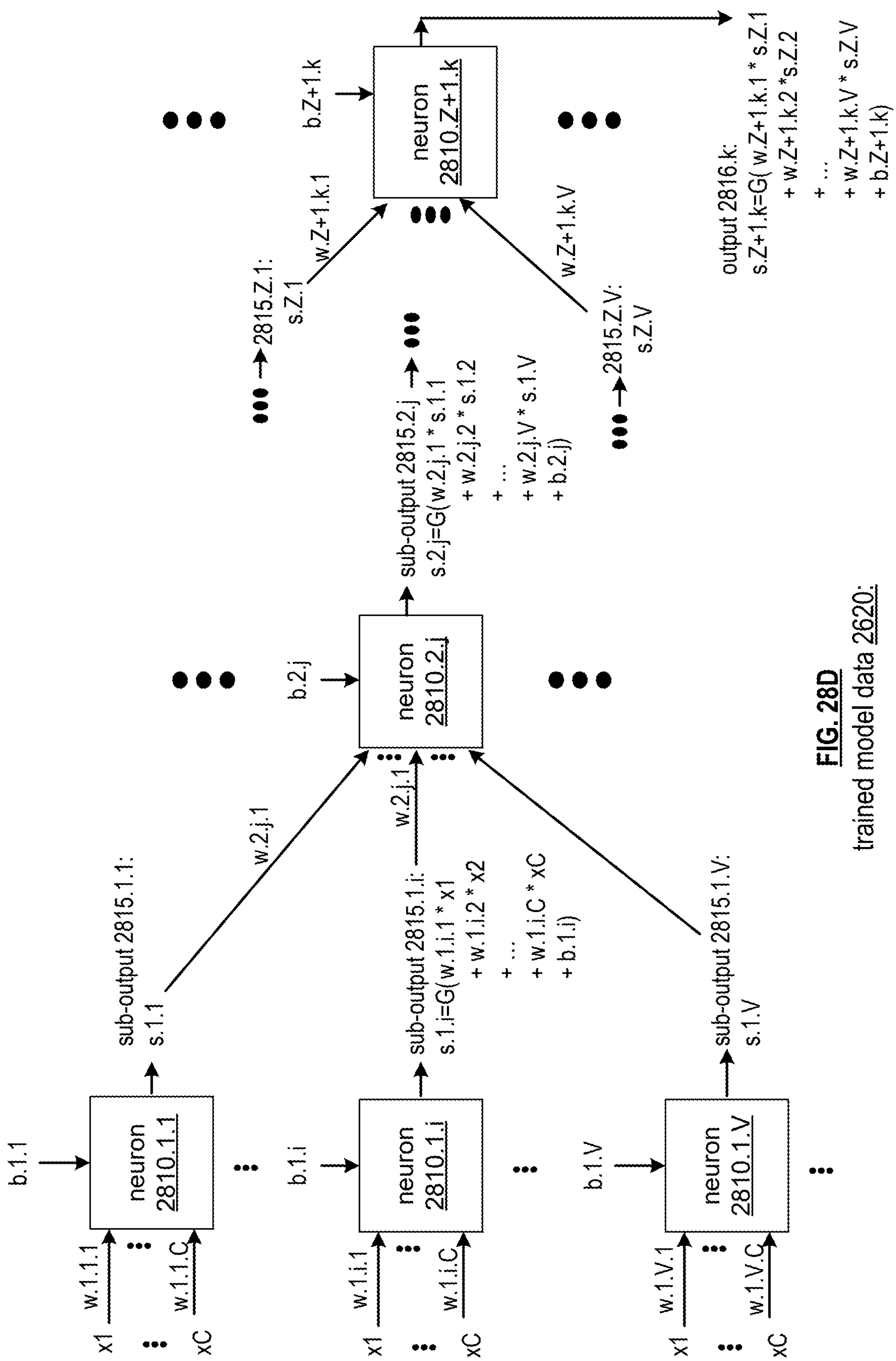
Figure 28E:
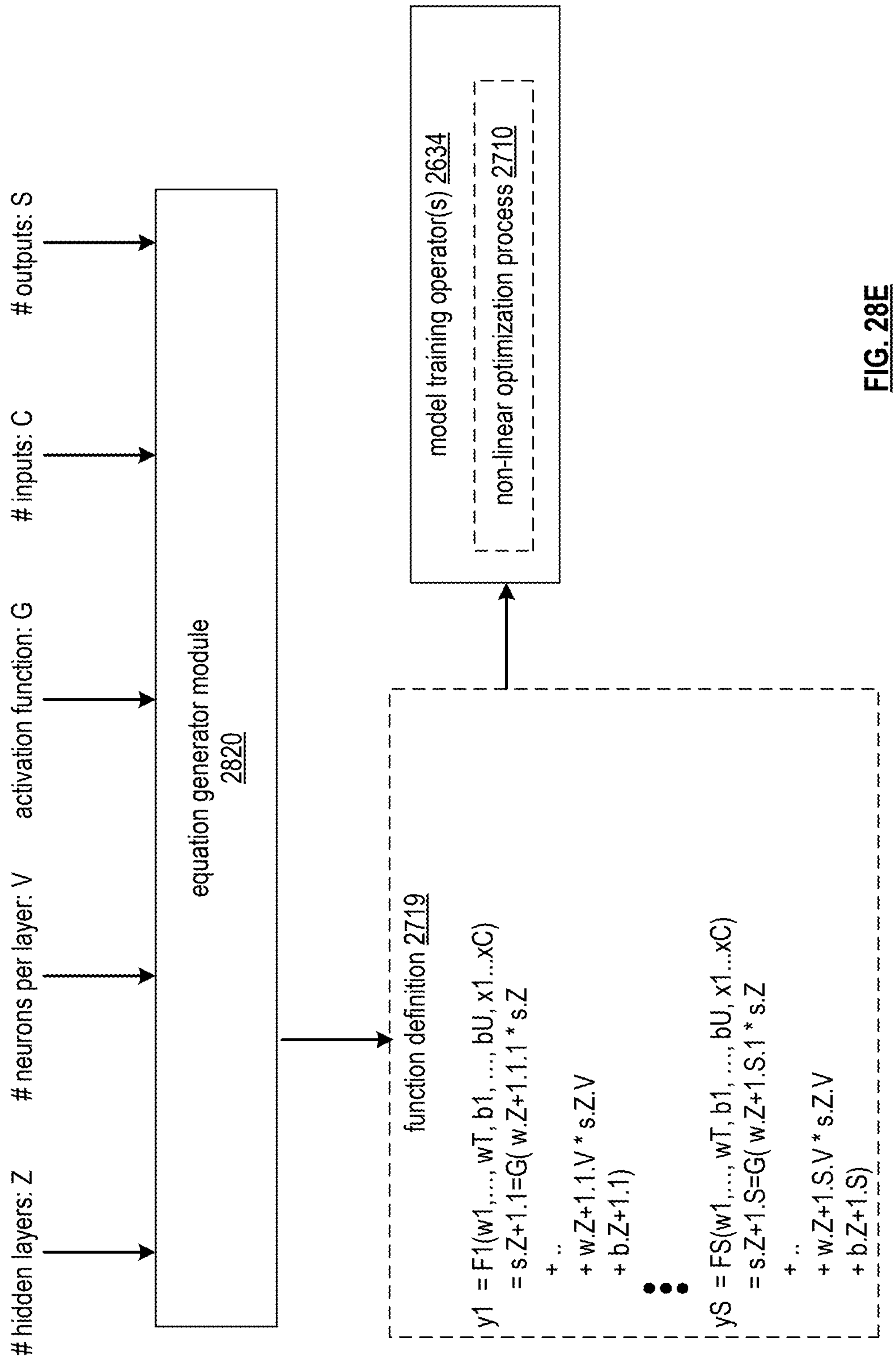
Figure 28F:
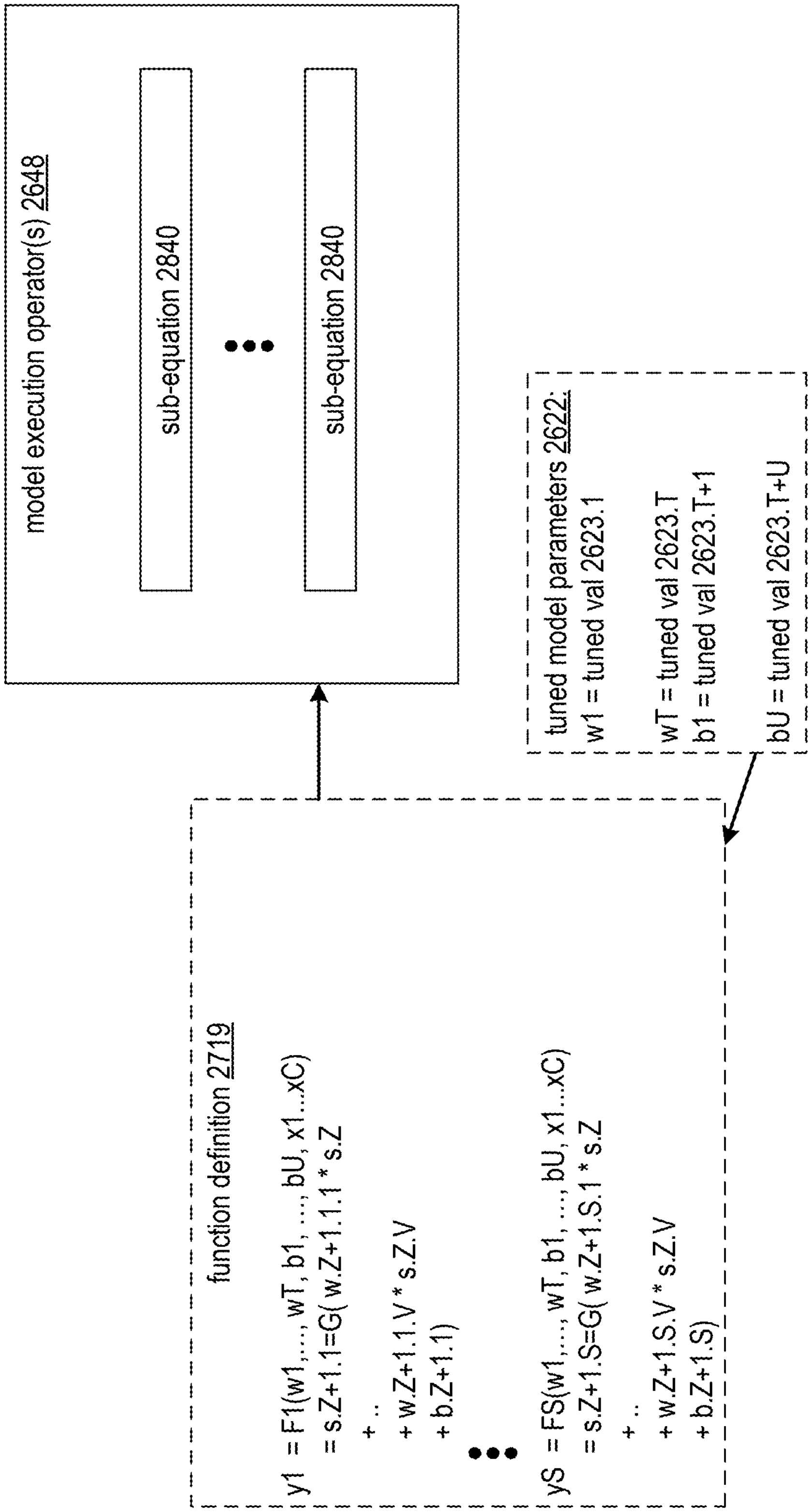
Figure 28G:
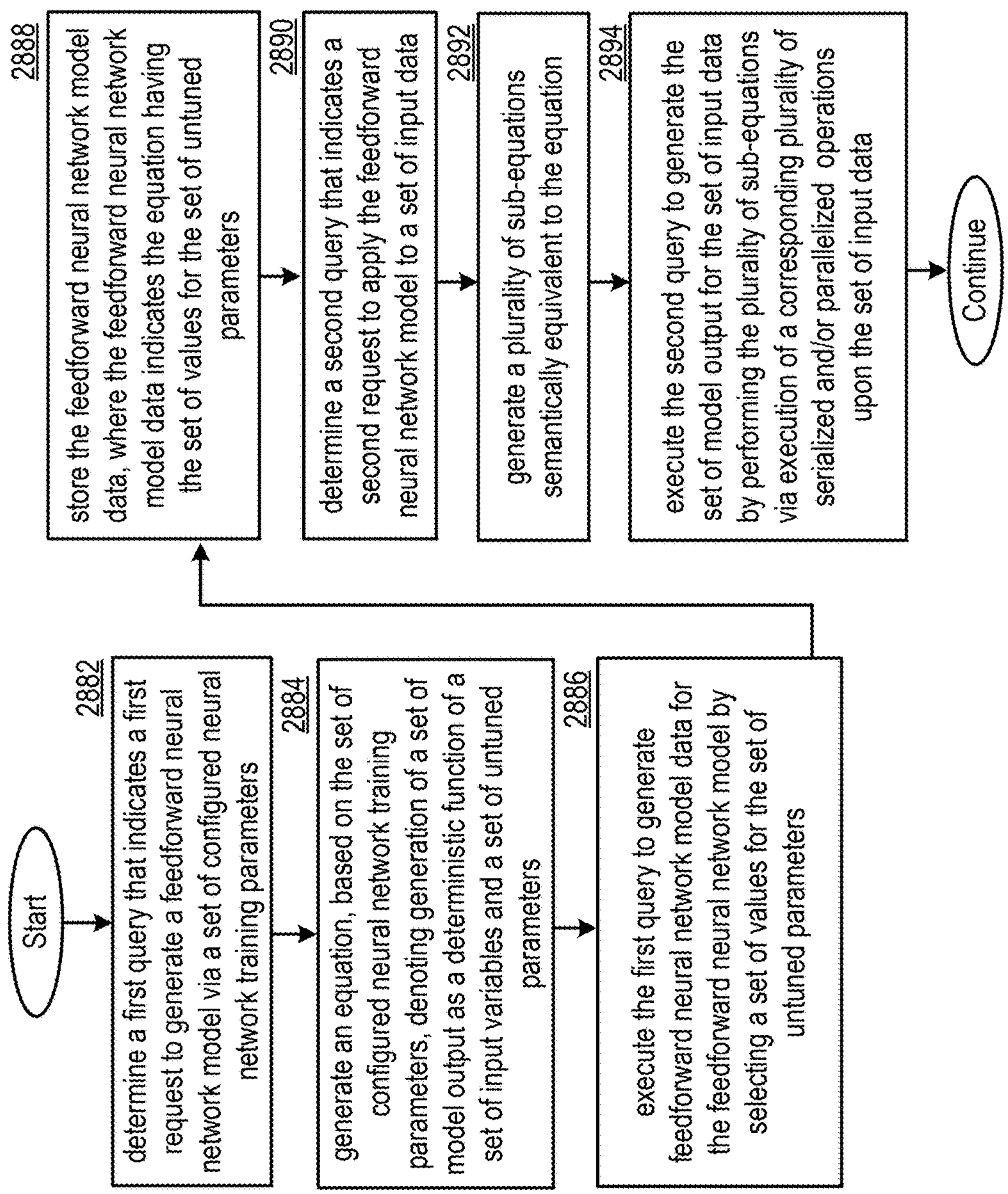
Figure 29A:
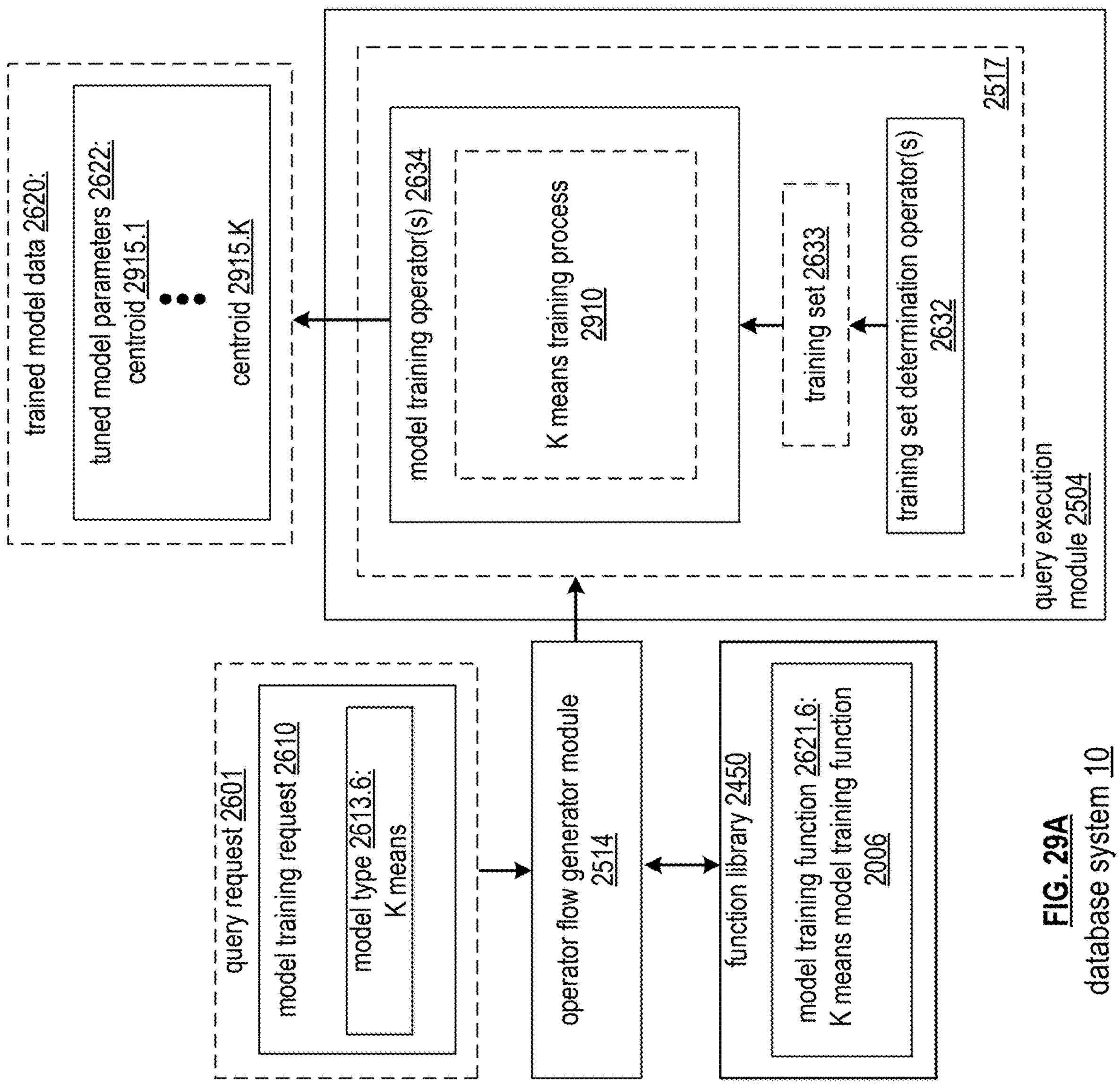
Figure 29B:
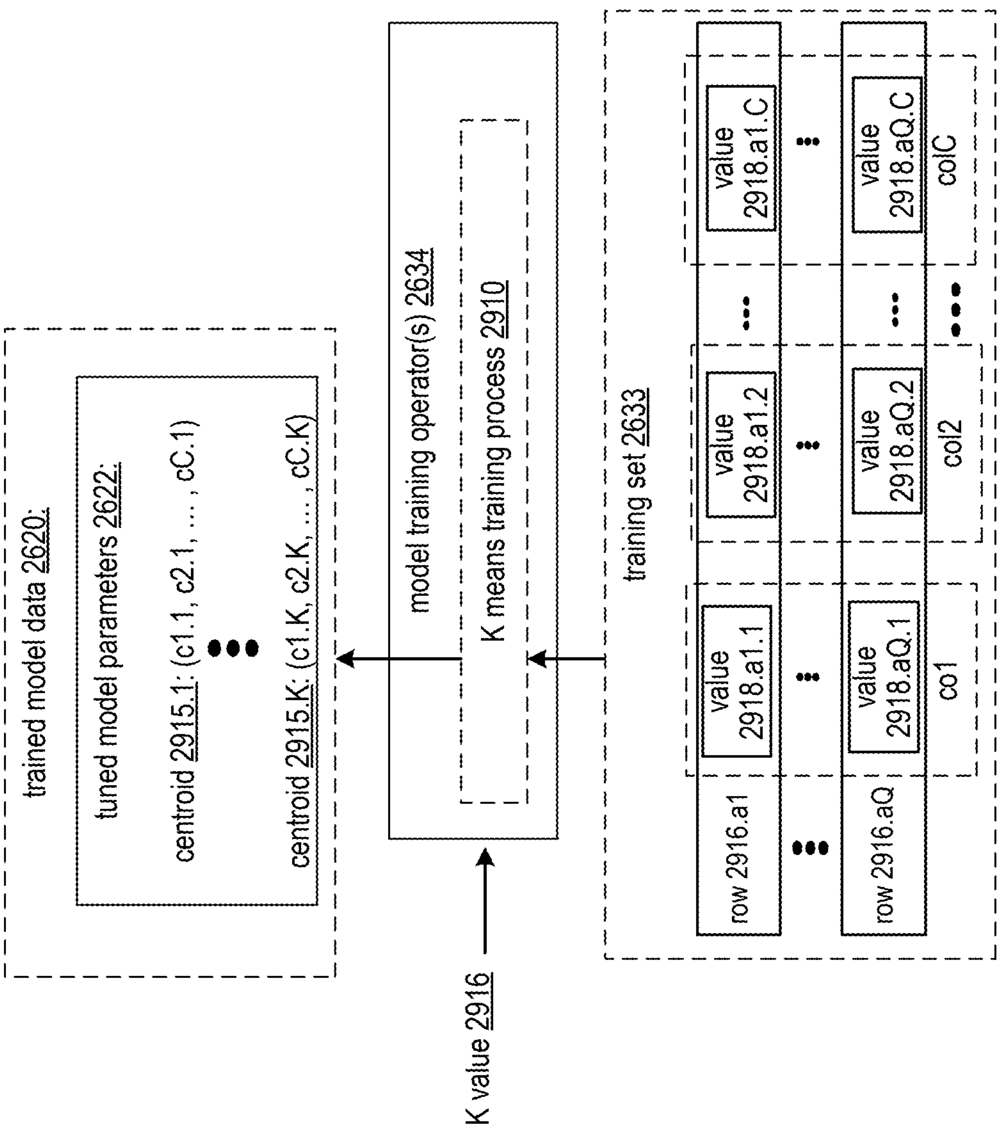
Figure 29C:
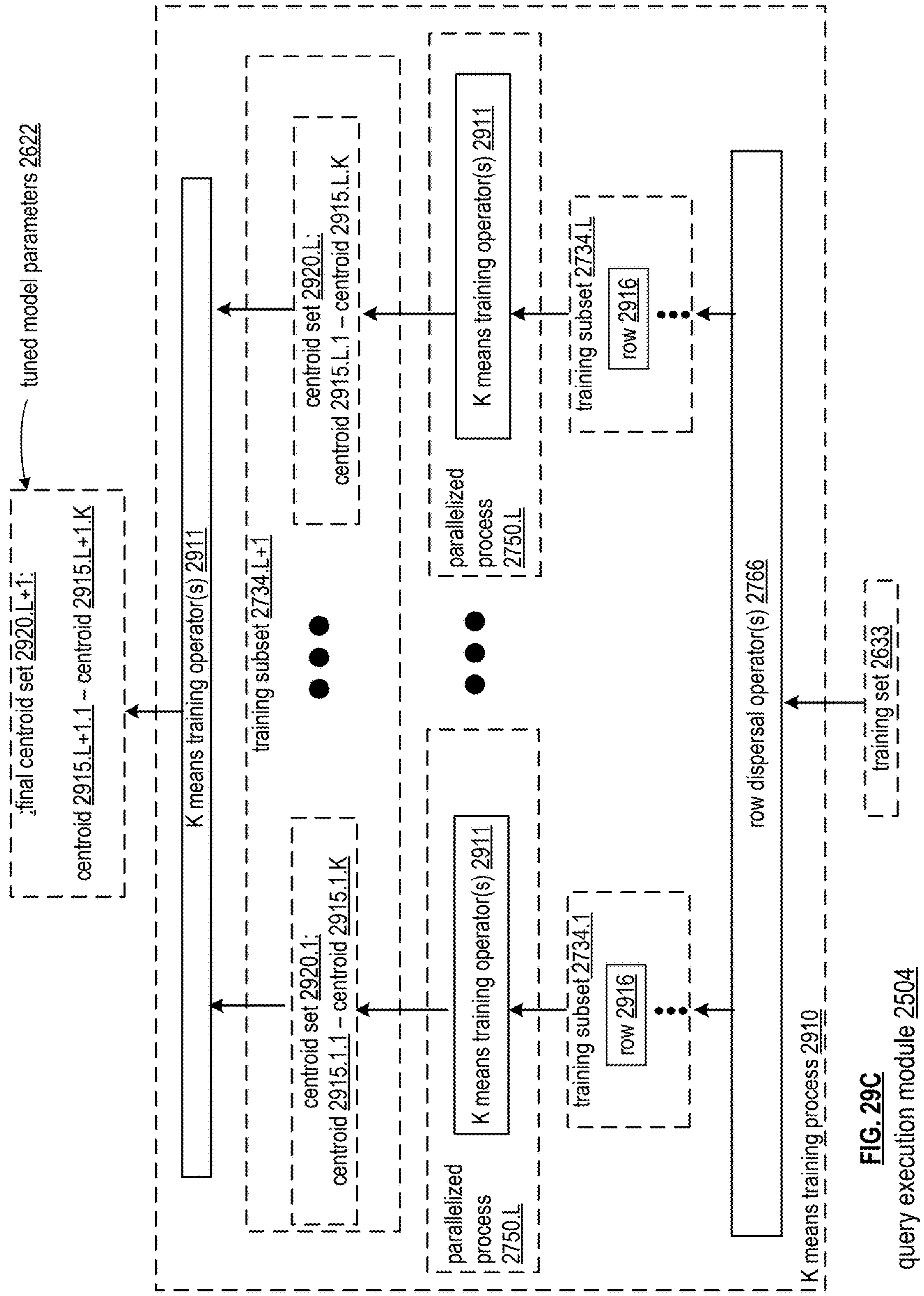
Figure 29D:
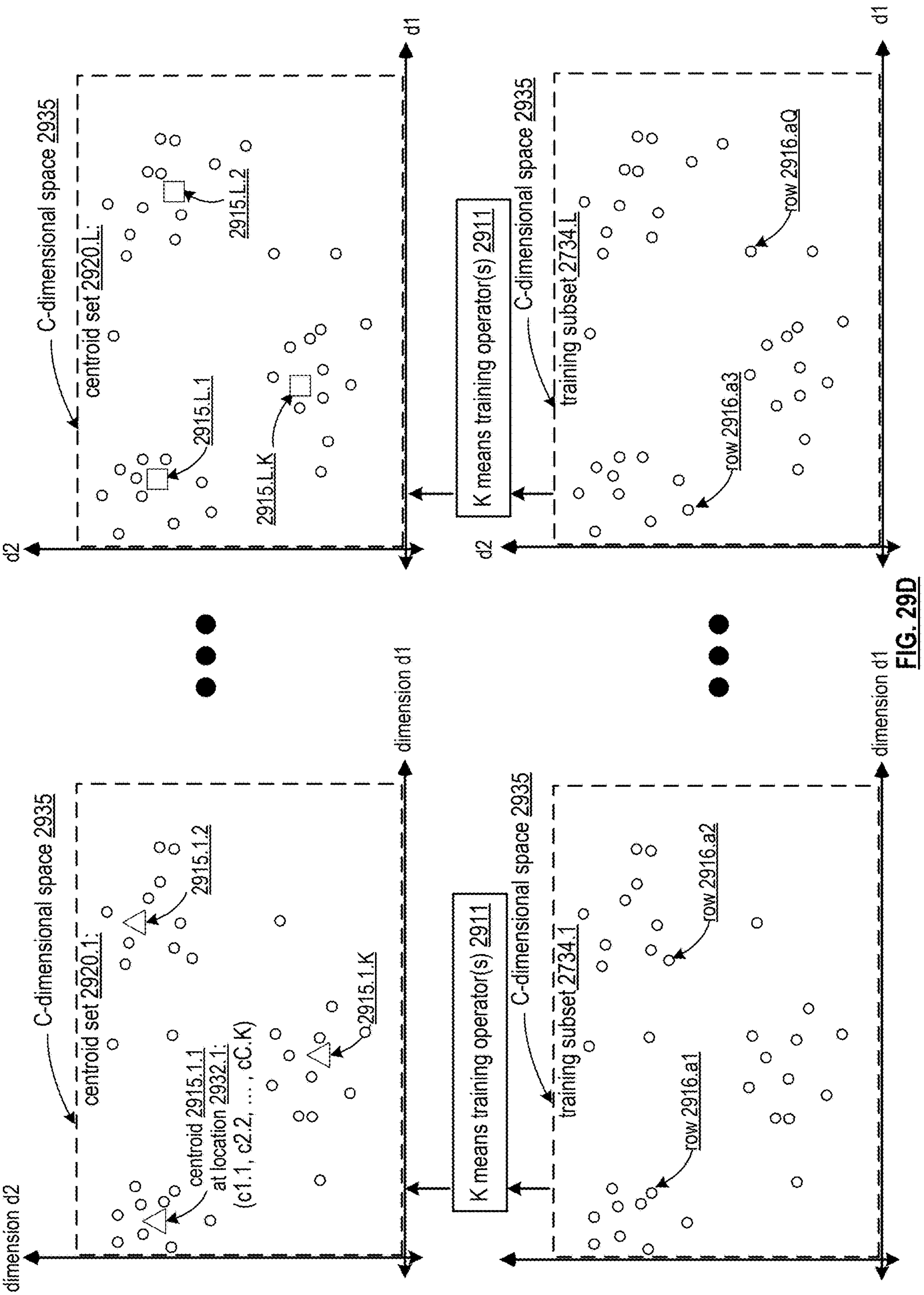
Figure 29E:
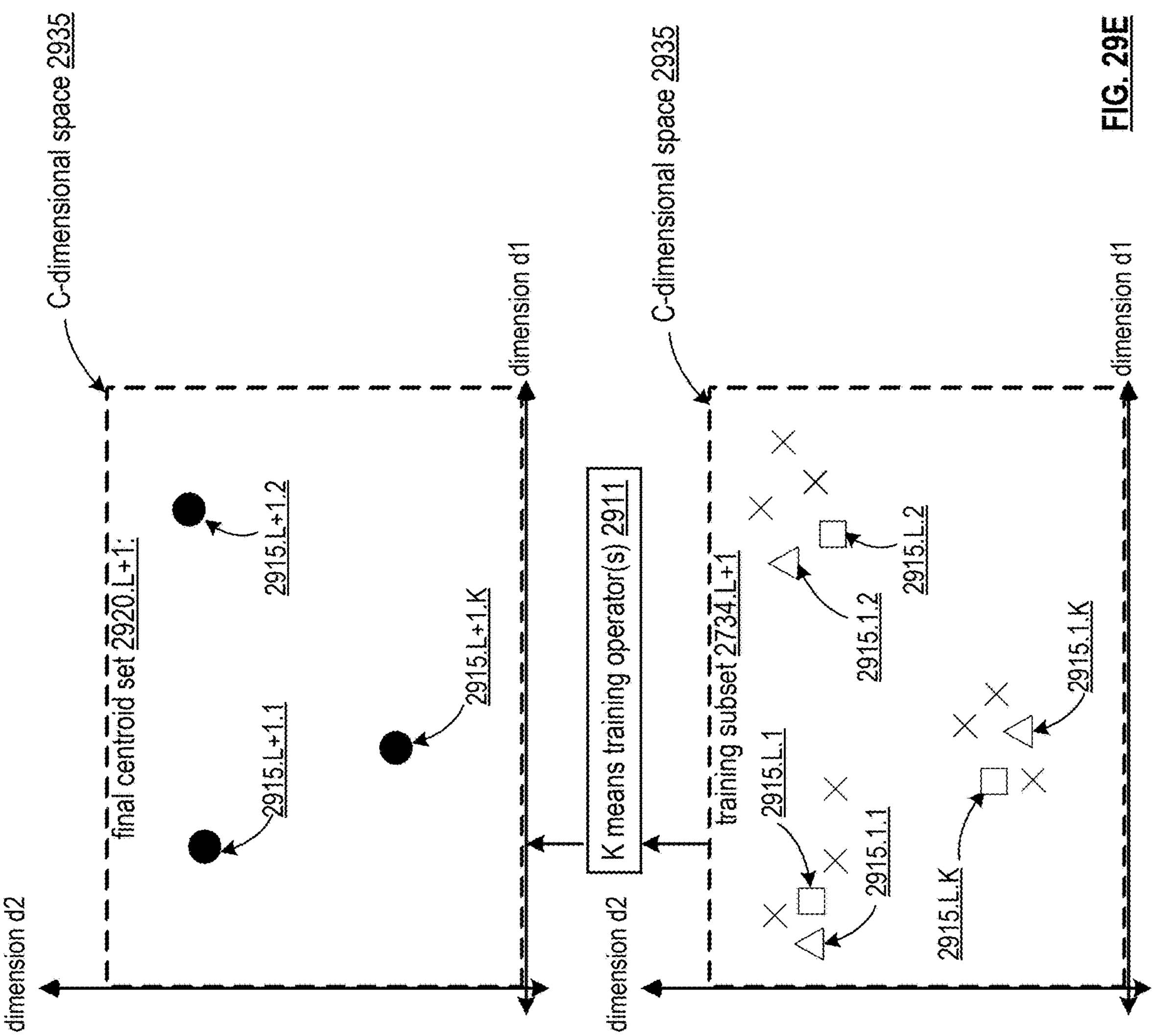
Figure 29F:
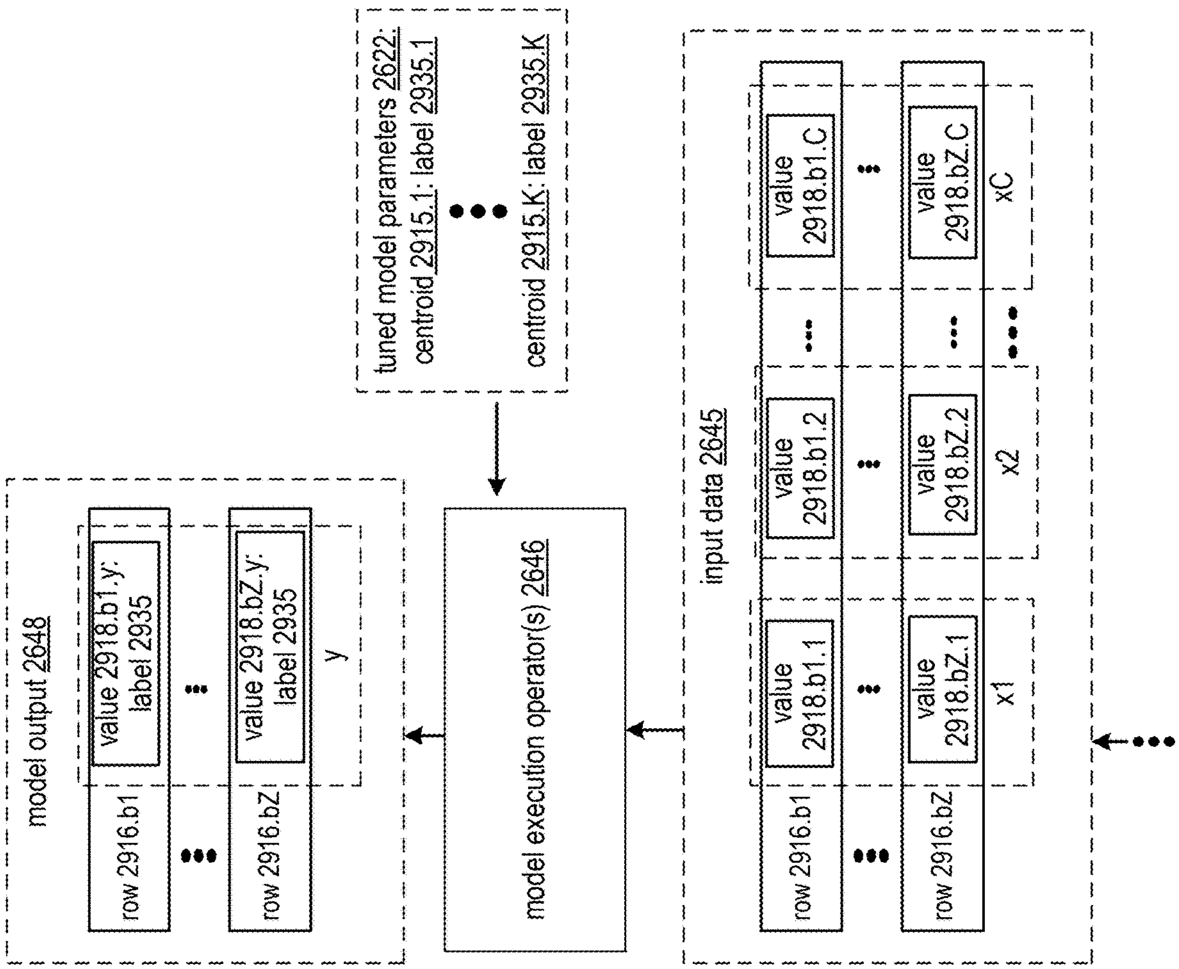
Figure 29G:
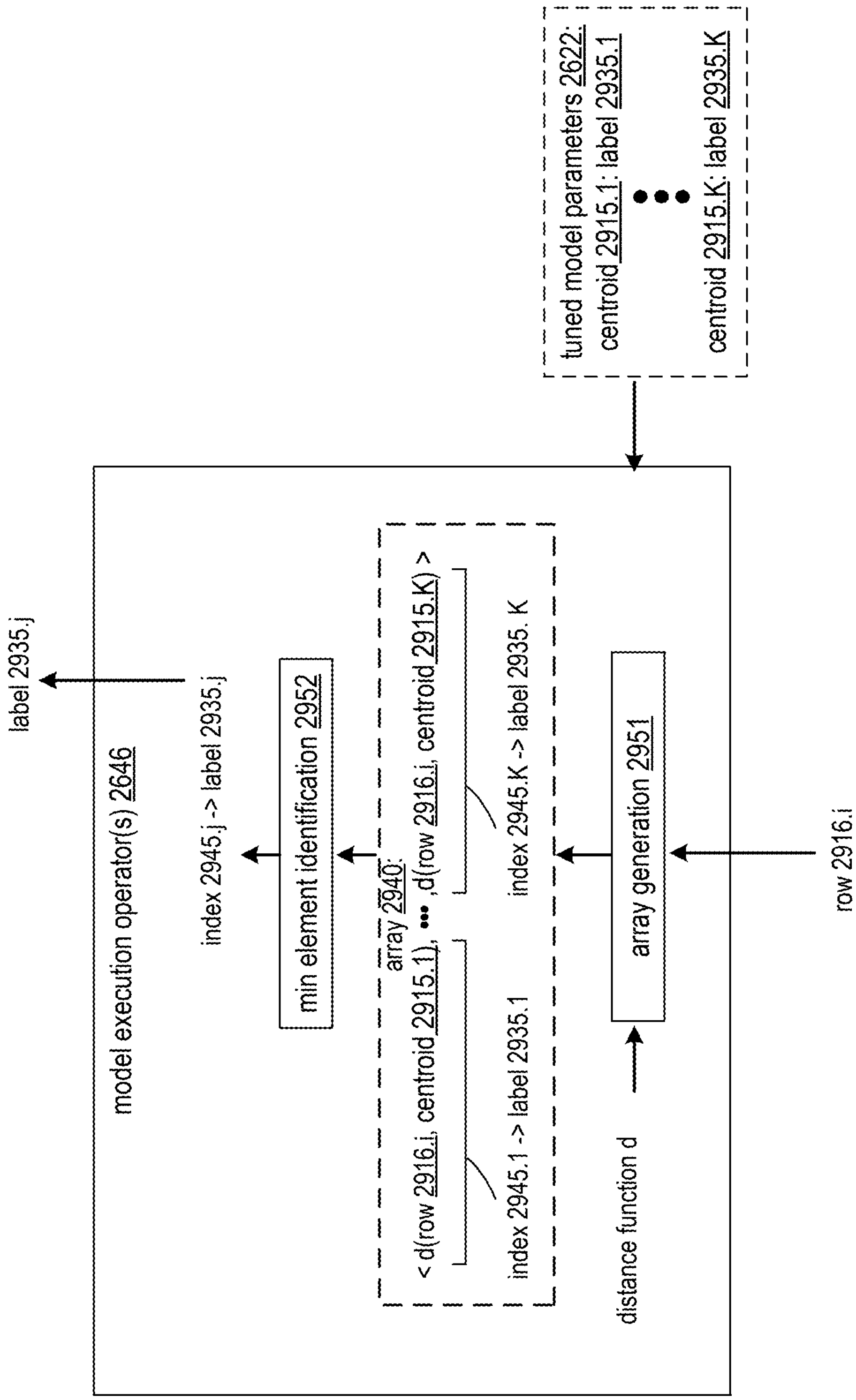
Figure 29H:
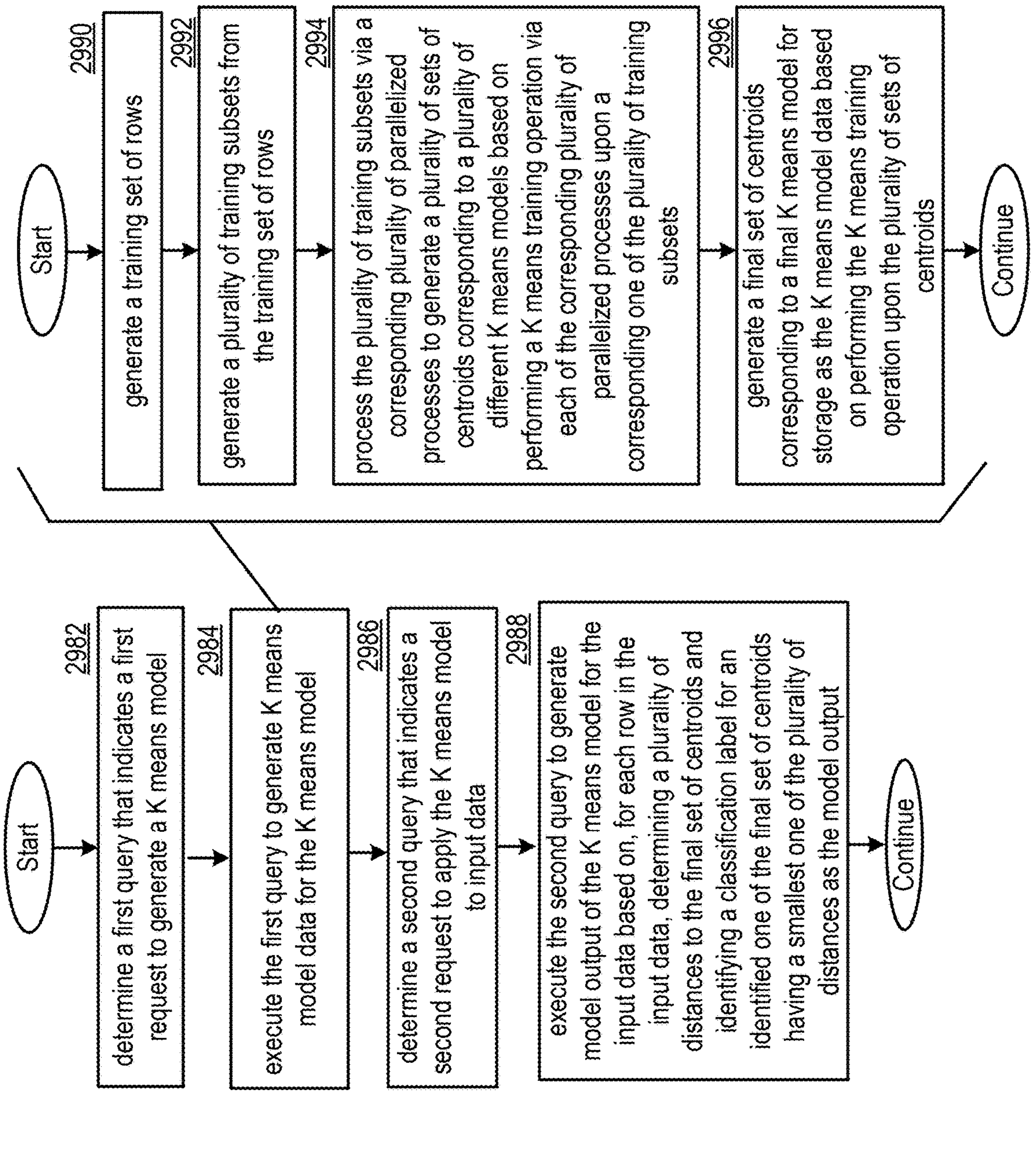
Figure 30A:
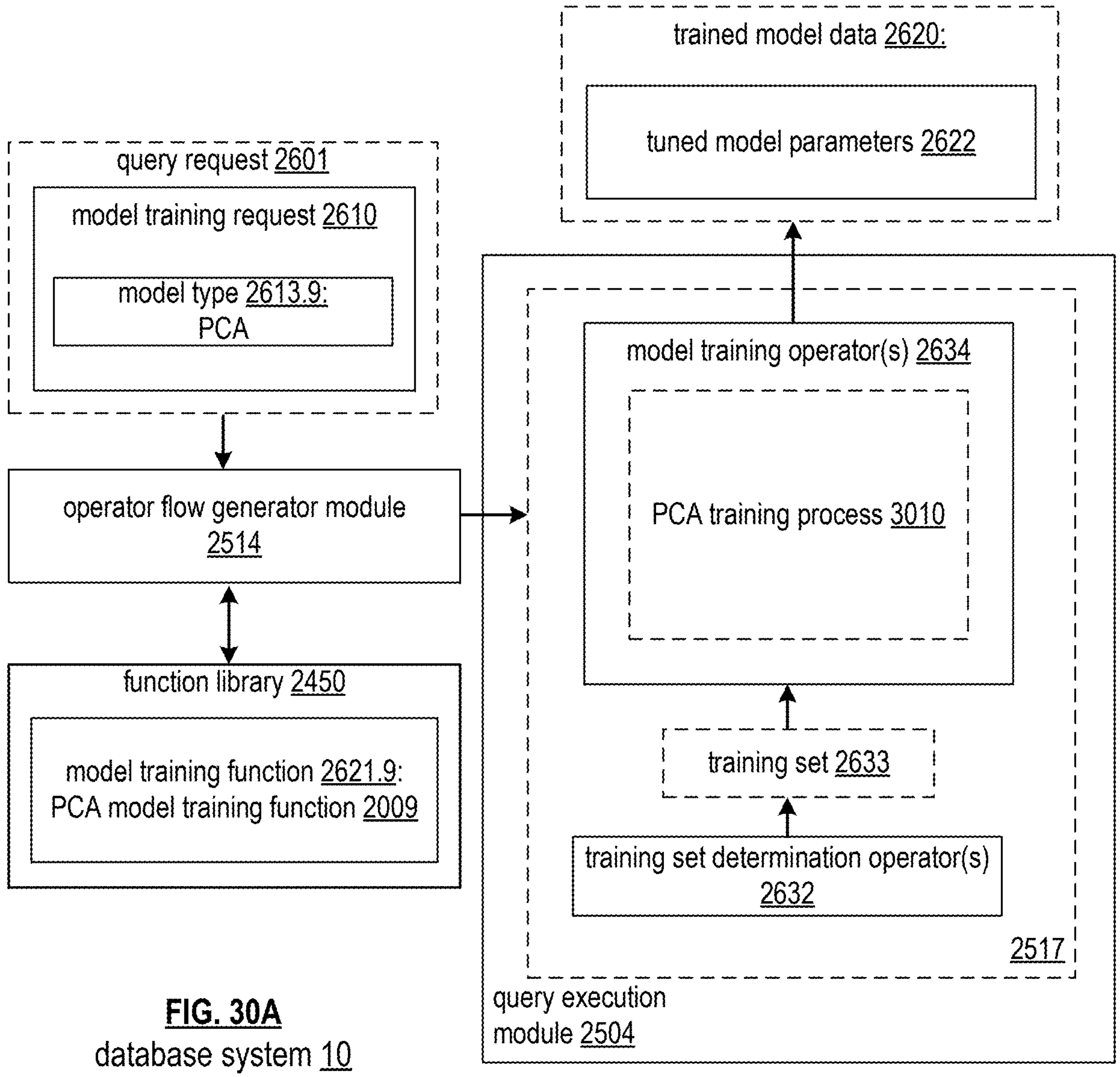
Figure 30B:
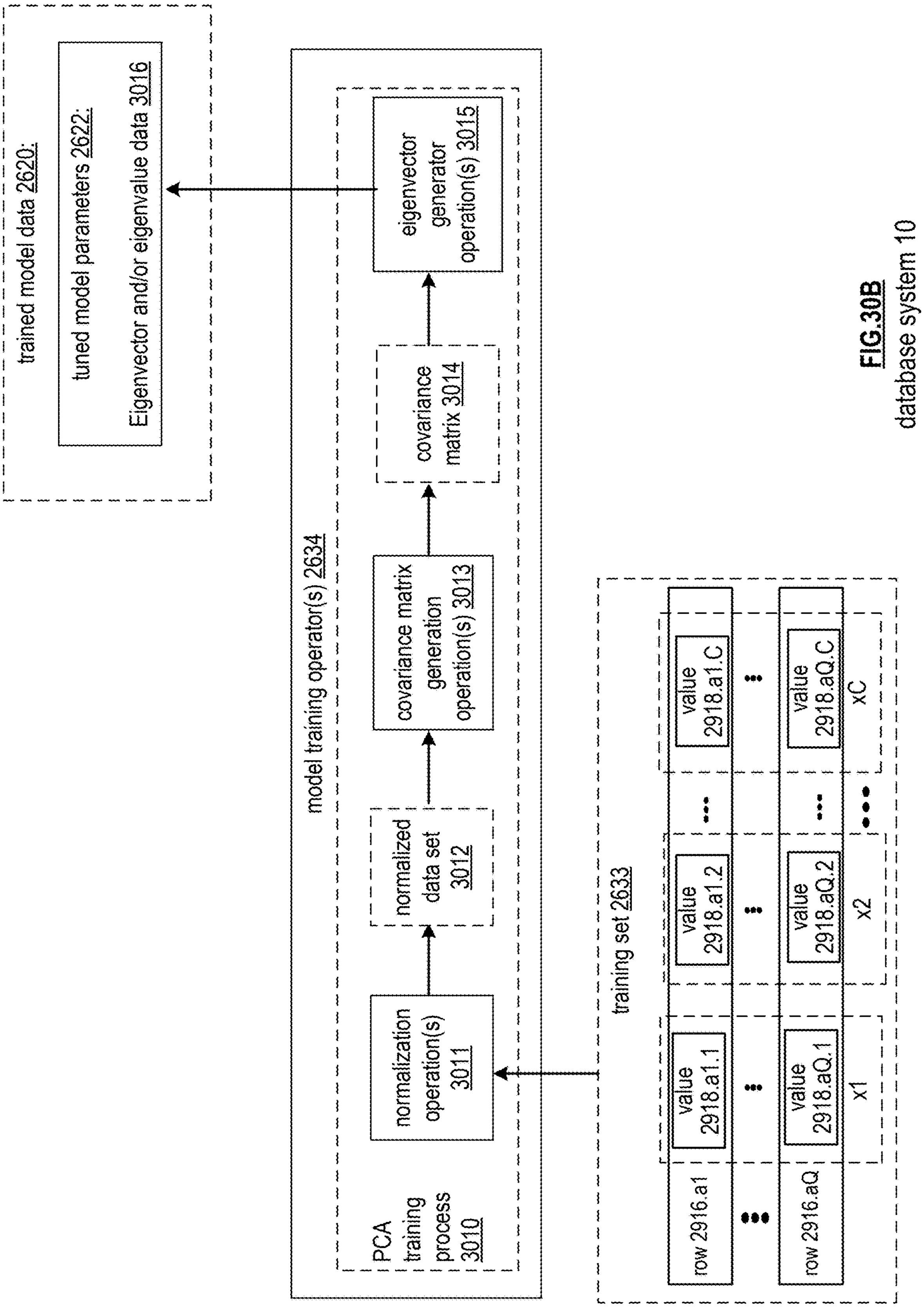
Figure 30C:
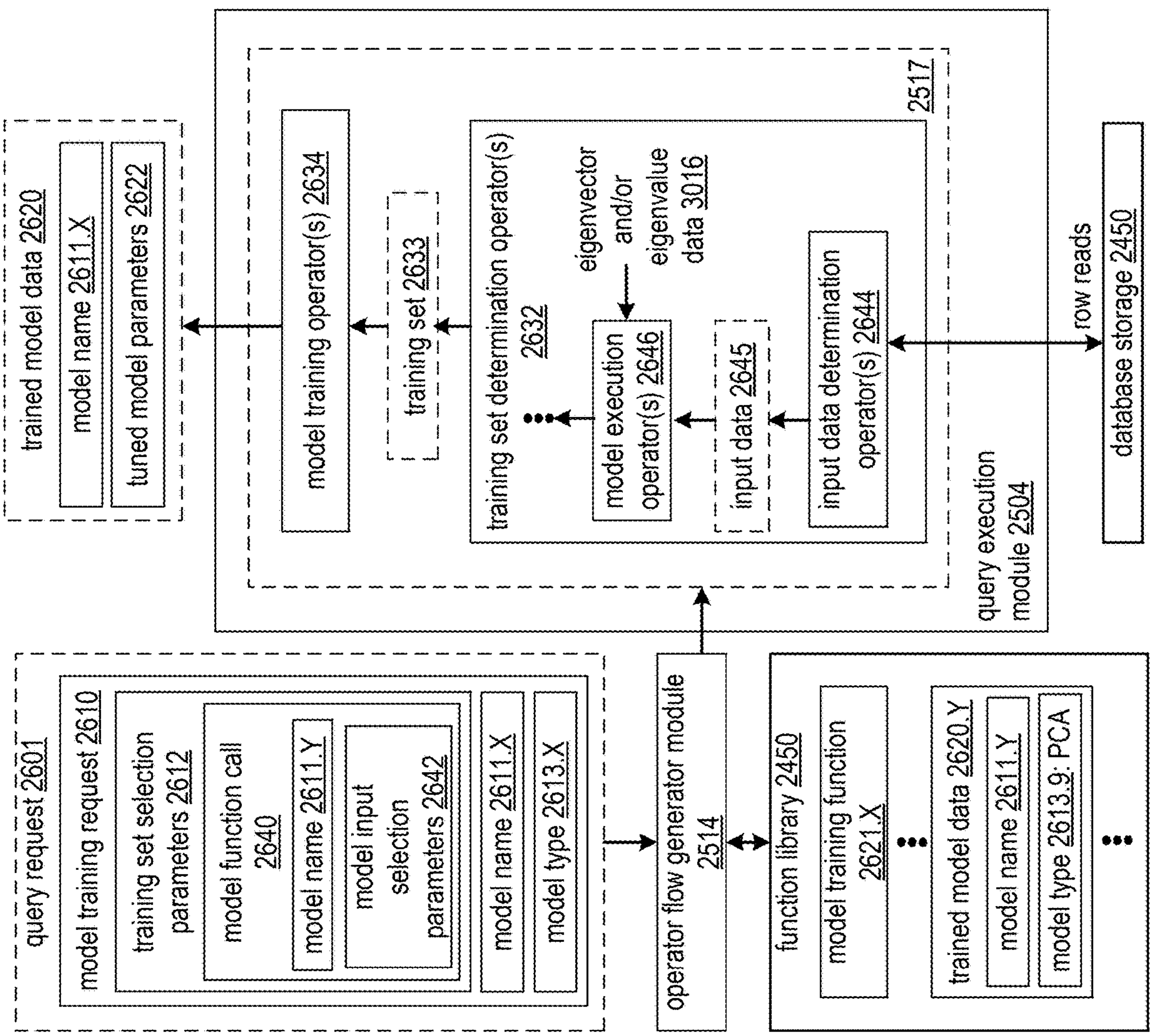
Figure 30D:
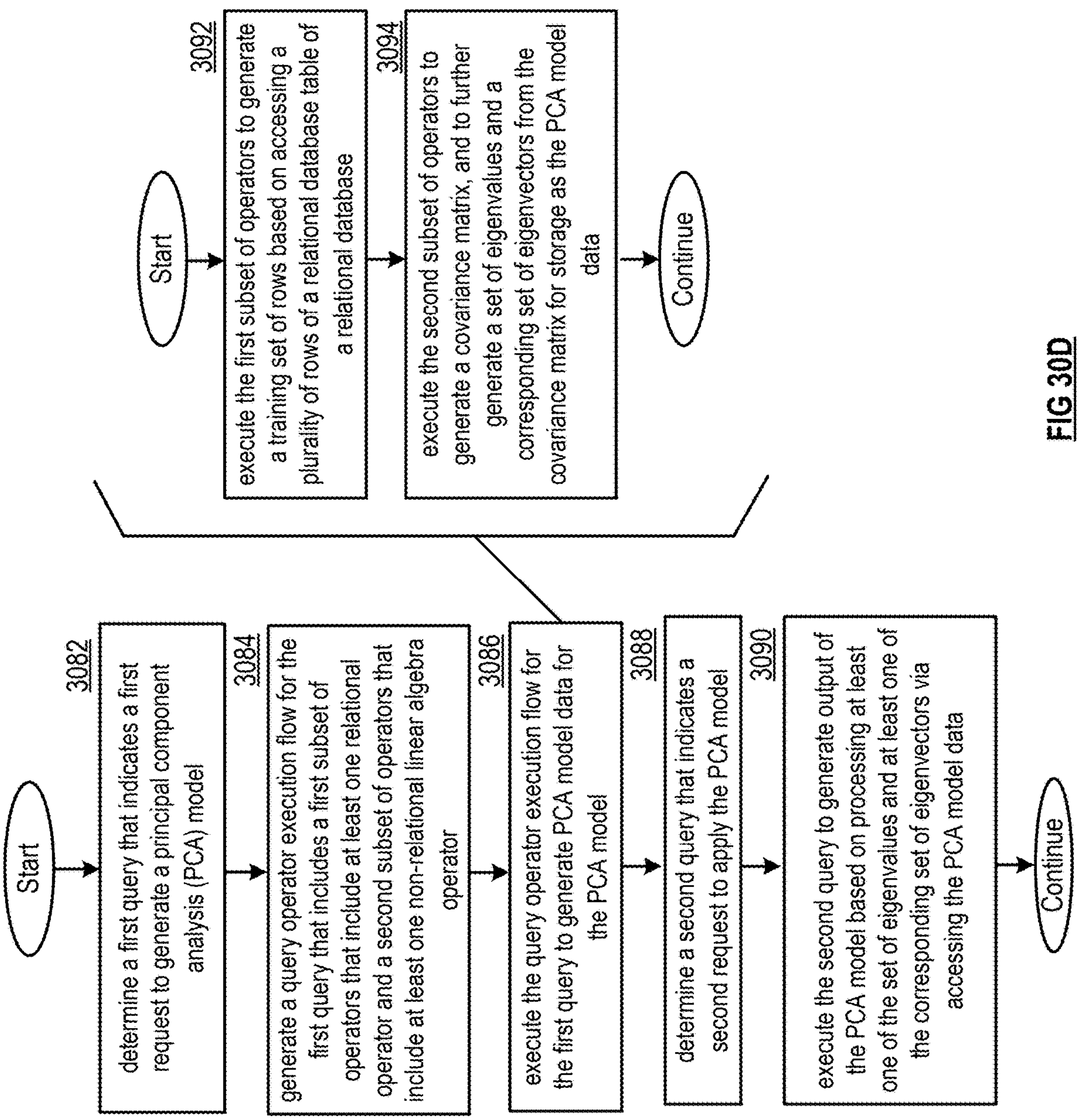
Figure 31A:
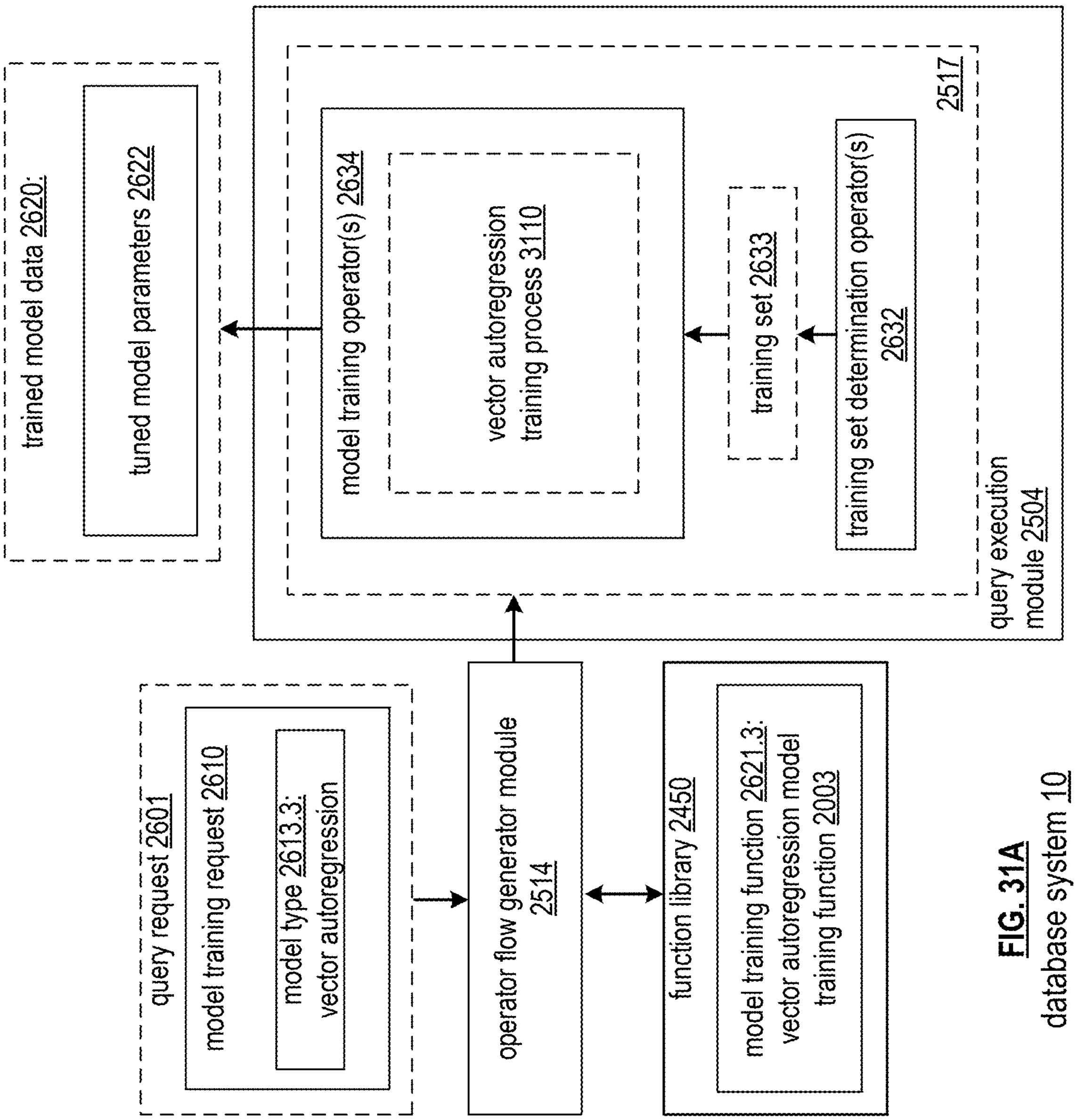
Figure 31B:
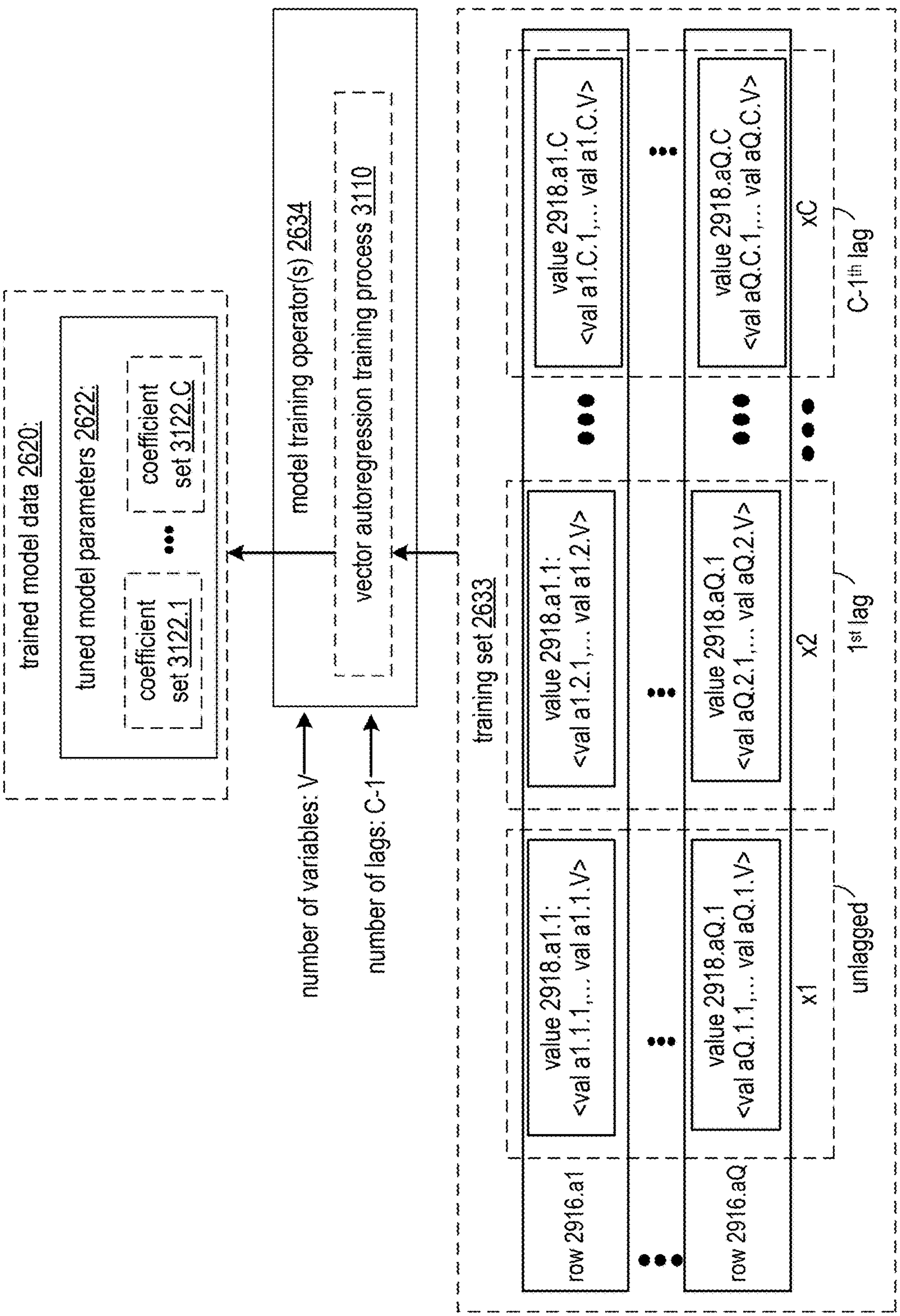
Figure 31C:
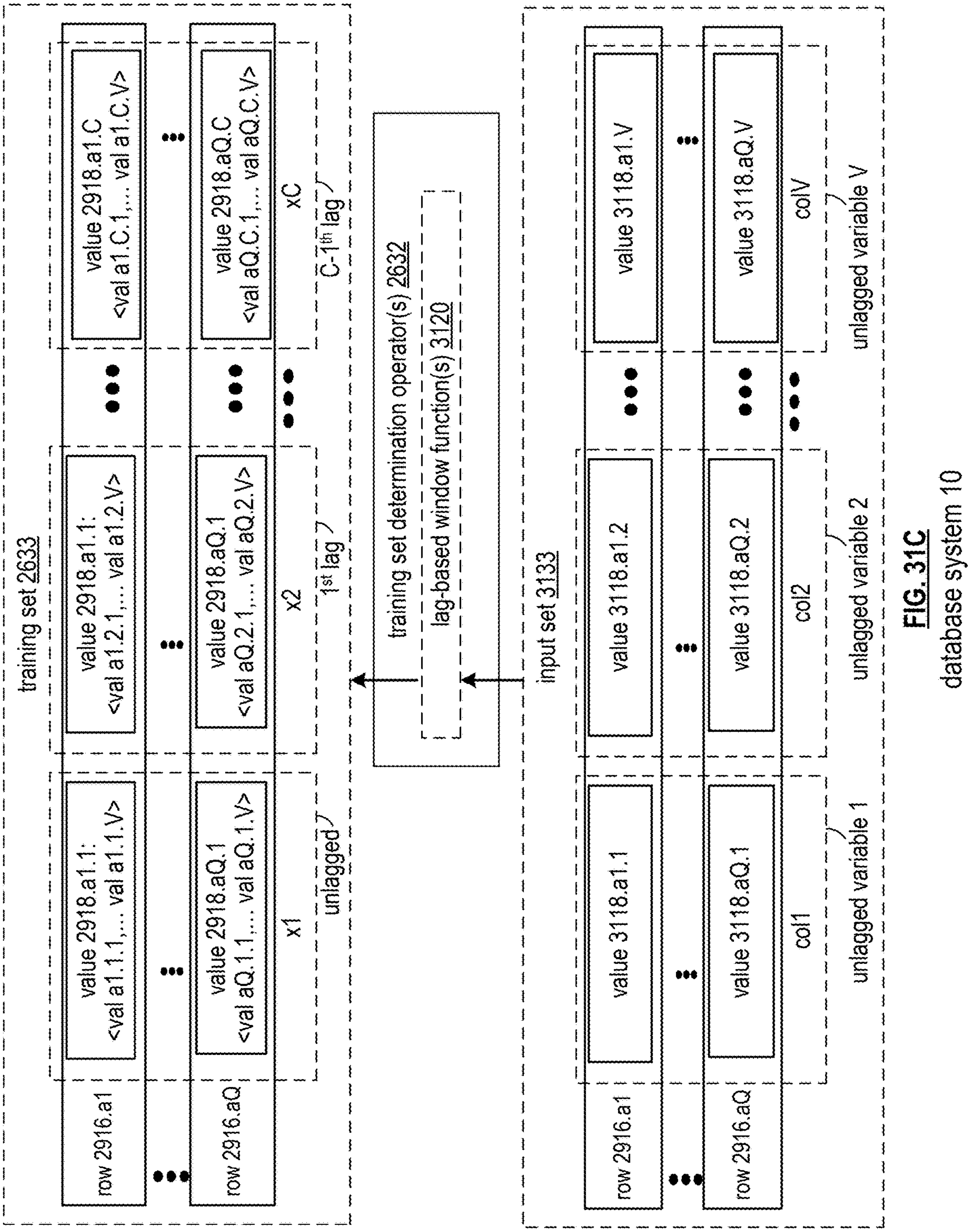
Figure 31D:
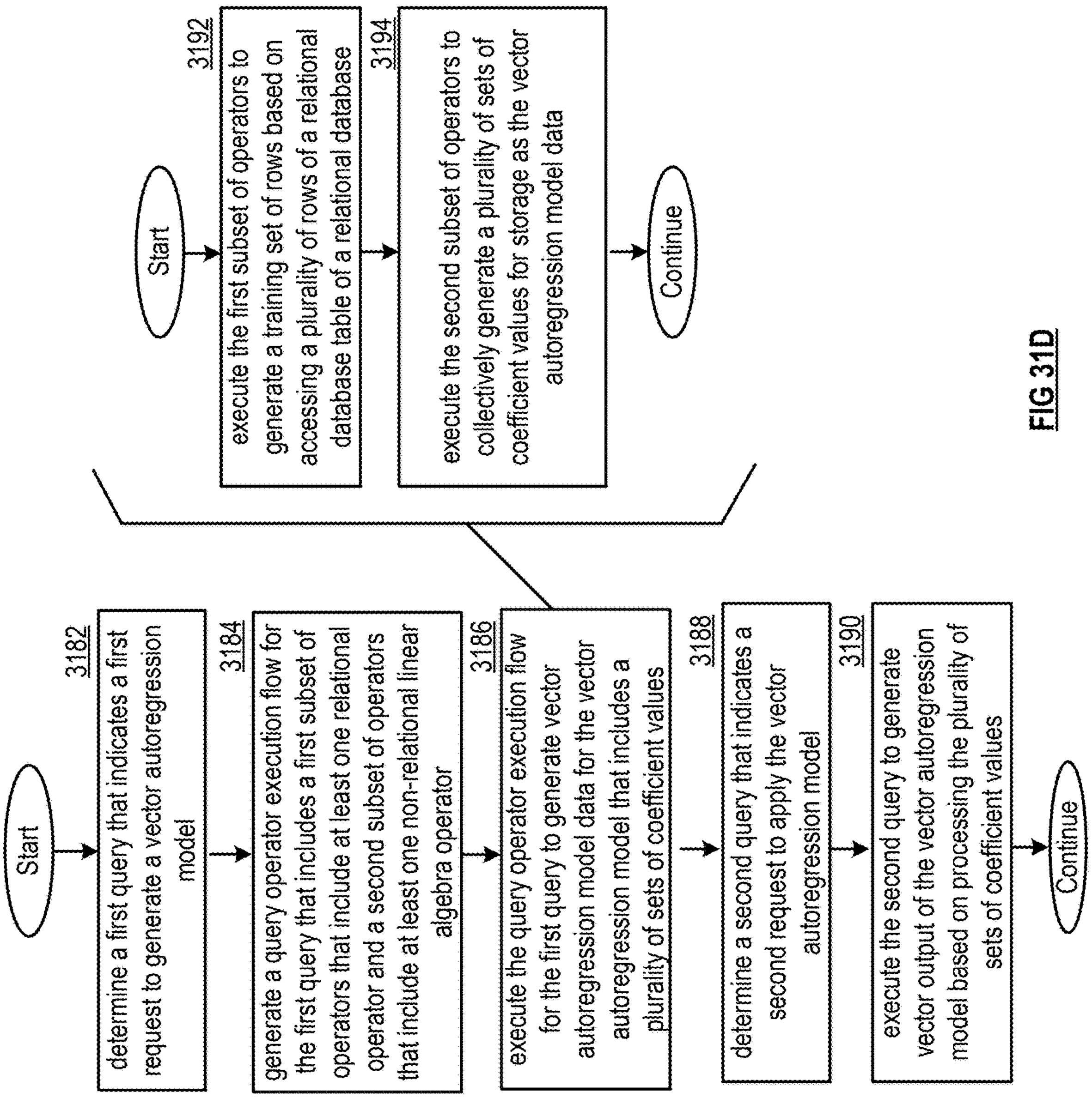
Figure 32A:
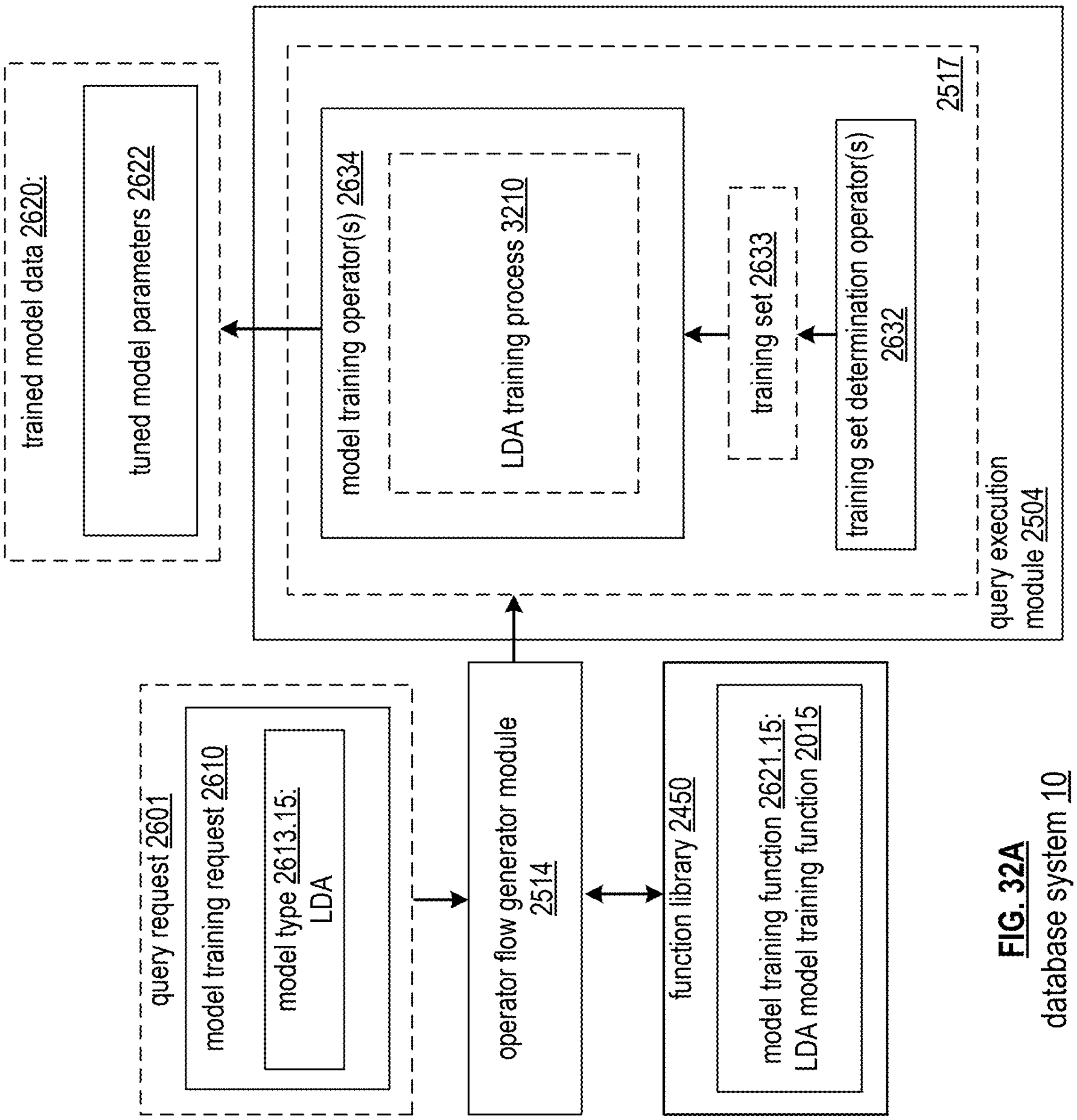
Figure 32B:
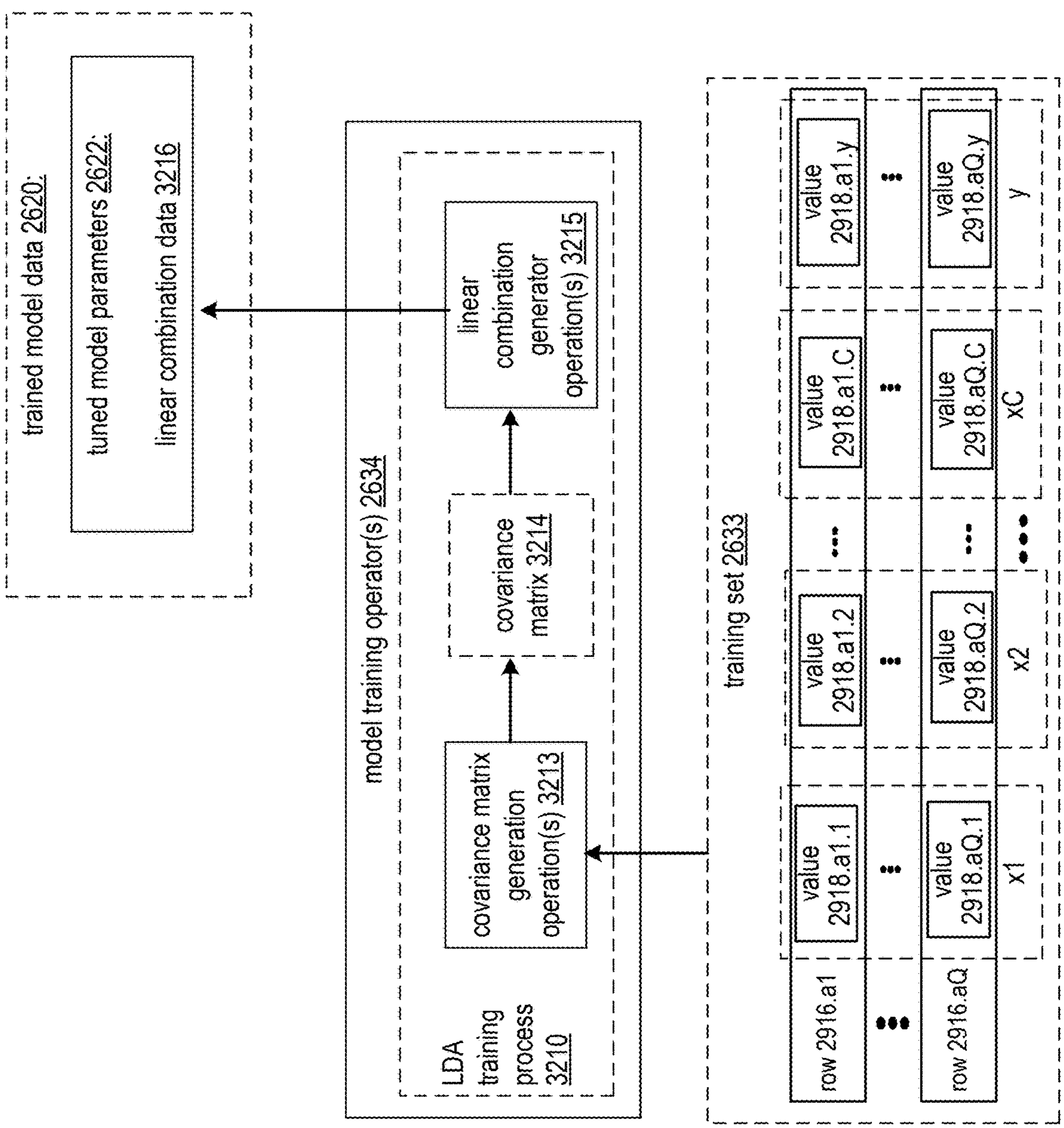
Figure 32C:
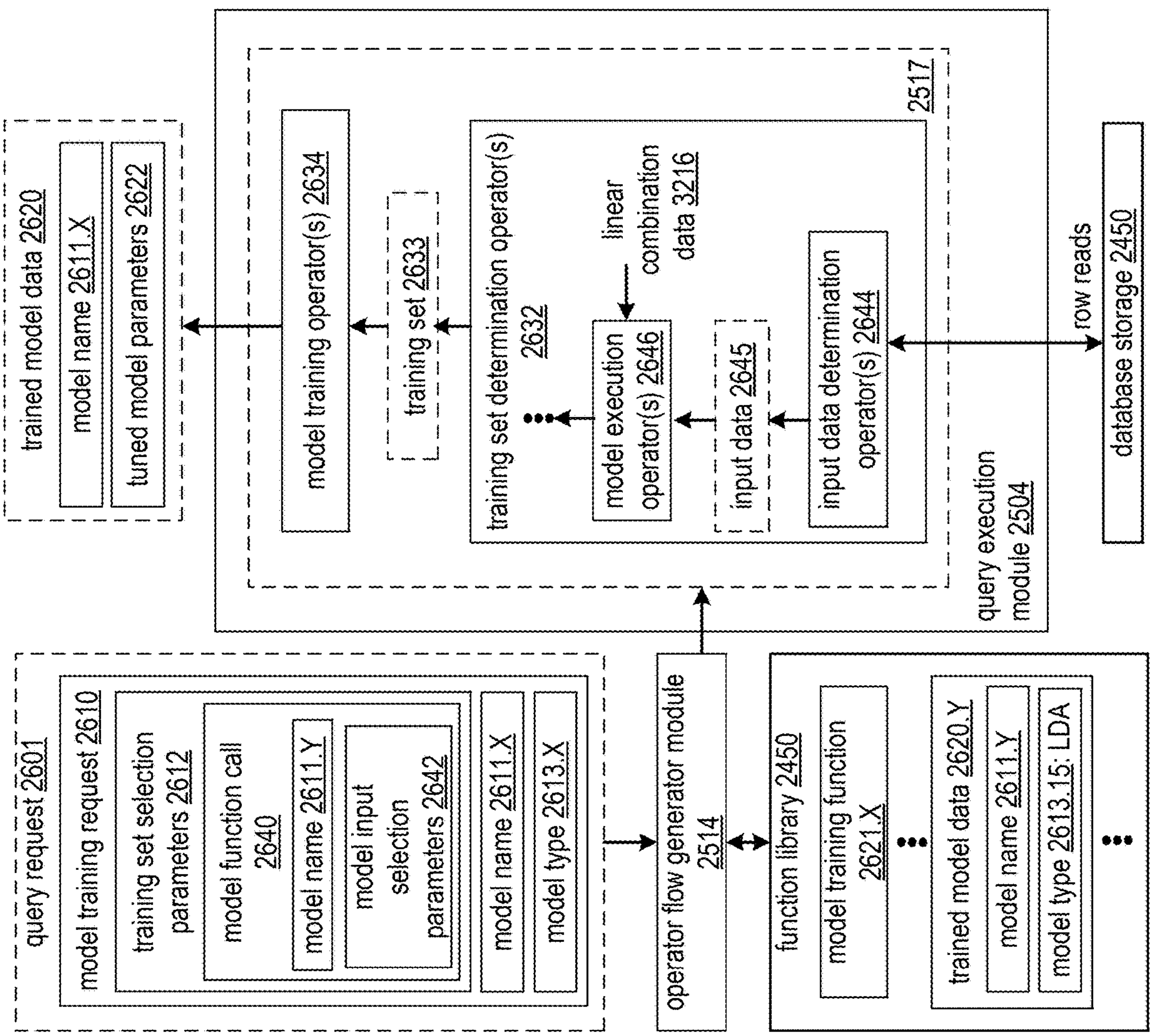
Figure 32D:
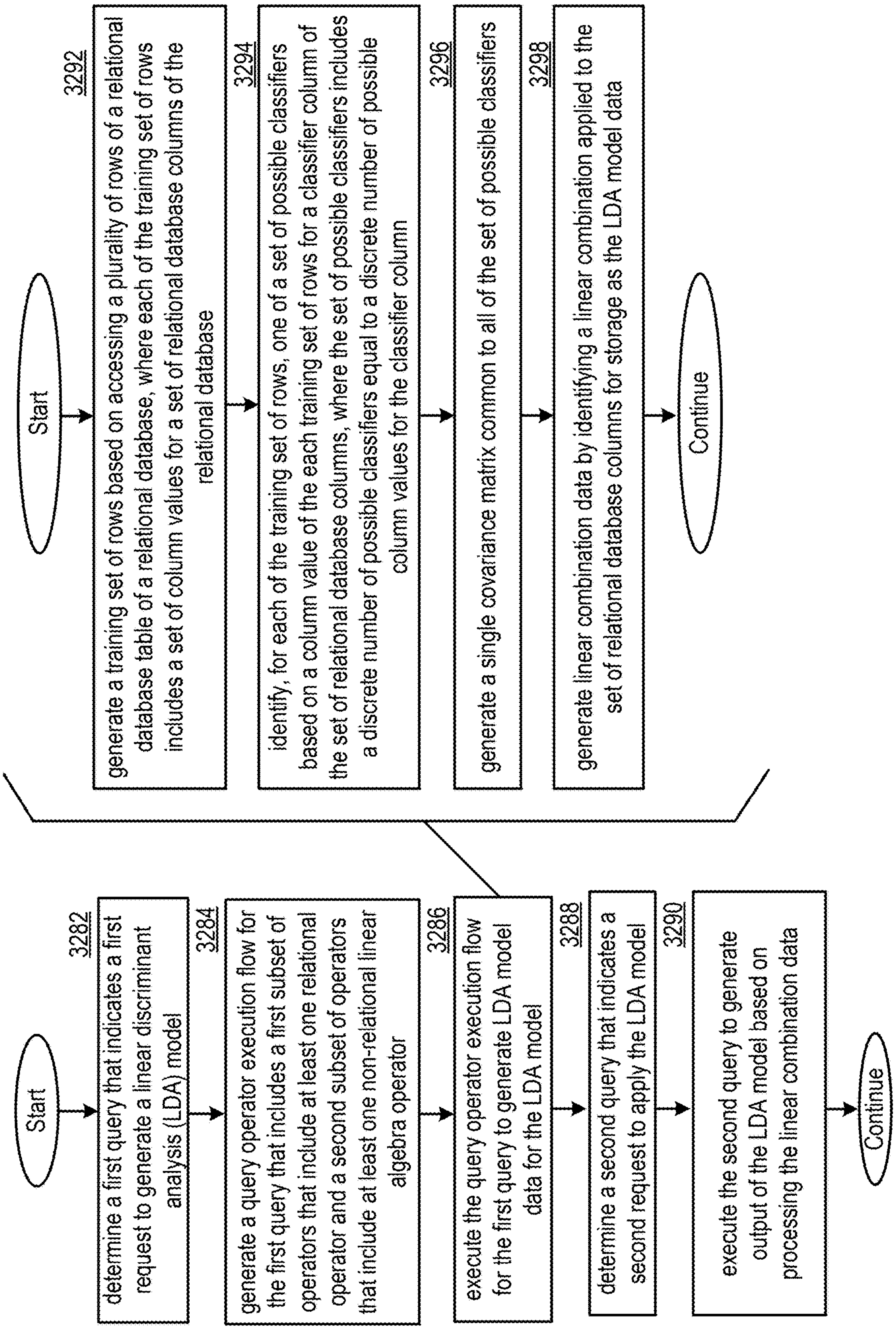
Figure 33A:
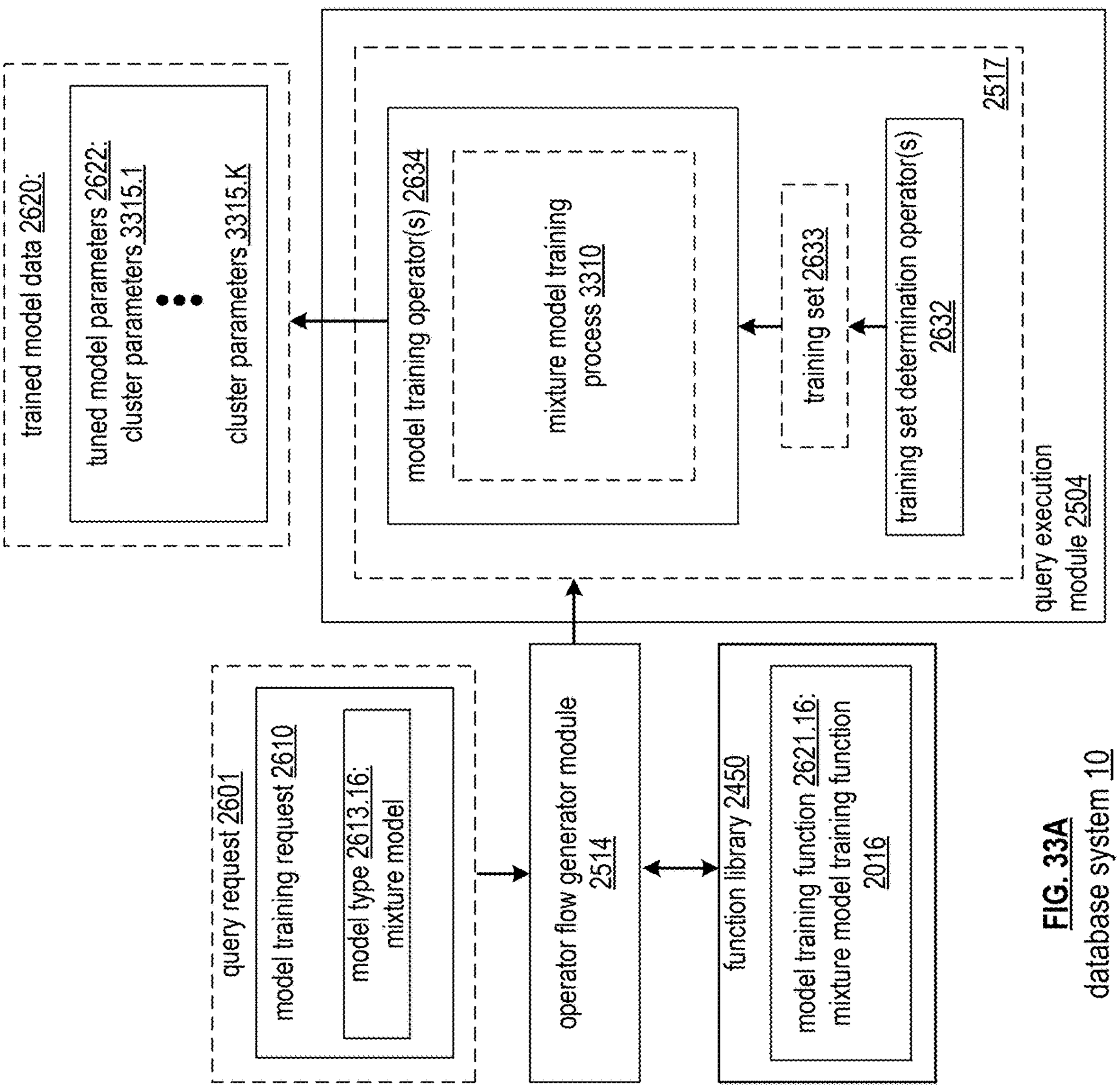
Figure 33B:
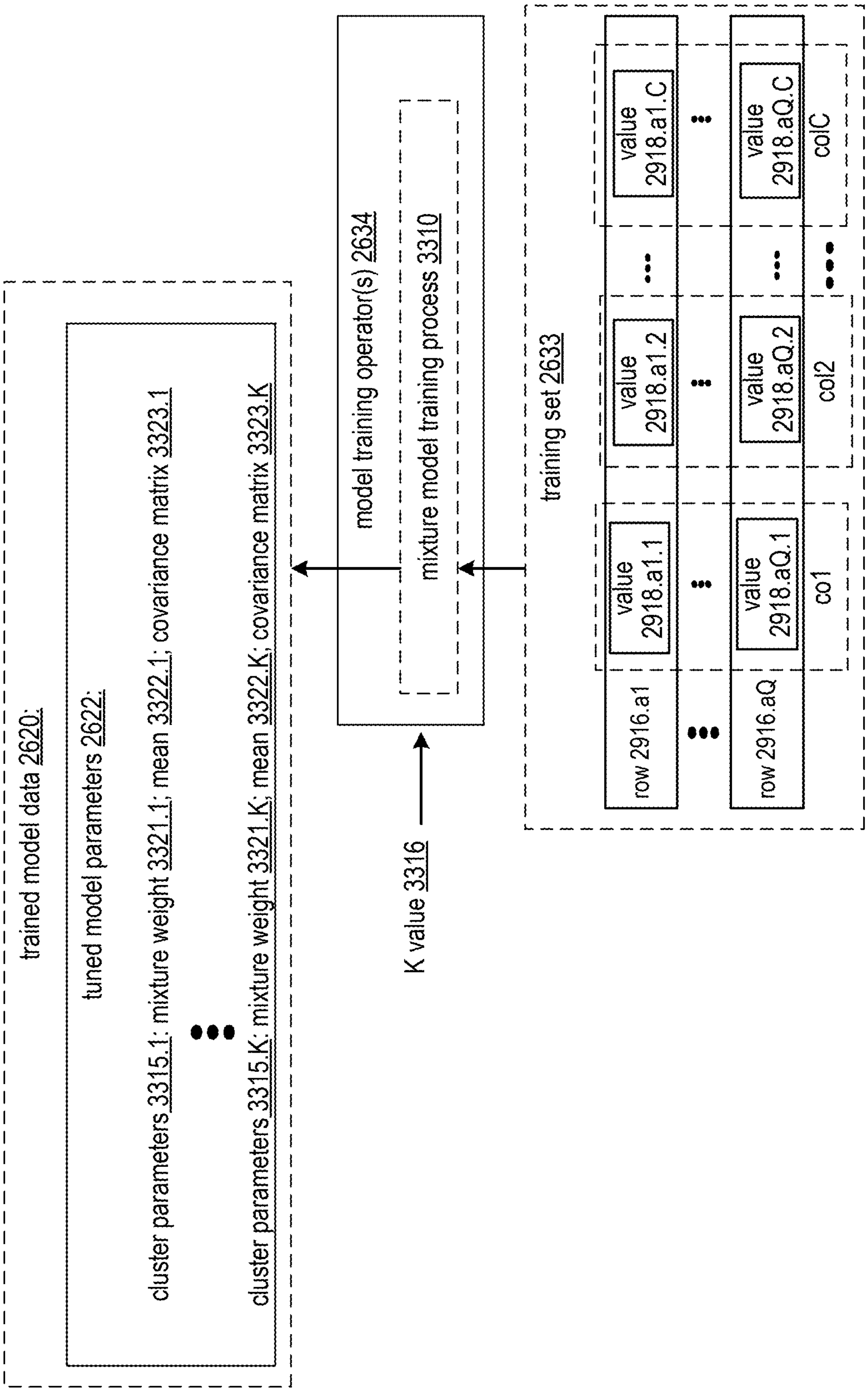
Figure 33C:
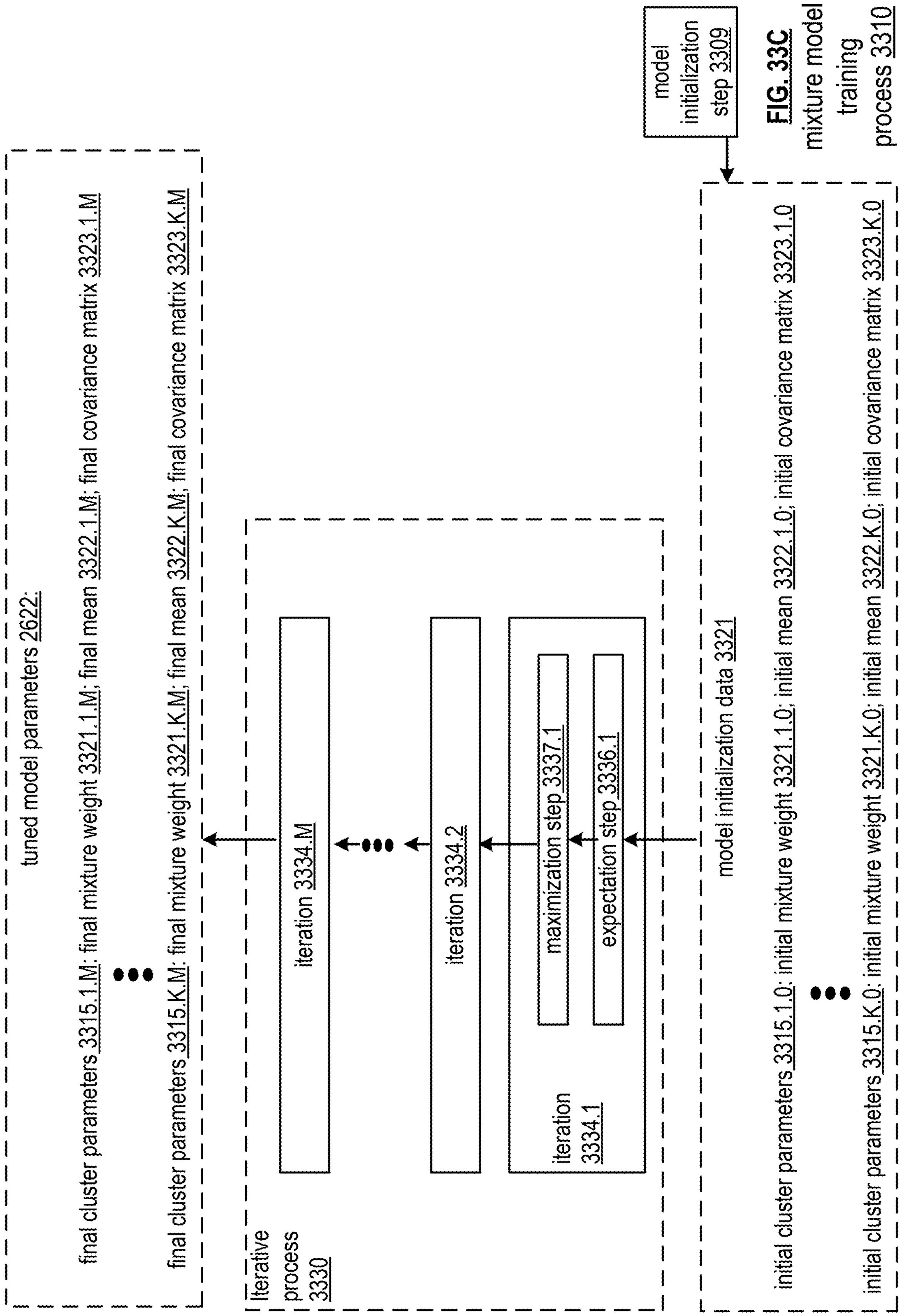
Figure 33D:
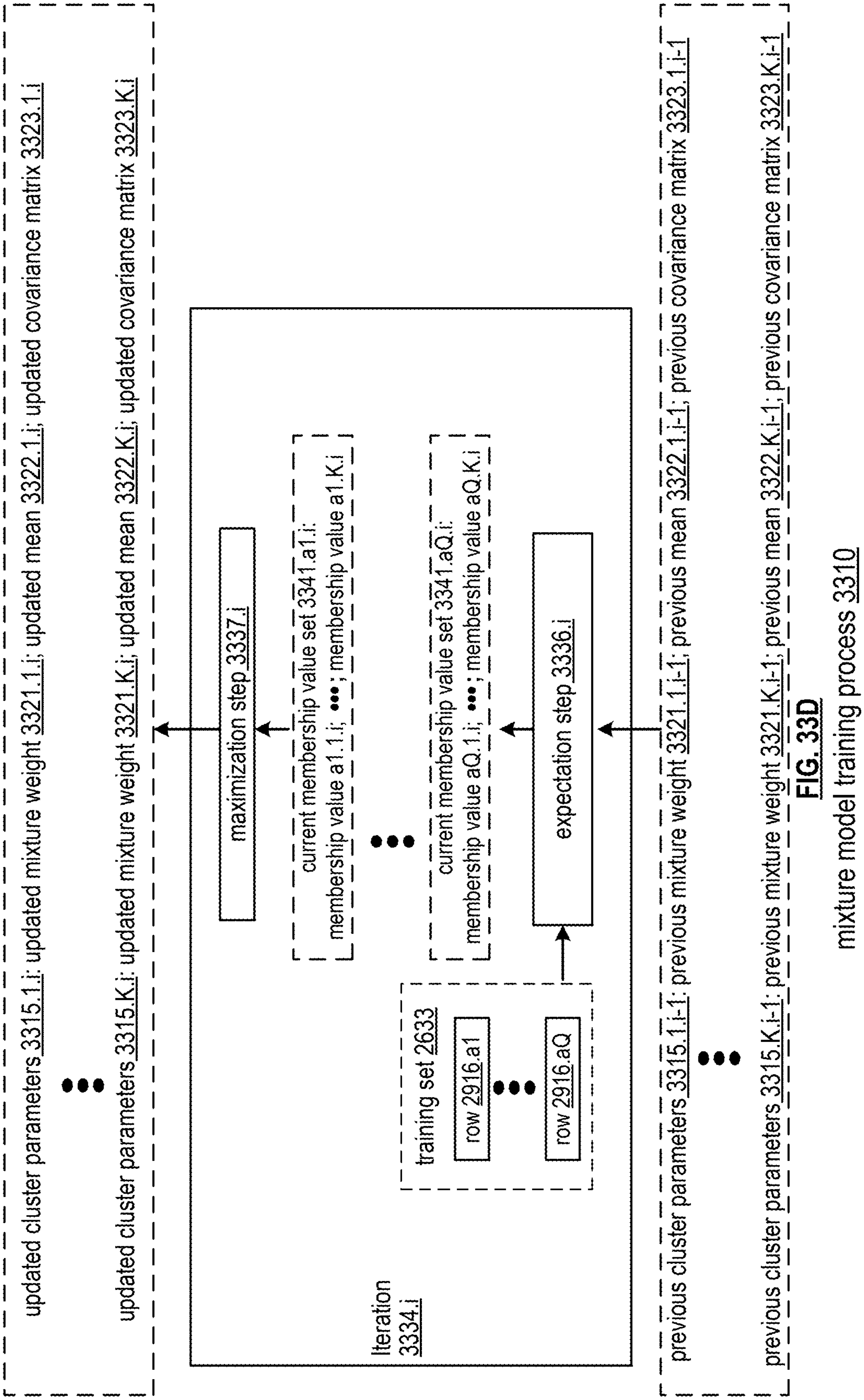
Figure 33E:
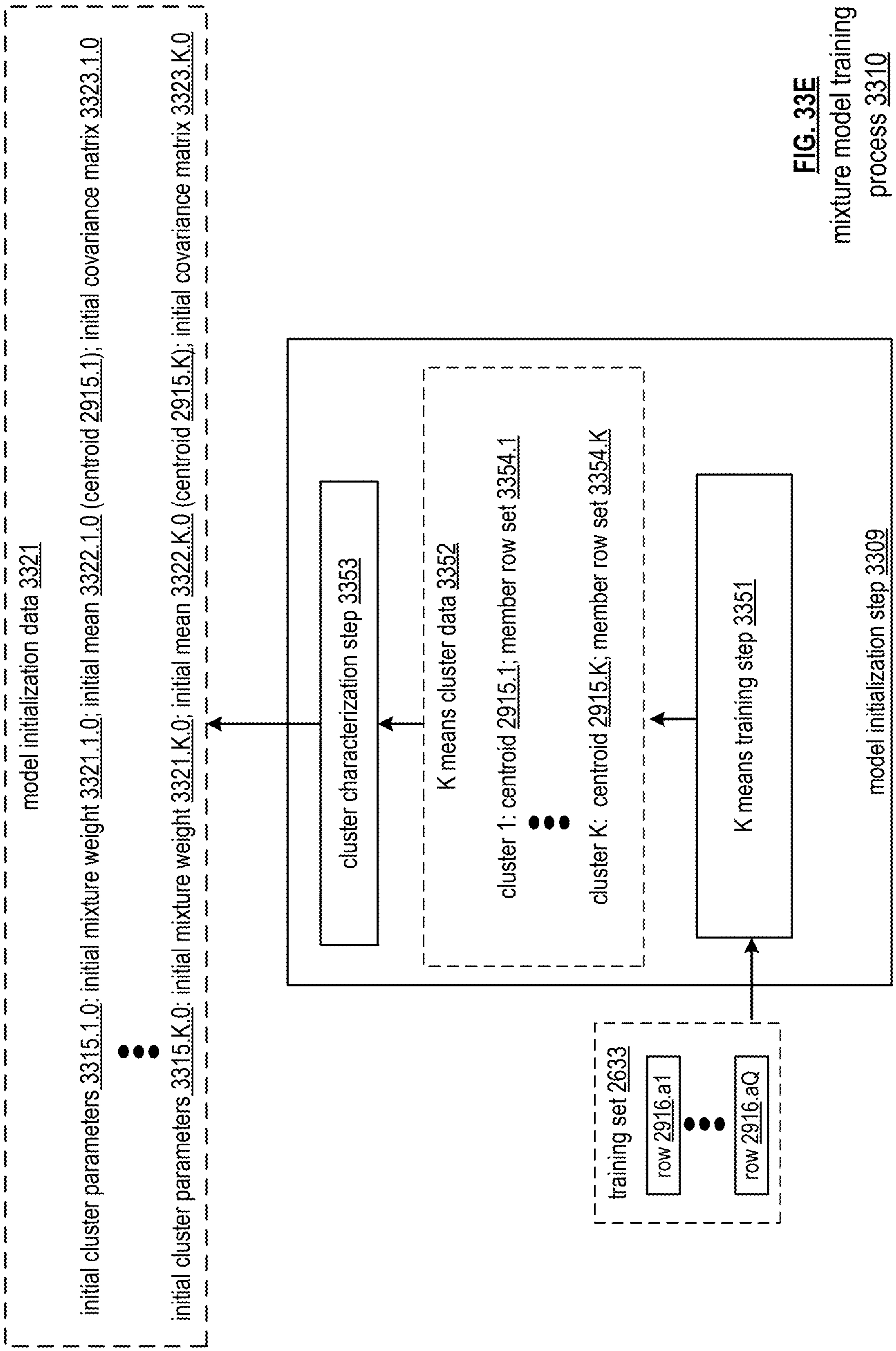
Figure 33F:
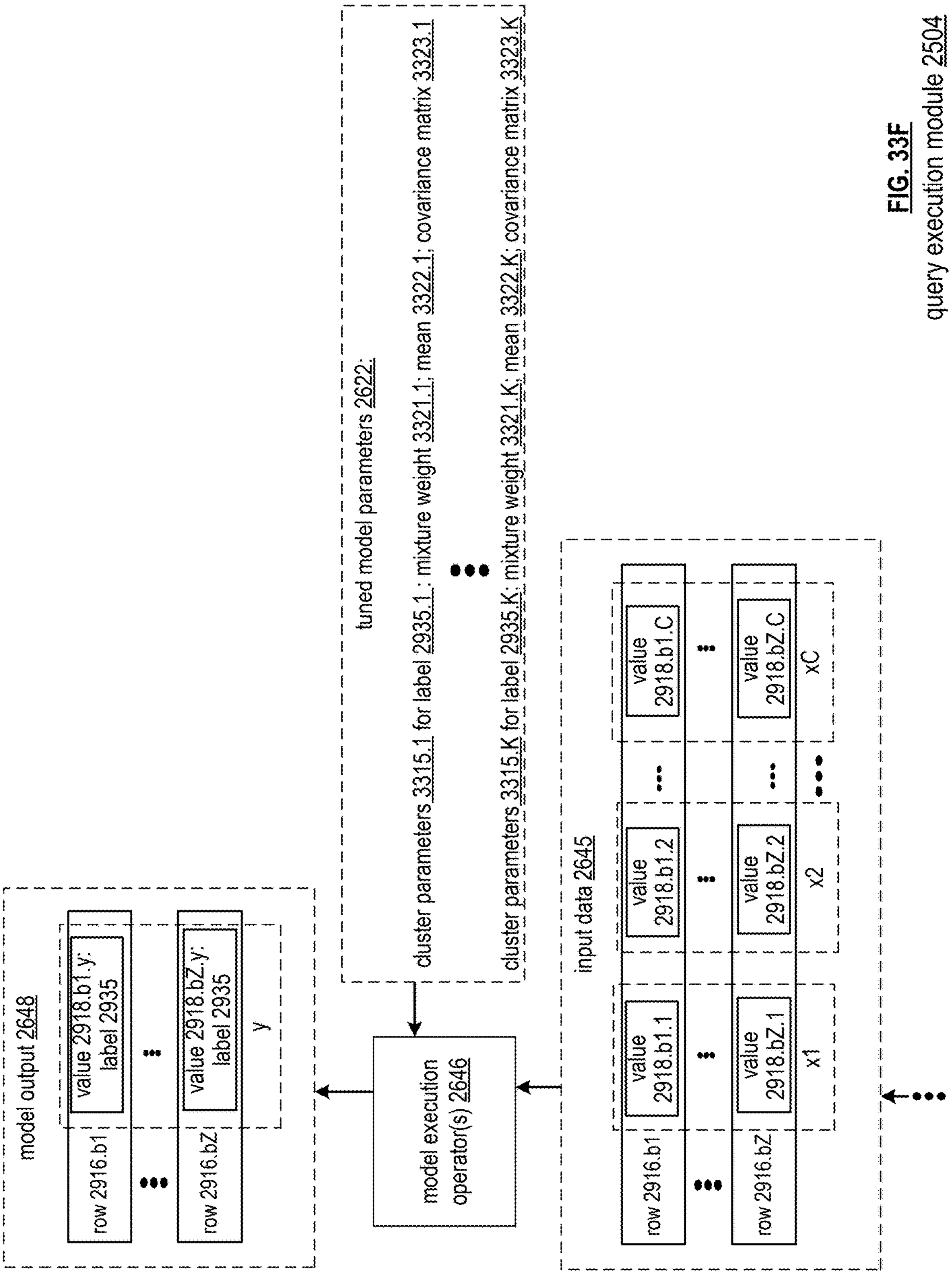
Figure 33G:
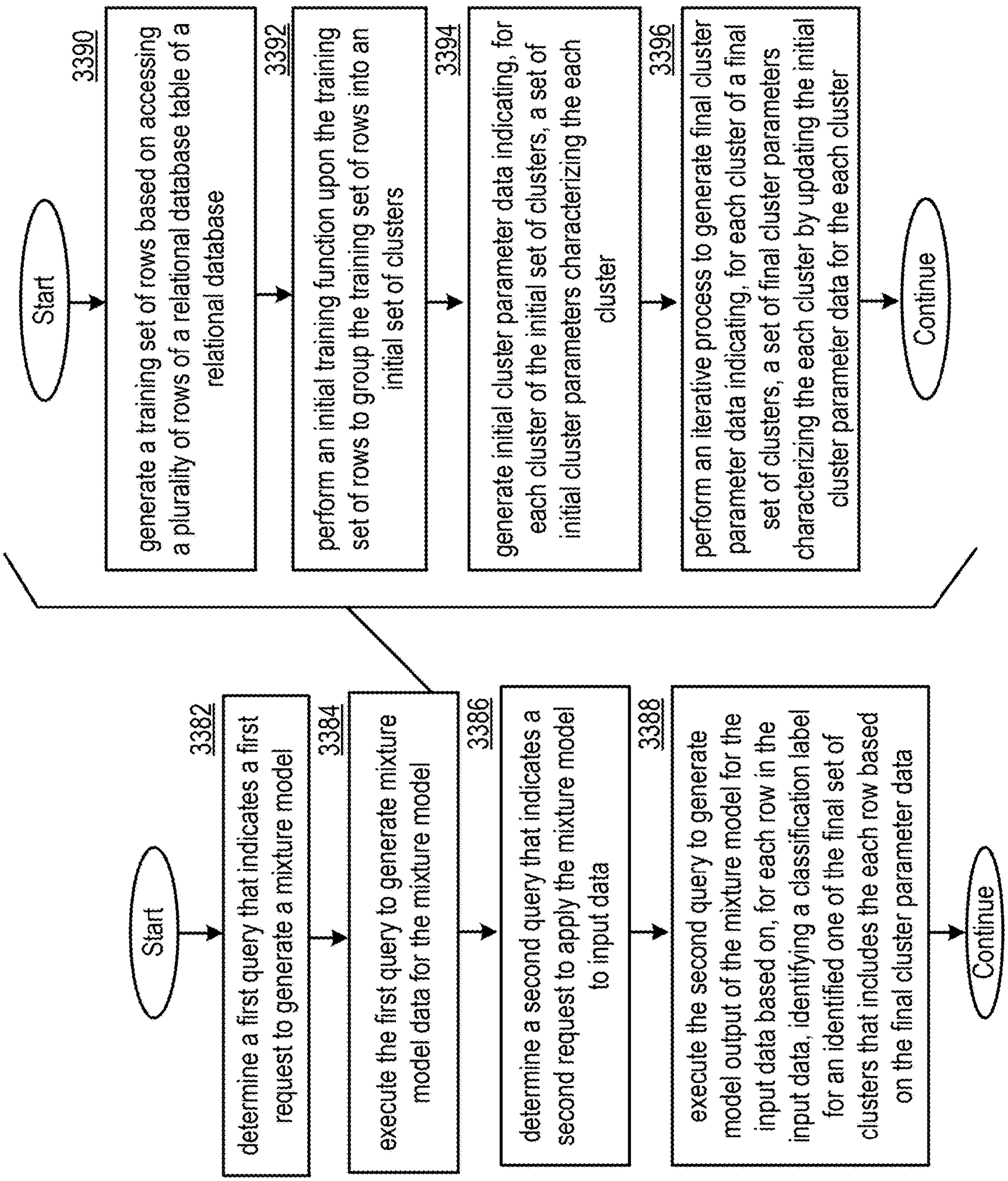
Figure 34A:
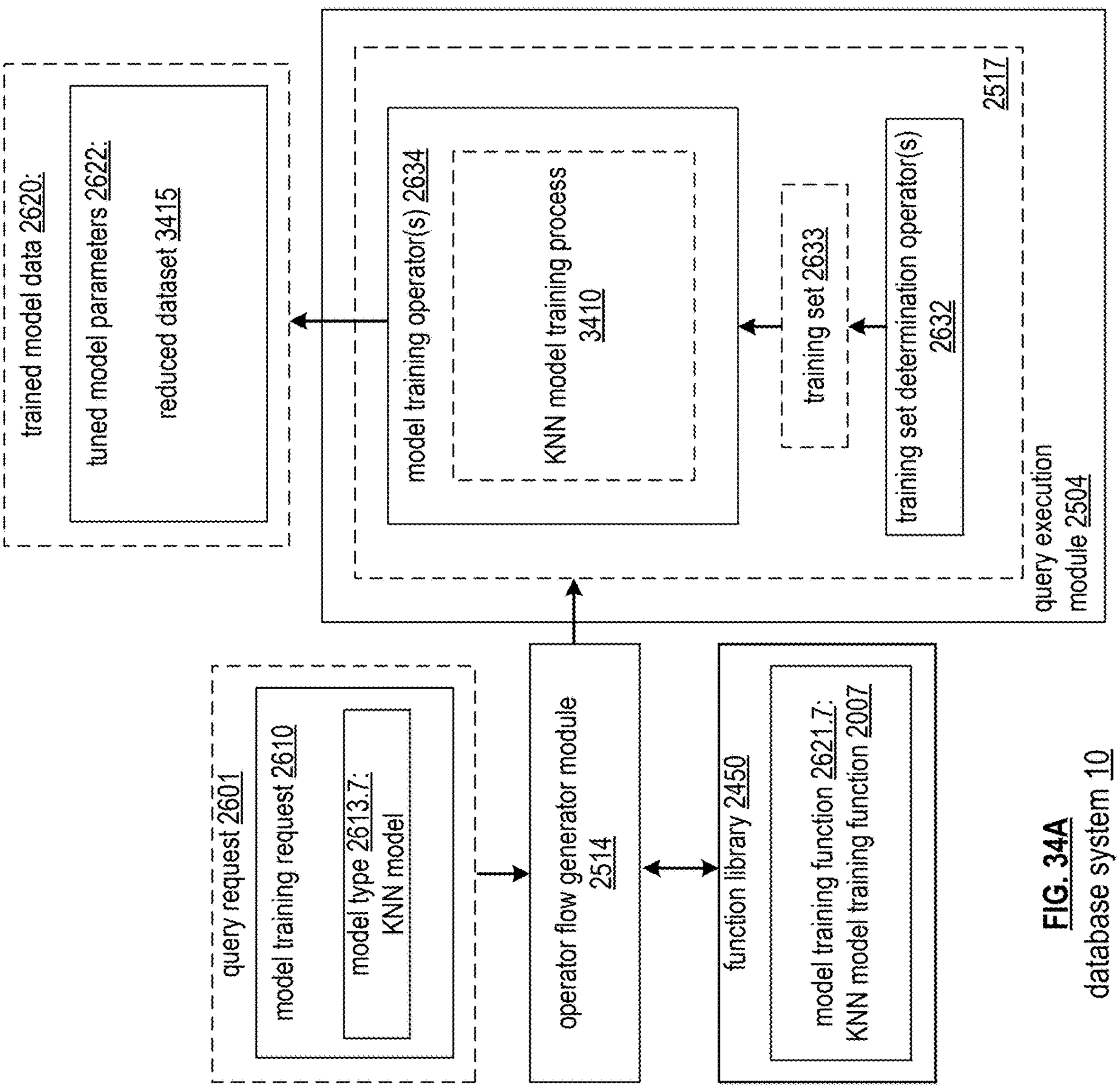
Figure 34B:
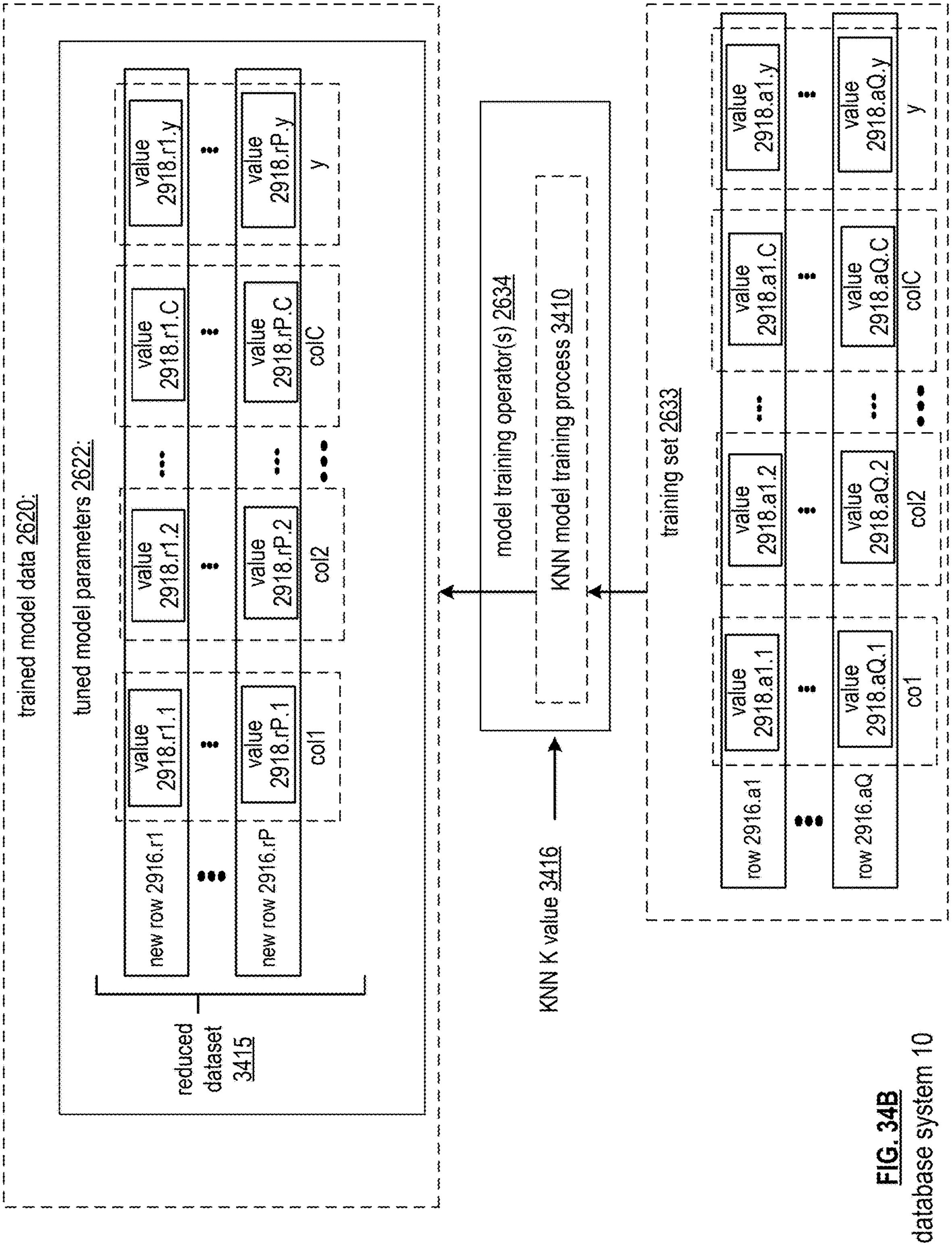
Figure 34C:
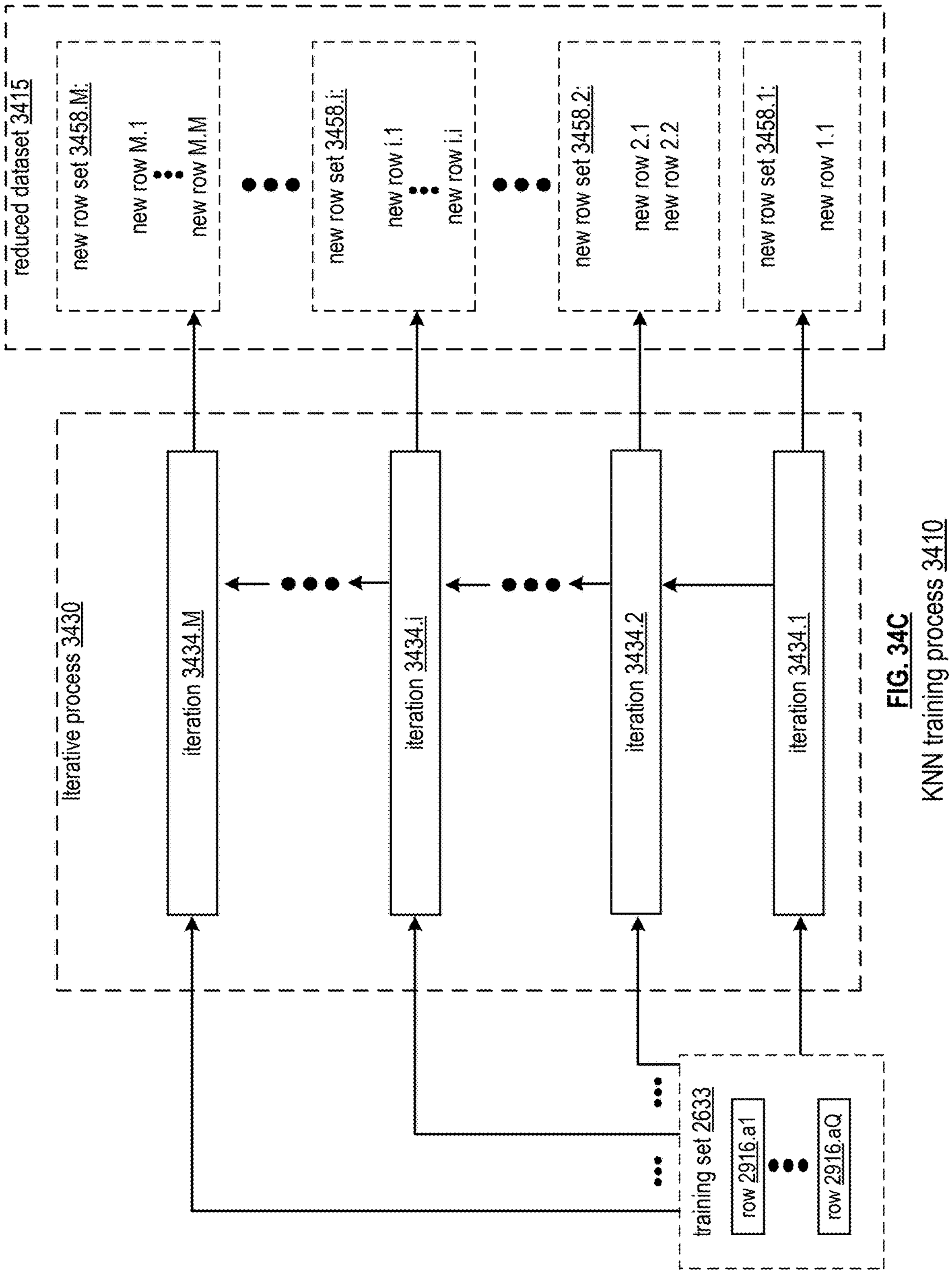
Figure 34D:
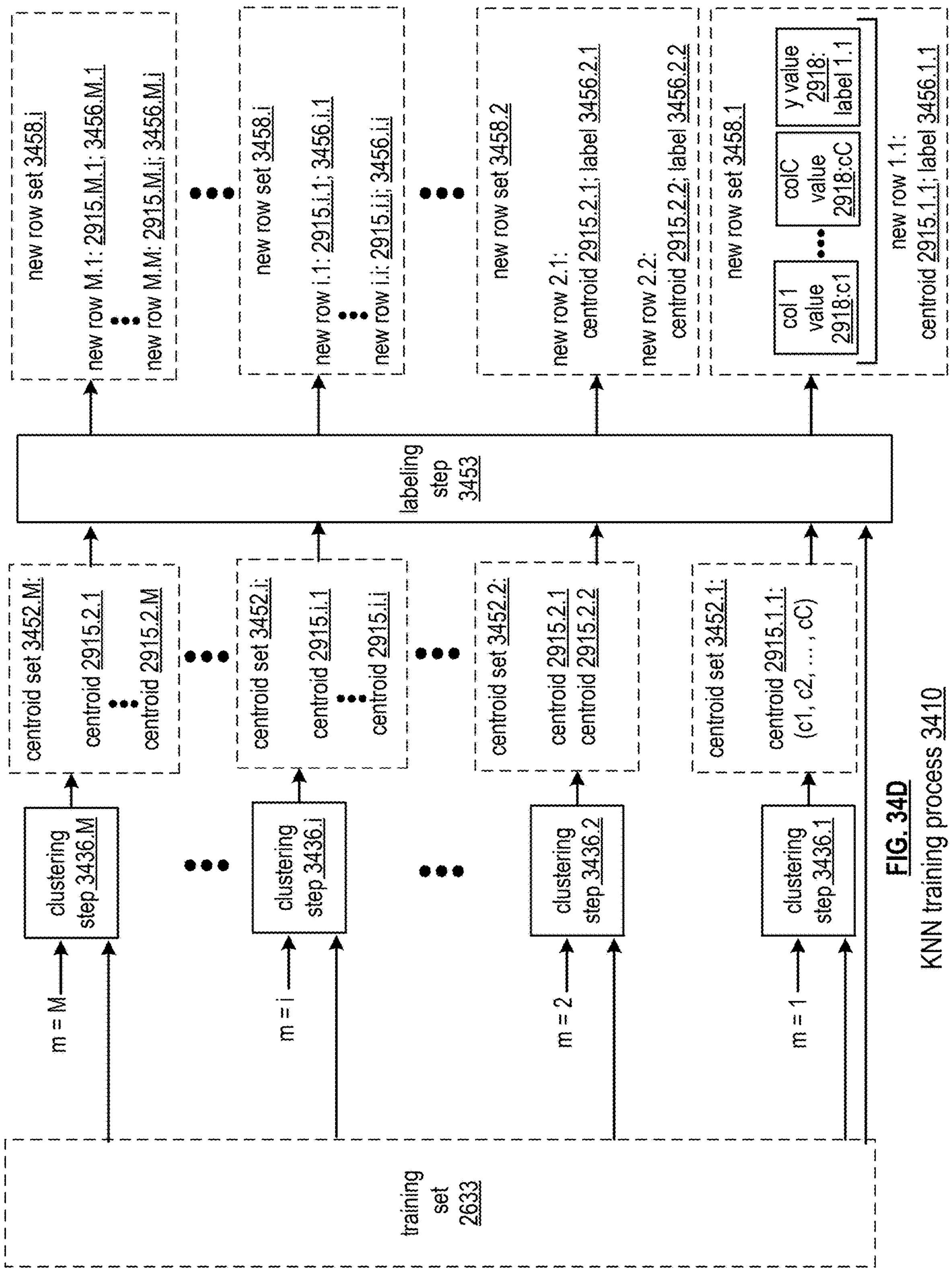
Figure 34E:
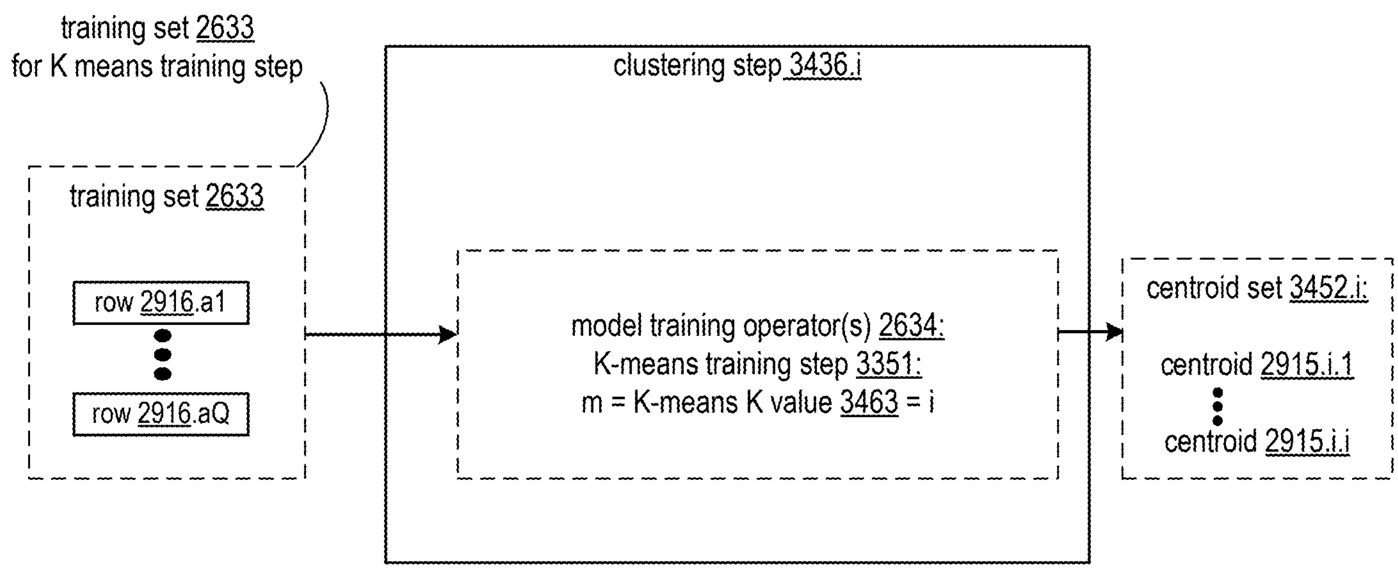
Figure 34F:
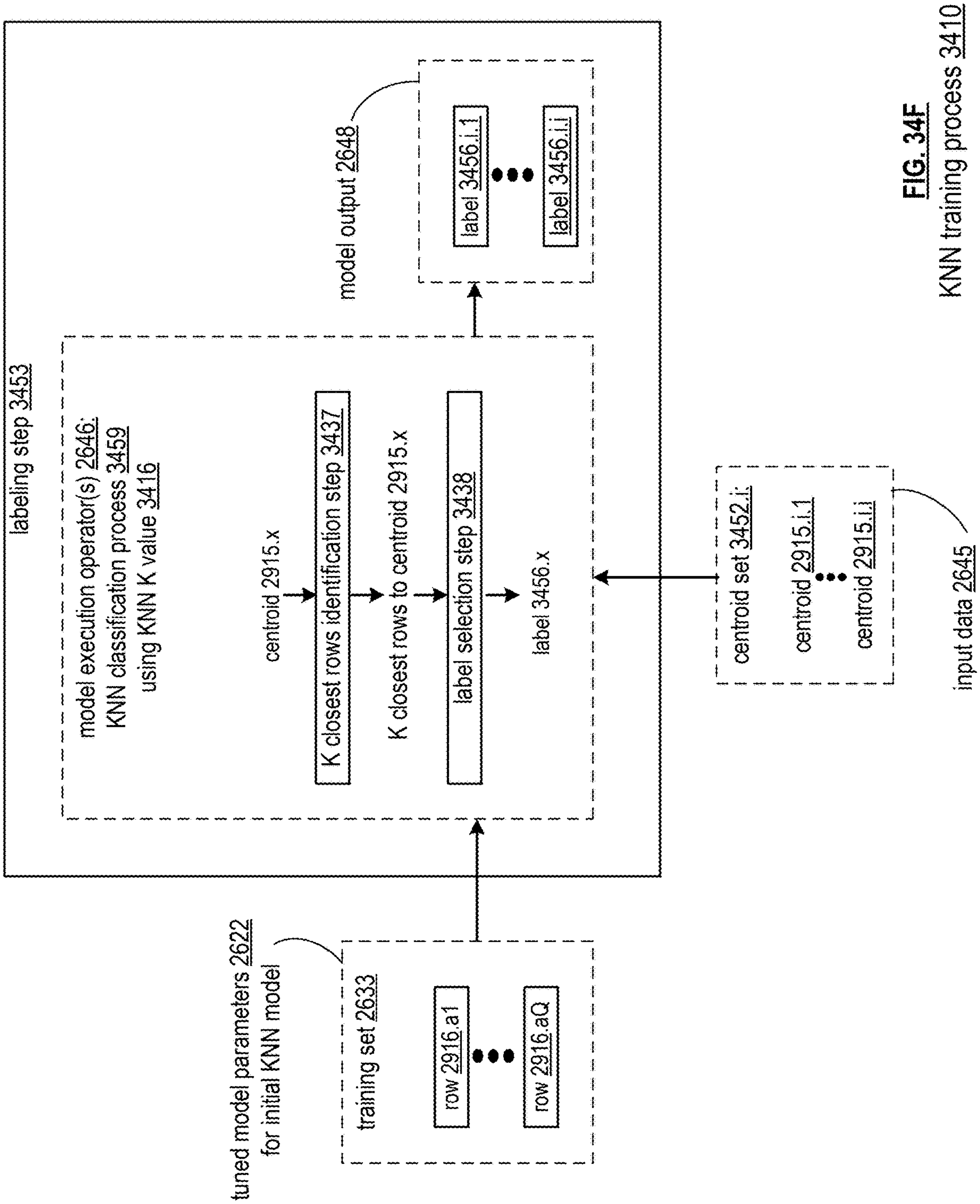
Figure 34G:
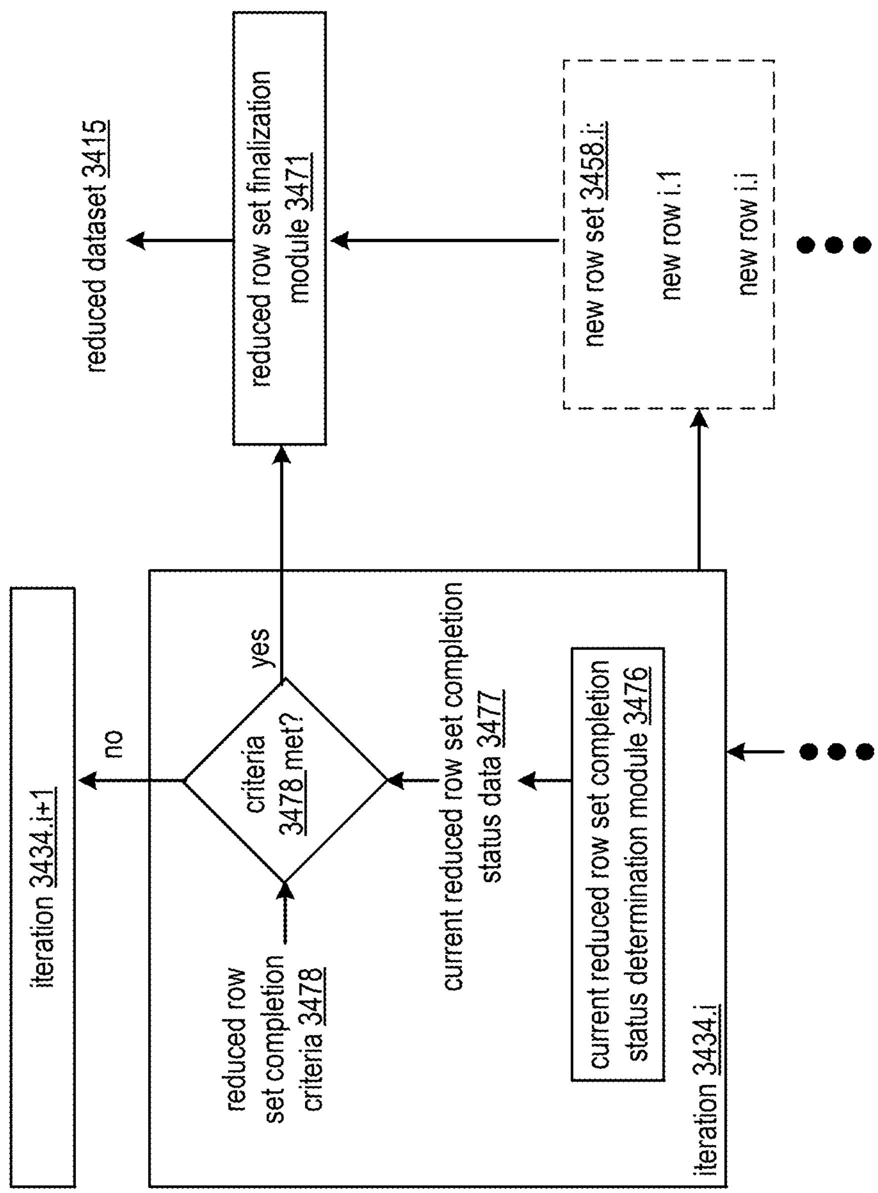
Figure 34H:
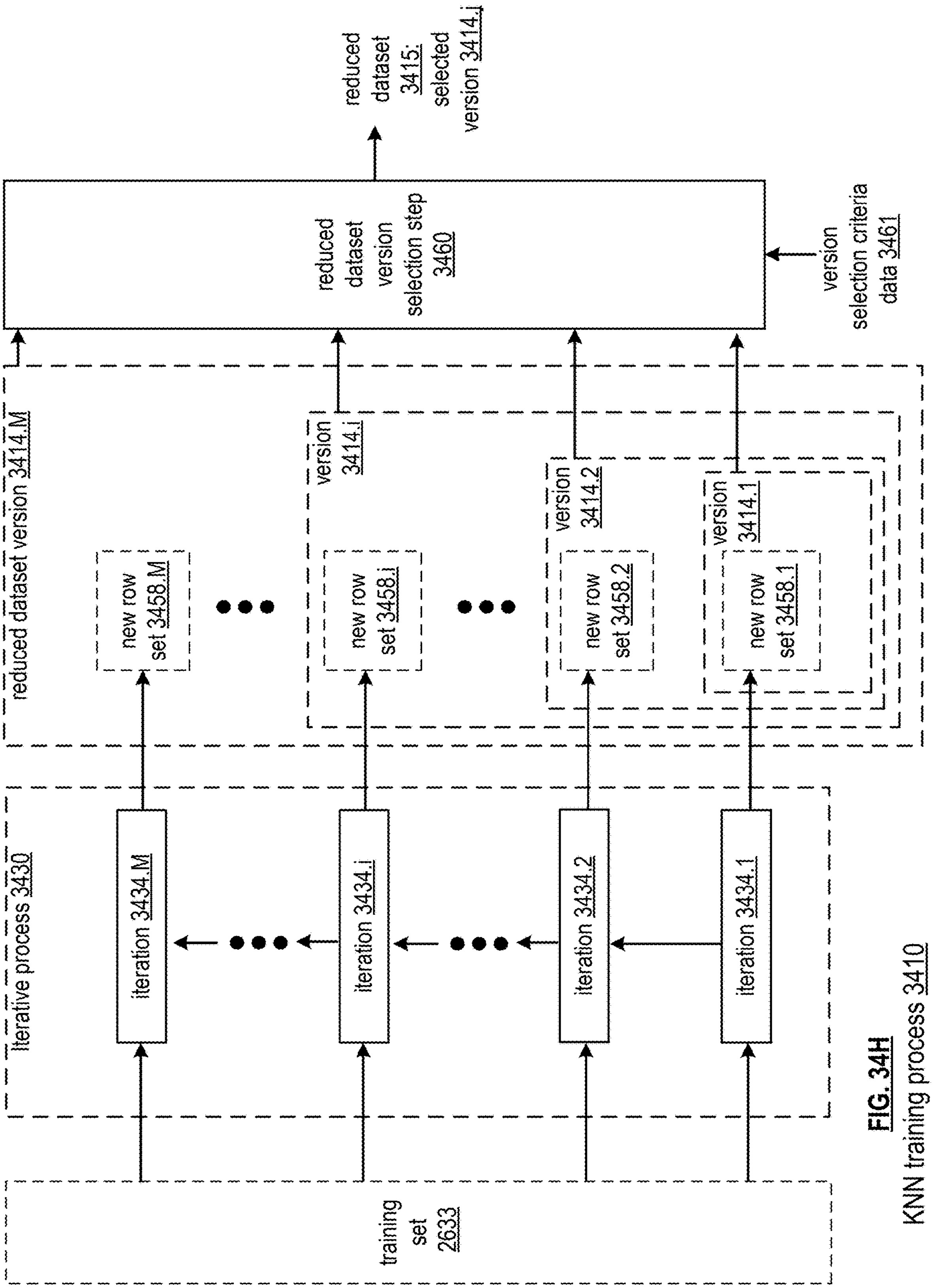
Figure 34I:
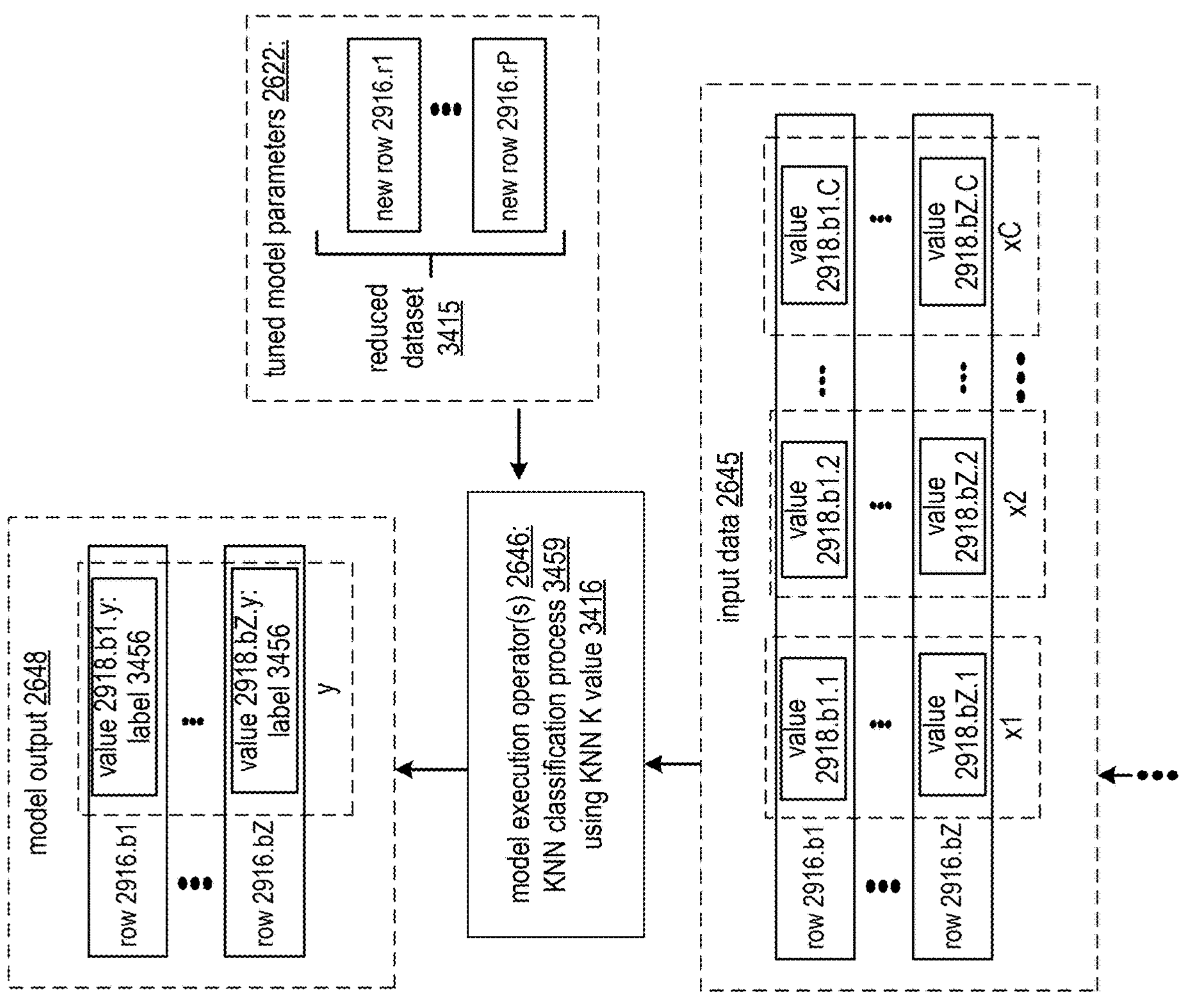
Figure 34J:
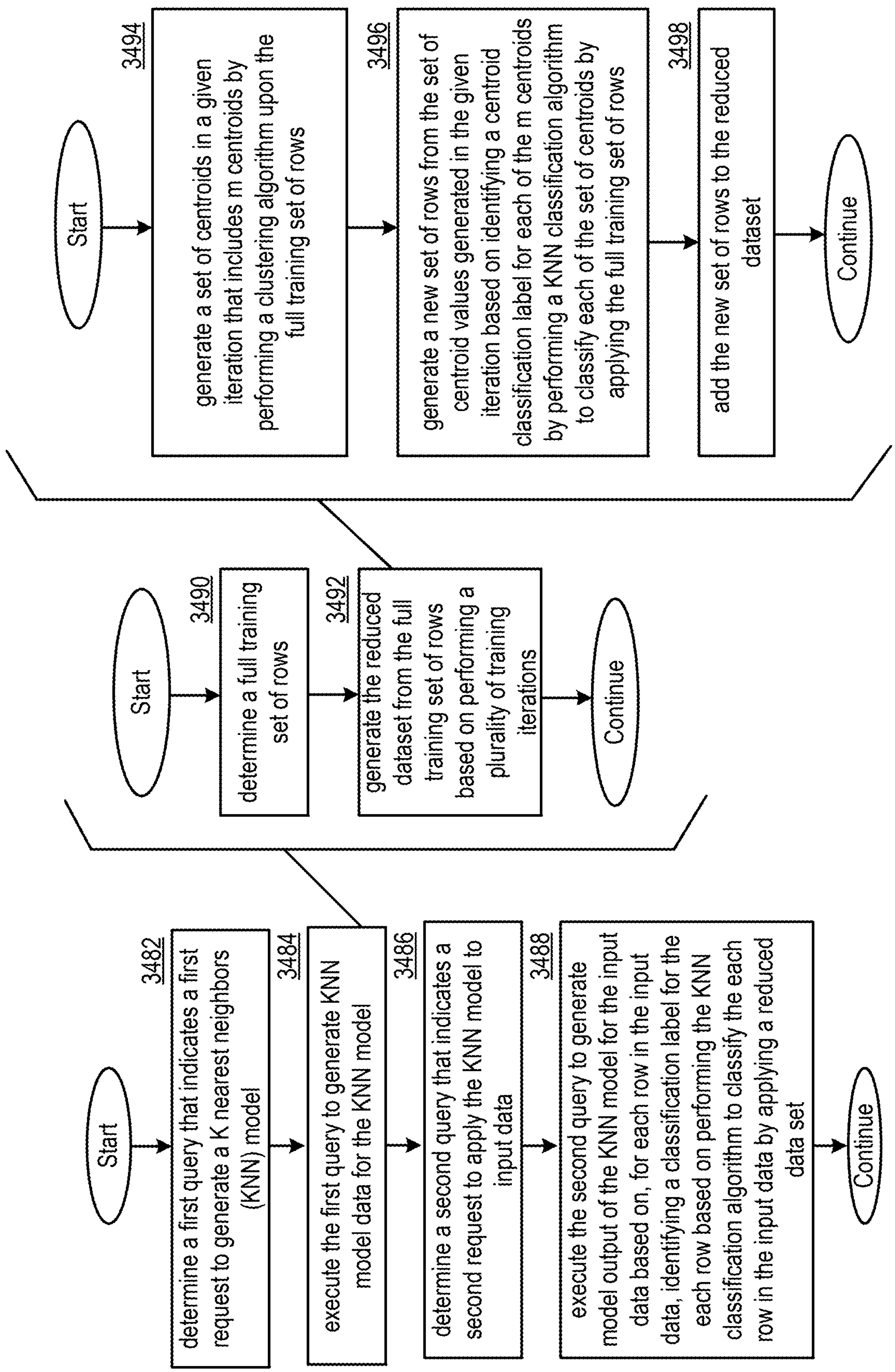
Figure 35A:
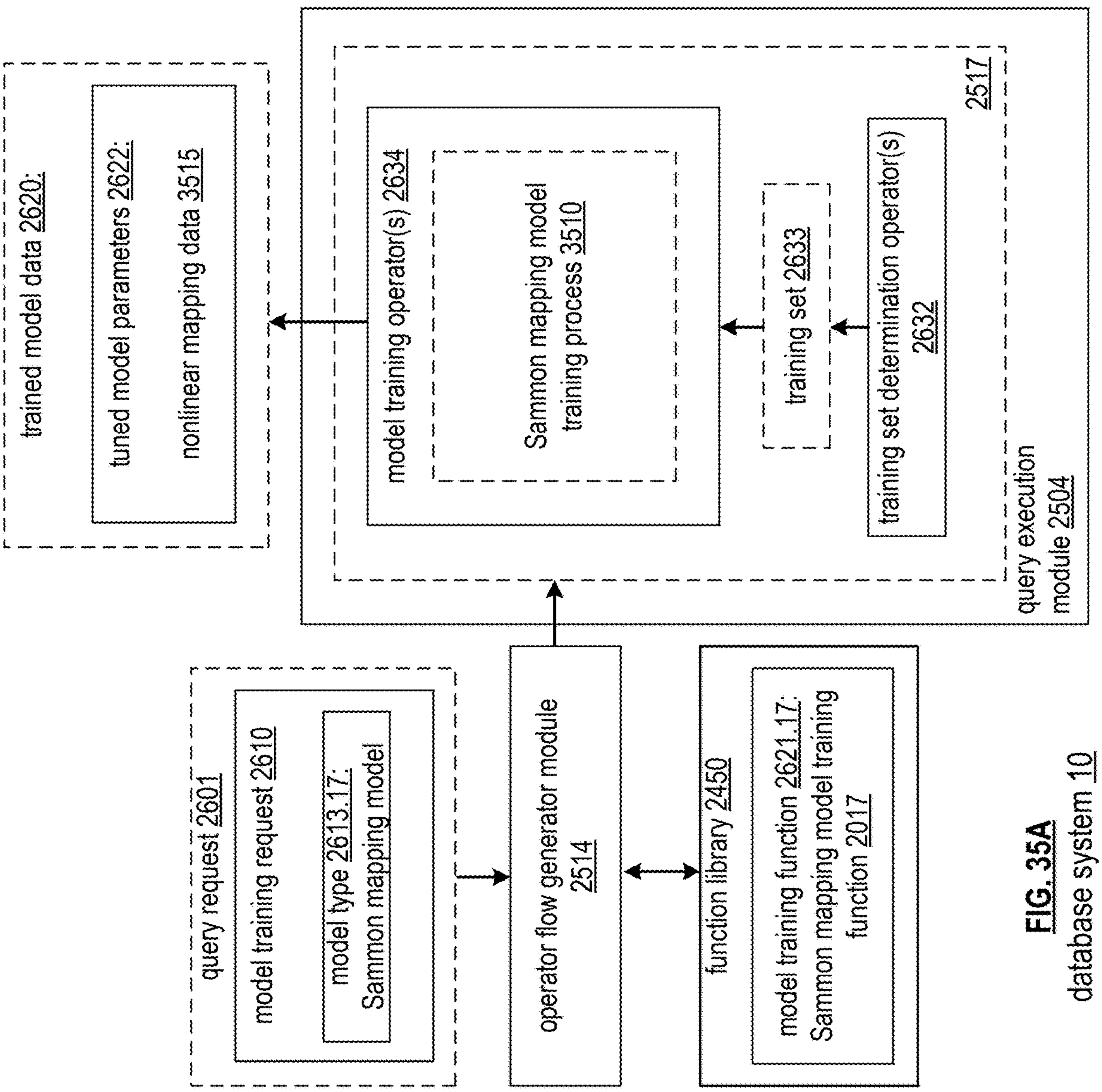
Figure 35B:
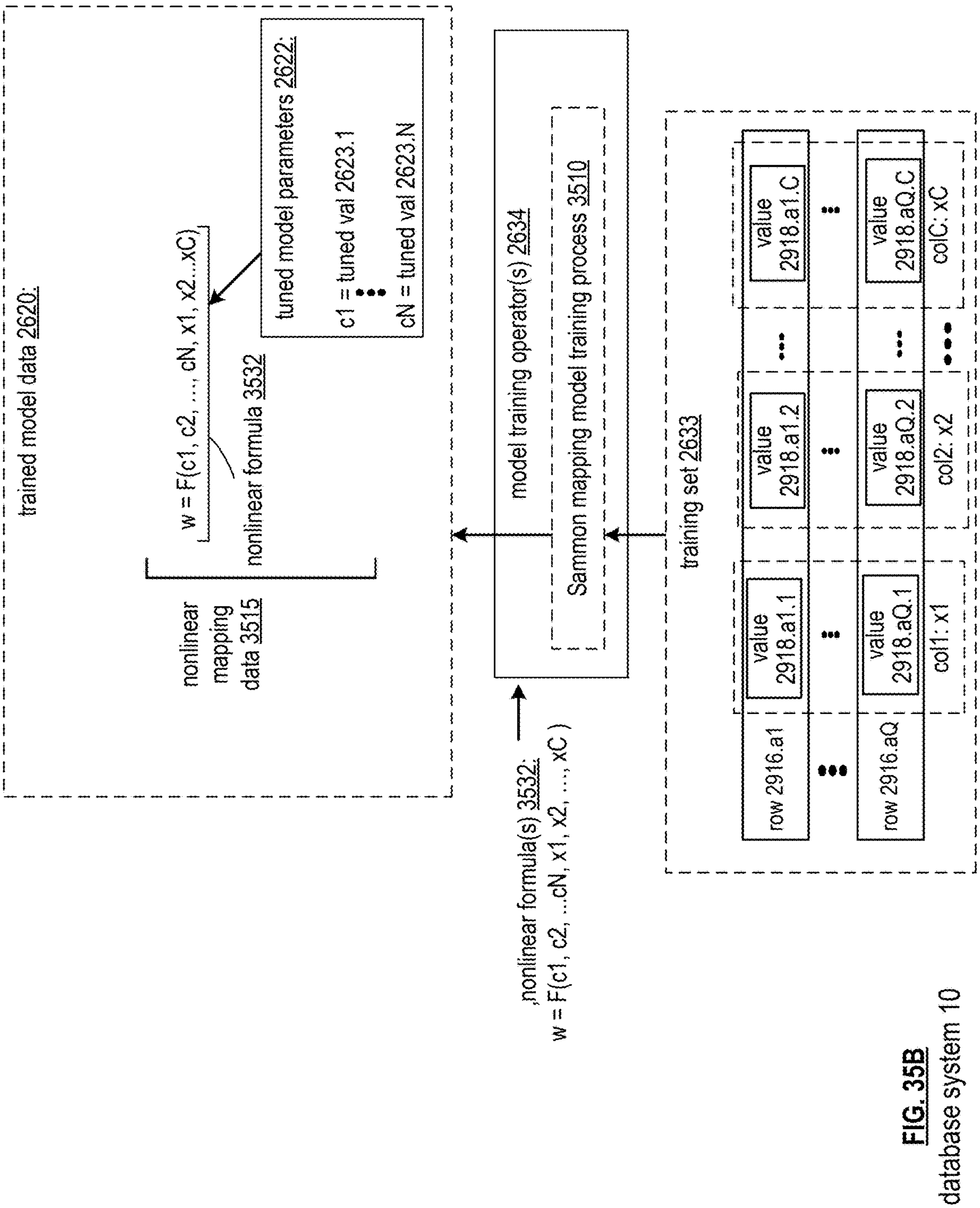
Figure 35C:
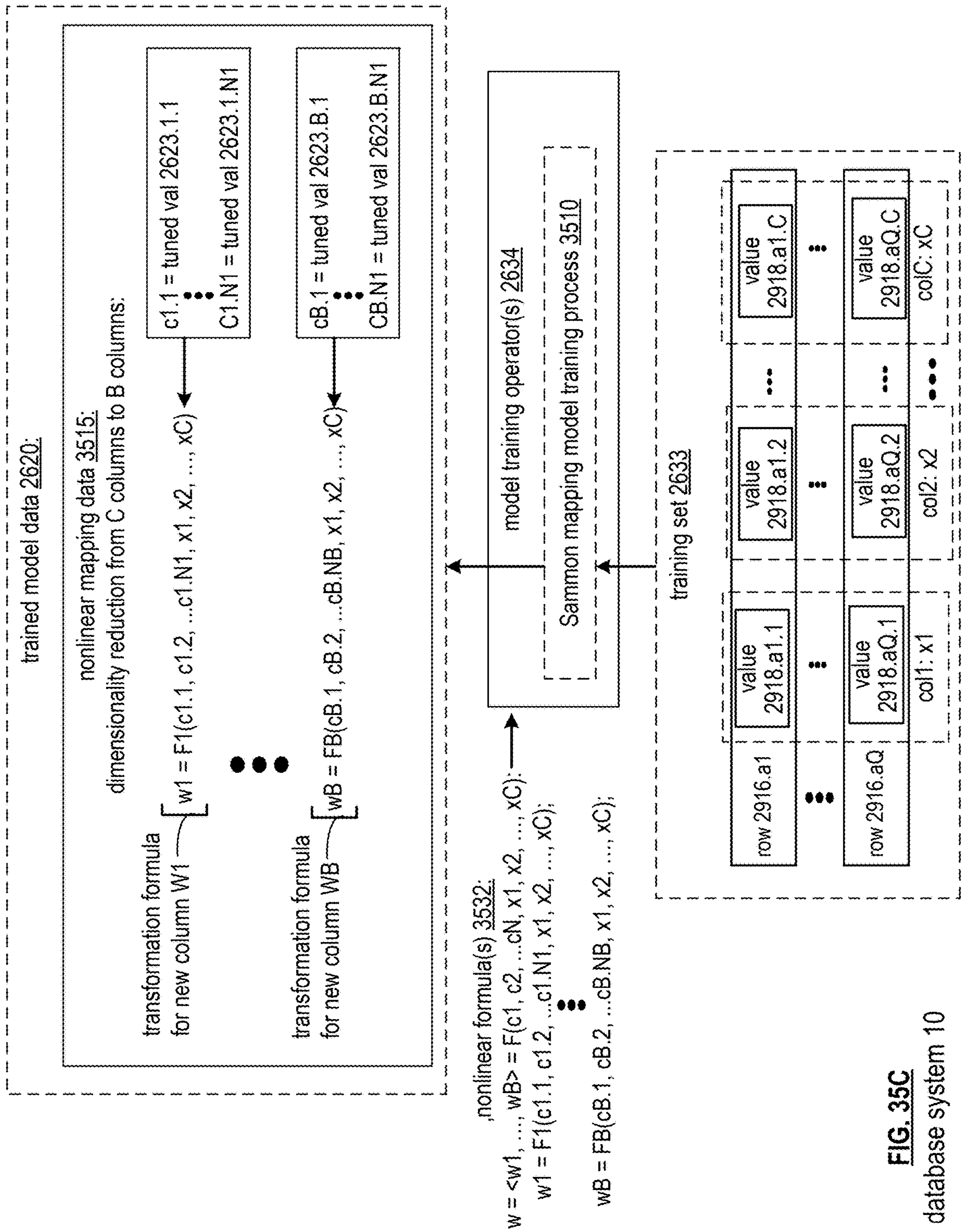
Figure 35D:
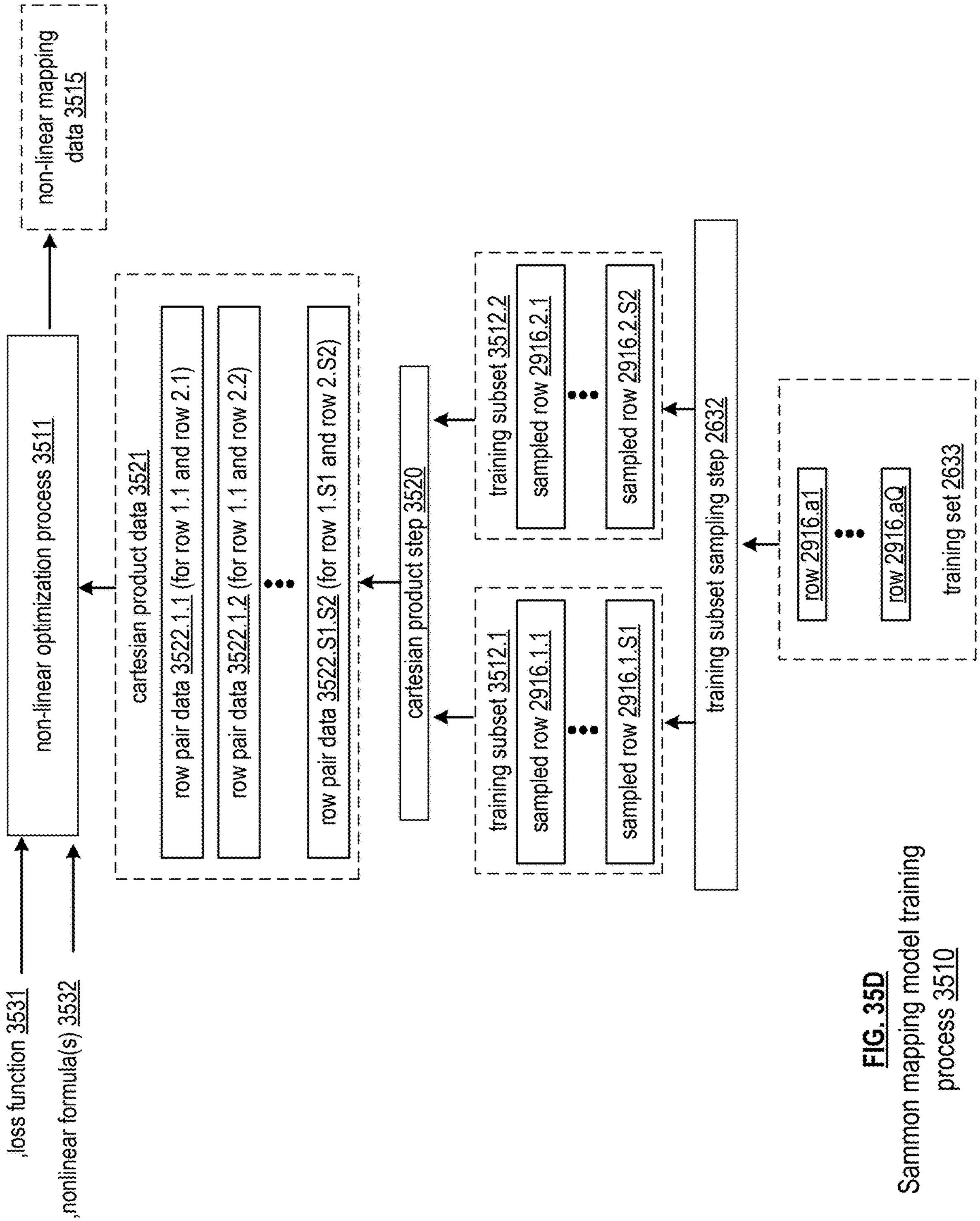
Figure 35E:
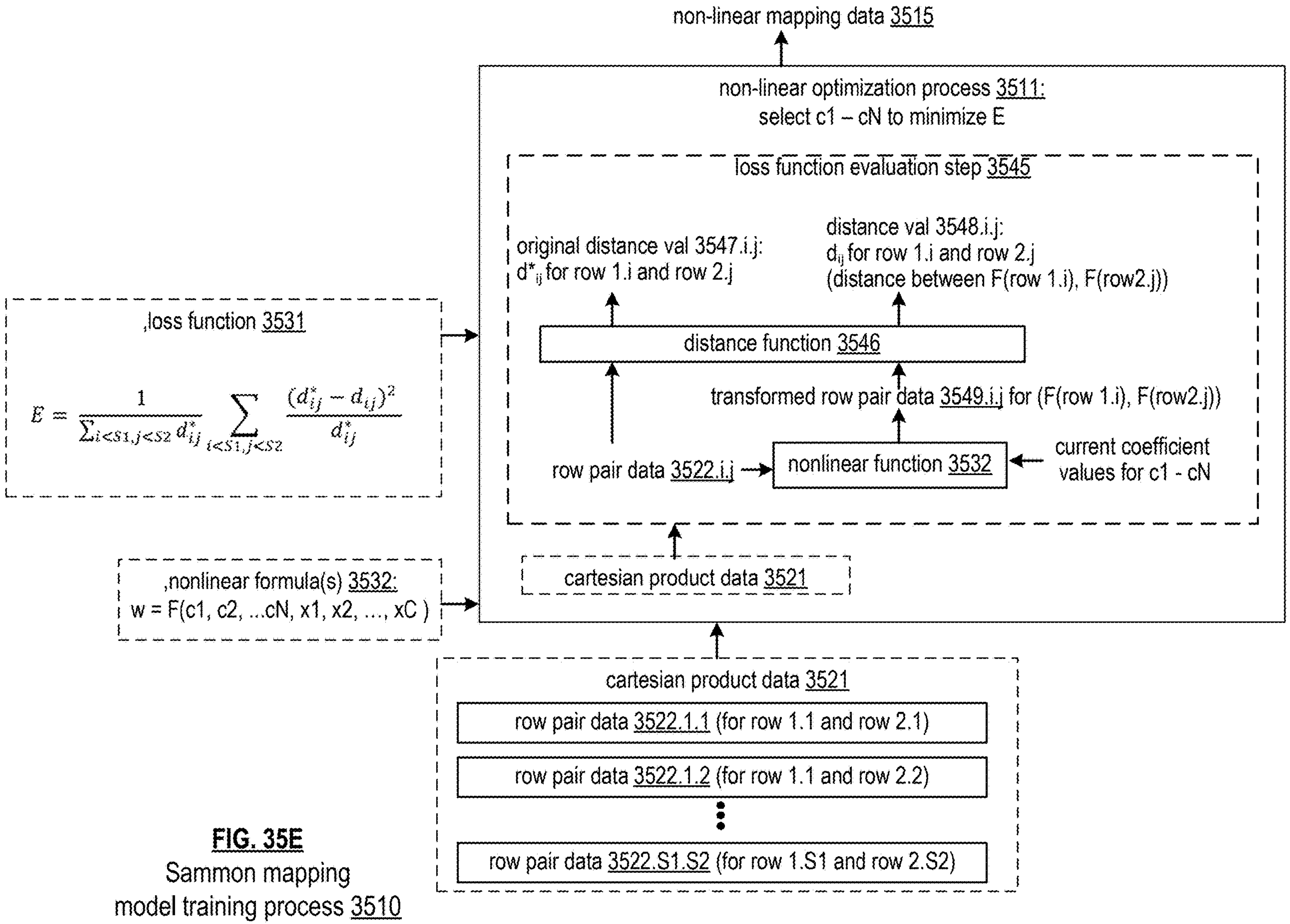
Figure 35F:
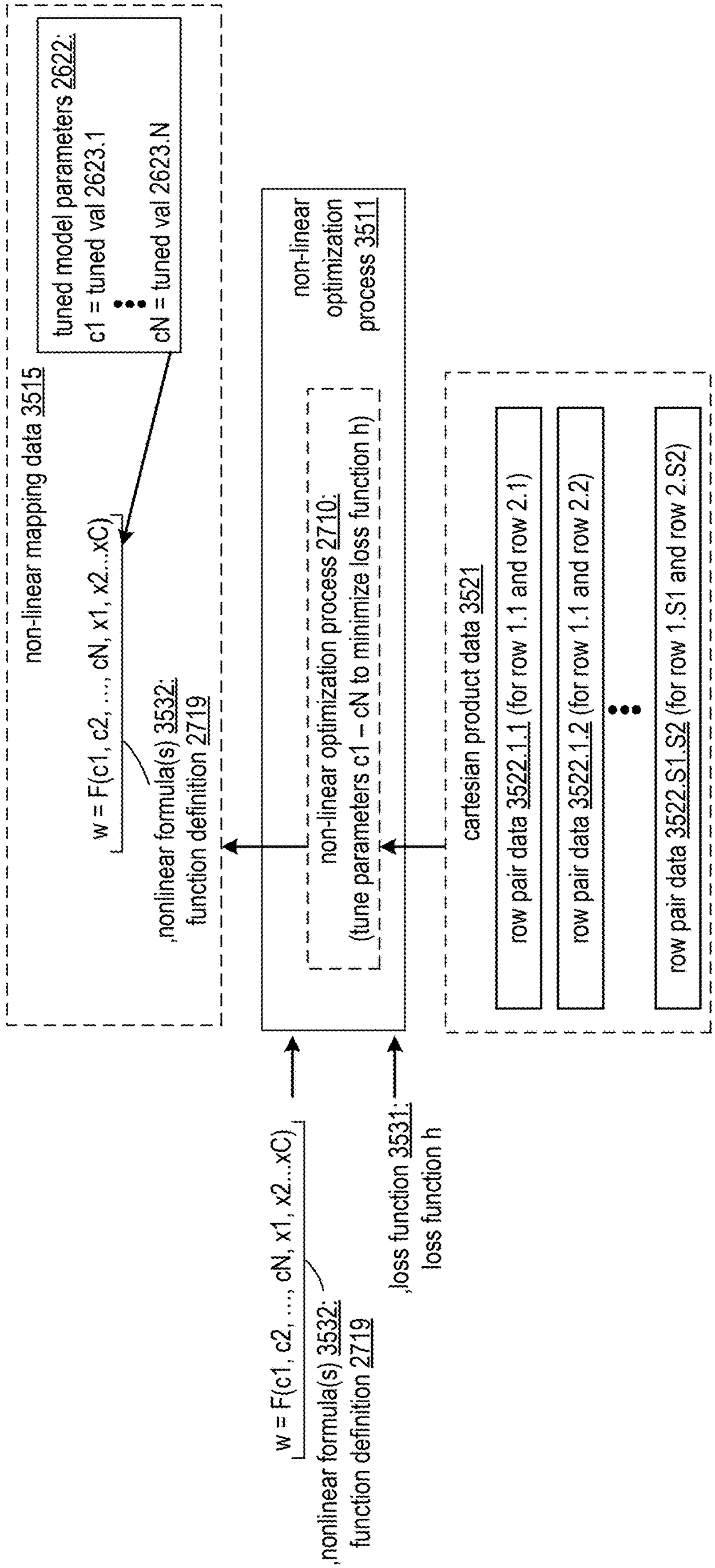
Figure 35G:
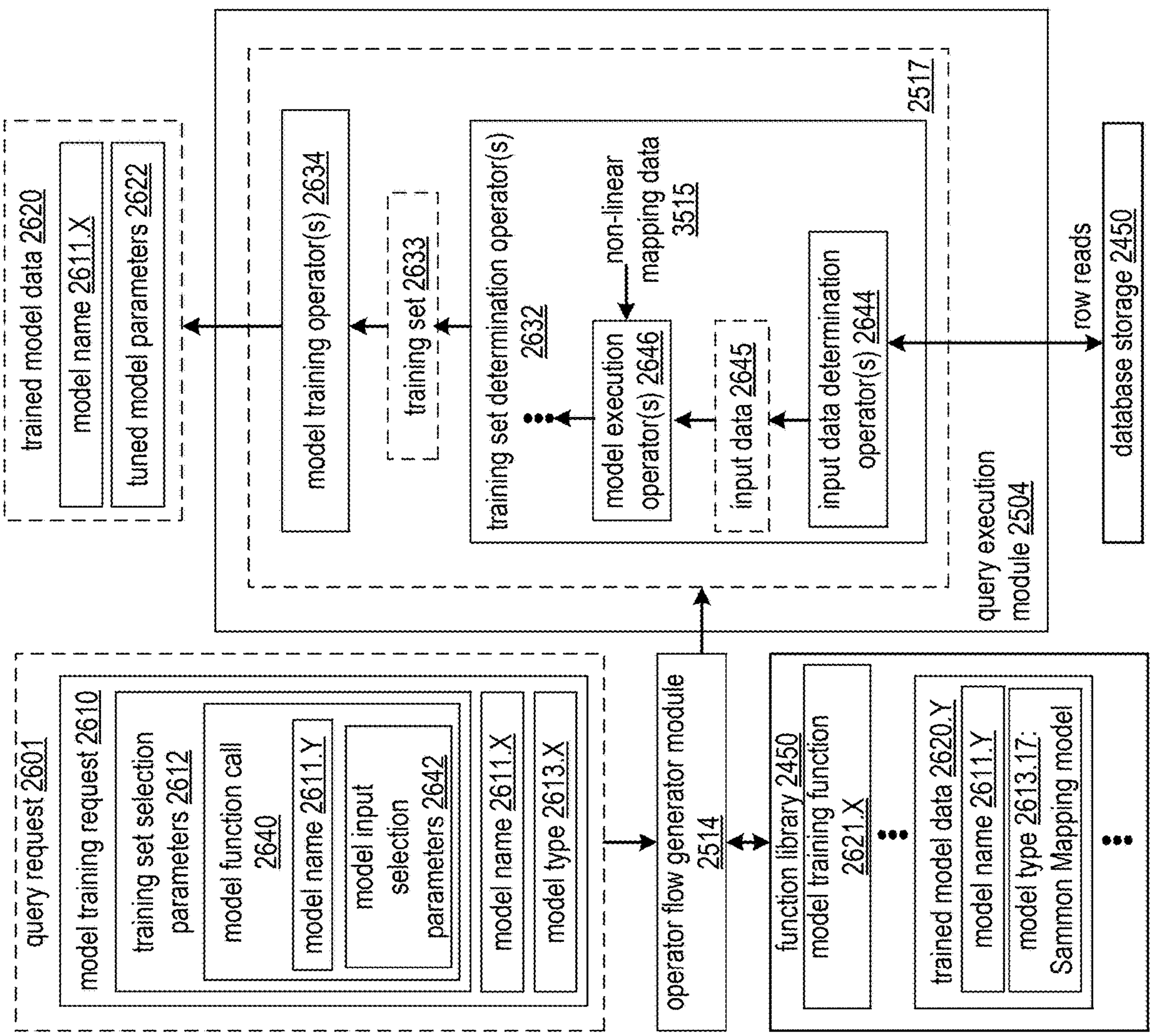
Figure 35H:
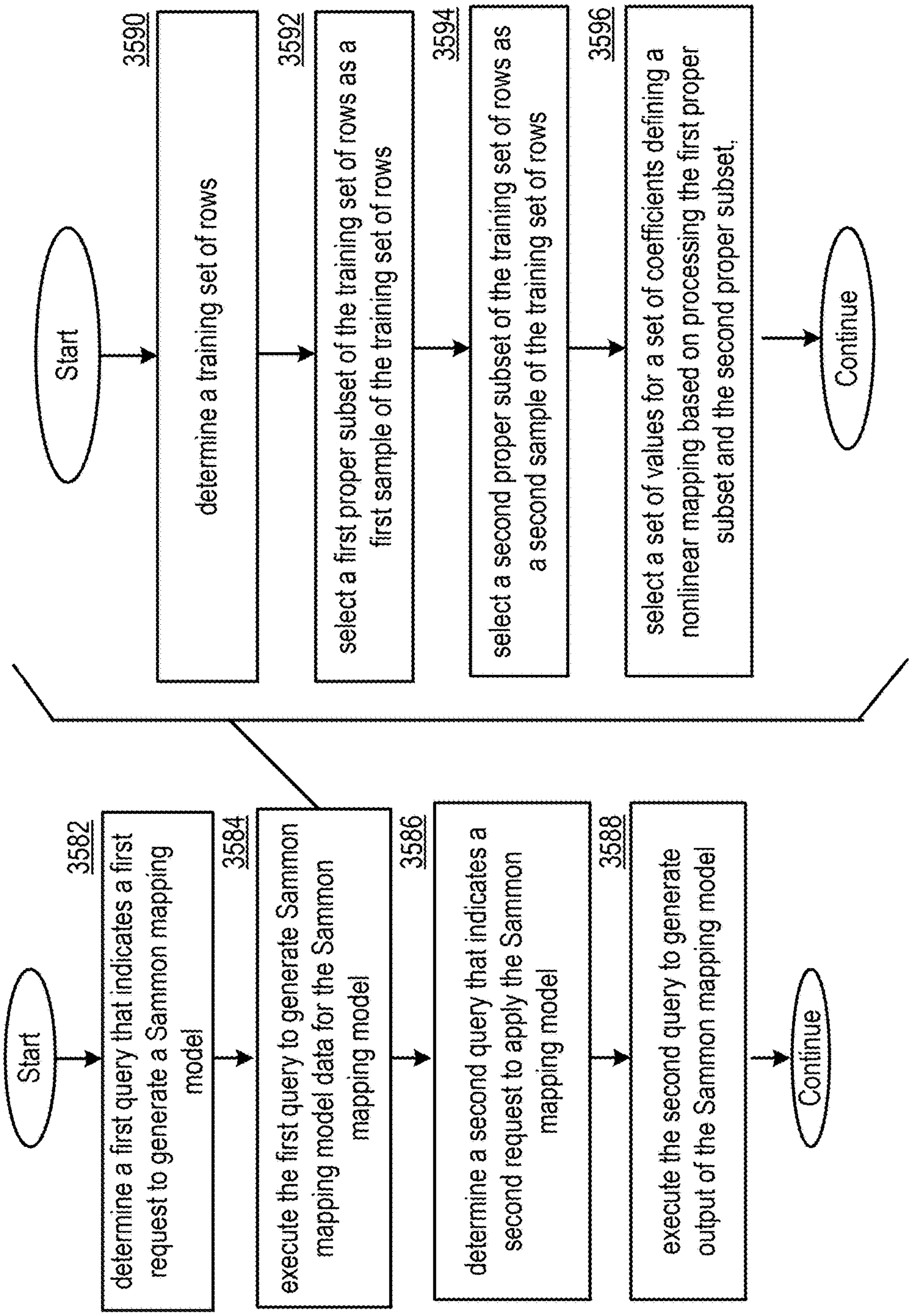
Figure 36A:
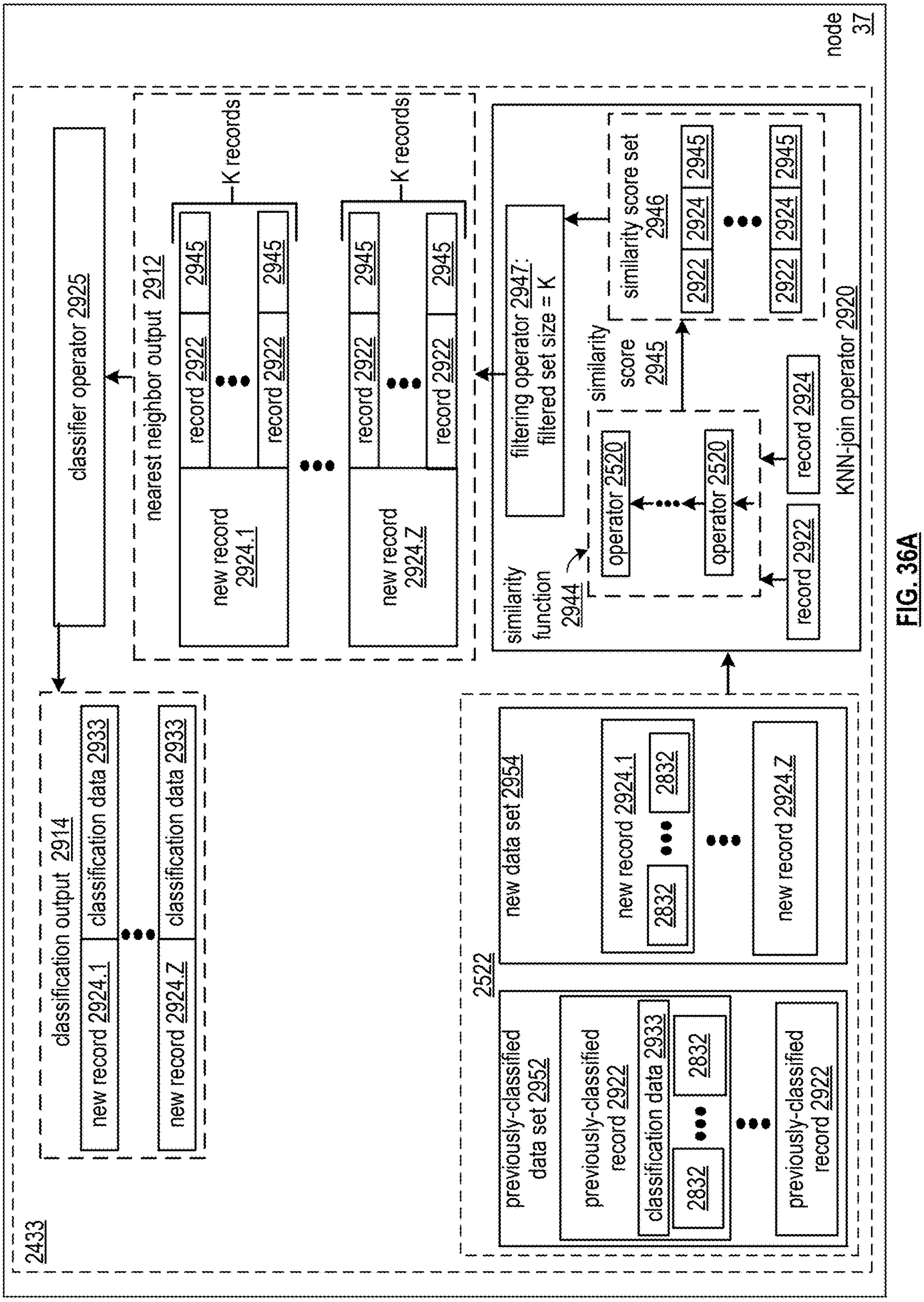
Figure 36B:
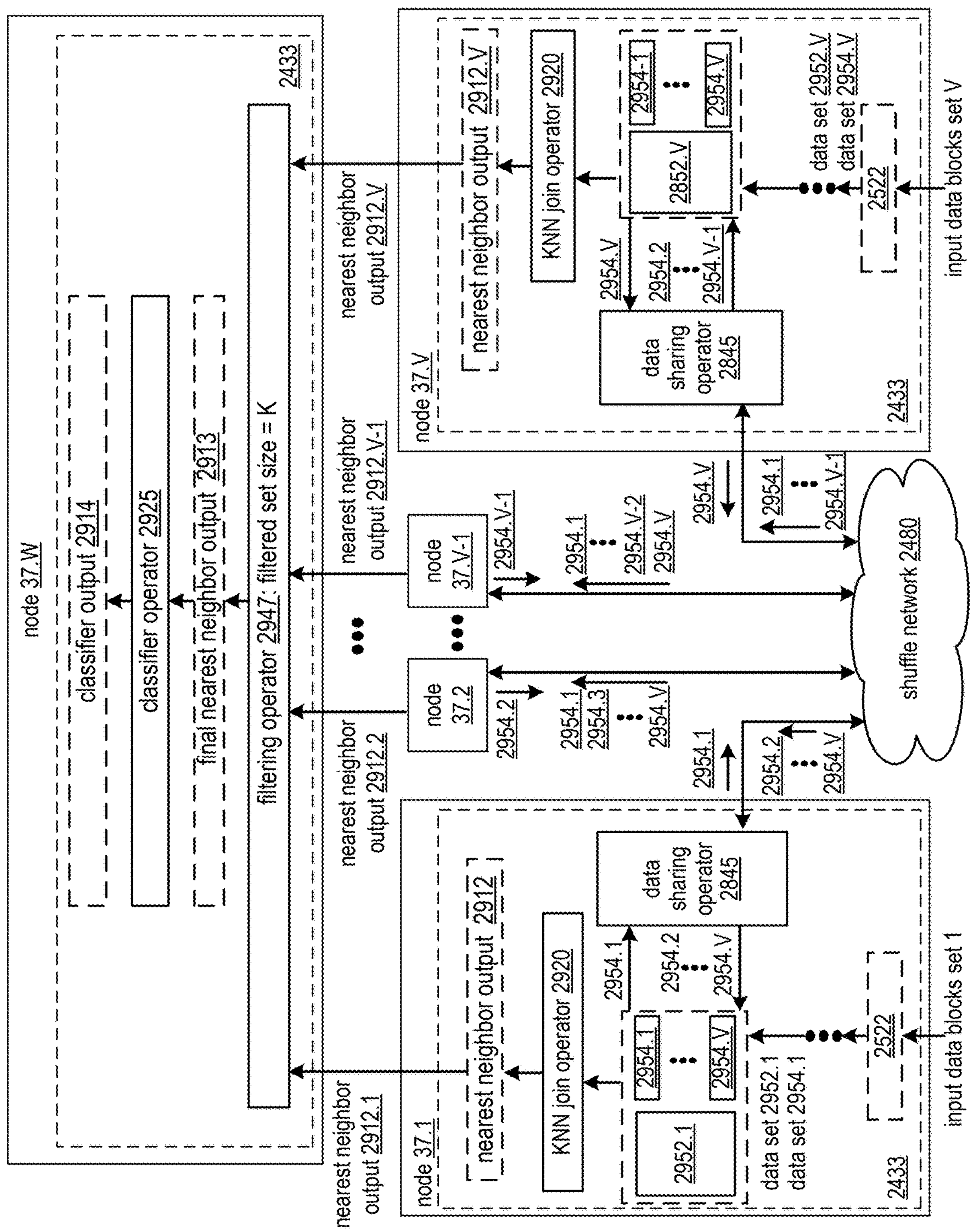
Figure 36C:
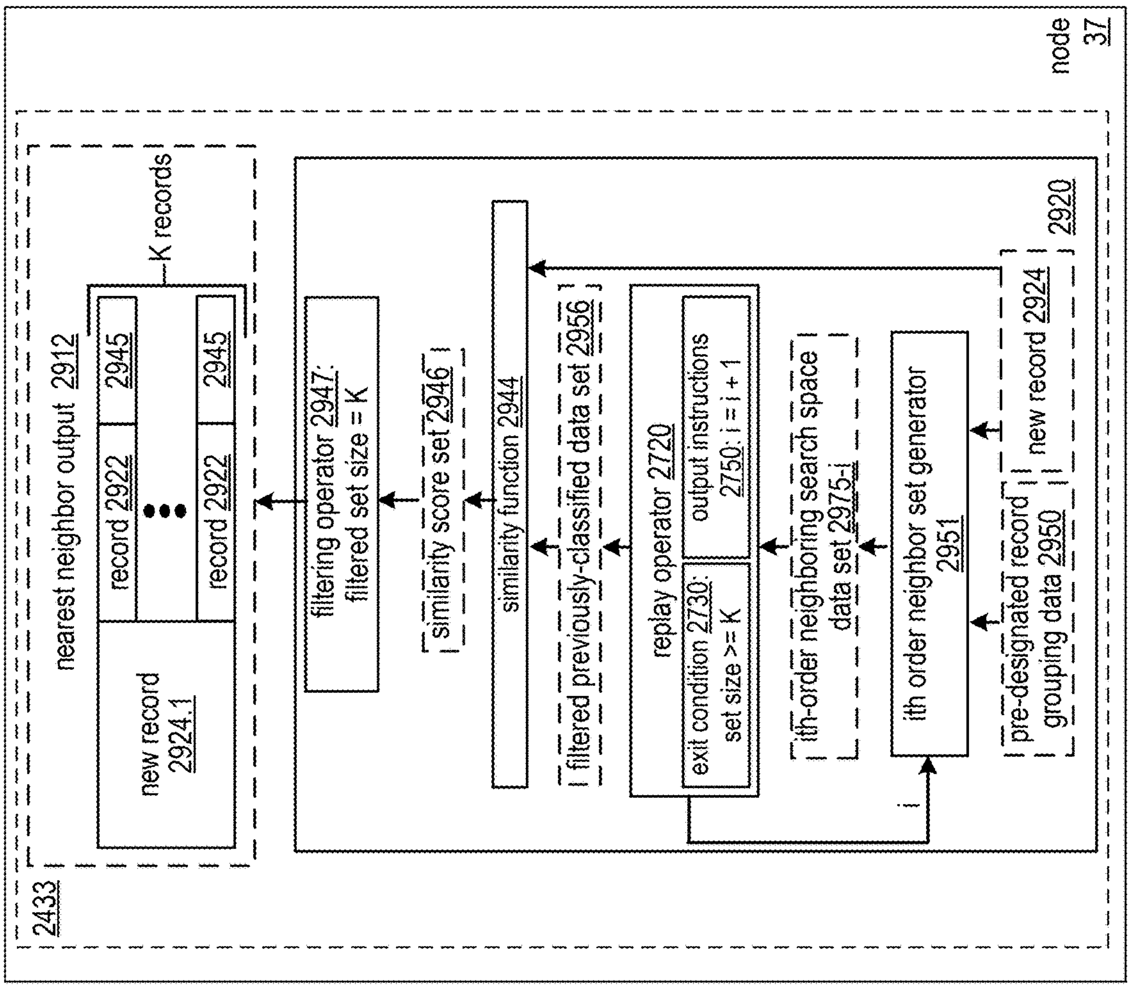
Figure 36D:
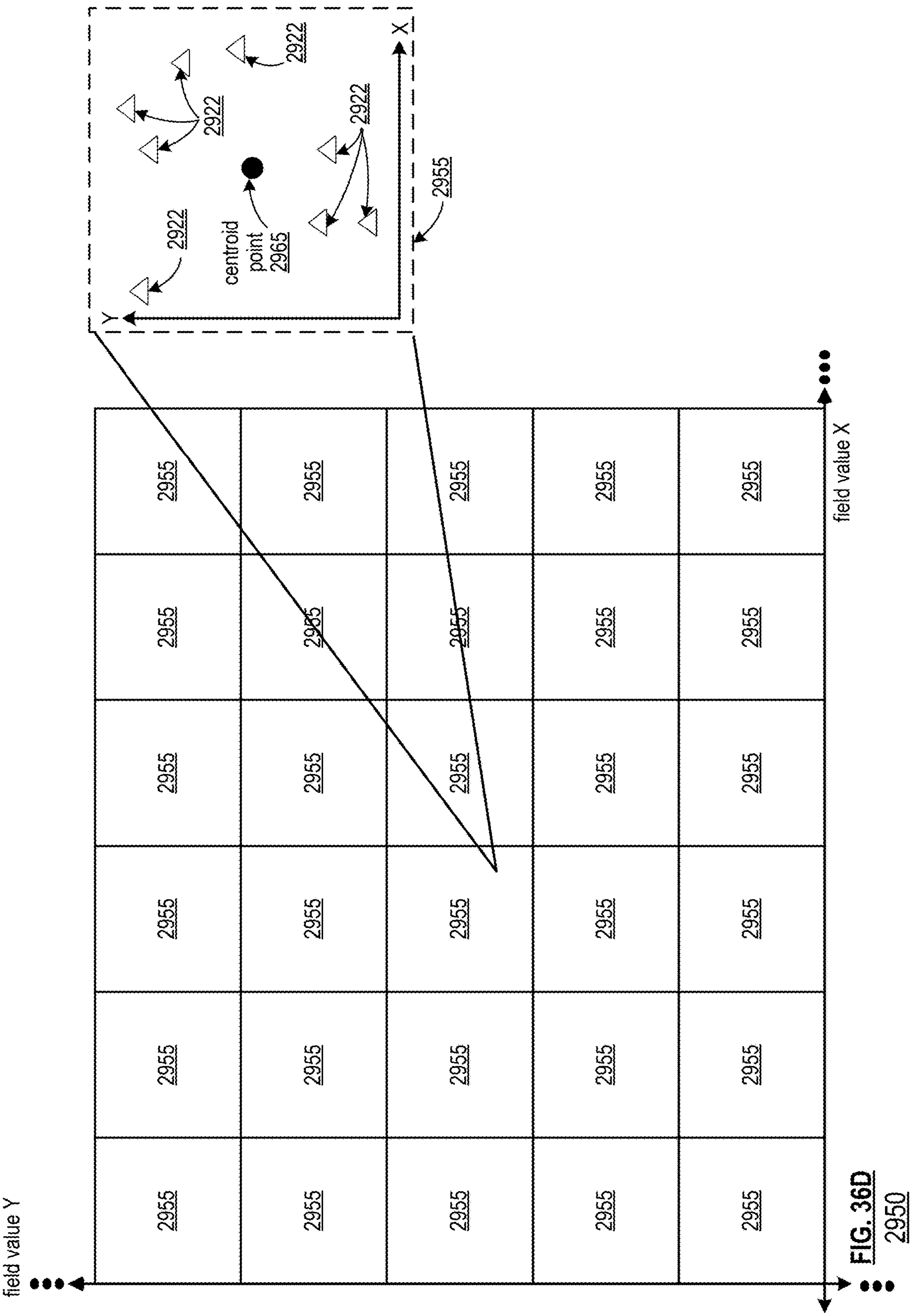
Figure 36E:
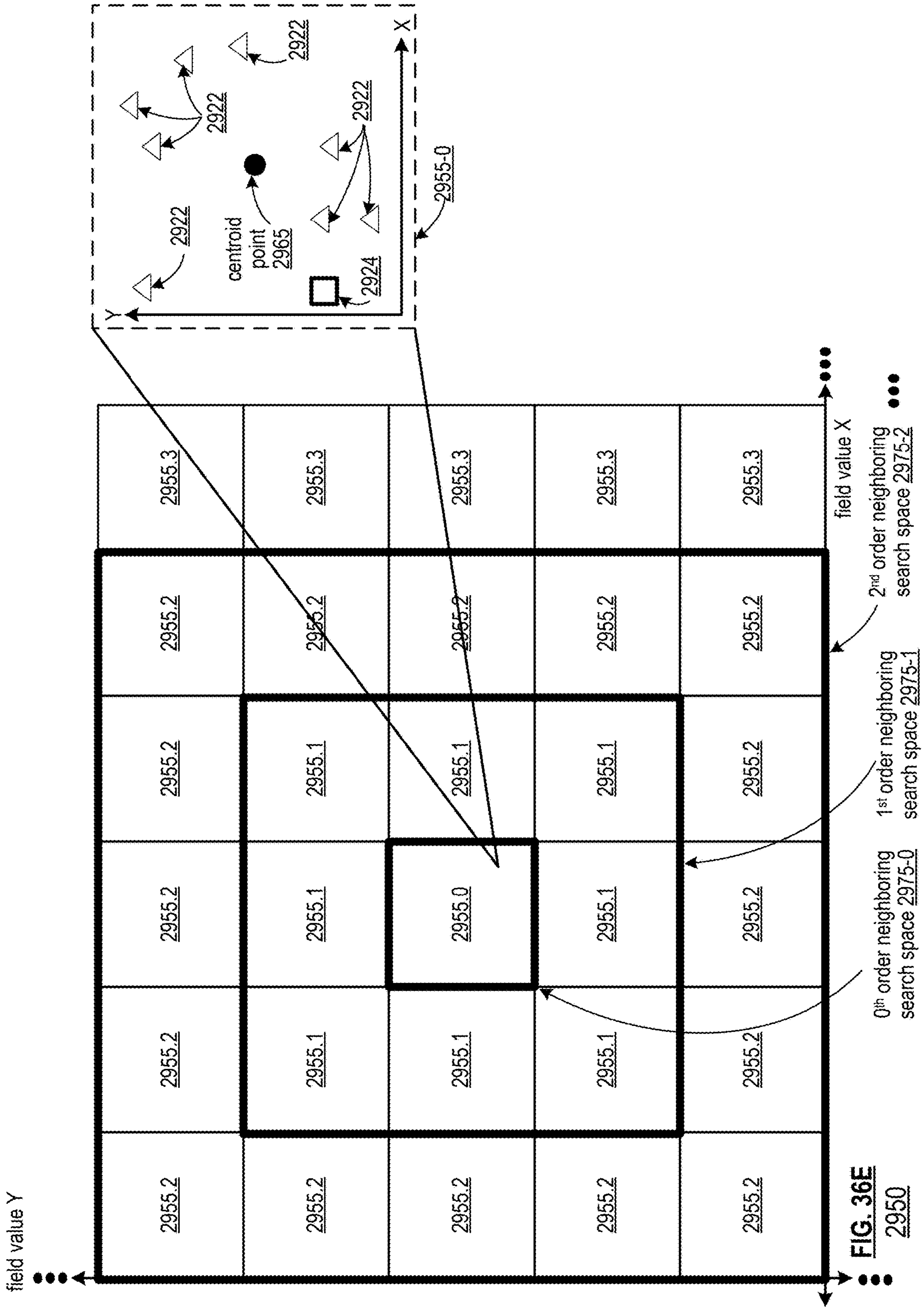
Figure 36F:
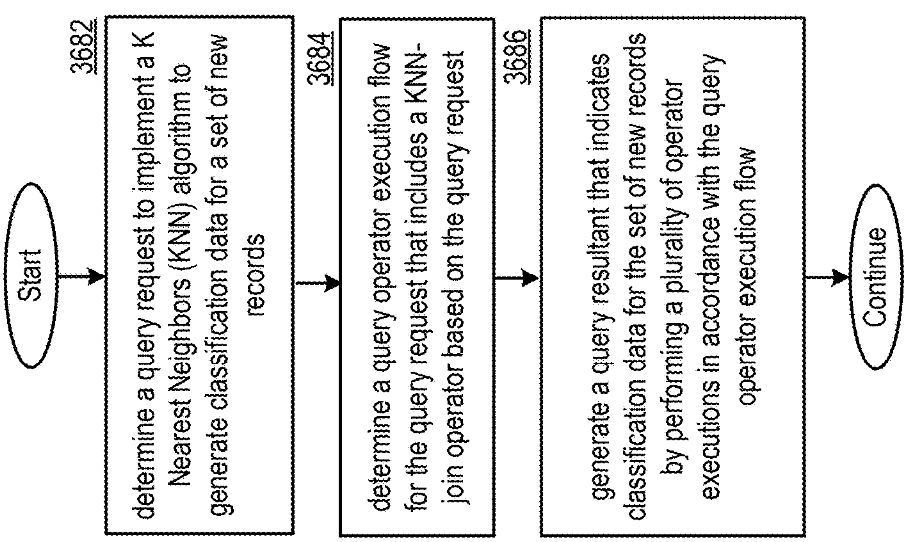
Figure 36G:
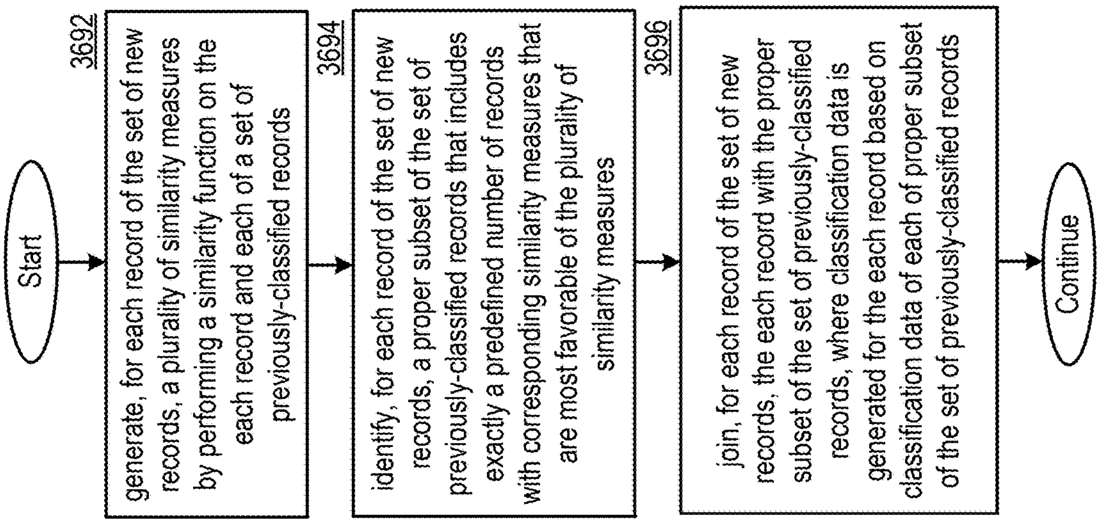

FIG. 28D is an illustrative depiction of generating output via neurons as a function of outputs generated via neurons of prior layers;

FIG. 28E is a schematic block diagram of an operator flow generator module that determines model training operators implementing a nonlinear optimization process based on a function definition generated via an equation generator module;

FIG. 28F is a schematic block diagram of an operator flow generator module that determines model execution operators implementing a plurality of sub-equations based on a function definition for a trained model having tuned parameters;

FIG. 28G is a logic diagram illustrating a method for execution in accordance with various embodiments;

FIG. 29A is a schematic block diagram of a database system that generates trained model data for a K means model in accordance with various embodiments;

FIG. 29B is a schematic block diagram of a database system that generates trained model data that includes a plurality of centroids each having a plurality of values in accordance with various embodiments;

FIG. 29C is a schematic block diagram of a query execution model that executes a k means training process via a plurality of parallelized processes in accordance with various embodiments;

FIGS. 29D and 29E are illustrative depictions of a query execution model that executes a k means training process via a plurality of parallelized processes in accordance with various embodiments;

FIG. 29F is a schematic block diagram of a query execution model that executes model execution operators for a k means model in accordance with various embodiments;

FIG. 29G is a schematic block diagram of a query execution model that executes model execution operators based on generating an array and identifying a minimum array element with various embodiments;

FIG. 29H is a logic diagram illustrating a method for execution in accordance with various embodiments;

FIG. 30A is a schematic block diagram of a database system that generates trained model data for a principal component analysis model in accordance with various embodiments;

FIG. 30B is a schematic block diagram of a database system that generates trained model data via execution of a principal component analysis training process in accordance with various embodiments;

FIG. 30C is a schematic block diagram of a database system that generates new trained model data based on applying a trained PCA model in accordance with various embodiments;

FIG. 30D is a logic diagram illustrating a method for execution in accordance with various embodiments;

FIG. 31A is a schematic block diagram of a database system that generates trained model data for a vector autoregression model in accordance with various embodiments;

FIG. 31B is a schematic block diagram of a database system that generates trained model data via execution of a vector autoregression training process in accordance with various embodiments;

FIG. 31C is a schematic block diagram of a database system that generates a training set for training a vector autoregression model data via execution of a lag-based windowing function in accordance with various embodiments;

FIG. 31D is a logic diagram illustrating a method for execution in accordance with various embodiments;

FIG. 32A is a schematic block diagram of a database system that generates trained model data for a linear discriminant analysis model in accordance with various embodiments;

FIG. 32B is a schematic block diagram of a database system that generates trained model data via execution of a linear discriminant analysis training process in accordance with various embodiments;

FIG. 32C is a schematic block diagram of a database system that generates new trained model data based on applying a trained linear discriminant analysis model in accordance with various embodiments;

FIG. 32D is a logic diagram illustrating a method for execution in accordance with various embodiments;

FIG. 33A is a schematic block diagram of a database system that generates trained model data for a mixture model in accordance with various embodiments;

FIG. 33B is a schematic block diagram of a database system that generates trained model data that includes a plurality of sets of cluster parameters in accordance with various embodiments;

FIG. 33C illustrates performance of a mixture model training process via a plurality of iterations of an iterative process in accordance with various embodiments;

FIG. 33D illustrates performance of an expectation step and a maximization step of an iteration of an iterative process of a mixture model training process in accordance with various embodiments;

FIG. 33E illustrates performance of a model initialization step that includes a K means training step and a cluster characterization step in accordance with various embodiments;

FIG. 33F is a schematic block diagram of a query execution model that executes model execution operators for a mixture model in accordance with various embodiments;

FIG. 33G is a logic diagram illustrating a method for execution in accordance with various embodiments;

FIG. 34A is a schematic block diagram of a database system that generates trained model data for a K Nearest Neighbors (KNN) model in accordance with various embodiments;

FIG. 34B is a schematic block diagram of a database system that generates trained model data that includes a plurality of new rows of a reduced dataset in accordance with various embodiments;

FIG. 34C illustrates performance of a KNN training process that includes performing a plurality of iterations of an iterative process to generate a plurality of new row sets in accordance with various embodiments;

FIG. 34D illustrates performance of a KNN training process that includes performing a plurality of clustering steps to generate a plurality of centroid sets, and to further generate a new row set from each centroid set via performing a labeling step in accordance with various embodiments;

FIG. 34E illustrates performance of a clustering step by implementing a K-means training step in accordance with various embodiments;

FIG. 34F illustrates performance of a labeling step by implementing a KNN classification process in accordance with various embodiments;

FIG. 34G illustrates performance of a KNN training process that initiates a subsequent iteration based evaluating current reduced row set completion status data in accordance with various embodiments;

FIG. 34H illustrates performance of a KNN training process that includes selecting one reduced dataset version of a plurality of reduced dataset versions in accordance with various embodiments;

FIG. 34I is a schematic block diagram of a query execution model that executes model execution operators for a KNN model in accordance with various embodiments;

FIG. 34J is a logic diagram illustrating a method for execution in accordance with various embodiments;

FIG. 35A is a schematic block diagram of a database system that generates trained model data for a Sammon mapping model in accordance with various embodiments;

FIG. 35B is a schematic block diagram of a database system that generates trained model data that includes nonlinear mapping data in accordance with various embodiments;

FIG. 35C is a schematic block diagram of a database system that generates trained model data that includes nonlinear mapping data indicating a set of transformation functions for generating a set of new columns in accordance with various embodiments;

FIG. 35D illustrates performance of a Sammon mapping model training process that includes performing a training subset sampling step, a cartesian product step, and/or a non-linear optimization process in accordance with various embodiments;

FIG. 35E illustrates performance of a non-linear optimization to minimize a loss function based on evaluating a loss function by computing at least one distance value in accordance with various embodiments;

FIG. 35F illustrates performance of a non-linear optimization process to minimize a loss function to tune parameters of a function definition in accordance with various embodiments;

FIG. 35G is a schematic block diagram of a database system that generates new trained model data based on applying a trained Sammon mapping model in accordance with various embodiments;

FIG. 35H is a logic diagram illustrating a method for execution in accordance with various embodiments;

FIG. 36A is a schematic block diagram of a query operator execution flow that includes a K Nearest Neighbors (KNN) join operator to implement a classification algorithm in accordance with various embodiments;

FIG. 36B is a schematic block diagram of via a plurality of nodes communicating via a shuffle network that that utilize query operator execution flows that include a KNN join operator in accordance with various embodiments;

FIG. 36C is a schematic block diagram of a KNN join operator that implements a replay operator to expand a neighboring search space over a plurality of iterations in accordance with various embodiments;

FIG. 36D is a schematic block diagram illustrating a plurality of pre-designated record groupings of previously-classified records in the two-dimensional case in accordance with various embodiments;

FIG. 36E is a schematic block diagram illustrating radial expansion of neighboring search spaces of pre-designated record groupings in the two-dimensional case in accordance with various embodiments; and FIGS. 36F and 36G are logic diagrams illustrating a method for execution in accordance with various embodiments of the present invention.

DETAILED DESCRIPTION OF THE INVENTION

Figure 1:
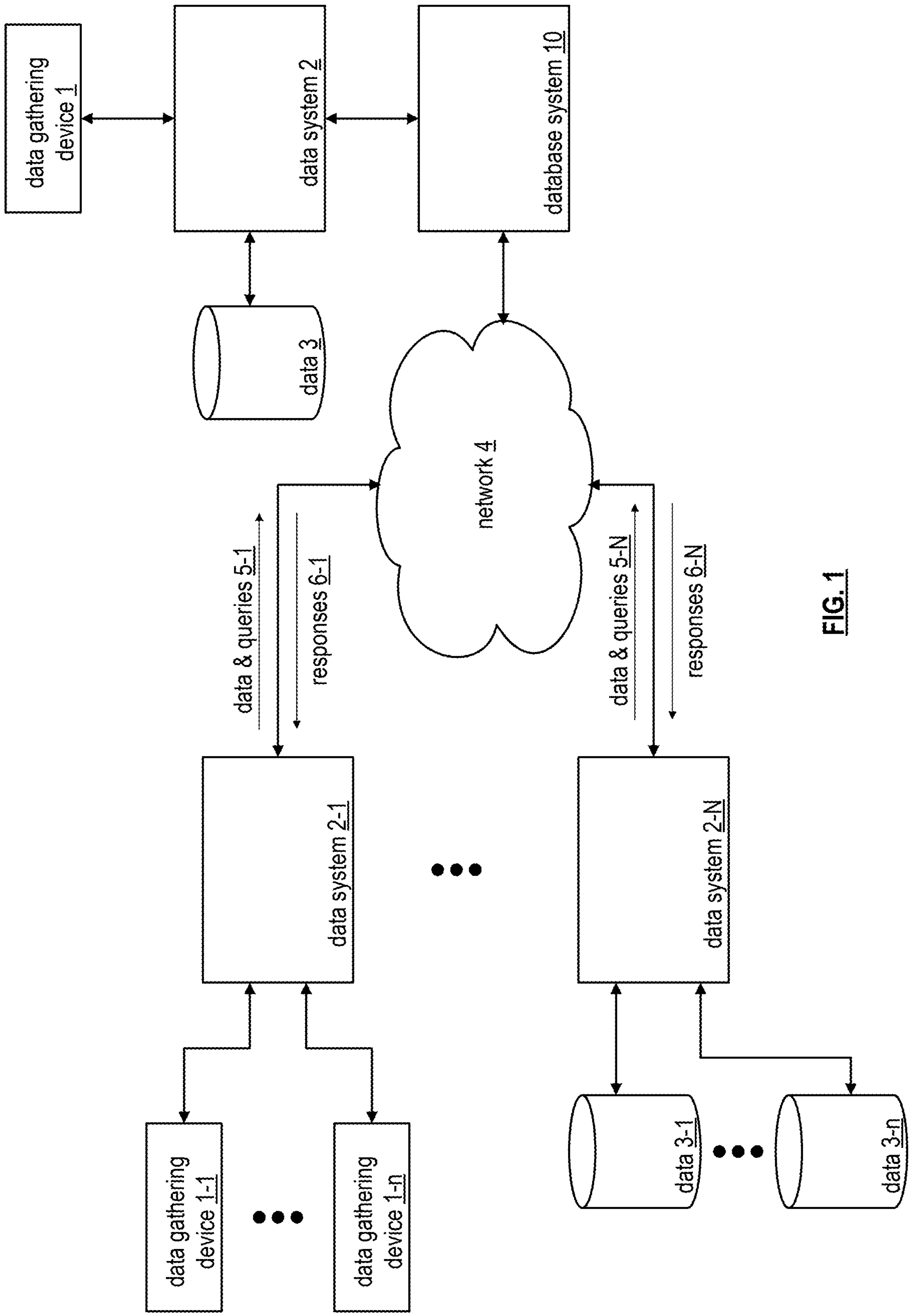
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
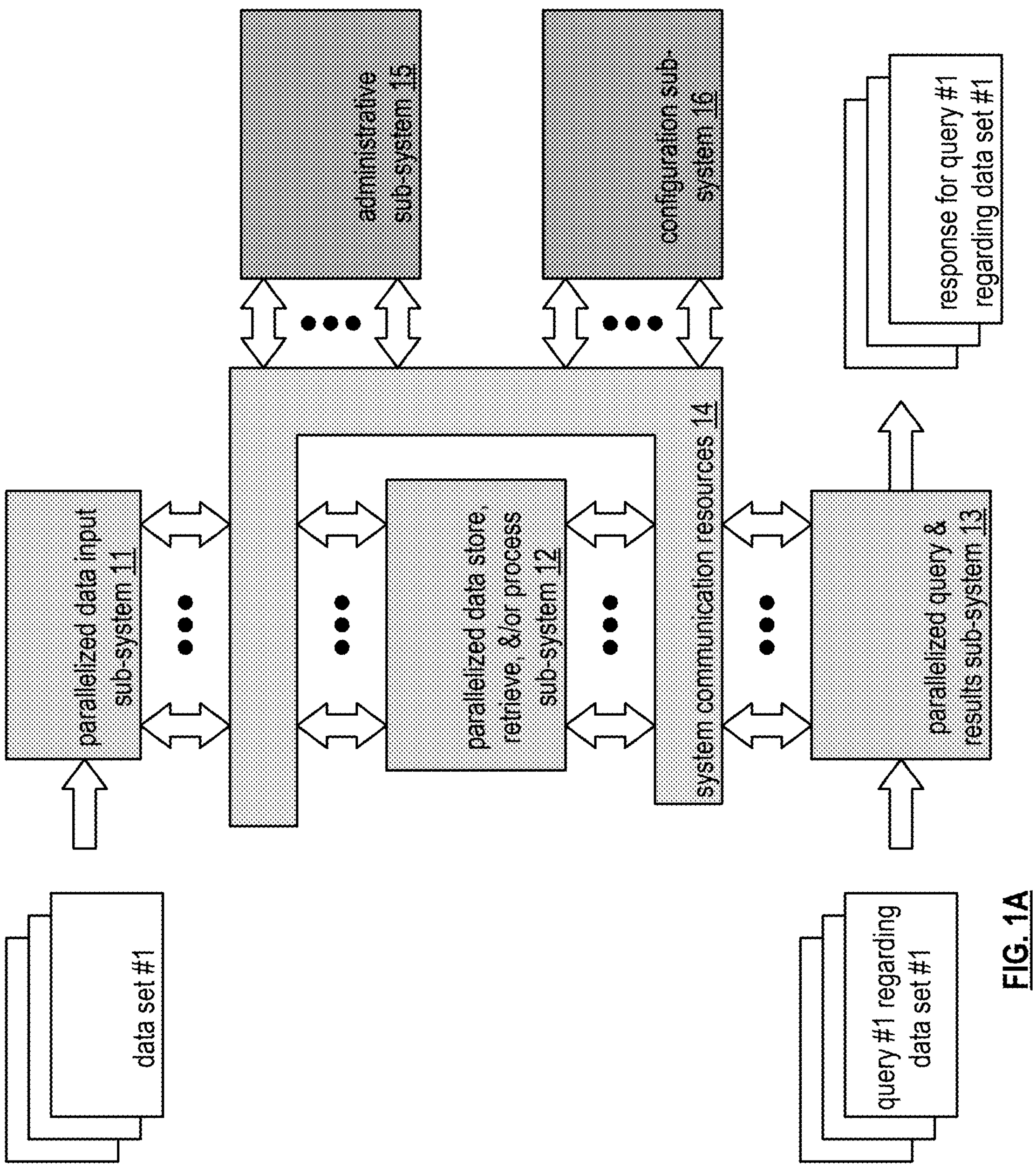
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 can also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
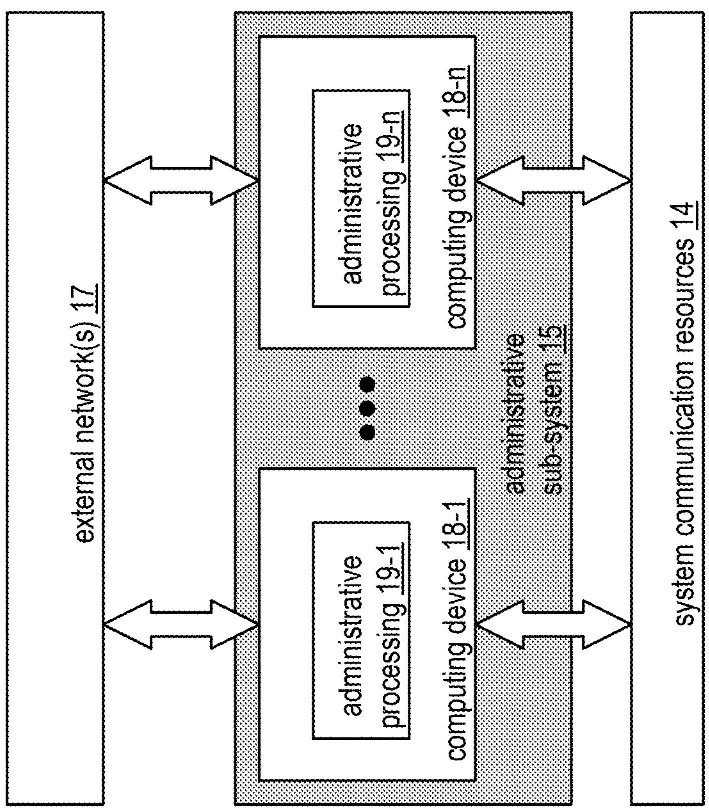
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
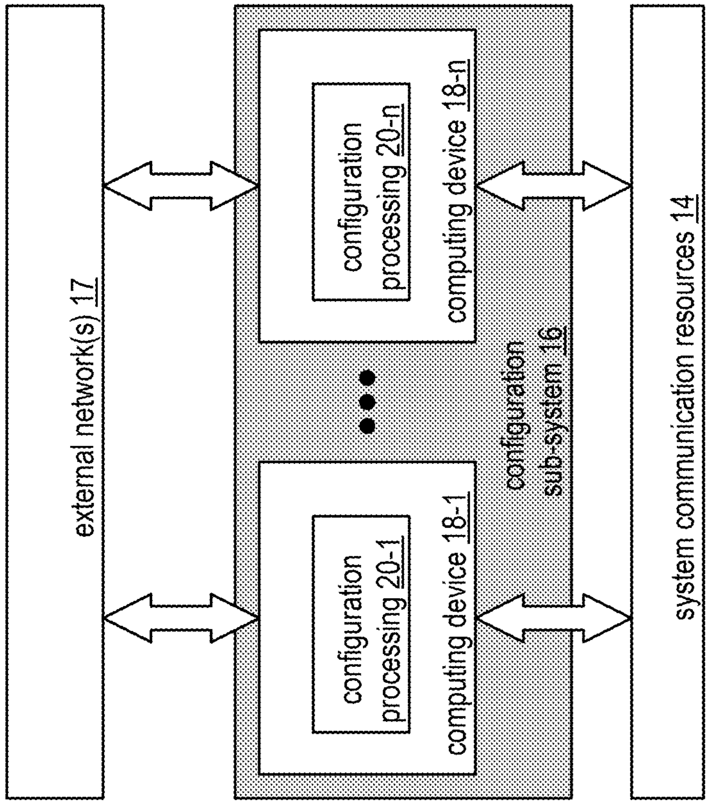
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
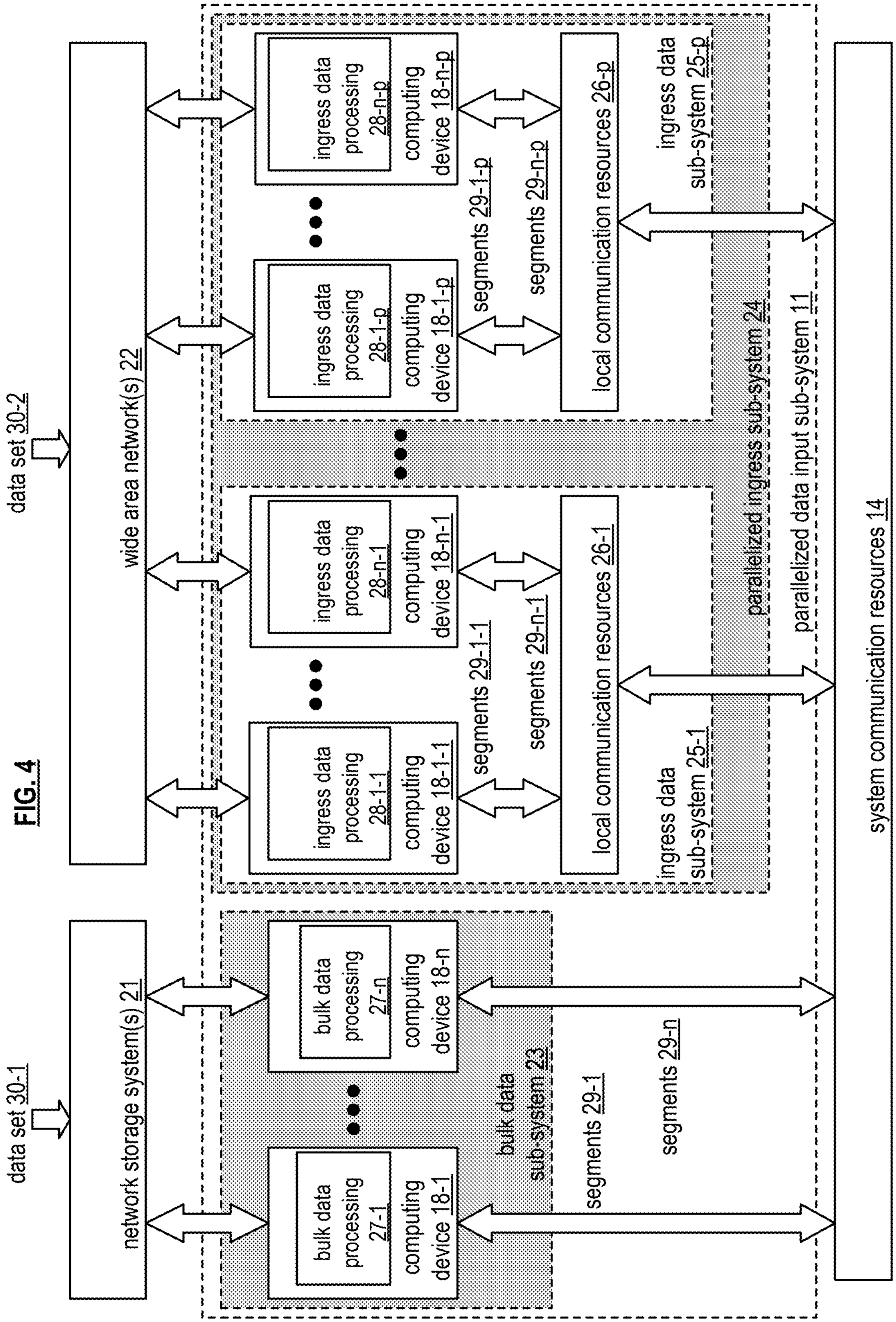
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
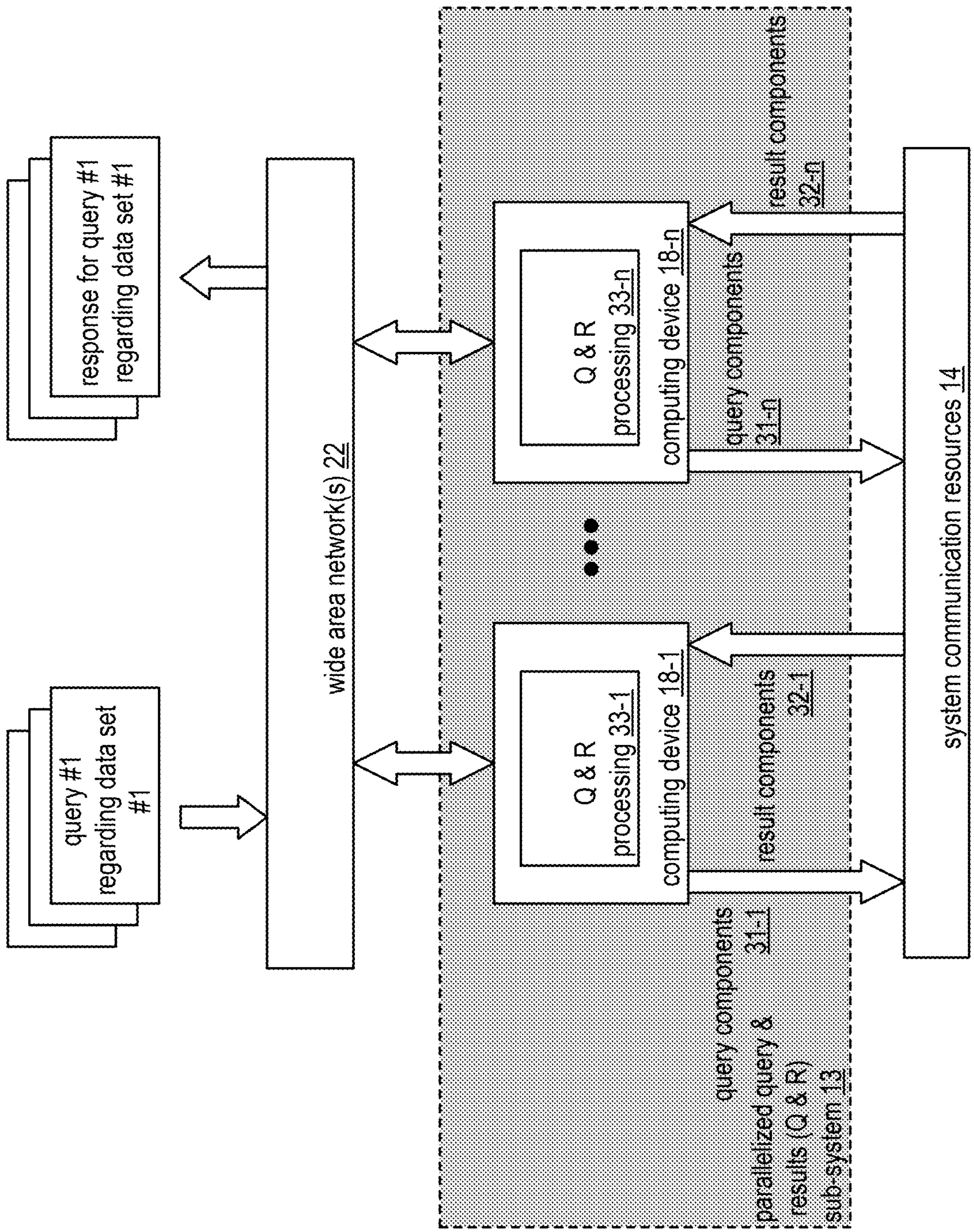
FIG. 5 is a schematic block diagram of an embodiment of a parallelized query and response (Q & R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q & R sub-system 13 processes the result components to produce a query response.

The Q & R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
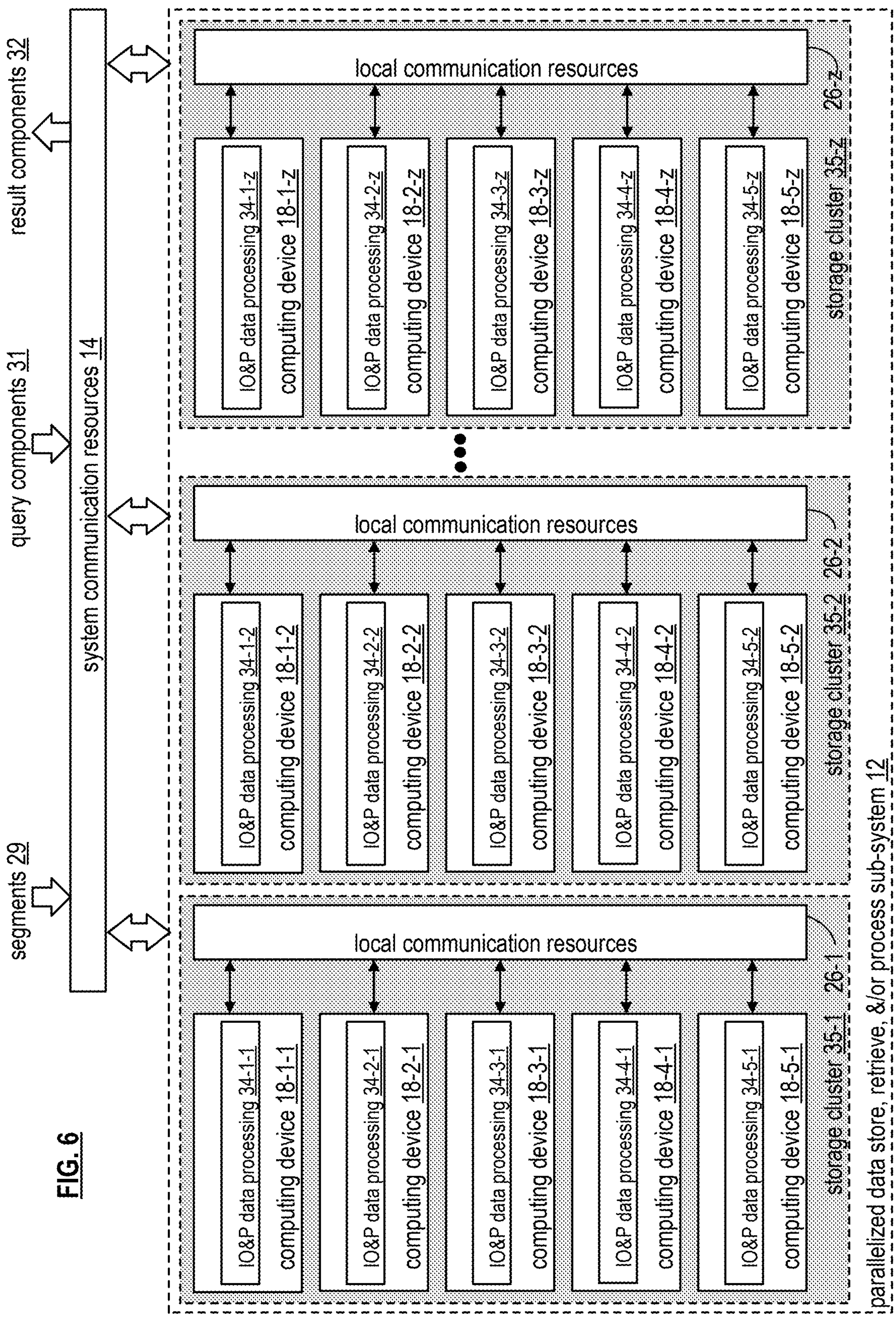
FIG. 6 is a schematic block diagram of an embodiment of a parallelized data store, retrieve, and/or process (IO & P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO & P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q & R sub-system 13) and produce appropriate result components.

While storage cluster 35-1 is storing and/or processing a segment group, the other storage clusters 35-2 through **35-*n* are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1** is storing and/or processing a second segment group while it is storing/or and processing a first segment group.

Figure 7:
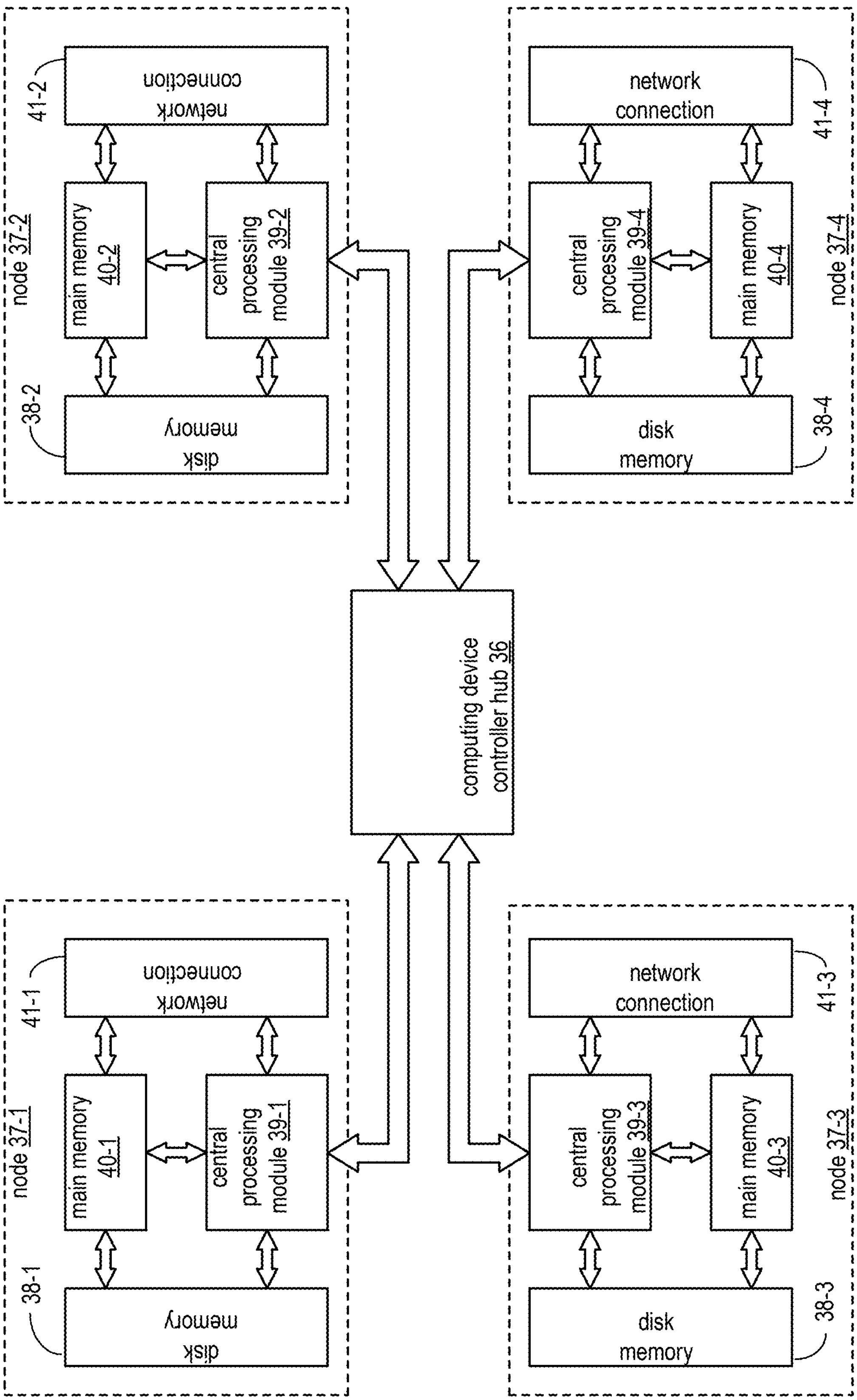
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
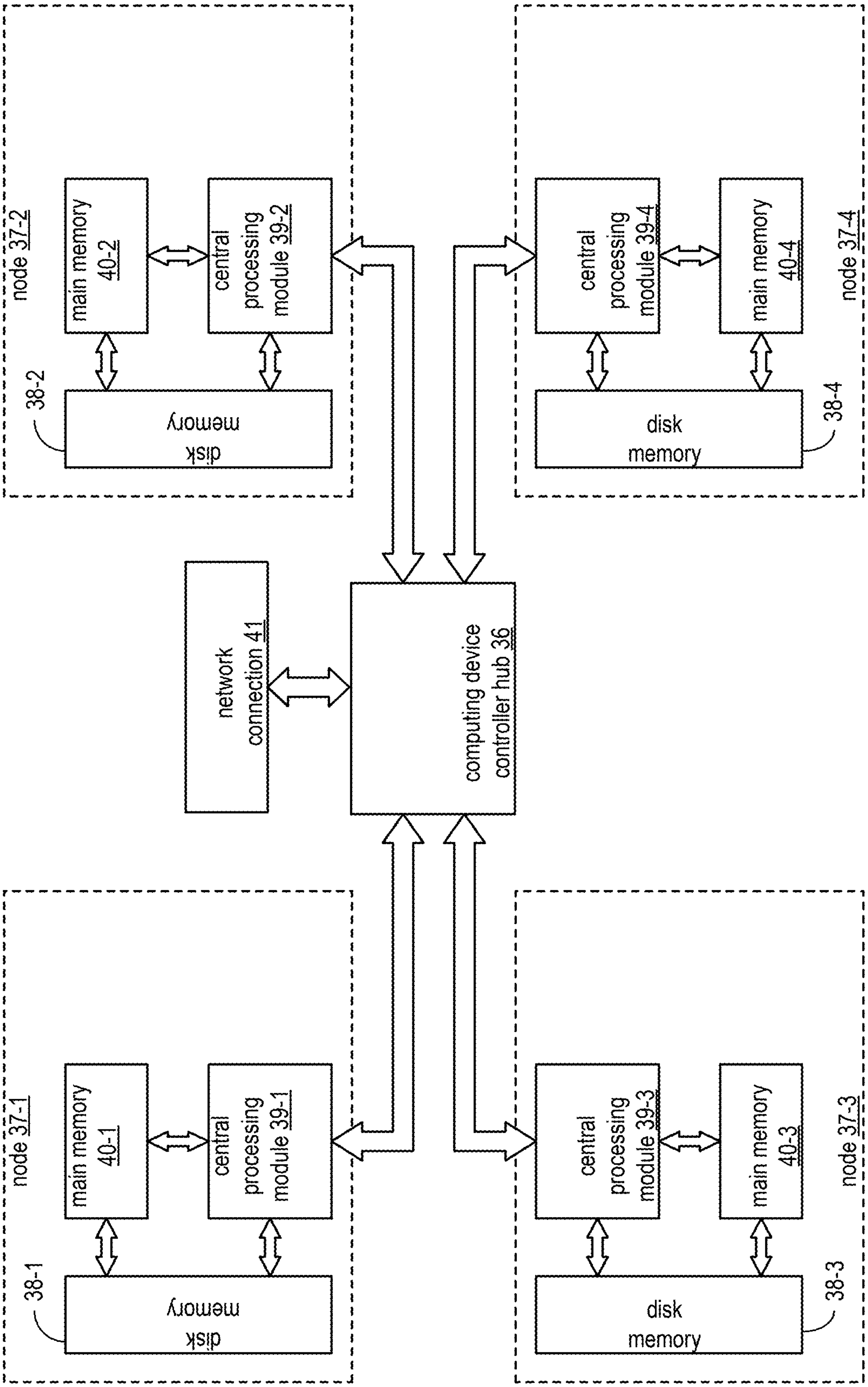
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
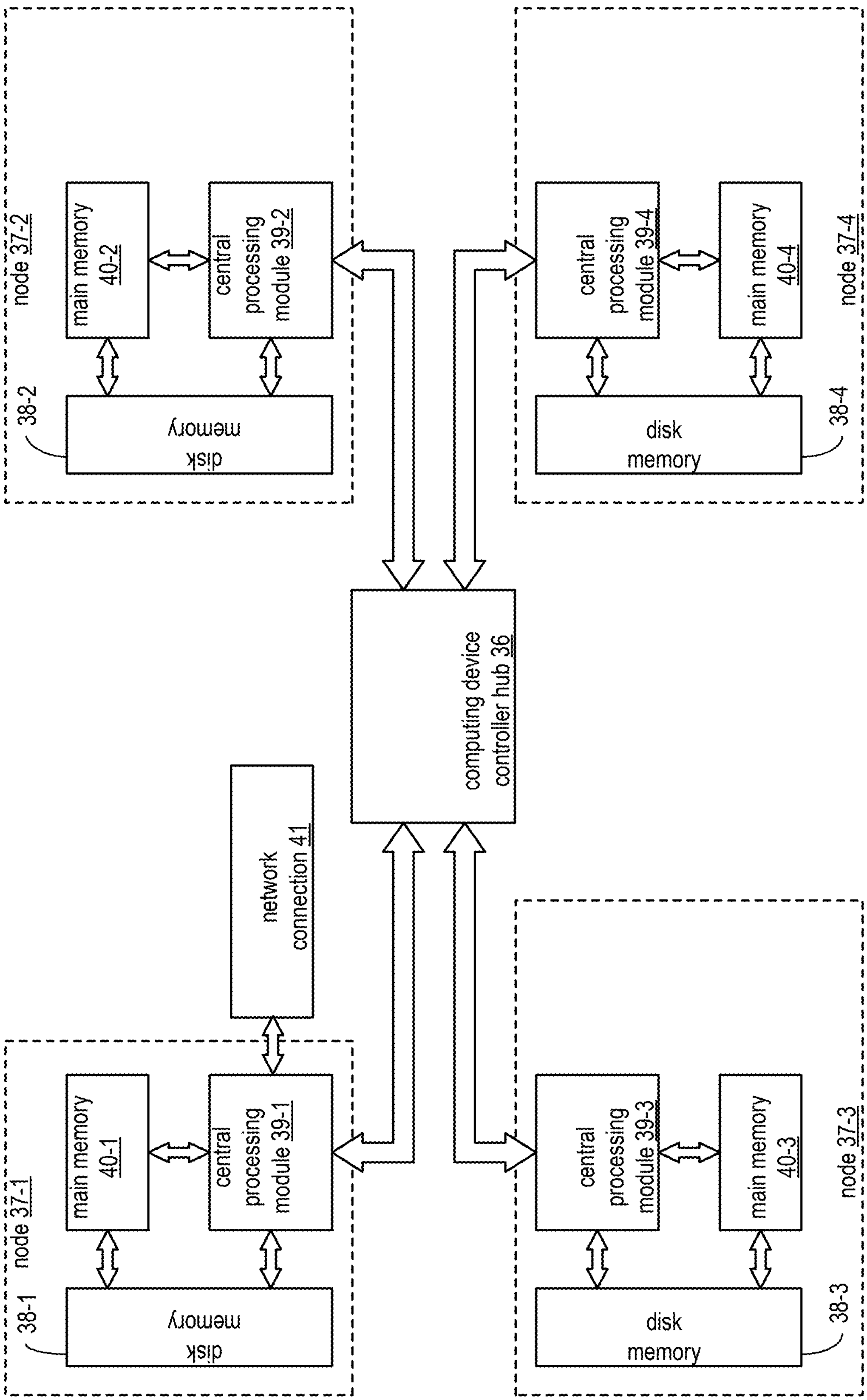
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
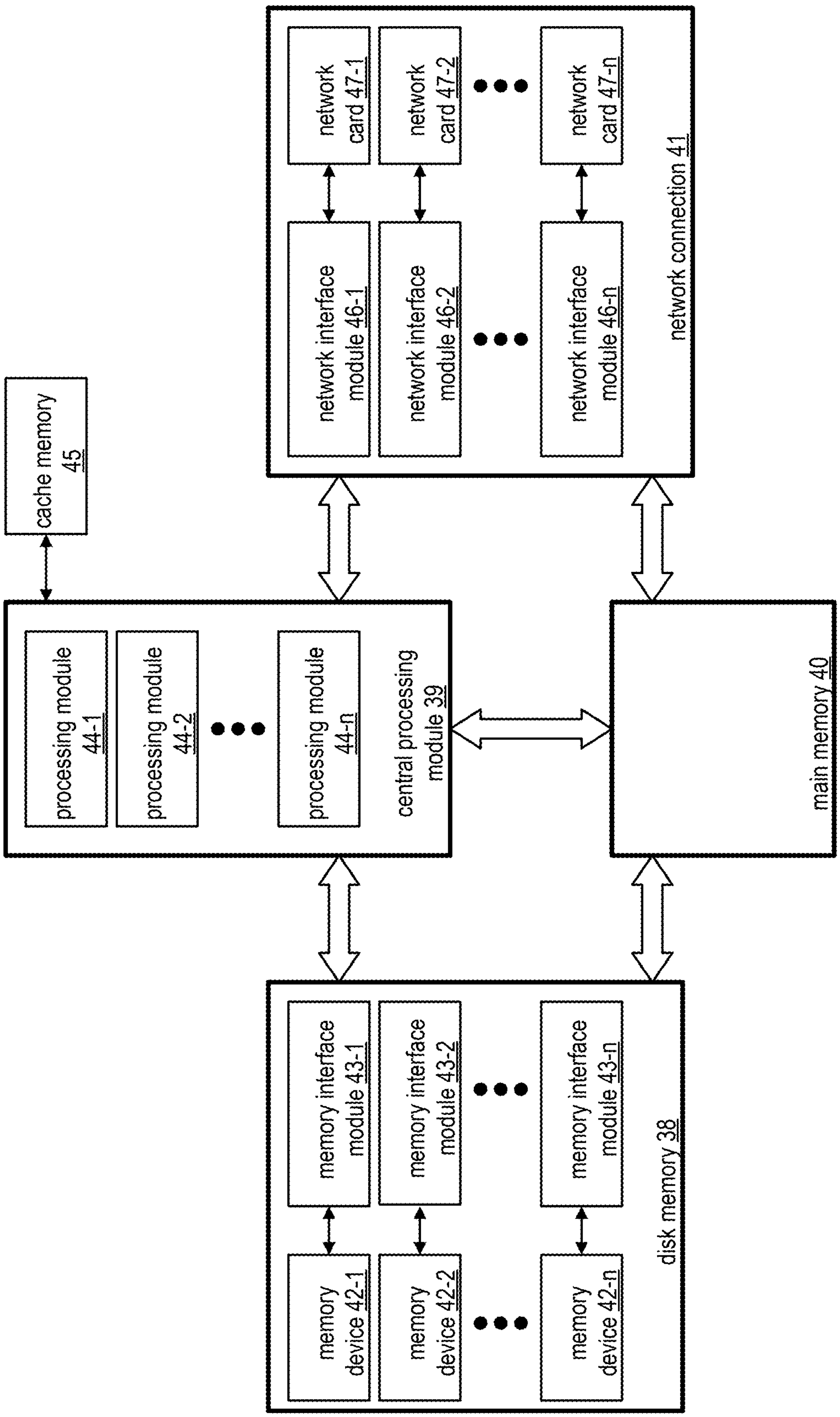
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
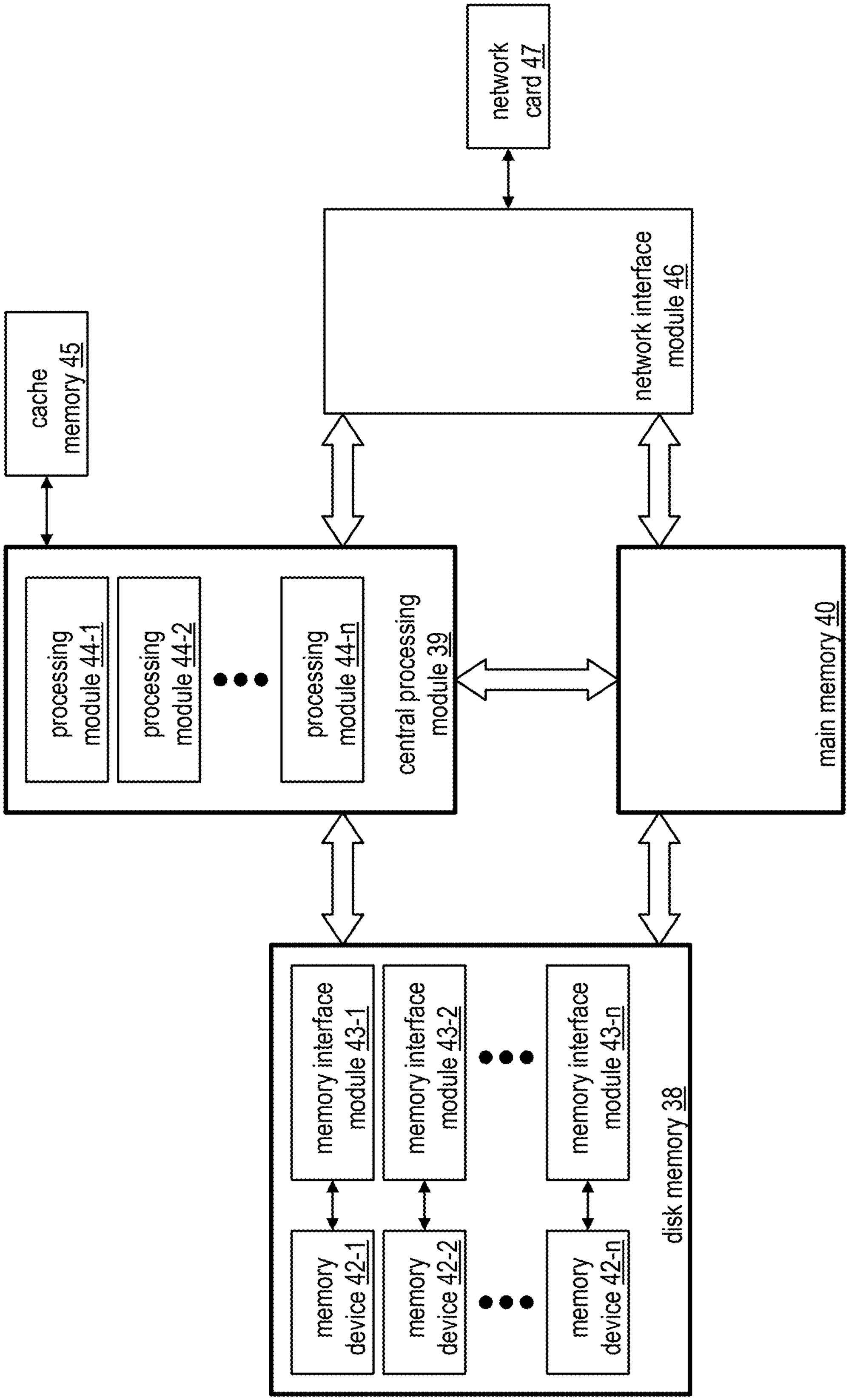
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
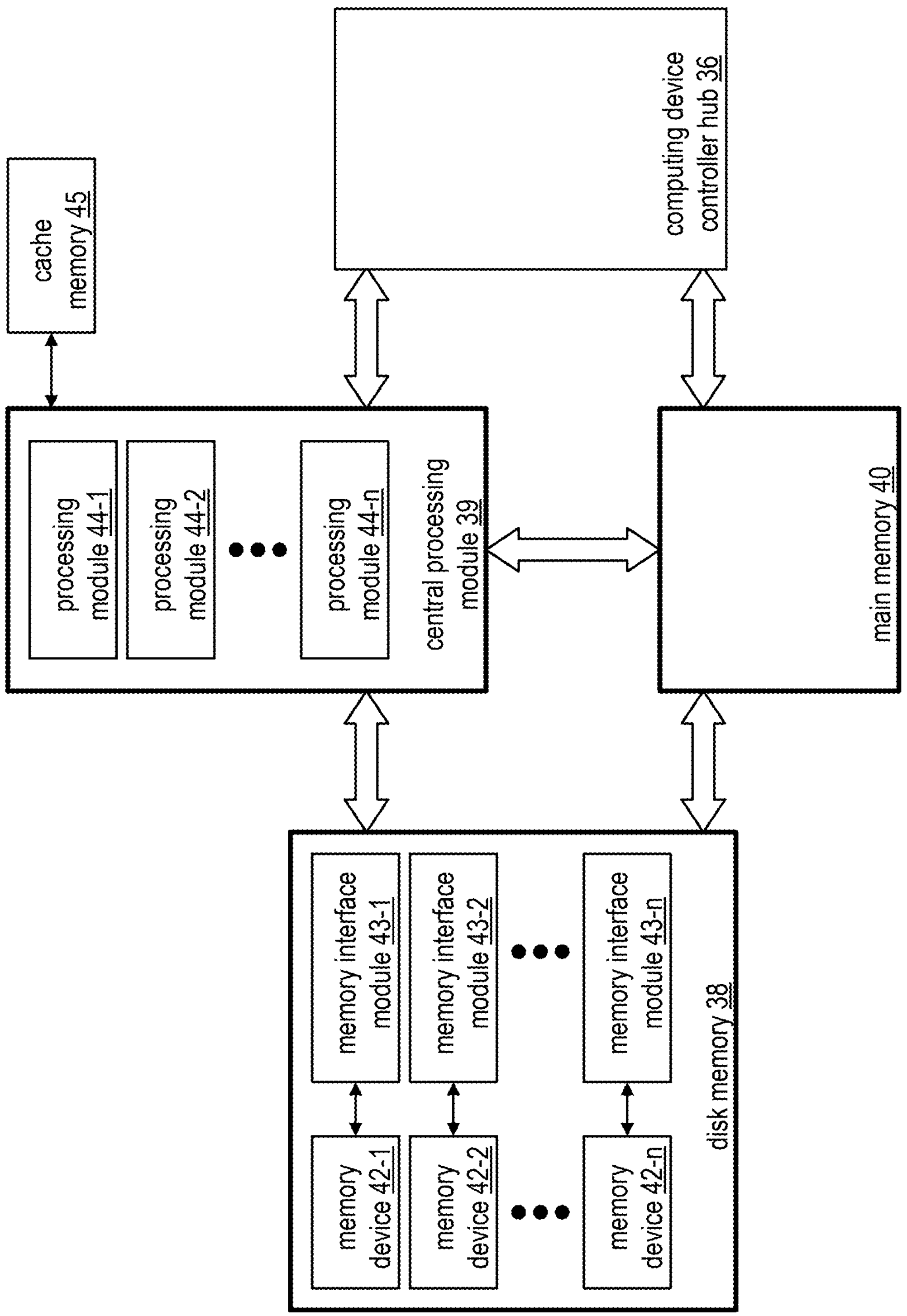
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
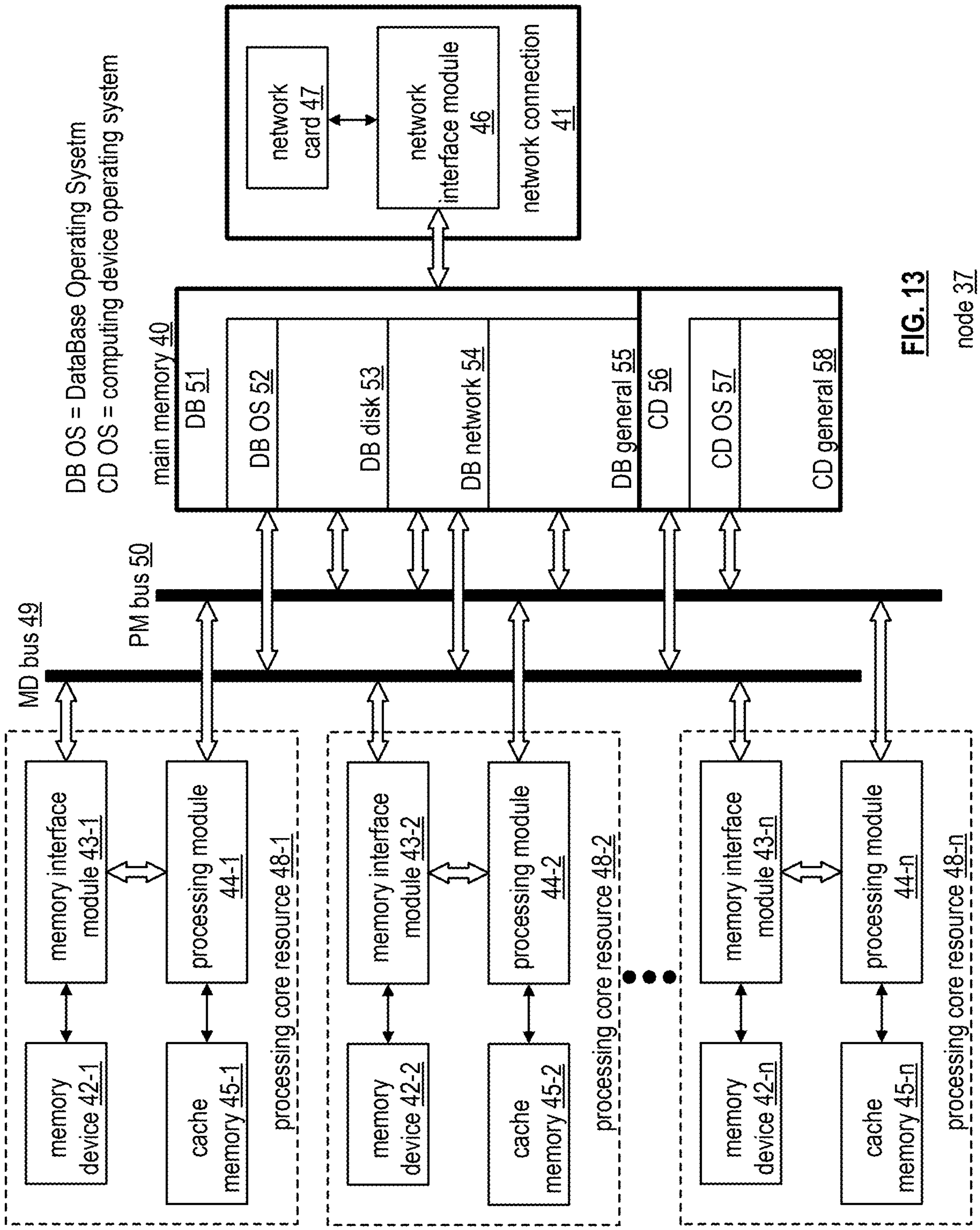
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
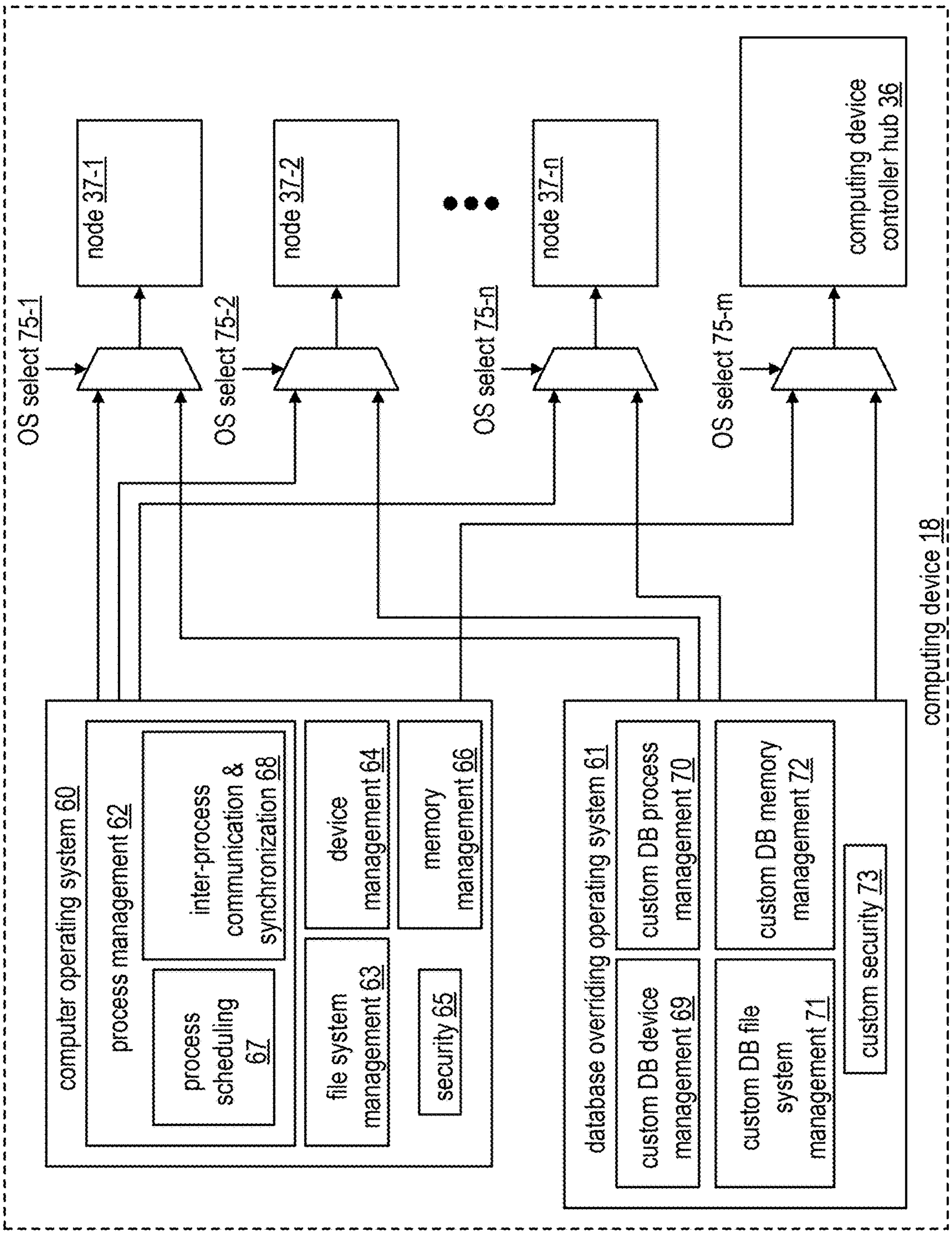
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
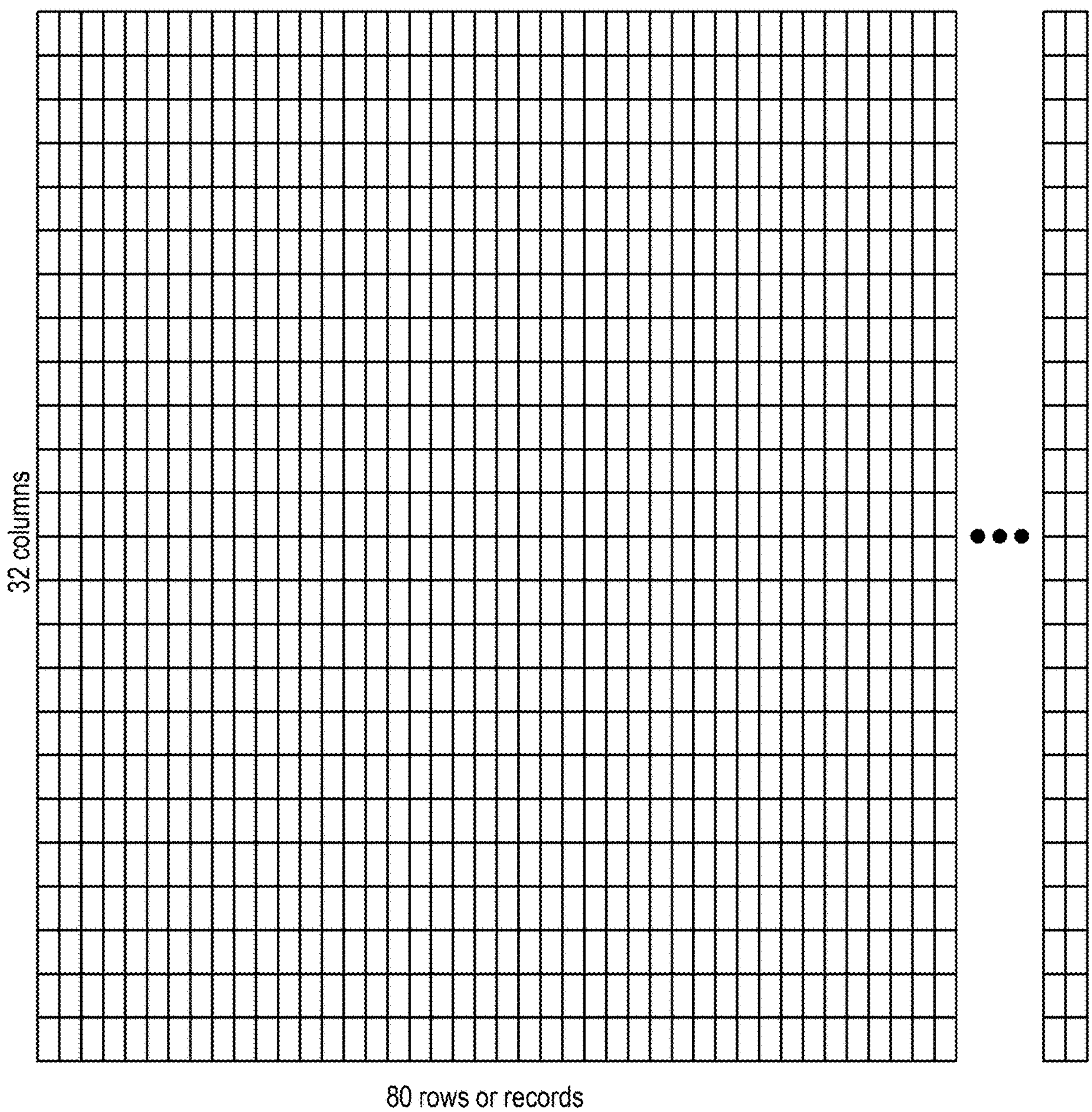
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
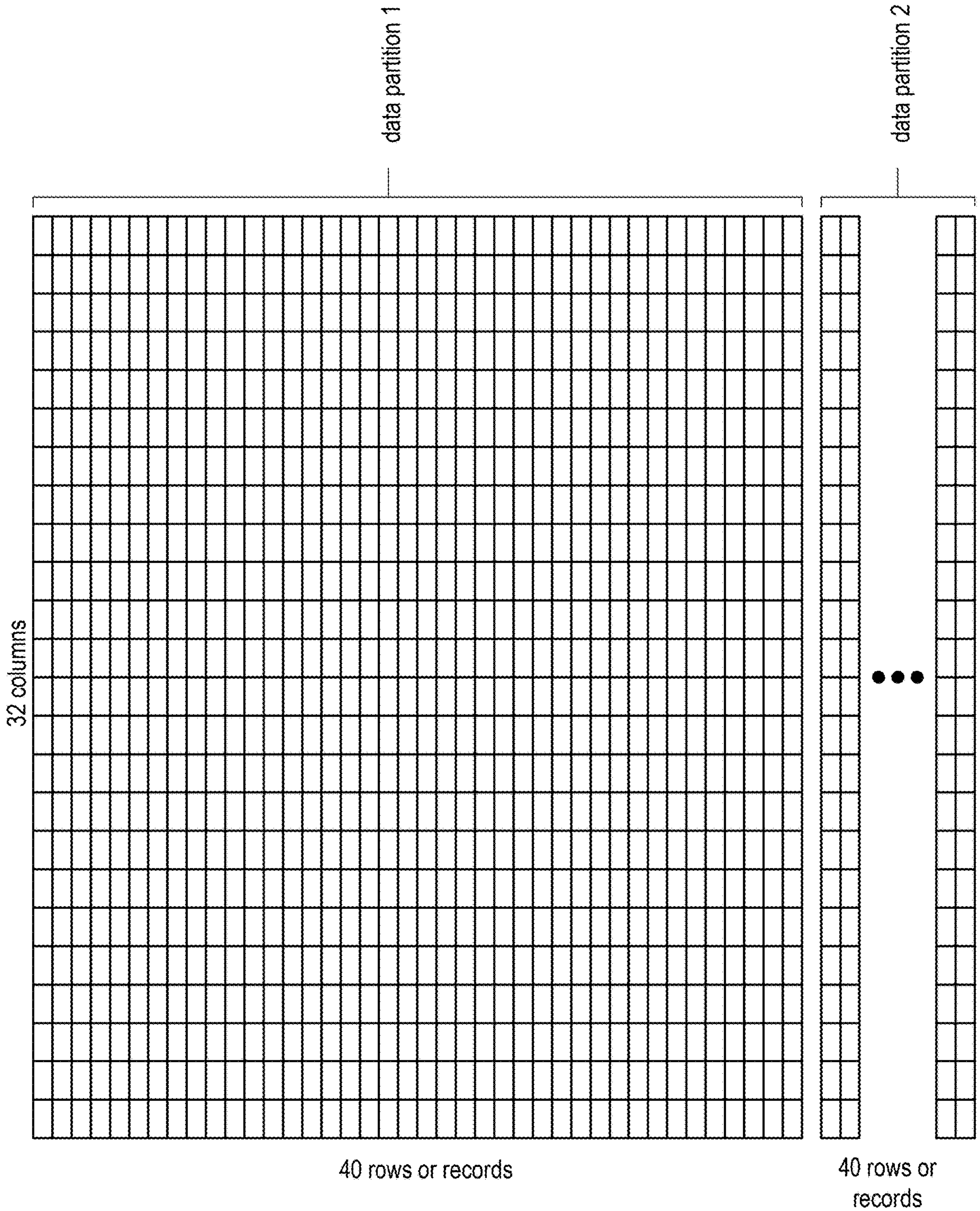

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
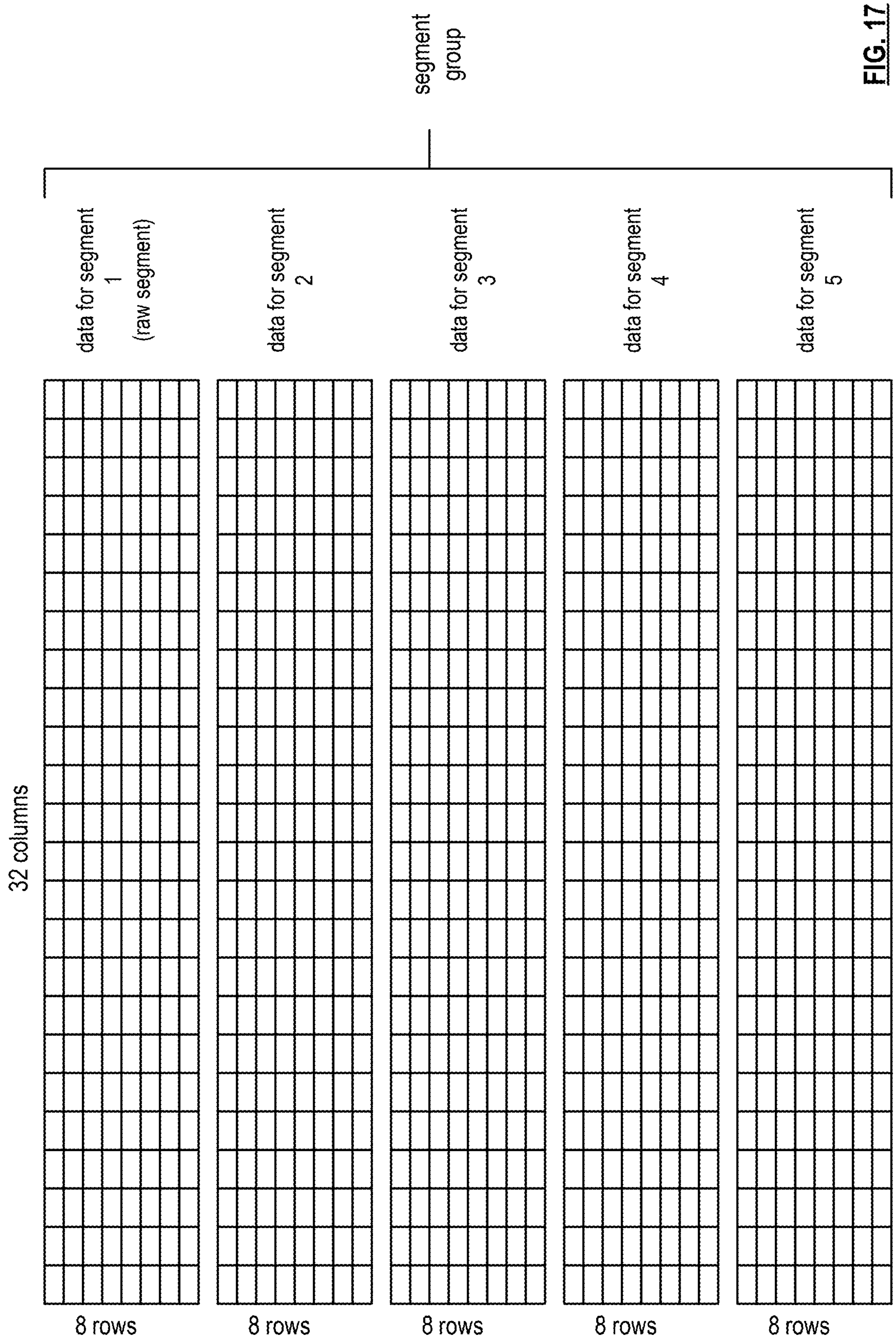

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
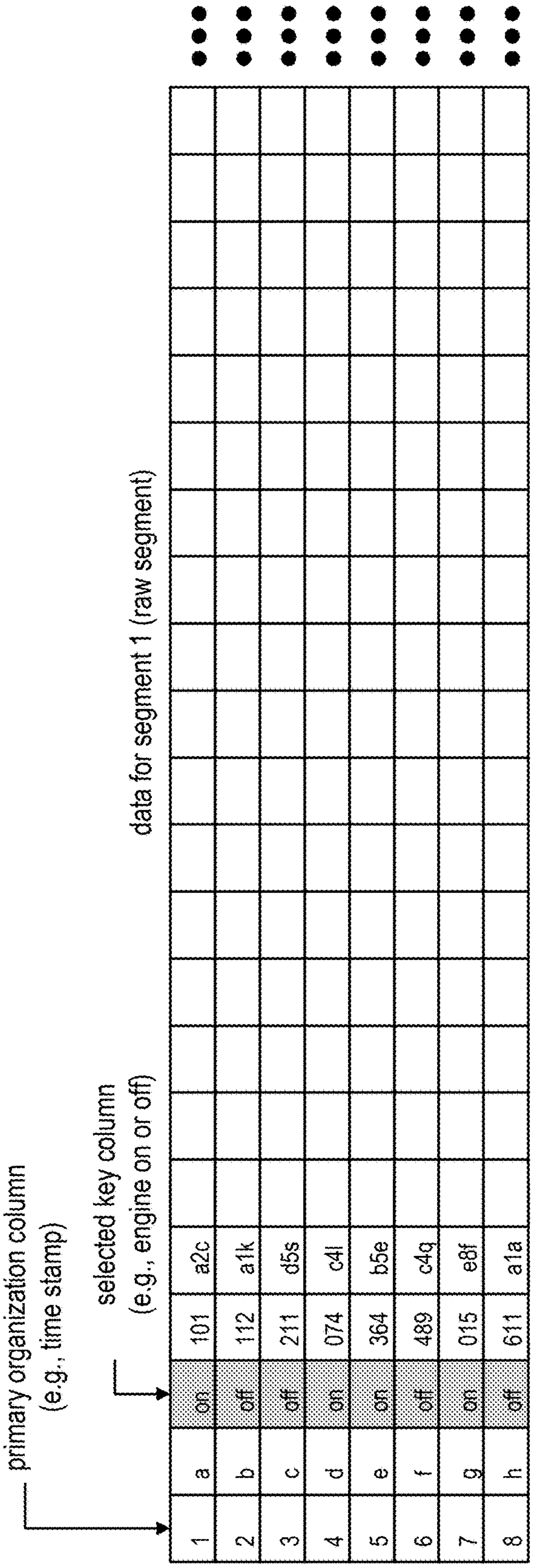

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
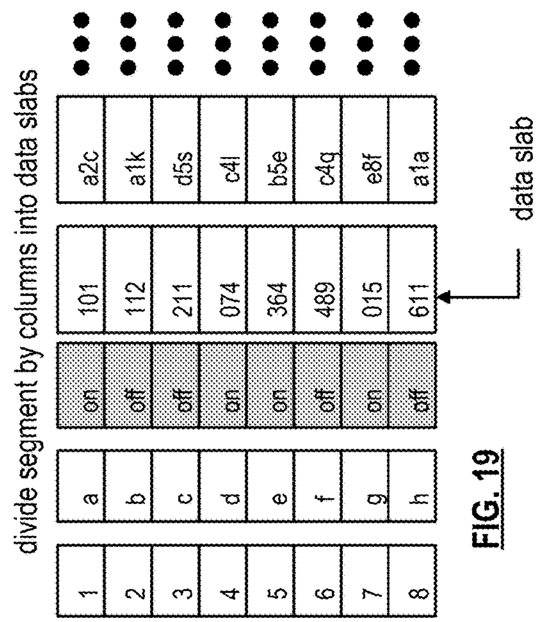

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
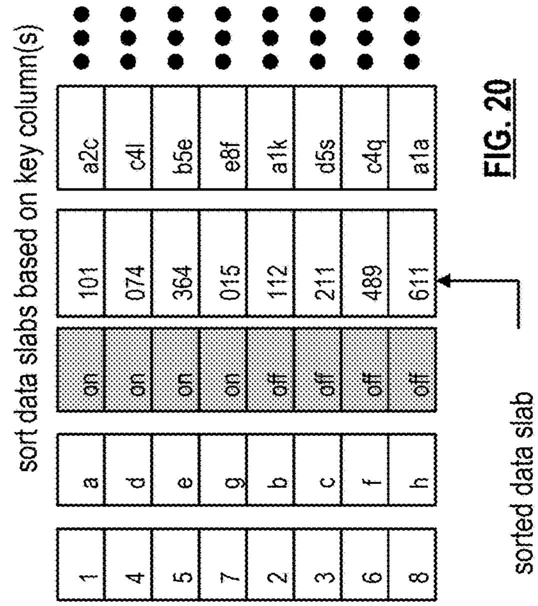

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
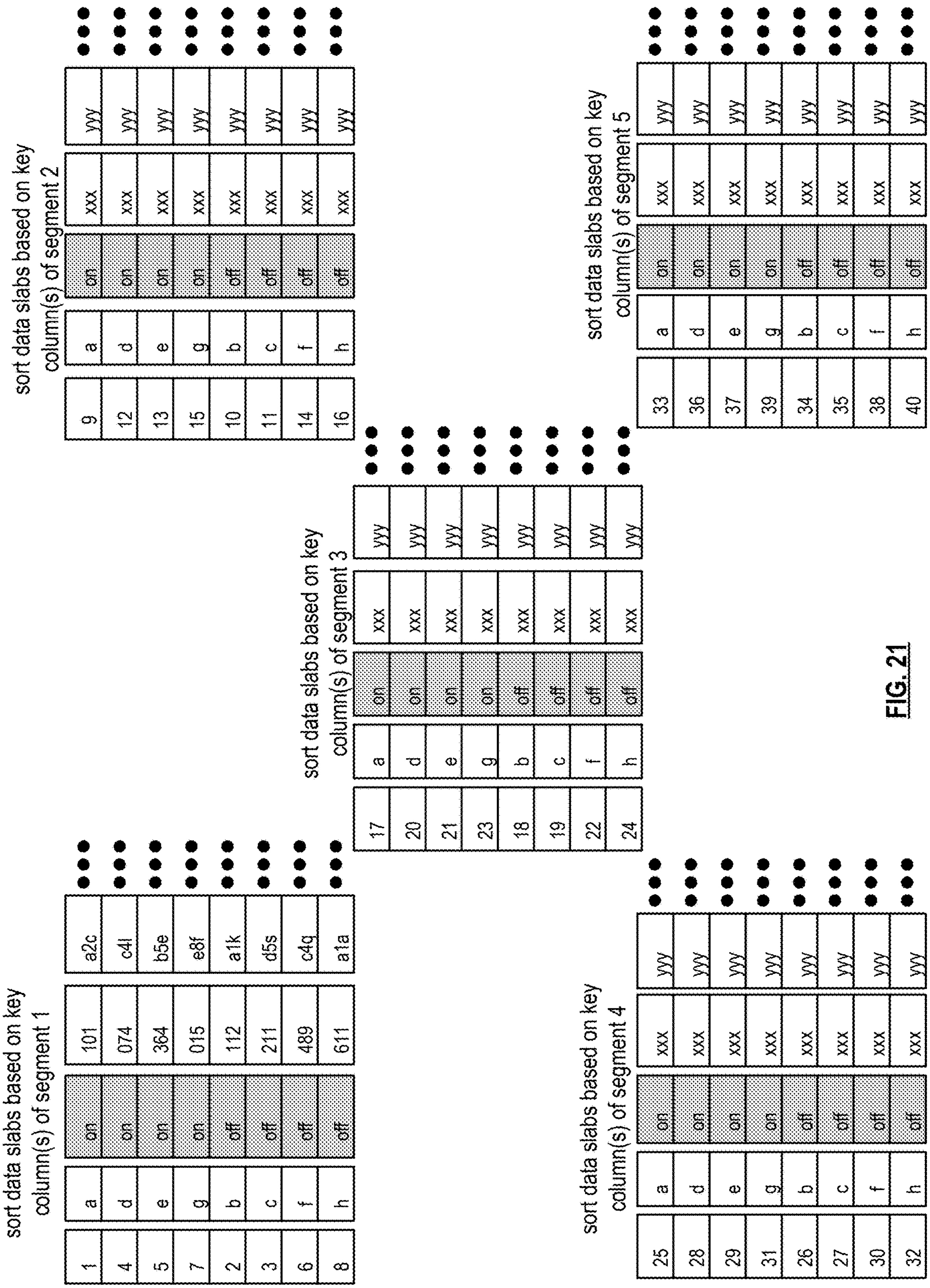

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
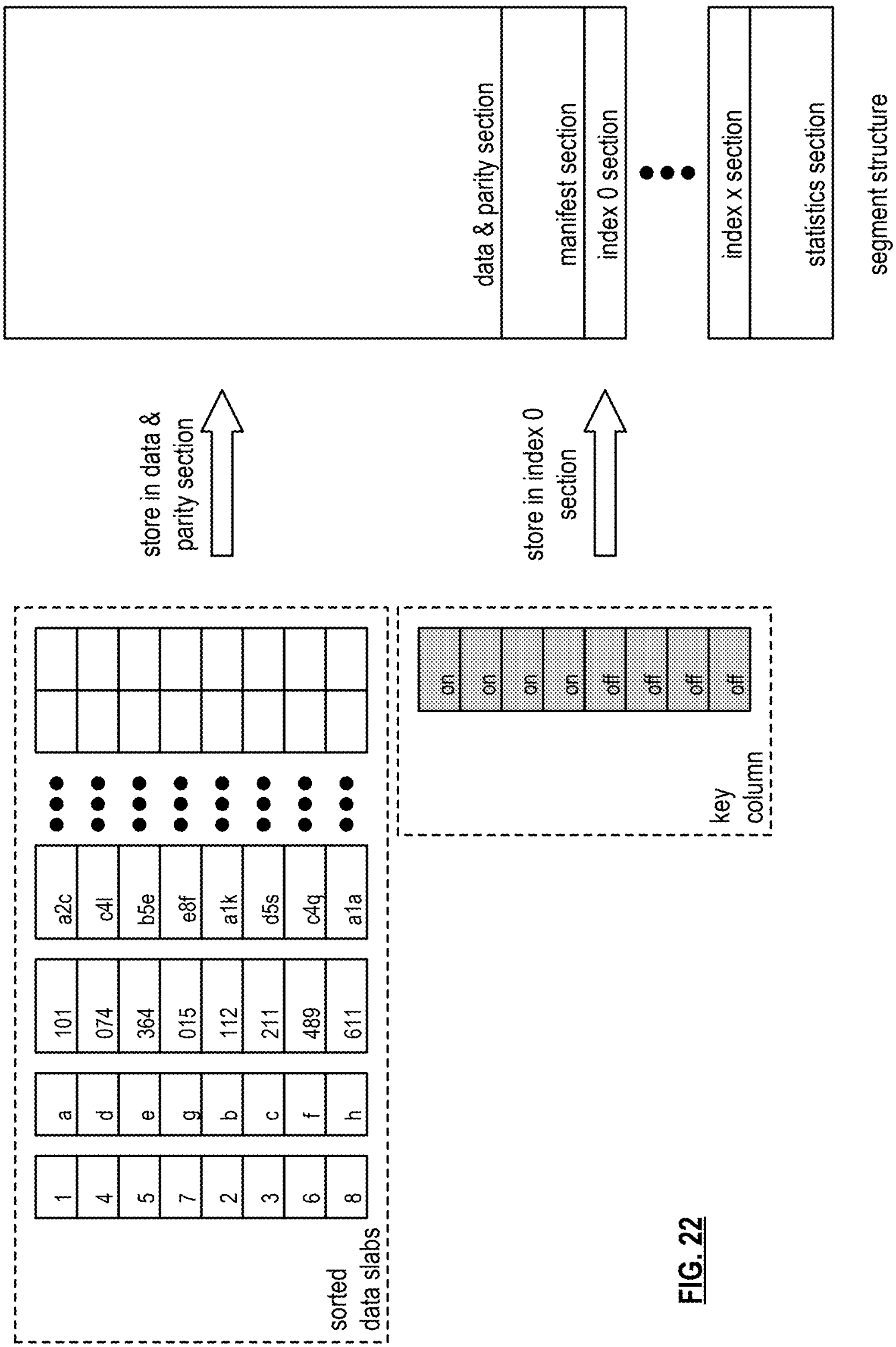

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
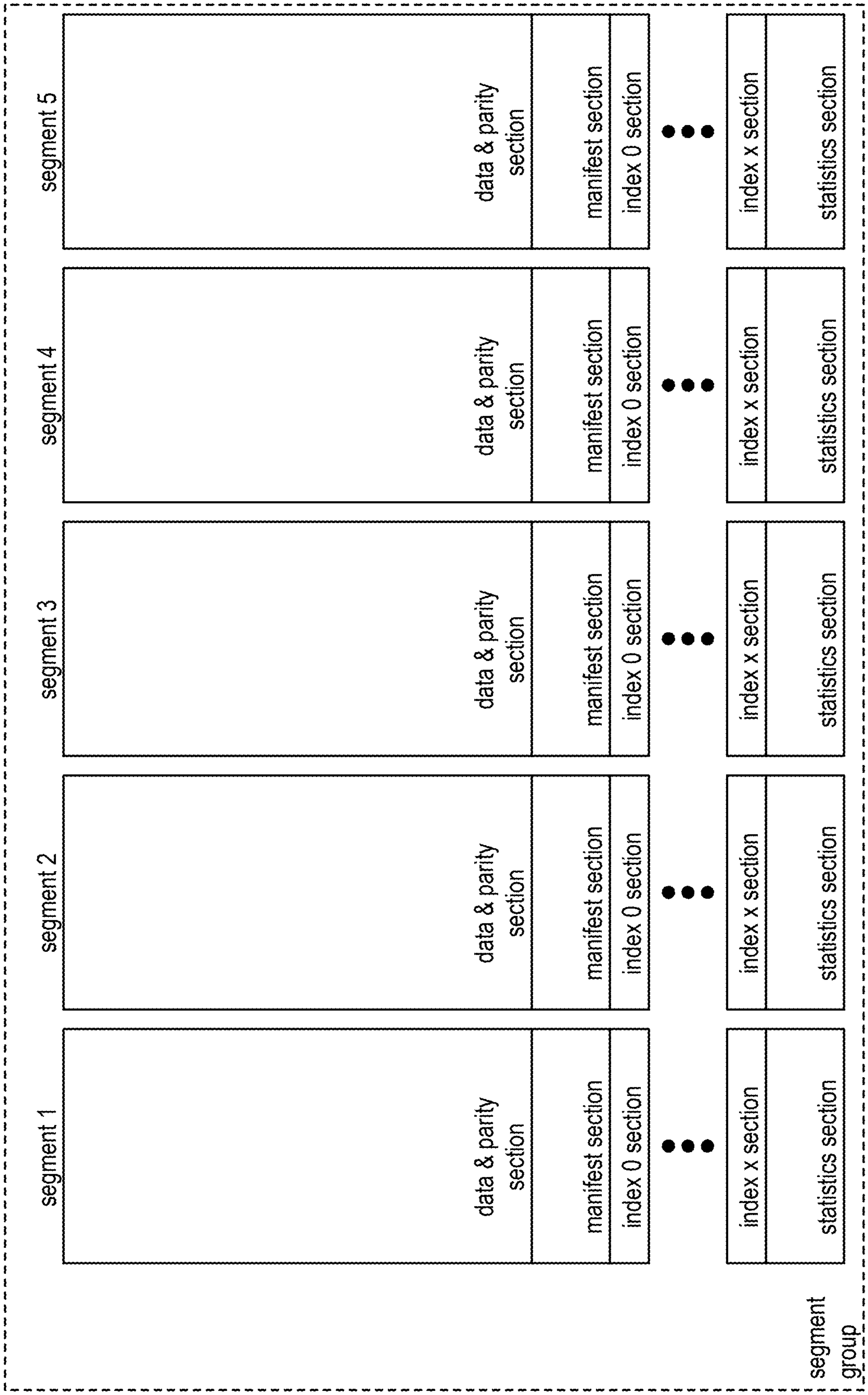

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
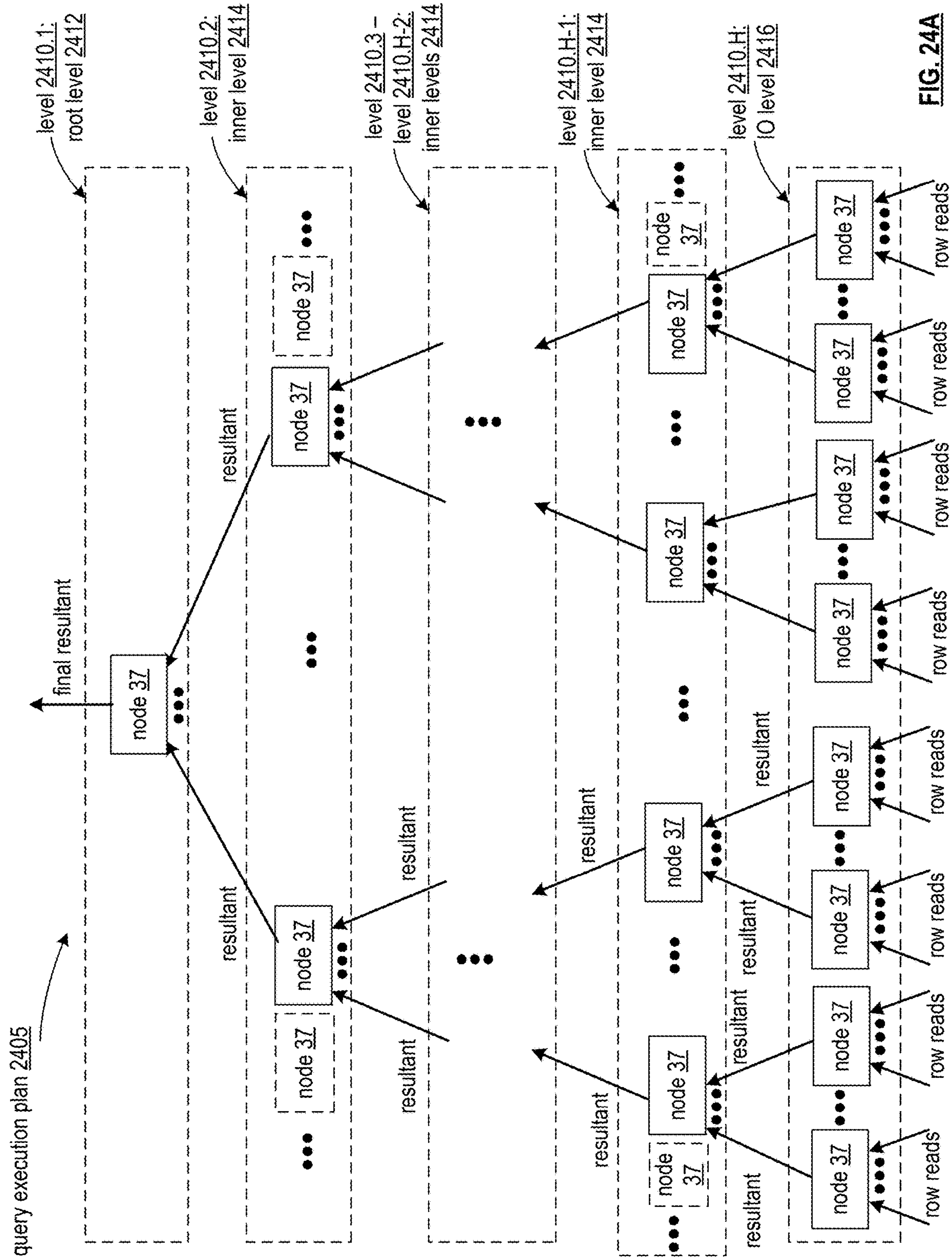
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37.

For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Execution of queries via a query execution plan 2405 can be ideal as processing of the query is distributed across a plurality of nodes 37 to enable decentralized query execution. At scale, this is ideal as retrieval of large numbers of records required for a query's execution and/or processing of this large number of records via query operators required for a query's execution can be dispersed across many distinct processing modules implemented by the separate nodes 37. This reduces coordination required for query execution, where some nodes 37 do not need to coordinate with and/or do not require knowledge of other nodes 37 of the query execution plan 2405 in performing their respective portion of a query's execution. This also enables queries to be executed upon data stored in separate memories of database system 10, while not requiring all required records to be first centralized prior to query execution, as nodes 37 at IO level 2416 can retrieve records from their own memory and/or from assigned memory devices with which they communicate. This mechanism of maintaining decentralization and/or reducing coordination via implementing a query execution plan 2405 increases query efficiency.

Figure 24B:
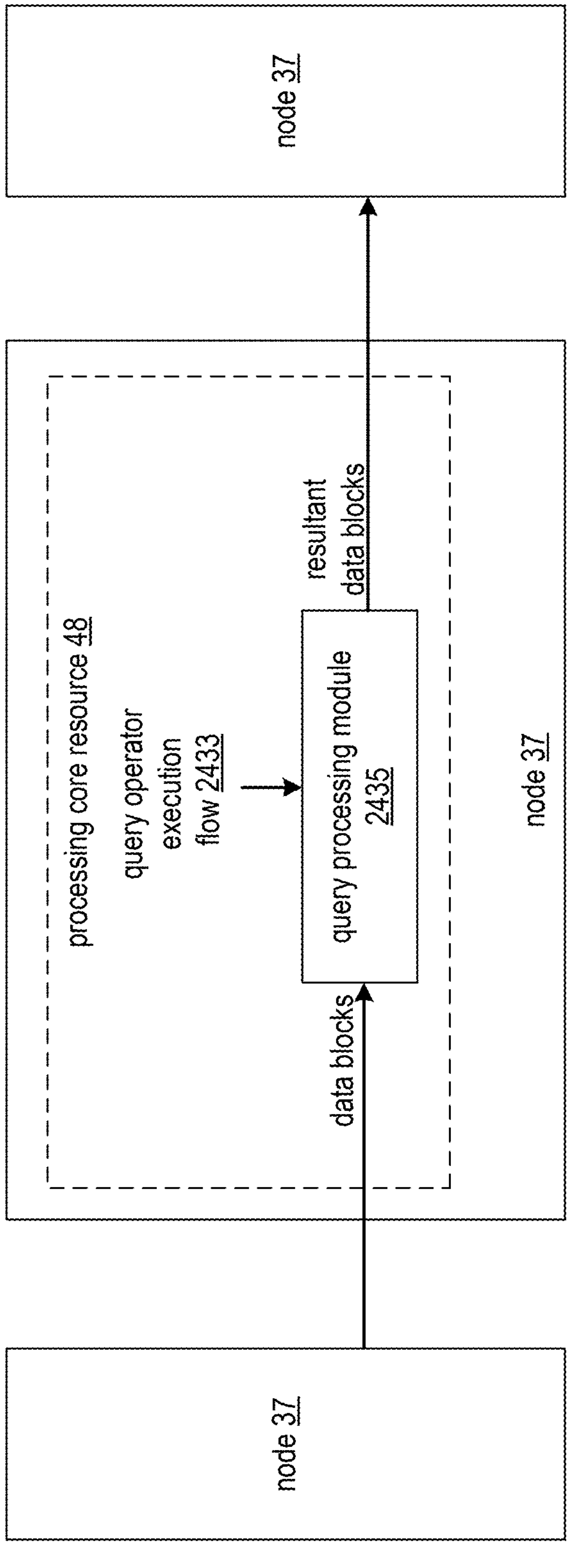
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 24C:
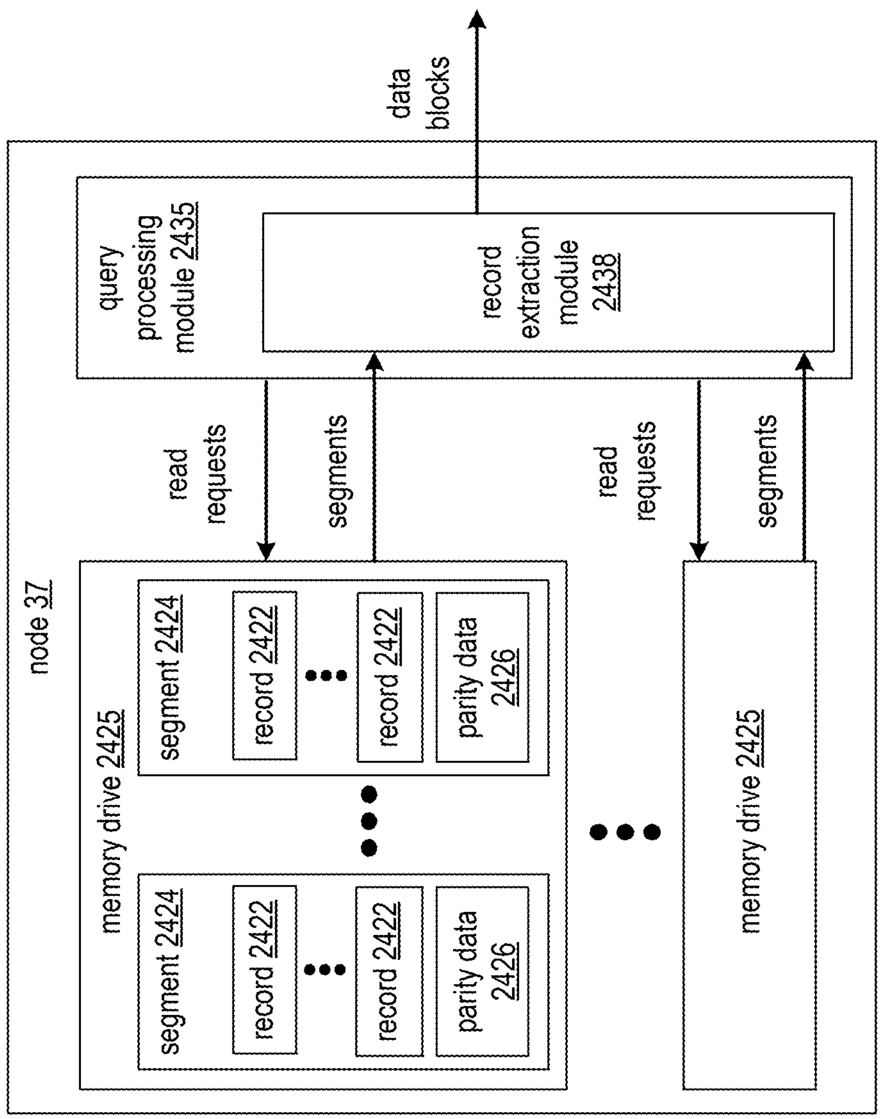

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
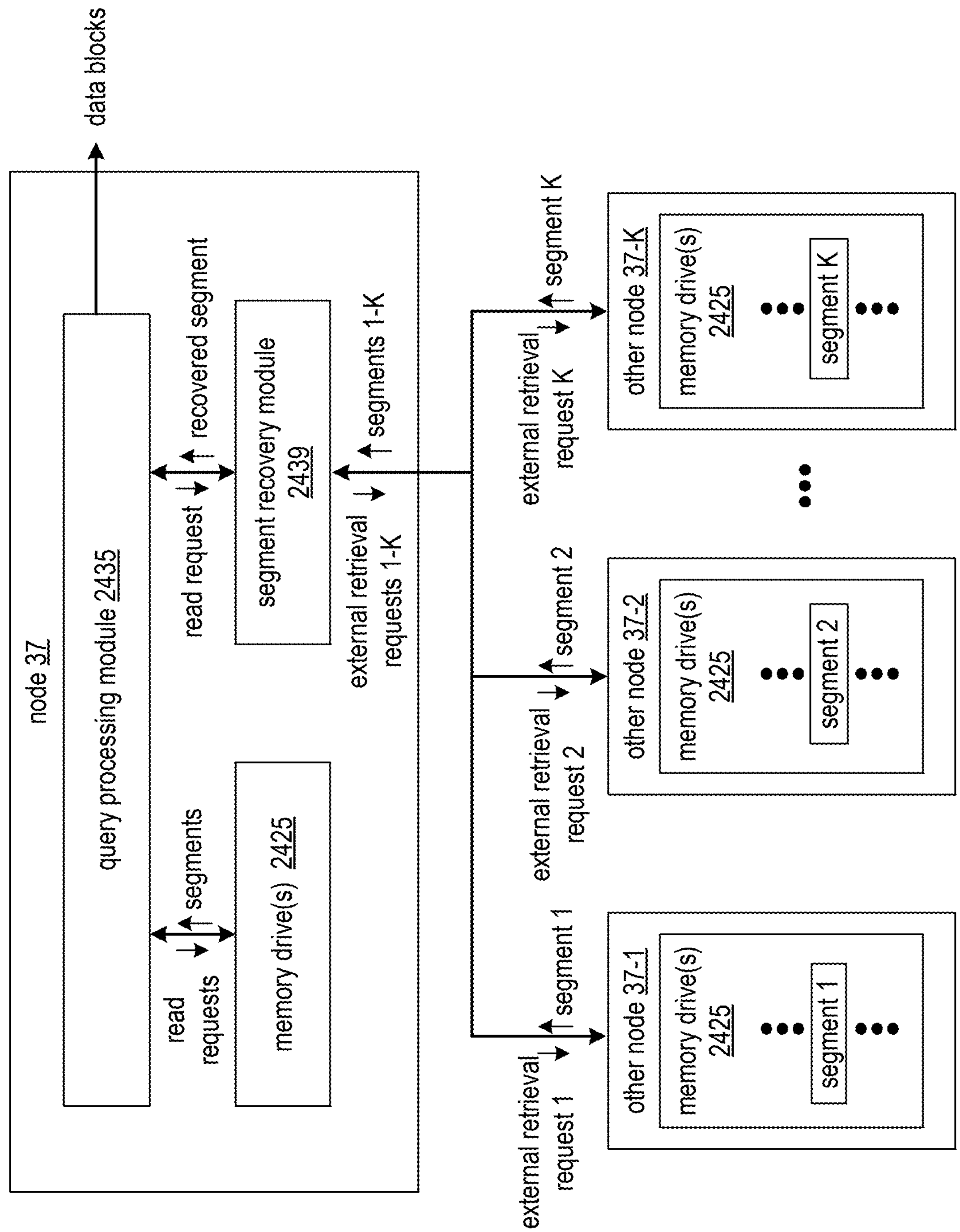

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
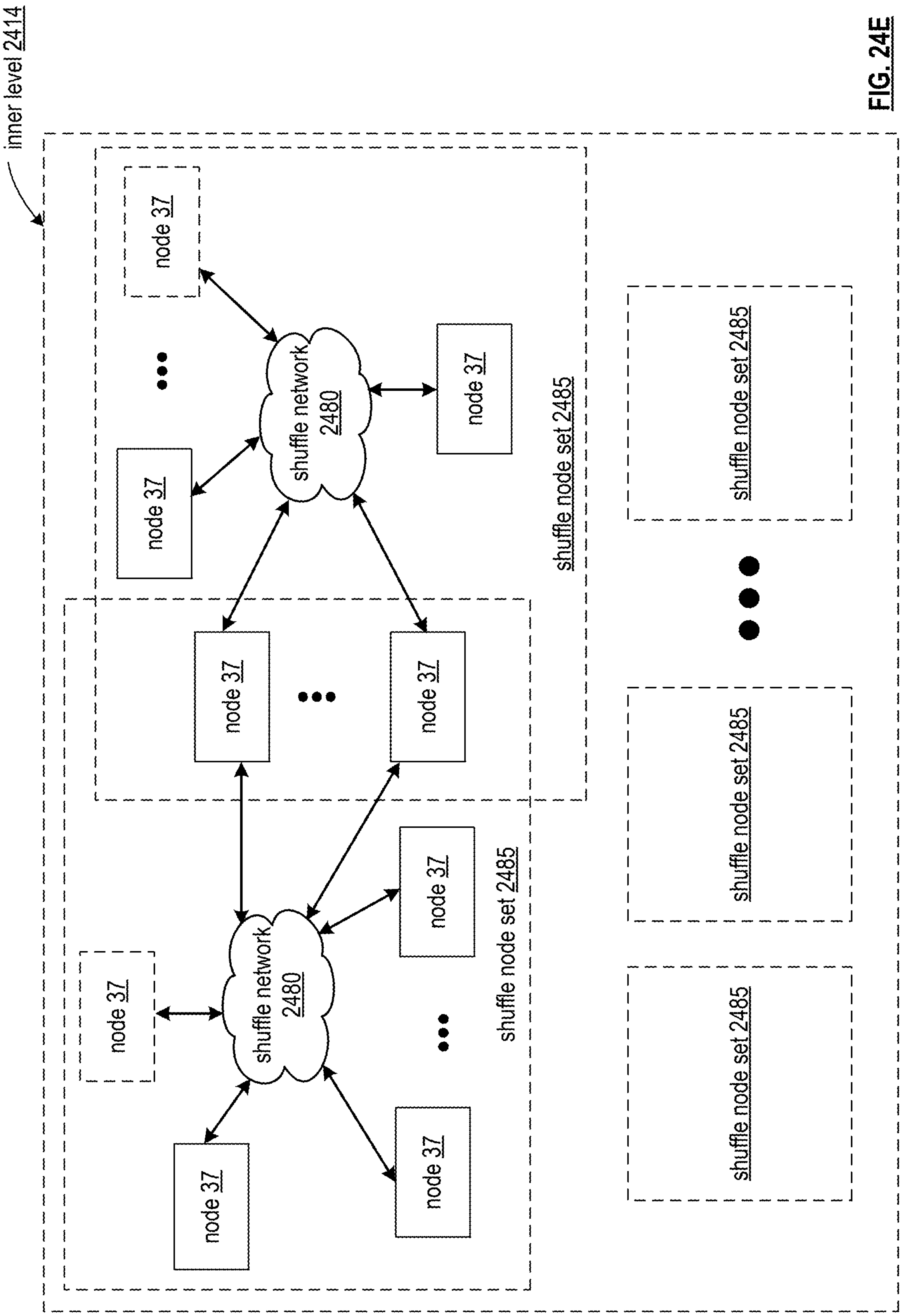
FIG. 24E is a schematic block diagram of shuffle node sets of a query execution plan in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set that do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
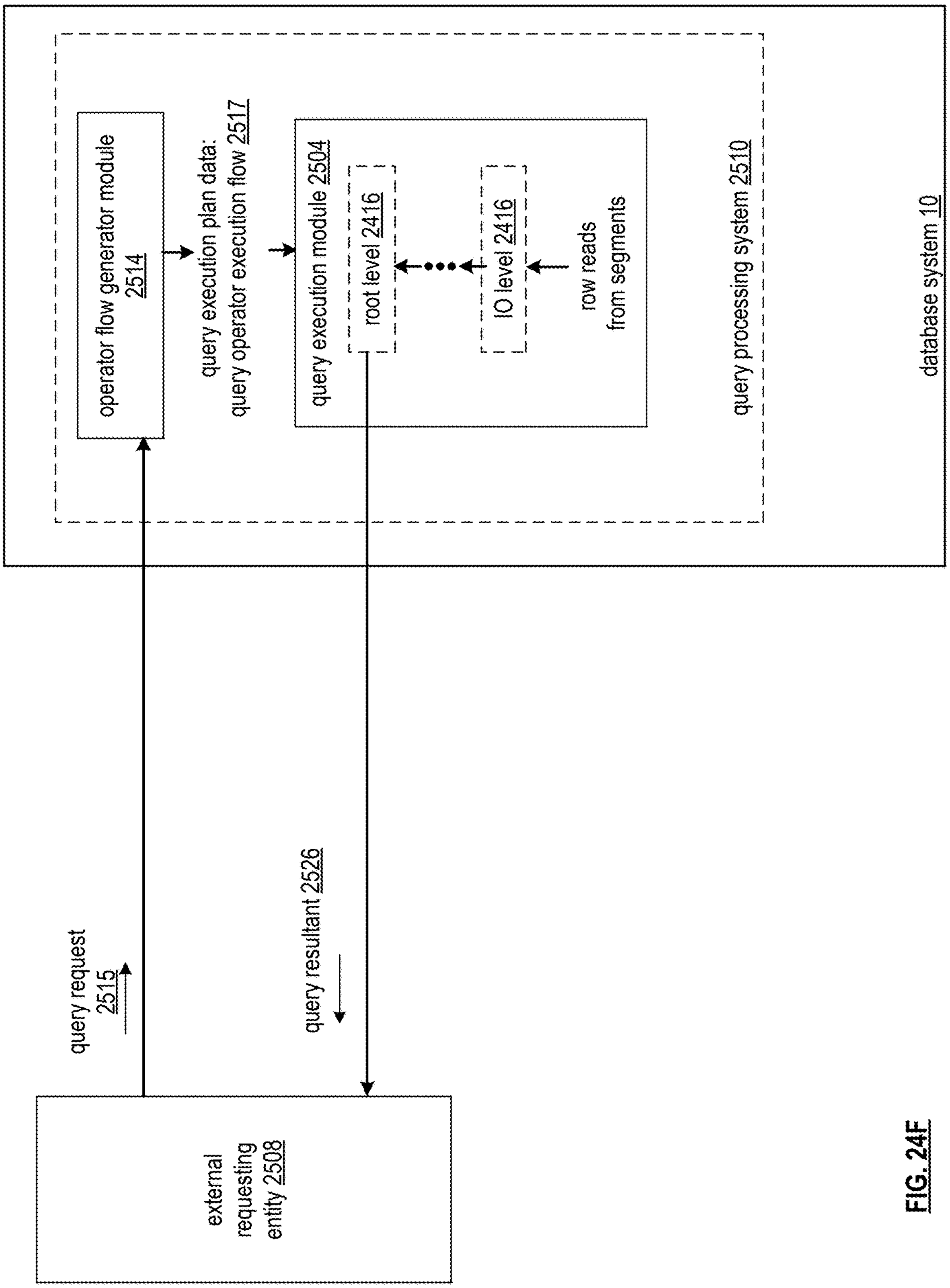
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
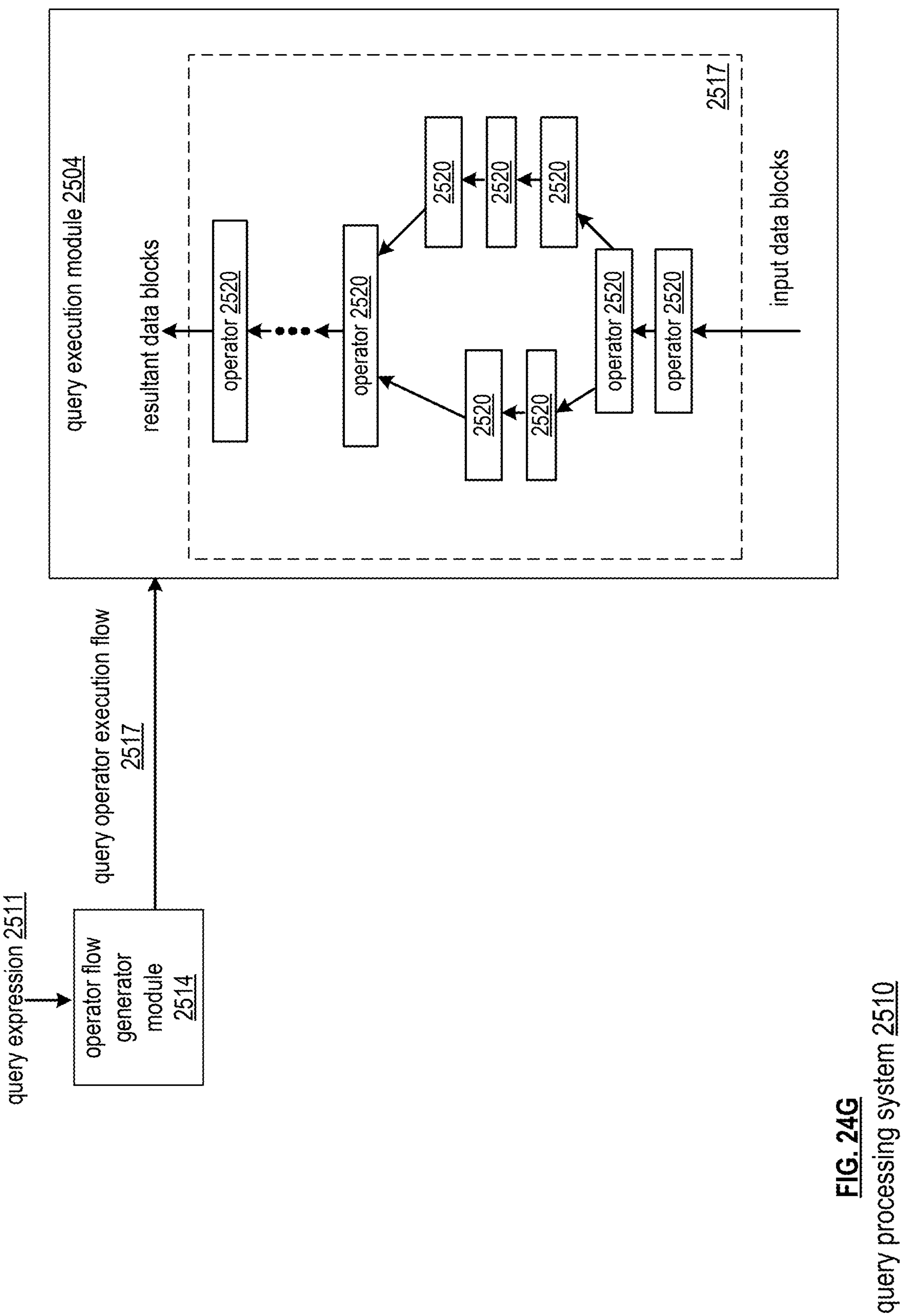
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
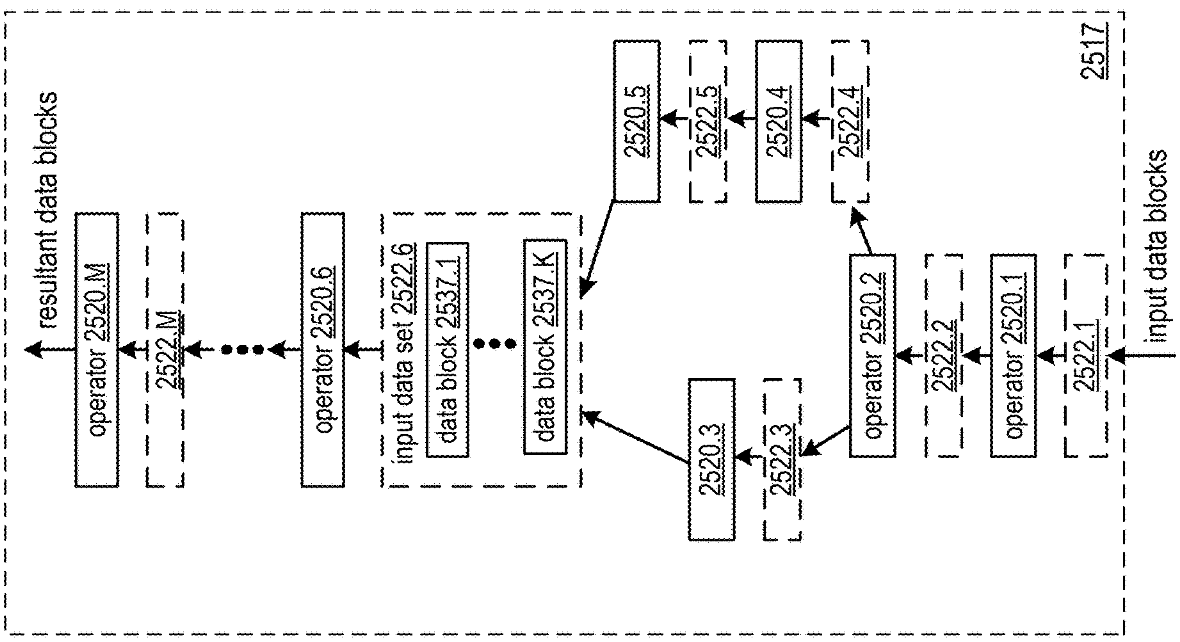
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
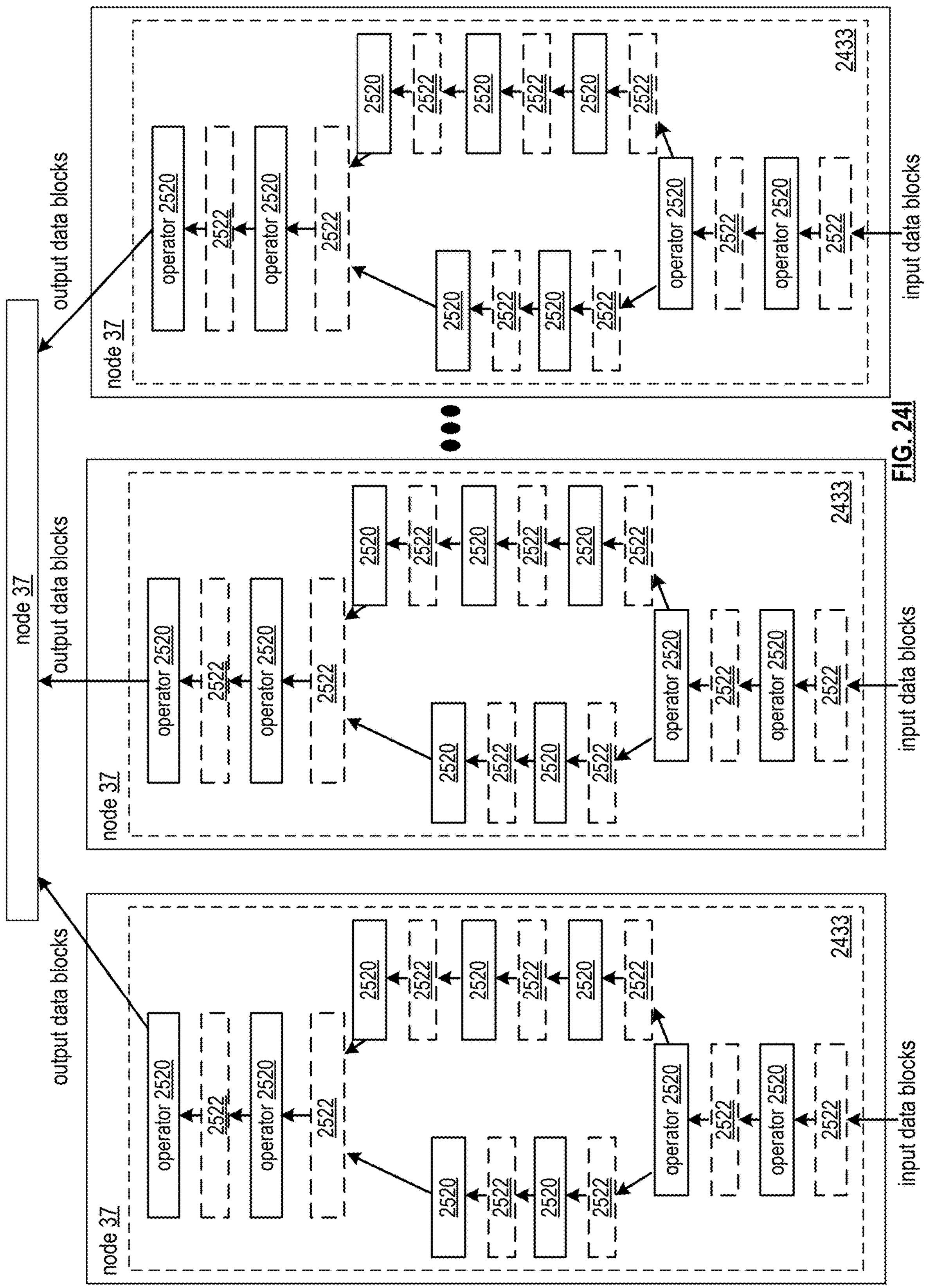
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
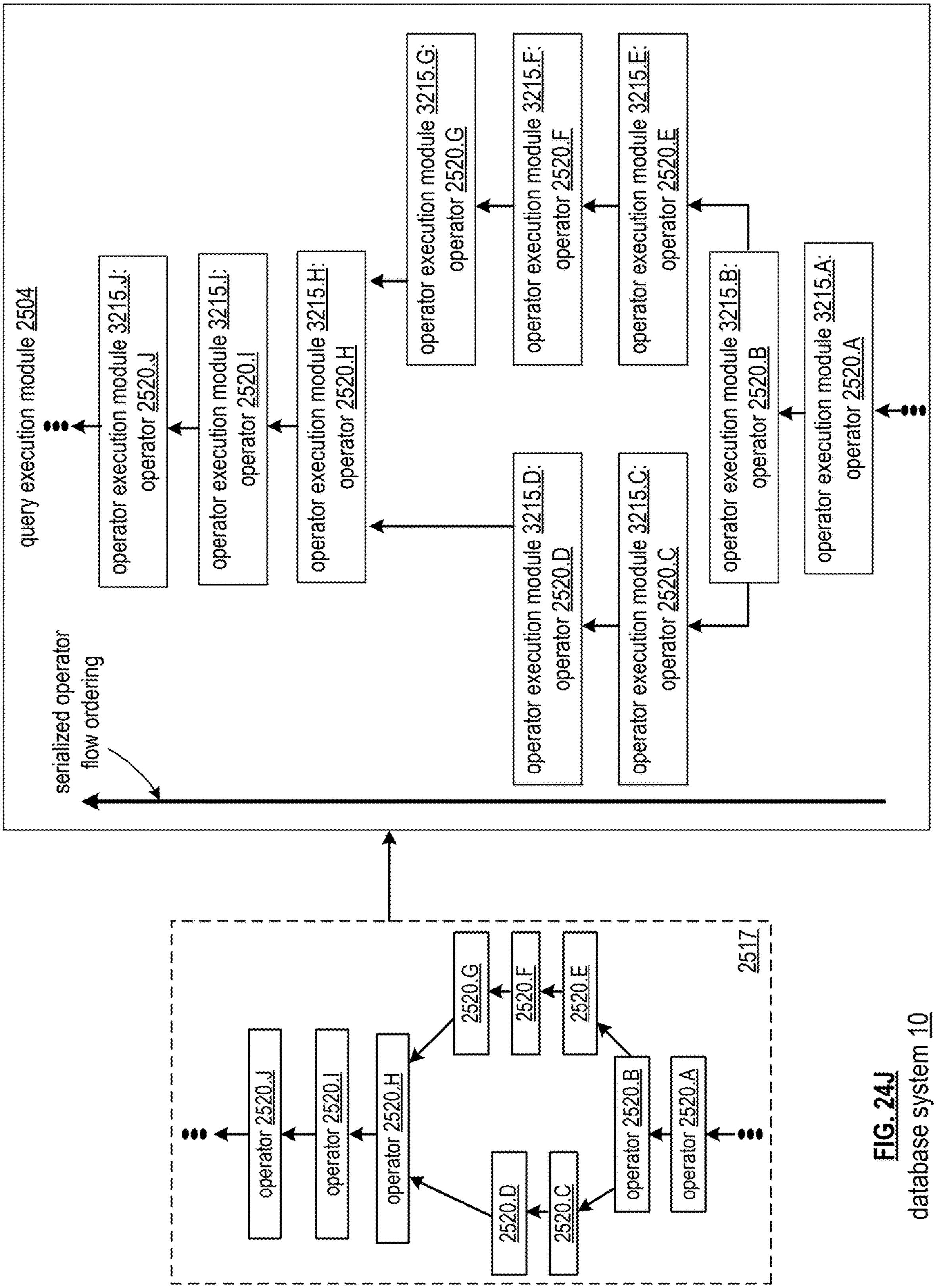
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
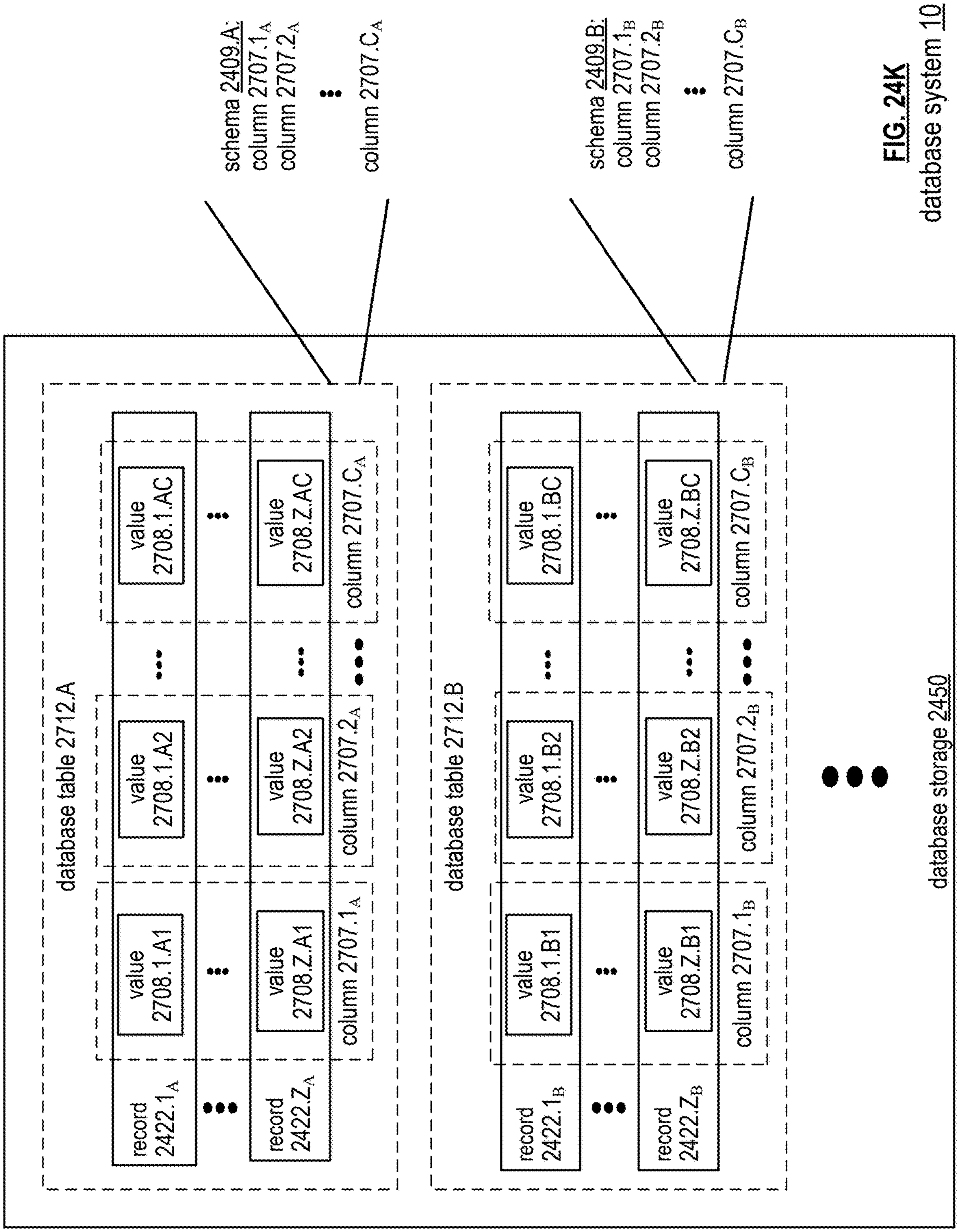
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.$\mathbf{1}_A$-2707.$C_A$ of schema 2709.A for database table 2712.A can have a different number of columns than and/or can have different datatypes for some or all columns of the set of columns 2707.$\mathbf{1}_B$-2707.$C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
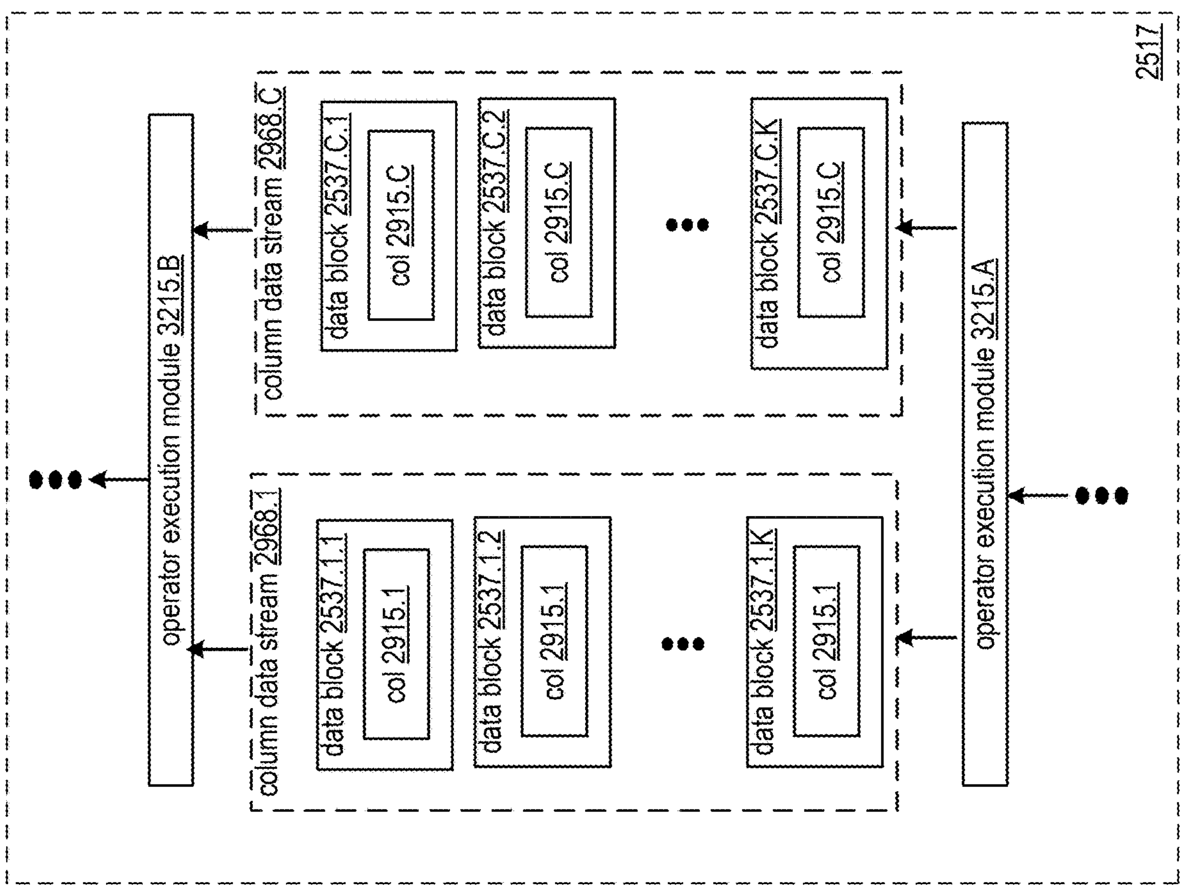
FIG. 24L is a schematic block diagram of a query execution module that implements a plurality of column data streams in accordance with various embodiments.
Figure 24M:
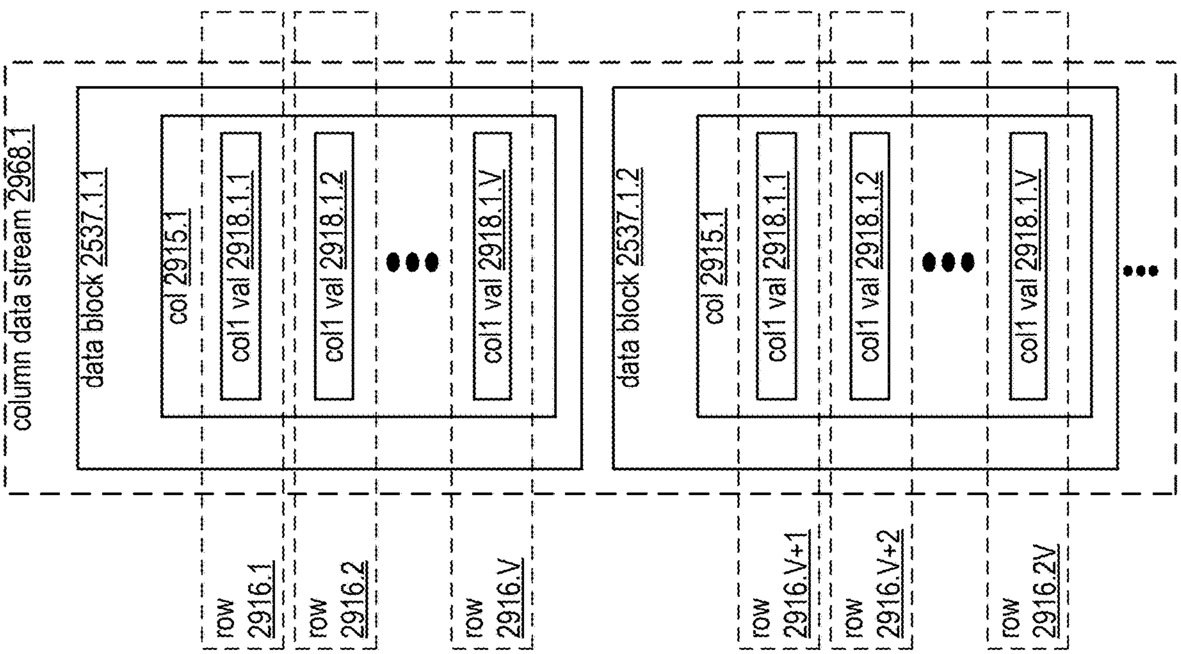
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple columns can be emitted in a same multi-column data stream.

Figure 24N:
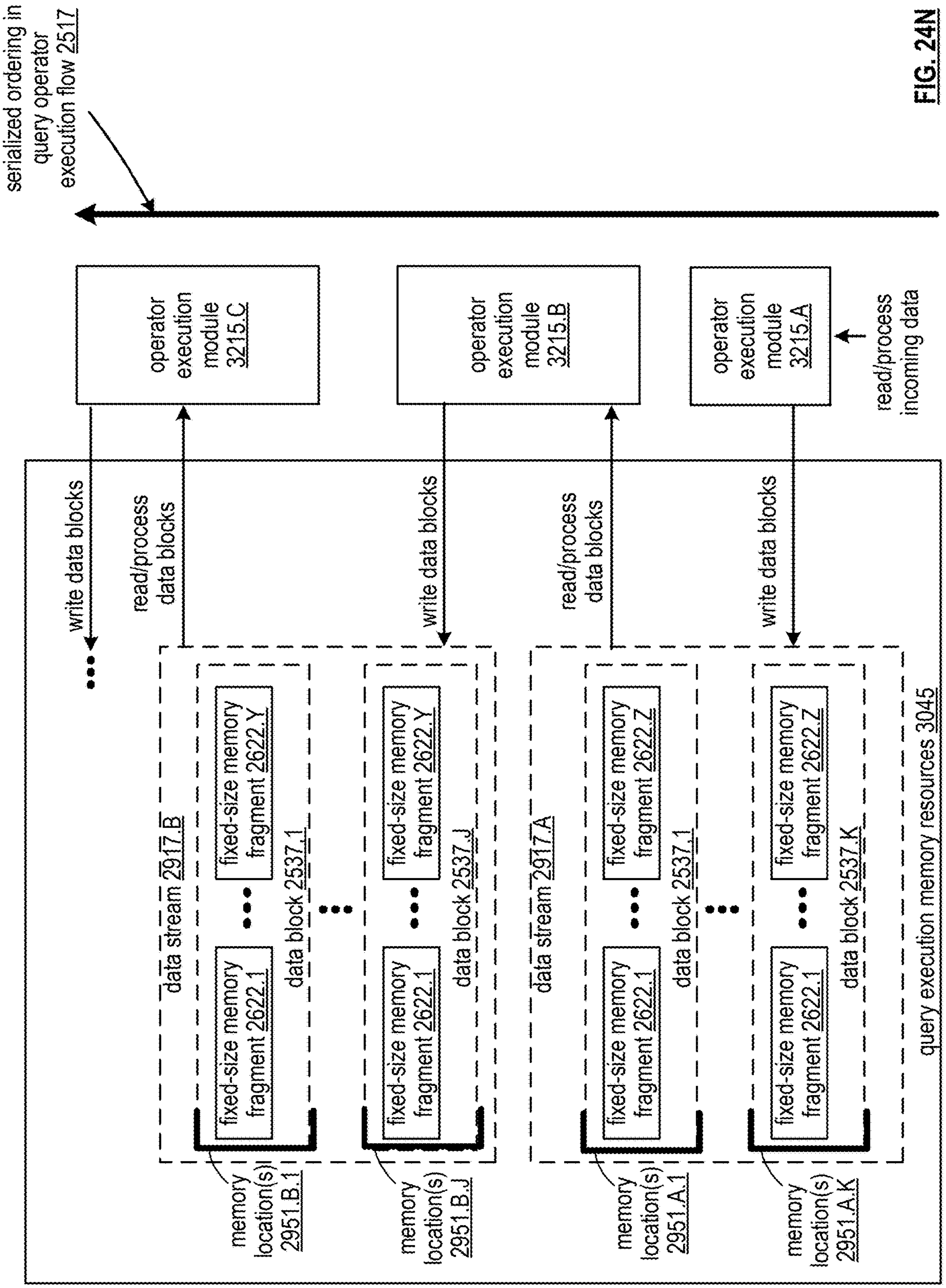
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622. Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 25A:
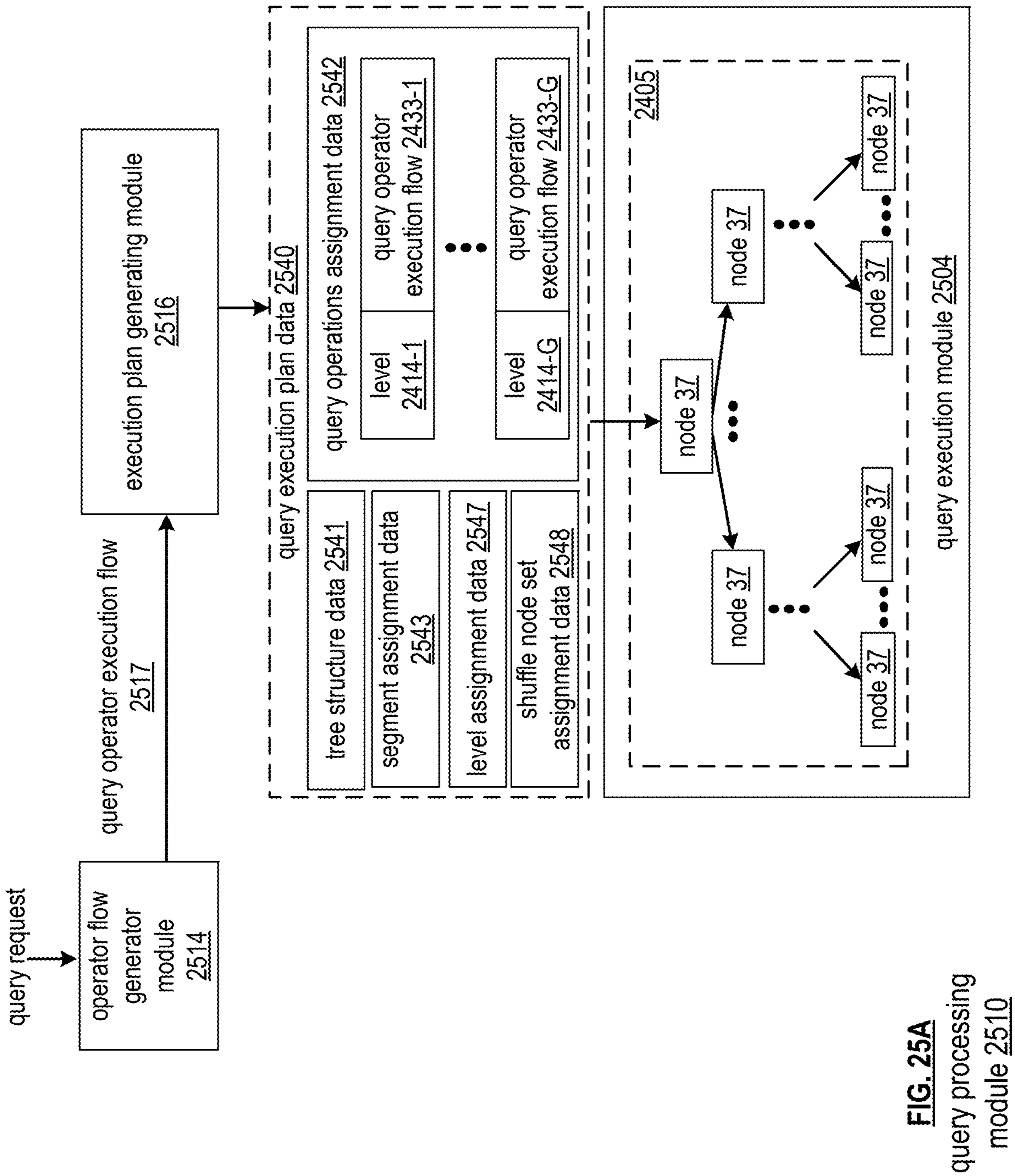
FIG. 25A is a schematic block diagram of a query processing system in accordance with various embodiments.

FIG. 25A illustrates an embodiment of a query processing system 2510 that generates query execution plan data 2540 to be communicated to nodes 37 of the corresponding query execution plan to indicate instructions regarding their participation in the query execution plan 2405. The query processing system 2510 can be utilized to implement, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 25A, an operator flow generator module 2514 of the query processing system 2510 can be utilized to generate a query operator execution flow 2517 for the query indicated in a query request. This can be generated based on a query expression indicated in the query request, based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

An execution plan generating module 2516 can utilize the query operator execution flow 2517 to generate query execution plan data 2540. The query execution plan data 2540 that is generated can be communicated to nodes 37 in the corresponding query execution plan 2405, for example, in the downward fashion in conjunction with determining the corresponding tree structure and/or in conjunction with the node assignment to the corresponding tree structure for execution of the query as discussed previously. Nodes 37 can thus determine their assigned participation, placement, and/or role in the query execution plan accordingly, for example, based on receiving and/or otherwise determining the corresponding query execution plan data 2540, and/or based on processing the tree structure data 2541, query operations assignment data 2542, segment assignment data 2543, level assignment data 2547, and/or shuffle node set assignment data of the received query execution plan data 2540.

The query execution plan data 2540 can indicate tree structure data 2541, for example, indicating child nodes and/or parent nodes of each node 37, indicating which nodes each node 37 is responsible for communicating data block and/or other metadata with in conjunction with the query execution plan 2405, and/or indicating the set of nodes included in the query execution plan 2405 and/or their assigned placement in the query execution plan 2405 with respect to the tree structure. The query execution plan data 2540 can alternatively or additionally indicate segment assignment data 2543 indicating a set of segments and/or records required for the query and/or indicating which nodes at the IO level 2416 of the query execution plan 2405 are responsible for accessing which distinct subset of segments and/or records of the required set of segments and/or records. The query execution plan data 2540 can alternatively or additionally indicate level assignment data 2547 indicating which one or more levels each node 37 is assigned to in the query execution plan 2405. The query execution plan data 2540 can alternatively or additionally indicate shuffle node set assignment data 2548 indicating assignment of nodes 37 to participate in one or more shuffle node sets 2485 as discussed in conjunction with FIG. 24E.

The query execution plan can alternatively or additionally indicate query operations assignment data 2542, for example, based on the query operator execution flow 2517. This can indicate how the query operator execution flow 2517 is to be subdivided into different levels of the query execution plan 2405, and/or can indicate assignment of particular query operator execution flows 2433 to some or all nodes 37 in the query execution plan 2405 based on the overall query operator execution flow 2517. As a particular example, a plurality of query operator execution flows 2433-1-2433-G are indicated to be executed by some or all nodes 37 participating in corresponding inner levels 2414-1-2414-G of the query execution plan. For example, the plurality of query operator execution flows 2433-1-2433-G correspond to distinct serial portions of the query operator execution flow 2517 and/or otherwise renders execution of the full query operator execution flow 2517 when these query operator execution flows 2433 are executed by nodes 37 at the corresponding levels 2414-1-2414-G. If the query execution plan 2405 has exactly one inner level 2414, the query operator execution flow 2433 assigned to nodes 37 at the exactly one inner level 2414 can correspond to the entire query operator execution flow 2517 generated for the query.

A query execution module 2502 of the query processing system 2510 can include a plurality of nodes 37 that implement the resulting query execution plan 2405 in accordance with the query execution plan data 2540 generated by the execution plan generating module 2516. Nodes 37 of the query execution module 2502 can each execute their assigned portion query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2502 can be utilized to implement the parallelized query and results sub-system 13 and/or the parallelized data store, receive and/or process sub-system 12.

Figure 25B:
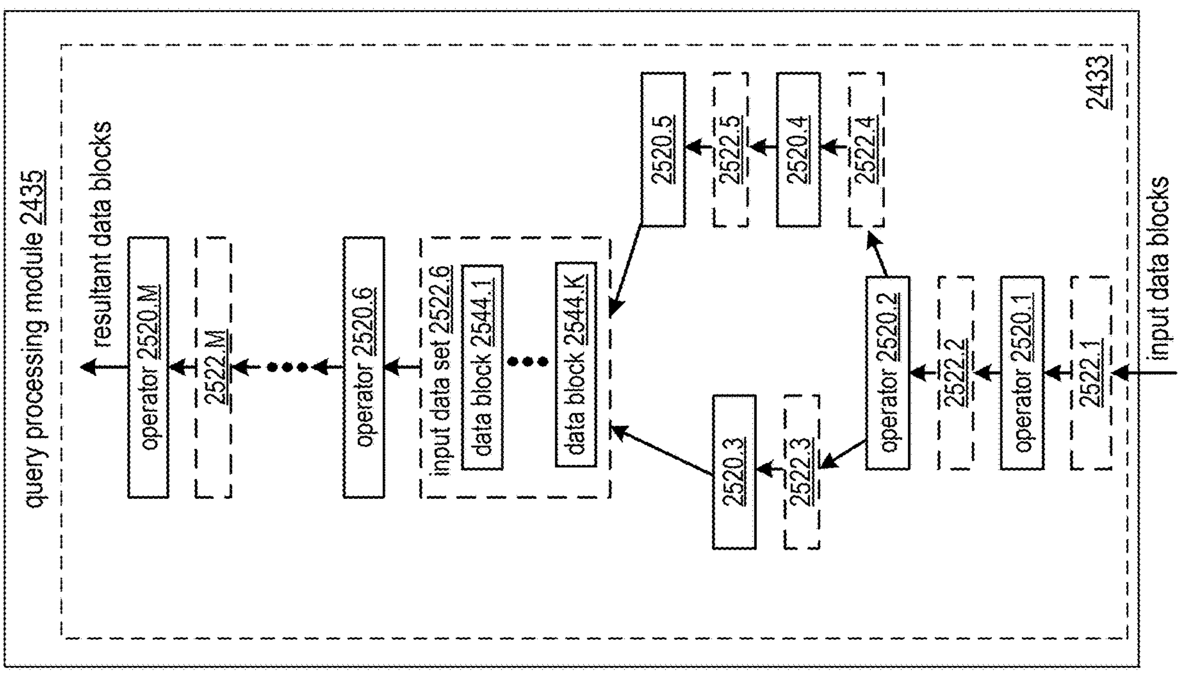
FIG. 25B is a schematic block diagram of a query operator execution flow in accordance with various embodiments.

FIG. 25B presents an example embodiment of a query processing module 2435 of a node 37 that executes a query's query operator execution flow 2433. The query processing module 2435 of FIG. 25B can be utilized to implement the query processing module 2435 of node 37 in FIG. 24B and/or to implement some or all nodes 37 at inner levels 2414 of a query execution plan 2405 of FIG. 24A and/or implemented by the query execution module 2502 of FIG. 25A.

Each node 37 can determine the query operator execution flow 2433 for its execution of a given query based on receiving and/or determining the query execution plan data 2540 of the given query. For example, each node 37 determines its given level 2410 of the query execution plan 2405 in which it is assigned to participate based on the level assignment data 2547 of the query execution plan data 2540. Each node 37 further determines the query operator execution flow 2433 corresponding to its given level in the query execution plan data 2540. Each node 37 can otherwise determine the query operator execution flow 2433 to be implemented based on the query execution plan data 2540, for example, where the query operator execution flow 2433 is some or all of the full query operator execution flow 2517 of the given query.

The query processing module 2435 of node 37 can execute the determined query operator execution flow 2433 by performing a plurality of operator executions of operators 2520 of its query operator execution flow 2433 in a corresponding plurality of sequential operator execution steps. Each operator execution step 2540 of the plurality of sequential operator execution steps corresponds to execution of a particular operator 2520 of a plurality of operators 2520-1-2520-M of a query operator execution flow 2433. In some embodiments, the query processing module 2435 is implemented by a single node 37, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2433 to input data blocks received from other nodes and/or retrieved from memory as read and/or recovered records. In such cases, the entire query operator execution flow 2517 determined for the query as a whole can be segregated into multiple query operator execution flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module

2502 to execute a corresponding query, for example, to perform the entire query operator execution flow 2517 of the query as a whole.

The query processing module 2435 to perform a single operator execution by executing one of the plurality of operators of the query operator execution flow 2433. As used herein, an operator execution corresponds to executing one operator 2520 of the query operator execution flow 2433 on one or more pending data blocks 2544 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2544 in the operator input data set 2522 were outputted by the one or more other operators 2520 that are immediately below the particular operator via one or more corresponding operator executions of one or more previous operator execution steps in the plurality of sequential operator execution steps. Pending data blocks 2544 of an operator input data set 2522 can be ordered, for example as an ordered queue, based on an ordering in which the pending data blocks 2544 are received by the operator input data set 2522. Alternatively, an operator input data set 2522 is implemented as an unordered set of pending data blocks 2544.

If the particular operator 2520 is executed for a given one of the plurality of sequential operator execution steps, some or all of the pending data blocks 2544 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2544 to generate one or more output data blocks, this data block is removed from the operator's operator input data set 2522. In some cases, an operator selected for execution is automatically executed upon all pending data blocks 2544 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 25A, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2544 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2544. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2433 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in the same shuffle node set 2485 as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in the same shuffle node set 2485 as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in the shuffle node set 2485 all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in the same shuffle node set 2485 as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in the shuffle node set 2485 based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Figure 25C:
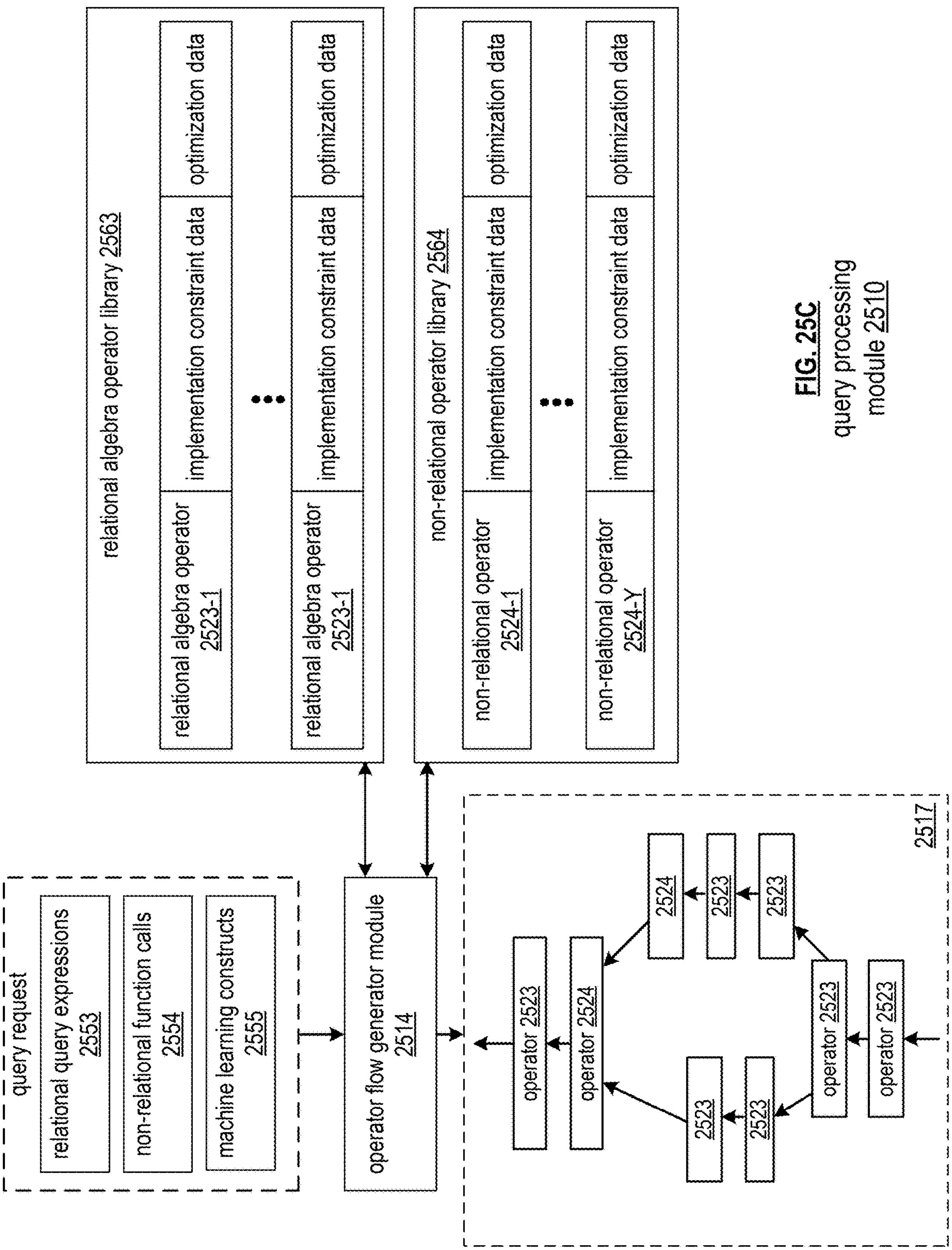
FIG. 25C is a schematic block diagram of a query processing system in accordance with various embodiments.

FIG. 25C illustrates an embodiment of a query processing system 2510 that facilitates decentralized query executions utilizing a combination of relational algebra operators and non-relational operators. This can enable the query processing system 2510 to perform non-traditional query executions beyond relational query languages such as the Structured Query Language (SQL) and/or beyond other relational query execution by utilizing non-relational operators in addition to traditional relational algebra operators of queries performed upon relational databases. This can be ideal to enable training and/or implementing of various machine learning models upon data stored by database system 10. This can be ideal to alternatively or additionally enable execution of mathematical functions upon data stored by database system 10 that cannot traditionally be achieved via relational algebra. The query processing system 2510 of FIG. 25C can be utilized to implement the query processing system 2510 of FIG. 25A, and/or any other embodiment of query processing system 2510 discussed herein. The query processing system 2510 of FIG. 25C can otherwise be utilized to enable query executions upon any embodiments of the database system 10 discussed herein.

As discussed previously, decentralizing query execution, for example, via a plurality of nodes 37 of a query execution plan 2405 implemented by a query execution module 2502, can improve efficiency and performance of query execution, especially at scale where the number of records required to be processed in query execution is very large. However, in cases where machine learning models are desired to be built and/or implemented upon a set of records stored by a database system, other database systems necessitate the centralizing of these necessary records and executing the necessary training and/or inference function of the machine learning model accordingly on the centralized data. In particular, these machine learning models may be treated as a "black box" are implemented as an unalterable program that therefore must be performed upon centralized data. Even in cases where the set of records is retrieved by performing a relational query based on parameters filtering the set of records from all records stored by the database system, the machine learning models can only be applied after the corresponding query is executed, even if executed in a decentralized manner as discussed previously, upon the centralized resultant that includes the set of records. Other database systems may similarly require execution of other mathematical functions such as derivatives, fractional derivatives, integrals, Fourier transforms, Fast Fourier Transforms (FFTs), matrix operations, other linear algebra functionality, and/or other non-relational mathematical functions upon centralized data, as these functions similarly cannot be implemented via the traditional relational operators of relational query languages.

The query processing system 2510 of FIG. 25C improves database systems by enabling the execution efficiency achieved via decentralized query execution for execution of machine learning models and/or other non-relational mathematical functions. Rather than requiring that the required set of records first be retrieved from memories of various nodes 37 and centralize, and then applying the machine learning model and/or non-relational mathematical functions to the centralized set of records, the query processing system 2510 of FIG. 25C can enable decentralized query executions to implement executions of machine learning functions and/or non-relational mathematical functions instead of or in addition to decentralized query executions that implement traditional relational queries. This ability to maintain decentralized execution, even when non-relational functionality is applied, improves efficiency of executing non-relational functions upon data stored by database systems, for example, in one or more relational databases of a database system 10.

This decentralization of implementing machine learning models and/or other non-relational mathematical functions can be achieved by implementing the linear algebra constructs that are necessary to implement these machine learning models and/or other these other non-relational mathematical functions as one or more additional operators. These non-relational operators can be treated in a similar fashion as the traditional relational operators utilized to implement traditional relational algebra in relational query execution. These non-relational operators can be implemented via custom operators that are known to the operator flow generator module 2514 and/or that can be included in the query operator execution flow 2517 generated by the operator flow generator module 2514. For example, the query operator execution flow 2517 can include one or more non-relational operators instead of or in addition to one or more relational operators.

The query execution plan data 2540 can be generated to indicate the query operator execution flow 2517 as one or more query operator execution flows 2433 to be applied by sets of nodes 37 at one or more corresponding levels 2410 of the query execution plan, where one or more query operator execution flows 2433-1-2433-G includes at least one non-relational operator. Thus, at least one node 37, such as some or all nodes at one or more inner levels 2414 of the query execution plan, perform their assigned query operator execution flows 2433 by performing at least one non-relational operator instead of or in addition to performing one or more relational algebra operators. The operator flow generator module 2514 can implement an optimizer as discussed in conjunction with FIG. 25A to select and/or arrange the non-relational operators in query operator execution flow 2517 in accordance with optimizer functionality. For example, the query operator execution flow 2517 is selected such that the non-relational operators are arranged in an optimal fashion and/or is selected based on being determined to be more optimal than one or more other options.

An example of such an embodiment of query processing system 2510 is illustrated in FIG. 25C. The operator flow generator module 2514 can receive a query request that includes and/or indicates one or more relational query expressions 2553, one or more non-relational function calls 2554, and/or one or more machine learning constructs 2555. The operator flow generator module 2514 can generate a query operator execution flow 2517 to implement the one or more relational query expressions 2553, one or more non-relational function calls 2554, and/or one or more machine learning constructs 2555 of the given query expression. The query request can indicate the one or more relational query expressions 2553, one or more non-relational function calls 2554, and/or one or more machine learning constructs 2555, for example, as a single command and/or in accordance with a same programming language, where these different constructs 2553, 2554 and/or 2555 can be nested and/or interwoven in the query request rather than being distinguished individually and/or separately. For example, a single query expression included in the query request can indicate some or all of the one or more relational query expressions 2553, the one or more non-relational function calls 2554, and/or the one or more machine learning constructs 2555 of the query.

The resulting query operator execution flow 2517 can include a combination of relational algebra operators 2523 and/or non-relational operators 2524 in a serialized ordering with one or more parallelized tracks to satisfy the given query request. Various relational algebra operators 2523 and/or non-relational operators 2524 can be utilized to implement some or all of the operators 2520 of FIG. 25B. Note that some combinations of multiple non-relational operators 2524 and/or multiple relational algebra operators 2523, for example, in a particular arrangement and/or ordering, can be utilized to implement particular individual function calls indicated in query expressions 2553, machine learning constructs 2555, and/or non-relational function calls 2554.

The query operator execution flow 2517 depicted in FIG. 25C serves as an example query operator execution flow 2517 to illustrate that the query operator execution flow 2517 can have multiple parallel tracks, can have a combination of relational algebra operators 2523 and/or non-relational operators 2524, and that the relational algebra operators 2523 and/or non-relational operators 2524 can be interleaved in the resulting serialized ordering. Other embodiments of the resulting query operator execution flow 2517 can have different numbers of relational algebra operators 2523 and/or non-relational operators 2524, can have different numbers of parallel tracks, can have multiple serial instances of sets of multiple parallel tracks in the serialized ordering, can have different arrangements of the relational algebra operators 2523 and/or non-relational operators 2524, and/or can otherwise have any other combination and respective ordering of relational algebra operators 2523 and non-relational operators 2524 in accordance with the corresponding query request. Some query operator execution flows 2517 for some queries may have only relational algebra operators 2523 and no non-relational operators 2524, for example, based on the query request not requiring use of linear algebra functionality. Some query operator execution flows 2517 for some queries may have only non-relational operators 2524 and no relational algebra operators 2523, for example, based on the query request not requiring use of relational algebra functionality.

The operator flow generator module 2514 can generate a query operator execution flow 2517 by accessing a relational algebra operator library 2563 that includes information regarding a plurality of relational algebra operators 2523-1-2523-X that can be included in query operator execution flows 2517 for various query requests and/or by accessing a non-relational operator library 2564 that includes information regarding a plurality of non-relational operators 2524-1-2524-Y that can be included in query operator execution flows 2517 for various query requests. The relational algebra operator library 2563 and/or the non-relational operator library 2564 can be stored and/or implemented by utilizing at least one memory of the query processing system 2510 and/or can be integrated within the operational instructions utilized to implement the operator flow generator module 2514. Some or all relational algebra operators 2523 of the relational algebra operator library 2563 and/or some or all non-relational operators 2524 of the non-relational operator library 2564 can be mapped to and/or can indicate implementation constraint data and/or optimization data that can be utilized by the operator flow generator module 2514.

The implementation constraint data can indicate rules and/or instructions regarding restrictions to and/or requirements for selection and/or arrangement of the corresponding operator in a query operator execution flow 2517. The optimization data can indicate performance information, efficiency data, and/or other information that can be utilized by an optimizer implemented by the operator flow generator module 2514 in its selection and/or arrangement of the corresponding operator in a query operator execution flow 2517. The library can further indicate particular function names, parameters and/or expression grammar rules, for example, to map each operator and/or combinations of operators to particular function names or other information identifying the corresponding operator be used based on being indicated in a relational query expression 2553, non-relational function call 2554, and/or machine learning construct 2555. The library 2563 and/or 2564 can further indicate configurable function parameters and how they be applied to the corresponding operator 2523 and/or 2524, for example, where particular parameters to be applied are indicated in the query request and/or are otherwise determined based on the query request and are applied to the corresponding function accordingly.

The set of relational algebra operators 2523-1-2523-X of the relational algebra operator library 2563 can include some or all traditional relational algebra operators that are included in or otherwise utilized to implement traditional relational algebra query expressions for execution as relational queries upon relational databases. For example, some or all SQL operators or operators of one or more other relational languages can be included in the relational algebra operator library 2563. This can include SELECT operators and corresponding filtering clauses such as WHERE clauses of relational query languages; aggregation operations of relational query languages such as min, max, avg, sum, and/or count; joining and/or grouping functions of relational query languages such as JOIN operators, ORDER BY operators, and/or GROUP BY operators; UNION operators; INTERSECT operators; EXCEPT operators; and/or any other relational query operators utilized in relational query languages.

The set of non-relational operators 2524-1-2524-Y of the non-relational operator library 2564 can include operators and/or sets of multiple operators that can be included in query operator execution flow 2517 that implement non-relational functionality, and can be distinct from the relational algebra operators 2523-1-2523X of the relational algebra operator library 2563. As used herein, the non-relational operators 2524-1-2524-Y can correspond to non-relational algebra operators, such as operators that cannot be implemented via traditional relational query constructs and/or operators that are otherwise distinct from traditional-query constructs.

The non-relational operators 2524-1-2524-Y can include one or more operators utilized to implement non-relational mathematical functions such as derivatives, fractional derivatives, integrals, Fourier transforms and/or FFTs. For example, one or more non-relational operators 2524-1-2524-Y utilized to implement derivatives, fractional derivatives, and/or integrals can be based on a relational window operator, can include a relational window operator as one of a set of multiple operators, and/or can include a customized, non-relational window operator implemented to execute derivatives, fractional derivatives, and/or integrals.

The non-relational operators 2524-1-2524-Y can include one or more operators utilized to implement supervised machine learning models such as linear regression, logistic regression, polynomial regression, other regression algorithms, Support Vector Machines (SVMs), Naive Bayes, nearest neighbors algorithms such as K-nearest neighbors, other classification algorithms, and/or other supervised machine learning models. This can include one or more operators utilized to implement unsupervised algorithms such as clustering algorithms, which can include K-means clustering, mean-shift clustering, and/or other clustering algorithms. This can include one or more operators utilized to implement machine learning models such as neural networks, deep neural networks, convolutional neural networks, and/or decision trees, and/or random forests.

The non-relational operators 2524-1-2524-Y can include a set of linear algebra operators that implement linear algebra functionality. This can include linear algebra operators that are implemented to be executed by utilizing vectors and/or matrices as input. These vectors and/or matrices can be stored by the database system 10 and/or can be generated as intermediate output via execution of another linear algebra operator in a query operator execution flow 2433. For example, some or all of these vectors and/or matrices can be based on and/or be implemented as records 2422. In some cases, vectors can correspond to rows of a relational database stored by database system 10, where the field values of these rows correspond to values populating the vectors. Similarly, a matrix can correspond to one or more rows of a relational database stored by database system, where a number of fields of each row correspond to a first dimensionality of the matrix and where a number of rows represented by the matrix correspond to a second dimensionality of the matrix. Intermediate result sets of the linear algebra operators can correspond to scalar, vector, and/or matrix values that can be stored, returned, and/or utilized as input to an input data set 2522 of subsequent operators in a query operator execution flow 2433. The set of linear algebra operators can correspond to one or more operators utilized to implement: matrix multiplication, matrix inversion, matrix transpose, matrix addition, matrix decomposition, matrix determinant, matrix trace, and/or other matrix operations utilizing one or more matrices as input. For example, the one or more matrices are indicated in data blocks of the input data set 2522 of a corresponding linear algebra operator. Matrix multiplication operators can include a first one or more operators utilized to implement multiplication of a matrix with a scalar and/or can include a second one or more operators utilized to implement multiplication of a matrix with another matrix. Multiple linear algebra operators can be included in query operator execution flows 2517 instead of or in addition to one or more relational operators 2523, via the operator flow generator module 2514, to execute the non-relational function calls 2554 and/or the machine learning constructs 2555 that require some or all of this matrix functionality. In some cases, all non-relational operators 2524 of a query operator execution flow 2517 are included in the set of linear algebra operators.

In various embodiments, the set of non-relational operators 2524-1-2524-Y and/or any other non-relational functionality discussed herein, can be implemented via any features and/or functionality of the set of non-relational operators 2524-1-2524-Y, and/or other non-relational functionality, disclosed U.S. by Utility application Ser. No. 16/838,459, entitled "IMPLEMENTING LINEAR ALGEBRA FUNCTIONS VIA DECENTRALIZED EXECUTION OF QUERY OPERATOR FLOWS", filed Apr. 2, 2020, which is hereby incorporated herein by reference in its entirety and made part of the present U.S. Utility Patent Application for all purposes.

For example, the set of non-relational operators 2524-1-2524-Y can include a loop operator, such as the replay operator of U.S. Utility application Ser. No. 16/838,459. In some embodiments, the loop operator can be utilized in query operator execution flows 2517 to implement regression or other machine learning and/or mathematical constructs. As another example, the set of non-relational operators 2524-1-2524-Y can include a randomizer operator that randomizes input data, which may otherwise have an inherent ordering and/or pattern utilized in efficient storage and/or retrieval of records in one or more segments, for use in machine learning models. As another example, the set of non-relational operators 2524-1-2524-Y can include one or more custom-join operators, such as one or more custom-join operators of U.S. Utility application Ser. No. 16/838,459. In some embodiments, the custom-join operators are different from a relational JOIN operator of the relational algebra operator library 2563. As another example, the set of non-relational operators 2524-1-2524-Y can be utilized to implement a K-nearest neighbors classification algorithm, such as the K-nearest neighbors classification algorithm of U.S. Utility application Ser. No. 16/838,459. In some embodiments, the K-nearest neighbors classification algorithm can be implemented utilizing a KNN-join operator of the non-relational operator library 2564.

In some cases, at least one non-relational operator 2524 of the non-relational operator library 2564 utilizes a set of other operators of the non-relational operator library 2564 and/or the relational algebra operator library 2563. For example, a complex non-relational operator of the non-relational operator library 2564 can be built from a plurality of other operators 2523 and/or 2524, such as primitive operators 2523 and/or 2524 that include only one operator and/or other complex operators 2523 and/or 2524 that are built from primitive operators. The complex non-relational operator can correspond to a function built from the operators in non-relational operator library 2564 and/or the relational algebra operator library 2563. Such a complex non-relational operator 2524 can be included in the query operator execution flow to indicate operator executions for its set of operators 2523 and/or 2524. The operator executions for its set of operators 2523 and/or 2524 can be arranged in the query operator execution flow in accordance with a predefined nesting and/or ordering based on the corresponding functionality of the complex non-relational operator 2524, and/or can be arranged based on the optimizer being applied, for example, where some of the set of operators 2523 and/or 2524 of the complex non-relational operator are separated and/or rearranged in the query operator execution flow based on the optimizer, but still perform the corresponding functionality of the complex non-relational operator 2524 when the query operator execution flow as a whole is executed.

Figure 25D:
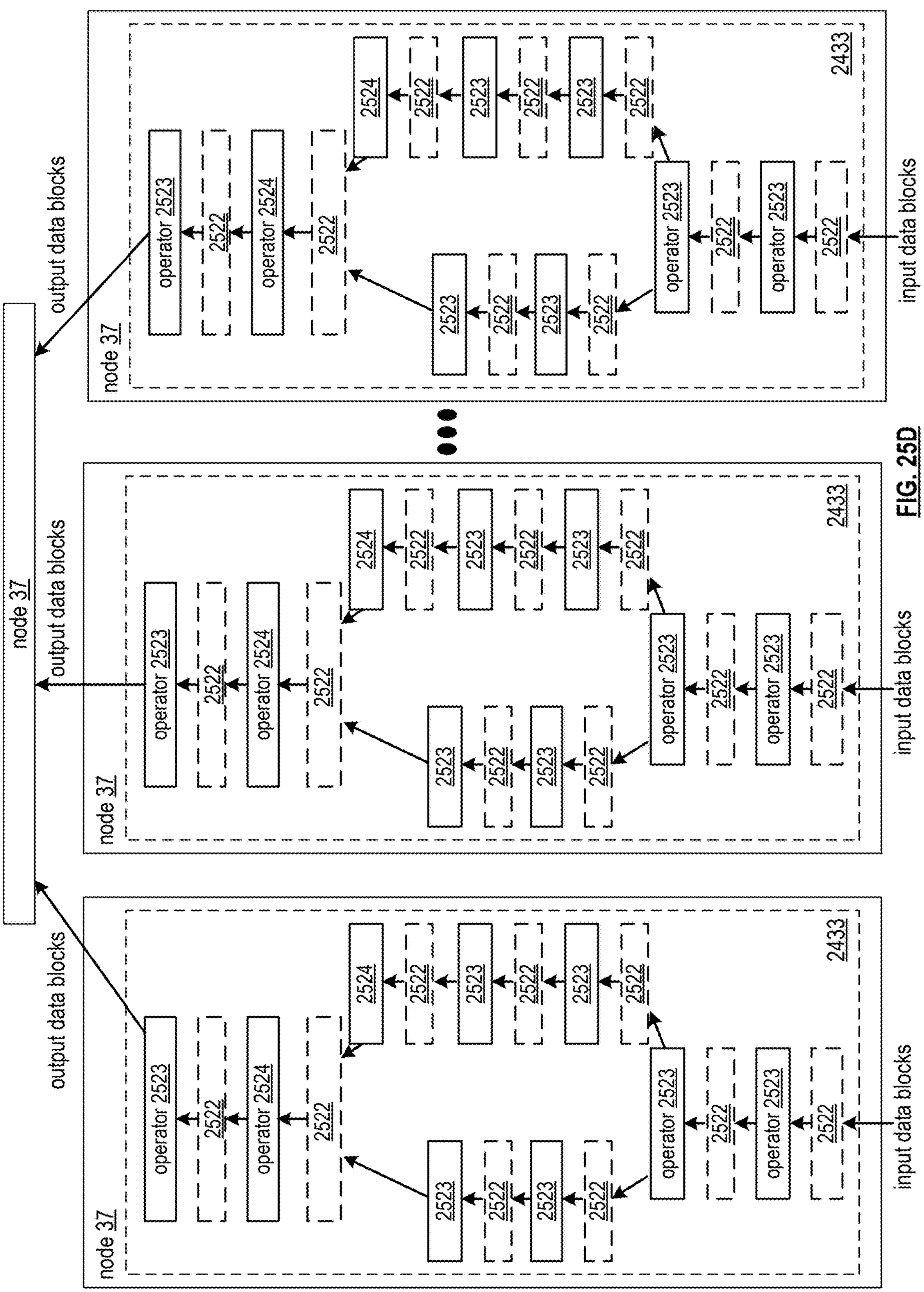
FIG. 25D is a schematic block diagram of a plurality of nodes that utilize query operator execution flows in accordance with various embodiments.

FIG. 25D illustrates an example embodiment of multiple nodes 37 that utilize a query operator execution flow 2433 with a combination of relational algebra operators 2523 and non-relational operators 2524. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data 2540 for the corresponding query that indicates the query operator execution flow 2433 to be performed by these nodes 37 in accordance with their participation at a corresponding inner level 2414 of the corresponding query execution plan 2405 as discussed in conjunction with FIG. 25A. This query operator execution flow 2433 utilized by the multiple nodes can be the full query operator execution flow 2517 generated by the operator flow generator module 2514 of FIG. 25A and/or FIG. 25C. This query operator execution flow 2433 can alternatively include a sequential proper subset of operators from the query operator execution flow 2517 generated by the operator flow generator module 2514 of FIG. 25A and/or FIG. 25C, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 25B. This can include performing an operator execution upon input data sets 2522 of a corresponding operator 2523 and/or 2524, where the output of the operator execution is added to an input data set 2522 of a sequentially next operator 2523 and/or 2524 in the operator execution flow, as discussed in conjunction with FIG. 25B, where the operators 2523 and/or 2524 of the query operator execution flow 2433 are implemented as operators 2520 of FIG. 25B. Some or operators 2523 and/or 2524 can correspond to blocking operators that must have all required input data blocks generated via one or more previous operators before execution. Each query processing module can receive, store in local memory, and/or otherwise access and/or determine necessary operator instruction data for operators 2523 and/or 2524 indicating how to execute the corresponding operators 2523 and/or 2524. For example, some or all information of relational algebra operator library 2563 and/or non-relational operator library 2564 can be sent by the query processing module to a plurality of nodes of the database system 10 to enable the plurality of nodes 37 to utilize their query processing module 2435 to execute corresponding operators 2523 and/or 2524 received in query operator execution flows 2433 for various queries.

In various embodiments, a query processing system includes at least one processor and a memory that stores operational instructions that, when executed by the at least one processor, cause the query processing system to determine a query request that indicates a plurality of operators, where the plurality of operators includes at least one relational algebra operator and further includes at least one non-relational operator. The query processing system generates a query operator execution flow from the query request that indicates a serialized ordering of the plurality of operators. The query processing system generates a query resultant of the query by facilitating execution of the query via a set of nodes of a database system that each perform a plurality of operator executions in accordance with the query operator execution flow, where a subset of the set of nodes each execute at least one operator execution corresponding to the at least one non-relational operator in accordance with the execution of the query.

Figure 25E:
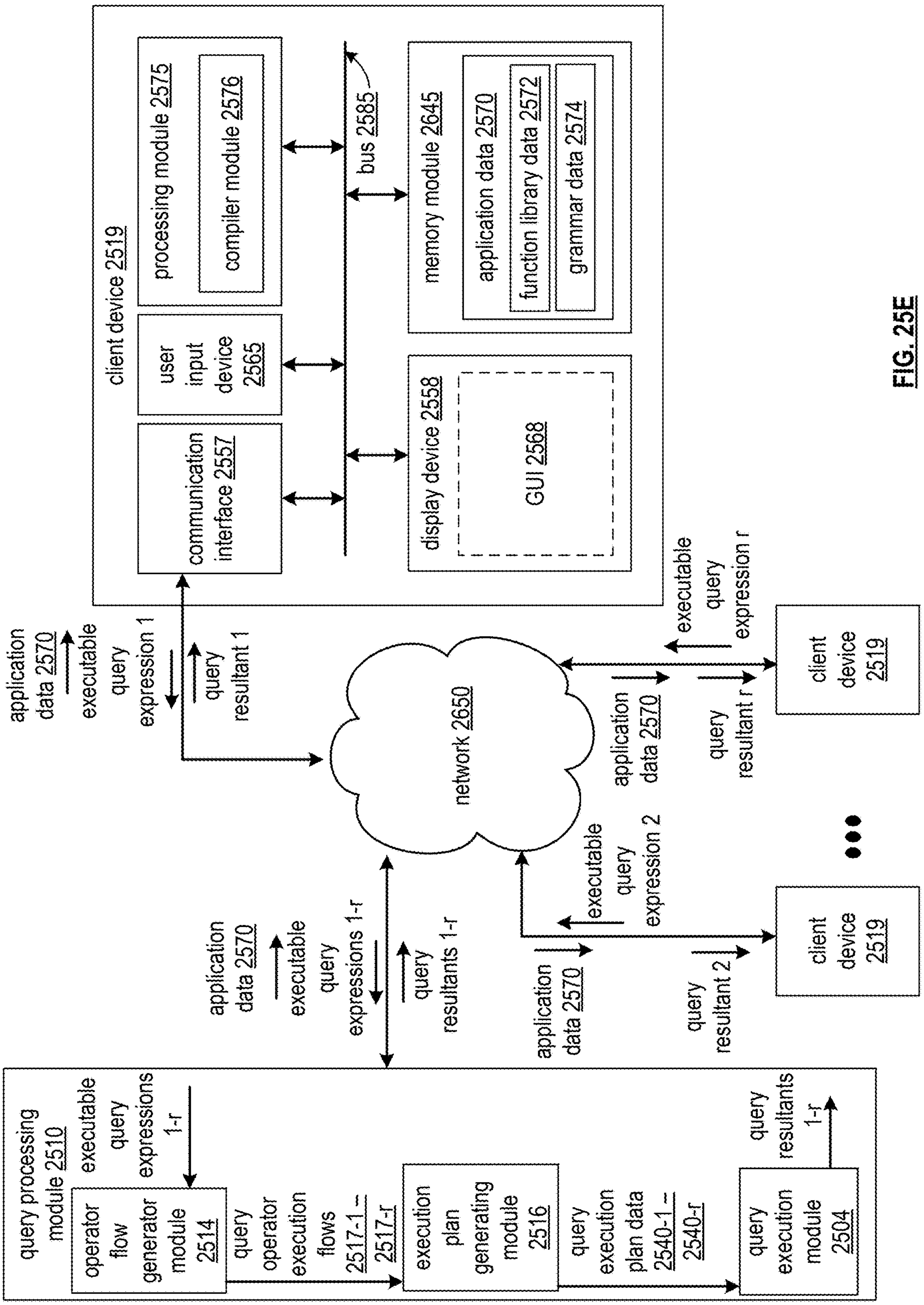
FIG. 25E is a schematic block diagram of a query processing system that communicates with a plurality of client devices in accordance with various embodiments.

FIG. 25E illustrates an embodiment of a query processing system 2510 that communicates with a plurality of client devices. The query processing system 2510 of FIG. 25E can be utilized to implement the query processing system 2510 of FIG. 25A and/or any other embodiment of the query processing system 2510 discussed herein.

In various embodiments, a user can generate their own executable query expression that is utilized to generate the query operator execution flow 2517 of FIG. 25E. The executable query expression can be built from a library of operators that include both standard relational operators and additional, custom, non-relational operators that are utilized implement linear algebra constructs to execute derivates, fractional derivatives, integrals, Fourier transforms, regression machine learning models, clustering machine learning models, etc. A language and corresponding grammar rules can be defined to allow users to write executable query expressions that include the linear algebra constructs.

Rather than rigidly confining the bounds to which the non-relational operators 2524 can be utilized in query execution, the embodiment of FIG. 25E enables users to implement non-relational operators 2524 and/or to create new non-relational operators 2524 from existing non-relational operators 2524 and/or relational algebra operators 2523. This further improves database systems by expanding the capabilities to which mathematical functions and machine learning models can be defined and implemented in query executions. In particular, users can determine and further define particular query functionality based on characteristics of their data and/or of their desired analytics, rather than being confined to a fixed set of functionality that can be performed.

As discussed in conjunction with FIG. 25A-25D, these custom, executable query expressions can be optimized and/or otherwise decentralized in execution via a plurality of nodes. Non-relational operators, such as non-relational operators 2524 and/or custom non-relational functions utilized to implement linear algebra constructs and/or other custom non-relational, are selected and arranged in the query operator execution flow 2517 for execution by a plurality of nodes 37 of a query execution plan 2405. This enables the custom functionality to be optimized and/or otherwise be efficiently processed in a decentralized fashion rather than requiring centralization of data prior to executing the non-relational constructs presented in a corresponding executable query expression.

For example, the query request of FIG. 25C can be expressed as a single, executable query expression that includes and/or indicates the one or more relational query expressions 2553, the one or more non-relational function calls 2554, and/or the one or more machine learning constructs 2555 in accordance with the function library and/or grammar rules of a corresponding language. Executable query expressions of the corresponding language can be broken down into a combination of relational algebra operators 2523 and/or non-relational operators 2524 that can be arranged into a corresponding query operator execution flow 2517 that can be segmented and/or otherwise sent to a plurality of nodes 37 of a query execution plan 2405 to be executed as a query operator execution flow 2433 via the node as illustrated in FIG. 25B. For example, any compilable or otherwise acceptable executable query expression that complies with the function library and/or grammar rules can be processed by the operator flow generator module 2514 to generate a corresponding query operator execution flow 2517 that can be executed in accordance with a query execution plan 2405 in a decentralized fashion.

These executable query expressions can be generated and/or determined automatically by the query processing system 2510 and/or can be received from client devices 2519 as illustrated in FIG. 25E. As illustrated, a plurality of client devices 2519 can bidirectionally communicate with the query processing system 2510 via a network 2650. For example, the network 2650 can be implemented utilizing the wide area network(s) 22 of FIG. 5, the external network(s) 17 of FIG. 2, the system communication resources 14 of FIG. 5, and/or by utilizing any wired and/or wireless network. The query processing system 2510 can receive a plurality of executable query expressions 1-*r* from a set of client devices 1-*r*, can generate query operator execution flows 2517 for each query expression to facilitate execution of the executable query expressions 1-*r* via the query execution module 2502 to generate corresponding query resultants 1-*r*. The query processing system 2510 can send the generated query resultants 1-*r* to the same or different corresponding client device for display. In some embodiments, the client devices 2519 of FIG. 25E implement one or more corresponding external requesting entities 2508 of FIG. 24F.

Client devices 2519 can include and/or otherwise communicate with a processing module 2575, a memory module 2545, a communication interface 2557, a display device 2558, and/or a user input device 2565, connected via a bus 2585. The client device 2519 can be implemented by utilizing a computing device 18 and/or via any computing device that includes a processor and/or memory. Some or all client devices 2519 can correspond to end users of the database system that request queries for execution and/or receive query resultants in response. Some or all client devices 2519 can alternatively or additionally correspond to administrators of the system, for example, utilizing administrative processing 19.

Client devices 2519 can store application data 2570 to enable client devices 2519 to generate executable query expressions. The application data 2570 can be generated by and/or can be otherwise received from the query processing system 2510 and/or another processing module of database system 10. The application data 2570 can include application instructions that, when executed by the processing module 2575, cause the processing module 2575 to generate and/or compile executable query expressions based on user input. For example, execution of the application instruction data 2620 by the processing module 2575 can cause the client device to display a graphical user interface (GUI) 2568 via display device 2558 that presents prompts to enter executable query expressions via the user input device 2565 and/or to display query resultants generated by and received from the query processing system 2510.

The application data 2570 can include and/or otherwise indicate function library data 2572 and/or grammar data 2574, for example, of a corresponding language that can be utilized by a corresponding end user to generate executable query expressions. The function library data 2572 and/or grammar data 2574 can be utilized by the processing module 2575 to implement a compiler module 2576 utilized to process and/or compile text or other user input to GUI 2568 to determine whether the executable query expression complies with function library data 2572 and/or grammar data 2574 and/or to package the executable query expression for execution by the query processing system 2510. The function library data 2572 and/or grammar data 2574 can be displayed via GUI 2568 to instruct the end user as to rules and/or function output and parameters to enable the end user to appropriately construct executable query expressions. For example, the application data 2570 can be utilized to implement an application programming interface (API) to enable construction, compiling, and execution of executable query expressions by the end user via interaction with client device 2519.

The function library data 2572 can include a plurality of functions that can be called and/or included in an executable query expression. These functions can include and/or map to one or more operators of the relational algebra library 2563 and/or the linear algebra library 2564. For example, the relational algebra library 2563 and/or the linear algebra library 2564 stored by the query processing system 2510 can be sent and/or included in application data 2570. As another example, the relational algebra library 2563 and/or the linear algebra library 2564 can store function mapping data that maps the functions indicated in the function library data 2572 to one or more operators of the relational algebra library 2563 and/or the linear algebra library 2564 that can implement the corresponding function when included in a query operator execution flow 2517, for example, in predefined ordering and/or arrangement in the query operator execution flow 2517.

The function library data 2572 can indicate rules and/or roles of one or more configurable parameters of one or more corresponding functions, where the executable query expression can include one or more user-selected parameters of one or more functions indicated in the function library data 2572. The function library data 2572 can indicate one or more user-defined functions written and/or otherwise generated via user input to the GUI 2568 by the same user or different user via a different client device. These user-defined functions can be written in the same language as the executable query expressions in accordance with the function library data 2572 and/or grammar data 2574, and/or can be compiled via compiler module 2576. These user-defined functions can call and/or utilize a combination of other function indicated in function library data 2572 and/or in relational algebra library 2563 and/or the linear algebra library 2564.

Executable query expressions generated via user input to the GUI 2568 and/or compiled by compiler module 2576 can be transmitted to the query processing system 2510 by communication interface 2557 via network 2650. Corresponding query resultants can be generated by the query processing system 2510 by utilizing operator flow generator module 2514 to generate a query operator execution flow 2517 based on the executable query expression; by utilizing execution plan generating module 2516 to generate query execution plan data 2540 based on the query operator execution flow 2517; and/or by utilizing a plurality of nodes 37 of query execution module 2502 to generate a query resultant via implementing the query execution plan 2405 indicated in the query execution plan data 2540, for example, as discussed in conjunction with FIGS. 25A-25D. The query resultant can be sent back to the client device 2519 by the query processing system 2510 via network 2650 for receipt by the client device 2519 and/or for display via GUI 2568.

Figure 25F:
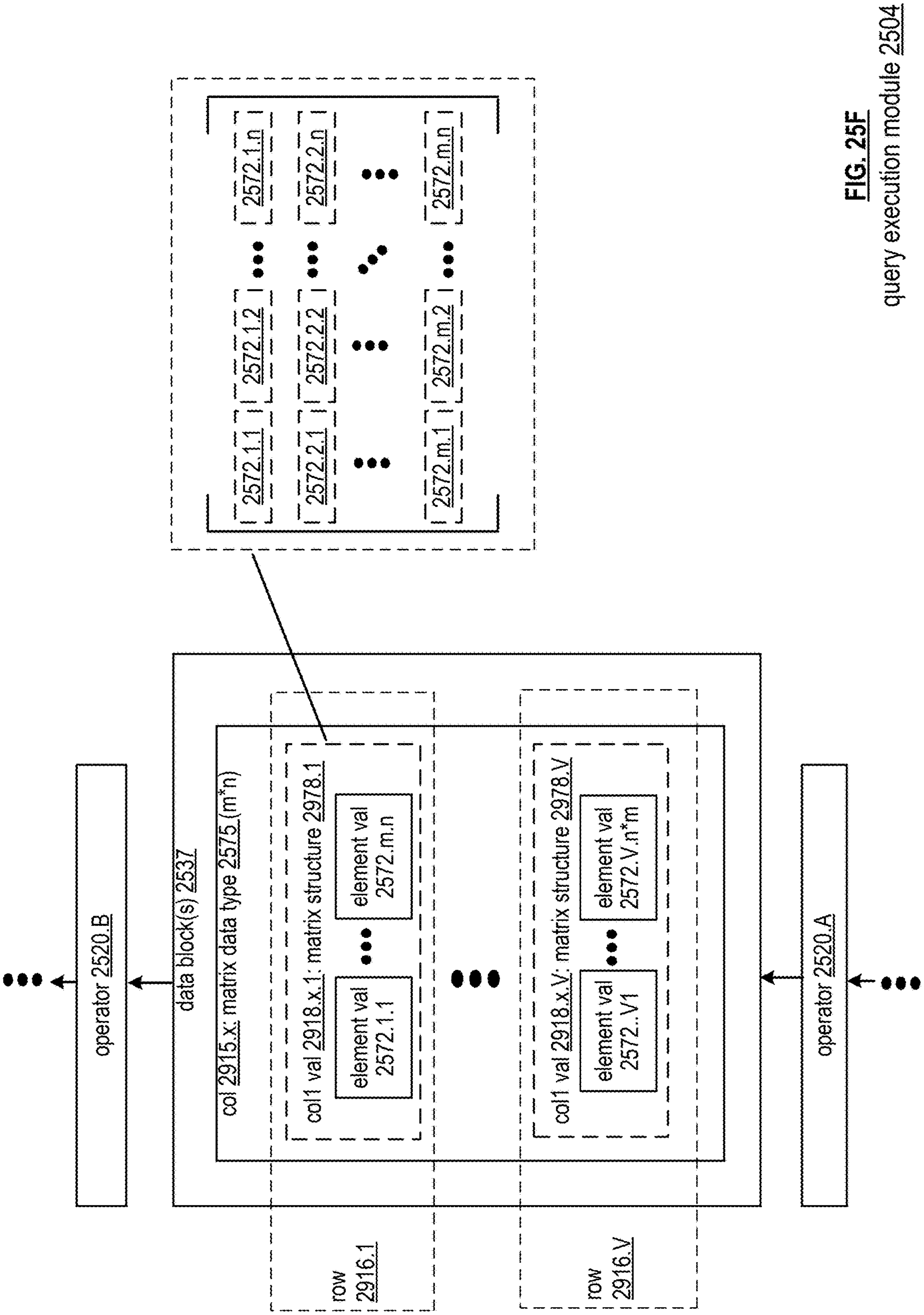
FIG. 25F is a schematic block diagram of a query execution module that processes a column for a matrix data type via execution of operators in accordance with various embodiments.

FIG. 25F is a schematic block diagram of a query execution module 2504 that processes data blocks 2537 that include column values 2918 for a column 2915 (e.g. of a column stream) for a matrix data type 2575 via execution of operators 2520 in accordance with various embodiments. Some or all features and/or functionality of the query execution module 2504 of FIG. 25F can implement some or all features and/or functionality of any embodiment of query execution module 2504 described herein. Some or all features and/or functionality of the column stream 2915 of FIG. 25F can implement any embodiment of a column steam described herein. Some or all features and/or functionality of the data block that include a column stream for the matric data type of FIG. 25F can implement any data blocks generated via execution of an operator 2520.

The database system can be operable to store, generate, and/or process matrix structures 2978, for example, included in columns 2915 processed as input and/or generated as output of operators 2520. For example, these matrix structures 2978 can be implemented as column values 2918 based on the corresponding column 2915 having a matric data type 2575. Each matrix structures 2978 can include a corresponding plurality of element values 2572.1.1-2572.*m*.*n*, for example, where m is a number of matrix rows and n is a number of matrix columns. Thus, a given column value 2915 can thus store many values 2572 of a corresponding matrix. While the values 2572.1.1-2572.*m*.*n* can be mathematically representative as values making up of rows and columns of a respective matrix, the values 2978.1.1-2978.*m*.*n*, and can be mathematically processed accordingly when applying non-relational linear algebra operators 2524 to the corresponding matrix structure 2978, the c values 2572.1.1-2572.*m*.*n* can be stored/indicated by matric structure 2978 in any format/layout.

A given column 2915 implemented as storing values 1918 of a matrix data type can be required to store matrixes of a same size, and/or having elements of a same type (e.g. doubles/integers/etc.). Different matrix columns 2915 can have different dimensions. The dimensions m×n for a given matrix column can be dictated by the operator 2520 that generated the matrix in accordance with the respective query and/or as dictated by its input (e.g. an operator 2520 implementing matrix multiplication generates 5×3 matrixes as output when receiving a first column having 5×1 matrixes and a second column having 1×3 matrixes; and/or an operator 2520 generating a covariance matrix generates a C×C covariance matrix based on processing C columns streams (e.g. C columns of a training set that includes a plurality of rows) as input.

For example, a non-relational operator 2524 implementing a linear algebra function generates the matrixes as column values 2918 of the column stream (e.g. from vectors, other matrixes, scalar values, or other input), where operator 2520.A is a non-relational operator 2524. As another example, a relational operator 2523 implementing a relational algebra function generates the matrixes as column values 2918 of the column stream (e.g. simply processes matrix column values of input data blocks via relational functions, such as filtering matrixes by value/other criteria; performing set operations upon matrixes as input; etc. vectors, other matrixes, scalar values, or other input), where operator 2520.A is a relational operator 2523. As another example, a non-relational operator 2524 implementing a linear algebra function processes the matrixes as column values 2918 of the column stream to generate further data blocks (e.g. that include further matrixes, vectors, scalar values, or other values based on performing a linear algebra function upon the matrix values), where operator 2520.B is a non-relational operator 2524. As another example, a relational operator 2523 implementing a relational algebra function processes the matrixes as column values 2918 of the column stream to generate further data blocks (e.g. simply processes matrix column values of input data blocks via relational functions, such as filtering matrixes by value/other criteria; performing set operations upon matrixes as input; etc. vectors, other matrixes, scalar values, or other input), where operator 2520.A is a relational operator 2523.

In some cases, rather than a column of multiple matrix structures 2978 being generated/processed, a single matrix structure 2978 can be generated as output of an operator and/or processed as input by an operator. For example, the operator 2520 generating the single matrix structure 2978 is an aggregate operator/blocking operator that generates a single matrix (e.g. single row) as its output from some or all of a plurality of input rows processed by the operator 2520. As a particular example, a single covariance matrix is generated from all of an incoming set of rows via execution of an operator 2524 implementing an aggregate covariance function.

While not illustrated, operator 2520.A and/or 2520.B can further process other incoming columns. For example, operator 2520.A generates the matrix values based on performing matrix addition, matrix multiplication, scalar multiplication or other linear algebra functions upon the matrix data types of the column and also matrixes, vectors and/or scalar values of one or more other columns. As another example, operator 2520.B processes the matrix values in conjunction with other columns such as scalar columns, vector columns, and/or matrix columns to generate its output based on performing matrix addition, matrix multiplication or other linear algebra functions upon multiple vector/matrix data types as input from multiple columns.

In some embodiments, the matrix values of the matrix column are generated from a plurality of rows that themselves optionally do not have matrix data types. For example, a plurality of rows are processed via one or more operators 2520.A implementing a covariance aggregate function that generates a covariance matrix as a given column value 2918 from the plurality of rows, for example, based on corresponding variance of the respective values across multiple columns. Optionally, the covariance aggregate function generates a covariance matrix as a given column value 2918 from a plurality of vector values for a plurality of rows, for example, implemented as column values for the matrix data type with one of the two dimensions being one, where a given vector values denotes a set of values for a given row (e.g. its independent variables).

In cases where a matrix structure 2978 represents a covariance matrix, the plurality of element values 2572 can mathematically represent a corresponding covariance matrix, where each element value 2572 of a C×C covariance matrix is computed as a covariance of a corresponding pair of independent variables of the training set of rows. For example, an element value 2572.*i.j* corresponding to an ith row and jth column of the covariance matrix can be computed as the covariance between a corresponding ith column and a corresponding jth column of a respective data set (e.g. a training set of rows having C columns each corresponding to an independent variable).

Some or all of this functionality can be based on the matric data type 2575 being implemented as a first class data type via the database system 10 (e.g. in accordance with SQL or any query language/database structuring). For example, a column value 2918 storing a matrix structure 2578 as a corresponding set of element values 2575 for all of the matrixes respective m rows and n columns can be implemented as an object that exists independently of other matrices and/or other objects, and/or has an identity independent of any other matrix and/or object. As another example, the database system 10 can be configured to allow/enable columns having values 2918 implemented as matrix structures 2578 be stored in tables for one or more corresponding columns and/or to be generated/processed in conjunction with processing database columns as new columns when executing queries. A query resultant can optionally include one or more values 2918 having matrix data type 2575.

While not illustrated, one or more database tables 2712 of FIG. 24K and/or as described herein can similarly store columns 2707 having the matrix data type 2575, where values 2708 for these columns are implemented as matrix structures 2578. These matrix structures 2578 can be read during query execution (E.g. as a whole, in conjunction with processing the corresponding column) for further processing/filtering/manipulation via relational and/or non-relational operators during query execution.

Some or all of the generation, processing, and/or storing of matrixes discussed herein can be implemented via processing of matrix structures 2578 in a same of similar fashion as illustrated and/or discussed in conjunction with FIG. 25F. Such values 2918 implemented as matrix structures 2578 can be implemented via generation, processing, and/or storing of a corresponding column 2915 having matrix data type 2575, for example, as illustrated and/or discussed in conjunction with FIG. 25F.

FIGS. 26A-26H illustrate embodiments of a database system 10 that is operable to generate and store machine learning models based on executing corresponding query requests, and to further utilize these machine learning models in executing other queries. Some or all features and/or functionality of the database system 10 of FIGS. 26A-26H can implement any embodiment of the database system 10 described herein.

Figure 26A:
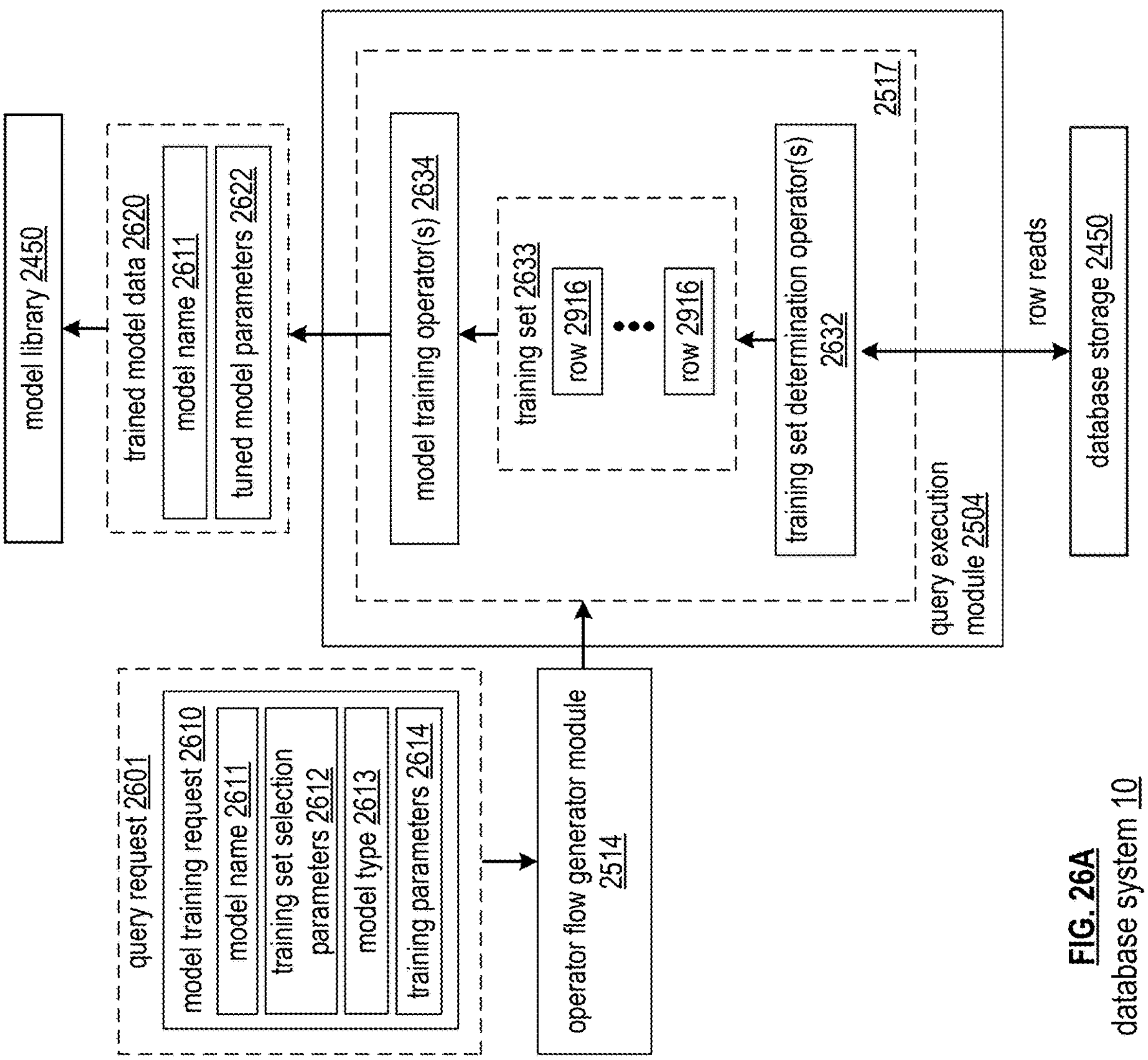
FIG. 26A is a schematic block diagram of a database system that processes a model training request in in accordance with various embodiments.

FIG. 26A illustrates an embodiment of a database system 10 that executes a query request 2601 by generating a query operator execution flow 2517 for the query request 2601 via an operator flow generator module 2514 for execution via a query execution module 2504. The execution of a query based on a query request of FIG. 26A can be implemented via some or all features and/or functionality of executing queries as discussed in some or all of FIGS. 24A—25E, and/or any other query execution discussed herein.

The query request 2601 can indicate a model training request 2610 indicating a machine learning model or other model be trained in query execution. The model training request can indicate: a model name 2611, training set selection parameters 2612, a model type 2613, and/or training parameters 2614. The query operator execution flow 2517 can be generated and executed to generate corresponding trained model data 2620 based on the model name 2611, the training set selection parameters 2612, the model type 2613, and/or the training parameters 2614.

The query operator execution flow 2517 can include one or more training set determination operators 2632, which can be implemented as one or more operators 2520 of the query operator execution flow in a serialized and/or parallelized ordering that, when executed, render generation of a training set 2633 that includes a plurality of rows 2916. The training set determination operators 2632 can include IO operators and/or can otherwise perform row reads to retrieve records 2422 from one or more tables to be included in training set 2633 directly as rows 2916 and/or to be further filtered, modified, and/or otherwise further processed to render rows 2916. For example, the training set determination operators 2632 further include filtering operators, logical operators, join operators, extend operators, and/or other types of operators utilized to generate rows 2916 from some or all columns of retrieved records 2422. The rows 2916 can have new columns created from columns of records 2422 and/or can have some or all of the same columns as those of records 2422.

The performance of row reads and/or further processing upon the retrieved rows of the training set determination operators 2632 can be configured by operator flow generator module 2514 based on the training set selection parameters 2612 of the respective model training request 2610, where the training set selection parameters 2612 indicate which rows and/or columns of which tables be accessed, how retrieved rows be filtered and/or modified to render rows 2916, and/or which existing and/or new columns be included in the rows 2916 of training set 2633. In particular, a model can be created (e.g. trained) as illustrated in FIG. 26A over the result set of any SQL statement indicated in the respective query expression (e.g. as training set model parameters 2612), where training set 2633 not just restricted to data as is sitting in a table stored in database storage 2450.

The query operator execution flow 2517 can further include one or more model training operators 2634, which can be implemented as one or more operators 2520 of the query operator execution flow in a serialized and/or parallelized ordering that, when executed, render processing of the plurality of rows 2916 of training set 2633 to generate trained model data 2620. The operators of model training operators 2634 can be serially after the training set determination operators 2632 to render training the corresponding model from the training set 2633 generated first via the training set determination operators 2632.

The model training operators 2634 can be configured by operator flow generator module 2514 based on the model type 2613, where the model training operators 2634 train the corresponding type of model accordingly. Different executions of model training operators 2634 utilized to train different models for different model training requests 2610 can be implemented differently to train different types of models. This can include applying different model training functions and/or machine learning constructs for these different types. The model training operators 2634 can be further configured by operator flow generator module 2514 based on the training parameters 2614. For example, the training parameters 2614 can further specify how the corresponding type of machine learning model be trained. As another example, the training parameters 2614 specify which columns of rows 2916 correspond to independent variables and/or model input, and which columns of rows 2916 correspond to dependent variables and/or model output.

The execution of model training request 2610 can be implemented via one or more relational query expressions 2553, one or more non-relational function calls 2554, and/or one or more machine learning constructs 2555 of FIG. 25C. The query operator execution flow 2517 can be implemented based on accessing a relational algebra operator library 2563 and/or a non-relational operator library 2564. The model training operators 2634 and/or the training set determination operators 2632 can include operators 2523 and/or 2524 that implement relational constructs, non-relational constructs, and/or machine learning constructs. For example, different types of machine learning models are trained based on applying different machine learning constructs 2555 stored in relational algebra operator library 2563, non-relational operator library 2564, and/or another function library.

The execution of model training request 2610 can include executing exactly one query operator execution flow 2517. Alternatively or in addition, the execution of model training request 2610 can include executing multiple query operator execution flows 2517, for example, serially or in parallel. For example, the query operator execution flow 2517 can correspond to a plurality of different query operator execution flows 2517 for a plurality of different SQL queries and/or other queries that are collectively executed to generate corresponding trained model data 2620. In some or all cases, the multiple queries that are executed to generate corresponding trained model data 2620 are deterministically determined as a function of model training request 2610, for example, where all models of a given type are executed via the same number of queries, the exact same queries, and/or a set of similar queries that differ based on other parameters of model training request 2610. Alternatively or in addition, the multiple queries that are executed to generate corresponding trained model data 2620 are dynamically determined based on the output of prior queries, where the number of queries ultimately executed and/or the configuration of these queries is unknown when the first query is executed for some or all types of models, such as a decision tree model type.

The trained model data 2620 can be stored in a model library 2650 for future access in subsequent query executions. Model library 2650 can be implemented as relational algebra operator library 2563 and/or non-relational operator library 2564, and/or can be separate from relational algebra operator library 2563 and/or non-relational operator library 2564. The model library 2650 can store a plurality of trained model data 2620 generated in accordance with corresponding model training requests 2610 of respective query requests 2601, where different trained model data 2620 of this plurality of trained model data 2620 have different model names 2611 and/or different tuned model parameters 2622.

The trained model data 2620 can indicate the model name 2611 and/or tuned model parameters 2622, where the corresponding trained model 2620 is accessible in future query requests based on being identified via model name 2611 and/or where the corresponding trained model 2620 is implemented in future query requests based on applying the tuned model parameters 2622. The trained model data 2620 can otherwise be utilized in the same query execution for the same query request 2601 and/or subsequent queries for subsequent query requests to perform a corresponding inference function and/or generate corresponding inference data upon new rows.

Figure 26B:
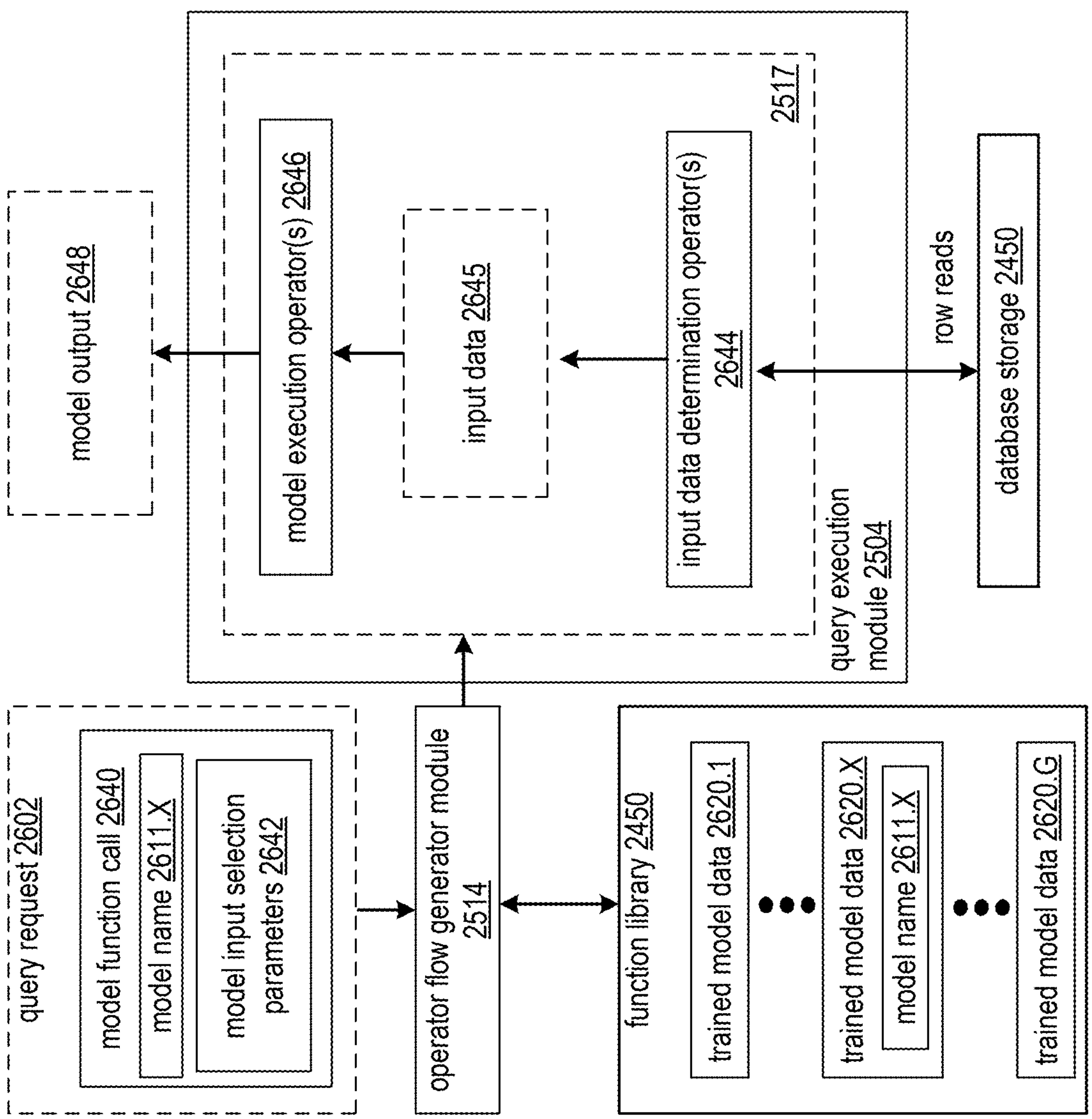
FIG. 26B is a schematic block diagram of a database system 10 that processes a model function call in accordance with various embodiments.

FIG. 26B illustrates an embodiment of executing a query request 2602 that applies a model, for example, previously trained via executing a model training request 2610 of query request 2601 of FIG. 26A. The execution of a query based on a query request of FIG. 26B can be implemented via some or all features and/or functionality of executing queries as discussed in some or all of FIGS. 24A-25E, and/or any other query execution discussed herein. The execution of a query based on a query request of FIG. 26B can be implemented via the same or different query execution resources of FIG. 26A.

The query request 2602 can indicate a model function call 2640 indicating a machine learning model or other model be applied in query execution, and/or that a corresponding inference function be executed. The model function call 2640 can indicate: a model name 2611 and/or model input selection parameters. The query operator execution flow 2517 can be generated and executed to generate corresponding model output 2648 based on applying the previously trained model having the given model name 2611 to the input data specified by the model input selection parameters 2642.

This can include accessing function library 2650 to access and apply the respective tuned model parameters 2622 of the trained model data 2620 having the given mode name 2611, where the function library 2650 stores a plurality of trained model data 2620.1-2620.G for a plurality of corresponding trained models generated via respective model training requests 2610 of FIG. 26A. In this example, the model function call 2640 indicates a particular function name 2611.X, and the corresponding trained model data 2620.X, such as the corresponding tuned parameter data 2622, is accessed and utilized to generate the corresponding query operator execution flow 2517 for execution.

The query operator execution flow 2517 can include one or more input data determination operators 2644, which can be implemented as one or more operators 2520 of the query operator execution flow in a serialized and/or parallelized ordering that, when executed, render generation of input data 2645. The input data 2645, while not illustrated, can include one or more rows 2916 to which the model be applied.

The training set determination operators 2644 can include IO operators and/or can otherwise perform row reads to retrieve records 2422 from one or more tables to be included in input data 2645 directly as rows 2916 and/or to be further filtered, modified, and/or otherwise further processed to render rows 2916. For example, the training set determination operators 2632 further include filtering operators, logical operators, join operators, extend operators, and/or other types of operators utilized to generate rows 2916 from some or all columns of retrieved records 2422. The rows 2916 can have new columns created from columns of records 2422 and/or can have some or all of the same columns as those of records 2422. The performance of row reads and/or further processing upon the retrieved rows of the training set determination operators 2644 can be configured by operator flow generator module 2514 based on the model input selection parameters 2642 of the respective model function call 2640, where the model input selection parameters 2642 indicate which rows and/or columns of which tables be accessed, how retrieved rows be filtered and/or modified to render rows 2916, and/or which existing and/or new columns be included in the rows 2916 of input data 2645.

As a particular example, the one or more rows 2916 include only columns corresponding to the independent variables and/or model input specified in training the respective model, where the model is applied to execute a corresponding inference function to generate one or more columns corresponding to the dependent variables and/or model output for these rows 2916 as inference data. This can be preferable in cases where such information for these rows is not known, where the inference data corresponds to predicted values. This can also be utilized to validate and/or measure accuracy of the model based on comparing the outputted values to known values for these columns, where input data 2645 corresponds to a test set to test the model.

The query operator execution flow 2517 can further include one or more model execution operators 2646 which can be implemented as one or more operators 2520 of the query operator execution flow in a serialized and/or parallelized ordering that, when executed, render processing of input data 2645 to generate model output 2648. The operators of model execution operators 2646 can be serially after the model input selection parameters 2642 to render applying the corresponding model to input data 2645 generated first via the model input selection parameters 2642.

The model execution operators 2646 can be configured by operator flow generator module 2514 based on the tuned model parameters 2622 of the respective model accessed in function library 2650, where the model execution operators 2646 execute a corresponding inference function and/or otherwise process the input data 2645 by applying the tuned model parameters 2622.

The model execution operators 2646 can be further configured by operator flow generator module 2514 based on the model type 2613 of the respective model accessed in function library 2650, where the model execution operators 2646 execute a corresponding inference function and/or otherwise process the input data 2645 by applying the corresponding model type 2613, in conjunction with applying the tuned model parameters 2622 to this model type. The trained model data 2620 can further indicate the model type of the respective model. This can include applying different model execution functions and/or machine learning constructs for these different types.

Different executions of model execution operators 2646 implementing different trained model data 2620 to train different models for different model training requests 2610 can be implemented differently to apply different types of models and/or apply multiple models of the same type having different tuned model parameters 2622.

The execution of model function call 2640 can be implemented via one or more relational query expressions 2553, one or more non-relational function calls 2554, and/or one or more machine learning constructs 2555 of FIG. 25C. The query operator execution flow 2517 can be implemented based on accessing a relational algebra operator library 2563 and/or a non-relational operator library 2564. The model execution operators 2646 and/or the model input selection parameters 2642 can include operators 2523 and/or 2524 that implement relational constructs, non-relational constructs, and/or machine learning constructs. For example, different types of machine learning models are executed based on applying different machine learning constructs 2555 stored in relational algebra operator library 2563, non-relational operator library 2564, and/or another function library.

The query request 2602 of FIG. 26B for applying a given model via model function call 2640 can be separate from the query request 2601 of FIG. 26A for training this given model via model training request 2610. For example, model training data 2620 for a given model is generated at a first time by executing a respective query request 2601, and is applied at one or more future times by executing one or more respective query requests 2602 calling this trained model.

In some embodiments, the given model can be called by query requests 2602 received from requesting entities 2508 and/or client devices 2519 that are different from the requesting entity 2508 and/or client device 2519 that trained the model via query request 2601. In some embodiments, the given model can only be called by query requests 2602 received from the same requesting entity 2508 and/or same client device 2519 that trained the model via query request 2601. In some embodiments, the requesting entity 2508 and/or client device 2519 that trained the model via query request 2601, and/or an administrator of database system 10 and/or of the respective company associated with requesting entity 2508, can configure permissions and/or monetary costs for calling and/or otherwise utilizing the respective machine learning model denoted in the respective model training data 2620, which can dictate whether some or all other requesting entities 2508 and/or client devices 2519 utilizing the database system 10 have permissions to and/or otherwise have access to calling the respective machine learning model.

In some cases, the query request 2602 of FIG. 26B for applying a given model via model function call 2640 can be the same as the query request 2601 of FIG. 26A for training this given model via model training request 2610. For example, model training data 2620 for a given model is generated by executing a respective model training request 2610 of this given query request, and is then applied in the same query based on this calling this trained model via a model function call 2640 in this same query request. For example, a single SQL statement or other same query request is received to denote the model be trained and immediately applied. In such cases, the model is optionally not stored in the function library 2540 for future use, and is only applied in this given query request. Alternatively, the model is still stored in the function library 2540 for future use, where the model is also called in future query requests 2602 as well as in this query request utilized to train the model.

The trained model data 2620 of FIG. 26B can be generated and/or stored as first class objects in the database, for example, where each trained model data 2620 exists independently of other models 2620 and/or other object, and/or has an identity independent of any other model and/or object. Once a model exists as trained model data 2620, it can be called (e.g. via model function calls 2640) as a scalar function, and can be called in any context where a scalar function can be used, which can be almost everywhere in SQL query expression. This can be favorable over other embodiments where models are implemented as stored procedures and they can't be embedded in queries and instead require being called on their own.

Figure 26C:
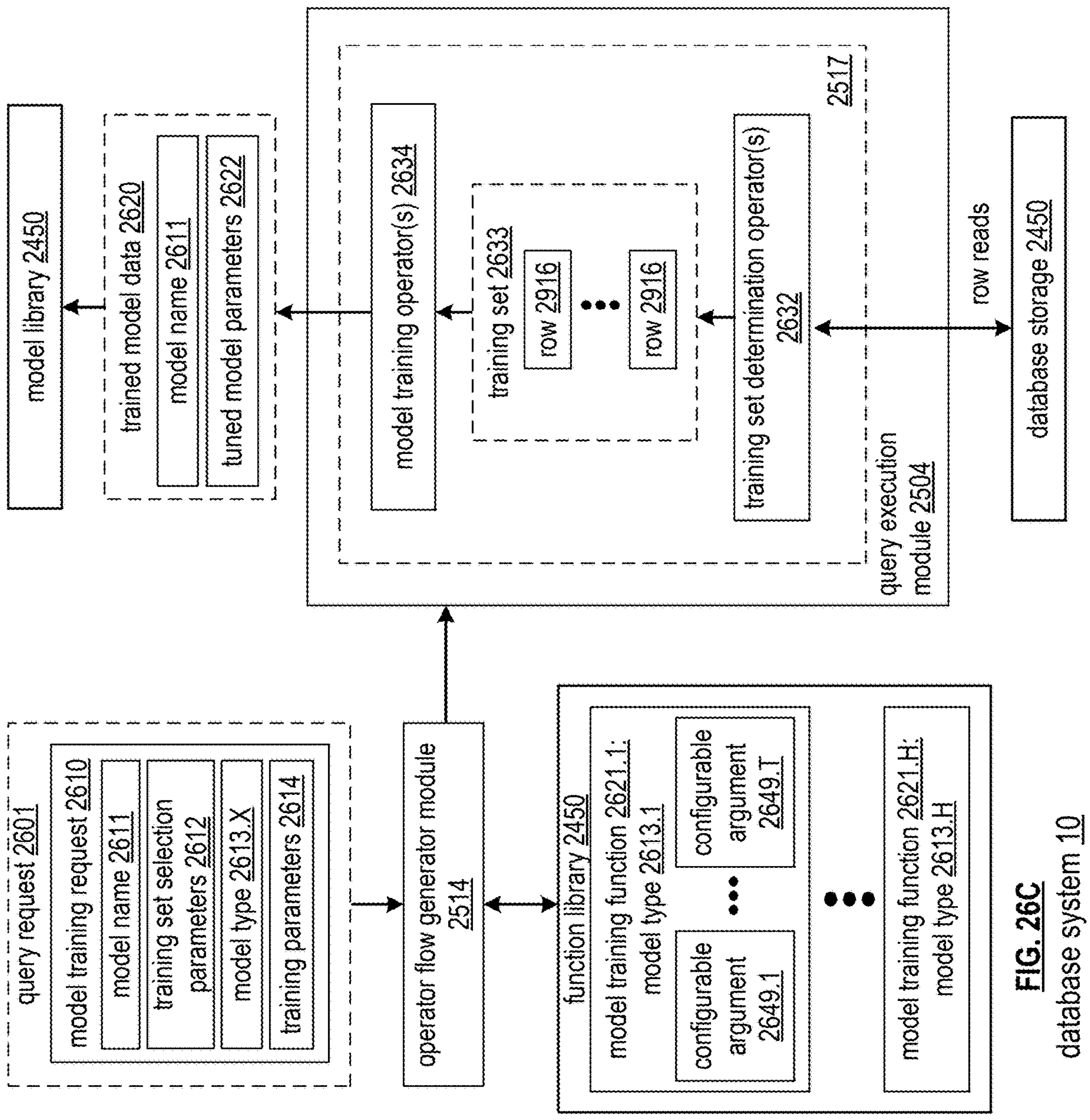
FIG. 26C is a schematic block diagram of a database system 10 that processes a model training request denoting a model type based on performing a model training function for the model type in accordance with various embodiments.

FIG. 26C illustrates an embodiment of a database system 10 that stores model training functions 2621.1-2621.H where model training functions are accessed for training respective models as dictated by model training requests 2610. Some or all features and/or functionality of executing a query request 2601 that includes a model training requests 2610 of FIG. 26C can implement the executing of a query request 2601 that includes a model training requests 2610 of FIG. 26A.

The model type 2613 specified in model training request 2610 can dictate which corresponding model training function 2621 be applied in selecting and/or executing model training operators 2634 of query operator execution flow 2517. A function library 2650 storing model training functions 2621.1-2621.H can be accessed to retrieve the corresponding function for execution. In this example, a model type 2513.X is specified, and a corresponding model training function 2621.X can be performed to train the model via model training operators 2634 accordingly. For example, H different types of models are available for selection, where each model training functions 2621.1-2621.H corresponds to a different one of the H model types, and where various different models stored as different trained model data 2620 of the stored trained model data 2620.1-2620.G can be of the same or different model type, having been trained via the respective type of model training function 2621.

This function library 2650 storing model training functions 2621.1-2621.H can be same or different function library 2650 of FIGS. 26A and/or 26B storing the trained model data 2620. The model training functions 2621.1-2621.H can be implemented via one or more relational query expressions 2553, one or more non-relational function calls 2554, and/or one or more machine learning constructs 2555 of FIG. 25C. The function library 2650 storing model training functions 2621.1-2621.H can be implemented via relational algebra operator library 2563 and/or a non-relational operator library 2564.

Some or all of the model training functions 2621 can have a set of configurable arguments 2629.1-2629.T. The number and/or type of arguments 2629.1-2629.T can be the same or different for model training functions 2621 corresponding to different model types. Some or all of the training parameters 2614 of the given model training request 2610 can denote the selected values for some or all configurable arguments 2629.1-2629.T of the respective model type. Some or all of the set of configurable arguments 2629.1-2629.T can be optional and/or required. Some or all of the set of configurable arguments 2629.1-2629.T can have a default value that is applied in cases where the argument is not specified in the training parameters 2614.

Some or all of the model training functions 2621 can be predetermined and/or can be part of application data 2570 utilized by client devices, for example, where the model training functions 2621 were built by an architect and/or administrator of the database system 10. Some or all of the model training functions 2621 can be generated and/or configured via client devices 2519 and/or requesting entities as custom functions for use in training models.

Figure 26D:
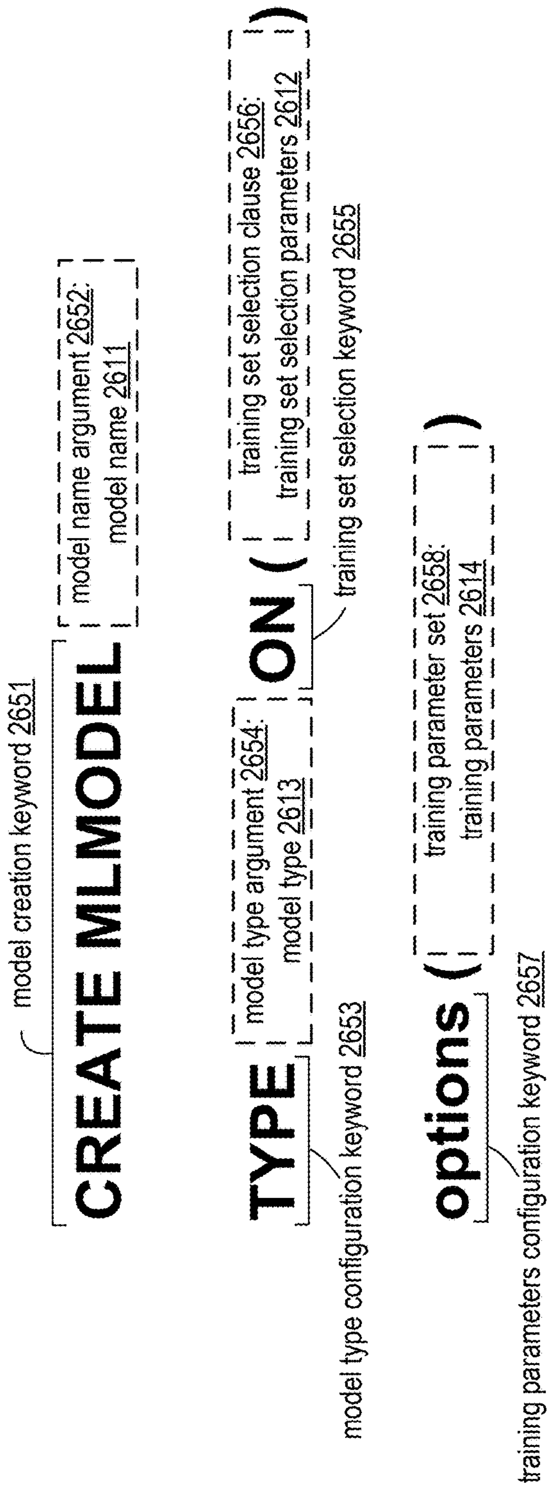
FIG. 26D illustrates an example model training request that includes a training set selection clause and a training parameter set in accordance with various embodiments.
Figure 26E:
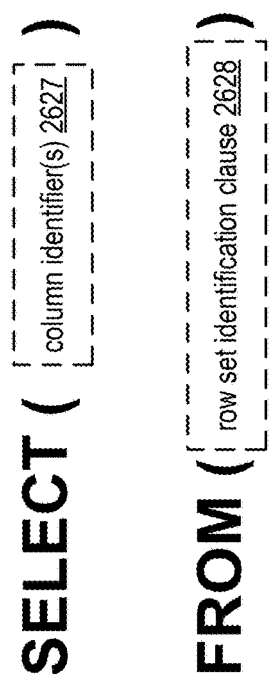
FIG. 26E illustrates an example training set selection clause in accordance with various embodiments.
Figure 26F:
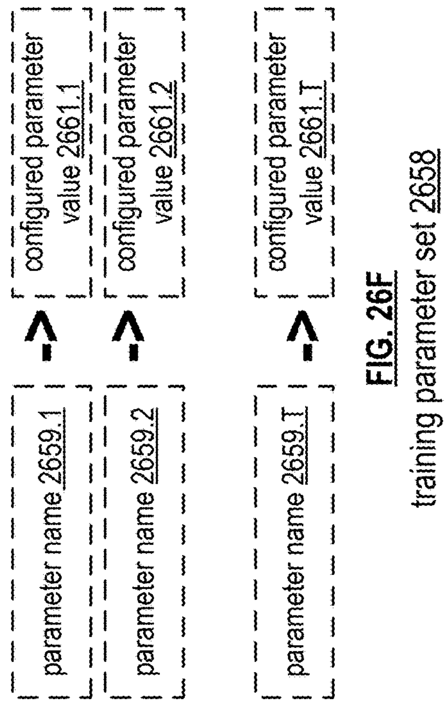
FIG. 26F illustrates an example training parameter set in accordance with various embodiments.
Figure 26G:
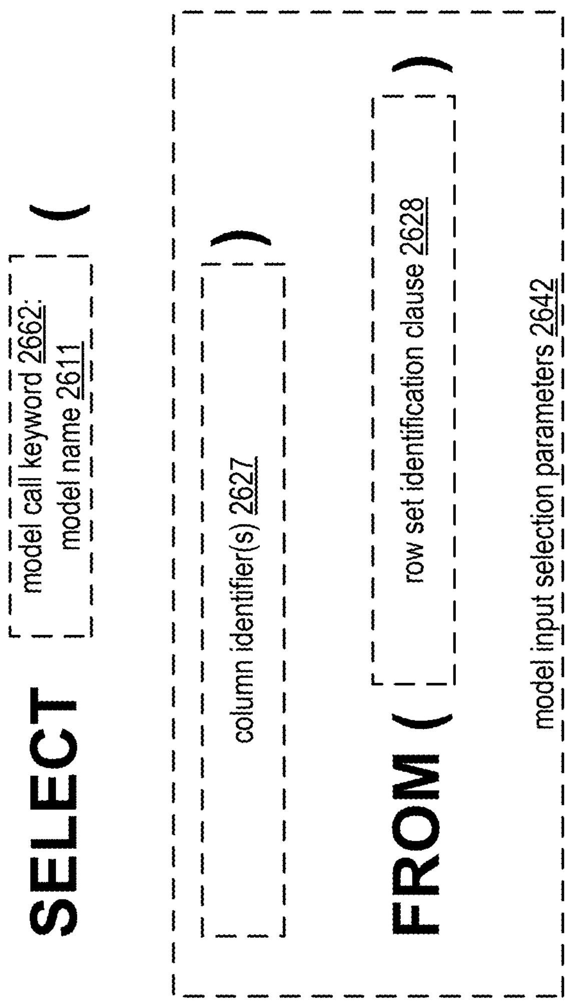
FIG. 26G illustrates an example model function call in accordance with various embodiments.
Figure 26H:
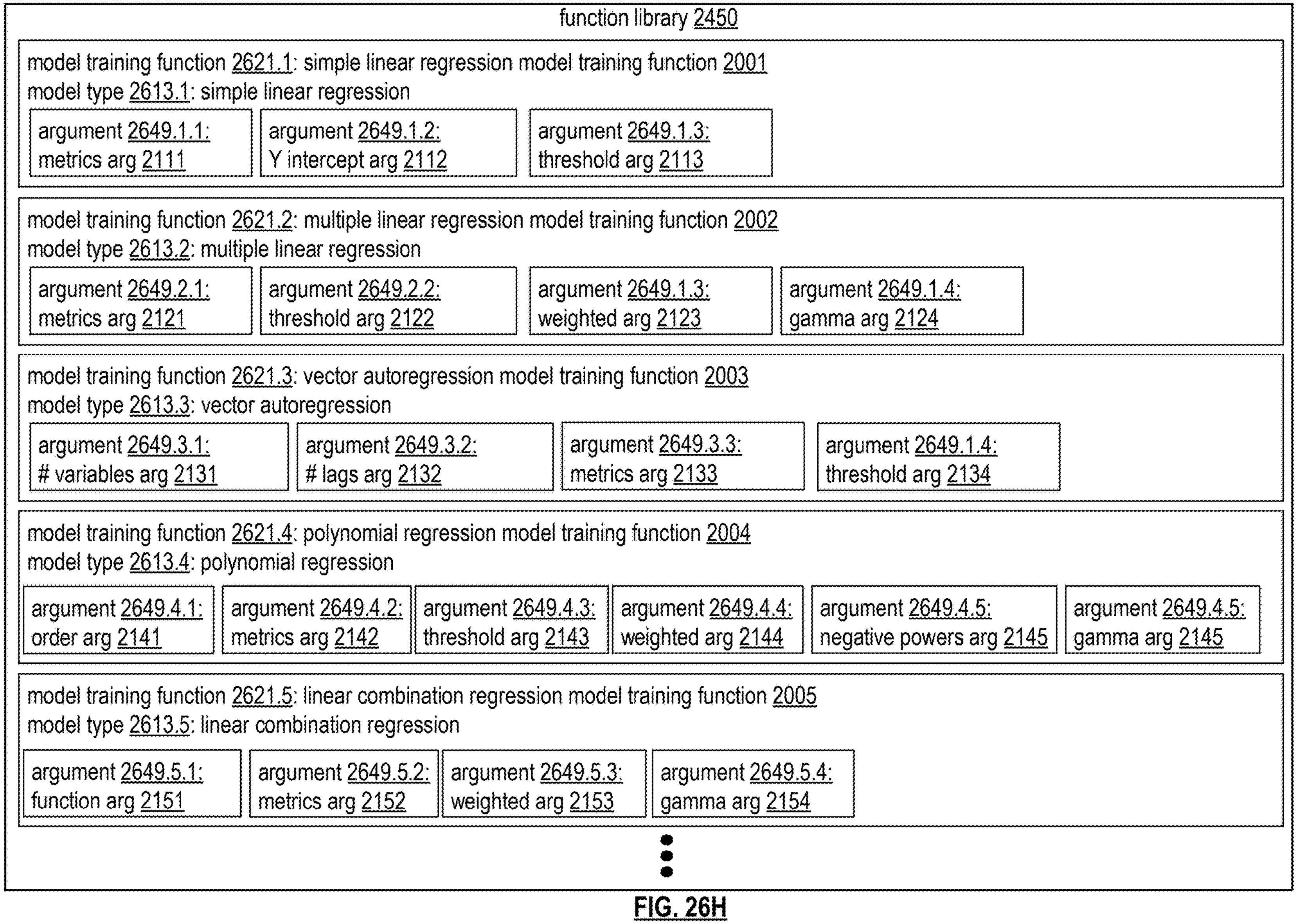
FIGS. 26H-26K illustrate example model training functions of a function library in accordance with various embodiments.
Figure 26I:
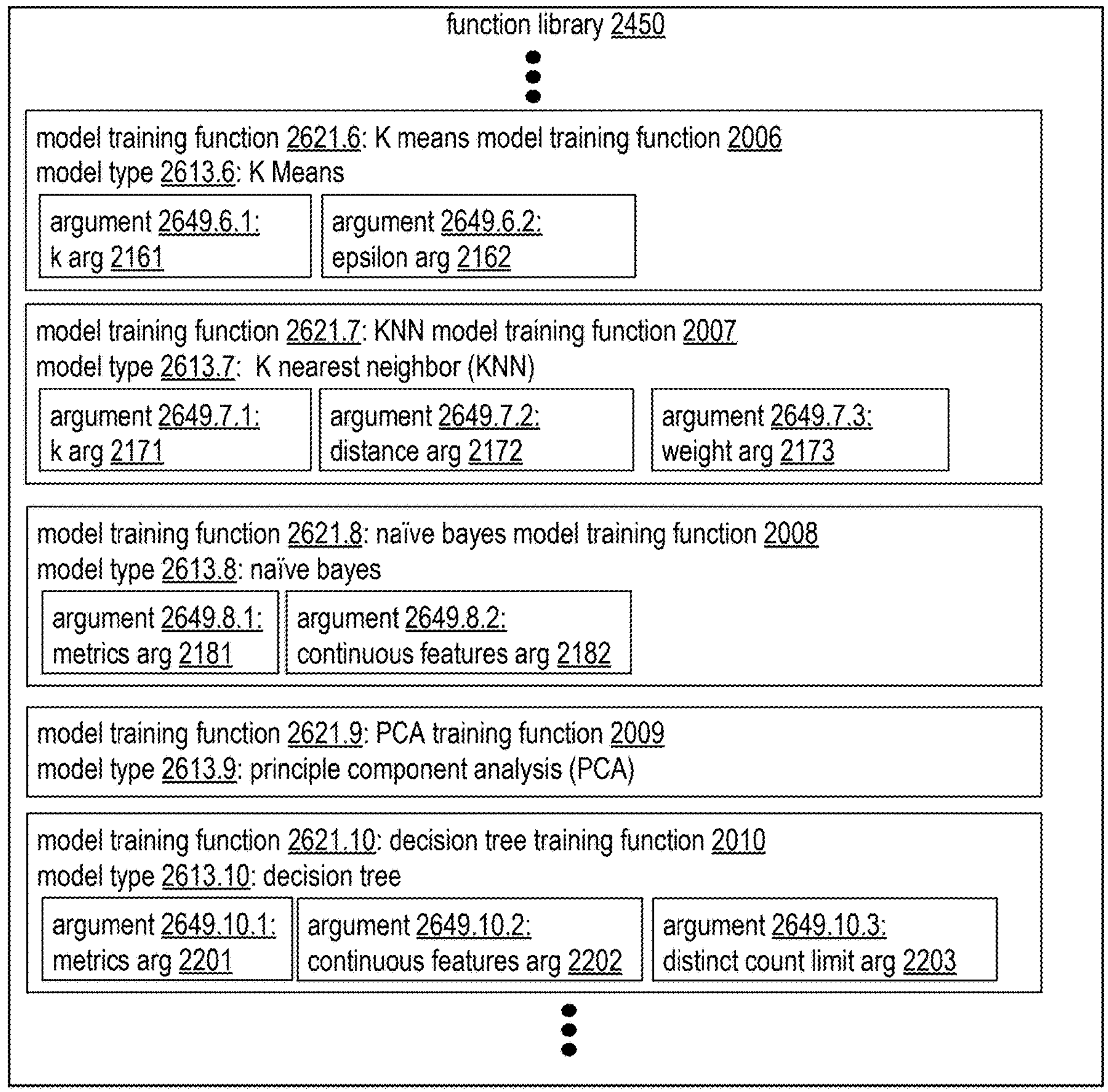

Example model training functions 2621 for an example set of model types 2613, with corresponding example configurable arguments 2649, are discussed in conjunction with FIGS. 26H-26I.

In various embodiments, some or all of the model training functions 2621 can be implemented via any features and/or functionality of any embodiment of the computing window function definition 2612, any embodiment of the custom Table Value Function (TVF) function definition 3012, any embodiment of the user defined function (UDF) definition 3312, and/or other function definitions, disclosed U.S. by Utility application Ser. No. 16/921,226, entitled "RECURSIVE FUNCTIONALITY IN RELATIONAL DATABASE SYSTEMS", filed Jul. 6, 2020, which is hereby incorporated herein by reference in its entirety and made part of the present U.S. Utility Patent Application for all purposes.

In various embodiments, some or all of the trained model data 2620 can be implemented via any features and/or functionality of any embodiment of the computing window function definition 2612, any embodiment of the custom Table Value Function (TVF) function definition 3012, any embodiment of the user defined function (UDF) definition 3312, and/or other function definitions, disclosed by U.S. Utility application Ser. No. 16/921,226.

In various embodiments, some or all of the model training requests 2610 can be implemented via any features and/or functionality of any embodiment of the computing window function call, any embodiment of the custom Table Value Function (TVF) function call, any embodiment of the UDF creation function call, and/or other function calls, disclosed by U.S. Utility application Ser. No. 16/921,226.

In various embodiments, some or all of the model function calls 2610 can be implemented via any features and/or functionality of any embodiment of the computing window function call 2620, any embodiment of the custom Table Value Function (TVF) function call 3020, any embodiment of the new function call 3330, and/or other function calls, disclosed by U.S. Utility application Ser. No. 16/921,226.

FIG. 26D illustrates an example embodiment of model training request 2610. Some or all features and/or functionality of the model training request 2610 of FIG. 26D can implement the model training request 2610 of FIG. 26A and/or FIG. 26C.

The model training request 2610 can include and/or be denoted by a model creation keyword 2651, which can be implemented as "CREATE MLMODEL" as illustrated in FIG. 26D and/or any other one or more words, phrases, and/or alpha-numeric patterns.

The model training request 2610 can alternatively or additionally include and/or indicate the model name 2611 as some or all of a model name argument 2652, for example, where the model name argument 2652 is an argument of a model creation function call denoted by model creation keyword 2651.

The model training request 2610 can alternatively or additionally include and/or indicate the model type 2613 as some or all of a model type argument 2654. For example, this model type argument 2654 follows and/or is denoted by a model type configuration keyword 2653. The model type configuration keyword 2653 can be implemented as "TYPE" as illustrated in FIG. 26D and/or any other one or more words, phrases, and/or alpha-numeric patterns. The model type configuration keyword 2653 can denote which model training function 2621 be implemented, where the model type argument 2654 has H different options corresponding to the H different model training functions for the H different model types.

The model training request 2610 can alternatively or additionally include and/or indicate the training set selection parameters 2612 as some or all of a training set selection clause 2656. For example, this training set selection clause 2656 follows and/or is denoted by a training set selection keyword 2655. The training set selection keyword 2655 can be implemented as "ON" as illustrated in FIG. 26D and/or any other one or more words, phrases, and/or alpha-numeric patterns.

The model training request 2610 can alternatively or additionally include and/or indicate the training parameters 2614 as some or all of a training parameter set 2614. For example, this training parameter set 2614 follows and/or is denoted by a training parameters configuration keyword 2657. The training parameters configuration keyword 2657 can be implemented as "options" as illustrated in FIG. 26D and/or any other one or more words, phrases, and/or alphanumeric patterns.

The model creation keyword 2651, model type configuration keyword 2653, model type configuration keyword 2653, and/or training parameters configuration keyword 2657 can be implemented as a reserved keyword, can be implemented as a SQL keyword or a keyword of another language, and/or can be implemented as a keyword denoting a custom function such as a user defined function and/or custom built-in function definition that is distinct from the SQL keywords and/or keywords of another language utilized to implement some or all other portions of the query request 2601.

FIG. 26E illustrates an example embodiment of the training set selection clause 2656 of FIG. 26D. The training set selection clause can denote one or more column identifier 2627 that be selected from rows 2916 identified via a set identification clause 2628. The training set selection clause 2656 can optionally be implemented as a SQL select statement in accordance with SQL syntax.

FIG. 26F illustrates an example embodiment of the training parameter set 2658 of FIG. 26D. The training parameter set 2658 can denote one or more parameter names 2659, such as some or all of a set of T parameter names 2659.1-2659.T corresponding to some or all of the T configurable arguments 2649 for the respective type. The set of parameter names 2659 can be denoted in the corresponding model training function 2621. Each given parameter name 2659 can be followed by a corresponding configured parameter value 2661, which can set the respective configurable argument 2649 denoted by the given parameter name.

In some embodiments, the model training request 2610 can be implemented as a function call to a machine learning model creation function, such as the CREATE MLMODEL function of FIG. 26D. Below is example syntax for a CREATE MLMODEL function called in model training request 2610 of a query request 2601 implementing the features of FIGS. 26D—26F:

```
CREATE MLMODEL <model name>
TYPE <model type> ON(
<SQL select statement>
)
[options(<option list>)]
```

This CREATE MLMODEL function, or other machine learning model creation function implementing model training request 2610, can be implemented to train a new machine learning model of type <model type> on the result set returned by the select statement. Once the model is created, <model name> can become a callable function in SQL select statements. The CREATE MLMODEL function, or other machine learning model creation function implementing model training request 2610 can be stored in function library 2650.

In some syntax configurations, <model name> is a user defined name to use in future references to the model.

In some syntax configurations, <model type> can be one of the following, and/or can denote selection of one of the following machine learning model types:

SIMPLE LINEAR REGRESSION
MULTIPLE LINEAR REGRESSION
VECTOR AUTOREGRESSION
POLYNOMIAL REGRESSION
LINEAR COMBINATION REGRESSION
KMEANS
KNN
LOGISTIC REGRESSION
NAIVE BAYES
NONLINEAR REGRESSION
FEEDFORWARD NETWORK
PRINCIPAL COMPONENT ANALYSIS
SUPPORT VECTOR MACHINE
DECISION TREE
LINEAR DISCRIMINANT ANALYSIS
GAUSSIAN MIXTURE MODEL
SAMMON MAPPING

For example, the SIMPLE LINEAR REGRESSION model type can be implemented via the model type 2613.1 corresponding to simple linear regression, where corresponding models are trained via simple linear regression model training function 2001, as discussed in further detail herein. As another example, the MULTIPLE LINEAR REGRESSION model type can be implemented via the model type 2613.2 corresponding to multiple linear regression, where corresponding models are trained via multiple linear regression model training function 2002, as discussed in further detail herein. As another example, the VECTOR AUTOREGRESSION model type can be implemented via the model type 2613.3 corresponding to vector autoregression, where corresponding models are trained via vector autoregression model training function 2003, as discussed in further detail herein. As another example, the POLYNOMIAL REGRESSION model type can be implemented via the model type 2613.4 corresponding to polynomial, where corresponding models are trained via polynomial regression model training function 2004, as discussed in further detail herein. As another example, the LINEAR COMBINATION REGRESSION model type can be implemented via the model type 2613.5 corresponding to linear combination regression, where corresponding models are trained via linear combination regression model training function 2005, as discussed in further detail herein. As another example, the KMEANS model type can be implemented via the model type 2613.6 corresponding to K Means, where corresponding models are trained via K means model training function 2006, as discussed in further detail herein. As another example, the KNN model type can be implemented via the model type 2613.7 corresponding to K nearest neighbors (KNN), where corresponding models are trained via KNN model training function 2007, as discussed in further detail herein. As another example, the NAIVE BAYES model type can be implemented via the model type 2613.8 corresponding to naive bayes, where corresponding models are trained via naive bayes model training function 2008, as discussed in further detail herein. As another example, the PRINCIPAL COMPONENT ANALYSIS model type can be implemented via the model type 2613.9 corresponding to principal component analysis (PCA), where corresponding models are trained via PCA regression model training function 2009, as discussed in further detail herein. As another example, the DECISION TREE model type can be implemented via the model type 2613.10 corresponding to decision trees, where corresponding models are trained via decision tree model training function 2010, as discussed in further detail herein. As another example, the NONLINEAR REGRESSION model type can be implemented via the model type 2613.11 corresponding to nonlinear regression, where corresponding models are trained via logistic regression model training function 2011, as discussed in further detail herein. As another example, the LOGISTIC REGRES- SION model type can be implemented via the model type 2613.12 corresponding to logistic regression, where corresponding models are trained via logistic regression model training function 2012, as discussed in further detail herein. As another example, the FEEDFORWARD NETWORK model type can be implemented via the model type 2613.13 corresponding to neural networks, where corresponding models are trained via feedforward neural network model training function 2013, as discussed in further detail herein. As another example, the SUPPORT VECTOR MACHINE model type can be implemented via the model type 2613.14 corresponding to support vector machines (SVMs), where corresponding models are trained via SVM model training function 2014, as discussed in further detail herein. As another example, the LINEAR DISCRIMINANT ANALYSIS model type can be implemented via the model type 2613.15 corresponding to linear discriminant analysis, where corresponding models are trained via LDA model training function 2015, as discussed in further detail herein. As another example, the GAUSSIAN MIXTURE MODEL model type can be implemented via the model type 2613.16 corresponding to gaussian mixture models, where corresponding models are trained via mixture model training function 2016, as discussed in further detail herein. As another example, the SAMMON MAPPING model type can be implemented via the model type 2613.17 corresponding to Sammon mapping, where corresponding models are trained via Sammon mapping model training function 2017, as discussed in further detail herein.

In some syntax configurations, <option list> can be a comma-separated list in the format '<option name 1>'→'<value 1>', '<option name 2>'→'<value2>'. In some syntax configurations, both the name and values must be enclosed in single quotes and are case sensitive with the exception that Boolean values may be any of true, false, TRUE, or FALSE. The <option list> can be implemented as the training parameter set 2658 of FIG. 26F.

In some syntax configurations, the <SQL select statement> that the model is built upon can be required to return rows that fit the specified model's requirements. For example, for the multiple linear regression model type, the first N columns are the independent variables and the last column is the dependent variable. The <SQL select statement> can be implemented as illustrated in FIG. 26E.

FIG. 26G illustrates an embodiment of a model function call 2640. Some or all features and/or functionality of the model function call 2640 of FIG. 26G can implement the model function call 2640 of FIG. 26B.

The model function call 2640 can include and/or indicate the model name 2611 as some or all of a model call keyword 2662. The model name 2611 implementing model call keyword 2662 can be as "one or more words, phrases, and/or alpha-numeric patterns set by the user in creating the respective model. The execution of the model via model function call 2640 can be implemented as a user defined function and/or custom built-in function definition that is distinct from the SQL keywords and/or keywords of another language utilized to implement some or all other portions of the query request 2602.

The model function call 2640 can alternatively or additionally include and/or indicate the model input selection parameters 2642 as a set of column identifiers 2627 and/or a row set identification clause 2628, denoting which columns of the identified set of rows be utilized as input to the model to render the corresponding output. For example, model output is generated for every row in the set of rows identified in row set identification clause 2628 as a function of their column values of the columns denoted by the set of column identifiers 2627.

The model function call 2640 can be implemented as and/or within a SQL SELECT statement, denoting output of the model be selected and/or returned as specified in other portions of the query request that include this SELECT statement.

Below is example syntax for a model function call 2640 in a query request 2602 implementing the features of FIG. 26G to execute a query against a machine learning model, for example, which was previously created via a function call to a machine learning model creation function and/or via another model training request 2610:

```
SELECT <model name>
(expression, ...)
FROM <tableReference>
```

In some embodiments, a trained model data 2620 for a given machine learning model can be dropped, and/or otherwise removed from storage and/or future usage, via executing a query request that includes a drop machine learning model function call, such as a DROP MLMODEL function call. Below is example syntax for a drop machine learning model function call utilized to denote a corresponding machine learning model of the given model name be removed from storage and/or be no longer accessible for calling in model function calls 2640:

DROP MLMODEL <model name>

FIGS. 26H-26K illustrate embodiments of a function library 2450 that includes an example plurality of model training functions 2621.1-2621.17. Some or all of the model training functions 2621.1-2621.17 can be utilized to implement some or all model training functions 2621.1-2621.H of FIG. 26C. Some or all corresponding model types 2613.1-2613.17 of FIG. 26T can implement any model types 2613 described herein.

As illustrated in FIG. 26H, function library 2450 can optionally include model training function 2621.1 that implements a simple linear regression model training function 2001, corresponding to a model type 2613.1 for simple linear regression. Calling of simple linear regression model training function 2001, and/or corresponding execution of simple linear regression model training function 2001 via model training operators 2634, can render training of model 2620 as a simple linear regression model accordingly.

In particular, the simple linear regression model training function 2001 can be implemented based on utilizing one independent variable and one dependent variable, where the relationship is linear. The training set 2622 used as input to the model can be required to have 2 numeric columns. For example, the first column is the independent variable (referred to as x), and the second column is the dependent variable (referred to as y). Executing the simple linear regression model training function 2001 can include finding the least squares best fit for y=ax+b.

The simple linear regression model training function 2001 can optionally have a configurable argument 2649.1.1, for example, corresponding to a metrics argument 2111. The configurable argument 2649.1.1 can be a Boolean value that, when TRUE, can cause collection of quality metrics such as the coefficient of determination (r2) and/or the root mean squared error (RMSE). The configurable argument 2649.1.1 can be an optional argument for simple linear regression model training function 2001, and can default to FALSE.

The configurable argument 2649.1.1 can optionally have a parameter name 2659 of "metrics".

Alternatively or in addition, the simple linear regression model training function 2001 can optionally have a configurable argument 2649.1.2, for example, corresponding to a y intercept argument 2112. The configurable argument 2649.1.2 can be a numeric value that, when present, can force a specific y-intercept (i.e. the model value when x is zero), corresponding to the desired y-intercept of the resulting best fit line. If not specified, the y-intercept is not forced to be any particular value and least squares will be used to find the best value. If the y-intercept is forced to a particular value, least squares instead finds the best fit with that constraint. The configurable argument 2649.1.2 can be an optional argument for simple linear regression model training function 2001. The configurable argument 2649.1.2 can optionally have a parameter name 2659 of "yIntercept".

Alternatively or in addition, the simple linear regression model training function 2001 can optionally have a configurable argument 2649.1.3, for example, corresponding to a threshold argument 2113. The configurable argument 2649.1.3 can be a positive numeric value that, when present, can enable soft thresholding. For example, once the coefficients are calculated, if any of them are greater than the threshold value, the threshold value is subtracted from them. If any are less than the negation of the threshold value, the threshold value is added to them. For any between the negative and positive threshold values, they are set to zero. The configurable argument 2649.1.3 can be an optional argument for simple linear regression model training function 2001. The configurable argument 2649.1.3 can optionally have a parameter name 2659 of "threshold".

Below is example syntax for a CREATE MLMODEL function called in model training request 2610 of a query request 2601 specifying the simple linear regression type 2613.1, and thus inducing execution of the simple linear regression model training function 2001 accordingly:

```
CREATE MLMODEL my_model
TYPE SIMPLE LINEAR REGRESSION ON (
  SELECT
    x1,
    y
  FROM public.my_table
  )
options(
  'yIntercept' -> '10',
  'metrics' -> 'true'
);
```

When executing the model after training, the corresponding model function call 2640 can take a single numeric argument representing x, where the model output generated via execution of model execution operators 2646 returns ax+b. Below is example syntax for a model function call 2640 in a query request 2602 to execute a query against a machine learning model that was previously created as having the simple linear regression type 2613.1 via execution of the simple linear regression model training function 2001:

```
SELECT my_model(col1) FROM my_table;
```

As illustrated in FIG. 26H, function library 2450 can alternatively or additionally include model training function 2621.2 that implements a multiple linear regression model training function 2002, corresponding to a model type 2613.2 for multiple linear regression. Calling of multiple linear regression model training function 2002, and/or corresponding execution of simple linear regression model training function 2002 via model training operators 2634, can render training of model 2620 as a multiple linear regression model accordingly.

In particular, the multiple linear regression model training function 2002 can be implemented based on implementing a vector of independent variables, where the dependent variable is a scalar valued function of the vector input that it is linear in all vector components. The training set 2633 used as input to the model can have C columns, which can be required to all be numeric. The first C−1 columns can be the independent variables (it can be considered a single independent variable that is a vector), where the last column is the dependent variable. Executing the multiple linear regression model training function 2002 can include finding the least squares best fit for y=a1*x1+a2*x2+ . . . +b (e.g. in vector notation, y=ax+b, where a and x are vectors and the multiplication is a dot product), for example, where the trained model data 2620 indicates tuned parameters 2622 as the selected values for a1-aC−1 and b.

The multiple linear regression model training function 2002 can optionally have a configurable argument 2649.2.1, for example, corresponding to a metrics argument 2121. The configurable argument 2649.2.1 can be a Boolean value that, when TRUE, can cause collection of quality metrics such as the coefficient of determination (r2), the adjusted coefficient of determination, and/or the root mean squared error (RMSE). The configurable argument 2649.2.1 can be an optional argument for multiple linear regression model training function 2002, and can default to FALSE. The configurable argument 2649.2.1 can optionally have a parameter name 2659 of "metrics".

Alternatively or in addition, the multiple linear regression model training function 2001 can optionally have a configurable argument 2649.2.2, for example, corresponding to a threshold argument 2122. The configurable argument 2649.2.2 can be a positive numeric value that, when present, can enable soft thresholding. For example, once the coefficients are calculated, if any of them are greater than the threshold value, the threshold value is subtracted from them. If any are less than the negation of the threshold value, the threshold value is added to them. For any between the negative and positive threshold values, they are set to zero. The configurable argument 2649.2.2 can be an optional argument for multiple linear regression model training function 2002. The configurable argument 2649.2.2 can optionally have a parameter name 2659 of "threshold".

Alternatively or in addition, the multiple linear regression model training function 2002 can optionally have a configurable argument 2649.2.3, for example, corresponding to a weighted argument 2123. The configurable argument 2649.2.3 can be a Boolean value that, if set to true, enables weighted least squares regression, where each sample has a weight/importance associated with it. In this case, there can be an extra numeric column after the dependent variable that has the weight for the sample. The configurable argument 2649.2.3 can be an optional argument for multiple linear regression model training function 2001 that defaults to FALSE. The configurable argument 2649.2.3 can optionally have a parameter name 2659 of "weighted".

Alternatively or in addition, the multiple linear regression model training function 2002 can optionally have a configurable argument 2649.2.4, for example, corresponding to a gamma argument 2124. The configurable argument 2649.2.4 can be a matrix value that, if specified, represents a Tikhonov gamma matrix used for regularization, utilized to facilitate performance of ridge regression. The configurable argument 2649.2.4 can be an optional argument for multiple linear regression model training function 2001. The configurable argument 2649.2.4 can optionally have a parameter name 2659 of "gamma".

Below is example syntax for a CREATE MLMODEL function called in model training request 2610 of a query request 2601 specifying the multiple linear regression type 2613.2, and thus inducing execution of the simple linear regression model training function 2002 accordingly:

```
CREATE MLMODEL my_model
TYPE MULTIPLE LINEAR REGRESSION ON (
  SELECT
    x1,
    x2,
    x3,
    y
  FROM public.my_table
  )
options(
  'metrics' -> 'true'
);
```

When executing the model after training, the corresponding model function call 2640 can denote the independent variables to be provided to the model function call, where the model output generated via execution of model execution operators 2646 returns the estimate of the dependent variable. Below is example syntax for a model function call 2640 in a query request 2602 to execute a query against a machine learning model that was previously created as having the multiple linear regression type 2613.2 via execution of the multiple linear regression model training function 2002:

```
SELECT my_model(col1, col2, col3) FROM my_table;
```

As illustrated in FIG. 26H, function library 2450 can alternatively or additionally include model training function 2621.3 that implements a vector autoregression model training function 2003, corresponding to a model type 2613.3 for vector autoregression. Calling of vector autoregression model training function 2003, and/or corresponding execution of vector autoregression model training function 2003 via model training operators 2634, can render training of model 2620 as a vector autoregression model accordingly.

In particular, the vector autoregression model training function 2003 can be implemented based on estimating the next value of multiple variables based on some number of lags of all the variables, as a group. For example, if there are 2 variables and 2 lags. The model is trying to build the following:

```
Estimate <x1(t), x2(t)> based on x1(t-1), x2(t-1), x1(t-2), and x2(t-2)
```

In this example, x1(t) means that value of x1 at time t, and x1(t−1) means the value of x1 and time t−1 (typically the previous sample time). The syntax <x1(t), x2(t)> is meant to demonstrate that the result of the models is a row vector containing all of the model's predictions, and that all predictions rely on all the lags of all the variables. When vector autoregression model training function 2003 is executed to create a corresponding model, the input training set 2633 can be required to have #lags+1 columns. All columns can be required to be row vectors of a size equal to the number of variables. The first columns can be the un-lagged values, for example {{x1, x2, x3}}. The second column can be the first lag, and the next column is the second lag, etc. It can be required to filter out the nulls, as matrices/vectors do not allow null elements.

The vector autoregression model training function 2003 can optionally have a configurable argument 2649.3.1, for example, corresponding to a number of variables argument 2131. The configurable argument 2649.3.1 can be a positive integer specifying the number of variables in the model. The configurable argument 2649.3.1 can be a required argument for vector autoregression model training function 2003. The configurable argument 2649.3.1 can optionally have a parameter name 2659 of "num Variables".

Alternatively or in addition, the vector autoregression model training function 2003 can optionally have a configurable argument 2649.3.2, for example, corresponding to a number of lags argument 2132. The configurable argument 2649.3.2 can be a positive integer specifying the number of lags in the model. The configurable argument 2649.3.2 can be a required argument for vector autoregression model training function 2003. The configurable argument 2649.3.2 can optionally have a parameter name 2659 of "numLags".

Alternatively or in addition, the vector autoregression model training function 2003 can optionally have a configurable argument 2649.3.3, for example, corresponding to a metrics argument 2133. The configurable argument 2649.3.3 can be a Boolean value that, when TRUE, can cause collection of quality metrics such as the coefficient of determination (r2). The configurable argument 2649.3.3 can be an optional argument for vector autoregression model training function 2003, and can default to FALSE. The configurable argument 2649.3.3 can optionally have a parameter name 2659 of "metrics".

Alternatively or in addition, the vector autoregression model training function 2003 can optionally have a configurable argument 2649.3.4, for example, corresponding to a threshold argument 2134. The configurable argument 2649.3.4 can be a positive numeric value that, when present, can enables soft thresholding. For example, once the coefficients are calculated, if any of them are greater than the threshold value, the threshold value is subtracted from them. If any are less than the negation of the threshold value, the threshold value is added to them. For any between the negative and positive threshold values, they are set to zero. The configurable argument 2649.3.4 can be an optional argument for vector autoregression model training function 2003. The configurable argument 2649.3.4 can optionally have a parameter name 2659 of "threshold".

Below is example syntax for a CREATE MLMODEL function called in model training request 2610 of a query request 2601 specifying the vector autoregression regression type 2613.3, and thus inducing execution of the vector autoregression model training function 2003 accordingly:

```
CREATE MLMODEL my_model
TYPE VECTOR AUTOREGRESSION ON (
  SELECT
    {{x1, x2, x3}},
    {{x1_lag1, x2_lag1, x3_lag1}},
    {{x1_lag2, x2_lag2, x3_lag2}},
    {{x1_lag3, x2_lag3, x3_lag3}},
    {{x1_lag4, x2_lag4, x3_lag4}}
```

-continued

```
  FROM (
    SELECT
      x1, x2, x3,
      LAG(x1, 1) OVER(ORDER BY t) as x1_lag1,
      LAG(x1, 2) OVER(ORDER BY t) as x1_lag2,
      LAG(x1, 3) OVER(ORDER BY t) as x1_lag3,
      LAG(x1, 4) OVER(ORDER BY t) as x1_lag4,
      LAG(x2, 1) OVER(ORDER BY t) as x2_lag1,
      LAG(x2, 2) OVER(ORDER BY t) as x2_lag2,
      LAG(x2, 3) OVER(ORDER BY t) as x2_lag3,
      LAG(x2, 4) OVER(ORDER BY t) as x2_lag4,
      LAG(x3, 1) OVER(ORDER BY t) as x3_lag1,
      LAG(x3, 2) OVER(ORDER BY t) as x3_lag2,
      LAG(x3, 3) OVER(ORDER BY t) as x3_lag3,
      LAG(x3, 4) OVER(ORDER BY t) as x3_lag4
      FROM public.my_table
      WHERE
        x1 IS NOT NULL and x2 IS NOT NULL and x3 IS NOT
NULL
        and
        x1_lag1 IS NOT NULL and x1_lag2 IS NOT NULL and
        x1_lag3 IS
      NOT NULL and x1_lag4 IS NOT NULL and
        x2_lag1 IS NOT NULL and x2_lag2 IS NOT NULL and
        x2_lag3 IS
      NOT NULL and x2_lag4 IS NOT NULL and
        x3_lag1 IS NOT NULL and x3_lag2 IS NOT NULL and
        x3_lag3 IS
      NOT NULL and x3_lag4 IS NOT NULL
      )
  )
options(
  'metrics' -> 'true',
  'numVariables' -> '3',
  'numLags' -> '4'
);
```

When executing the model after training, the number of arguments provided in corresponding model function call 2640 can be required to be equal to the number of lags the number of arguments provided must be equal to the number of lags. Each of those arguments can be required to be a row vector that contains lags for all model variables. The first argument can denote first lag, the second argument can denote the second lag, etc. In this example the unlagged value is utilized as the first lag, meaning that the model is configured to predict the next value.

Below is example syntax for a model function call 2640 in a query request 2602 to execute a query against a machine learning model that was previously created as having the vector autoregression type 2613.3 via execution of the vector autoregression model training function 2003:

```
SELECT my_model({{x1, x2, x3}},
  {{x1_lag1, x2_lag1, x3_lag1}},
  {{x1_lag2, x2_lag2, x3_lag2}},
  {{x1_lag3, x2_lag3, x3_lag3}},
  {{x1_lag4, x2_lag4, x3_lag4}}
  )
FROM (
  SELECT x1, x2, x3,
    LAG(x1, 1) OVER(ORDER BY t) as x1_lag1,
    LAG(x1, 2) OVER(ORDER BY t) as x1_lag2,
    LAG(x1, 3) OVER(ORDER BY t) as x1_lag3,
    LAG(x1, 4) OVER(ORDER BY t) as x1_lag4,
    LAG(x2, 1) OVER(ORDER BY t) as x2_lag1,
    LAG(x2, 2) OVER(ORDER BY t) as x2_lag2,
    LAG(x2, 3) OVER(ORDER BY t) as x2_lag3,
    LAG(x2, 4) OVER(ORDER BY t) as x2_lag4,
```

-continued

```
    LAG(x3, 1) OVER(ORDER BY t) as x3_lag1,
    LAG(x3, 2) OVER(ORDER BY t) as x3_lag2,
    LAG(x3, 3) OVER(ORDER BY t) as x3_lag3,
    LAG(x3, 4) OVER(ORDER BY t) as x3_lag4
  FROM my_table
);
```

As illustrated in FIG. 26H, function library 2450 can alternatively or additionally include model training function 2621.4 that implements a polynomial regression model training function 2004, corresponding to a model type 2613.4 for polynomial regression. Calling of polynomial regression model training function 2004, and/or corresponding execution of polynomial regression model training function 2004 via model training operators 2634, can render training of model 2620 as a polynomial regression model accordingly.

In particular, the polynomial regression model training function 2004 can be implemented based on one to many independent variables and one dependent variable, where the dependent variable is be modeled in terms of an nth degree polynomial of the independent variables. When polynomial regression model training function 2004 is executed to create a corresponding model, the training set 2633 can include C columns, which can be required to all be numeric. The first C−1 columns of the training set 2633 can be the independent variables (which can be considered a single independent variable that is a vector), and last column can be the dependent variable. Executing the polynomial regression model training function 2004 can include finding the least squares best fit of a sum of all possible combinations of terms that's degree is less than or equal to the value of the order option, denoted via a configurable parameter 2649. For example, with 2 independent variables (x1 and x2) and order set to 2, the model can be implemented as y=a1*x1^2+a2*x2^2+a3*x1*x2+a4*x1+a5*x2+b, where the trained model data 2620 indicates tuned parameters 2622 as the selected values for a1-a5 and b.

The polynomial regression model training function 2004 can optionally have a configurable argument 2649.4.1, for example, corresponding to an order argument 2141. The configurable argument 2649.4.1 can be a positive integer specifying the degree of the polynomial to use. The configurable argument 2649.4.1 can be a required argument for polynomial regression model training function 2004. The configurable argument 2649.4.1 can optionally have a parameter name 2659 of "order".

Alternatively or in addition, the polynomial regression model training function 2004 can optionally have a configurable argument 2649.4.2, for example, corresponding to a metrics argument 2142. The configurable argument 2649.4.2 can be a Boolean value that, when TRUE, can cause collection of quality metrics such as the coefficient of determination (r^2), the adjusted coefficient of determination, and/or the root mean squared error (RMSE). The configurable argument 2649.4.2 can be an optional argument for polynomial regression model training function 2004, and can default to FALSE. The configurable argument 2649.4.2 can optionally have a parameter name 2659 of "metrics".

Alternatively or in addition, the polynomial regression model training function 2004 can optionally have a configurable argument 2649.4.3, for example, corresponding to a threshold argument 2143. The configurable argument 2649.4.3 can be a positive numeric value that, when present, can enables soft thresholding. For example, once the coefficients are calculated, if any of them are greater than the threshold value, the threshold value is subtracted from them. If any are less than the negation of the threshold value, the threshold value is added to them. For any between the negative and positive threshold values, they are set to zero. The configurable argument 2649.4.3 can be an optional argument for polynomial regression model training function 2004. The configurable argument 2649.4.3 can optionally have a parameter name 2659 of “threshold”.

Alternatively or in addition, the polynomial regression model training function 2004 can optionally have a configurable argument 2649.4.4, for example, corresponding to a weighted argument 2144. The configurable argument 2649.4.4 can be a Boolean value that, if set to true, enables weighted least squares regression, where each sample has a weight/importance associated with it. In this case, there can be an extra numeric column after the dependent variable that has the weight for the sample. The configurable argument 2649.4.4 can be an optional argument for polynomial regression model training function 2004 that defaults to FALSE The configurable argument 2649.4.4 can optionally have a parameter name 2659 of “weighted”.

Alternatively or in addition, the polynomial regression model training function 2004 can optionally have a configurable argument 2649.4.5, for example, corresponding to a negative powers argument 2145. The configurable argument 2649.4.5 can be a Boolean value that, if TRUE, causes generation of the model to include independent variables raised to negative powers, for example, via implementation of Laurent polynomials. Execution of polynomial regression model training function 2004 can render generating of all possible terms such that the sum of the absolute value of the power of each term in each product is less than or equal to order. For example, with 2 independent variables and order set to 2, the model can be generated as: y=a1*x1^2+a2*x1^−2+a3*x2^2+a4*x2^−2+a5*x1*x2+a6*x1^-1*x2+a7*x1*x2^−1+a8*x1^−1*x2^−1+a9*x1+a10*x1^−1+a11*x2+a12*x2^−1+b. If this option is specified, the polynomial regression model training function 2004 can still generate the tuned parameter set 2622 with the restriction that the sum of the absolute value of the exponents in a term will be less than or equal to the value specified on the order option. Regardless of whether or not this negative powers option is used, the model can compute a coefficient for every possible term that meets this restriction. When this negative powers option is applied, the model will contain many more terms, and thus include more tuned parameters. For example a quadratic model over 2 independent variables has 6 terms, but when this negative powers option is used, the model has 13 terms. The configurable argument 2649.4.5 can be an optional argument for polynomial regression model training function 2004. The configurable argument 2649.4.6 can optionally have a parameter name 2659 of “negativePowers”.

Alternatively or in addition, the polynomial regression model training function 2004 can optionally have a configurable argument 2649.4.6, for example, corresponding to a gamma argument 2146. The configurable argument 2649.4.6 can be a matrix value that, if specified, represents a Tikhonov gamma matrix used for regularization, utilized to facilitate performance of ridge regression. The configurable argument 2649.4.6 can be an optional argument for polynomial regression model training function 2004. The configurable argument 2649.4.6 can optionally have a parameter name 2659 of “gamma”.

Below is example syntax for a CREATE MLMODEL function called in model training request 2610 of a query request 2601 specifying the polynomial regression type 2613.4, and thus inducing execution of the polynomial regression model training function 2004 accordingly:

```
CREATE MLMODEL my_model
TYPE POLYNOMIAL REGRESSION ON (
  SELECT
    x1,
    x2,
    x3,
    y
  FROM public.my_table
  )
options(
  'order' -> '3',
  'metrics' -> 'true'
);
```

When executing the model after training, the independent variables can be indicated in corresponding model function call 2640, where the model output generated via execution of model execution operators 2646 returns the estimate of the dependent variable.

Below is example syntax for a model function call 2640 in a query request 2602 to execute a query against a machine learning model that was previously created as having the polynomial regression type 2613.4 via execution of the polynomial regression model training function 2004:

```
SELECT my_model(col1, col2, col3) FROM my_table;
```

As illustrated in FIG. 26H, function library 2450 can alternatively or additionally include model training function 2621.5 that implements a linear combination regression model training function 2005, corresponding to a model type 2613.5 for linear combination regression. Calling of linear combination regression model training function 2005, and/or corresponding execution of linear combination regression model training function 2005 via model training operators 2634, can render training of model 2620 as a linear combination regression model accordingly.

In particular, the linear combination regression model training function 2005 can be implemented based on being built on top of m independent variables and a single dependent variable. However, unlike other examples, the function utilized to perform least-squares regression can be a linear combination of functions specified by the user. The general form can be y=c0+c1*f1(x1, x2, . . . )+f2(x1, x2, . . . )+ . . . , etc. The number of independent variables can be determined based on the number of columns in the training set 2633 over which the model is built, where the training set 2633 further includes a column for the dependent variable, and optionally includes may be a weight column for the weighted option. Thus, the number of independent variables can be either one or two less than the number of columns in the result of the input SQL statement (e.g. utilized to generate training set 2633). The number of user-specified functions for the model can be given by defining function1, function2, . . . keys in the options dictionary, for example, as a configurable parameter. As long as consecutive function key names exist, they can be included in the model. A constant term can always be included. The value strings for the function option keys can be specified in SQL syntax and can refer to x1, x2, . . . for the model input independent variables. The result set that is input to the model can have C columns, which can all be numeric. The first C−1 columns can be the independent variables, (e.g. this can be considered a single independent variable that is a vector), where the last column is the dependent variable. Executing the linear combination regression model training function 2005 can include finding the least squares best fit for a model of the form y=a1*f1(x1, x2, . . . xn)+a2*f2(x1, x2, . . . xn)+ . . . +an*fn(x1, x2, . . . xn), where f1, f2, . . . , fn are functions that are provided in a required option. For example, the trained model data 2620 indicates tuned parameters 2622 as the selected values for coefficients denoted in the set of fn functions.

The linear combination regression model training function 2005 can optionally have one or more configurable argument 2649.5.1, for example, corresponding to one or more function arguments 2151. For example, the first function (f1) can be required to be specified using a key named 'function1'. Subsequent functions can be required use keys with names that use subsequent values of N (e.g. 'function2', function3', etc.). Functions can be specified in SQL syntax, and can use the variables x1, x2, . . . , xn to refer to the 1st, 2nd, and nth independent variables respectively. For example: 'function1'→'sin(x1*x2+x3)', 'function2'→'cos(x1*x3)'. The configurable argument 2649.5.1 can be a required argument for linear combination regression model training function 2005, where the first one user-defined function is required, and where additional user-defined functions are optional. The configurable argument 2649.5.1 can optionally have a parameter name 2659 of "functionN", where N is specified as the given function (e.g. "function1", "function2", etc.)

Alternatively or in addition, the linear combination regression model training function 2005 can optionally have a configurable argument 2649.5.2, for example, corresponding to a metrics argument 2152. The configurable argument 2649.5.2 can be a Boolean value that, when TRUE, can cause collection of quality metrics such as the coefficient of determination (r2), the adjusted coefficient of determination, and/or the root mean squared error (RMSE). The configurable argument 2649.5.2 can be an optional argument for linear combination regression model training function 2005, and can default to FALSE. The configurable argument 2649.5.2 can optionally have a parameter name 2659 of "metrics".

Alternatively or in addition, the linear combination regression model training function 2005 can optionally have a configurable argument 2649.5.3, for example, corresponding to a threshold argument 2153. The configurable argument 2649.5.3 can be a positive numeric value that, when present, can enable soft thresholding. For example, once the coefficients are calculated, if any of them are greater than the threshold value, the threshold value is subtracted from them. If any are less than the negation of the threshold value, the threshold value is added to them. For any between the negative and positive threshold values, they are set to zero. The configurable argument 2649.5.3 can be an optional argument for linear combination regression model training function 2005. The configurable argument 2649.5.3 can optionally have a parameter name 2659 of "threshold".

Alternatively or in addition, the linear combination regression model training function 2005 can optionally have a configurable argument 2649.5.4, for example, corresponding to a weighted argument 2154. The configurable argument 2649.5.4 can be a Boolean value that, if set to true, enables weighted least squares regression, where each sample has a weight/importance associated with it. In this case, there can be an extra numeric column after the dependent variable that has the weight for the sample. The configurable argument 2649.5.4 can be an optional argument for linear combination regression model training function 2005 that defaults to FALSE The configurable argument 2649.5.4 can optionally have a parameter name 2659 of "weighted".

Alternatively or in addition, the linear combination regression model training function 2005 can optionally have a configurable argument 2649.5.5, for example, corresponding to a gamma argument 2156. The configurable argument 2649.5.5 can be a matrix value that, if specified, represents a Tikhonov gamma matrix used for regularization, utilized to facilitate performance of ridge regression. The configurable argument 2649.5.5 can be an optional argument for linear combination regression model training function 2005. The configurable argument 2649.5.5 can optionally have a parameter name 2659 of "gamma".

Below is example syntax for a CREATE MLMODEL function called in model training request 2610 of a query request 2601 specifying the linear combination regression type 2613.5, and thus inducing execution of the linear combination regression model training function 2005 accordingly:

```
CREATE MLMODEL my_model
TYPE LINEAR COMBINATION REGRESSION ON (
  SELECT
    x1,
    x2,
    x3,
    y1
  FROM public.my_table
  )
options(
  'function1' -> 'sin(x1 * x2 + x3)',
  'function2' -> 'cos(x1 * x3)'
);
```

When executing the model after training, the independent variables can be indicated in corresponding model function call 2640, where the model output generated via execution of model execution operators 2646 returns the estimate of the dependent variable.

Below is example syntax for a model function call 2640 in a query request 2602 to execute a query against a machine learning model that was previously created as having the linear combination regression type 2613.5 via execution of the linear combination regression model training function 2005:

```
SELECT my_model(col1, col2, col3) FROM my_table;
```

As illustrated in FIG. 26I, function library 2450 can alternatively or additionally include model training function 2621.6 that implements a K Means model training function 2006, corresponding to a model type 2613.6 for K Means. Calling of K Means model training function 2006, and/or corresponding execution of K Means model training function 2006 via model training operators 2634, can render training of model 2620 as a K Means model accordingly.

In particular, the K Means model training function 2006 can be implemented as an unsupervised clustering algorithm, where all of the columns in the input result set are features, and/or where there is no label. All of the input columns can be required to be numeric. Executing the K Means model training function 2006 can include finding k points such that all points are classified by which of the k points is closest, where corresponding distance calculations are computed as Euclidean distances. The resulting points, and set of rows closest to each resulting point, can denote corresponding "classification" of the points into auto-generated groupings, due to the algorithm being implemented in an unsupervised format where no classification and/or no dependent variable is specified.

The K Means model training function 2006 can optionally have configurable argument 2649.6.1, for example, corresponding to a k argument 2161. The configurable argument 2649.6.1 be a positive integer denoting how many clusters are created in executing the corresponding K Means algorithm. The configurable argument 2649.6.1 can be a required argument for K Means model training function 2006. The configurable argument 2649.6.1 can optionally have a parameter name 2659 of "k".

Alternatively or in addition, the K Means model training function 2006 can optionally have a configurable argument 2649.6.2, for example, corresponding to an epsilon argument 2162. The configurable argument 2649.6.2 can be a positive floating point value that, if specified, denotes that when the maximum distance that a centroid moved from one iteration of the algorithm to the next is less than this value, the algorithm will terminate. The configurable argument 2649.6.2 can be an optional argument for K Means model training function 2006, and can optionally default to 1e−8. The configurable argument 2649.6.2 can optionally have a parameter name 2659 of "epsilon".

Below is example syntax for a CREATE MLMODEL function called in model training request 2610 of a query request 2601 specifying the K Means type 2613.6, and thus inducing execution of the K Means model training function 2006 accordingly:

```
CREATE MLMODEL my__model
TYPE K MEANS ON (
  SELECT
    x1,
    x2,
    x3,
    x4
  FROM public.my__table
  )
options(
  'k' -> 8'
);
```

Because there are optionally no labels for clusters, when executing this function after training with the same number (and/or same order) of features as input, the model output generated via execution of model execution operators 2646 can denote an integer that specifies the cluster to which the point belongs (e.g. denoting its corresponding classification).

Below is example syntax for a model function call 2640 in a query request 2602 to execute a query against a machine learning model that was previously created as having the K Means type 2613.6 via execution of the K Means model training function 2006:

```
SELECT my__model(x1, x2, x3, x4) FROM my__table;
```

As illustrated in FIG. 26I, function library 2450 can alternatively or additionally include model training function 2621.7 that implements a KNN model training function 2007, corresponding to a model type 2613.7 for KNN. Calling of KNN model training function 2007, and/or corresponding execution of KNN model training function 2007 via model training operators 2634, can render training of model 2620 as a KNN model accordingly.

In particular, the KNN model training function 2007 can be implemented as a classification algorithm. The first C−1 input columns of the training set 2633 can be implemented as the features, which can be required to be numeric. The last input column of the training set 2633 can be implemented as a label, which can be of any data type. There is optionally not a training step for KNN. Instead, when the model is created via KNN model training function 2007, a copy of all input data is saved to a table, for example, via a CTAS operation. Thus, when the model is called in a later model function call 2640 in a query request 2602 (e.g. in a later SQL statement), a snapshot of the data utilized in the model execution is available via accessing this saved table. The user can optionally override both the weight function and the distance function utilized in performing the KNN classification via configurable arguments 2649.

The KNN model training function 2007 can optionally have configurable argument 2649.7.1, for example, corresponding to a k argument 2171. The configurable argument 2649.7.1 be a positive integer denoting how many closest points to utilize for classifying a new point. The configurable argument 2649.7.1 can be a required argument for KNN model training function 2007. The configurable argument 2649.7.1 can optionally have a parameter name 2659 of "k".

Alternatively or in addition, the KNN model training function 2007 can optionally have a configurable argument 2649.7.2, for example, corresponding to a distance argument 2172. The configurable argument 2649.7.2 can be implemented via a function in SQL syntax that, if specified, is utilized to calculate the distance between a point being classified and points in the training data set. This function can be implemented using the variables x1, x2, . . . for the 1st, 2nd, . . . features in the training data 2633 (e.g. the first C−1 columns), and p1, p2, . . . for the features in the point being classified. The configurable argument 2649.7.2 can be an optional argument for KNN model training function 2007, where the default function utilized to compute distance can default to Euclidian distance. The configurable argument 2649.7.2 can optionally have a parameter name 2659 of "distance".

Alternatively or in addition, the KNN model training function 2007 can optionally have a configurable argument 2649.7.3, for example, corresponding to a weight argument 2173. The configurable argument 2649.7.3 can be implemented via a function in SQL syntax that, if specified is utilized to if present, compute the weight for a neighbor. This function can be implemented using the variable d for distance to calculate the distance between a point being classified and points in the training data set. The configurable argument 2649.7.3 can be an optional argument for KNN model training function 2007, where the default function utilized to compute the weight of a neighbor can be is set to 1/d. The configurable argument 2649.7.3 can optionally have a parameter name 2659 of "weight".

Alternatively or in addition, the KNN model training function 2007 can optionally have a configurable argument 2649 corresponding to a maximum snapshot size, for example, specifying a maximum number of rows and/or maximum size relative to the training set. Alternatively or in addition, the KNN model training function 2007 can optionally have a configurable argument 2649 corresponding to a minimum snapshot size, for example, specifying a minimum number of rows and/or minimum size relative to the training set. Alternatively or in addition, the KNN model training function 2007 can optionally have a configurable argument 2649 corresponding to a fixed snapshot size, for example, specifying a fixed number of rows and/or fixed size relative to the training set. For example, the trained model data for the KNN model corresponds to a reduced dataset having a size constrained based on this one or more configurable arguments 2649.

Alternatively or in addition, the KNN model training function 2007 can optionally have a configurable argument 2649 corresponding to a minimum accuracy, for example, specifying a minimum percentage. Alternatively or in addition, the KNN model training function 2007 can optionally have a configurable argument 2649 indicating how validation of the model be performed (e.g. percentage of training set rows to be used for validation, a separate validation set of rows, whether cross-validation be performed, parameters configuring the cross-validation, etc.). For example, the trained model data for the KNN model corresponds to a reduced dataset configured to meet this minimum accuracy based on this one or more configurable arguments 2649.

Below is example syntax for a CREATE MLMODEL function called in model training request 2610 of a query request 2601 specifying the KNN type 2613.7, and thus inducing execution of the KNN model training function 2007 accordingly:

```
CREATE MLMODEL my_model
TYPE KNN ON (
  SELECT
    x1,
    x2,
    x3,
    y1
  FROM public.my_table
  )
options(
  'k' -> 8'
  'distance' -> 'power(x1 - p1, 2) + power(x2 - p2, 2) + power(x3 - p3,
    2)'
);
```

When executing the model after training, it can be called with C−1 features as input. The model output generated via execution of model execution operators 2646 can denote a label, for example, by choosing the label from the class with the highest score computed when executing the model execution operators 2646, specifying the classification of the corresponding input row.

Below is example syntax for a model function call 2640 in a query request 2602 to execute a query against a machine learning model that was previously created as having the KNN type 2613.7 via execution of the KNN model training function 2007:

```
SELECT my_model(x1, x2, x3) FROM my_table;
```

In some embodiments, training KNN model via KNN training function 2007 and/or executing a query against a machine learning model that was previously created as having the KNN type 2613.7 can be based on implementing some or all features and/or functionality of the K-nearest neighbors classification algorithm of U.S. Utility application Ser. No. 16/838,459. For example, a new row is classified in executing a query against a machine learning model that was previously created as having the KNN type 2613.7 based on iteratively searching higher ordered neighbor search spaces until K rows are identified, for example, based on implementing an ith order neighbor set generator 2951 to generate an ith order neighboring search space data set **2975-*i*** in a given iteration i of a corresponding process via some or all features and/or functionality disclosed in FIGS. 29A-29G of U.S. Utility application Ser. No. 16/838,459.

As illustrated in FIG. 26I, function library 2450 can alternatively or additionally include model training function 2621.8 that implements a naive bayes model training function 2008, corresponding to a model type 2613.8 for naive bayes. Calling of naive bayes model training function 2008, and/or corresponding execution of naive bayes model training function 2008 via model training operators 2634, can render training of model 2620 as a naive bayes model accordingly.

In particular, the naive bayes model training function 2008 can be implemented as a classification algorithm, where the first C−1 input columns of the training set 2633 can be implemented as feature columns, which can be of any data type and can corresponding to discrete or continuous variables. The last input column of the training set 2633 can be implemented as a label, which can be required to be a discrete data type. When continuous feature columns are used, these columns can be specified via one or more configurable arguments 2649. The naive bayes model training function 2008 can be implemented based on assuming that all the features are equally important in the classification and that there is no correlation between features. With these assumptions, corresponding frequency information can be computed and saved to one or more tables (e.g. 3 tables) for example, via a CTAS operation. Thus, when the model is called in a later model function call 2640 in a query request 2602 (e.g. in a later SQL statement), this frequency data is available via accessing these one or more saved tables.

The naive bayes model training function 2008 can optionally have configurable argument 2649.8.1, for example, corresponding to a metrics argument 2181. The configurable argument 2649.8.1 can be a Boolean value that, when TRUE, can cause calculating of the percentage of samples that are correctly classified by the model, where this data is optionally saved this in a catalog table. The configurable argument 2649.8.1 can be an optional argument for naive bayes model training function 2008, and can default to FALSE. The configurable argument 2649.8.1 can optionally have a parameter name 2659 of "metrics".

Alternatively or in addition, the naive bayes model training function 2008 can optionally have a configurable argument 2649.8.2, for example, corresponding to a continuous features argument 2182. The configurable argument 2649.8.2, if set, can be implemented via a comma-separated list of the feature indexes that are continuous numeric variables (e.g. indexes start with 1). The configurable argument 2649.8.2 can be an optional argument for naive bayes model training function 2008. The configurable argument 2649.8.2 can optionally have a parameter name 2659 of "continuousFeatures".

Below is example syntax for a CREATE MLMODEL function called in model training request 2610 of a query request 2601 specifying the naive bayes type 2613.8, and thus inducing execution of the naive bayes model training function 2008 accordingly:

```
CREATE MLMODEL my__model
TYPE NAIVE BAYES ON (
  SELECT
    x1,
    x2,
    x3,
    y1
  FROM public.my__table
  )
options(
  'continousFeatures -> '1, 3'
);
```

When executing the model after training, it can be called with C−1 features as input. The model output generated via execution of model execution operators 2646 can denote a label, corresponding to the most likely classification, with the highest probability, given prior knowledge of the feature values. In other words, this can be the class y that has the highest value of P(y|x1, x2, . . . , xn)

Below is example syntax for a model function call 2640 in a query request 2602 to execute a query against a machine learning model that was previously created as having the naive bayes type 2613.8 via execution of the naive bayes model training function 2008:

```
SELECT my__model(col1, col2, col3) FROM my__table;
```

As illustrated in FIG. 26I function library 2450 can alternatively or additionally include model training function 2621.9 that implements a PCA training function 2009, corresponding to a model type 2613.9 for PCA. Calling of PCA training function 2009, and/or corresponding execution of PCA training function 2009 via model training operators 2634, can render training of model 2620 as a principal component analysis (PCA) model accordingly.

In some or all cases, the PCA training function 2009 can be implemented to generate a PCA model for use upon on the inputs to other models, for example, rather than being implemented as a model on its own. As a particular example, a trained PCA model generated via PCA training function 2009 can be applied to a raw and/or pre-processed set of rows to be utilized as training set 2633 and/or input data 2645, for example, based on the trained PCA model being called in training set selection parameters of a query request 2602 for building of another type of model and/or based on the trained PCA model being called in model input selection parameters 2642 of a query request 2602 for executing of another type of model.

In particular, a trained PCA model can serve the purpose of normalize all the numeric feature data utilized as model input to another model. This can be useful because some types of models can be sensitive to the scale of numeric features, and when different features have different scales, the results end up skewed. PCA training function 2009 can be implemented to normalize all features of input data (e.g. to another type of model) to the same scale.

Alternatively or in addition, a trained PCA model can serve the purpose of enabling dimensionality reduction. For example, PCA can be implemented to compute linear combinations of original features to render smaller number of new features.

The training set 2633 for the PCA training function 2009 can include C numeric columns that are all features/independent variables. For example, there is no corresponding label and/or dependent variable. After creating a PCA model, a corresponding catalog table can be created and stored to contain information on the percentage of the signal that is in each PCA feature, for example, via a CTAS operation. This can be used to determine how many of the output features to keep, for example, when applied to generate another type of model. For example, when the PCA model is called in a later model function call 2640 in a query request 2602 (e.g. when training another type of model via another query request 2601), this catalog table is available via accessing this saved catalog table.

The PCA training function 2009 can optionally have no configurable arguments 2649. In other embodiments, the PCA training function 2009 is configurable via one or more configurable arguments 2649.

Below is example syntax for a CREATE MLMODEL function called in model training request 2610 of a query request 2601 specifying the PCA type 2613.9, and thus inducing execution of the PCA training function 2009 accordingly:

```
CREATE MLMODEL reduceTo2
TYPE PRINCIPAL COMPONENT ANALYSIS ON (
  SELECT
    c1,
    c2,
    c3
  FROM public.my__table
);
```

The resulting model reduceTo2 in this example can be implemented, for example, if there are 3 features and it is desirable to reduce to 2 features for training of another model. For example, the resulting example model reduceTo2 can be called to train a logistic regression model. Below is example syntax for a CREATE MLMODEL function called in model training request 2610 of a query request 2601 specifying a logistic regression type that calls the example reduceTo2 model:

```
CREATE MLMODEL binaryClass
TYPE LOGISTIC REGRESSION ON (
  SELECT
    reduceTo2 (c1, c2, c3, 1)
    reduceTo2 (c1, c2, c3, 2)
  FROM [...]
);
```

When executing a model after training that was created via use of the PCA model, for correct execution, the original features are passed through the PCA model when calling the new model. Below is example syntax for a model function call 2640 in a query request 2602 to execute a query against this example binaryClass model:

```
SELECT
  binaryClass
    reduceTo2 (x1, x2, x3, 1)
    reduceTo2 (x1, x2, x3, 2)
FROM [...]
```

Below is example syntax for a CREATE MLMODEL function called in model training request 2610 of a query request 2601 specifying the PCA type 2613.9, and thus inducing execution of the PCA training function 2009 accordingly, where the PCA analysis is performed over 4 variables:

```
CREATE MLMODEL my_model
TYPE PRINCIPAL COMPONENT ANALYSIS ON (
  SELECT
    c1,
    c2,
    c3,
    c4
  FROM public.my_table
);
```

When executing a model after training that was created via use of the PCA model, the user can be required to provide the same original input features in the same order, followed by a positive integer argument which specifies which PCA component they want returned, for example, to render correct execution. The PCA component index starts at 1. Below is example syntax for a model function call 2640 in a query request 2602 to execute a query against this example PCA model:

```
SELECT
  my_model(col1, col2, col3, col4, 2) as component2,
  my_model(col1, col2, col3, col4, 3) as component3,
FROM public.my_table;
```

As illustrated in FIG. 26I, function library 2450 can alternatively or additionally include model training function 2621.10 that implements a decision tree model training function 2010, corresponding to a model type 2613.10 for decision trees. Calling of decision tree model training function 2010, and/or corresponding execution of decision tree model training function 2010 via model training operators 2634, can render training of model 2620 as a decision tree model accordingly.

In particular, the decision tree model training function 2010 can be implemented as a classification algorithm. The first C−1 input columns of training set 2633 can be features and can be implemented any data type. All non-numeric features can require to be discrete and/or can be required to contain no more than a configured maximum number of unique values, for example, configured as configurable argument 2649 corresponding to a distinct count limit. This limit can be implemented to prevent the internal model representation from growing too large. Numeric features can be discrete by default, and can have the same limitation on number of unique values, but they can optionally be marked as continuous. For continuous features, the decision tree can be built by dividing the values into two ranges instead of using discrete, unique values. The last input column can be implemented the label and can be any data type. The label can also be required to have also have no more than the configured maximum number of unique values. When creating the model, all the features are optionally passed in first, where the label is passed in last.

The decision tree model training function 2010 can optionally have configurable argument 2649.10.1, for example, corresponding to a metrics argument 2201. The configurable argument 2649.10.1 can be a Boolean value that, when TRUE, can cause calculating of the percentage of samples that are correctly classified by the model, where this data is optionally saved this in a catalog table. The configurable argument 2649.10.1 can be an optional argument for decision tree model training function 2010, and can default to FALSE. The configurable argument 2649.10.1 can optionally have a parameter name 2659 of "metrics".

Alternatively or in addition, the decision tree model training function 2010 can optionally have a configurable argument 2649.10.2, for example, corresponding to a continuous features argument 2202. The configurable argument 2649.10.2, if set, can be implemented via a comma-separated list of the feature indexes that are continuous numeric variables (e.g. indexes start with 1). The configurable argument 2649.10.2 can be an optional argument for decision tree model training function 2010. The configurable argument 2649.10.2 can optionally have a parameter name 2659 of "continuousFeatures".

Alternatively or in addition, the decision tree model training function 2010 can optionally have a configurable argument 2649.10.3, for example, corresponding to a distinct count limit argument 2203. The configurable argument 2649.10.3, if set, can be implemented via a positive integer, setting the limit for how many distinct values a non-continuous feature and the label may contain. The configurable argument 2649.10.2 can be an optional argument for decision tree model training function 2010, and can optionally have a default value of 256. The configurable argument 2649.10.2 can optionally have a parameter name 2659 of "distinctCountLimit".

Below is example syntax for a CREATE MLMODEL function called in model training request 2610 of a query request 2601 specifying the decision tree type 2613.10, and thus inducing execution of the decision tree model training function 2010 accordingly:

```
CREATE MLMODEL my_model
TYPE DECISION TREE ON (
  SELECT
    c1,
    c2,
    c3,
    y1
  FROM public.my_table
  )
);
```

When executing the model after training, it can be called with C−1 features as input. The model output generated via execution of model execution operators 2646 can denote a label, corresponding to the expected label. Below is example syntax for a model function call 2640 in a query request 2602 to execute a query against a machine learning model that was previously created as having the decision tree type 2613.10 via execution of the decision tree model training function 2010:

```
SELECT my_model(col1, col2, col3) FROM my_table;
```

Figure 26J:
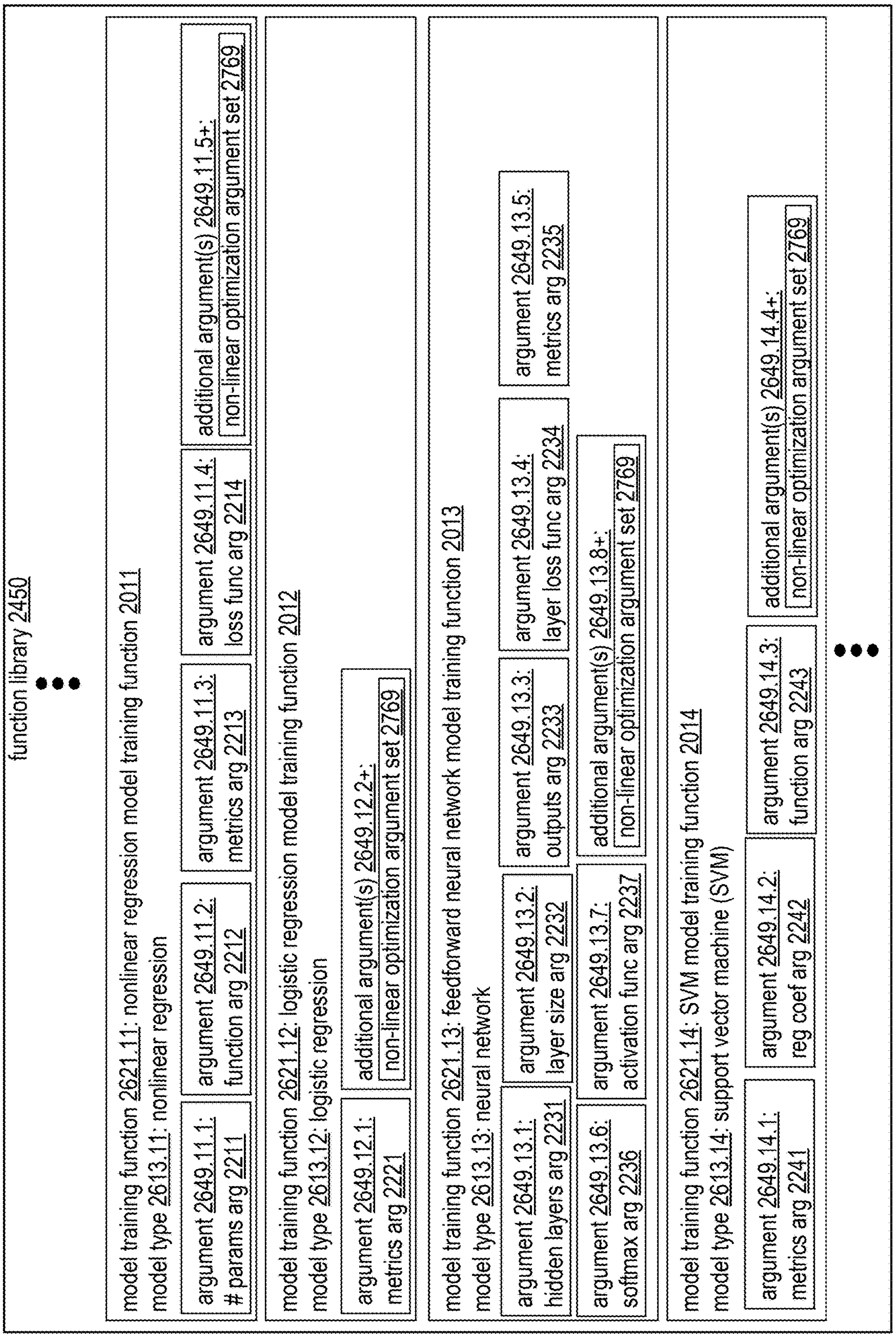

As illustrated in FIG. 26J, function library 2450 can alternatively or additionally include model training function 2621.11 that implements a nonlinear regression model training function 2011, corresponding to a model type 2613.11 for nonlinear regression. Calling of nonlinear regression model training function 2011, and/or corresponding execution of nonlinear regression model training function 2011 via model training operators 2634, can render training of model 2620 as a nonlinear regression model accordingly.

In particular, the nonlinear regression model training function 2011 can be implemented to find best fit parameters of an arbitrary (e.g. user-defined) function, for example, utilizing an arbitrary (e.g. user-defined) defined loss function. This model type can be optionally implemented to provide direct access to capabilities that both logistic regression and support vector machines rely on. The first C−1 columns of training set 2633 can be implemented as numeric independent variables, and the last column of training set 2633 can be implemented as the numeric dependent variable. Executing nonlinear regression model training function 2011 can include finding a best fit of the arbitrary function to the training set 2633 using a negative log likelihood loss function. Executing nonlinear regression model training function 2011 to find this best fit of the arbitrary function can include performing a nonlinear optimization process, for example, via some or all functionality described in conjunction with FIGS. 27A-27N.

The nonlinear regression model training function 2011 can optionally have configurable argument 2649.11.1, for example, corresponding to a number of parameters argument 2211. The configurable argument 2649.11.1 can set to a positive integer, denoting how many different parameters there are to optimize, i.e. how many coefficients c1-cN there are in the user-specified function. The configurable argument 2649.11.1 can be a required argument for nonlinear regression model training function 2011. The configurable argument 2649.11.1 can optionally have a parameter name 2659 of “numParameters”. Note that as used herein, “coefficients” c1-cN can be implemented as any constants/variables/parameters in the respective equation, optionally having unknown value until their values are tuned during model training, where their tuned values are applied when the model is executed upon new data.

Alternatively or in addition, the nonlinear regression model training function 2011 can optionally have a configurable argument 2649.11.2, for example, corresponding to a function argument 2212. The configurable argument 2649.11.2 can specify the function to fit to the data of training set 2633, for example, in SQL syntax. In particular, the configurable argument 2649.11.2 can be required to use a1, a2, . . . to refer to the parameters to be optimized, and/or can be required to use x1, x2, . . . to refer to the input features. In some embodiments, some SQL functions are not allowed, for example, where only scalar expressions that can be represented internally as postfix expressions are allowed. Most notably, this optionally means that some functions that get rewritten as CASE statements (like least( ) and greatest( )) are not allowed. If the function is not allowed, an error message can be emitted and/or displayed to a corresponding user providing the query request 2601. The configurable argument 2649.11.2 can be a required argument for nonlinear regression model training function 2011. The configurable argument 2649.11.2 can optionally have a parameter name 2659 of “function”.

The nonlinear regression model training function 2011 can optionally have configurable argument 2649.11.3, for example, corresponding to a metrics argument 2213. The configurable argument 2649.11.3 can be a Boolean value that, when TRUE, can cause calculating the coefficient of determination (r2), the adjusted r2, and/or the root mean squared error (RMSE). These quality metrics are optionally computed using the least squares loss function, and not the user specified loss function of configurable argument 2649.11.4. The configurable argument 2649.11.3 can be an optional argument for nonlinear regression model training function 2011, and can default to FALSE. The configurable argument 2649.11.3 can optionally have a parameter name 2659 of “metrics”.

Alternatively or in addition, the nonlinear regression model training function 2011 can optionally have a configurable argument 2649.11.4, for example, corresponding to a loss function argument 2214. The configurable argument 2649.11.4, if set, specify what loss function to use on a per sample basis, for example, when performing a nonlinear optimization process. The actual loss function can then be implemented as the sum of this function applied to all samples. The loss function can be defined via using the variable y to refer to the dependent variable in the training data and/or can be required to use the variable f to refer to the computed estimate for a given sample. The configurable argument 2649.11.4 can be an optional argument for nonlinear regression model training function 2011, with a default of default is least squares, which could be specified as double((f−y)*(f−y)). The configurable argument 2649.11.4 can optionally have a parameter name 2659 of “lossFunction”.

Alternatively or in addition, the nonlinear regression model training function 2011 can optionally have one or more additional configurable arguments 2649.11.5, for example, corresponding to a nonlinear optimization argument set 2769. The one or more configurable arguments 2649.11.5 can be implemented via some or all configurable arguments 2649 of the nonlinear optimization argument set 2769 presented in conjunction with FIG. 27N, and/or can be implemented to set various parameters utilized in executing a nonlinear optimization process as part of executing nonlinear regression model training function 2011, for example, via some or all functionality described in conjunction with FIGS. 27A-27N. This one or more additional configurable arguments 2649.11.5 can be optional arguments for nonlinear regression model training function 2011.

Below is example syntax for a CREATE MLMODEL function called in model training request 2610 of a query request 2601 specifying the nonlinear regression type 2613.11, and thus inducing execution of the nonlinear regression model training function 2011 accordingly:

```
CREATE MLMODEL my_model
TYPE NONLINEAR REGRESSION ON (
  SELECT
    x1,
    x2,
    y1
  FROM public.my_table
  )
options(
  'numParameters' -> '5';
  'function' -> 'a1 * sin(a2 * x1 + a3) + a4 + a5 * x2'
);
```

When executing the model after training, it can be called with C−1 features as input. The model output generated via execution of model execution operators 2646 can denote the value outputted via execution of the corresponding function (e.g. the value of y) based on applying the tuned parameters a1-a5 in this example generated during training. Below is example syntax for a model function call 2640 in a query request 2602 to execute a query against a machine learning model that was previously created as having the nonlinear regression type 2613.11 via execution of the nonlinear regression model training function 2011:

```
SELECT my_model(x1, x2) FROM my_table;
```

As illustrated in FIG. 26J, function library 2450 can alternatively or additionally include model training function 2621.12 that implements a logistic regression model training function 2012, corresponding to a model type 2613.12 for logistic regression. Calling of logistic regression model training function 2012, and/or corresponding execution of logistic regression model training function 2012 via model training operators 2634, can render training of model 2620 as a logistic regression model accordingly.

In particular, the logistic regression model training function 2012 can be implemented as a binary classification algorithm implemented via applying a logistic curve to the data of training set 2633 such that when the value >=0.5, the result is one class, and when it's <0.5, it's the other class. The first C−1 input columns of training set 2633 can be features and/or can be required to be numeric. Features can optionally be one-hot encoded. The last input column can be implemented as the class or label, where it can be required that there be exactly 2 non-null labels in this column of training set 2633 used to create the model. Executing logistic regression model training function 2012 can include finding a best fit of the logistic curve to the training set 2633 using a negative log likelihood loss function. Executing logistic regression model training function 2012 to find this best fit of the logistic curve can include performing a nonlinear optimization process, for example, via some or all functionality described in conjunction with FIGS. 27A—27N. For example, executing logistic regression model training function 2012 can be based on applying an adapted version of nonlinear regression model training function 2011, where the function is automatically set as a logistic function, and/or where the loss function is automatically set as the negative log likelihood loss function.

The logistic regression model training function 2012 can optionally have configurable argument 2649.12.1, for example, corresponding to a metrics argument 2223. The configurable argument 2649.12.1 can be a Boolean value that, when TRUE, can cause calculating model will also calculate the percentage of samples that are correctly classified by the model, for example, to be saved in a catalog table. The configurable argument 2649.12.1 can be an optional argument for logistic regression model training function 2012, and can default to FALSE. The configurable argument 2649.12.1 can optionally have a parameter name 2659 of "metrics".

Alternatively or in addition, the logistic regression model training function 2012 can optionally have one or more additional configurable arguments 2649.12.2, for example, corresponding to a nonlinear optimization argument set 2769. The one or more configurable arguments 2649.12.2 can be implemented via some or all configurable arguments 2649 of the nonlinear optimization argument set 2769 presented in conjunction with FIG. 27N, and/or can be implemented to set various parameters utilized in executing a nonlinear optimization process as part of executing logistic regression model training function 2012, for example, via some or all functionality described in conjunction with FIGS. 27A-27N. This one or more additional configurable arguments 2649.12.2 can be optional arguments for logistic regression model training function 2012.

Below is example syntax for a CREATE MLMODEL function called in model training request 2610 of a query request 2601 specifying the logistic regression type 2613.12, and thus inducing execution of the logistic regression model training function 2012 accordingly:

```
CREATE MLMODEL my_model
TYPE LOGISTIC REGRESSION ON (
```

-continued

```
    SELECT
      x1,
      x2,
      x3,
      y1
    FROM public.my_table
    )
  options(
    'metrics' -> 'true';
  );
```

When executing the model after training, it can be called with C−1 features as input. The model output generated via execution of model execution operators 2646 can denote the label outputted via execution of the corresponding tuned logistic function. Below is example syntax for a model function call 2640 in a query request 2602 to execute a query against a machine learning model that was previously created as having the logistic regression type 2613.12 via execution of the logistic regression model training function 2012:

```
SELECT my_model(col1, col2, col3) FROM my_table;
```

As illustrated in FIG. 26J, function library 2450 can alternatively or additionally include model training function 2621.13 that implements a feedforward neural network model training function 2013, corresponding to a model type 2613.13 for feedforward neural networks. Calling of feedforward neural network model training function 2013, and/or corresponding execution of feedforward neural network model training function 2013 via model training operators 2634, can render training of model 2620 as a feedforward neural network model accordingly.

In particular, the feedforward neural network model training function 2013 can utilized to build a neural network model where data moves from the inputs through hidden layers and to the outputs. The number of inputs can be determined by the first columns in the input training set 2633. Each input can be required to be numeric. The last one or more columns in the input result set can be implemented as the target variable. For models with 1 output, this is can be required to be a numeric column. For models with multiple outputs, this can be required to be a 1×N matrix (e.g. a row vector). In particular, such multiple output models can be utilized to implement multi-class classification, where the multiple outputs are one-hot encoded values that represent the class of the record. Model results can be used with an argmax function to select the highest probability class. Alternatively or in addition, these multiple output models can be utilized to implement probability modeling, where the multiple output values represent probabilities between 0 and 1 that sum to 1. As another example, these multiple output models can be utilized to implement multiple numeric prediction, where the multiple output values represent different numeric values to predict against. A custom loss functions can be required and/or utilized in this case.

Executing feedforward neural network model training function 2013 to generate a corresponding feedforward neural network can include performing a nonlinear optimization process, for example, via some or all functionality described in conjunction with FIGS. 27A—27N. For example, executing feedforward neural network model training function 2013 can be based on applying an adapted version of nonlinear regression model training function 2011 to configure weights between nodes of hidden layers in a similar fashion as selecting coefficient values in training the nonlinear regression model, for example, to enable tuning of these respective parameters during training via the nonlinear optimization process.

The feedforward neural network model training function 2013 can optionally have configurable argument 2649.13.1, for example, corresponding to a hidden layers argument 2231. The configurable argument 2649.13.1 can be set to a positive integer, specifying how many hidden layers to use. The configurable argument 2649.13.1 can be a required argument for feedforward neural network model training function 2013. The configurable argument 2649.13.1 can optionally have a parameter name 2659 of "hiddenLayers".

The feedforward neural network model training function 2013 can optionally have configurable argument 2649.13.2, for example, corresponding to a hidden layers size argument 2232. The configurable argument 2649.13.2 can be set to a positive integer, specifying how many nodes to include in each hidden layer. The configurable argument 2649.13.2 can be a required argument for feedforward neural network model training function 2013. The configurable argument 2649.13.2 can optionally have a parameter name 2659 of "hiddenLayerSize".

The feedforward neural network model training function 2013 can optionally have configurable argument 2649.13.3, for example, corresponding to a number of outputs argument 2233. The configurable argument 2649.13.3 can be set to a positive integer, specifying how many outputs to utilize. The configurable argument 2649.13.3 can be a required argument for feedforward neural network model training function 2013. The configurable argument 2649.13.3 can optionally have a parameter name 2659 of "outputs".

Alternatively or in addition, the nonlinear regression model training function 2011 can optionally have a configurable argument 2649.13.4, for example, corresponding to a hidden layer loss function argument 2234. The configurable argument 2649.13.4 can specify the loss function that all hidden layer nodes and all output layer nodes use. This can be one of several predefined loss functions, or a user-defined loss function. The predefined loss functions that can be selected from can include a squared error loss function (e.g. utilized to implement regression), a vector squared error loss function (e.g. utilized to implement regression with multiple outputs), a log loss function (e.g. utilized to implement binary classification with target values of 0 and 1), a hinge loss function (e.g. utilized to implement binary classification with target values of −1 and 1), and/or a cross entropy loss function (e.g. utilized to implement multi-class classification). If the value for this required parameter specifies none of these functions (e.g. by not specifying one of a set of corresponding keywords, it can be assumed to be a user-defined loss function. The user-defined loss function can specify the per sample loss, where the actual loss function is then just the sum of this function applied to all samples. It can be implemented using the variable y to refer to the dependent variable in the training data and/or can use the variable f to refer to the computed estimate for a given sample. The configurable argument 2649.13.4 can optionally have a parameter name 2659 of "lossFunction".

The feedforward neural network model training function 2013 can optionally have configurable argument 2649.13.5, for example, corresponding to a metrics argument 2235. The configurable argument 2649.13.5 can be a Boolean value that, when TRUE, can cause calculating the average value of the loss function. The configurable argument 2649.13.5 can be an optional argument for feedforward neural network model training function 2013, and can default to FALSE. The configurable argument 2649.13.5 can optionally have a parameter name 2659 of "metrics".

The feedforward neural network model training function 2013 can optionally have configurable argument 2649.13.6, for example, corresponding to a softmax argument 2236. The configurable argument 2649.13.6 can be a Boolean value that, when TRUE, can cause applying of a softmax function to the output of the output layer, and/or before computing of the loss function. This can be useful in networks with multiple outputs, and can be utilized when implementing multi-class classification, for example, with a corresponding cross-entropy model. The configurable argument 2649.13.6 can be an optional argument for feedforward neural network model training function 2013, and can default to FALSE. The configurable argument 2649.13.6 can optionally have a parameter name 2659 of "useSoftMax".

Alternatively or in addition, the feedforward neural network model training function 2013 can optionally have a configurable arguments 2649.13.7, for example, corresponding to an activation function argument 2237. The configurable argument 2649.13.7 can be a selected keyword corresponding to one or of a predefined set of activation functions, and/or can optionally denote a user-defined activation function. The predefined set of activation functions can optionally include one or more of: a binary step function, a linear activation function, a sigmoid and/or logistic activation function, a derivative of a sigmoid activation function, a tanh and/or hyperbolic tangent function, a rectified linear unit (reLU) activation function, a dying reLU function, or other activation function. The configured activation function can be applied, for example, at each node to generate its input as a function of its input. The configurable argument 2649.13.7 can be an optional argument for feedforward neural network model training function 2013, and can default to a particular activation function. Alternatively, the configurable argument 2649.13.7 can be a required argument, where user selection of the activation function is required. The configurable argument 2649.13.7 can optionally have a parameter name 2659 of "activationFunction".

Alternatively or in addition, the feedforward neural network model training function 2013 can optionally have one or more additional configurable arguments 2649.13.8, for example, corresponding to a nonlinear optimization argument set 2769. The one or more configurable arguments 2649.13.8 can be implemented via some or all configurable arguments 2649 of the nonlinear optimization argument set 2769 presented in conjunction with FIG. 27N, and/or can be implemented to set various parameters utilized in executing a nonlinear optimization process as part of executing feedforward neural network model training function 2013, for example, via some or all functionality described in conjunction with FIGS. 27A-27N. This one or more additional configurable arguments 2649.13.8 can be optional arguments for feedforward neural network model training function 2013.

Below is example syntax for a CREATE MLMODEL function called in model training request 2610 of a query request 2601 specifying the feedforward neural network type 2613.13, and thus inducing execution of the feedforward neural network model training function 2013 accordingly:

```
CREATE MLMODEL my_model
TYPE FEEDFORWARD NEURAL NETWORK ON (
  SELECT
    x1,
    x2,
    y1
  FROM public.my_table
  )
options(
  'hiddenLayers' -> '1';
  'hiddenLayerSize' -> '8';
  'outputs' -> '3';
  'activationFunction' -> 'relu';
  'lossFunction' -> 'cross_entropy';
  'useSoftMax' -> 'true'
);
```

When executing the model after training, it can be called with C−1 features as input. The model output generated via execution of model execution operators 2646 can denote the estimate of the target variable outputted via applying the tuned neural network to the input. In the case of multiple outputs, this output can be implemented as a 1×N matrix (e.g. a row vector). If the multiple outputs are being utilized to do multi-class classification, an argmax function can be applied to return the integer representing the class. Below is example syntax for a model function call 2640 in a query request 2602 to execute a query against a machine learning model that was previously created as having the feedforward neural network type 2613.13 via execution of the feedforward neural network model training function 2013:

```
SELECT argmax(my_model(x1, x2)) FROM my_table;
```

As illustrated in FIG. 26J, function library 2450 can alternatively or additionally include model training function 2621.14 that implements a Support Vector Machine (SVM) model training function 2014, corresponding to a model type 2613.14 for Support Vector Machines (SVMs). Calling of SVM model training function 2014, and/or corresponding execution of SVM model training function 2014 via model training operators 2634, can render training of model 2620 as a SVM model accordingly.

In particular, the SVM model training function 2014 can utilized to implement a binary classification algorithm. Execution of SVM model training function 2014 can include finding a hypersurface (e.g., in 2d the hypersurface is a curve) that correctly splits the data into the 2 classes and/or that maximizes the margin around the hypersurface. By default, it tries to find a hyperplane to split the data (e.g. in 2d this is a straight line). A hinge loss function can be applied to balance the 2 objectives of finding a hyperplane with a wide margin and/or to minimize the number of incorrectly classified points Executing SVM model training function 2014 to generate a corresponding SVM can include performing a nonlinear optimization process, for example, via some or all functionality described in conjunction with FIGS. 27A-27N. For example, executing SVM model training function 2014 can be based on applying an adapted version of nonlinear regression model training function 2011, where parameters defining the hypersurface are tuned during training via the nonlinear optimization process in a same or similar fashion as selecting the coefficient values in training the nonlinear regression model. The first C−1 columns of training set 2633 can be required to be numeric, where the last column can denote the label and/or be of any arbitrary type.

The SVM model training function 2014 can optionally have configurable argument 2649.14.1, for example, corresponding to a metrics argument 2245. The configurable argument 2649.14.1 can be a Boolean value that, when TRUE, can cause calculating the percentage of samples that are correctly classified by the model and/or saving this information in a catalog table. The configurable argument 2649.14.1 can be an optional argument for SVM model training function 2014, and can default to FALSE. The configurable argument 2649.14.1 can optionally have a parameter name 2659 of "metrics".

The SVM model training function 2014 can optionally have configurable argument 2649.14.2, for example, corresponding to a regularization coefficient argument 2242. The configurable argument 2649.14.2 can be a floating point number utilized to control the balance of finding a wide margin and/or minimizing incorrectly classified points in the loss function. When this value is larger (and positive) it can make having a wide margin around the hypersurface more important relative to incorrectly classified points. In some embodiments, the values for this parameter will likely be different than values used in other SVM implementations. The configurable argument 2649.14.2 can be an optional argument for SVM model training function 2014, and can default to 1.0/1000000.0. The configurable argument 2649.14.2 can optionally have a parameter name 2659 of "regularizationCoefficient".

The SVM model training function 2014 can optionally have configurable argument 2649.14.3, for example, corresponding to one or more function arguments 2243. The configurable argument 2649.14.3, if specified, can include a list of functions that are summed together, for example, to be implemented as a kernel function. Similar to the function arguments 2151 optionally utilized in linear combination regression as discussed above, the first function can be specified using a key named 'function1', and/or subsequent function can be denoted with names that use subsequent values of N. Functions can be required to be specified in SQL syntax, and can use the variables x1, x2, . . . , xn to refer to the 1st, 2nd, and nth independent variables respectively. The configurable argument 2649.14.2 can be an optional argument for SVM model training function 2014, and can default to a default linear kernel, which could be specified as 'function1'→'x1', 'function2'→'x2', etc. . . . . The configurable argument 2649.14.2 can optionally have a parameter name 2659 of "functionN",", where N is specified as the given function (e.g. "function1", "function2", etc.).

Alternatively or in addition, the SVM model training function 2014 can optionally have one or more additional configurable arguments 2649.14.4, for example, corresponding to a nonlinear optimization argument set 2769. The one or more configurable arguments 2649.14.4 can be implemented via some or all configurable arguments 2649 of the nonlinear optimization argument set 2769 presented in conjunction with FIG. 27N, and/or can be implemented to set various parameters utilized in executing a nonlinear optimization process as part of executing SVM model training function 2014, for example, via some or all functionality described in conjunction with FIGS. 27A-27N. This one or more additional configurable arguments 2649.14.4 can be optional arguments for SVM model training function 2014.

Below is example syntax for a CREATE MLMODEL function called in model training request 2610 of a query request 2601 specifying the SVM type 2613.14, and thus inducing execution of the SVM model training function 2014 accordingly:

```
CREATE MLMODEL my_model
TYPE SUPPORT VECTOR MACHINE ON (
  SELECT
    c1,
    c2,
    c3,
    y1
  FROM public.my_table
);
```

When executing the model after training, it can be called with C−1 features as input. The model output generated via execution of model execution operators 2646 can denote the expected label outputted via applying the tuned SVM network to the input. Below is example syntax for a model function call 2640 in a query request 2602 to execute a query against a machine learning model that was previously created as having the SVM type 2613.14 via execution of the SVM model training function 2014:

```
SELECT my_model(col1, col2, col3) FROM my_table;
```

Figure 26K:
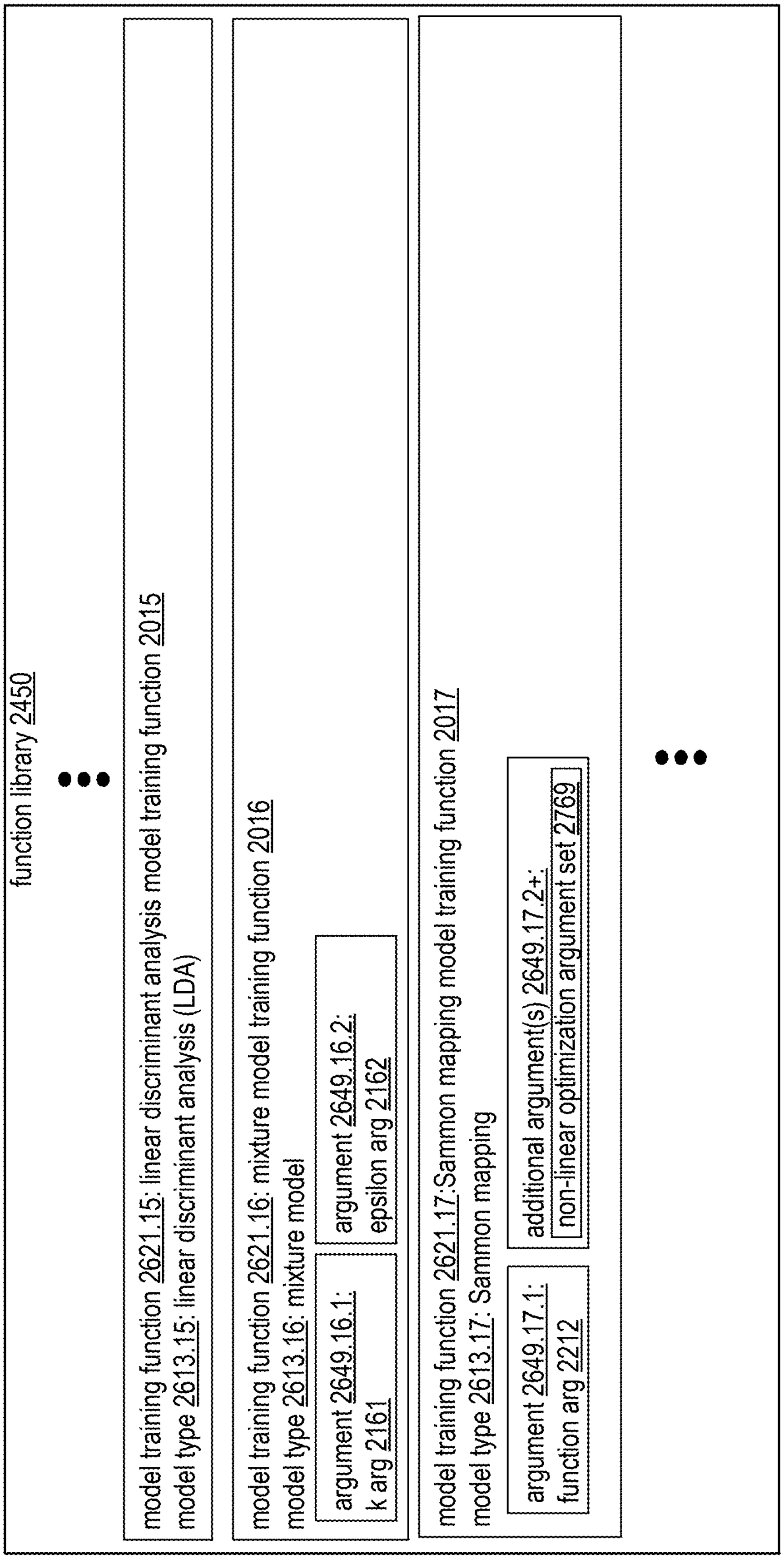

As illustrated in FIG. 26K, function library 2450 can alternatively or additionally include model training function 2621.15 that implements a linear discriminant analysis (LDA) training function 2015, corresponding to a model type 2615. for LDA. Calling of LDA training function 2015, and/or corresponding execution of LDA training function 2015 via model training operators 2634, can render training of model 2620 as a linear discriminant analysis (LDA) model accordingly.

In some or all cases, the LDA training function 2015 can be implemented to generate an LDA model for use upon on the inputs to other models, for example, rather than being implemented as a model on its own. As a particular example, a trained LDA model generated via LDA training function 2015 can be applied to a raw and/or pre-processed set of rows to be utilized as training set 2633 and/or input data 2645, for example, based on the trained LDA model being called in training set selection parameters of a query request 2602 for building of another type of model and/or based on the trained LDA model being called in model input selection parameters 2642 of a query request 2602 for executing of another type of model.

In particular, a trained LDA model can serve the purpose of normalizing all the numeric feature data utilized as model input to another model. This can be useful because some types of models can be sensitive to the scale of numeric features, and when different features have different scales, the results end up skewed. LDA training function 2015 can be implemented to normalize all features of input data (e.g. to another type of model) to the same scale.

Alternatively or in addition, a trained LDA model can serve the purpose of enabling dimensionality reduction. For example, LDA can be implemented to compute linear combinations of original features to render smaller number of new features.

An LDA model can be trained in a similar fashion of training of a PCA model as discussed herein. An LDA model can be utilized to achieve dimensionality reduction in a same or similar fashion as utilizing a PCA model to achieve dimensionality reduction as described herein. In some embodiments, an LDA model and corresponding training function 2015 can differ from a PCA model and corresponding training function 2009 based on the LDA model being trained to achieve dimensionality reduction for data having discrete classifiers (e.g. labels classifying the data), while the PCA model is optionally trained to dimensionality reduction for data not having discrete classifiers. For example, the use of discrete classifiers applied to the data can render the LDA model training function 2015 being implemented as a supervised machine learning algorithm, while the PCA model training function 2009 is instead implemented as an unsupervised machine learning algorithm. Thus, while the PCA model training function 2009 can be implemented to generate tuned parameter data (e.g. linear discriminants) that maximizes the variance in a dataset, the LDA model training function can be implemented to generate tuned parameter data (e.g. linear discriminants) that maximize the separation/distance between multiple classes.

Additionally, as the LDA model training function 2015 is implemented to reduce dimensionality for classifying data, the LDA model can be utilized in performing corresponding classification to classify new data. For example, each row in training data utilized to train the LDA model has a first set of columns corresponding to independent variables (E.g. continuous numeric values, continuous) and an additional column corresponding to a dependent variable (e.g. a discrete value from a discrete set of possible values). The resulting LDA model can be applied reduce dimensionality of the training set and/or other new data of this type (e.g. new rows of the same dataset not yet classified, the same type of data, etc.), which optionally originally has this same first set of columns. A second set of columns can be generated for the existing training data/new data from the first set of columns, where the second set of columns has fewer columns from the first set of columns based on corresponding dimensionality reduction (E.g. values of the second set of columns are generated as a linear combination of values in the first set of columns, as defined by the trained LDA model). This smaller, second set of columns can be utilized as input to a machine learning classification algorithm in conjunction with the corresponding additional column implemented as the label, for example, to train a classification model, such as a naive bayes model, SVM, KNN model, decision tree model, and/or any other type of supervised classification model, for example, via calling of a corresponding model training function as described herein.

This trained model can be applied to further input data needing classification to generate corresponding inference/predication data for the label. For example, incoming data to be labeled can undergo the dimensionality reduction via the trained LDA model to render the second set of columns from which the respective classification model was trained (e.g. based on also being of the same type as the training data and thus having values for the first set of columns), and the resulting dataset having the reduced, second set of columns can then be classified by applying the trained classification model to the resulting dataset outputted by applying the trained LDA model.

The training set 2633 for the LDA training function 2015 can include C−1 numeric columns that are all features/independent variables, and also an additional column that corresponds to a dependent variable, which can be implemented as a discrete classifier label (e.g. as a discrete data type, where there is a discrete set of options for the classifier label that classifies the data). After creating a LDA model, a corresponding catalog table can be created and stored to contain information on the percentage of the signal that is in each LDA feature, for example, via a CTAS operation. This can be used to determine how many of the output features to keep, for example, when applied to generate another type of model. For example, when the LDA model is called in a later model function call 2640 in a query request 2602 (e.g. when training another type of model via another query request 2601), this catalog table is available via accessing this saved catalog table.

The LDA training function 2009 can optionally have no configurable arguments 2649. In other embodiments, the LDA training function 2009 is configurable via one or more configurable arguments 2649.

Below is example syntax for a CREATE MLMODEL function called in model training request 2610 of a query request 2601 specifying the LDA type 2613.15, and thus inducing execution of the LDA training function 2009 accordingly:

```
CREATE MLMODEL reduceTo2
TYPE LINEAR DISCRIMINANT ANALYSIS ON (
  SELECT
    c1,
    c2,
    c3
  FROM public.my__table
)
```

The resulting model reduceTo2 in this example can be implemented, for example, if there are 3 features and it is desirable to reduce to 2 features for training of another model. For example, the resulting example model reduceTo2 can be called to train a classification model. Below is example syntax for a CREATE MLMODEL function called in model training request 2610 of a query request 2601 specifying a logistic regression type that calls the example reduceTo2 model:

```
CREATE MLMODEL binaryClass
TYPE NAIVE BAYES ON (
  SELECT
    reduceTo2 (c1, c2, c3, 1),
    reduceTo2 (c1, c2, c3, 2),
    y1
  FROM [...]
);
```

When executing a model after training that was created via use of the LDA model, for correct execution, the original features are passed through the LDA model when calling the new model. Below is example syntax for a model function call 2640 in a query request 2602 to execute a query against this example binaryClass model:

```
SELECT
  binaryClass
    reduceTo2 (x1, x2, x3, 1),
    reduceTo2 (x1, x2, x3, 2),
    y1
FROM [...]
```

Below is example syntax for a CREATE MLMODEL function called in model training request 2610 of a query request 2601 specifying the LDA type 2613.15, and thus inducing execution of the LDA training function 2015 accordingly, where the LDA analysis is performed over 4 variables:

```
CREATE MLMODEL my__model
TYPE LINEAR DISCRIMINANT ANALYSIS ON (
```

-continued

```
  SELECT
    c1,
    c2,
    c3,
    c4,
    y1
  FROM public.my__table
);
```

When executing a model after training that was created via use of the LDA model, the user can be required to provide the same original input features in the same order, followed by a positive integer argument which specifies which LDA component they want returned, for example, to render correct execution. The LDA component index can start at 1. Below is example syntax for a model function call 2640 in a query request 2602 to execute a query against this example LDA model:

```
SELECT
  my__model(col1, col2, col3, col4, 2) as component2,
  my__model(col1, col2, col3, col4, 3) as component3,
  y1
FROM public.my__table;
```

While not illustrated in FIGS. 26I-26K, function library 2450 can alternatively or additionally include one or more other model training functions 2621 that implement other types of dimensionality reduction similar to LDA and/or PCA, For example, function library 2450 can alternatively or additionally include one or more other model training functions 2621 that implements quadratic discriminant analysis.

As illustrated in FIG. 26K, function library 2450 can alternatively or additionally include model training function 2621.16 that implements a Gaussian mixture model training function 2016, corresponding to a model type 2616 for a mixture model. Calling of mixture model training function 2016, and/or corresponding execution of mixture training function 2016 via model training operators 2634, can render training of model 2620 as a mixture model accordingly.

In some embodiments, mixture model training function is optionally implemented to generate a Gaussian mixture model based on being implemented as a Gaussian mixture model training function. Alternatively or in addition, the same or different mixture model training function is optionally implemented to generate another type of mixture model, such as a categorical mixture model, a multivariate Gaussian mixture model, a non-Bayesian mixture model, a Bayesian mixture model, or any other type of mixture model. The function library 2450 can optionally store multiple different mixture model training functions that train different types of mixture models.

The mixture model training function 2016 can be implemented as an unsupervised clustering algorithm, where all of the columns in the input result set are features, and/or where there is no label. All of the input columns can be required to be numeric. Executing the mixture model training function 2016 can include characterizing k clusters via a set of cluster parameters, denoting corresponding "classification" of the rows into auto-generated groupings, due to the algorithm being implemented in an unsupervised format where no classification and/or no dependent variable is specified.

The mixture model training function 2016 can optionally have configurable argument 2649.16.1, for example, corresponding to a k argument 2161. The configurable argument 2649.16.1 be a positive integer denoting how many clusters are created in executing the corresponding mixture algorithm. The configurable argument 2649.16.1 can be a required argument for mixture model training function 2016. The configurable argument 26491.6.1 can optionally have a parameter name 2659 of "k".

Alternatively or in addition, the mixture model training function 2016 can optionally have a configurable argument 2649.16.2, for example, corresponding to an epsilon argument 2162. The configurable argument 2649.16.2 can be a positive floating point value that, if specified, denotes that when the maximum distance that one or more parameters changed from one iteration of the algorithm to the next is less than this value, the algorithm will terminate. The configurable argument 2649.16.2 can be an optional argument for mixture model training function 2016, and can optionally default to $1^*e^{-8}$. The configurable argument 2649.16.2 can optionally have a parameter name 2659 of "epsilon".

Alternatively or in addition, the mixture model training function 2016 can optionally have additional configurable arguments 2649.16, for example, specifying the type of probability density function to be utilized to characterize a corresponding probability distribution for each cluster.

Alternatively or in addition, the mixture model training function 2016 can optionally have additional configurable arguments 2649.16, for example, specifying whether the some or all of the columns are continuous or discrete/categorical. Alternatively or in addition, the mixture model training function 2016 can optionally have additional configurable arguments 2649.16, for example, specifying how/by which type of model the clusters be initialized. Alternatively or in addition, the mixture model training function 2016 can optionally have additional configurable arguments 2649.16, for example, specifying how/by which type of mixture model be trained (e.g. a Gaussian mixture model, a different type of mixture model, etc.).

Below is example syntax for a CREATE MLMODEL function called in model training request 2610 of a query request 2601 specifying the mixture type 2613.16, and thus inducing execution of the mixture model training function 2016 accordingly:

```
CREATE MLMODEL my_model
TYPE GAUSSIAN MIXTURE ON (
  SELECT
    x1,
    x2,
    x3,
    x4
  FROM public.my_table
  )
options(
  'k' -> 8'
);
```

Because there are optionally no labels for clusters, when executing this function after training with the same number (and/or same order) of features as input, the model output generated via execution of model execution operators 2646 can denote an integer that specifies the cluster to which the point belongs (e.g. denoting its corresponding classification).

Below is example syntax for a model function call 2640 in a query request 2602 to execute a query against a machine learning model that was previously created as having the K Means type 2613.6 via execution of the mixture model training function 2016:

```
SELECT my_model(x1, x2, x3, x4) FROM my_table;
```

As illustrated in FIG. 26K, function library 2450 can alternatively or additionally include model training function 2621.17 that implements a Sammon mapping model training function 2017, corresponding to a model type 2617. for Sammon mapping. Calling of Sammon mapping training function 2017, and/or corresponding execution of Sammon mapping training function 2017 via model training operators 2634, can render training of model 2620 as a Sammon mapping model accordingly.

In some or all cases, the Sammon mapping model training function 2017 can be implemented to generate an Sammon mapping model for use upon on the inputs to other models, for example, rather than being implemented as a model on its own. As a particular example, a trained Sammon mapping model generated via Sammon mapping training function 2017 can be applied to a raw and/or pre-processed set of rows to be utilized as training set 2633 and/or input data 2645, for example, based on the trained Sammon mapping model being called in training set selection parameters of a query request 2602 for building of another type of model and/or based on the trained Sammon mapping model being called in model input selection parameters 2642 of a query request 2602 for executing of another type of model.

In particular, a trained Sammon mapping model can serve the purpose of normalizing all the numeric feature data utilized as model input to another model. This can be useful because some types of models can be sensitive to the scale of numeric features, and when different features have different scales, the results end up skewed. Sammon mapping training function 2015 can be implemented to normalize all features of input data (e.g. to another type of model) to the same scale.

Alternatively or in addition, a trained Sammon mapping model can serve the purpose of enabling dimensionality reduction. However, unlike LDA and/or PCA, Sammon mapping can be implemented to apply nonlinear functions to original features to render smaller number of new features. This nonlinearity can be ideal in situations where linear combinations alone are not sufficient based on distribution characteristics of the underlying training set. Sammon mapping can be implemented to maintain the geometrical structure of the original space as much as possible in the new, lower dimensional space.

The training set 2633 for the Sammon mapping training function 2015 can include C numeric columns that optionally are all features/independent variables, and/or that optionally include at least one dependent variable. After creating a Sammon mapping model, a corresponding catalog table can be created and stored to contain information on the percentage of the signal that is in each Sammon mapping feature, for example, via a CTAS operation. This can be used to determine how many of the output features to keep, for example, when applied to generate another type of model. For example, when the Sammon mapping model is called in a later model function call 2640 in a query request 2602 (e.g. when training another type of model via another query request 2601), this catalog table is available via accessing this saved catalog table.

Sammon mapping model training function 2017 can optionally have a configurable argument 2649.17.1, for example, corresponding to a function argument 2212. The configurable argument 2649.17.1 can specify the nonlinear function to optimize, for example, in SQL syntax. In particular, the configurable argument 2649.17.1 can be required to use a1, a2, . . . to refer to the parameters (e.g. coefficients) to be optimized, and/or can be required to use x1, x2, . . . to refer to the input features. In some embodiments, some SQL functions are not allowed, for example, where only scalar expressions that can be represented internally as postfix expressions are allowed. Most notably, this optionally means that some functions that get rewritten as CASE statements (like least( ) and greatest( )) are not allowed. If the function is not allowed, an error message can be emitted and/or displayed to a corresponding user providing the query request 2601. The configurable argument 2649.17.1 can be a required argument for Sammon mapping model training function 2017. The configurable argument 2649.17.1 can optionally have a parameter name 2659 of "function".

Alternatively or in addition, the Sammon mapping model training function 2017 can optionally have one or more additional configurable arguments 2649.17.2, for example, corresponding to a nonlinear optimization argument set 2769. The one or more configurable arguments 2649.17.2 can be implemented via some or all configurable arguments 2649 of the nonlinear optimization argument set 2769 presented in conjunction with FIG. 27N, and/or can be implemented to set various parameters utilized in executing a nonlinear optimization process as part of executing Sammon mapping model training function 2017, for example, via some or all functionality described in conjunction with FIGS. 27A-27N. This one or more additional configurable arguments 2649.17.2 can be optional arguments for Sammon mapping model training function 2017.

Below is example syntax for a CREATE MLMODEL function called in model training request 2610 of a query request 2601 specifying the Sammon mapping type 2613.17, and thus inducing execution of the Sammon mapping training function 2017 accordingly:

```
CREATE MLMODEL reduceTo2
TYPE SAMMON MAPPING ON (
  SELECT
    c1,
    c2,
    c3
  FROM public.my__table
)
options(
  'function1' -> 'a1 * sin(a2 * c1 + a3) + a4 * + a5 * c3',
  'function2' -> a6 * cos(a7 * c1 + a8) + a9 * c3^2)'
);
```

The resulting model reduceTo2 in this example can be implemented, for example, if there are 3 features and it is desirable to reduce to 2 features for training of another model. For example, the resulting example model reduceTo2 can be called to train a classification model. Below is example syntax for a CREATE MLMODEL function called in model training request 2610 of a query request 2601 specifying a logistic regression type that calls the example reduceTo2 model:

```
CREATE MLMODEL binaryClass
TYPE NAIVE BAYES ON (
```

-continued

```
    SELECT
      reduceTo2 (c1, c2, c3, 1),
      reduceTo2 (c1, c2, c3, 2),
    FROM [...]
  );
```

When executing a model after training that was created via use of the Sammon mapping model, for correct execution, the original features are passed through the Sammon mapping model when calling the new model. Below is example syntax for a model function call 2640 in a query request 2602 to execute a query against this example binaryClass model:

```
SELECT
  binaryClass
    reduceTo2 (x1, x2, x3, 1),
    reduceTo2 (x1, x2, x3, 2)
FROM [...]
```

Figure 26L:
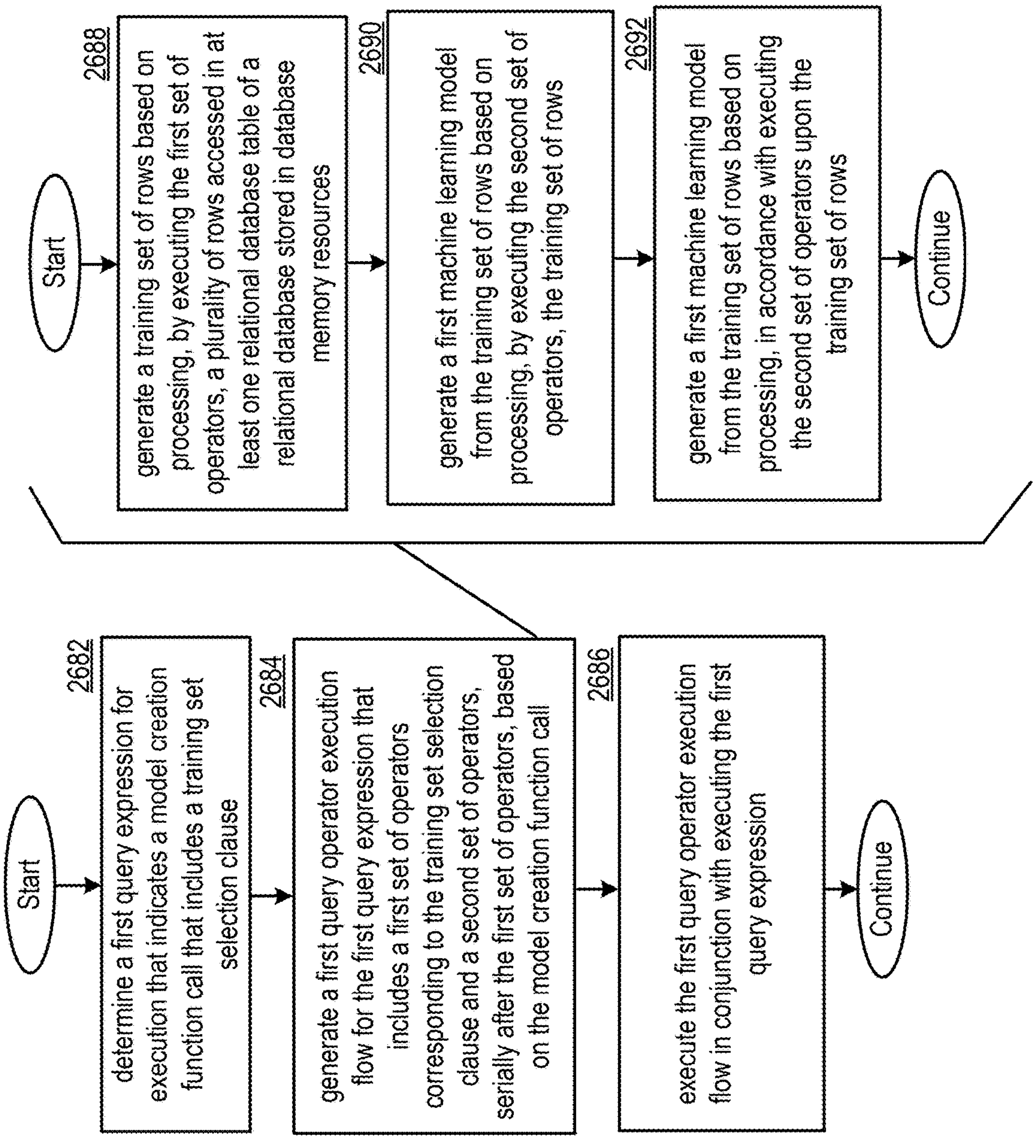
FIG. 26L is a logic diagram illustrating a method for execution in accordance with various embodiments.
Figure 26M:
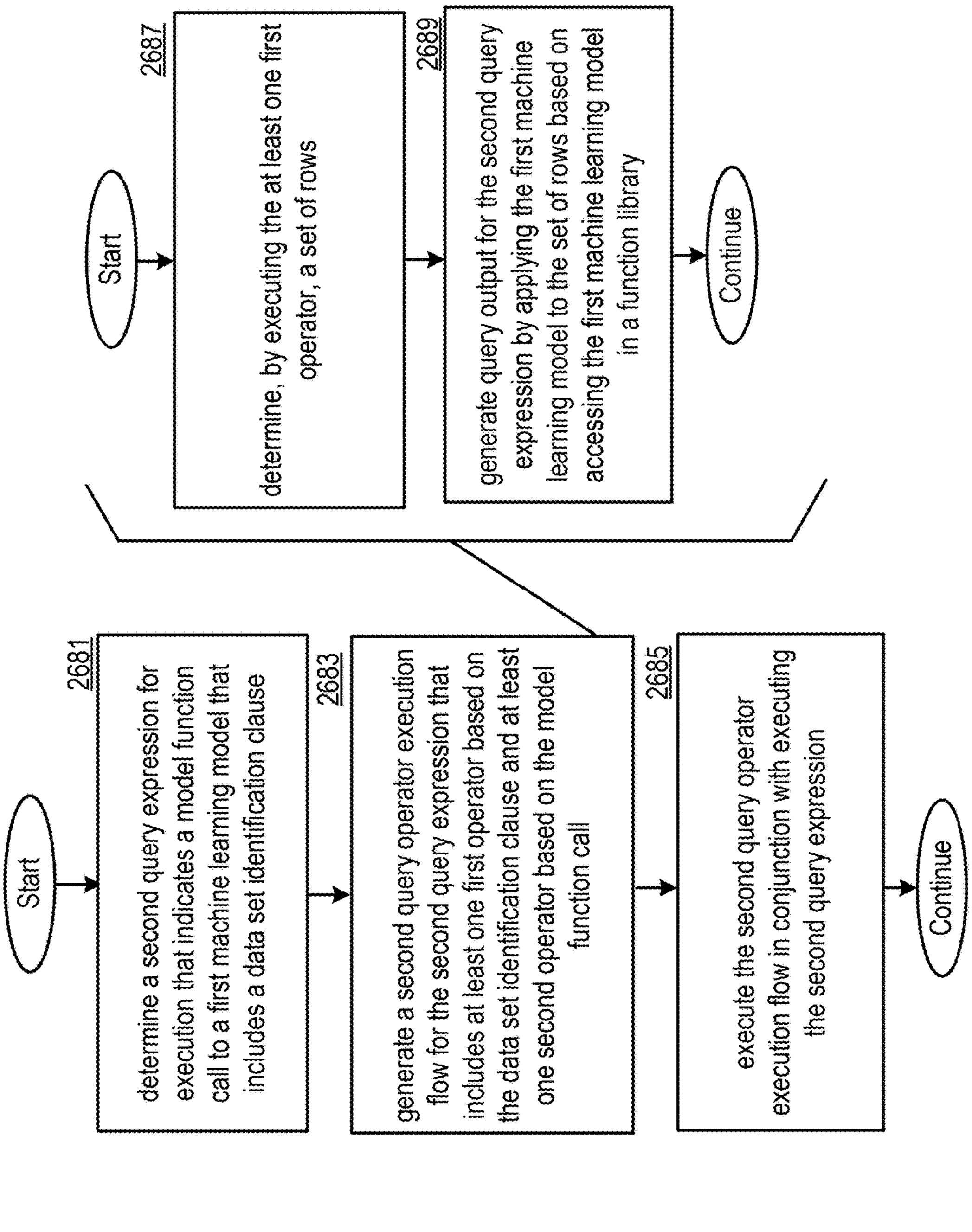
FIG. 26M is a logic diagram illustrating a method for execution in accordance with various embodiments.

FIG. 26L and FIG. 26M illustrate methods for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26L and/or FIG. 26M. In particular, a node 37 can utilize their own query execution memory resources 3045 to execute some or all of the steps of FIG. 26L and/or FIG. 26M, where multiple nodes 37 implement their own query processing modules 2435 to independently execute the steps of FIG. 26L and/or FIG. 26M for example, to facilitate execution of a query as participants in a query execution plan 2405. Some or all of the steps of FIG. 26L and/or FIG. 26M can optionally be performed by any other processing module of the database system 10. Some or all of the steps of FIG. 26L and/or FIG. 26M can be performed to implement some or all of the functionality of the database system 10 as described in conjunction with FIGS. 26A-26H, for example, by implementing some or all of the functionality of executing a query request 2601 that includes a model training request 2610 to generate trained model data 2620, and/or accessing this trained model data to further execute a query request 2602 that includes a model function call 2640 to generate model output 2648. Some or all of the steps of FIG. 26L and/or FIG. 26M can be performed to implement some or all of the functionality regarding execution of a query via the plurality of nodes in the query execution plan 2405 as described in conjunction with some or all of FIGS. 24A-25K. Some or all steps of FIG. 26L and/or FIG. 26M can be performed by database system 10 in accordance with other embodiments of the database system 10 and/or nodes 37 discussed herein. Some or all steps of FIG. 26L and/or FIG. 26M can be performed in conjunction with one or more steps of any other method described herein.

FIG. 26L illustrates steps 2682-2686. Step 2682 includes determining a first query expression for execution that indicates a model creation function call that includes a training set selection clause. Step 2684 includes generating a first query operator execution flow for the first query expression that includes a first set of operators corresponding to the training set selection clause and a second set of operators, serially after the first set of operators, based on the model creation function call. Step 2686 includes executing the first query operator execution flow in conjunction with executing the first query expression.

Executing step 2686 can include executing steps 2688-2692. Step 2688 includes generating a training set of rows based on processing, by executing the first set of operators, a plurality of rows accessed in at least one relational database table of a relational database stored in database memory resources. Step 2690 includes generating a first machine learning model from the training set of rows based on processing, by executing the second set of operators, the training set of rows. Step 2692 includes generating a first machine learning model from the training set of rows based on processing, by executing the second set of operators, the training set of rows.

FIG. 26M illustrates steps 2681-2685. Step 2681 includes determining a second query expression for execution that indicates a model function call to a first machine learning model, such as the first machine learning model of FIG. 26L, that includes a data set identification clause. Step 2683 includes generating a second query operator execution flow for the second query expression that includes at least one first operator based on the data set identification clause and at least one second operator based on the model function call. Step 2685 includes executing the second query operator execution flow in conjunction with executing the second query expression.

Performing step 2685 can include performing step 2687 and/or 2689. Step 2687 includes determining, by executing the at least one first operator, a set of rows. Step 2689 includes generating query output for the second query expression by applying the first machine learning model to the set of rows based on accessing the first machine learning model in a function library.

In various examples, only the steps of FIG. 26L are performed and the steps of FIG. 26M are not performed. In various examples, only the steps of FIG. 26M are performed and the steps of FIG. 26L are not performed. In various examples, some or all of the steps of FIG. 26L are performed, and some or all of the steps of FIG. 26M are also performed. In various examples, the steps of FIG. 26L are performed during a first temporal period, and the steps of FIG. 26M are performed during a second temporal period strictly after the first temporal period, where performance of step 2681 of FIG. 26M optionally follows performance of step 2686 of FIG. 26L.

In various examples, the training set selection clause is a SELECT clause in accordance with the structured query language (SQL).

In various examples, the model creation function call indicates a plurality of machine learning function types. In various examples, the training set selection clause indicates a selected model type of the plurality of machine learning function types. In various examples, the first query operator execution flow for the first query expression is generated further based on the selected model type. In various examples, a model type of the first machine learning model corresponds to the selected model type of the plurality of machine learning function types based on the first query operator execution flow for the first query expression being generated based on the selected model type.

In various examples, the plurality of machine learning function types includes at least two of: a simple linear regression type; a multiple linear regression type; a polynomial regression type; a linear combination regression type; a K means type; a K Nearest Neighbors type; a logistic regression type; a naive bayes type; a nonlinear regression type; a feedforward network type; a principal component analysis type; a support vector machine type; or a decision tree type. In various examples, the selected model type corresponds to one of: the simple linear regression type; the multiple linear regression type; the polynomial regression type; the linear combination regression type; the K means type; the K Nearest Neighbors type; the logistic regression type; the naive bayes type; the nonlinear regression type; the feedforward network type; the principal component analysis type; the support vector machine type; or the decision tree type.

In various examples, the model creation function call indicates a set of parameters corresponding to selected model type, where the first query operator execution flow for the first query expression is generated further based on the set of parameters.

In various examples, the method further includes determining another query expression for execution that indicates another model creation function call indicating a second selected model type different from the selected model type and further indicating a second set of parameters for the second selected model type. In various examples, the second set of parameters includes a different number of parameters than the set of parameters based on the second selected model type being different from selected model type. In various examples, the method further includes generating another query operator execution flow for the another query expression based on the second selected model type and further based on the second set of parameters. In various examples, the method further includes executing the another query operator execution flow in conjunction with executing the another query expression by: generating another training set of rows; generating a second machine learning model from the another training set of rows in accordance with the second selected model type and the second set of parameters; and/or storing the second machine learning model in the function library.

In various examples, the model creation function call is denoted via a first keyword, and the model function call is denoted via a second keyword distinct from the first keyword. In various examples, the second keyword for the model function call corresponds to a model name for the first machine learning model indicated as a parameter in the model creation function call.

In various examples, the training set selection clause is a first SELECT clause in accordance with the structured query language (SQL). In various examples, the model function call is included in a second SELECT clause in accordance with SQL.

In various examples, the set of rows is distinct from the training set of rows.

In various examples, the training set of rows includes a first number of columns. In various examples, the first machine learning model is applied to a second number of columns from the set of rows. In various examples, the first number of columns is different from the second number of columns. In various examples, the query output for the second query expression includes at least one new columns generated for the set of rows that includes a third number of columns. In various examples, the first number is equal to a sum of the second number and the third number.

In various examples, determining the set of rows is based on accessing the set of rows in the relational database. In various examples, determining the set of rows is based on generating the set of rows from an accessed set of rows accessed in the relational database, where the accessed set of rows is different from the set of rows based on at least one of: the accessed set of rows including different column values for at least one column of the set of rows; the accessed set of rows including a different number of columns from the set of rows; or the accessed set of rows including a different number of rows from the set of rows.

In various embodiments, any one of more of the various examples listed above are implemented in conjunction with performing some or all steps of FIG. 26L and/or FIG. 26M. In various embodiments, any set of the various examples listed above can implemented in tandem, for example, in conjunction with performing some or all steps of FIG. 26L and/or FIG. 26M.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26L and/or FIG. 26M described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26L and/or FIG. 26, for example, in conjunction with further implementing any one or more of the various examples described above.

In various embodiments, the operational instructions, when executed by the at least one processor, cause the database system to, in a first temporal period: determine a first query expression for execution that indicates a model creation function call that includes a training set selection clause; generate a first query operator execution flow for the first query expression that includes a first set of operators corresponding to the training set selection clause and a second set of operators, serially after the first set of operators, based on the model creation function call; and/or execute the first query operator execution flow in conjunction with executing the first query expression. Executing the first query operator execution flow in conjunction with executing the first query expression can be based on generating a training set of rows based on processing, by executing the first set of operators, a plurality of rows accessed in at least one relational database table of a relational database stored in database memory resources; generating a first machine learning model from the training set of rows based on processing, by executing the second set of operators, the training set of rows; and/or storing the first machine learning model in a function library.

In various embodiments, the operational instructions, when executed by the at least one processor, further cause the database system to, in a second temporal period strictly after the first temporal period, determine a second query expression for execution that indicates a model function call to the first machine learning model that includes a data set identification clause; generate a second query operator execution flow for the second query expression that includes at least one first operator based on the data set identification clause and at least one second operator based on the model function call; and/or execute the second query operator execution flow in conjunction with executing the second query expression. Executing the second query operator execution flow in conjunction with executing the second query expression can be based on determining, by executing the at least one first operator, a set of rows; and/or generate query output for the second query expression by applying the first machine learning model to the set of rows based on accessing the first machine learning model in the function library.

FIGS. 27A-27N illustrate embodiments of a database system 10 that performs a nonlinear optimization process 2710 during query execution to generate trained model data 2620 for query requests 2601 indicating a model training request 2610. Some or all features and/or functionality of the generation and/or execution of query operator execution flow 2517 to implement a nonlinear optimization process 2710 of FIGS. 27A-27N can implement the execution of query requests 2601 to generate trained model data 2620 of FIG. 26A and/or any other embodiment of database system 10 described herein.

FIG. 27A illustrates a query execution module 2504 of a database system 10 that implements a nonlinear optimization process 2710 via execution of model training operators 2634 to render generation of tuned model parameters 2622 of trained model data 2620 that includes a set of N parameters c1-cN tuned via implementing the nonlinear optimization process 2710. Some or all features and/or functionality of the model training operators 2634 and/or trained model data 2620 of FIG. 27A can implement the model training operators 2634 and/or trained model data 2620 of FIGS. 26A and/or 26C, and/or any other embodiments of training a model via query execution described herein.

FIG. 27B illustrates an example of a query execution module 2504 generating trained model data 2620 that indicates a function definition 2719 generated via nonlinear optimization process 2710 implemented via model training operators 2634. Some or all features and/or functionality of generating trained model data 2620 from training set 2633 of FIG. 27B can implement the generating of trained model data 2620 from training set 2633 of FIG. 27A, FIGS. 26A, and/or 26C.

The function definition can indicate a linear and/or nonlinear mathematical equation where one or more output values y are a deterministic function F of: the set of N parameters c1-cN, which can be fixed coefficient values that are tuned via implementing the nonlinear optimization process 2710; and a set of C independent variables, which are optionally not fixed. For example, the function definition 2719 can be implemented as and/or based on a nonlinear regression model. Note that these C independent variables can be implemented as the C−1 or C−2 independent variables discussed in the previous examples in conjunction with FIGS. 26H-26J.

Below is an example function definition 2719 having 5 coefficients and 2 independent variables:

$$y = c1 * \sin(c2 * x1 + c3) + c4 + c5 * sqrt(x2)$$

The particular function definition 2919 relating parameters c1-cN and independent variables x1-xC, without the tuned values of parameters c1-cN, can be user defined and/or automatically generated as part of performing model training operators 2634. The number of and/or types for the independent variables x1-xC can be set by and/or be otherwise based on number and/or type of the corresponding set of column in the training set 2633.

The selection of values for the set of N parameters c1-cN can be based on performance of the nonlinear optimization process 2710 upon a training set 2633 that includes a plurality of Q rows 2916.*a*1-2916.*a*Q, each having values 2918 for the C columns x1-xC, and further having values 2918 for at least one additional column y. The function definition can be applied to render N parameters c1-cN, and/or a corresponding function definition, that best fits the set of Q rows of training set 2633 when their respective column values are applied, for example, in accordance with a loss function (e.g. loss function defined via loss function argument 2214 or another error function/loss function) minimized via the nonlinear optimization process 2710.

In particular, the function definition 2719 can be known, for example, based on being native to the corresponding model type (e.g. automatically utilized for the corresponding model training function 2621), and/or being indicated via user input (e.g. via a configured argument for the corresponding model training function 2621, optionally denoting a selected predetermined function from a set of options, denoting parameters utilized to render the function, and/or specifying an arbitrary user-defined function). Note that prior to nonlinear optimization process 2710, the parameters c1-cN can be untuned (e.g. unknown), where the nonlinear optimization process 2710 is implemented to tune these parameters by selecting a particular tuned parameter value 2623 for each parameter.

The tuning applied by the nonlinear optimization process 2710 can be based on minimizing a loss function h, for example, denoting error in the training set fitting to the respective function 2719 when a given set of N tuned parameter values 2623 are applied for the N coefficients. In particular, the loss function h can be known, for example, based on being native to the corresponding model type (e.g. automatically utilized for the corresponding model training function 2621), and/or being indicated via user input (e.g. via a configured argument for the corresponding model training function 2621, optionally denoting a selected predetermined loss function from a set of options, denoting parameters utilized to render the loss function, and/or specifying an arbitrary user-defined function). The loss function h can be determined and/or applied as a function of the function 2719 and/or some or all of the training data 2633.

FIG. 27C illustrates an example of a query execution module 2504 generating model output 2648 for a set of Z rows 2916.*b*1-2916.*b*Z based on applying the function definition 2719 generated as discussed in conjunction with FIG. 27B via model execution operators 2646 upon the set of Z rows. Some or all features and/or functionality of generating model output 2648 from input data 2645 of FIG. 27C can implement the generating of trained model output 2648 from input data 2645 of FIG. 26B.

Generating model output 2648 can include generating and/or populating column y for a set of input rows 2916.*b*1-2916.*b*Z. This set of input rows 2916.*b*1-2916.*b*Z can optionally be mutually exclusive from the rows 2916.*a*1-2916.*a*Q of training set 2633, where predictive values of column y are generated for set of input rows 2916.*b*1-2916.*b*Z, for example, based on values for column y not being known for the set of set of input rows 2916.*b*1-2916.*b*Z and/or based on testing the accuracy of the function definition 2719 via a different set of data with known values. Alternatively, the set of input rows 2916.*b*1-2916.*b*Z can be overlapping with the rows 2916.*a*1-2916.*a*Q of training set 2633, for example, as part of performing a cross-validation process to test the function definition 2719.

In particular, performance of a corresponding inference function, for example, performed via model execution operators 2646 based on the given trained model being called in a corresponding query request 2602, can populate values x1-xC as corresponding column values indicated in and/or derived from a given row 2916.*b* included in the input data 2645, where the model output for the given row 2916 is the column value y generated by performing the respective function, and where different rows have different model output based on having different values x1-xC, where the same N fixed coefficients c1-cN are applied for all rows when the given model is applied.

FIG. 27D illustrates an example of a query execution module 2504 generating trained model data 2620 via a plurality of L parallelized processes 2750.1-2750.L that each execute one or more nonlinear optimization operators 2711. for example, independently and/or without coordination. For example, different parallelized processes 2750.1-2750.L are performed on different processing core resources 48, on different nodes 37, and/or on different computing devices 18, for example, in conjunction with performing assigned portions of a corresponding query execution plan 2405 implementing query operator execution flow 2517. Some or all features and/or functionality of generating trained model data 2620 from training set 2633 of FIG. 27D can implement the generating of trained model data 2620 from training set 2633 of FIG. 27A, FIG. 26A, 26C, and/or any other embodiment of generating of trained model data 2620 from training set 2633 described herein.

Different parallelized processes 2750 can perform the nonlinear optimization operators 2711 upon different training subsets 2734 to render different candidate models 2720 with different tuned model parameters 2622. For example, the configuration of nonlinear optimization operators 2711 is the same for each parallelized process 2750, but different candidate models 2720 with different tuned model parameters 2622 are generated as a result of each being performed upon different training subsets 2734 having different subsets of rows 2916 from the training set 2633.

In some embodiments, the plurality of parallelized processes 2750 are implemented via a plurality of nodes 37 of a same IO and/or inner level 2414 of a query execution plan. Note that a given node 37 can implement multiple ones of the plurality of parallelized processes via multiple corresponding processing core resources.

The rows included in each of the training subsets 2734.1-2734.L can be selected and/or distributed via performance of one or more row dispersal operators 2766, such as one or more multiplexer operators and/or shuffle operators sending each row 2916 in training set 2633 to one or more parallelized processes 2750 based on being selected for inclusion in a corresponding training subsets 2734.1-2734.L. In some embodiments, the row dispersal operators 2766 are implemented by performing a shuffle operation via some or all functionality of FIG. 24E.

The generation of training subsets 2734.1-2734.L via row dispersal operators 2766 can be in accordance with a randomized process such as a round robin process, where each row 2916 of training set 2633 is randomly included in exactly one training subsets 2734. Alternatively, in some embodiments, some or all rows are processed in multiple training subsets 2734.1-2734.L in accordance with an overwrite factor, which can be automatically selected via query operator execution module 2514 and/or can be configured via user input, for example, in the query request 2501.

In some embodiments, each nonlinear optimization operator instance (e.g. on each core of each node) can operate on some random subset of the training set 2633. In some embodiments, the subsets can be configured to potentially and/or be guaranteed to have some overlap. This can depend on statistical properties to be achieved in training subset selection, and/or can be based on cardinality estimates of the result set. To this end, the row dispersal operators 2766 can be implemented via a random shuffle capability such that, before nonlinear optimization runs, the data is randomly shuffled across nodes. At each node, the received rows can then immediately be processed via a random multiplexer so that the data is further randomly distributed across processing core resources 48 of the node.

This random shuffle can have an "overwrite factor" parameter dictating how many subsets each row is included in. For example, if the overwrite factor is set to 2, all rows get sent to 2 places; if its set to 3 all rows get sent to 3 places. This can provide the subset overlap, when desired. It can have a parallelization parameter dictating the number Lr of parallelized processes (e.g. number of nodes and/or number of cores) that will be implemented in the set of L. This can be utilized to limit the number of nodes involved in the shuffle, so even though there may be 10 nodes, it only uses the overwrite factor number (e.g. 3). The reason for this is that every core on every node has to have enough data for it to have means of generating a good model. In some cases, there is no need for those additional threads and/or any parallelization (e.g. because the size of the training set is smaller than a threshold or otherwise does not include enough data). The operator flow generator module 2514 can process known information about the size of the training set 2633 and/or cardinality estimates of the result set that is input to the model training to determine the overwrite factor and/or the number of nodes to be utilized.

The trained model data 2620 can be generated by performing one or more model finalization operators 2767 upon the set of candidate models 2720.1-2720.L generated via the set of parallelized processes. This can include selecting one of the candidate models from the set of L different candidate models 2720.1-2720.L, such as lowest error one of the candidate models and/or best performing one of the candidate models. This can alternatively or additionally include combining aspects of different ones of the candidate models, for example, in accordance with applying a genetic algorithm and/or crossover techniques, to generate a new model from two or more candidate models as the trained model data 2620, where the new model is different from any of the candidate models 2720.1-2720.L.

In some embodiments, the one or more model finalization operators 2767 is implemented via a root node of a corresponding query execution plan 2405. Alternatively or in addition, a given node implementing the one or more model finalization operators 2767 receives the set of L different candidate models 2720.1-2720.L from a set of child nodes at a lower level from the given node.

FIG. 27E illustrates an example flow executed by query execution module 2504 to generate a model 2720. For example, the model 2720 of FIG. 27E is a candidate model of FIG. 27D, where the flow of FIG. 27E is implemented via a given one or more nonlinear optimization operators 2711 of a given parallelized process 2750, and where each of the plurality of parallelized processes 2750.1-2750.L separately performs the flow of FIG. 27E, without coordination, upon its own training subset 2734 to generate its own candidate model 2720 that is then processed via model finalization operators 2767 to render generation of the ultimate trained model data. Alternatively, only one thread of nonlinear optimization operators 2711 is employed, where the flow of FIG. 27E is performed via only one process rather than a plurality of parallelized processes. The flow of FIG. 27E can otherwise be implemented via any embodiment of query processing module 2504 described herein, where the trained model data 2620 is the model 2720 of FIG. 27E and/or is selected based on generation of model 2720 via some or all steps illustrated in FIG. 27E.

First, a model initialization step 2709 can be performed to generate model initialization data. For example, the model initialization data includes initial values for each of the parameters c1-cN of tuned model parameters 2622, which can be selected via a random process and/or other initialization process.

Next, a first algorithm phase 2712 can be performed upon the model initialization data 2721. The first algorithm phase 2712 can optionally include a plurality of phase instances 2716.1-2716.M that are performed in series. For example, the number of phases M is predetermined, is configured via user input in query request 2601, and/or is dynamically determined during execution based on when a predetermined convergence condition is met, where additional iterations of phase instances are performed until the predetermined convergence condition is met. The predetermined convergence condition can correspond to falling below a threshold error metric, falling below a threshold amount of change from a prior iteration, or other condition.

Each phase instance 2716 can include performance of a first algorithm type 2701 and/or performance of a second algorithm type 2702. For example, each phase instance 2716 can first include iterative performance 2713 of algorithm type 2701 via a plurality of iterations 2714.1-2714.W of the algorithm type 2701. The number of iterations W can be the same or different for different phase instances 2716. For example, the number of iterations W is predetermined, is configured via user input in query request 2601, and/or is dynamically determined during execution based on when a predetermined convergence condition is met, where additional iterations of phase instances are performed until the predetermined convergence condition is met. The predetermined convergence condition can correspond to falling below a threshold error metric, falling below a threshold amount of change from a prior iteration, or other condition. Each phase instance 2716 can alternatively or additionally include performance 2715 of algorithm type 2702, for example, after first performing the iterative performance 2713 of algorithm type 2701 via the W iterations 2714.1-2714.W.

After the first algorithm phase 2712, a second algorithm phase 2717 can be performed. Performing the second algorithm phase 2717 can include performance 2718 of a third algorithm type 2703 and/or a final performance of the second algorithm type 2702. For example, the second algorithm phase 2717 includes first executing performance 2718 of a third algorithm type 2703, and then performing the final, M+1st performance of the second algorithm type 2702.

In other embodiments, other serialized and/or parallelized ordering of some or all of the first algorithm type 2701, the second algorithm type 2702, the third algorithm type 2703, and/or one or more additional algorithm types can be performed.

The model 2720 can denote final values for each of the parameters c1-cN of tuned model parameters 2622, optimized over the serialized iterations of the function. These can correspond to the parameters c1-cN determined to render a lowest value when applied to a loss function for the deterministic function 2719. For example, the loss function is determined based on the training subset 2734 to measure an error metric for the fit of the deterministic function 2719 to the training subset 2734 when the given parameters c1-cN are applied as the coefficients for deterministic function 2719. In particular, the serialized flow of FIG. 27E can be configured to minimize the error value based on intelligently searching possible sets of N coefficients c1-cN that render the smallest output to the loss function, for example, without exhaustively evaluating every possible set of N coefficients c1-cN.

The "search" for this best set of N coefficients c1-cN can be considered a search for the point in an N-dimensional search space that renders the minimum value of the loss function. Note that the set of N coefficients c1-cN of the outputted model 2720 may not correspond to the true minimum value of the loss function in this N-dimensional search space due to many local minima being present and/or based on the entirety of the search space not being searched.

FIG. 27F presents a two-dimensional illustration of an N-dimensional search space 2735, where N corresponds to the N coefficients c1-cN of tuned model parameters 2622. Some or all dimensions of the N dimensional search space can be bounded and/or unbounded. While only dimensions d1 and d2 are illustrated, more than 2 dimensions can be present, for example, based on the number of coefficients being tuned. While a portion of the N-dimensional search space 2735 is illustrated to include locations of 3 particles 2730.1, 2730.2, and 2730.3, additional particles can have locations in different portions of the N-dimensional search space 2735.

Performing the flow of FIG. 27E can include initializing and updating locations of a plurality of particles 2730.1-2730.P in the N-dimensional search space. For example, each particle can have a current location 2732 during a given point in the serialized process of FIG. 27E. Performing model initialization step 2709 can include selecting, for example, randomly and/or pseudo-randomly, the initial location of each of a plurality of different particles 2730 across the N-dimensional search space. As different particles "move" over time as the algorithm flow of FIG. 27E progresses via updates to their current locations, their respective "best" locations can be tracked. The best location of a given particle 2730 can correspond to, of all past locations of the particle, the location that has a minimum value in the search space, for example, where the value is computed as output of the a deterministic function of the location (e.g. the N coefficients c1-cN). For example, the deterministic function denoting the value of a given location is a loss function determined as a function of the given training subset, e.g., denoting the error when fitting the deterministic function 2719 to the training subset 2734 when the given values for the given location are "plugged in" as the values for the respective coefficients of deterministic function 2719. The current and best locations of each particle can be initialized as the model initialization data 2721.

This tracking of current and best locations of various particles 2730 can correspond to tracking and updating of particle state data, for example, as the algorithm flow of FIG. 27E progresses through various stages.

As a particular example of implementing nonlinear optimization via the flow of FIG. 27E based on tracking of current and best locations of various particles 2730 in N-dimensional search space 2735 of FIG. 27F. The first type of algorithm 2701 can be implemented via optimizing each particle 2730 of a set of P particles 2730.1-2730.P. The first type of algorithm 2701 in a new and unique way. For example, unlike existing techniques, such as in particle swarm optimization, where global optimal scores are tracked, the first type of algorithm 2701 can be entirely independently parallel, where each particle 2730 optimizes its location totally independently, and only knows about its best position and not the best or current position of other particles 2730.

Furthermore, unlike existing techniques, such as in particle swarm optimization, where "momentum" values modelled after physics are utilized, the first type of algorithm 2701 can instead use two random float variables for its particles: a first variable, which specifies the scale of a random float value which is how much to move towards a particle's known best position (e.g. "gravity"), and a second variable, which sets the scale of a random float variable which is how far to move in any random direction (e.g. "momentum"). At each step (e.g. each iteration 2714 of the first type of algorithm 2701) the first variable "pulls" the position back towards its known best position, and the second variable carries it in an arbitrary direction (which has nothing to do with its current direction). An example of applying these values to render updates in particle location is illustrated in FIG. 27H.

Continuing with this particular example of implementing nonlinear optimization, after M iterations of the first type of algorithm 2701 (note that M can be adjustable), a line search algorithm can be applied to implement the second type of algorithm 2702. This can include running the same line search algorithm on the current position of all the particles as well as the best position (so far) of all the particles. Improvements that come from starting with a "best position" overwrites the "best position" but improvements that come from starting with a current point overwrite that current point and potentially also the best position.

Continuing with this particular example of implementing nonlinear optimization, performing the second type of algorithm 2702 can include, running a golden section search on each dimension (i.e. coefficient) in series one after another. If a better position is found for a given dimension, this better position is utilized when moving one to the next dimension. If not, this dimension is left alone. Because attributes of golden section search requires that the respective function to which it is being applied (in this case, the loss function) be unimodal. Performing the second type of algorithm 2702 can include stepping 1 "unit" (configurable) away from the current point. And then step 2, and then 4 units. As long as the value of the loss function keeps decreasing, we keep going in this manner, increasing step size, for example, quadratically and/or exponentially. Once it stops decreasing and switches to increasing, now we have a region over which its unimodal and we know there is a minimum in there. The golden section search can be applied to find it. Example performance of the second type of algorithm 2702 via golden section search is illustrated in FIGS. 27I-27K.

Continuing with this particular example of implementing nonlinear optimization, next, further performing the algorithm can include going back to the first type of algorithm 2701, for example, by starting a new phase instance 2716. The algorithm performance can alternate between these two algorithms as described above, first performing many iterations of algorithm type 2701, then performing algorithm type 2702, and repeating, until there is no improvement, and/or until improvement is less than a predefined threshold (e.g. after M iterations, where M is optionally not fixed, as illustrated in FIG. 27E). In some cases, there can be a configuration option for making subsequent iterative performance 2713 of the first type of algorithm 2701 shorter, for example, where the value of W decreases with some or all subsequent phase instances 2716.

This performance of the first algorithm phase 2712 in this particular example of implementing nonlinear optimization can be likened to the following analogy: if you are trying to find the peak of a mountain, randomly drop a bunch of people off all over the mountain (e.g. particles 2730). Then have them all track the GPS coordinate of the highest point they found so far. Have them wander around randomly, taking steps of a random size in a random direction, followed by (smaller) steps of a random size towards their best known point (e.g. perform algorithm type 2701). After a while (e.g. after W iterations of algorithm type 2701), have them go from their current points and their best points as far as they can upwards in the north, east, west, south directions, in order (e.g. perform algorithm type 2701). Their current best and their current points are updated accordingly. Then repeat (e.g. M times). Once this stops giving us any improvement enter second algorithm phase 2717.

Continuing with this particular example of implementing nonlinear optimization, next, a crossover of results can be applied, for example, based on adapting techniques utilized in genetic algorithms. Crossovers can be generated where each coefficient could come from either of two parents (e.g. either of two best locations of two different particles 2730 outputted via the first algorithm phase 2712) In some cases, these crossovers can be tested to determine their respective values for the loss function fairly quickly, so in some cases the total number of crossovers via two parents is small enough that we just generate them all and try them all. In some embodiments, crossovers are only attempted between the best known point across all particles (which can be determined and/or tracked even though not utilized by iterations of the first algorithm type 2701 and the best positions for each particle). The best result out of this phase, whether it was the best result coming this phase or something resulting from a crossover here, and the line search of the second type of algorithm 2702 can be run on this best result more time (e.g. and not run on all particles), to render the model 2720, where this given nonlinear optimization operator instance outputs its best found coefficients determined in this fashion. Examples of applying crossovers are illustrated in FIGS. 27L and 27M.

Continuing with this particular example of implementing nonlinear optimization, where this example is implemented via every operator instance in parallel as illustrated in FIG. 27D (e.g. about 1 k instances of this nonlinear optimization in parallel, for example, where some or all instances are upon different training subsets 2734. In some embodiments, when creating a model 2620 (e.g. a nonlinear regression model), this step is run via the parallel instances and then all of the outputs are saved from all of the operator instances as rows in a table, for example, via performance of a Create Table As Select (CTAS) operation.

Continuing with this particular example of implementing nonlinear optimization, once these alternatives are all rows in a table, a query can be generated and executed, for example via generation and execution of a corresponding SQL statement, to try all the alternatives against all the rows in the table and return the one with the smallest error, based on the user's defined loss function/error function. The execution of such a SQL statement can be parallelized across the plurality of nodes, where, despite being really 1 k separate trainings on (potentially overlapping) subsets of the data, the winner is picked from minimizing error across the whole data set. When the model is called after training, it just executes the formula, for example, provided via the user in the model training request 2610, and plugs in the coefficients.

FIG. 27G illustrates updating of particle state data 2740.*k.i* to 2740.*k.i*+1 for a given iteration 2714.*k.i* of algorithm type 2701. For example, the value of k corresponds to the given algorithm phase, and the value of i corresponds to the given iteration within the given algorithm type. Note that, in a first iteration of the given phase, the updates are instead applied to state data outputted via the second type of algorithm 2702 performed in the previous phase. Note that, in a first iteration of the first phase, the updates are instead applied to state data corresponding to the model initialization data 2721.

For each given particle 2720, its current location 2732 can be tracked. The given current location 2732 for a given particle 2730 can have coordinates 2733, which can include N corresponding values defining the location in the N-dimensional space, which correspond to candidate values of coefficients c1-cN. The given current location can further have a value 2734, denoting the value as a deterministic function h of its coordinates 2733. This deterministic function h can correspond to the loss function being minimized via the nonlinear optimization process, such as a user-specified loss function denoted via a loss function argument 2214, for example, of configurable argument 2649.11.4 of nonlinear regression model training function 2011, and/or the least squares loss function.

For each given particle 2720, its best location 2736 can also be tracked. The given best location 2736 for a given particle 2730 can have coordinates 2737, which can include N corresponding values defining the location in the N-dimensional space, which correspond to candidate values of coefficients c1-cN. The given best location and can further have a value 2738, denoting the value as the deterministic function h of its coordinates 2737. The best location 2738 of a given particle 2730 can correspond to the location of all prior current locations 2732 having the most favorable (e.g. lowest) value 2734.

Updating a given particle's current location 2732 can include applying a corresponding vector 2748, denoting the "movement" of the given particle in the N-dimensional space. The vector 2748 to be applied to a given particles 2730 can determined pseudo-randomly as a function of the particle's state data, independent of the state data of any other particles. An example of vector 2748 is illustrated in FIG. 27H.

For each given particle, the best location is updated as the new current location in the updated particle state data 2740.*i*+1 if the value 2734.*i*+1 for the new current location is more favorable (e.g. lower) than the value 2738.*i* for the given particle in the current state data 2740.*i*.

FIG. 27H illustrates an example of the vector 2748 applied to a given particle 2730 to update its current location. The new location for a particle can be determined as a function of its current location and its best location. In a given iteration, different particles can thus have different vectors 2748 applied based on differences in their best location and/or based on random factors utilized to generate each different vector rendering different random output.

In particular, a vector 2748 to be applied to a given particle can be determined as a sum of two independently determined vectors 2741 and 2745. Vectors 2741 and/or 2745 can be different for different particles in a given iteration. Vectors 2741 and/or 2745 can be different for the same particle across different iterations.

The vector 2741 for a given particle can have magnitude 2742, which can be generated as a deterministic and/or random function g1 of a first value 2743. This first value 2743 and/or the function g1 can be predetermined, can be configured via an administrator, and/or can be configured via user input, for example, as part of model training request 2610. For example, first value 2743 can optionally bound magnitude 2742, where magnitude 2742 is randomly selected based on the bounds imposed by one or more first value(s) 2743. As another example, first value 2743 sets magnitude 2742, where magnitude 2742 is always the first value for every particle. This first value and the function g1 can be the same across all particles, where all particles have their respective vector 2741 determined in each iteration based on this same first value and this same function g1.

The vector 2741 for a given particle can have direction 2744, which can be determined as a deterministic function of the best location. In particular, the direction 2744 for a given particle can always correspond the direction from the particle's current location 2732 towards its best location 2733. Note that in cases where magnitude 2742 is large enough, the application of vector 2741 to the current location optionally surpasses the best location 2733.

The vector 2745 for a given particle can have magnitude 2746, which can be generated as a deterministic and/or random function g2 of a second value 2747. This second value 2747 and/or the function g2 can be predetermined, can be configured via an administrator, and/or can be configured via user input, for example, as part of model training request 2610. For example, second value 2747 can optionally bound magnitude 2746, where magnitude 2746 is randomly selected based on the bounds imposed by one or more first value(s) 2747. As another example, second value 2747 sets magnitude 2746, where magnitude 2746 is always the second value for every particle. This second value and the function g2 can be the same across all particles, where all particles have their respective vector 2745 determined in each iteration based on this same second value and this same function g2.

The vector 2745 for a given particle can have direction 2749, which can be determined as a random function independent of the best location. In particular, the direction 2748 can be uniformly selected from all possible directions.

In cases where g1 is an increasing function of value 2743 (e.g. on average when g1 is a random function) and where g2 is an increasing function of value 2747 (e.g. on average when g2 is a random function), the relationship (e.g. ratio) between value 2743 and 2747 can be configured to tune how much particles search new places away from their known best location vs. how much particle search in the vicinity of their best location. Furthermore, the magnitude of values 2743 and 2747 can be configured to tune how quickly the search space is navigated and/or how much particles are capable of moving in each iteration in general.

FIG. 27I illustrates an example embodiment of a kth performance 2715.*k* of algorithm type 2702. This performance 2715.*k* of algorithm type 2702 can be applied to the particle state data 2740.*k*.Wk outputted via the kth iterative performance 2713.*k* of algorithm type 2701 in the corresponding kth phase instance 2716.*k*, where the output of this performance 2715.*k* of algorithm type 2702 can render updating of this given particle state data 2740.*k*.Wk as updated particle state data 2740.*k*.Wk+N, via N respective updates applied over the N dimensions during performance 2715.*k* of algorithm type 2702. This outputted particle state data 2740.*k*.Wk+N can be the input to the k+1th iterative performance 2713.*k*+1 of algorithm type 2701 in starting the next, k+1th phase instance 2716.*k*+1.

Generating particle state data 2740.*k*.Wk+N can include iteratively performing N golden section searches 2551 for each of the P particles 2730.1-2730.P, where each golden section search 2551 is performed over a respective dimension, rendering potential updating of each dimension, one at a time, for each of the P particles.

FIGS. 27J and 27K illustrate examples of performing two iterations of golden section search algorithm 2551 over two dimensions 2552.*j* and 2552.*j*+1, respectively, of the N-dimensional search space 2735 in performing a given performance 2715.*k* of algorithm type 2702 for a given particle 2730.1.

In performing the jth iteration of section search algorithm 2551 over dimension 2552.*j* for this given performance 2715.*k* of algorithm type 2702 for the given particle 2730.1, as illustrated in FIG. 27J, a bounded unimodal search space 2753.*j* in dimension 2552.*j* is determined for the current location 2732.1.*k*.Wk.j−1 determined in the previous iteration of section search algorithm 2551 over dimension 2552.*j*−1. For example, the bounded unimodal search space 2753 is determined in both directions from the current location in the dimension 2552.*j* based on, for each direction, taking step sizes (e.g. with increasing size, for example, in accordance with a quadratic and/or exponential function or other increasing function) until the corresponding value for this location as defined by function h is no longer decreasing, and setting the bound at this first instance where the value no longer decreases. Once the bounded unimodal search space for the in dimension 2552.*j* is determined for the current location 2732.1, a golden section search 2751 is performed to identify the minimum value in the bounded unimodal search space 7253, where the current location is updated to this location accordingly. Note that the current location can remain the same if the previously determined current location is determined to have the minimum value in the bounded unimodal search space 2753.

Alternatively or in addition, this same process can be performed for the best location 2733.1 for the given particle 2730.1, where another bounded unimodal search space 2754.*j* in dimension 2552.*j* is determined for the best location 2733.1. For example, the bounded unimodal search space 2754 is determined in both directions from the best location in the dimension 2552.*j* based on, for each direction, taking step sizes (e.g. with increasing size, for example, in accordance with a quadratic and/or exponential function or other increasing function) until the corresponding value for this location as defined by function h is no longer decreasing, and setting the bound at this first instance where the value no longer decreases, where this process is optionally be the same and/or similar as determining bounded unimodal search space 2753 for the current location 2732. Once the bounded unimodal search space for the in dimension 2552.*j* is determined for the best location 2733.1, the golden section search 2551 can be performed to identify the minimum value in this bounded unimodal search space 2754 in a same or similar fashion as performing the golden section search 2551 for the bounded unimodal search space 2753 of the current location. Note that the best location can remain the same if the previously determined best location is determined to have the minimum value in the bounded unimodal search space 2754. Furthermore, if the newly determined current location is more favorable (e.g. has a corresponding value that is lower) than the best location determined in performing this golden section search 2551 for the bounded unimodal search space 2754 of the best location, the best location can be instead updated to reflect this newly determined current location.

As illustrated in FIG. 27K, in performing the j+1th iteration of section search algorithm 2551 over dimension 2552.*j*+1 for this given performance 2715.*k* of algorithm type 2702 for the given particle 2730.1, this same process of FIG. 27J can be applied in dimension 2552.*j*+1. However, the respective bounded unimodal search spaces 2753 and 2754, in addition to being generated for the different dimension 2552.*j*+1, are generated from the current location and best location, respectively, updated in the prior iteration of FIG. 27J. Note that in this example, the updated best location 2733 remains unchanged from the jth iteration in iteration j+1 due to the best location 2733 having the lowest corresponding value in the bounded unimodal search space 2754.*j*+1.

The golden section search 2551 can similarly be performed in each iteration of all other particles in the set of P particles 2730.1-2730.P to render similar updates in best and/or current location as searches are performed in each dimension.

FIG. 27L illustrates an example embodiment of performance of the second algorithm phase 2717 where performance 2718 of algorithm type 2703 includes a particle set expansion step 2761, a particle selection step 2762. In particular, the particle set expansion step 2761 can be performed upon the particle state data 2740.M.WM+N outputted via the final performance 2715.M of the second algorithm type 2702 in the final phase instance 2716.M during the first algorithm phase 2712, for example, after performance of the final golden selection search 2551 over dimension 2552.N is performed upon all particles 2730.1-2730.P.

Note that the second algorithm phase 2717 is optionally performed as a function of the set of P best locations 2736.1-2736.P generated via the first algorithm phase 2712. For example, the particles 2730.1-2730.P no longer "move" in the N-dimensional space during the second algorithm phase 2717, where the tracked best locations 2736.1-2736.P over the course of performing the first algorithm phase 2712 are processed to ultimately select an overall best location (e.g. set of corresponding coordinates c1-cN).

A particle set expansion step 2761 can be implemented to generate S new particle locations as a function of the set of P locations in the particle state data 2740 outputted via the first algorithm phase 2712. This can include performing crossover techniques upon particles of the particle state data 2740, for example, where each new particle has a location 2736 generated as a function of two or more best locations 2736 of the particle state data 2740.

A particle selection step 2762 can be implemented to select a single set of coordinates (i.e. of a single location 2736) from the expanded particle state data 2759, where exactly one of the P+S possible particles 2730.1-2730.P+S has their particle utilized to render the outputted model 2720. In particular, of the locations 2736.1-2736.P+S, a particular location 2736.*v* is identified based on having the coordinates 2737.*v* that render the most favorable (e.g. minimum) output when utilized as input to the function h (e.g. the loss function). In some cases, this particular location 2736.*v* is identified based on having the coordinates 2737.*v* could be the location 2736 of one of the original set of particles 2730.1-2730.P outputted by the first algorithm phase 2712. In other cases, this particular location 2736.*v* is identified based on having the coordinates 2737.*v* could be the location 2736 of one of the new particles 2730.P+1-2730.P+S outputted by the second algorithm phase 2712.

The final identified set of coordinates defining the corresponding outputted model 2720 can be indicated by particle state data 2760 for the selected particle generated as output of the second algorithm phase 2717. In some embodiments, as illustrated in FIG. 27L, the coordinates 2737.*v* are further processed as particle state data 2760.0 for selected particle 2730.*v* via a final, M+1th performance of algorithm type 2702, for example, where N golden section searches 2551 are performed over the set of N dimensions for only the selected particle 2730.*v* as described in conjunction with FIGS. 27I-27K. The output of this performance 2715.M+1 of algorithm type 2702 can render the final particle state data 2760 denoting the coordinates 2737 that be indicated as tuned model parameters 2622 for the respective model 2720 outputted by the nonlinear optimization instance, such as the tuned model parameters 2622 of a corresponding candidate model 2720 of FIG. 27D. These coordinates 2737 are optionally implemented as tuned model parameters 2622 of the trained model data 2620, for example, if the corresponding coordinates 2737 renders the minimum output of the loss function h of all other coordinates 2737 of all of the set of L candidate models 2720.1-2720.L, or if there is a single parallelized process 2750 implementing nonlinear optimization operators 2711 to perform the functionality of FIGS. 27E-27N rather than this functionality being performed by each of a plurality of parallelized processes 2750.1-2750.L.

FIG. 27M illustrates an example embodiment of the particle set expansion step 2761, where a crossover function 2768 is performed upon each of a plurality of parent sets 2765.1-2765.S to generate the set of S new particles 2730.P+1-2730.P+S. In particular, each new particle 2730 can be generated to have coordinates selected from particles 2730 in the respective parent set 2765.

In the case where exactly two parents are included in a given parent set 2765, as illustrated in FIG. 27M, the new particle 2730 has a first proper subset of its coordinates from a first one of the two parents, and the new particle 2730 has a second proper subset of its coordinates from a second one of the two parents, where all coordinates of the new particle 2730 are selected from either the first parent or second parent. This notion can be applied in any embodiments where a plurality of parents are included in a given parent set 2765, which optionally includes more than two parents, where the new particle 2730 has a plurality of corresponding proper subsets of its coordinates, where each proper subset of its coordinates is taken from a corresponding one of the plurality of parents, and where all parents in plurality of parents have at least one of their coordinates reflected in the new particle 2730.

The number of and/or particular ones of the N coordinates selected from each parent set 2765 can be selected randomly, or in accordance with a deterministic function. In some cases, an equal number or roughly equal number of coordinates (e.g. N/2 in the case of two parents when N is even) is selected from each parent. In other cases, substantially more coordinates are selected from one parent than another, either deterministically or in accordance with a random function. In some embodiments, multiple different parents sets 2761 include identical sets of parents, where different numbers of and/or combinations of their respective coordinates are selected to render the resulting new particle 2730. For example, for a parent set 2765 that includes given set of Q parents (e.g. 2 or more), all of the $Q^N$-Q possible new particles, or a proper subset of possible new particles that includes multiple ones of this set of possible set of new particles, are generated from the given set of two parents. Alternatively, only one new particle is generated from a given parent set 2765. In some cases, to reduce the number of new particles being generated and/or evaluated, a small number of new particles, such as only one new particle, is generated from a given parent set via deterministic and/or random selection of which coordinate be selected from which parent.

The particles included in each of the S parent sets can be selected deterministically and/or randomly from the P particles 2730.1-2730.N. In some cases, all parent sets 2765 include exactly 2, or another same number that is greater than 2, of particles. In some cases, different parent sets 2765 include different numbers of particles. In the case where each parent set 2765 includes Q particles (e.g. 2 or more), some or all of the set of c(P,Q) (i.e. P combination Q, or the number of possible different sets of Q particles selected from a set of P particles) denotes the mathematical equation P combination Q possible parent sets 2765 can be included in the S parent sets 2765.1-2765.S, where each parent set 2765 renders exactly one new particle or multiple new particles as discussed above.

In some cases, as illustrated in FIG. 27M, to reduce the number S of parent sets evaluated via crossover function 2768, a subset of possible parent sets is intelligently selected based on knowledge of which particles 2730 already render more favorable output to the loss function h. These particles can be guaranteed and/or more likely to be included in parent sets.

As a particular example, as illustrated in FIG. 27M, the tracked best particle over all P particles 2730.X is identified in the set of particles 2730.1-2730.P that has coordinates 2737 for its best location 2736 rendering the most favorable (e.g. minimum) output of the loss function h of all coordinates 2737 for all best locations 2736 across all P particles in the particle state data 2740 outputted via the first algorithm phase 2712. The set of parent sets can include exactly P−1 parent sets, where this "best" particle 2730.X is paired with every other particle of the P particles to render these P−1 parent sets. In the case where only one new particle is generated for each new particle, only P−1 new particles are generated, where S is equal to P−1.

The nonlinear optimization process 2710 of some or all of FIGS. 27A-27M can be implemented via model training operators 2634 to generate various model types 2713. For example, the nonlinear optimization process 2710 can be implemented in performing nonlinear regression training function 2011, where the coefficients of the arbitrary function being fit to the data in training set 2633 are configured via some or all features and/or functionality of performing the nonlinear optimization process 2710 described in conjunction with FIGS. 27A-27M.

Alternatively or in addition, the nonlinear optimization process 2710 can be implemented in performing logistic regression training function 2012. For example, building a logistic regression model can include performing the nonlinear optimization of the logistic equation. However, because the dependent variables are labels and not necessarily numeric, the result of the model can be outputted as a floating point number between 0 and 1 that needs to be converted to the correct label. As part of model training, verification can be performed to ensure that there are exactly 2 distinct values/labels for the label. Once of these values is assigned to 1, and the other one of these values is assigned to 0. This mapping of the output labels to 1 vs. 0 can further be stored in the model data 2620. Then the nonlinear fit is performed as discussed in conjunction with some or all of FIGS. 27A-27M in a similar fashion as performing nonlinear regression, but the loss function is the negative log likelihood loss rather than least squares or arbitrary user-defined function. Lastly, when the model is called after training, the result is rounded to one or zero, and the corresponding mapped label is outputted accordingly.

FIG. 27N illustrates an example embodiment of a model training request 2610 that includes a configured nonlinear optimization argument set 2779 that includes a plurality of configured values for a plurality of arguments 2649 that correspond to arguments of a nonlinear optimization argument set 2769. The operator flow generator module 2514 can generate the query operator execution flow 2517 based applying the configured values for the plurality of arguments 2649 in the nonlinear optimization argument set 2779, for example, as defined in a corresponding model training function 2621. In particular, one or more aspects of the nonlinear optimization process 2710 can be configured via the nonlinear optimization argument set 2779. Some or all features and/or functionality of the processing of model training request 2610 to generate a query operator execution flow 2517 for execution can implement the processing of model training request 2610 to generate a query operator execution flow 2517 of FIG. 27A, and/or any other processing of a model training request 2610 described herein.

The nonlinear optimization argument set 2769 can denote how a given model training function 2621 be configured, for example, when performing nonlinear optimization process 2710. Some or all configurable arguments 2749 of the nonlinear optimization argument set 2769 of FIG. 27N can be implemented as configurable arguments 2749 of the nonlinear optimization argument set 2769 of the nonlinear regression model training function 2011, the logistic regression model training function 2012, the feedforward neural network model training function 2013, the SVM model training function 2014, and/or any other model training function 2621 for any type of model that implements some or all of the nonlinear optimization process 2710 described in conjunction with FIGS. 27A-27M.

As illustrated in FIG. 27N, nonlinear optimization argument set 2769 can include a configurable argument 2649.15.1, for example, corresponding to a population size argument 2251. The configurable argument 2649.15.1, if set, can be a positive integer value that sets the population size for performance of the first type of algorithm 2701. For example, the configurable argument 2649.15.1 specifies the number of particles 2730 that be initialized and/or tracked in executing the first type of algorithm 2701. The configurable argument 2649.1.1 can be an optional argument for some or all corresponding model training functions 2621, and can default to 1024. In this example, the configured nonlinear optimization argument set 2779 denotes a corresponding user-specified population size value 2351 for this configurable argument 2649.15.1. The configurable argument 2649.15.1 can optionally have a parameter name 2659 of "popSize".

The nonlinear optimization argument set 2769 can alternatively or additionally include a configurable argument 2649.15.2, for example, corresponding to a minimum initial parameter value argument 2252. The configurable argument 2649.15.2, if set, can be a floating point number specifying the minimum for initial parameter values for the optimization algorithm, such as the minimum value for some or all coefficients c1-CN generated in initializing each particle 2730. The configurable argument 2649.15.2 can be an optional argument for some or all corresponding model training functions 2621, and can default to −1. In this example, the configured nonlinear optimization argument set 2779 denotes a corresponding user-specified minimum initial parameter value 2352 for this configurable argument 2649.15.2. The configurable argument 2649.15.2 can optionally have a parameter name 2659 of "minInitParam Value".

The nonlinear optimization argument set 2769 can alternatively or additionally include a configurable argument 2649.15.3, for example, corresponding to a maximum initial parameter value argument 2253. The configurable argument 2649.15.3, if set, can be a floating point number specifying the maximum for initial parameter values for the optimization algorithm, such as the maximum value for some or all coefficients c1-CN generated in initializing each particle 2730. The configurable argument 2649.15.3 can be an optional argument for some or all corresponding model training functions 2621, and can default to 1. In this example, the configured nonlinear optimization argument set 2779 denotes a corresponding user-specified maximum initial parameter value 2353 for this configurable argument 2649.15.3. The configurable argument 2649.15.3 can optionally have a parameter name 2659 of "maxInitParam Value".

The nonlinear optimization argument set 2769 can alternatively or additionally include a configurable argument 2649.15.4, for example, corresponding to an initial number of iterations argument 2254. The configurable argument 2649.15.4, if set, can be a positive integer value specifying the number of iterations W1 for the iterative performance 2713.1 of the first algorithm type 2701 in first phase instance 2716.1. The configurable argument 2649.15.4 can be an optional argument for some or all corresponding model training functions 2621, and can default to 5000. In this example, the configured nonlinear optimization argument set 2779 denotes a corresponding user-specified initial number of iterations value 2354 for this configurable argument 2649.15.4. The configurable argument 2649.15.4 can optionally have a parameter name 2659 of "initialIterations".

The nonlinear optimization argument set 2769 can alternatively or additionally include a configurable argument 2649.15.5, for example, corresponding to a subsequent number of iterations argument 2255. The configurable argument 2649.15.5, if set, can be a positive integer value specifying the number of iterations W2, W3, . . . , WM for some or all subsequent iterative performances 2713.2-2713.M of the first algorithm type 2701 in some or all subsequent phase instances after phase instance 2716.1. The configurable argument 2649.15.5 can be an optional argument for some or all corresponding model training functions 2621, and can default to 1000. In this example, the configured nonlinear optimization argument set 2779 denotes a corresponding user-specified subsequent number of iterations value 2355 for this configurable argument 2649.15.5. The configurable argument 2649.15.5 can optionally have a parameter name 2659 of "subsequentIterations".

The nonlinear optimization argument set 2769 can alternatively or additionally include a configurable argument 2649.15.6, for example, corresponding to a momentum argument 2256. The configurable argument 2649.15.6, if set, can be a positive floating point value controlling how much particles move away from their local best value to explore new territory in iterations of algorithm type 2701. For example, the configurable argument 2649.15.6 specifies value 2747. The configurable argument 2649.15.6 can be an optional argument for some or all corresponding model training functions 2621, and can default to 0.1. In this example, the configured nonlinear optimization argument set 2779 denotes a corresponding user-specified momentum value 2356 for this configurable argument 2649.15.6. The configurable argument 2649.15.6 can optionally have a parameter name 2659 of "momentum".

The nonlinear optimization argument set 2769 can alternatively or additionally include a configurable argument 2649.15.7, for example, corresponding to a gravity argument 2257. The configurable argument 2649.15.7, if set, can be a positive floating point value controlling how much particles are drawn back towards their local best value in iterations of algorithm type 2701. For example, the configurable argument 2649.15.7 specifies value 2743. The configurable argument 2649.15.7 can be an optional argument for some or all corresponding model training functions 2621, and can default to 0.01. In this example, the configured nonlinear optimization argument set 2779 denotes a corresponding user-specified momentum value 2357 for this configurable argument 2649.15.7. The configurable argument 2649.15.7 can optionally have a parameter name 2659 of "gravity".

The nonlinear optimization argument set 2769 can alternatively or additionally include a configurable argument 2649.15.8, for example, corresponding to a loss function number of samples argument 2258. The configurable argument 2649.15.8, if set, can be a positive integer specifying how many points are sampled (e.g. how many rows in the training set 2633 and/or respective training subset be sampled) when performing the loss function and/or when estimating the output of the loss function. The configurable argument 2649.15.8 can be an optional argument for some or all corresponding model training functions 2621, and can default to 1000. In this example, the configured nonlinear optimization argument set 2779 denotes a corresponding user-specified loss function number of samples value 2358 for this configurable argument 2649.15.8. The configurable argument 2649.15.8 can optionally have a parameter name 2659 of "lossFuncNumSamples".

The nonlinear optimization argument set 2769 can alternatively or additionally include a configurable argument 2649.15.9, for example, corresponding to a number of crossovers argument 2259. The configurable argument 2649.15.9, if set, can be a positive integer specifying how many different crossover possibilities will be tried, for example, in accordance with applying a genetic algorithm and/or in performing the third algorithm type 2703. For example, this controls the number of new particles S that be generated via performance of crossover function 2768. The configurable argument 2649.15.9 can be an optional argument for some or all corresponding model training functions 2621, and can default to 10 million. In this example, the configured nonlinear optimization argument set 2779 denotes a corresponding user-specified loss function number of samples value 2359 for this configurable argument 2649.15.9. The configurable argument 2649.15.9 can optionally have a parameter name 2659 of "numGAAttempts".

The nonlinear optimization argument set 2769 can alternatively or additionally include a configurable argument 2649.15.10, for example, corresponding to a maximum number of line search iterations argument 2260. The configurable argument 2649.15.10, if set, can be a positive integer specifying the maximum allowed number of iterations when running a line search and/or corresponding golden section search, for example, in each performance of the second type of algorithm 2702. The configurable argument 2649.15.10 can be an optional argument for some or all corresponding model training functions 2621, and can default to 200. In this example, the configured nonlinear optimization argument set 2779 denotes a corresponding user-specified maximum number of line search iterations value 2360 for this configurable argument 2649.15.10. The configurable argument 2649.15.10 can optionally have a parameter name 2659 of "maxLineSearchIterations".

The nonlinear optimization argument set 2769 can alternatively or additionally include a configurable argument 2649.15.11, for example, corresponding to a minimum line search step size argument 2261. The configurable argument 2649.15.11, if set, can be a positive integer specifying the minimum step size that the line search algorithm and/or corresponding golden section search ever takes, for example, in each performance of the second type of algorithm 2702. The configurable argument 2649.15.11 can be an optional argument for some or all corresponding model training functions 2621, and can default to 1e−5. In this example, the configured nonlinear optimization argument set 2779 denotes a corresponding user-specified minimum line search step size 2361 for this configurable argument 2649.15.11. The configurable argument 2649.15.11 can optionally have a parameter name 2659 of "minLineSearchStepSize".

The nonlinear optimization argument set 2769 can alternatively or additionally include a configurable argument 2649.15.12, for example, corresponding to a samples per thread argument 2262. The configurable argument 2649.15.12, if set, can be a positive integer value controlling the target number of samples that are sent to each thread (e.g. each parallelized optimization process 2750), where each thread independently computes a candidate regression model, and they are all combined and/or evaluated at the end. For example, the configurable argument 2649.15.12 is utilized to determine the overwrite factor and/or number of nodes to be utilized, for example further based on cardinality estimates for the training set 2633. The configurable argument 2649.15.12 can be an optional argument for some or all corresponding model training functions 2621, and can default to 1 million. In this example, the configured nonlinear optimization argument set 2779 denotes a corresponding user-specified samples per thread target value 2362 for this configurable argument 2649.15.12. The configurable argument 2649.15.12 can optionally have a parameter name 2659 of "samplesPerThread".

Alternatively or in addition, the configurable arguments 2749 of the nonlinear optimization argument set 2769 can include additional arguments to configure other aspects of the optimization process 2710 and/to configure same parts of the optimization process 2710 in a different fashion.

While the model function call 2610 of FIG. 27N indicates inclusion of values for all configurable arguments 2749 of the nonlinear optimization argument set 2769 in the function library, some or all of the configurable arguments 2749 of the nonlinear optimization argument set 2769 can be optional arguments, where a corresponding model function call 2610 optionally need not include corresponding configured values for some or all of these configurable arguments 2749.

FIG. 27O illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27O. In particular, a node 37 can utilize their own query execution memory resources 3045 to execute some or all of the steps of FIG. 27O, where multiple nodes 37 implement their own query processing modules 2435 to independently execute the steps of FIG. 27O for example, to facilitate execution of a query as participants in a query execution plan 2405. Some or all of the steps of FIG. 27O can optionally be performed by any other processing module of the database system 10. Some or all of the steps of FIG. 27O can be performed to implement some or all of the functionality of the database system 10 as described in conjunction with FIGS. 27A-27N, for example, by implementing some or all of the functionality of generating trained model data 2620 via a nonlinear optimization process 2710. Some or all of the steps of FIG. 27O can be performed to implement some or all of the functionality regarding execution of a query via the plurality of nodes in the query execution plan 2405 as described in conjunction with some or all of FIGS. 24A-26J. Some or all steps of FIG. 27O can be performed by database system 10 in accordance with other embodiments of the database system 10 and/or nodes 37 discussed herein. Some or all steps of FIG. 27O can be performed in conjunction with one or more steps of FIG. 26L, FIG. 26M, and/or one or more steps of any other method described herein.

Step 2782 includes determining a query for execution that indicates generating of a machine learning model. Step 2784 includes generating a query operator execution flow for the query that includes at least one parallelized optimization process configured to facilitate generating of the machine learning model. Step 2786 includes executing the query operator execution flow in conjunction with executing the query based on executing the plurality of operators.

Performing step 2786 can include performing some or all of steps 2788-2792. Step 2788 includes, for each parallelized optimization process, initializing a set of locations for a set of particles of a search space corresponding to a set of configurable coefficients of the machine learning model. Step 2790 includes, for each parallelized optimization process, generating a candidate model based on iteratively performing a first type of optimization algorithm (e.g. algorithm type 2701). upon the set of particles and further performing a second type of optimization algorithm (e.g. algorithm type 2702). Step 2792 includes utilizing one candidate set of model coefficients (e.g. a most favorable set of candidate model coefficients) to generate the machine learning model.

In various examples, the one candidate set of model coefficients is selected from one or more sets of candidate model coefficients generated via the at least one parallelized optimization process.

In various examples, the at least one parallelized optimization process includes only one optimization process, where the candidate set of model coefficients is outputted as the model.

In various examples, the at least one parallelized optimization process includes a plurality of parallelized optimization processes configured to facilitate generating of the machine learning model, where the plurality of operators implement the plurality of parallelized optimization processes. In various examples, executing each of the plurality of parallelized optimization processes in conjunction with executing the query based on executing the plurality of operators includes generating a corresponding set of candidate model coefficients of a plurality of sets of candidate model coefficients independently from executing other ones of plurality of parallelized optimization processes, for example, based on the each of the plurality of parallelized optimization processes performing steps 2788 and/or 2790.

In various examples, a dimension of the search space is based on a number of coefficients in the set of configurable coefficients. In various examples, the second type of optimization algorithm is different from the first type of optimization algorithm;

In various examples, each parallelized optimization process performs a first instance of a first algorithm phase by iteratively performing the first type of optimization algorithm independently upon each of the set of particles a plurality of times to update the set of locations and to initialize a set of best positions for the set of particles, and by further updating the set of locations and the set of best positions generated via the first type of optimization algorithm based on performing the second type of optimization algorithm. In various examples, the corresponding set of candidate model coefficients is based on processing the set of best positions generated via the second type of optimization algorithm.

In various examples, the machine learning model is generated in executing the query based on selection of a most favorable set of candidate model coefficients from the plurality of sets of candidate model coefficients outputted via the plurality of parallelized optimization processes.

In various examples, the most favorable set of candidate model coefficients is selected from the plurality of sets of candidate model coefficients outputted via the plurality of parallelized optimization processes based on executing at least one other operator of the plurality of operators serially after the plurality of parallelized optimization processes in the query operator execution flow.

In various examples, executing the at least one other operator includes generating and storing a table in accordance with a Create Table As Select (CTAS) query execution to store the plurality of sets of candidate model coefficients as a corresponding plurality of table entries. In various examples, executing the at least one other operator further includes identifying the most favorable set of candidate model coefficients as one table entry of the corresponding plurality of table entries having a smallest error against a training set of rows in accordance with a loss function.

In various examples, performance of each of a set of iterations of the first type of optimization algorithm upon the each of the set of particles includes generating an updated location from a current location generated via a prior iteration of the first type of optimization algorithm upon the each of the set of particles. In various examples, generating the updated location from the current location is based on: applying a first vector having a magnitude as an increasing function of a first predefined value and having a direction corresponding to a direction vector from the current location towards a current best location; and/or further applying a second vector having a magnitude as an increasing function of a second predefined value and having a direction corresponding to a direction vector with a randomly selected direction.

In various examples, performance of each of a set of iterations of the first type of optimization algorithm upon the each of the set of particles includes generating an updated best location from a current best location generated via a prior iteration of the first type of optimization algorithm upon the each of the set of particles. In various examples, generating the updated best location from the current best location includes: comparing a first value to a second value, where the first value is output of a function applied to the updated location as input, and where the second value is output of the function applied to the current best location as input; setting the updated best location as the updated location when the first value is more favorable the second value; and/or maintaining the current best location as the updated best location when the second value is more favorable the first value.

In various examples, for a subsequent iteration of the set of iterations, the updated location is utilized as the current location and the updated best location is utilized as the current best location.

In various examples, the function is a loss function corresponding to a set of coefficients of the machine learning model. In various examples, the first value is more favorable the second value when the first value is less than the second value.

In various examples, the query is determined based on a query expression generated via user input that indicates an equation denoting dependent variable output as a function of a set of independent variables and/or a set of coefficient variables corresponding to the set of configurable coefficients. In various examples, executing the query operator execution flow further includes reading a plurality of rows from memory of a relational database stored in memory resources, where a first set of columns of the plurality of rows correspond to the set of independent variables, and/or where at least one additional column of the plurality of rows corresponds to the dependent variable output. In various examples, executing the query operator execution flow further includes identifying a plurality of training data subsets from the plurality of rows, where each of the plurality of training data subsets is utilized by a corresponding one of the plurality of parallelized optimization processes. In various examples, output of the loss function for the each of the plurality of parallelized optimization processes is based on the equation; and/or a corresponding one of the plurality of training data subsets processed by the each of the plurality of parallelized optimization processes.

In various examples, the method further includes storing the machine learning model in memory resources after executing the query, and determining a second query for execution that indicates applying of the machine learning model to a dataset. In various examples, the method further includes generating a second query operator execution flow for the second query based on accessing the machine learning model in the memory resources; generating a set of input rows via execution of a first portion of the second query operator execution flow; and/or generating predicted output for each of the set of input rows in accordance with applying the machine learning model via execution of a second portion of the second query operator execution flow.

In various examples, the machine learning model corresponds to a logistic regression model. In various examples, executing the query operator execution flow further includes: identifying exactly two labels in at least one additional column of the plurality of rows; and/or reassigning each of the exactly two labels as one of: a one or a zero as a deterministic mapping. In various examples, the loss function is implemented based on a negative log likelihood loss function. In various examples, generating the predicted output includes rounding a numeric output of to the one of: the one or the zero, and/or further includes applying the deterministic mapping to emit one of the exactly two labels for each of the set of input rows as the predicted output.

In various examples, the machine learning model corresponds to a support vector machine model. In various examples, executing the query operator execution flow further includes: identifying exactly two labels in at least one additional column of the plurality of rows; and/or reassigning each of the exactly two labels as one of: a positive one or a negative one as a deterministic mapping. In various examples, the loss function is implemented based on a hinge loss function. In various examples, generating the predicted output includes identifying a sign of a numeric, and/or further includes applying the sign of the deterministic mapping to emit one of the exactly two labels for each of the set of input rows as the predicted output.

In various examples, performance of the second type of optimization algorithm includes, for the each of the set of particles, processing a current position and a current best position generated via a final iteration of the first type of optimization algorithm upon the each of the set of particles to generate an updated position and an updated best position based on, for each of the set of configurable coefficients, one at a time: performing a golden selection search from a first current coefficient value of the each of the set of configurable coefficients for the current best position to identify a first other coefficient value where a corresponding function in the search space begins increasing; identifying a first given coefficient value in a first region between the first current coefficient value and the first other coefficient value inducing a first minimum for the corresponding function in the first region; updating the current best position by setting the each of the set of configurable coefficients as the first given coefficient value; performing the golden selection search from a second current coefficient value of the each of the set of configurable coefficients for the current position to identify a second other coefficient value where the corresponding function in the search space begins increasing; identifying a second given coefficient value in a second region between the second current coefficient value and the second other coefficient value inducing a second minimum for the corresponding function in the second region; updating the current position by setting the each of the set of configurable coefficients as the second given coefficient value; and/or when the second minimum is less than the first minimum, updating the current best position by setting the each of the each of the set of configurable coefficients as the second given coefficient value.

In various examples, executing the each of the plurality of parallelized optimization processes is further based on further updating the set of locations and the set of best positions in each of a plurality of additional instances in iteratively repeating the first algorithm phase from the set of locations and the set of best positions generated in a prior instance based on, in each additional instance of the plurality of additional instances, iteratively performing the first type of optimization algorithm independently upon the each of the set of particles the plurality of times and then performing the second type of optimization algorithm upon the set of locations and the set of best positions generated via the first type of optimization algorithm. In various examples, the corresponding set of candidate model coefficients is based on processing the set of best positions generated via a final one of the plurality of additional instances.

In various examples, executing the each of the plurality of parallelized optimization processes is further based on further updating the set of best positions by performing a second algorithm phase upon the set of best positions generated via the final one of the plurality of additional instances based on generating at least one new candidate best position from the set of best positions (e.g. via algorithm type 2703). In various examples, the corresponding set of candidate model coefficients is based on processing the set of best positions generated via the final one of the plurality of additional instances.

In various examples, the each best position of the set of best positions is defined via an ordered set of values, where each one of the ordered set of values corresponds to a different one of a set of dimensions of the search space, and/or where generating each new candidate best position of the at least one new candidate best position includes selecting a corresponding ordered set of values defining the each new candidate best position as having: a first proper subset of values of the corresponding ordered set of values selected from a first ordered set of values defining a first one of the set of best positions; and/or a second proper subset of values of the corresponding ordered set of values selected from a second ordered set of values defining a second one of the set of best positions that is different from the first one of the set of best positions.

In various examples, the first proper subset and the second proper subset are mutually exclusive and collectively exhaustive with respect to the corresponding ordered set of values.

In various examples, performing the second algorithm phase includes performing a crossover process in accordance with applying a genetic algorithm.

In various examples, the second one of the set of best positions is a same one of the best positions utilized for every new candidate best position. In various examples, the same one of the best positions is selected from the set of best positions based on being a most favorable one of the set of best positions.

In various examples, generating a query operator execution flow for the query further includes: determining a maximum number of nodes parameter and/or determining an overwrite factor parameter. In various examples, executing the query operator execution flow further includes reading a plurality of rows from memory of a relational database stored in memory resources, where a first set of columns of the plurality of rows correspond to a set of independent variables, and/or where at least one additional column of the plurality of rows corresponds to a dependent variable output. In various examples, executing the query operator execution flow further includes identifying a plurality of training data subsets from the plurality of rows based on performing a random shuffling process by applying the maximum number of nodes parameter and/or the overwrite factor parameter, where each of the plurality of training data subsets is utilized by a corresponding one of the plurality of parallelized optimization processes.

In various examples, the maximum number of nodes parameter and/or the overwrite factor parameter are automatically selected based on a cardinality of a set of columns of the plurality of rows.

In various examples, generating the query operator execution flow for the query is based on a set of arguments configured via user input. In various examples, the set of arguments indicates at least one of: a configured number of particles in the set of particles; a configured minimum particle value for particles in the set of particles; a configured minimum particle value for particles in the set of particles; a configured initial number of iterations performed in a first instance of iteratively performing the first type of optimization algorithm; a configured subsequent number of iterations performed in at least one additional instance of iteratively performing the first type of optimization algorithm; a configured first value denoting scale of a first vector applied to the particles from their current location towards their current best location when performing the first type of optimization algorithm; a configured second value denoting scale of a second vector applied to the particles from their current location towards a random direction when performing the first type of optimization algorithm; a configured number of samples specifying how many points be sampled when estimating output of a loss function; a configured number of crossover attempts specifying how many crossover combinations are utilized when processing the set of best positions; a configured maximum number of line search iterations for a line search applied when performing the second type of optimization algorithm; a configured minimum line search step size for the line search applied when performing the second type of optimization algorithm; and/or a configured number of samples per parallelized process configuring a target number of samples processed by each parallelized process of the set of parallelized processes.

In various embodiments, any one of more of the various examples listed above are implemented in conjunction with performing some or all steps of FIG. 27O. In various embodiments, any set of the various examples listed above can be implemented in tandem, for example, in conjunction with performing some or all steps of FIG. 27O.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27O described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27O, for example, in conjunction with further implementing any one or more of the various examples described above.

In various embodiments, the operational instructions, when executed by the at least one processor, cause the database system to: determine a query for execution that indicates generating of a machine learning model; generate a query operator execution flow for the query that includes a plurality of operators implementing a plurality of parallelized optimization processes configured to facilitate generating of the machine learning model; and/or execute the query operator execution flow in conjunction with executing the query based on executing the plurality of operators. Executing each of the plurality of parallelized optimization processes can include generating a corresponding set of candidate model coefficients of a plurality of sets of candidate model coefficients based on, independently from executing other ones of plurality of parallelized optimization processes: initializing a set of locations for a set of particles of a search space corresponding to a set of configurable coefficients of the machine learning model, where a dimension of the search space is based on a number of coefficients in the set of configurable coefficients; performing a first instance of a first algorithm phase based on iteratively performing a first type of optimization algorithm independently upon each of the set of particles a plurality of times to update the set of locations and to initialize a set of best positions for the set of particles and/or based on updating the set of locations and the set of best positions generated via the first type of optimization algorithm based on performing a second type of optimization algorithm that is different from the first type of optimization algorithm. A corresponding set of candidate model coefficients can be based on processing the set of best positions generated via the second type of optimization algorithm. The machine learning model can be generated in executing the query based on selection of a most favorable set of candidate model coefficients from a plurality of sets of candidate model coefficients outputted via the plurality of parallelized optimization processes.

FIGS. 28A-28F illustrate embodiments of a database system 10 that generates trained model data 2620 for a neural network model type 2613.13 via performance of a nonlinear optimization process 2710 during query execution. The database system 10 can further apply this trained model data 2620 of the neural network model type in other query executions to generate output for other input data. Some or all features and/or functionality of the generation and/or execution of query operator execution flow 2517 to implement generation of trained model data 2620 for a neural network model type 2613.13 of FIGS. 28A-28F can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a neural network model type 2613.13 of FIGS. 28A-28F can implement the execution of query requests 2602 to apply trained model data 2620 of FIG. 26B, 27C and/or any other embodiment of database system 10 described herein.

The feedforward neural network model type 2613.13 of FIGS. 28A-28F can be implemented to solve simple nonlinear problems (or more complex nonlinear problems, deep learning problems, etc.) where it may be unclear what the model should look like. The corresponding feedforward neural network model training function 2621.13 can leverage the trait of feedforward neural networks that the output can be represented by a single equation. Even when there's multiple output, the output can be treated as single output that's a vector). This equation can have C inputs which can be all independent variables. The details of this equation can be a deterministic function of the activation functions, the number of hidden layers (e.g. fully connected), and/or the number of neurons per hidden layer. From there, once this equation is determined, generation of the respective model can be treated as a nonlinear regression problem. For example, some or all of the features and/or functionality of the nonlinear optimization process 2710 of FIGS. 27A-27N can be implemented to solve for the parameters of this equation, even though these parameters denote weights/biases of a neural network rather than arbitrary coefficients in a user-defined function, for example, as discussed in conjunction with nonlinear regression model training function 2621.11 for the nonlinear regression type 2613.11 and/or as discussed in examples of FIGS. 27A-27N.

In some embodiments, pre-packed (e.g. predefined) loss functions can be provided, where a user can select from this specified set of functions. (e.g. this set can include least squares, vector least squares, hinge, negative log likelihood, etc.). Alternatively, the user can write/otherwise specify their own loss function. The user can also optionally specify if a softmax function should be applied to the output (e.g. when the output is a vector). Such configuration can be implemented via corresponding values for respective configured arguments 2649.

After training, executing the model on new data can include applying this equation, with the tuned parameters, for example, specified into SQL text for execution. This equation can be large, and can have the same terms get repeated over and over by nature of the neural network model type: the terms for earlier stages in the network are used over and over for later stages (because they are part of the input). While the actual equation written as a single equation can be large, executing the model can include applying the full equation as a it as a series of sub-equations. This can include defining temporary variables during execution that can then be used in later equations: e.g.

$$b = a1 * x1 + a2$$

$$c = a3 * b + a4$$

In this example, b is a temporary variable utilized to generate temporary variable c, where temporary variable c can be called in generating further temporary variables. This can make execution more efficient and/or representation of the equation much smaller. In some cases, the sub-equations and/or respective generation of temporary variables is not written in SQL directly, but this nature of generating and utilizing temporary variables to apply a series of sub-equations can be automatically represented and applied in query operator execution flows 2517 executed by query execution module 2504.

FIG. 28A presents an embodiment of a database system 10 that generates trained model data 2620 having tuned parameters 2622 that include a plurality of tuned weights w1-wT and a plurality of tuned biases b1-bU. For example, the trained model data 2620 is generated based on executing a corresponding query for a query request 2601 denoting a model training request 2610 denoting the model type 2613.13 corresponding to the feedforward neural network model type. This can include performing a model training function 2621.13 corresponding to a feedforward neural network training function 2013. The feedforward neural network training function 2013 can have some or all configurable arguments discussed in conjunction with FIG. 26J, and/or the model training request 2610 denoting the model type 2613.13 can denote user-specified values for these configurable arguments, for example, optionally in accordance with syntax discussed in conjunction with FIG. 26J.

Performing the feedforward neural network training function 2013 to generate tuned model parameters 2622 for trained model data 2620 can include performing nonlinear optimization process 2710, for example, in conjunction with some or all features and/or functionality of the nonlinear optimization process 2710 described in conjunction with FIGS. 27A-27N, where weights w1-wT and biases b1-bU of FIG. 28A are implemented as the set of N coefficients c1-cN.

FIG. 28B illustrates an embodiment of a database system 10 that generates trained model data indicating tuned model parameters 2622 for a function definition 2719, based on the nonlinear optimization process selecting these parameters for the defined function 2719 based on minimizing a loss function h, for example, as described in conjunction with FIG. 27B. Note that the output of the function 2719 can include a vector of multiple values y1-yS, rather than a single value. S corresponding columns of the training set (and/or a corresponding vector of S values in one column) can be utilized to train the model accordingly. Automatic determination of the function 2719 to be tuned via nonlinear optimization process based on reflecting behavior of a corresponding neural network is discussed in further detail in conjunction with FIG. 28E.

FIG. 28C illustrates a depiction of trained model data 2620 as a neural network having an input layer 2811, Z hidden layers 2812.1-2812.Z, and an output layer 2813. Each of these layers can include a plurality of neurons 2810, for example, implemented in accordance with neural network characteristics. The input layer 2811 can include C neurons 2810.0.1-2810.0.C corresponding to the C inputs x1-xC. Each hidden layer 2812 can include V neurons 2810, where Vis optionally the same for each hidden layer 2812, or where different numbers of neurons 2810 are included in different hidden layers 2812. The output layer 2813 can include S neurons 2810.Z+1.1-2810.Z+1.S corresponding to the S inputs y1-yS. This configuration of the neural network can be predetermined prior to runtime based on a preset and/or user-configured neural network layout. In particular, this layout can be deterministic based on: the number of hidden layers Z; the number of neurons V per hidden layer; the number of inputs C; and/or the number of outputs S; for example, in the case where the neural network is to be fully connected. Some or all of values of Z, V, C, and/or S can be denoted via configurable arguments in model training request 2610. For example, Z is specified via hidden layers argument 2321; V is specified via layer size argument 2232; S is specified via outputs argument 2233; and/or C is specified via a number of columns in the generated training set 2633 (e.g. total #columns minus S).

FIG. 28D illustrates a depiction of hidden layer neurons 2810 generating sub-outputs 2815 as a function of applying weight values to inputs from prior neurons, applying a bias value, and/or applying an activation function G.

For a first hidden layer 2812.1, each neuron 2810 applies respective weights to each of the C inputs (e.g. generates a corresponding product of input with the respective weights), where the C weights for each neuron of the first hidden layer 2812.1 are tuned via feedforward neural network model training function 2013, for example, by performing nonlinear optimization process 2710. A summation of these products can be summed with the respective bias value, where the bias for each neuron of the first hidden layer 2812.1 is tuned via feedforward neural network model training function 2013, for example, by performing nonlinear optimization process 2710. An activation function G can be applied to this summation to render respective sub-output, where the activation function G is predetermined based on being native to the feedforward neural network model training function 2013 and/or based on being selected/written via user input (e.g. as activation function argument 2237). In some embodiments, the activation function is configured to be and/or required to be a linear function and/or a differentiable function. For a given ith neuron in the first hidden layer, its sub-output 2815.1.*i* (denoted s.1.i) can be expressed as G(w.1.i.1*x1+w.1.i.2*x2+ . . . +w.1.i.C*xC+b.1.i), thus a function of the weights, biases, and independent variables.

For a second hidden layer 2812.2 (if applicable), each neuron 2810 applies respective weights to each of the V inputs outputted via the V neurons of the first layer 2812.1 (e.g. generates a corresponding product of input with the respective weights), where the V weights for each neuron of the first hidden layer 2812.2 are also tuned via feedforward neural network model training function 2013, for example, by performing nonlinear optimization process 2710. A summation of these products can be summed with the respective bias value, where the bias for each neuron of the second hidden layer 2812.2 is also tuned via feedforward neural network model training function 2013, for example, by performing nonlinear optimization process 2710. An activation function G can be applied to this summation to render respective sub-output, where the activation function G is predetermined based on being native to the feedforward neural network model training function 2013 and/or based on being selected/written via user input (e.g. as activation function argument 2237). The activation function for the different layers/different neurons can be configured to be the same or different from each other. For a given jth neuron in the second hidden layer, its sub-output 2815.2.*j* (denoted s.2.j) can be expressed as G(w.2.j.1*s. 1.1+w.2.j.2*s.1.2+ . . . +w.2.j.V*s.1.V+b.2.j), thus a function of the weights, biases, and prior sub-outputs. As the prior sub-outputs from hidden layer 2812.1 are function of the weights, biases, and independent variables, a given sub-output 2815.2.*j* is thus also a function of the weights, biases, and independent variables (e.g. if the V s. 1 values are plugged in respectively).

If additional hidden layers are present, their respective output can similarly be depicted as functions of their weights, biases, and the sub-outputs of the prior hidden layer, where given sub-output 2815 for any given hidden layer is thus also a function of the weights, biases, and independent variables. Z can denote a single hidden layer or any number of multiple hidden layers.

For an output layer 2813, each neuron 2810 applies respective weights to each of the V inputs outputted via the V neurons of the final hidden layer 2812.Z (e.g. generates a corresponding product of input with the respective weights), where the V weights for each neuron of the output layer 2813 are also tuned via feedforward neural network model training function 2013, for example, by performing nonlinear optimization process 2710. A summation of these products can be summed with the respective bias value, where the bias for each neuron of the output layer 2813 is also tuned via feedforward neural network model training function 2013, for example, by performing nonlinear optimization process 2710. An activation function G can be applied to this summation to render respective sub-output, where the same or different activation function G is predetermined based on being native to the feedforward neural network model training function 2013 and/or based on being selected/written via user input (e.g. as activation function argument 2237). For a given kth neuron in the output layer, its output 2816 (denoted s.Z+1.k) can be expressed as G(w.Z+1.k.1*s.Z.1+w.K+1.k.2*s.Z.2+ . . . +w.Z+1.k.V*s.Z.V+b.Z+1.k), thus a function of the weights, biases, and prior sub-outputs. As the prior sub-outputs from hidden layer 2812.Z are function of the weights, biases, and independent variables, a given sub-output 2815.2.*j* is thus also a function of the weights, biases, and independent variables (e.g. if the V s.Z values are plugged in respectively, with its respective s.Z−1 values being plugged in, and so on back to the first s. 1 values being plugged in to render an expression as a function of the weights, biases, and independent variables. This output s.Z+1.k can correspond a kth output yk, where the other S−1 outputs of y1-yS are computed similarly.

The plurality of weights for all connections across neurons of the fully connected neural network of FIGS. 28C and 28D can correspond to the T weights w1-wT. For example, the value of T corresponds to the number of connections, which can optionally be expressed as $T=C^*(V^Z)^*S$, and/or can correspond to a similar and/or different number of weights.

The plurality of biases for all hidden layer and output layer neurons of the fully connected neural network of FIGS. 28C and 28D can correspond to the U biases b1-bU. For example, the value of U corresponds to the number of neurons in hidden layers and in the output layer, which can optionally be expressed as U=V*Z+S, and/or can correspond to a similar and/or different number of biases.

FIG. 28E illustrates how the respective function definition 2719 can be deterministically determined prior to model training, for example, as illustrated by behavior of the neural network model type illustrated in the illustrative depiction of layers of neurons in FIGS. 28C and 28D. Note that function definition 2719 is expressed via untuned coefficients (e.g. untuned/unknown values for weights w1-wT and biases b1-bU), where their respective values are selected by applying the nonlinear optimization process 2710 to this function definition 2719 in a same or similar fashion as selecting values of coefficients c1-cN discussed in some or all of FIGS. 27A-27N.

While the function definition 2719 depicted in FIG. 28E depicts the values of outputs y1-yZ as functions of prior sub-outputs of the Zth hidden layer 2810 for brevity, as discussed previously, the respective equations can be expressed purely as a function of weights, biases, and independent variables if the values for sub-outputs of prior hidden layers are plugged in. Such a full equation that denotes the relationship between all weights w1-wT, all biases b1-bU, and all independent variables x1-xC can thus be utilized as function F to which nonlinear optimization process is applied to tune weights w1-wT and biases b1-bU.

The full function F to have its parameters tuned via nonlinear optimization process 2710 can be generated via an equation generator module 2820. As discussed previously, this full function can be a deterministic function of: a user-configured and/or predetermined number of hidden layers Z; a user-configured and/or predetermined number of neurons per layer V; a user-configured and/or predetermined activation function G; a user-defined and/or predetermined number of inputs C; and/or a user-defined and/or predetermined number of outputs S. In particular, this can dictate the layout and functionality of the neural network as discussed in conjunction with FIGS. 28C and 28D, which dictates how the output is generated as a function of weights, biases, and independent variables.

FIG. 28E illustrates how the respective function definition 2719, once tuned values 2623 are configured for all weights and biases via nonlinear optimization process 2710, can be applied via model execution operators 2848 to generate output for new input data.

Model execution operators 2648 can be implemented by performing a plurality of sub-equations 2840, for example, serially and/or in parallel, for example, via same or different operators 2520 and/or same or different nodes 37. The plurality of sub-equations, collectively, can be semantically equivalent to performing the full equation F. However, as the full equation F can be lengthy and can include the same terms multiple times, it can be preferable to generate temporary variables for some terms, which are expressed in other sub-equations. In some embodiments, one or more sub-equations 2840 correspond to equations for generation of a given sub-output 2815 as a function of other sub-output, or independent variables as discussed in conjunction with FIG. 28D, where final output 2816 is generated based on a temporary variable corresponding to sub-output of a final layer, generated via temporary variables denoting sub-output of prior layers. Alternatively, other sub-equations 2840 that are collectively semantically equivalent to performing the full equation F can be applied.

FIG. 28G illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28G. In particular, a node 37 can utilize their own query execution memory resources 3045 to execute some or all of the steps of FIG. 28G, where multiple nodes 37 implement their own query processing modules 2435 to independently execute the steps of FIG. 28G for example, to facilitate execution of a query as participants in a query execution plan 2405. Some or all of the steps of FIG. 28G can optionally be performed by any other processing module of the database system 10. Some or all of the steps of FIG. 28G can be performed to implement some or all of the functionality of the database system 10 as described in conjunction with FIGS. 28A-28F, for example, by implementing some or all of the functionality of generating trained model data 2620 for a feedforward neural network model and/or applying the feedforward neural network model to generate new output for other input data. Some or all of the steps of FIG. 28G can be performed to implement some or all of the functionality regarding execution of a query via the plurality of nodes in the query execution plan 2405 as described in conjunction with some or all of FIGS. 24A-26J. Some or all of the steps of FIG. 28G can be performed to implement some or all of the functionality regarding performing nonlinear optimization process 2710 as described in conjunction with some or all of FIGS. 27A-27N. Some or all steps of FIG. 28G can be performed by database system 10 in accordance with other embodiments of the database system 10 and/or nodes 37 discussed herein. Some or all steps of FIG. 28G can be performed in conjunction with one or more steps of FIG. 26L, FIG. 26M, FIG. 27O, and/or one or more steps of any other method described herein.

Step 2882 includes determining a first query that indicates a first request to generate a feedforward neural network model via a set of configured neural network training parameters. Step 2884 includes generating an equation, based on the set of configured neural network training parameters, denoting generation of a set of model output as a deterministic function of a set of input variables and a set of untuned parameters. Step 2886 includes executing the first query to generate feedforward neural network model data for the feedforward neural network model by selecting a set of values for the set of untuned parameters. In various examples, selecting a set of values for the set of untuned parameters in generating feedforward neural network model data by executing the first query includes performing a nonlinear optimization process via a plurality of parallelized optimization processes to minimize error of a loss function applied to the equation and a training set of rows.

Step 2888 includes storing the feedforward neural network model data, for example, in memory resources of the database system, where the feedforward neural network model data indicates the equation having the set of values for the set of untuned parameters. Step 2890 includes determining a second query that indicates a second request to apply the feedforward neural network model to a set of input data. Step 2892 includes generating a plurality of sub-equations semantically equivalent to the equation, for example, based on accessing the feedforward neural network model data in the memory resources. Step 2894 includes executing the second query to generate the set of model output for the set of input data by performing the plurality of sub-equations via execution of a corresponding plurality of serialized and/or parallelized operations upon the set of input data, for example, via generation of a corresponding plurality of temporary variables and/or via applying of the corresponding plurality of temporary variables.

In various examples, performance of each of the plurality of parallelized optimization processes includes: initializing a set of locations for a set of particles of a search space, where a dimension of the search space is based on a number of parameters in the set of untuned parameters, and/or where each location of the set of locations is denoted via a set of candidate values for the set of untuned parameters; and/or performing a first instance of a first algorithm phase. In various examples, performing the first instance of the first algorithm phase is based on iteratively performing a first type of optimization algorithm independently upon each of the set of particles a plurality of times to update the set of locations and to initialize a set of best positions for the set of particles; and/or updating the set of locations and the set of best positions generated via the first type of optimization algorithm based on performing a second type of optimization algorithm that is different from the first type of optimization algorithm. In various examples, a corresponding set of candidate parameter values for the set of untuned parameters is generated via the each of the plurality of parallelized optimization processes based on processing the set of best positions generated via the second type of optimization algorithm. In various examples, the set of values selected for the set of untuned parameters are determined based on selection of a most favorable set of candidate parameter values from a plurality of sets of candidate parameter values outputted via the plurality of parallelized optimization processes based on applying the loss function.

In various examples, performance of each of a set of iterations of the first type of optimization algorithm upon the each of the set of particles includes generating an updated location from a current location generated via a prior iteration of the first type of optimization algorithm upon the each of the set of particles based on: applying a first vector having a magnitude as an increasing function of a first predefined value and having a direction corresponding to a direction vector from the current location towards a current best location; and/or further applying a second vector having a magnitude as an increasing function of a second predefined value and having a direction corresponding to a direction vector with a randomly selected direction. In various examples, performance of each of a set of iterations of the first type of optimization algorithm upon the each of the set of particles further includes generating an updated best location from a current best location generated via a prior iteration of the first type of optimization algorithm upon the each of the set of particles based on: comparing a first value to a second value, where the first value is output of the loss function applied to the updated location as input, and/or where the second value is output of the loss function applied to the current best location as input; setting the updated best location as the updated location when the first value is more favorable the second value; and/or maintaining the current best location as the updated best location when the second value is more favorable the first value. In various examples, for a subsequent iteration of the set of iterations, the updated location is utilized as the current location and the updated best location is utilized as the current best location.

In various examples, performance of the second type of optimization algorithm includes, for the each of the set of particles, processing a current position and a current best position generated via a final iteration of the first type of optimization algorithm upon the each of the set of particles to generate an updated position and an updated best position based on, for each of the set of untuned parameters, one at a time: performing a golden selection search from a first current candidate value of the each of the set of untuned parameters for the current best position to identify a first other value where the loss function begins increasing; identifying a first given candidate value in a first region between the first current candidate value and the first other value inducing a first minimum for the loss function in the first region; updating the current best position by setting the each of the set of untuned parameters as the first given candidate value; performing the golden selection search from a second current candidate value of the each of the set of untuned parameters for the current position to identify a second other value where the loss function begins increasing; identifying a second given candidate value in a second region between the second current candidate value and the second other value inducing a second minimum for the loss function in the second region; updating the current position by setting the each of the set of untuned parameters as the second given candidate value; and/or when the second minimum is less than the first minimum, updating the current best position by setting the each of the each of the set of untuned parameters as the second given candidate value.

In various examples, executing the each of the plurality of parallelized optimization processes is further based on further updating the set of locations and the set of best positions in each of a plurality of additional instances in iteratively repeating the first algorithm phase from the set of locations and the set of best positions generated in a prior instance based on, in each additional instance of the plurality of additional instances, iteratively performing the first type of optimization algorithm independently upon the each of the set of particles the plurality of times and then performing the second type of optimization algorithm upon the set of locations and the set of best positions generated via the first type of optimization algorithm. In various examples, executing the each of the plurality of parallelized optimization processes is further based on further updating the set of best positions by performing a second algorithm phase upon the set of best positions generated via a final one of the plurality of additional instances based on generating at least one new candidate best position from the set of best positions.

In various examples, each best position of the set of best positions is defined via an ordered set of values, where each one of the ordered set of values corresponds to a different one of a set of dimensions of the search space, and/or where generating each new candidate best position of the at least one new candidate best position includes selecting a corresponding ordered set of values defining the each new candidate best position as having: a first proper subset of values of the corresponding ordered set of values selected from a first ordered set of values defining a first one of the set of best positions; and/or a second proper subset of values of the corresponding ordered set of values selected from a second ordered set of values defining a second one of the set of best positions that is different from the first one of the set of best positions.

In various examples, the feedforward neural network model data is generated to reflect a set of hidden layers, where each hidden layer of the set of hidden layers includes a set of neurons. In various examples, the set of configured neural network training parameters includes a configured number of hidden layers to include in the set of hidden layers and further includes a configured number of neurons per hidden layer to include in each set of neurons of the each hidden layer. In various examples, the equation is generated as a deterministic function of the configured number of hidden layers and the configured number of neurons per hidden layer.

In various examples, the equation is generated as the deterministic function of the set of the configured number of hidden layers and the configured number of neurons per hidden layer based on the set of untuned parameters including a set of untuned weight values based on the configured number of hidden layers and the configured number of neurons per hidden layer, and/or further including a set of untuned bias values based on the configured number of hidden layers and the configured number of neurons per hidden layer.

In various examples, the feedforward neural network model data is further generated to reflect an input layer and an output layer. In various examples, a serialized progression of a plurality of layers includes the input layer serially before the set of hidden layers, the output layer serially after the set of hidden layers, and a serialized ordering of hidden layers within the set of hidden layers. In various examples, a plurality of neurons of the feedforward neural network model data are dispersed across the plurality of layers.

In various examples, the feedforward neural network model data is further generated to reflect a set of connections between neurons of the plurality of layers, where each neuron in each given hidden layer has a first plurality of connections with all neurons in a prior layer serially before the each given hidden layer in the serialized progression of a plurality of layers, and/or where were each neuron in the each given hidden layer has a second plurality of connections with all neurons in a subsequent layer serially after the hidden layer in the serialized progression of the plurality of layers. In various examples, each of the set of untuned weight values reflects a weight of a corresponding one of the set of connections. In various examples, each of the set of untuned bias values reflects a bias of a corresponding one of the plurality of neurons.

In various examples, the set of configured neural network training parameters includes a selected activation function from a set of activation function options. In various examples, the equation is generated based on applying the selected activation function at least once to at least one linear combination of at least some of the set of untuned weight values, at least some of the set of untuned bias values, and/or at least some of the set of input variables.

In various examples, the first query is determined based on a query expression that includes a call to a feedforward neural network model training function, and/or the set of configured neural network training parameters is denoted via user-selection of each of a corresponding set of configurable parameter values for each of a corresponding set of configurable arguments of the feedforward neural network model training function in the call to the feedforward neural network model training function.

In various examples, the set of configured neural network training parameters indicates the loss function as a configurable parameter value for a loss function argument based on the call to the feedforward neural network model training function indicating a user-configured selection of one predetermined loss function from a set of predetermined loss function options for the feedforward neural network model training function via a corresponding loss function keyword. In various examples, the set of predetermined loss function options includes at least two of: a least squares function; a vector least squares function; a hinge function; or a negative log likelihood function.

In various examples, the set of configured neural network training parameters indicates the loss function as a configurable parameter value for a loss function argument based on the call to the feedforward neural network model training function indicating a user-defined equation defining the loss function.

In various examples, the set of model output includes multiple output values based on the set of configured neural network training parameters indicating a corresponding number of output values.

In various examples, each output value in the multiple output values of the set of model output corresponds to exactly one classification category of a set of multiple classification categories. In various examples, the set of model output generated via the second query denotes a predicted class for each of the set of input data corresponding to a highest probability one of the set of multiple classification categories. In various examples, the multiple output values of the set of model output corresponds to a set of probability values having a sum equal to one.

In various embodiments, any one of more of the various examples listed above are implemented in conjunction with performing some or all steps of FIG. 28G. In various embodiments, any set of the various examples listed above can be implemented in tandem, for example, in conjunction with performing some or all steps of FIG. 28G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28G, for example, in conjunction with further implementing any one or more of the various examples described above.

In various embodiments, the operational instructions, when executed by the at least one processor, cause the database system to: determine a first query that indicates a first request to generate a feedforward neural network model via a set of configured neural network training parameters; generate an equation, based on the set of configured neural network training parameters, denoting generation of a set of model output as a deterministic function of a set of input variables and a set of untuned parameters; execute the first query to generate feedforward neural network model data for the feedforward neural network model by selecting a set of values for the set of untuned parameters based on performing a nonlinear optimization process via a plurality of parallelized optimization processes to minimize error of a loss function applied to the equation and a training set of rows; store the feedforward neural network model data, where the feedforward neural network model data indicates the equation having the set of values for the set of untuned parameters; determine a second query that indicates a second request to apply the feedforward neural network model to a set of input data; generate a plurality of sub-equations semantically equivalent to the equation based on accessing the feedforward neural network model data; and/or execute the second query to generate the set of model output for the set of input data by performing the plurality of sub-equations via execution of a corresponding plurality of serialized operations upon the set of input data.

FIGS. 29A-29G illustrate embodiments of a database system 10 that generates trained model data 2620 for a K means model type 2613.6 via performance of a K means training process 2910 during query execution. The database system 10 can further apply this trained model data 2620 of the K means model type 2613.6 type in other query executions to generate output for other input data. Some or all features and/or functionality of the generation and/or execution of query operator execution flow 2517 to implement generation of trained model data 2620 for a K means type 2613.6 of FIGS. 29A-29G can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a K means model type 2613.6 of FIGS. 29A-29G can implement the execution of query requests 2602 to apply trained model data 2620 of FIG. 26B, 27C and/or any other embodiment of database system 10 described herein.

Training of a K means model can include utilizing of a new type of query plan, and/or corresponding new virtual machine (VM) operator type (e.g. a "kMeansOperator") to implement a corresponding K means training process 2910. Similar to the nonlinear optimization process 2710 via a plurality of parallelized processes of FIG. 27D and described herein, the K means training process 2910 can be implemented via performance of a random shuffle and/or random multiplexer generate subsets of the data for each parallelized process (e.g. each processing core resource 48 of each participating node 37), potentially with overlap, for example, based on the overwrite factor, number of nodes, cardinality of the training set 2633, etc. as discussed previously.

Each parallelized process can execute its own instance of one or more k means operators (e.g. the kMeansOperator) implementing k means training upon its own training subset, for instance, to essentially run the k means algorithm. In some embodiments, the initialization strategy utilized to initialize centroid locations is a custom initialization strategy that does not follow any standard initialization strategy. The initialization strategy can include employing a deterministic algorithm to initialize the centroid locations, rather than computing a plurality of random weighted distributions. This deterministic approach can be preferred over randomized initializing processes by being faster and/or more efficient than the processing of such plurality of random weighted distributions. In some cases, this deterministic initialization strategy can be similar to the initialization utilized in kmeans++, where the deterministic algorithm is implemented to output what kmeans++ is most likely to do (e.g. can output a set of centroids equivalent or similar to an expected mean set of centroids of a plurality of sets of centroids that would have been outputted via a plurality of initializations via the randomized process of kmeans++, when the plurality of initializations is sufficiently large).

This can render similar advantages as kmeans++ initialization, without requiring the processing needed to perform the randomization via computing of random weighted distributions.

Similar to the case discussed with nonlinear optimization via a plurality of parallelized processes as illustrated in FIG. 27D, each parallelized process (e.g. each vmcore across the one or more participating nodes) generates a result of their k means training upon their training subset, (e.g. consisting of k centroids). For example, approximately 1k outputs (e.g. 1k different sets of k computed centroids) are generated via approximately 1k (e.g. 1024) corresponding parallelized processes.

Processing of the plurality of sets of computed centroids can include performing another round of k means training (e.g. that runs on a single thread, for example, on a root node of a corresponding query execution plan), utilizing the centroids across all sets of centroids outputted via the parallelized processes as the input training data for this final round of k means. The final model can thus be considered essentially the centroids of the centroids that were computed over all the subsets.

When the model is called after training, for example, in a model function call 2640, a plan fragment can be generated that computes the distance to each centroid, puts them all in an array, and then finds the index of the minimum element of the array, which corresponds to correct label for the result.

FIG. 29A presents an embodiment of a database system 10 that generates trained model data 2620 having tuned parameters 2622 that include a plurality of centroids 2915.1-2915.K. For example, the trained model data 2620 is generated based on executing a corresponding query for a query request 2601 denoting a model training request 2610 denoting the model type 2613.6 corresponding to the K means model type. This can include performing a model training function 2621.6 corresponding to a k means training function 2006. The k means training function 2006 can have some or all configurable arguments discussed in conjunction with FIG. 26I, and/or the model training request 2610 denoting the model type 2613.6 can denote user-specified values for these configurable arguments, for example, optionally in accordance with syntax discussed in conjunction with FIG. 26I.

Performing the k means model training function 2006 to generate tuned model parameters 2622 for trained model data 2620 can include performing a k means process 2910, which can optionally implement some or all same and/or similar same and/or similar functionality of nonlinear optimization process 2710, for example described in conjunction with some or all features and/or functionality of the nonlinear optimization process 2710 described in conjunction with FIGS. 27A-27N, where centroids 2915.1-2915.K of FIG. 29A are implemented as the set of N coefficients c1-cN. Some or all portions of the k means process 2910 can be implemented differently from the nonlinear optimization process 2710.

FIG. 29B illustrates an embodiment of a database system 10 that generates trained model data indicating tuned model parameters 2622 that include centroids 2915.1-2915.K, based on the k means training process 2910 selecting these parameters. The number of centroids K can be predetermined and/or configured via user input. Each centroid 2915 can be defined via a plurality of coordinates in C-dimensional space, where C corresponds to the number of input features of the training set 2633. The K means training process 2910 can be implemented via an unsupervised learning process, where no output label is specified in the training set 2633.

FIG. 29C illustrates an embodiment of performing K means training process 2910 via a plurality of parallelized processes 2750.1-2750.L Some or all features and/or functionality of the K means training process 2910 of FIG. 29C can implement the K means training process 2910 of FIG. 29A and/or any other embodiment of the K means training process 2910 described herein.

Training set 2633 can be processed via row dispersal operators 2766, for example, in a same or similar fashion as the processing of training set 2633 via row dispersal operators 2766 discussed in conjunction with FIG. 27D. This can render generation of L training subsets 2734.1-2734.L for processing via a respective set of parallelized processes 2750.1-2750.L, for example, in a same or similar fashion as discussed in conjunction with FIG. 27D.

Each parallelized process 2750 of the parallelized processes 2750.1-2750.L can perform one or more K means training operators 2911, for example, in a serialized and/or parallelized configuration to implement k means training upon the respective training subset to generate a corresponding centroid set 2920 that includes K centroids. For example, the same configuration of K means training operators 2911 are applied by every parallelized process 2750, where different centroid sets 2920 are outputted by different K means training operators 2911 based on being applied to different training subsets 2734.

The plurality of outputted centroid sets 2920.1-2920.L can be considered a further training subset 2734.L+1 that is processed as input via one or more final K means training operators 2911. The one or more final K means training operators 2911 can be implemented via a same configuration as the one or more K means training operators 2911 executed by each parallelized processes 2750. However, the final K means training operators 2911 can be applied to centroids 2915 included across all centroid sets 2920.1-2920.L rather than the original rows 2916 from the training set 2633. This final performance K means training operators 2911 can render a final centroid set 2920.L+1, whose centroids are implemented as the tuned model parameters 2622 of the trained model data 2620.

FIGS. 29D and 29E illustrate example embodiments of performance of this K means training process 2910 of FIG. 29C. FIG. 29D depicts an illustrative example of different training subsets 2734 of rows 2916 of the full training set 2633, depicted in a two dimensional view corresponding to a C-dimensional space 2935. The rows 2916 of each given training subset 2734 can be processed via K means training operator(s) 2911 to render a corresponding centroid set 2920. Note that the corresponding three centroids illustrated in this example are presented for illustrative purposes, and may not be exactly positioned in a location that would be outputted via the K means algorithm implemented via the K means training operators 2911. However, this illustration shows how centroids are determined in central locations of respective clusters of data as part of performing corresponding unsupervised clustering. In the example of FIG. 29D, centroid set 2920.1 is depicted via triangles in the C-dimensional space 2935, and centroid set 2920.L is depicted via squares in the C-dimensional space 2935.

As illustrated in FIG. 29E, these outputted centroid sets 2920.1-2920.L of FIG. 29D can be combined to render training subset 2734.L+1, where the triangles correspond to the centroids of centroid set 2920.1 of FIG. 29D, where the squares correspond to the centroids of centroid set 2920.L of FIG. 29D, and where the Xs correspond to other centroids from other centroid sets 2920 in centroid sets 2920.2-2920.L−1 not depicted in FIG. 29D. K means training operators can be performed upon this training subset 2734.L+1 of centroids to form further centroids from these centroids as the final centroid set 2920.L+1, depicted as the black circles of FIG. 29E in the C-dimensional space. Note that corresponding centroids illustrated in this example are again presented for illustrative purposes, and may not be exactly positioned in a location that would be outputted via the K means algorithm implemented via the K means training operators 2911.

FIG. 29F illustrates an example of generating output 2648 for a K means model via model execution operators 2646 utilizing centroids 2915.1-2915.K, which can map to a set of labels 2935.1-2935.K denoting the K different clusters identified during the respective k means training process 2910. The model output 2648 can denote a label 2935 assigned to each row based on which respective centroid 2915.1-2915.K they are closest to, for example, in accordance with a Euclidean distance or other distance function applied to its values of columns x1-xC measuring distance from each of the K centroids. Some or all features and/or functionality of model execution operators 2646 FIG. 29F can implement the model execution operators 2646 of FIG. 26B and/or any other applying of a model to input data to generate model output described herein.

FIG. 29G illustrates an example implementation of the model execution operators 2646 of FIG. 29F. For a given row 2916.*i* of the input data 2645, model execution operators 2646 can implement array generation 2951 to generate an array of distance values by applying a distance function d, such as the Euclidean distance function, where the array 2940 has K entries, where each given index 2945 stores the computed distance between the row 2916.*i* and a corresponding centroid mapped to the value of the index. Minimum element identification 2952 can be performed to identify which of the K elements of the array 2940 has the lowest value, denoting the smallest difference, where the respective index 2945.*j* that includes this smallest distance denotes the respective label 2935.*j* that is outputted (e.g. the label mapped to the centroid from which the rows distance was measured to generate the distance at this index).

FIG. 29H illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29H. In particular, a node 37 can utilize their own query execution memory resources 3045 to execute some or all of the steps of FIG. 29H, where multiple nodes 37 implement their own query processing modules 2435 to independently execute the steps of FIG. 29H for example, to facilitate execution of a query as participants in a query execution plan 2405. Some or all of the steps of FIG. 29H can optionally be performed by any other processing module of the database system 10. Some or all of the steps of FIG. 29H can be performed to implement some or all of the functionality of the database system 10 as described in conjunction with FIGS. 29A-29G, for example, by implementing some or all of the functionality of generating trained model data 2620 for a K means model and/or applying the K means network model to generate new output for other input data. Some or all of the steps of FIG. 29H can be performed to implement some or all of the functionality regarding execution of a query via the plurality of nodes in the query execution plan 2405 as described in conjunction with some or all of FIGS. 24A-26J. Some or all of the steps of FIG. 29H can be performed to implement some or all of the functionality regarding performing nonlinear optimization process 2710 as described in conjunction with some or all of FIGS. 27A-27N. Some or all steps of FIG. 29H can be performed by database system 10 in accordance with other embodiments of the database system 10 and/or nodes 37 discussed herein. Some or all steps of FIG. 29H can be performed in conjunction with one or more steps of FIG. 26L, FIG. 26M, and/or one or more steps of any other method described herein.

Step 2982 includes determining a first query that indicates a first request to generate a K means model. Step 2984 includes executing the first query to generate K means model data for the K means model. Step 2986 includes determining a second query that indicates a second request to apply the K means model to input data. Step 2988 includes executing the second query to generate model output of the K means model for the input data based on, for each row in the input data, determining a plurality of distances to the final set of centroids and identifying a classification label for an identified one of the final set of centroids having a smallest one of the plurality of distances as the model output.

Performing step 2984 can include performing step 2990, 2992, 2994, and/or 2996. Step 2990 includes generating a training set of rows. Step 2992 includes generating a plurality of training subsets from the training set of rows. Step 2994 includes processing the plurality of training subsets via a corresponding plurality of parallelized processes to generate a plurality of sets of centroids corresponding to a plurality of different K means models based on performing a K means training operation via each of the corresponding plurality of parallelized processes upon a corresponding one of the plurality of training subsets. Step 2996 includes generating a final set of centroids corresponding to a final K means model for storage as the K means model data based on performing the K means training operation upon the plurality of sets of centroids.

In various examples, the method further includes determining a maximum number of nodes parameter and/or determining an overwrite factor parameter. Generating the training set of rows can include reading a plurality of rows from memory of a relational database stored in memory resources, where the training set of rows is generated from the plurality of rows. Generating the plurality of training subsets from the training set of rows can be based on performing a random shuffling process by applying the maximum number of nodes parameter and the overwrite factor parameter, where each of the plurality of training subsets is utilized by a corresponding one of the corresponding plurality of parallelized processes.

In various examples, at least two of the plurality of training subsets have a non-null intersection based on the overwrite factor parameter having a value greater than one.

In various examples, the method further includes determining cardinality estimate data for the training set of rows, where the a maximum number of nodes parameter and the overwrite factor parameter are automatically computed as a function of the cardinality estimate data.

In various examples, each centroid of the plurality of sets of centroids is defined as an ordered set of centroid values corresponding to an ordered set of columns of the training set of rows.

In various examples, the first query is determined based on a first query expression that includes a call to a K means model training function indicating a configured k value, where each set of centroids of the plurality of sets of centroids is configured to include a number of centroids equal to the configured k value.

In various examples, performing the K means training operation upon a corresponding one of the plurality of training subsets includes: executing an initialization step to initialize locations for a corresponding set of centroids of the plurality of sets of centroids; and/or executing a plurality of iterative steps to move the locations for the corresponding set of centroids, where the corresponding set of centroids generated via the performance of the K means training operation upon the corresponding one of the plurality of training subsets corresponds to a final location of the corresponding set of centroids after a final one of the plurality of iterative steps.

In various examples, the initialization step is executed via performance of a deterministic initialization algorithm upon the corresponding one of the plurality of training subsets. In various examples, performing the K means training operation upon the plurality of sets of centroids includes: executing the initialization step to initialize locations for the final set of centroids via performance of the deterministic initialization algorithm upon the plurality of sets of centroids; and/or executing the plurality of iterative steps to move the locations for the final set of centroids, where the final set of centroids generated via the performance of the K means training operation upon the plurality of sets of centroids corresponds to a final location of the final set of centroids after a final one of the plurality of iterative steps.

In various examples, the first query is determined based on a first query expression that includes a call to a K means model training function indicating a configured epsilon value. In various examples, the K means training operation is automatically determined to be complete in response to determining a movement distance of every one of the corresponding set of centroids in performance of a most recent iterative step of the plurality of iterative steps is less than the configured epsilon value.

In various examples, determining the plurality of distances to the final set of centroids is based on computing, for the each row, a Euclidean distance to each of the final set of centroids based on the each row having a number of column values equal to a number of values defining the each of the final set of centroids.

In various examples, executing the second query includes, for the each row: populating an array with the plurality of distances to the final set of centroids; identifying an index of the array storing a minimum distance of the plurality of distances in the array; and/or determining the classification label mapped to a value of the index.

In various examples, the first query is determined based on a first query expression that includes a call to a K means model training function selecting a name for the K means model, and/or where the second query is determined based on a second query expression that includes a call to the K means model by indicating the name for the K means model.

In various embodiments, any one of more of the various examples listed above are implemented in conjunction with performing some or all steps of FIG. 29H. In various embodiments, any set of the various examples listed above can be implemented in tandem, for example, in conjunction with performing some or all steps of FIG. 29H.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29H, for example, in conjunction with further implementing any one or more of the various examples described above.

In various embodiments, the operational instructions, when executed by the at least one processor, cause the database system to: determine a first query that indicates a first request to generate a K means model and/or executing the first query to generate K means model data for the K means model. Executing the first query to generate K means model data for the K means model can be based on: generating a training set of rows; generating a plurality of training subsets from the training set of rows; processing the plurality of training subsets via a corresponding plurality of parallelized processes to generate a plurality of sets of centroids corresponding to a plurality of different K means models based on performing a K means training operation via each of the corresponding plurality of parallelized processes upon a corresponding one of the plurality of training subsets; and/or generating a final set of centroids corresponding to a final K means model for storage as the K means model data based on performing the K means training operation upon the plurality of sets of centroids. The operational instructions, when executed by the at least one processor, cause the database system to determine a second query that indicates a second request to apply the K means model to input data; and/or execute the second query to generate model output of the K means model for the input data. Executing the second query to generate model output of the K means model for the input data can be based on, for each row in the input data, determining a plurality of distances to the final set of centroids and/or identifying a classification label for an identified one of the final set of centroids having a smallest one of the plurality of distances as the model output.

FIGS. 30A-30C illustrate embodiments of a database system 10 that generates trained model data 2620 for a principal component analysis (PCA) model type 2613.9 via performance of a PCA training process 3010 during query execution. The database system 10 can further apply this trained model data 2620 of the PCA model type 2613.9 type in other query executions to generate output for other input data. Some or all features and/or functionality of the generation and/or execution of query operator execution flow 2517 to implement generation of trained model data 2620 for a PCA model type 2613.9 of FIGS. 30A-30C can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a PCA model type 2613.9 of FIGS. 30A—30C can implement the execution of query requests 2602 to apply trained model data 2620 of FIG. 26B, 27C and/or any other embodiment of database system 10 described herein.

Some or all features and/or functionality of PCA training process 3010 can be based on database system 10 implementing matrices as a first class SQL data type, for example, via a custom implementation and/or based on implementing non-relational functionality such as linear algebra functionality as described previously. For example, some or all features and/or functionality of PCA training process 3010 can implement some or all features and/or functionality of FIG. 25F, and/or can otherwise include generating and/or processing one or more matrix structures 2978 each having a plurality of element values 2572 in accordance with mathematically representing a corresponding matrix, where one or more covariance matrixes of the PCA training process are generated as matrix structures 2978 based on executing at least one corresponding non-relational linear algebra operator 2524.

Performing PCA training process 3010 can include first passing all inputs through a normalization routine, which can be implemented in a same or similar fashion as the z-score algorithm. For example, the normalization routine is implemented as a window function applied to the training set 2633, such as a custom window function different from traditional SQL functions optionally implemented via one or more one or more non-relational operators. Next, PCA training process 3010 can include building a covariance matrix, for example, where a matrix entry (x,y) of the covariance matrix is the covariance of x and y. This can be implemented via a covariance aggregate function, such as a custom covariance aggregate different from traditional SQL functions optionally implemented via one or more non-relational operator. Finally, PCA training process 3010 can include computing the eigenvalues and/or eigenvectors of this covariance matrix, for example, via a corresponding function. The eigenvalues and/or eigenvectors can be saved in the resulting model data. For example, if the model is called in a subsequent query, if the query request denotes a request for the $2^{nd}$ PCA term over the respective input, this can be computed as model output via the saved eigenvalues and/or eigenvectors via a linear sum over coefficients.

FIG. 30A presents an embodiment of a database system 10 that generates trained model data 2620 having tuned parameters 2622 in accordance with a PCA model. For example, the trained model data 2620 is generated based on executing a corresponding query for a query request 2601 denoting a model training request 2610 denoting the model type 2613.9 corresponding to the PCA model type. This can include performing a model training function 2621.9 corresponding to a PCA training function 2009. The PCA training function 2009 can be implemented via some or all functionality discussed in conjunction with FIG. 26I. The model training request 2610 denoting the model type 2613.9 can optionally denote user-specified values for one or more configurable arguments.

The trained model data 2620 can be generated via performing a PCA training process 3010. Some or all of the PCA training process 3010 can be implemented via some or all functionality of the nonlinear optimization 2710 of FIGS. 27A-27O, and/or can be implemented via a different process.

FIG. 30B illustrates an example embodiment of a PCA training process 3010 implemented by performing the PCA model training function 2009 to generate tuned model parameters 2622 for trained model data 2620 via model training operators 2634. The PCA training process can be implemented via one or more normalization operations 3011 implemented to generate a normalized data set 3012 from training set 2633. The one or more normalization operations 3011 can be implemented via performance of a z-score algorithm. The one or more normalization operations 3011 can alternatively or additionally be implemented via performance of window function.

The PCA training process can alternatively or additionally be implemented via one or more covariance matrix generation operations 3013 implemented to generate a covariance matrix 3014. The one or more covariance matrix generation operations 3013 can be implemented via performance of a covariance generation function in accordance with linear algebra principles, for example, by executing corresponding non-relational operators that implement generation of a covariance matrix 3014. The covariance matrix 3014 can be implemented as a first class data type, such as a first class data type in accordance with SQL, and/or such as an object that exists independently of other matrices and/or other objects, and/or has an identity independent of any other matrix and/or object.

The PCA training process can alternatively or additionally be implemented via one or more eigenvector generator operations 3015 implemented to generate eigenvector and/or eigenvalue data 3016 that includes a set of eigenvectors and/or corresponding set of eigenvalues from the covariance matrix 3014. The one or more eigenvector generator operations 3015 can be implemented via performance of an eigenvector generator function in accordance with linear algebra principles, for example, by executing corresponding non-relational operators that implement generation of eigenvectors and/or eigenvalues from a first class matrix object. The eigenvector and/or eigenvalue data 3016 that includes this set of eigenvectors and/or corresponding set of eigenvalues generated from the covariance matrix 3014 can be stored as tuned model parameters 2622 of the trained model data 2620.

FIG. 30C illustrates an example of a model training request 2610 for another model type 2613.Y that is different from the PCA model type, where the model training request 2610 includes a model function call to a trained PCA model for use in generating the corresponding training set 2633. This can be useful in cases where dimensionality reduction is performed prior to training of another machine learning model, such as any other type of model described herein. The respective query request 2601 of FIG. 30C can implement any query request 2601 having a model training request 2610 described herein, and/or can implement any query request 2602 having a model function call 2640 described herein.

The training set determination operators 2632 can be implemented via execution of model execution operators 2646 that apply the eigenvector and/or eigenvalue data 3016 of the tuned model parameters 2622 of the trained model data 2620. Y denoted by the model function call 2640 via the corresponding model name 2621.Y. The output of model execution operators 2646 optionally includes a dimensionality reduced version of input data 2645 generated via input data determination operators 2644 via performance of corresponding row reads. The output of model execution operators 2646 can be further processed and/or can be implemented as training set 2633 that is processed via mode training operators 2634 to generate the trained model data 2620 of the non-PCA type model. Some or all of the operator execution flow 2517 of FIG. 30C can implement the dimensionality reduction example of model function call for the PCA type discussed in conjunction with FIG. 26I.

FIG. 30D illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30D. In particular, a node 37 can utilize their own query execution memory resources 3045 to execute some or all of the steps of FIG. 30D, where multiple nodes 37 implement their own query processing modules 2435 to independently execute the steps of FIG. 30D for example, to facilitate execution of a query as participants in a query execution plan 2405. Some or all of the steps of FIG. 30D can optionally be performed by any other processing module of the database system 10. Some or all of the steps of FIG. 30D can be performed to implement some or all of the functionality of the database system 10 as described in conjunction with FIGS. 30A-30C, for example, by implementing some or all of the functionality of generating trained model data 2620 for a PCA model and/or applying the PCA model to generate new output for other input data. Some or all of the steps of FIG. 30D can be performed to implement some or all of the functionality regarding execution of a query via the plurality of nodes in the query execution plan 2405 as described in conjunction with some or all of FIGS. 24A-26J. Some or all of the steps of FIG. 30D can be performed to implement some or all of the functionality regarding executing non-relational operators 2524 in query execution plans as described in conjunction with some or all of FIGS. 25A-25E. Some or all steps of FIG. 30A can be performed by database system 10 in accordance with other embodiments of the database system 10 and/or nodes 37 discussed herein. Some or all steps of FIG. 30A can be performed in conjunction with one or more steps of FIG. 26L, FIG. 26M, and/or one or more steps of any other method described herein.

Step 3082 includes determining a first query that indicates a first request to generate a principal component analysis (PCA) model/Step 3084 includes generating a query operator execution flow for the first query that includes a first subset of operators that include at least one relational operator and a second subset of operators that include at least one non-relational linear algebra operator. Step 3086 includes executing the query operator execution flow for the first query to generate PCA model data for the PCA model. Step 3088 includes determining a second query that indicates a second request to apply the PCA model. Step 3090 includes executing the second query to generate output of the PCA model based on processing at least one of the set of eigenvalues and at least one of the corresponding set of eigenvectors via accessing the PCA model data.

Performing step 3086 can include performing step 3092 and/or step 3094. Step 3092 includes executing the first subset of operators to generate a training set of rows based on accessing a plurality of rows of a relational database table of a relational database. Step 3094 includes executing the second subset of operators to generate a covariance matrix, and to further generate a set of eigenvalues and a corresponding set of eigenvectors from the covariance matrix for storage as the PCA model data;

In various examples, the covariance matrix is implemented via generation of an object having a matrix data type, and/or where the matrix data type is implemented as a first class data type.

In various examples, the covariance matrix is generated via at least one first non-relational linear algebra operator. In various examples, a set of eigenvalues and a corresponding set of eigenvectors are generated via at least one second non-relational linear algebra operator that is different from the at least one first non-relational linear algebra operator.

In various examples, executing the second subset of operators includes generating normalized data based on performing a normalization routine by executing a window function upon the training set of rows, where the covariance matrix is generated from the normalized data.

In various examples, the first query is determined based on a first query expression that includes a call to a PCA model training function selecting a name for the PCA model. In various examples, the second query is determined based on a second query expression that includes a call to the PCA model by indicating the name for the PCA model.

In various examples, the PCA model training function corresponds to a PCA model type, where the second query further indicates a call to another model training function corresponding to another model type different from the PCA model type. In various examples, the call to another model training function includes a training set selection clause indicating the output of the PCA model be utilized as a second training set for training another model corresponding to the another model type.

In various examples, the method further includes determining a third query that indicates a second request to apply the another model; and/or executing the third query to generate output of the another model on other input data based on accessing the another model.

In various embodiments, any one of more of the various examples listed above are implemented in conjunction with performing some or all steps of FIG. 30D. In various embodiments, any set of the various examples listed above can be implemented in tandem, for example, in conjunction with performing some or all steps of FIG. 30D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30D, for example, in conjunction with further implementing any one or more of the various examples described above.

In various embodiments, the operational instructions, when executed by the at least one processor, cause the database system to: determine a first query that indicates a first request to generate a principal component analysis (PCA) model; generate a query operator execution flow for the first query that includes a first subset of operators that include at least one relational operator and a second subset of operators that include at least one non-relational linear algebra operator; execute the query operator execution flow for the first query to generate PCA model data for the PCA model based on executing the first subset of operators to generate a training set of rows based on accessing a plurality of rows of a relational database table of a relational database and/or executing the second subset of operators to generate a covariance matrix and to further generate a set of eigenvalues and a corresponding set of eigenvectors from the covariance matrix for storage as the PCA model data; determine a second query that indicates a second request to apply the PCA model; and/or execute the second query to generate output of the PCA model based on processing at least one of the set of eigenvalues and at least one of the corresponding set of eigenvectors via accessing the PCA model data.

FIGS. 31A-31C illustrate embodiments of a database system 10 that generates trained model data 2620 for a vector autoregression model type 2613.3 via performance of a vector autoregression training process 3110 during query execution. The database system 10 can further apply this trained model data 2620 of the vector autoregression model type 2613.3 type in other query executions to generate output for other input data. Some or all features and/or functionality of the generation and/or execution of query operator execution flow 2517 to implement generation of trained model data 2620 for a vector autoregression model type 2613.3 of FIGS. 31A-31C can implement the execution of query requests 2601 to generate trained model data 2620 of FIG. 26A, 27A and/or any other embodiment of database system 10 described herein. Generation and/or execution of query operator execution flow 2517 to implement utilizing of trained model data 2620 for a vector autoregression model type 2613.3 can implement the execution of query requests 2602 to apply trained model data 2620 of FIG. 26B, 27C and/or any other embodiment of database system 10 described herein.

FIG. 31A presents an embodiment of a database system 10 that generates trained model data 2620 having tuned parameters 2622 in accordance with a vector autoregression model. For example, the trained model data 2620 is generated based on executing a corresponding query for a query request 2601 denoting a model training request 2610 denoting the model type 2613.3 corresponding to the vector autoregression model type. This can include performing a model training function 2621.3 corresponding to a vector autoregression training function 2003. The vector autoregression training function 2003 can have some or all configurable arguments discussed in conjunction with FIG. 26I, and/or the model training request 2610 denoting the model type 2613.3 can denote user-specified values for these configurable arguments, for example, optionally in accordance with syntax discussed in conjunction with FIG. 26I.

The trained model data 2620 can be generated via performing a vector autoregression training process 3110. Some or all of the vector autoregression training process 3110 can be implemented via some or all functionality of the nonlinear optimization 2710 of FIGS. 27A—27O, and/or can be implemented via a different process.

FIG. 31B illustrates an example of performing the vector autoregression training process 3110 upon a training set 2633 to generate a plurality of coefficient sets 3122.1-3122.C as the tuned parameter data 2622.

The vector autoregression training process 3110 can be implemented based on a set of independent variables that includes V independent variables, and/or a number of lags that denotes a number of lags, which can include C−1 lags where C is the number of columns in the input set. Each of the C columns can include, for each row, a vector storing V values corresponding to the V independent variables, at a corresponding lag for the given column (e.g. the first column corresponds to unlagged values, the second column corresponds to applying a first lag, and the final column corresponds to applying a C−1th lag based on the number of lags being configured as C−1 and/or based on the input including C columns.

Some or all features and/or functionality of vector autoregression training process 3110 can be based on generating a set of C multiple linear regression models that all share the same independent variables. The output of the model can be implemented as a vector, which can be considered the dependent variable from these C multiple linear regression models. In some cases, these C multiple linear regression models can be generated separately by generating C separate multiple linear regression models independently via corresponding separate portions of input (e.g. different ones of the C columns). However, query execution efficiency can be improved by implementing linear algebra capabilities to process vector and/or matrix data types via linear algebra operators as discussed previously, enabling collective generation of the C N models all in one plan.

When the model is called after training, the model execution operators can be implemented to read all the coefficients and/or computes these C dependent variables. Executing the corresponding query calling the model can optionally further include packaging these C output values into a vector, for example, implemented as a vector of C value as model output.

In some embodiments, the vector autoregression model can be implemented to characterize the relationship between different variables (e.g. V independent variables) as they change over time, where each variable can have its own equation characterizing change over time. The training set 2633 can include lag values, denoting past and/or historical values that are optionally generated via a window function, such as a lag function applied to an original data set of rows.

The coefficient sets 3122.1-3122.C can each include a plurality of coefficient values. In some embodiments, some or all of the coefficient sets 3122 corresponds to a matrix of values, which can be optionally stored as and/or applied as a matrix type, such as first class matrix type in SQL when generating the tuned model parameters 2622 and/or when applying the tuned model parameters 2622 in executing subsequent queries that call/apply the model. As a particular example, a given coefficient set 3122 corresponds to a V×V matrix of values, for example, to be multiplied with and/or applied to the vector of a corresponding vector of V values included in a corresponding one of C input columns of input data 2645 when the model is applied. For example, C−1 coefficient sets 3122 are implemented as such matrixes, where a final coefficient set 3122 corresponds to a vector of additional constants and/or error terms to be added. The C−1 coefficient sets 3122 implemented as matrixes can thus denote coefficients to be multiplied with respective independent variables at a given lag in accordance with the rules of matrix multiplication. In various embodiments, such matrix multiplication is implemented via non-relational linear algebra operators.

FIG. 31C illustrates an example embodiment of generating graining set 2633 via training set determination operators 2632 that implement lag-based window functions 3120, such as a SQL lag function and/or other window functions applied to an input set 3133. For example, the lag functions are applied to generate the training data 2633 that includes C (one more than the configured number of lag) columns of vectors that each include V values from an original input set 3133 of V columns each storing a value 3118, corresponding to unlagged values, where the lags are generated from these values. For example, the set of rows in input set 3133 optionally corresponds to time-series data ordered by time or other ordered data appropriate for applying lags in accordance with time delay or other evolution of data as rows progress. The input set 3133 can be read from a relational table directly and/or can be generated from existing rows via performance of other training set determination operators 2632.

Some or all functionality of FIG. 31C can be performed via the example expressions of function call to the vector autoregression training function 2003 discussed in conjunction with FIG. 26I. In some embodiments, some or all of the function call of FIG. 26I, such as calling of LAG and/or ORDER BY functions are optionally applied automatically in the query execution plan based on the specified values of V and/or C with the given input set, where the lag-based window functions 3120 are automatically determined and applied in executing vector autoregression model training function 2003, rather than requiring that these functions and/or other windowing functions be explicitly written in a respective query expression calling the vector autoregression model training function 2003.

FIG. 31D illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31D. In particular, a node 37 can utilize their own query execution memory resources 3045 to execute some or all of the steps of FIG. 31D, where multiple nodes 37 implement their own query processing modules 2435 to independently execute the steps of FIG. 31D for example, to facilitate execution of a query as participants in a query execution plan 2405. Some or all of the steps of FIG. 31D can optionally be performed by any other processing module of the database system 10. Some or all of the steps of FIG. 31D can be performed to implement some or all of the functionality of the database system 10 as described in conjunction with FIGS. 31A-31C, for example, by implementing some or all of the functionality of generating trained model data 2620 for a vector autoregression model and/or applying the vector autoregression model to generate new output for other input data. Some or all of the steps of FIG. 31D can be performed to implement some or all of the functionality regarding execution of a query via the plurality of nodes in the query execution plan 2405 as described in conjunction with some or all of FIGS. 24A-26J. Some or all of the steps of FIG. 31D can be performed to implement some or all of the functionality regarding executing non-relational operators 2524 in query execution plans as described in conjunction with some or all of FIGS. 25A-25E. Some or all steps of FIG. 31D can be performed by database system 10 in accordance with other embodiments of the database system 10 and/or nodes 37 discussed herein. Some or all steps of FIG. 31D can be performed in conjunction with one or more steps of FIG. 26L, FIG. 26M, and/or one or more steps of any other method described herein.

Step 3182 includes determining a first query that indicates a first request to generate a vector autoregression model. Step 3184 includes generating a query operator execution flow for the first query that includes a first subset of operators that include at least one relational operator and a second subset of operators that include at least one non-relational linear algebra operator. Step 3186 includes executing the query operator execution flow for the first query to generate vector autoregression model data for the vector autoregression model that includes a plurality of sets of coefficient values. Step 3188 includes determining a second query that indicates a second request to apply the vector autoregression model. Step 3190 includes executing the second query to generate vector output of the vector autoregression model based on processing the plurality of sets of coefficient values.

Performing step 3186 can include performing step 3192 and/or step 3194. Step 3192 includes executing the first subset of operators to generate a training set of rows based on accessing a plurality of rows of a relational database table of a relational database. Step 3194 can include executing the second subset of operators to collectively generate a plurality of sets of coefficient values for storage as the vector autoregression model data.

In various examples, the plurality of sets of coefficient values are collectively generated via a same set of serialized operations of the second subset of operators that implement the at least one non-relational linear algebra function.

In various examples, generating the vector output of the vector autoregression model is based on reading all coefficients values of the plurality of sets of coefficient values and/or computing a plurality of values corresponding to a plurality of dependent variables based on applying all coefficients values. In various examples, the vector output includes the plurality of values.

In various examples, each set of coefficient values of the plurality of sets of coefficient values corresponds to one of a plurality of sub-models of the vector autoregression model.

In various examples, executing the second query includes executing another subset of operators that includes at least one relational operator to generate an input set of rows based on accessing another plurality of rows of the relational database.

In various examples, wherein the first request to generate the vector autoregression model indicates a set of user-configured parameters. In various examples, the query operator execution flow for the first query is generated based on the set of user-configured parameters.

In various examples, the set of user-configured parameters indicates: a number of variables parameter specifying a number of variables for the vector autoregression model and/or a number of lags parameter specifying a number of lags for the vector autoregression model.

In various examples, each of the training set of rows include a set of columns. In various examples, a number of columns in the set of columns is exactly one greater than the number of lags indicated by the number of lags parameter based on a first corresponding requirement for a corresponding vector autoregression model training function called in the first request.

In various examples, each column of the set of columns are implemented as a row vector that includes a set of values. In various examples, for each row in the training set of rows, a number of values in the set of values for the row vector of all columns of the set of columns includes exactly a number of values equal to the number of variables indicated by the number of variables parameter based on a second corresponding requirement for the corresponding vector autoregression model training function called in the first request.

In various examples, based on a third corresponding requirement for the corresponding vector autoregression model training function called in the first request, for each row in the training set of rows: a first row vector of a first column of the set of columns includes a set of un-lagged values, a second row vector of a second column of the set of columns includes a set of lagged values corresponding to a first lag, and/or a final row vector of a final column of the set of columns includes a set of lagged values corresponding to the number of lags.

In various examples, the second request to apply the vector autoregression model includes a set of arguments equal to the number of lags based on a first requirement for a vector autoregression model type implemented by the vector autoregression model.

In various examples, each of the set of arguments is implemented as a vector that includes a set of lags for all variables based on a second requirement for the vector autoregression model type implemented by the vector autoregression model. In various examples, the all variables corresponds to the number of variables.

In various examples, executing the first subset of operators to generate a training set of rows includes filtering out null elements based on a null filtering requirement for a corresponding vector autoregression model training function called in the first request.

In various examples, the first query is determined based on a first query expression that includes a call to a vector autoregression model training function selecting a name for the vector autoregression model. In various examples, the second query is determined based on a second query expression that includes a call to the vector autoregression model by indicating the name for the vector autoregression model.

In various embodiments, any one of more of the various examples listed above are implemented in conjunction with performing some or all steps of FIG. 31D. In various embodiments, any set of the various examples listed above can implemented in tandem, for example, in conjunction with performing some or all steps of FIG. 31D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 31D, for example, in conjunction with further implementing any one or more of the various examples described above.

In various embodiments, the operational instructions, when executed by the at least one processor, cause the database system to: determine a first query that indicates a first request to generate a vector autoregression model; generate a query operator execution flow for the first query that includes a first subset of operators that include at least one relational operator and a second subset of operators that include at least one non-relational linear algebra operator; execute the query operator execution flow for the first query to generate vector autoregression model data for the vector autoregression model based on executing the first subset of operators to generate a training set of rows based on accessing a plurality of rows of a relational database table of a relational database and/or further based on executing the second subset of operators to collectively generate a plurality of sets of coefficient values for storage as the vector autoregression model data; determine a second query that indicates a second request to apply the vector autoregression model; and/or executing the second query to generate vector output of the vector autoregression model based on processing the plurality of sets of coefficient values.

FIGS. 32A-32C illustrate embodiments of a database system 10 that generates trained model data 2620 for a linear discriminant analysis (LDA) model type 2613.15 via performance of a LDA training process 3210 during query execution. The database system 10 can further apply this trained model data 2620 of the LDA model type 2613.15 in other query executions to generate output for other input data. Some or all features and/or functionality of the generation and/or execution of query operator execution flow 2517 to implement generation of trained model data 2620 for a LDA model type 2613.15 of FIGS. 32A-32C can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a LDA model type 2613.15 of FIGS. 32A—32C can implement the execution of query requests 2602 to apply trained model data 2620 of FIG. 26B, 27C and/or any other embodiment of database system 10 described herein.

Some or all features and/or functionality of LDA training process 3210 can be based on database system 10 implementing matrices as a first class SQL data type, for example, via a custom implementation and/or based on implementing non-relational functionality such as linear algebra functionality as described previously. For example, some or all features and/or functionality of LDA training process 3210 can implement some or all features and/or functionality of FIG. 25F, and/or can otherwise include generating and/or processing one or more matrix structures 2978 each having a plurality of element values 2572 in accordance with mathematically representing a corresponding matrix, where one or more covariance matrixes of the LDA training process are generated as matrix structures 2978 based on executing at least one corresponding non-relational linear algebra operator 2524.

Performing LDA training process 3210 can include first passing all inputs through a normalization routine, which can be implemented in a same or similar fashion as the z-score algorithm. For example, the normalization routine is implemented as a window function applied to the training set 2633, such as a custom window function different from traditional SQL functions optionally implemented via one or more one or more non-relational operators. Alternatively or in addition, LDA training process 3210 can include building a covariance matrix, for example, where a matrix entry (x,y) of the covariance matrix is the covariance of x and y. This can be implemented via a covariance aggregate function, such as a custom covariance aggregate different from traditional SQL functions optionally implemented via one or more non-relational operators, for example, implementing the covariance function as an aggregate query function. Alternatively or in addition, LDA training process 3210 can include computing the eigenvalues and/or eigenvectors of this covariance matrix, for example, via a corresponding function, and/or can otherwise include generating linear combination data 3215 from the covariance matrix. The eigenvalues and/or eigenvectors can be saved in the resulting model data. For example, if the model is called in a subsequent query, if the query request denotes a request for the $2^{nd}$ LDA term over the respective input, this can be computed as model output via the saved eigenvalues and/or eigenvectors via a linear sum over coefficients.

FIG. 32A presents an embodiment of a database system 10 that generates trained model data 2620 having tuned parameters 2622 in accordance with a LDA model. For example, the trained model data 2620 is generated based on executing a corresponding query for a query request 2601 denoting a model training request 2610 denoting the model type 2613.15 corresponding to the LDA model type. This can include performing a model training function 2621.15 corresponding to a LDA training function 2015. The LDA training function 2015 can be implemented via some or all functionality discussed in conjunction with FIG. 26K. The model training request 2610 denoting the model type 2613.15 can optionally denote user-specified values for one or more configurable arguments.

The trained model data 2620 can be generated via performing an LDA training process 3210. Some or all of the LDA training process 3210 can be implemented via some or all functionality of the nonlinear optimization 2710 of FIGS. 27A-27O, and/or can be implemented via a different process. Some or all of the LDA training process 3210 can be implemented via some or all functionality of the PCA training process 3210 of FIGS. 30A-30C, and/or can be implemented via a different process.

FIG. 32B illustrates an example embodiment of an LDA training process 3210 implemented by performing the LDA model training function 2015 to generate tuned model parameters 2622 for trained model data 2620 via model training operators 2634.

The LDA training process can be implemented via one or more covariance matrix generation operations 3213 implemented to generate a covariance matrix 3214. The one or more covariance matrix generation operations 3213 can be implemented via performance of a covariance generation function in accordance with linear algebra principles, for example, by executing corresponding non-relational operators that implement generation of a covariance matrix 3214. The covariance matrix 3214 can be implemented as a first class data type, such as a first class data type in accordance with SQL, and/or such as an object that exists independently of other matrices and/or other objects, and/or has an identity independent of any other matrix and/or object. The covariance matrix generation operations 3213 implemented to generate a covariance matrix 3214 can optionally be implemented in a same or similar fashion as the covariance matrix generation operations 3013 implemented to generate a covariance matrix 3014 of FIG. 30B.

The covariance matrix 3014 can be a C×C matrix structure 2978 with a plurality of element values 2572.1.1-2572.C.C, where element value 2572.*i* is a covariance between column xi and xj of the set of columns x1-xC of training set 2633, corresponding the set of independent variables of the respective training data. Column y can correspond to a label/dependent variable of the training set 2633, where each value 2918.*a*1.*y*-2918.*a*1Q.y is one of a discrete set of values.

The LDA training process can alternatively or additionally be implemented via one or more linear combination generator operation(s) 3215. The linear combination generator operation(s) 3215 can be operable to generate linear combination data 3216. The linear combination data 3216 can be implemented as some or all of the tuned parameter data 2620, and can indicate one or more linear combinations of columns, which, when applied can render new columns of a dimensionally-reduced dataset. For example, the linear combination data 3216 indicates at least one vector to be processed via a vector dot product with the set of incoming columns to render at least one corresponding new column as a linear combination of one or more columns. The linear combination data 3216 can indicate one or more linear discriminants. The one or more linear combination data 3216 can be implemented via performance one or more non-relational linear algebra operators and/or can otherwise be executed in accordance with linear algebra principles. The linear combination data 3216 can be generated to express linear combinations for reduced columns based on determining corresponding linear discriminants that maximize the respective differences between classification via different ones of the discrete set of classifiers, based on values of column y, to thus best/most reliably classify the data while reducing number of dimensions requiring processing. For example, for one or more columns in a reduced set of columns (e.g. a set of less than C columns), the linear combination data 3216 indicates a corresponding set of weights to applied to each of the columns corresponding to independent variables of the incoming input set (e.g. x1-xC), where the new column is generated as a weighted sum of column values of all other columns in accordance with multiplying each column value by its respective numeric weight and then computing the sum of these products (note that some weights are optionally zero, where the corresponding column is thus not applicable/utilized in generating the new corresponding columns). For example a given new column xNew is expressed as a linear combination of the values of x1-xC. As a particular example, a first new column xNew1=w1.1*x1+w2.1*x2+w3.1*x3+ . . . wC.1*xC; a second new column xNew2=w1.2*x1+w2.2*x2+w3.2*x3+ . . . wC.2*xC; and so on, where a final new column xNewD=w1.D*x1+w2.D*x2+w3.D*x3+ . . . wC.D*xC; where the value of D is less than the value of C, and/or where the C weights for each of the D new columns (e.g. w. 1.1-w.C.D) are stored and/or indicated in trained model data 2620 as linear combination data 3216, for example, as a corresponding D×C or C×D matrix structure 2978, and/or as corresponding set of vectors (e.g D vectors each implemented as C×1 or 1×C matrix structures 2978 indicating the set of C weights for generating the respective new column).

The linear combination data 3216 can be generated based on applying a homoscedastic assumption, where variance for different classifications is assumed to be identical, thus rendering use of a same, single covariance matrix 3214. Thus, the covariance matrix generation operations 3213 are optionally implemented to compute a single covariance matrix 3214 based on applying the homoscedastic assumption.

Some or all of the linear combination generator operation(s) 3215 can be implemented as some or all eigenvector generator operations 3015 of FIG. 30B. For example, the eigenvector generator operations 3015 can be implemented to generate eigenvector and/or eigenvalue data 3016 that includes a set of eigenvectors and/or corresponding set of eigenvalues from the covariance matrix 3214, for example, as discussed in conjunction with FIG. 30B. The one or more eigenvector generator operations 3015 can be implemented via performance of an eigenvector generator function in accordance with linear algebra principles, for example, by executing corresponding non-relational operators that implement generation of eigenvectors and/or eigenvalues from a first class matrix object. The eigenvector and/or eigenvalue data 3016 that includes this set of eigenvectors and/or corresponding set of eigenvalues generated from the covariance matrix 3014 can be stored as tuned model parameters 2622 of the trained model data 2620, where the linear combination data 3216 is expressed as and/or is based on the eigenvector and/or eigenvalue data 3016 generated from the covariance matrix 3214.

While not illustrated, the LDA training process can optionally be further implemented via one or more normalization operations 3011 implemented to generate a normalized data set 3012 from training set 2633, for example, as discussed in conjunction with FIG. 30B. The one or more normalization operations 3011 can be implemented via performance of a z-score algorithm. The one or more normalization operations 3011 can alternatively or additionally be implemented via performance of a window function. The corresponding normalized data set can be processed via the covariance matrix generation operations 3213 of FIG. 32B.

The linear combination data is optionally stored as new database rows from its own corresponding table storing trained model data 2620, for example, via automatic execution of a CTAS operation.

FIG. 32C illustrates an example of a model training request 2610 for another model type 2613. Y that is different from the LDA model type, where the model training request 2610 includes a model function call to a trained LDA model for use in generating the corresponding training set 2633. This can be useful in cases where dimensionality reduction is performed prior to training of another machine learning model, such as a type of supervised classification model. The respective query request 2601 of FIG. 32C can implement any query request 2601 having a model training request 2610 described herein, and/or can implement any query request 2602 having a model function call 2640 described herein.

The training set determination operators 2632 can be implemented via execution of model execution operators 2646 that apply the linear combination data 3216 of the tuned model parameters 2622 of the trained model data 2620. Y denoted by the model function call 2640 via the corresponding model name 2621. Y. The linear combination data is optionally read as database rows accessed from a corresponding table storing trained model data 2620.

This can include applying eigenvector and/or eigenvalue data 3016 implementing the linear combination data 3216. This can include generating new columns of a dimension-reduced column set, where a number of columns included in input data 2645 is greater than a number of columns of training set 2633, where the resulting columns of training set 2633 are generated as linear combinations of the columns in input data 2645 in accordance with the linear combination data 3216. For example, for each incoming row of the input data 2645, the columns value for each given column of the dimension-reduced column set is generated as a corresponding linear combination of column values of some or all columns of the input data 2645.

For example, for one or more columns in a reduced set of columns, the linear combination data 3216 indicates a corresponding set of weights to applied to each of the columns corresponding to independent variables of the incoming input set, where the new column is generated as a weighted sum of column values of all other columns of input data in accordance with multiplying each column value by its respective numeric weight and then computing the sum of these products (note that some weights are optionally zero, where the corresponding column is thus not applicable/utilized in generating the new corresponding columns). This weighted sum utilized to generate each column value can be applied via performance of at least one non-relational linear algebra operator, such as a dot product operation implemented as a scalar query function.

The output of training set determination operator(s) 2632 thus optionally includes a dimensionality reduced version of input data 2645 generated via input data determination operators 2644 via performance of corresponding row reads. The output of model execution operators 2646 can be further processed and/or can be implemented as training set 2633 that is processed via model training operators 2634 to generate the trained model data 2620 of the non-LDA type model. Some or all of the operator execution flow 2517 of FIG. 32C can implement the dimensionality reduction example of model function call for the LDA type discussed in conjunction with FIG. 26K.

FIG. 32D illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32D. In particular, a node 37 can utilize their own query execution memory resources 3045 to execute some or all of the steps of FIG. 32D, where multiple nodes 37 implement their own query processing modules 2435 to independently execute the steps of FIG. 32D for example, to facilitate execution of a query as participants in a query execution plan 2405. Some or all of the steps of FIG. 32D can optionally be performed by any other processing module of the database system 10. Some or all of the steps of FIG. 32D can be performed to implement some or all of the functionality of the database system 10 as described in conjunction with FIGS. 32A-32C, for example, by implementing some or all of the functionality of generating trained model data 2620 for a LDA model and/or applying the LDA model to generate new output for other input data. Some or all of the steps of FIG. 32D can be performed to implement some or all of the functionality regarding execution of a query via the plurality of nodes in the query execution plan 2405 as described in conjunction with some or all of FIGS. 24A-26J. Some or all of the steps of FIG. 32D can be performed to implement some or all of the functionality regarding executing non-relational operators 2524 in query execution plans as described in conjunction with some or all of FIGS. 25A-25E. Some or all steps of FIG. 32A can be performed by database system 10 in accordance with other embodiments of the database system 10 and/or nodes 37 discussed herein. Some or all steps of FIG. 32A can be performed in conjunction with one or more steps of FIG. 26L, FIG. 26M, and/or one or more steps of any other method described herein.

Step 3282 includes determining a first query that indicates a first request to generate a linear discriminant analysis (LDA) model. Step 3284 includes generating a query operator execution flow for the first query that includes a first subset of operators that include at least one relational operator and a second subset of operators that include at least one non-relational linear algebra operator. Step 3286 includes executing the query operator execution flow for the first query to generate LDA model data for the LDA model. Step 3288 includes determining a second query that indicates a second request to apply the LDA model. Step 3290 includes executing the second query to generate output of the LDA model based on processing the linear combination data.

Performing step 3286 can include performing some or all of steps 3292-3298. Step 3292 includes generating a training set of rows based on accessing a plurality of rows of a relational database table of a relational database. In various examples, each of the training set of rows includes a set of column values for a set of relational database columns of the relational database. Step 3294 includes identifying, for each of the training set of rows, one of a set of possible classifiers based on a column value of the each training set of rows for a classifier column of the set of relational database columns. In various examples, the set of possible classifiers includes a discrete number of possible classifiers equal to a discrete number of possible column values for the classifier column. Step 3296 includes generating a single covariance matrix common to all of the set of possible classifiers. Step 3298 includes generating linear combination data by identifying a linear combination applied to the set of relational database columns for storage as the LDA model data.

In various examples, executing the first subset of operators includes performing step 3292 and/or step 3294. In various examples, executing the second subset of operations includes performing step 3296 and/or 3298. In various examples, step 3292 and/or step 3294 are performed by executing the at least one relational operator. In various examples, step 3296 and/or step 3298 are performed by executing the at least one non-relational linear algebra operator.

In various examples, the second subset of operators include the at least one non-relational linear algebra operator implemented as at least one of: at least one scalar query function, or at least one aggregate query function. In various examples, one or more of the at least one non-relational linear algebra operator implement a dot product function. In various examples, one or more of the at least one non-relational linear algebra operator implement a covariance aggregate function executed to generate the single covariance matrix.

In various examples, the single covariance matrix is implemented via generation of an object having a matrix data type. In various examples, the matrix data type is implemented as a first class data type.

In various examples, the single covariance matrix is generated via at least one first non-relational linear algebra operator, and wherein the linear combination data is generated via at least one second non-relational linear algebra operator that is different from the at least one first non-relational linear algebra operator.

In various examples, the single covariance matrix is generated as being common to all of the set of possible classifiers based on applying a homoscedastic assumption.

In various examples, executing the second query to generate the output of the LDA model based on processing the linear combination data includes determining an input data set that includes another plurality of rows each having corresponding column values the set of relational database columns and/or generating new column values corresponding to a reduced set of columns for each of the plurality of rows based on applying at least one linear combination expressed by the linear combination data to the corresponding column values of the each of the plurality of rows.

In various examples, generating the new column values includes performing at least one non-relational linear algebra operator of a second query operator execution flow generator for the second query.

In various examples, the linear combination data is expressed as at least one matrix having a matrix data type, and wherein the matrix data type is implemented as a first class data type, and wherein the LDA model data indicates the at least one matrix.

In various examples, the linear combination data indicates at least one eigenvector and/or at least one eigenvalue.

In various examples, the first query is determined based on a first query expression that includes a call to a LDA model training function selecting a name for the LDA model. In various examples, the second query is determined based on a second query expression that includes a call to the LDA model by indicating the name for the LDA model.

In various examples, the LDA model training function corresponds to a LDA model type. In various examples, the second query further indicates a call to another model training function corresponding to another model type different from the LDA model type. In various examples, the call to another model training function includes a training set selection clause indicating the output of the LDA model be utilized as a second training set for training another model corresponding to the another model type.

In various examples, the method further includes determining a third query that indicates a second request to apply the another model and/or executing the third query to generate further output of the another model on other input data based on accessing the another model.

In various examples, the other input data has a corresponding set of columns having a smaller number of columns than a number of columns included in the set of relational database columns based on the another model being generated via a reduced dimensionality applied to the set of relational database columns by applying the linear combination data. In various examples, the other input data includes the smaller number of columns based on the reduced dimensionality applied to the set of relational database columns.

In various examples, the another model type is a supervised classification model type. In various examples, the output of the another model includes classification data generated as inference data for a set of new rows to be classified. In various examples, the classification data indicates, for each new row of the set of new rows, one of the set of possible classifiers.

In various examples, the discrete number of possible classifiers is equal to two.

In various examples, the discrete number of possible classifiers is equal to an integer value greater than two. In various examples, executing the second subset of operators includes computing a subspace contain class variability for all of the set of possible classifiers. In various examples, computing the subspace includes generating an object having a matrix data type indicating the subspace, and wherein the matrix data type is implemented as a first class data type.

In various embodiments, any one of more of the various examples listed above are implemented in conjunction with performing some or all steps of FIG. 32D. In various embodiments, any set of the various examples listed above can be implemented in tandem, for example, in conjunction with performing some or all steps of FIG. 32D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 32D, for example, in conjunction with further implementing any one or more of the various examples described above.

In various embodiments, the operational instructions, when executed by the at least one processor, cause the database system to: determine a first query that indicates a first request to generate a linear discriminant analysis (LDA) model; generate a query operator execution flow for the first query that includes a first subset of operators that include at least one relational operator and a second subset of operators that include at least one non-relational linear algebra operator; execute the query operator execution flow for the first query to generate LDA model data for the LDA model; determine a second query that indicates a second request to apply the LDA model; and/or execute the second query to generate output of the LDA model based on processing the linear combination data. In various examples, executing the query operator execution flow for the first query to generate LDA model data for the LDA model includes executing the first subset of operators based on: generating a training set of rows based on accessing a plurality of rows of a relational database table of a relational database, where each of the training set of rows includes a set of column values for a set of relational database columns of the relational database; and/or identifying, for each of the training set of rows, one of a set of possible classifiers based on a column value of the each training set of rows for a classifier column of the set of relational database columns, wherein the set of possible classifiers includes a discrete number of possible classifiers equal to a discrete number of possible column values for the classifier column. In various examples, executing the query operator execution flow for the first query to generate LDA model data for the LDA model further includes executing the second subset of operators based on: generating a single covariance matrix common to all of the set of possible classifiers; and/or generating linear combination data by identifying a linear combination applied to the set of relational database columns for storage as the LDA model data.

FIGS. 33A-33F illustrate embodiments of a database system 10 that generates trained model data 2620 for a mixture model type 2613.16 (e.g. for a Gaussian mixture model or another mixture model type) via performance of a mixture model training process 3310 during query execution. The database system 10 can further apply this trained model data 2620 of the mixture model type 2613.16 in other query executions to generate output for other input data. Some or all features and/or functionality of the generation and/or execution of query operator execution flow 2517 to implement generation of trained model data 2620 for a mixture model type 2613.16 of FIGS. 33A-33E can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a mixture model type 2613.16 of FIGS. 33A-33E can implement the execution of query requests 2602 to apply trained model data 2620 of FIG. 26B, 27C and/or any other embodiment of database system 10 described herein.

The mixture model training function can be implemented as a Gaussian mixture model training function operable to generate trained model data for a Gaussian mixture model. The mixture model training function can be implemented as another mixture model training function operable to generate trained model data for another type of mixture model.

The mixture model training function can be implemented as an unsupervised training function operable to performing clustering-type learning. For example, the mixture model training function 2016 can be operable to generate similar types of models as the K means training function 2006, where groupings are determined during training, and the parameters dictating how the training set be grouped into the final groupings is utilized to similarly group (e.g. assign labels) to new training data. However, while the K means model is trained and utilized to perform clustering based on selecting centroids where new records are grouped based on their distances from centroids for the different groups, the mixture model can be trained based on clustering vis further parameters for its clusters (e.g. not only a mean, but also a covariance matrix and mixture weight). This can render more sophisticated groupings of records to improve insights during query executions in some embodiments.

Some or all features and/or functionality of mixture model training process 3310 can be based on database system 10 implementing matrices as a first class SQL data type, for example, via a custom implementation and/or based on implementing non-relational functionality such as linear algebra functionality as described previously. For example, some or all features and/or functionality of mixture model training process 3210 can implement some or all features and/or functionality of FIG. 25F, and/or can otherwise include generating and/or processing one or more matrix structures 2978 each having a plurality of element values 2572 in accordance with mathematically representing a corresponding matrix, where one or more covariance matrixes of the mixture model training process are generated as matrix structures 2978 based on executing at least one corresponding non-relational linear algebra operator 2524.

FIG. 33A presents an embodiment of a database system 10 that generates trained model data 2620 having tuned parameters 2622 in accordance with a mixture model (e.g. a Gaussian mixture model). For example, the trained model data 2620 is generated based on executing a corresponding query for a query request 2601 denoting a model training request 2610 denoting the model type 2613.16 corresponding to the mixture model type. This can include performing a model training function 2621.16 corresponding to a mixture model training function 2016. The mixture model training function 2015 can be implemented via some or all functionality discussed in conjunction with FIG. 26K. The model training request 2610 denoting the model type 2613.16 can optionally denote user-specified values for one or more configurable arguments.

The trained model data 2620 can be generated via performing a mixture model training process 3310. Some or all of the mixture model training process 3310 can be implemented via some or all functionality of the nonlinear optimization 2710 of FIGS. 27A-27O, and/or can be implemented via a different process.

FIG. 33B illustrates an embodiment of a database system 10 that generates trained model data indicating tuned model parameters 2622 that includes a plurality of sets of cluster parameters 2915.1-2915.K, based on the mixture model training process 3310 selecting these parameters. The number of sets of cluster parameters K can be predetermined and/or configured via user input. The mixture model training process 3310 can be implemented via an unsupervised learning process, where no output label is specified in the training set 2633.

Each set of cluster parameters 3315 can indicate a corresponding mixture weight 3321; a corresponding mean 3322; and/or a corresponding covariance matrix 3323. Each mixture weight 3321 can be a scalar value between 0 and 1, where all mixture weights 3321.1-3321.C sum to one. Each mean 3322 can be defined via C values, corresponding to a plurality of coordinates in C-dimensional space, where C corresponds to the number of input features of the training set 2633. Mean 3322 can be configured in a same or similar fashion as centroid 2915 of FIGS. 29A-29G. A given mean 3322 can optionally be implemented as a vector (e.g. a C×1 or 1×C matrix structure 2978). The mean can be computed as a mean across the rows/weighted portions of rows belonging to the corresponding cluster, where each row has C values for columns x1-xC. Each covariance matrix 3323 can be defined via a set of $C^2$ values (e.g. a set of element values 2572.1.1-2572.C.C of a C×C matrix structure 2978, where a given element in the ith row and jth column is the computed covariance between column xi and xj, for rows/weighted portions of rows belonging to the corresponding cluster. The cluster can be characterized via a corresponding probability density function based on the type of distribution. For example, for a Gaussian mixture model, a given cluster's distribution function is a Gaussian distribution function (e.g. a multivariate Gaussian distribution function corresponding to the C independent variables x1-xC), as defined by the corresponding mean 3322 and the corresponding covariance matrix 3323.

The set of cluster parameters 3315 can thus correspond to a collection of distribution functions (as defined by their mean and covariance matrix, for example, where all distribution functions as Gaussian distribution functions with the respective parameters) that collectively model the dataset, where the mixture weights weight the respective distributions based on how much of the data is characterized by the different respective distribution.

The covariance matrix can be applied to render a distribution curve/ellipsoid having a spherical type, a diagonal type, and/or can be applied via any orientation. The orientation can be configured via user input and/or can be automatically selected and/or determined.

FIG. 33C illustrates an embodiment of performing mixture model training process 3310. Model initialization data 3321 generated via a model initialization step 3309 can be processed via an iterative process 3330 that includes performance of a plurality of iterations 3336.1-3336.M to ultimately render tuned model parameters 2622. In particular, the model initialization data 3321 can include a plurality of sets of initial cluster parameters 3315.1.0-3313.K.0, which can each include an initial mixture weight, initial mean, and initial covariance matrix for the corresponding cluster. The plurality of sets of initial cluster parameters 3315.1.0-3313.K.0 can be optimized via the iterative process 3330 to render final cluster parameters 3315.1.M-3315.K.M, improved from the initial cluster parameters 3315.1.0-3313.K.0 over the course of the M iterations 3336.1-3336.M, and can each include a final mixture weight, final mean, and final covariance matrix.

Performing each iteration 3336 of iterative process 3330 can include performing an expectation step 3336 and a maximization step 3337. For example, the iterative process 3330 is implemented as an expectation-maximization (E-M) algorithm, and/or is implemented in a similar fashion as an expectation-maximization algorithm. The iterative process 3330 can alternatively be implemented as a maximum a posteriori estimation algorithm and/or can be implemented in a similar fashion as an a posteriori estimation algorithm.

Performance of each iteration after the first iteration can render updating of cluster parameters 3315.1-3315.K from those updated in the prior iteration, where the first iteration generates updated cluster parameters from the initial cluster parameters of the model initialization data 3321.

The number of iterations M can be based on a predetermined number of iterations and/or a termination condition (e.g. denoting that the optimization has sufficiently converged). The termination condition can be based on a predefined threshold change in one or more of the parameters (e.g. maximum change/minimum change/average change across all K clusters). For example, a predetermined or user configured epsilon value (e.g. epsilon argument 2162) defines the termination condition.

FIG. 33D illustrates an embodiment of performing a given iteration 3334.*i*. In the given iteration 3334.*i*, previous cluster parameters 3315.1.*i*−1-3315.K.i−1 are processed to generate updated cluster parameters 3315.1.*i*-3315.K.i. The previous cluster parameters 3315.*i*−1 for a given cluster can include a previous weight 3321.*i*−1, a previous mean 3322.*i*−1, and a previous covariance matrix 3323.*i*−1.

For example, the previous cluster parameters 3315 were generated via a prior iteration 3334.*i*−1, and/or, if the given iteration 3334 is the first iteration, the previous cluster parameters 3315 were generated via model initialization step 3309 and correspond to the initial cluster parameters 3315. Meanwhile the updated cluster parameters 3315 can be processed via a subsequent iteration 3334.*i*+1, and/or, if the given iteration 3334 is the final iteration, the updated cluster parameters 3315 correspond to the final cluster parameters 3315.

Performing expectation step 3336.*i* for the given iteration i can include computing a plurality of current membership value sets 3341.*a*1.*i*-3341.*a*Q.i corresponding to the plurality of rows 2916.*a*1-2916.*a*Q of the training set 2633. A given current membership value sets 3341 for a corresponding row 2916 can include a plurality of K membership values for the corresponding row, where each membership value denotes the corresponding rows membership in a corresponding cluster. The membership value for a given row and a given cluster can denote the "portion" of the row's membership in the cluster as defined by the previous cluster parameters. For example, the membership value for a given row's membership in a given cluster can be computed as a function of the current for the each row as a function of the previous mixture weight for the corresponding cluster, the previous mean of the corresponding cluster, and the previous covariance matrix for the corresponding cluster.

In particular, the current membership value set 3341 for a given row can be computed based on computing a set expectation values for the given row, corresponding to the set of clusters. Each expectation value for the given row can correspond to the probability value for a row being included in the respective grouping, conditioned on the probability that the row have the given value (e.g. given set of C column values) for the given row, and further weighted by the prior mixture weight. For example, each of a set of values corresponding to the set of clusters can be generated based on applying the corresponding distribution function (e.g. multivariate Gaussian distribution function) as defined by the corresponding previous mean and previous covariance matrix for the corresponding cluster, and multiplying this probability by the previous mixture weight for the corresponding cluster.

Alternatively or in addition, the plurality of set of membership values can be generated in accordance with performing the expectation step of the E-M algorithm based on the iterative process 3330 being implemented to apply the E-M algorithm via a corresponding execution of a plurality of operators 2520 to generate and/or process corresponding data blocks accordingly.

The membership value set for a given row can optionally be generated as a matrix structure 2978 (e.g. of dimension 1×K and/or K×1), where Q such matrixes are generated via expectation step 3336 (e.g., in executing one or more corresponding operators) and are processed via maximization step (e.g. by executing one or more corresponding operators). The membership values across all rows for a given cluster can optionally be generated as a matrix structure 2978 (e.g. of dimension 1×Q and/or Q×1), where K such matrixes are generated via expectation step 3336 (e.g., in executing one or more corresponding operators) and are processed via maximization step (e.g. by executing one or more corresponding operators). The membership value set for all rows and all clusters can optionally be generated as a matrix structure 2978 (e.g. of dimension Q×K and/or K×Q), where one such matrix is generated via expectation step 3336 (e.g., in executing one or more corresponding operators) and are processed via maximization step (e.g. by executing one or more corresponding operators). The membership value set for all rows and all clusters can alternatively or additionally be generated as a set of doubles/other single-valued data types.

The maximization step 3337 can be applied to process this plurality of membership value sets 3341.*a*1.*i*-3341.*a*Q.i to generate the updated parameters. In particular, the current membership values can indicate how partial membership of the set of rows across the different clusters has changed as a result of generation of the previous cluster parameters, and thus reflecting updated cluster parameters.

For example, the updated mixture weight for each given cluster can be computed as a mean of a plurality of current membership values computed for the given cluster across all rows in the training set of rows in performing the expectation step. The updated mean and the updated covariance matrix can be generated for each given cluster from the training set of rows based on each of the training set of rows being weighted utilizing the current membership value for the each row and the given cluster, where the distribution thus reflects a distribution of rows belonging to the cluster, as weighted by their membership values for the cluster. The set of membership values can be processed to generate the updated in accordance with performing the expectation step of the E-M algorithm based on the iterative process 3330 being implemented to apply the E-M algorithm via a corresponding execution of a plurality of operators 2520 to generate and/or process corresponding data blocks accordingly.

Alternatively or in addition, the plurality of set of membership values can be processed in accordance with performing the maximization step of the E-M algorithm based on the iterative process 3330 being implemented to apply the E-M algorithm via a corresponding execution of a plurality of operators 2520 to generate and/or process corresponding data blocks accordingly.

FIG. 33E illustrates an embodiment of performing the model initialization step 3309 of mixture model training process based on performing a K means training step 3351 and a cluster characterization step 3353.

K means training step 3351 can be, for example, performed to generate, for each of the K clusters, a centroid 2915. A member row set 3354 can be indicated/determined based on the centroid, for example based on assigning each row 2916 to a corresponding cluster based on which of the K centroids 2915.1-2915.K the row is closest to (e.g. with a smallest Euclidean distance).

Cluster characterization step 3353 can process the centroids 2915 and member row sets 3354 to generate the initial cluster parameters 3315.1.0-3315.K.0. For example, the initial mixture weight 3321 for a given cluster is computed as the number of rows in the member row set 3354 for that cluster in the K means cluster data divided by the total number of rows in training set 2633 (i.e. the proportion of rows in training set 2633 having the centroid 2915 for that cluster as its closest centroid as defined by the respective distance function). Alternatively or in addition, the initial mean 3322 for the given cluster can be set as the centroid 2915 for the given cluster in the K means cluster data 3351. Alternatively or in addition, the initial covariance matrix for the given cluster can be computed as the covariance matrix for the member row set 3354 for the given cluster, for example, with respect to the corresponding initial mean (e.g. the centroid 2915) for the corresponding cluster).

Performing K means training step 3351 can include calling and/or performing a corresponding K means training function 2006. For example, a first subset operators 2520 of model training operators 2634 of FIG. 33A are implemented to generate the model initialization data from training set 2633 via performing K means training function 2006, while a second subset of operators 2520 of model training operators 2634, serially after the a first subset of operators 2520, are implemented to process the model initialization data 2633 via the iterative process 3330 to ultimately generate tuned model parameters 2622.

This first subset operators 2520 of model training operators 2634 of FIG. 33A and/or otherwise implementing K means training step 3351 can be implemented via some or all features and/or functionality of the K means training function 2006 as described in conjunction with FIG. 29A-29H, for example, where parallelized instances of the function are performed upon different subsets of training data to generate corresponding sets of centroids, which are processed as input to a final K means training function as discussed previously. Alternatively, the K means training step 3351 can implement performance of K means in a different fashion than that of FIGS. 29A-29H (e.g. K means is performed once upon all input rather than being performed in parallelized instances).

Performing K means training function 2006 can include calling the corresponding model training function 2621.6 (e.g. via a corresponding function call) and/or can otherwise include executing the model training function 2621.6. This can include configuring the configurable arguments 2649 for the model training function 2621.6, for example, where the end user/system that called model training function 2621.16 does not call/is unaware of the internal calling of model training function 2621.6, and the corresponding function call is automatically generated in processing the call to model training function 2621.16 and/or executing the mixture model training function 2016 accordingly. For example, the model training request 2610 of FIG. 33A indicates the mixture model indicates the value of K and/or the value of epsilon for training the mixture model (e.g. as k argument 2121 and/or epsilon argument 2162 of arguments 2649.16 of model training function 2621.16), where the configured value of K and/or configured value of epsilon are automatically passed as the parameters 2649.6 in automatically calling the model training function 2621.6 internally. As another example, the configured value of epsilon and/or one or more other parameters of model training function 2621.6 are predetermined and/or otherwise determined based on the request to perform the mixture model training function 2016 without being explicitly specified in the request, where these determined parameters are passed as the parameters 2649.6 in automatically calling the model training function 2621.6 internally.

In other embodiments, the model initialization step is performed via another algorithm, where K means training step 3351 is optionally not performed and/or where a K means algorithm is otherwise not applied. For example, another clustering algorithm distinct from a mixture model training algorithm is applied to generate model output for another non-mixture model.

FIG. 33F illustrates an example of generating output 2648 for a mixture model (e.g. Gaussian mixture model) via model execution operators 2646 utilizing the cluster parameters 3315.1-3315.K of tuned model parameters 2622 (e.g. the final cluster parameters generated via the iterative process 3330), which can map to a set of labels 2935.1-2935.K denoting the K different clusters identified during the respective k means training process 2910. The model output 2648 can denote a label 2935 assigned to each row based on which respective cluster 3315.1-3315.K they best belong to. Some or all features and/or functionality of model execution operators 2646 FIG. 33F can implement the model execution operators 2646 of FIG. 26B and/or any other applying of a model to input data to generate model output described herein.

In some embodiments, determining which respective cluster 3315.1-3315.K each given row of input data set 2645 best belong to is based on determining the cluster for which the given row has a highest membership value of a set of membership values for the given rows partial membership to the set of clusters, each generated based on an expectation value for a corresponding distribution function for the corresponding cluster as defined by the mean 3322 and covariance matrix 3323 (e.g. in accordance with applying multivariate Gaussian distribution function having this mean and covariance matrix), with this expectation value being weighted (e.g. multiplied) by the corresponding mixture weight 3321 for the corresponding cluster. For example, the set membership values can be a membership value set 3341 generated for the given row in the input data 2645 based on performing expectation step 3336 for each given row in the input data 2645 when performing model execution operators 2646 to generate a membership value set 3341 for the given new row accordingly.

FIG. 33G illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33G. In particular, a node 37 can utilize their own query execution memory resources 3045 to execute some or all of the steps of FIG. 33G, where multiple nodes 37 implement their own query processing modules 2435 to independently execute the steps of FIG. 33G for example, to facilitate execution of a query as participants in a query execution plan 2405. Some or all of the steps of FIG. 33G can optionally be performed by any other processing module of the database system 10. Some or all of the steps of FIG. 33G can be performed to implement some or all of the functionality of the database system 10 as described in conjunction with FIGS. 33A-33F, for example, by implementing some or all of the functionality of generating trained model data 2620 for a mixture model and/or applying the mixture model to generate new output for other input data. Some or all of the steps of FIG. 33G can be performed to implement some or all of the functionality regarding execution of a query via the plurality of nodes in the query execution plan 2405 as described in conjunction with some or all of FIGS. 24A-26J. Some or all of the steps of FIG. 33G can be performed to implement some or all of the functionality regarding executing non-relational operators 2524 in query execution plans as described in conjunction with some or all of FIGS. 25A-25E. Some or all steps of FIG. 33G can be performed by database system 10 in accordance with other embodiments of the database system 10 and/or nodes 37 discussed herein. Some or all steps of FIG. 33G can be performed in conjunction with one or more steps of FIG. 26L, FIG. 26M, FIG. 29H, and/or one or more steps of any other method described herein.

Step 3382 includes determining a first query that indicates a first request to generate a mixture model. Step 3384 includes executing the first query to generate mixture model data for the mixture model. Step 3386 includes determining a second query that indicates a second request to apply the mixture model to input data. Step 3388 includes executing the second query to generate model output of the mixture model for the input data based on, for each row in the input data, identifying a classification label for an identified one of the final set of clusters that includes the each row based on the final cluster parameter data.

Performing step 3384 can include performing some or all of steps 3390-3396. Step 3390 includes generating a training set of rows based on accessing a plurality of rows of a relational database table of a relational database. Step 3392 includes performing an initial training function upon the training set of rows to group the training set of rows into an initial set of clusters. Step 3394 includes generating initial cluster parameter data indicating, for each cluster of the initial set of clusters, a set of initial cluster parameters characterizing the each cluster. Step 3396 includes performing an iterative process to generate final cluster parameter data indicating, for each cluster of a final set of clusters, a set of final cluster parameters characterizing the each cluster by updating the initial cluster parameter data for the each cluster.

In various examples, the mixture model is a Gaussian mixture model and/or the mixture model data is Gaussian mixture model data. In various examples, the mixture model is a another type of mixture model and/or the mixture model data is non-Gaussian mixture model data corresponding to the other type of mixture model.

In various examples, the initial cluster parameter data includes, for the each cluster: an initial mixture weight for the each cluster; an initial mean for the each cluster; and/or an initial covariance matrix for the each cluster. In various examples, the final cluster parameter data includes, for the each cluster: a final mixture weight for the each cluster generated based on updating the initial mixture weight for the each cluster via the iterative process; a final mean for the each cluster generated based on updating the initial mean for the each cluster via the iterative process; and/or a final covariance matrix for the each cluster generated based on updating the initial covariance matrix for the each cluster via the iterative process.

In various examples, generating the initial cluster parameter data includes computing the initial mixture weight for the each cluster as a proportion of rows of the training set of rows grouped in the each cluster via performance of the initial training function. In various examples, a set of initial mixture weights corresponding to the initial set of clusters sum to one. In various examples, a set of final mixture weights corresponding to the final set of clusters sum to one.

In various examples, generating the initial cluster parameter data includes computing the initial mean for the each cluster as a mean computed for rows of the training set of rows grouped in the each cluster via performance of the initial training function. In various examples, the initial mean is defined as an ordered set of mean values corresponding to an ordered set of columns of the training set of rows. In various examples, each mean value of the ordered set of mean values is computed as a mean column value for a corresponding column of the ordered set of columns.

In various examples, generating the initial cluster parameter data includes computing the initial covariance matrix for the each cluster from rows of the training set of rows grouped in the each cluster via performance of the initial training function.

In various examples, performing each iteration of a plurality of iterations of the iterative process includes performing a first step and a second step. In various examples, a given iteration of the plurality of iterations is performed immediately after a prior iteration of the plurality of iterations and immediately before a subsequent iteration of the plurality of iterations.

In various examples, performing the first step for the given iteration of the plurality of iterations includes computing, for each row in the training set of rows, a corresponding set of current membership values corresponding to a current set of clusters updated from the initial set of clusters via prior iterations of the plurality of iterations. In various examples, each current membership value of the corresponding set of current membership values is generated for a corresponding cluster of the current set of clusters for the each row as a function of a previous mixture weight for the corresponding cluster, a previous mean of the corresponding cluster, and/or a previous covariance matrix for the corresponding cluster. In various examples, the previous mixture weight for the corresponding cluster, the previous mean of the corresponding cluster, and the previous covariance matrix for the corresponding cluster were generated in the prior iteration.

In various examples, performing the second step for the given iteration of the plurality of iterations includes updating each cluster of the current set of clusters to render an updated set of clusters each having an updated mixture weight, an updated mean, and an updated covariance matrix based on: generating the updated mixture weight for the each cluster as a mean of a plurality of current membership values computed for the each cluster across all rows in the training set of rows in performing the first step; and/or generating the updated mean and/or the updated covariance matrix for the each cluster from the training set of rows based on each of the training set of rows being weighted utilizing the current membership value for the each row and the each cluster. In various examples, the subsequent iteration is performed based on processing the updated mixture weight for the each cluster, the updated mean for the each cluster, and/or the updated covariance matrix for the each cluster.

In various examples, the updated mixture weight generated in the given iteration for the each cluster is utilized as a corresponding previous mixture weight for the each cluster in performing the first step in the subsequent iteration. In various examples, the updated mean generated in the given iteration for the each cluster is utilized as a corresponding previous mean for the each cluster in performing the first step in the subsequent iteration. In various examples, the updated covariance matrix generated in the given iteration for the each cluster is utilized as a corresponding previous covariance matrix for the each cluster in performing the first step in the subsequent iteration.

In various examples, wherein the initial mixture weight for the each cluster is utilized as a first previous mixture weight for the each cluster in performing a first iteration of the plurality of iterations. In various examples, the initial mean for the each cluster is utilized as a first previous mean for the each cluster in performing the first iteration of the plurality of iterations. In various examples, the initial covariance matrix for the each cluster is utilized as a first covariance matrix for the each cluster in performing the first iteration of the plurality of iterations.

In various examples, the final mixture weight for the each cluster is set as the updated mixture weight generated for the each cluster in performing the second step in a final iteration of the plurality of iterations. In various examples, the final mean for the each cluster is set as the updated mean generated for the each cluster in performing the second step in the final iteration of the plurality of iterations. In various examples, the final covariance matrix for the each cluster is set as the updated covariance matrix generated for the each cluster in performing the second step in the final iteration of the plurality of iterations.

In various examples, identifying the classification label for each row in the input data in generating the model output by executing the second query is based on computing, for the each row in the input data, a corresponding set of membership values corresponding to the final set of clusters. In various examples, each membership value of the corresponding set of membership values is generated for a corresponding cluster of the set of clusters for the each row in the input data as a function of the final mixture weight for the corresponding cluster, the final mean of the corresponding cluster, and/or the final covariance matrix for the corresponding cluster. In various examples, the classification label identified for the each row in the input data corresponds to one of the final set of clusters for which the each row in the input data has a highest valued membership value of the corresponding set of membership values.

In various examples, the initial covariance matrix and the final covariance matrix are implemented via generation of an object having a matrix data type. In various examples, the matrix data type is implemented as a first class data type.

In various examples, the method further includes generating a query operator execution flow for the first query that includes: a first subset of operators that include at least one relational operator; and/or a second subset of operators that include at least one non-relational linear algebra operator. In various examples, executing the first query includes executing the query operator execution flow for the first query based on executing the first subset of operators and executing the second subset of operators. In various examples, the training set of rows is generated based on accessing the plurality of rows of the relational database table of the relational database by executing first subset of operators. In various examples, the initial training function is performed upon the training set of rows, the initial cluster parameter data is generated, and/or the iterative process implementing is performed by executing the second subset of operators.

In various examples, first query is determined based on a first query expression that includes a call to a Gaussian mixture model training function indicating a configured number of clusters, wherein the initial set of clusters includes exactly the configured number of clusters, and wherein the final set of clusters includes exactly the configured number of clusters.

In various examples, the first query is determined based on a first query expression that includes a call to a Gaussian mixture model training function selecting a name for the Gaussian mixture model. In various examples, the second query is determined based on a second query expression that includes a call to the Gaussian mixture model by indicating the name for the Gaussian mixture model.

In various examples, the initial training function is configured to train models of a corresponding model type having a non-mixture model type. In various examples, the initial training function is performed to generate non-mixture model data of the non-mixture model type indicating grouping of the training set of rows into the initial set of clusters. In various examples, the initial cluster parameter data is generated based on the non-mixture model data.

In various examples, the non-mixture model type is a K means model type. In various examples, the non-mixture model data corresponds to K means model data generated by performing a K means model training process. In various examples, the K means model indicates a set of K means centroids. In various examples, the mixture model data is implemented as non-K means model data.

In various examples, performing the K means model training process includes: generating a plurality of training subsets from the training set of rows; processing the plurality of training subsets via a corresponding plurality of parallelized processes to generate a plurality of sets of centroids corresponding to a plurality of different K means models based on performing a K means training operation via each of the corresponding plurality of parallelized processes upon a corresponding one of the plurality of training subsets; and/or generating a final set of centroids corresponding to a final K means model based on performing the K means training operation upon the plurality of sets of centroids, wherein the non-mixture model data indicates the final set of centroids as the set of K means centroids.

In various examples, a function library includes a Gaussian mixture model training function and/or a K means model training function. In various examples, the Gaussian mixture model training function is performed via a first function call to the Gaussian mixture model training function. In various examples, performing the Gaussian mixture model training function includes performing the K means model training function via a second function call to the K means model training function.

In various examples, the method further includes determining a third query that indicates a third request to generate a K means model. In various examples, the method further includes executing the third query to generate corresponding K means model data for the K means model based on executing the K means model training function. In various examples, the Gaussian mixture model training function is not executed when executing the third query based on the third query not indicating a request to generate a corresponding Gaussian mixture model.

In various examples, the method further includes determining a fourth query that indicates a fourth request to apply the K means model to second input data. In various examples, the method further includes executing the fourth query to generate model output of the K means model for the second input data.

In various examples, the iterative process implements an expectation-maximization algorithm.

In various embodiments, any one of more of the various examples listed above are implemented in conjunction with performing some or all steps of FIG. 33G, and/or any other method described herein. In various embodiments, any set of the various examples listed above can implemented in tandem, for example, in conjunction with performing some or all steps of FIG. 33G and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 33G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 33G, for example, in conjunction with further implementing any one or more of the various examples described above.

In various embodiments, the operational instructions, when executed by the at least one processor, cause the database system to: determine a first query that indicates a first request to generate a Gaussian mixture model; and/or execute the first query to generate Gaussian mixture model data for the Gaussian mixture model. In various embodiments, executing the first query to generate the Gaussian mixture model data for the Gaussian mixture model is based on: generating a training set of rows based on accessing a plurality of rows of a relational database table of a relational database; performing an initial training function upon the training set of rows to group the training set of rows into an initial set of clusters; generating initial cluster parameter data indicating, for each cluster of the initial set of clusters, a set of initial cluster parameters characterizing the each cluster; and/or performing an iterative process to generate final cluster parameter data indicating, for each cluster of a final set of clusters, a set of final cluster parameters characterizing the each cluster by updating the initial cluster parameter data for the each cluster. In various embodiments, the operational instructions, when executed by the at least one processor, further cause the database system to: determine a second query that indicates a second request to apply the Gaussian mixture model to input data; and/or execute the second query to generate model output of the Gaussian mixture model for the input data based on, for each row in the input data, identifying a classification label for an identified one of the final set of clusters that includes the each row based on the final cluster parameter data.

FIGS. 34A-34I illustrate embodiments of a database system 10 that generates trained model data 2620 for a KNN model type 2613.7 via performance of a KNN model training process 3410 during query execution. The database system 10 can further apply this trained model data 2620 of the KNN model type 2613.7 in other query executions to generate output for other input data. Some or all features and/or functionality of the generation and/or execution of query operator execution flow 2517 to implement generation of trained model data 2620 for a KNN model type 2613.7 of FIGS. 34A-34I can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a KNN model type 2613.7 of FIGS. 34A-34I can implement the execution of query requests 2602 to apply trained model data 2620 of FIG. 26B, 27C and/or any other embodiment of database system 10 described herein.

Generating trained model data 2620 for a KNN model can include generating a and storing a "snapshot of rows representative of the training set, to which a KNN classification algorithm can be applied when the function is called (e.g. where, for a given row to be classified, the K nearest rows to the given row are identified from the full set of rows stored as this snapshot of rows based on applying a distance function, and the label is assigned based on the labels of these rows, such as the label constituting a plurality of the K rows, and/or by applying weights to different ones of the K rows as a function of distance).

In some embodiments, the full training set 2633 is stored as the trained model data 2620, where the K rows nearest to a given new row to be classified are thus identified from the full training set 2633. While storing the full training set constitutes a fuller set of data thus reflecting the distribution of the training set accurately, performing the corresponding KNN classification algorithm upon new rows is lengthier as the K nearest rows need be identified from a larger set (e.g. a distance is computed between the new row and each of the training set rows top identify the K smallest distances, or the complexity otherwise scales with the training set size).

Consider a case where a training set 2633 includes a billion rows and is stored as tuned model parameters 2622 for a KNN model without first reducing the size of the training set. Applying the KNN model to classify one new row can require processing 10 billion calculations (for example, in the case where a distance is computed between a given new row and each of 10 billion rows stored as tuned model parameters 2633—in the case where an algorithm such as that of FIGS. 36A-36G is applied to identify and apply neighboring search spaces that expand over multiple iterations, for example, in conjunction with performing a KNN join operator, less than 10 billion calculations may be required, but the complexity optionally still scales as a function of training set size). This large number of calculations to classify a row might be acceptable in the case where only one new row need be classified. However, a user may issue a request to classify a set of many rows via the KNN model. In the case where 1K new rows are to be classified in executing a corresponding query now it becomes 10 trillion calculations (or scaling with the size of the training set), where the needed computations are potentially beyond the capabilities of the hardware. But if the amount of work can be reduced (e.g. by 10,000,000) then it becomes tractable again at these large scales, enabling KNN to be run in a reasonable amount of time, even if the original training set included a large number (e.g. a billion) rows.

Thus, it can be advantageous to build a smaller dataset such that a KNN model built over that data set is nearly as accurate as a KNN model built over the full dataset. FIGS. 34A-34I illustrate an example of such an embodiment where a KNN model training process 3410 is operable to build a reduced dataset 3415 from training set 2633 that is smaller than training set 2633, but generated to be reflective of the distribution of the training set 2633 to render more accurate KNN classification without necessitating use of the full model. For example, the reduced dataset 3415 of a KNN model generated via KNN model training process 3410 might end up with 200, 500, or 1000 rows in the snapshot (e.g. the tuned model parameters 2622) instead of 1 billion or 10 billion rows, which can make performance of a corresponding KNN classification algorithm upon a set of new rows significantly faster.

In some embodiments, building a reduced dataset includes building a k-means model with k=1 over the training set 2633, skipping the labels. This will find the centroid of all the data. Next, the centroid from the k-means model is run through the full KNN model (e.g. using the full training set 2633) to see how it classifies. This centroid is then added to the reduced data set along with the classification from the full model. Next the k-means model is built with k=2 over the training set 2633 to find the 2 centroids for 2 groups. Both of these points are run through the full KNN model (e.g. again using the full training set 2633) to get the classification for each of these 2 points, and then these two new points and the labels from the full KNN model to the reduced data set. This process continues, incrementing k by 1 each time, for example, until one of two things happens: the accuracy of the KNN model of the reduced data set reaches some user defined threshold; or the size of the reduced data set reaches a certain number of rows. When either of these happen, the best model we've seen so far over any of the reduced datasets (e.g. every step makes a new snapshot, so that we can easily rollback to the best snapshot, which optionally isn't the latest), and this best snapshot is selected as the snapshot (e.g. tuned model parameters 2622) for the KNN model. Using this feature can reduce the KNN snapshot by 7+ orders of magnitude while only giving up 2% in accuracy.

FIG. 34A presents an embodiment of a database system 10 that generates trained model data 2620 having tuned parameters 2622 in accordance with a KNN model. For example, the trained model data 2620 is generated based on executing a corresponding query for a query request 2601 denoting a model training request 2610 denoting the model type 2613.7 corresponding to the KNN model type. This can include performing a model training function 2621.7 corresponding to a KNN model training function 2007. The KNN model training function 2007 can be implemented via some or all functionality discussed in conjunction with FIG. 26K. The model training request 2610 denoting the model type 2613.7 can optionally denote user-specified values for one or more configurable arguments.

The trained model data 2620 can be generated via performing a KNN model training process 3410. The trained model 2620 can indicate a reduced dataset 3415.

FIG. 34B illustrates an embodiment of a database system 10 that generates trained model data indicating tuned model parameters 2622 that includes a plurality of new rows 2916.r1-2916.rP of a reduced dataset 3415. For example, the training set 2633 includes Q training rows 2916.a1-2916.aQ, while the reduced dataset 3415 includes P new rows 2916.r1-2916.rP, where P is strictly less than Q (e.g. P is at least one order of magnitude less than Q).

The P new rows 2916.r1-2916.rP of reduced dataset 3415 can be generated to have a same set of columns as the training set 2633 values for a set of columns 1-C, as well as a further value y for an additional column y, (e.g. columns 1-C are independent variables/features, column y stores a label, which can be a discrete value of a discrete set of possible values corresponding to a fixed set of labels). Thus, the reduced dataset 3415 emulates the training set 2633 by having same columns, but is smaller than training set 2633.

The P new rows 2916.r1-2916.rP of reduced dataset 3415 optionally include none of the rows 2916.a1-2916.aQ of the training set 2633, where some or all of the P new rows are instead generated as new rows based on processing the rows 2916.a1-2916.aQ of the training set 2633. This processing can be based on applying KNN model training process 3410, for example, by applying a KNN K value 3416 (e.g. specified in the request 2610, for example, as configurable parameters). The value of P and/or the ratio of P/Q can be predetermined, can be configured via user input (e.g. as configurable parameters of request 2610), and/or can be based on user-configured and/or automatically determined reduced row set completion criteria and/or version selection criteria data as discussed in further detail in conjunction with FIGS. 34G and 34H.

FIG. 34C illustrates an embodiment of performing a KNN training process 3410 to generate a reduced row set 3415 that includes some or all of a plurality of new row sets 3458.1-3458.M generated over a plurality of corresponding iterations 3434.1-3434.M of an iterative process 3430.

A given new row set 3458.i generated in a given iteration 3434.i can include exactly i new rows. Thus, the number of rows P in the reduced dataset 3415 can be equal to or based on a summation of a corresponding arithmetic sequence from 1–M, incrementing by 1 (e.g. P=(M/2)(M+1)). In embodiments where multiple versions of reduced dataset 3415 are compared as discussed in conjunction with FIG. 34H where not all new row sets 343458 are necessarily included, the value of P can be bounded by this value (e.g. P≤(M/2)(M+1)).

FIG. 34D illustrates an embodiment of performing the KNN training process 3410 to generate each new row set 3458.i via performance of a corresponding clustering step 3436.i and/or a corresponding labeling step 3453. For example, performance of a given iteration 3434.i of FIG. 34C includes performance of the corresponding clustering step 3436.i and/or the corresponding labeling step 3453 of FIG. 34D.

Performing a given clustering step 3436.i can include generating a corresponding centroid set 3452.i. For example, a given centroid set 3452.i generated in clustering step 3436 of iteration i can include exactly i centroids based on performing clustering step with a value of m equal to i. This value of m can dictate how many centroids be generated in accordance with a corresponding clustering algorithm performed upon training set 2633 in clustering step 3436 (e.g. in conjunction with an unsupervised learning algorithm, such as a mixture model training process or a K means model training process). The value of m can increment with each corresponding iteration, where the M clustering steps each apply a different value of m between 1 and M.

A given centroid 2915 can include C values for each of the C columns col1-colC of the training set based on clustering of the respective rows in a C dimensional space. In particular, the additional column corresponding to the label y is optionally ignored in performing the clustering step 3436, for example, based on the clustering step 3436 being implemented as an unsupervised clustering algorithm.

The labeling step 3453 can be performed to generate each new row set 3453 from a corresponding centroid set 3452. For example, a given new row set 3453.i includes i new rows i.1-i.1 generated from the i centroids in the centroid set 3452.i. In particular, the labeling step can be performed to assign a y value 2918 to each new row to render new rows of the reduced dataset 3415 that each have the full set of C+1 columns, like the training set 2633. This can include performing a classification step upon each centroid 2915 to generate the label accordingly, based on the training set 2633. Thus, a given new row can have C+1 columns, where the values of the C columns corresponding to the C independent variables (e.g. the first C columns) are set as the C values of the corresponding centroid 2915, and the value of the remaining column can be set as the assigned label (e.g. one of the fixed possible set of labels). In the case where more than 1 column is a label, multiple additional y columns can be generated with corresponding labels as columns in addition to the C columns reflecting the centroid value 2915 accordingly.

The labeling step 3453 can be performed upon a given centroid set after a given clustering step to render the respective new row set 3458 for a given iteration, for example, prior to the next centroid set of the next iteration being generated. Alternatively, after all centroid sets 3452.1 3452.M are generated over the M iterations, all centroids 2915 of all centroid sets 3451.1-3452.M are then labeled via labeling step 3453.

FIG. 34E illustrates an embodiment where a given clustering step 3436.i implements a K-means training step 3351 applying the value of m as a corresponding K-means K value 3463.

Performing K means training step 3351 can include calling and/or performing a corresponding K means training function 2006. For example, a first subset operators 2520 of model training operators 2634 of FIG. 34A are implemented to generate M centroid sets from training set 2633 via performing M iterations of K means training function 2006 with K-means K values 3462 incrementing from 1 to M accordingly (e.g. a given centroid set 3452.i having i centroids is based on the tuned parameter data 2622 generated via a given K means training function 2006 with K-means K value 3462 being implemented as m, having a value of i). A second subset of operators 2520 of model training operators 2634 can be implemented to process these centroid sets via labeling step 3453 to ultimately generate tuned model parameters 2622 for the KNN model training process that includes the reduced dataset 3415.

This can optionally include, for a given clustering step 3436.i, executing the K-means training process in conjunction with some or all features and/or functionality of FIGS. 29A—29H, where a plurality of parallelized processes are performed to generate different sets of centroids, and where a final k-means process is performed upon the sets of centroids to identify the set of centroids. Alternatively, for a given clustering step 3436.*i*, a single k-means process is performed upon the training set 2633 to identify the set of centroids. Performing K means training step 3351 for a given clustering step 3436.*i* with m=i can otherwise include implementing a k-means training process to generate a centroid set from training set 2633 having i centroids 2915.*i*.1-2915.*i*.*i*. In other embodiments, another type of clustering algorithm is performed to identify the set of centroids.

FIG. 34F illustrates an embodiment of labeling step 3453 that is implemented via model execution operators 2646 for a KNN classification process 3459 using KNN K value 3416 to classify each centroid 2915.*x* of a given centroid set 3452.*i* via a corresponding label 3465.*x* based on utilizing the full training set 2633 as the tuned model parameters 2622 for the initial KNN model. Thus, while the KNN model is itself being trained, execution of a corresponding KNN algorithm can be performed via implementing some of the model training operators 2634 as model execution operators 2646, where a set of labels 3456.*i*.1-3456.*i*.*i* for a given centroid set 3452.*i* is considered model output 2648 of the KNN classification process. This KNN classification process 3459 applied in this labeling step 3453 to train a given KNN model can be the same or different KNN classification process 3459 utilized to later apply this trained KNN model to new data.

Performing KNN classification process 3459 can include calling a corresponding KNN classification algorithm by applying the training set 2633 as tuned model parameters of a corresponding KNN model. For example, a first subset operators 2520 of model training operators 2634 of FIG. 34A are implemented to generate M centroid sets from training set 2633 (e.g. via performing M iterations of K means training function 2006, or other clustering algorithm implementing clustering step 3436) with m values incrementing from 1 to M accordingly. A second subset of operators 2520 of model training operators 2634 can be implemented to process these centroid sets via labeling step 3453 to ultimately generate tuned model parameters 2622 for the KNN model training process that includes the reduced dataset 3415 by implementing model execution operators 2646 of the KNN classification process 3459.

Executing request 2610 of FIG. 34A can optionally include first generating a KNN model corresponding to the full KNN training set (e.g. storing the full training set as a corresponding initial KNN model that can be called), where this initial KNN model is thus called in executing labeling step 3453 to render applying of this KNN model (e.g. the full training set of rows) in performing KNN classification in conjunction with executing the model accordingly. Alternatively, as the use of the full training set is temporary for its use in generating the reduced dataset in training the KNN model only, the full training set is optionally not stored as its own model, but is all the while processed in full when applying KNN classification process 3459 in executing labeling step 3453.

In particular, a given centroid 2915.*x* in a given centroid set 3452 can have K closest rows of training set 2633 identified via a K closest rows identification step 3437. For example, the K rows having a closest distance with centroid 2915 can be identified.

This number of rows K can be the KNN K value 3416 for which the KNN model is being trained (e.g. the user specified K values 3416 indicated in request 2610 being executed). This number of rows K can alternatively be a different predetermined KNN K value for use in training a given KNN model via performing labeling step 3453, where the KNN K value 3416 used when the trained model is ultimately applied to new rows using reduced training set 3415 is different from the number of row K identified via K closest rows identification step 3437 of labeling step 3453 in KNN model training process 3410.

This number of rows K can be the same across different centroid sets 3452 generated via clustering steps 3436 of different iterations 3434 (e.g. where unlike the value of m of clustering steps 3436, for example, implementing the K-means K value 3463 for a corresponding K-means training step 3351, the KNN K value 3416 dictating how many rows nearest a given centroid 2915 are identified to classify the given centroid is optionally fixed across all iterations 3434, where m increments with each iteration and where this KNN K value 3416 remains fixed across all iterations).

Identification of these K closest rows can include performing a distance function upon some or all rows in the full training set 2633 with the given centroid 2915.*x* (e.g. distance between a given centroid 2915 and given training row of training set 2633 is equal to/based on a Euclidean distance using the C centroid coordinates of the given centroid and the corresponding C rows of the independent variables of the given training row, ignoring the labels y of training set 2633). In some embodiments, some or all features and/or functionality of FIGS. 36A-36H is performed to reduce the search spaces applied, and/or identification of the K closest rows otherwise involves performing a distance function upon less than all of the training set of rows. The distance function applied can be defined as a configurable parameter in request 2610 for the KNN model training process and/or can be predetermined. The distance function applied in this labeling step 3453 to train a given KNN model can be the same or different distance function utilized to later apply this trained KNN model to new data.

A label classification step 3438 can select a label 3456.*x* for the centroid 2915.*x* based on the identified K closest rows to centroid 2915.*x*. For example, the centroid 2915.*x* is selected as a function of the K labels of the K closest rows. The label can be selected in accordance with a weighing function weighing the labels of different rows (E.g. as 1/d or other function of distance from the centroid 2915, where labels of rows closer to the centroid are more heavily weighted than those of rows further away). The weighing function applied can be defined as a configurable parameter in request 2610 for the KNN model training process and/or can be predetermined. The weighing function applied in this labeling step 3453 to train a given KNN model can be the same or different weighing function utilized to later apply this trained KNN model to new data. In some cases, no weighing is applied and/or the weighing function indicates equal weighs be applied to all labels, for example, where the label is selected as the label having more instances in the K rows than any other label.

FIG. 34G illustrates an embodiment of determining, after a given iteration 3434.*i* of KNN training process 3410, whether the iterative process 3430 is complete or if a further iteration 3434.*i*+1 be performed based on evaluating whether reduced row set completion criteria 3748 is met. A current reduced row set completion status determination module 3476 can generate/identify the relevant current reduced row set completion status data 3477, which is compared to reduced row set completion criteria 3478 to determine whether criteria 3478 is met. If so, the given iteration 3434.*i* is the final iteration 3434.M, and a reduced row set finalization module 3471 generates the reduced dataset 3415 from some or all of the new row sets 3458.1-

3458.*i* (e.g. to include all row sets, or evaluate which version is best as discussed in conjunction with FIG. 34H).

The reduced row set completion criteria 3748 can thus dictate when a sufficient number of iterations/a sufficient number of new rows sets 3458 have been generated. The reduced row set completion criteria 3748 can be predetermined and/or can be user-configured (e.g. as configurable parameters of the request).

In some embodiments, the reduced row set completion criteria 3748 indicates a fixed value of M (e.g. predetermined, automatically selected, or user-configured threshold value of M). The current reduced row set completion status data 3477 can denote the current value of m, where the final iteration is performed based on this iteration being the Mth iteration.

In some embodiments, the reduced row set completion criteria 3748 indicates a minimum and/or maximum number of rows in reduced row set, and/or maximum/minimum proportion relative to the full training set (e.g. predetermined, automatically selected, or user-configured threshold number/proportion). The current reduced row set completion status data 3477 can denote the current size of the reduced row set (e.g. current size=(i+1)(i/2)), where the final iteration is performed based on this current size meeting the required minimum row number/proportion and/or not exceeding the maximum row number/proportion.

In some embodiments, the reduced row set completion criteria 3748 indicates a minimum model accuracy (e.g. predetermined, automatically selected, or user-configured threshold accuracy percentage). The current reduced row set completion status data 3477 can denote the current accuracy of the reduced row set, where the final iteration is performed based on this current accuracy meeting/being at least as accurate as the minimum model accuracy. In such embodiments, the current reduced row set completion status determination module 3476 is optionally implemented to generate accuracy data for the current reduced row set (e.g. all new row sets generated so far, including new row sets 3458.1-3458.*i*). For example, a validation row set is identified from the full training set 2633 (e.g. to include some or all rows of the full training set), where the KNN classification process 3459 is performed upon the C independent variables columns 1-C validation row set to classify each row with labels 3456, where these assigned labels 3456 are compared to the actual labels of the y column of these validation rows to identify the percentage of rows that were classified correctly. In some embodiments, the KNN model is trained in accordance with applying a cross-validation process (e.g. large subsets of training set 2633 are applied to identify centroids and generate respective new row sets, where smaller, remaining subsets of training set 2633 are implemented as validation row sets to generate accuracy data).

The reduced row set completion criteria 3748 can optionally indicate completion as a function of multiple such factors (E.g. the process completes when either the maximum number of iterations/max num rows has been reached, or when a desired accuracy has been reached, whichever happens first). This can enable applying a configured trade-off between desired accuracy and model size, which corresponds to the trade-off between model accuracy and execution efficiency when later applying the model.

FIG. 34H illustrates an embodiment of KNN training process 3410 where a reduced dataset version selection step 3460 is performed to select reduced dataset 3515 as a selected reduced dataset version 3414.*j* from a plurality of reduced dataset versions. For example, each reduced dataset version corresponds to all new row sets generated prior to and during the given iteration, where M reduced dataset versions 3414.1-3414.M are generated over the M iterations 3434.1-3434.M of the iterative process, as illustrated in FIG. 34H. In some embodiments, other combinations of different new row sets/their underlying rows can be implemented as versions 3414 (e.g. a given version can have new row sets generated over a non-consecutive set of iterations and/or optionally includes new row sets after the first iteration, but not the first iteration; a given version optionally includes only a proper subset of rows from a given new row set 3458, etc.).

A selected version 3414.*j* can be selected from the set of possible versions 3414.1-3414.M based on version selection criteria data 3461. For example, the version selection criteria data 3461 indicates a version having a best accuracy be selected, where the reduced dataset version selection step 3460 generates model accuracy data for each version (e.g. if not already generated via current reduced row set completion status determination module 3476) to determine which version is most accurate (e.g. which version classifies a validation row set identified from the training set most accurately, where cross-validation is optionally applied over the course of KNN training process 3410). The version selection criteria data 3416 can applying a configured trade-off between desired accuracy and model size, which corresponds to the trade-off between model accuracy and execution efficiency when later applying the model (e.g. select based on some configured function of number of rows and model accuracy, where a most accurate version is optionally not necessarily selected in favor of another version having less rows also being sufficiently accurate while also rendering more efficient query execution when applied to classify new rows). The version selection criteria data 3416 can be configured via user input (e.g. as configurable parameters in request 2610) and/or can be predetermined and/or automatically selected.

FIG. 34I illustrates an example of generating output 2648 for a KNN model via model execution operators 2646 utilizing the reduced dataset 3415 of tuned model parameters 2622 (e.g. all new row sets, or only the new row sets of the selected version 3414). The model output 2648 can denote a label 3456 assigned to each row based on performing a KNN classification process 3459, for example, via some or all features and/or functionality described in conjunction with FIG. 34F, where a K closest rows identification step 3437 and label selection step are optionally performed. Some or all features and/or functionality of model execution operators 2646 FIG. 33F can implement the model execution operators 2646 of FIG. 26B and/or any other applying of a model to input data to generate model output described herein.

In particular, the KNN classification process 3459 performed to apply the trained KNN model in classifying input data 2646, for example, in conjunction with executing a subsequent query after the model is trained, can be performed in a same or similar fashion as performing KNN classification process 3459 to label centroids as discussed in conjunction with FIG. 34F. However, while the full training set is applied in performing KNN classification process 3459 as part of KNN model training process 3410 to generate labels for centroids to be included as new rows of reduced dataset 3415, only this reduced dataset 3415 is applied in performing KNN classification process 3459 in conjunction with calling the corresponding trained model to classify new input data.

In some embodiments, performing the KNN classification process 3459 via execution of model execution operators 2646 (e.g. of FIG. 34I and/or FIG. 34F) includes performing some or all features and/or functionality discussed in conjunction with FIGS. 36A-36G. For example, the KNN classification process 3459 is performed via model execution operators 2646 that includes KNN-join operator 2920 of FIGS. 36A-36G.

In various examples, performing the KNN model training process 3410 via model training operators 2634 (e.g. labeling centroids as illustrated in FIG. 34F; validating the model to generate model accuracy data, etc.) includes performing some or all features and/or functionality discussed in conjunction with FIGS. 36A-36G (e.g. includes executing a KNN-join operator 2920 of FIGS. 36A-36G).

FIG. 34J illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34J. In particular, a node 37 can utilize their own query execution memory resources 3045 to execute some or all of the steps of FIG. 34J, where multiple nodes 37 implement their own query processing modules 2435 to independently execute the steps of FIG. 34J for example, to facilitate execution of a query as participants in a query execution plan 2405. Some or all of the steps of FIG. 34J can optionally be performed by any other processing module of the database system 10. Some or all of the steps of FIG. 34J can be performed to implement some or all of the functionality of the database system 10 as described in conjunction with FIGS. 34A-34H, for example, by implementing some or all of the functionality of generating trained model data 2620 for a KNN model and/or applying the KNN model to generate new output for other input data. Some or all of the steps of FIG. 34H can be performed to implement some or all of the functionality regarding execution of a query via the plurality of nodes in the query execution plan 2405 as described in conjunction with some or all of FIGS. 24A-26J. Some or all of the steps of FIG. 34J can be performed to implement some or all of the functionality regarding executing non-relational operators 2524 in query execution plans as described in conjunction with some or all of FIGS. 25A-25E. Some or all steps of FIG. 34J can be performed by database system 10 in accordance with other embodiments of the database system 10 and/or nodes 37 discussed herein. Some or all steps of FIG. 34J can be performed in conjunction with one or more steps of FIG. 26L, FIG. 26M, FIG. 29H, and/or one or more steps of any other method described herein.

Step 3482 includes determining a first query that indicates a first request to generate a K nearest neighbors (KNN) model. Step 3484 includes executing the first query to generate KNN model data for the KNN model. Step 3486 includes determining a second query that indicates a second request to apply the KNN model to input data. Step 3488 includes executing the second query to generate model output of the KNN model for the input data based on, for each row in the input data, identifying a classification label for the each row based on performing the KNN classification algorithm to classify the each row in the input data by applying a reduced data set.

Performing step 3484 can include performing step 3490 and/or 3492. Step 3490 includes determining a full training set of rows (e.g. training set 2633). Step 3492 includes generating the reduced dataset from the full training set of rows based on performing a plurality of training iterations (e.g. M iterations 3434 of iterative process 3430).

Performing some or all given iterations of the plurality of training iterations of step 3492 can include performing some or all of steps 3494, 3496, and/or 3498. Step 3494 includes generating a set of centroids in a given iteration that includes m centroids by performing a clustering algorithm upon the full training set of rows, where m has a value based on a number of iterations performed prior to the given iteration. Step 3496 includes generating a set of centroids in a given iteration that includes m centroids by performing a clustering algorithm upon the full training set of rows. In various examples, m has a value based on a number of iterations performed prior to the given iteration. Step 3498 includes adding the new set of rows to the reduced dataset.

In various examples, the centroid classification label for each of the m centroids is identified from a discrete set of labels in performing the KNN classification algorithm to classify each of the set of centroids by applying the full training set of rows. In various examples, the classification label for the each row in the input data is identified from the discrete set of labels in performing the KNN classification algorithm to classify the each row in the input data by applying the reduced data set when executing the second query to generate model output of the KNN model for the input data.

In various examples, a number of new rows included in the reduced dataset is strictly less than number of original rows included in the full training set of rows.

In various examples, each training row of the full training set of rows includes a first set of columns corresponding to independent variables and at least one additional column corresponding to a classification label. In various examples, the at least one additional column includes, for the each training row, one of the discrete set of labels as the corresponding column value of the at least one additional column for the each training row.

In various examples, each training row of the full training set of rows includes a first number of column values. In various examples, the first set of columns includes a second number of column values. In various examples, the each of the m centroids is defined via a corresponding set of coordinates in d dimensional space. In various examples, d is equal to the second number, and/or each new row of the new set of rows includes the first number of columns.

In various examples, each coordinate of the corresponding set of coordinates corresponds to one of the first set of columns. In various examples, the performing the KNN classification algorithm to classify each of the set of centroids by applying the full training set of rows includes, in the each iterations, identifying k rows of the full training set of rows closest to the each of the m centroids based on, for each centroid of the m centroids: applying a distance function to the first set of columns of ones of the full training set of rows and to the corresponding set of coordinates of the each of the m centroids; identifying k rows of the full training set of rows having a smallest distance with the corresponding set of coordinates of the each of the m centroids; identifying a set of k column values based on determining the corresponding column value of the at least one additional column for the k rows of the full training set of rows; and/or classifying the each centroid with a label of the discrete set of labels based on the set of k column values.

In various examples, the first request indicates a configured k parameter (e.g. KNN K value 3416). In various examples, the k rows includes a number of rows equal to k based on a value of k being set as the configured k parameter. In various examples, identifying the classification label for the each row of the input data from the discrete set of labels in executing the second query is based on identifying another k rows of the reduced dataset having a smallest distance with the corresponding set of coordinates of the each of the m centroids based on the value of k being set as the configured k parameter.

In various examples, the first request indicates a configured distance parameter. In various examples, the distance function is defined based on the configured distance parameter. In various examples, identifying the classification label for the each row of the input data from the discrete set of labels in executing the second query is based on identifying the another k rows of the reduced dataset having a smallest distance with the corresponding set of coordinates of the each of the m centroids based on applying the distance function (e.g. having the smallest distance as defined by distance function output of the distance function). In various examples, the distance function is a Euclidean distance function. In various examples, the distance function is defined as a predetermined distance function.

In various examples, the first request indicates a configured weight parameter. In various examples, classifying the each centroid is further based on applying the configured weight parameter to the k rows of the full training set. In various examples, identifying the classification label for the each row of the input data from the discrete set of labels in executing the second query is based on identifying the another set of k column values further based on applying configured weight parameter to the another k rows of the reduced dataset. In various examples, the weight parameter is defined as a weight to be applied as a function of distance. In various examples, the weight parameter is defined as a predetermined weight function.

In various examples, in labeling a given input row, the weight applied a label for a given label of a given row of the training set/reduced dataset is applied as 1/D, where D is the distance between the given input row and the given row of the training set/reduced dataset as defined by the predetermined and/or configured distance function (e.g. Euclidean distance function). In various examples, all weights for each given label in the k identified rows closest to a given input row are summed, where a label having the highest of these sums is identified as the label for the given input row.

In various examples, labels for all k closest rows are weighted equally (e.g. based on the weight parameter indicating equal weighing of the k rows). In various examples, a number of rows having each given label in the k identified rows are counted, and a label having the highest number of rows in the k rows with this label. In various examples, the each centroid is classified with a label of the discrete set of labels constituting a plurality across the set of k column values of the k rows based on determining a number of instances of the label across the set of k column values is greater than numbers of instances of all other labels across the set of k column values.

In various examples, in a first iteration of the plurality of training iterations, the value of m is set to one. In various examples, the value of m in the each iteration after the first iteration increments by one from a previous one of the plurality of training iterations. In various examples, the reduced dataset includes, after adding the new set of rows to the reduced dataset in the each iteration, a number of rows equal to, is a function of, and/or is otherwise based on a product of: m divided by two; and m plus one (e.g. reduced dataset size after the ith iteration=(i/2)*(i+1))

In various examples, performing the KNN classification algorithm to classify each of the set of centroids for applying the full training set of rows includes, in the each iteration, identifying k rows of the full training set of rows closest to the each of the m centroids. In various examples, a value of k is a same value across all of the plurality of training iterations. In various examples, a value of m is different across all of the of the plurality of training iterations.

In various examples, the KNN model data is set as the reduced dataset for a final one of the plurality of training iterations that includes all of a plurality of new sets of rows generated over all of the plurality of training iterations.

In various examples, a plurality of reduced dataset versions are generated over the plurality of training iterations. In various examples, each given reduced dataset version of the plurality of reduced dataset versions generated in a corresponding iteration of the plurality of training iterations is a superset of all prior reduced data set versions generated in all prior ones of the plurality of training iterations. In various examples, the KNN model data is set as a most favorable one of the plurality of reduced dataset versions.

In various examples, the method further includes generating a plurality of model accuracy data based on generating one of the plurality of model accuracy data for each of the plurality of reduced dataset versions. In various examples, the most favorable one of the plurality of reduced dataset versions is identified as having a most favorable one of the plurality of model accuracy data.

In various examples, generating the one of the plurality of model accuracy data for each of the plurality of reduced dataset versions includes generating a set of expected labels for a validation row set determined from the full training set of rows, for each validation row in the validation row set, identifying a corresponding classification label for the each validation row from the discrete set of labels based on performing the KNN classification algorithm to classify the each validation row by applying the each of the plurality of reduced dataset versions. In various examples, generating the one of the plurality of model accuracy data for each of the plurality of reduced dataset versions further includes generating the one of the plurality of model accuracy data for the each of the plurality of reduced dataset versions based on comparing actual labels of the validation row set to the set of expected labels for the validation row set. In various examples, the validation row set is a proper subset of rows of the full training set of rows. In various examples, the validation row set is the full training set of rows. In various examples, the validation row set of one of a plurality of validation row sets in accordance with performance of a cross validation process utilized to generate the model accuracy data.

In various examples, a final iteration in the plurality of training iterations is determined based on at a determined number of iterations having been performed. In various examples, the determined number of iterations is configured in the first request via a user-configured number of iterations parameter. In various examples, the determined number of iterations is predetermined and/or fixed.

In various examples, a final iteration in the plurality of training iterations is determined based on a determined minimum and/or maximum number of rows required to be included in the reduced dataset. In various examples, the determined minimum number of rows and/or determined maximum number of rows is configured in the first request via at least one user-configured threshold number of rows parameter. In various examples, the determined minimum number of rows and/or determined maximum number of rows is predetermined and/or fixed.

In various examples, a final iteration in the plurality of training iterations is determined based on the reduced data-set having model accuracy data comparing favorably to a determined minimum accuracy. In various examples, the reduced dataset has model accuracy data is configured in the first request via a user-configured minimum accuracy. In various examples, the reduced dataset has model accuracy data is predetermined and/or fixed.

In various examples, the performing the KNN classification algorithm to classify each of the set of centroids by applying the full training set of rows includes, in the each iterations, identifying k rows of the full training set of rows closest to the each of the m centroids by applying a same value of k across all of the plurality of training iterations, and wherein a value of m is different across all of the of the plurality of training iterations.

In various examples, determining the full training set of rows includes generating the full training set of rows based on accessing a plurality of rows of a relational database table of a relational database.

In various examples, the first query is determined based on a first query expression that includes a call to a KNN model training function selecting a name for the KNN model. In various examples, the second query is determined based on a second query expression that includes a call to the KNN model by indicating the name for the KNN model.

In various examples, the clustering algorithm is configured to train models of a corresponding model type having a non-KNN model type. In various examples, the clustering algorithm is performed to generate non-KNN model data of the non-KNN model type indicating the set of m centroids.

In various examples, the non-KNN model type is a K-means model type. In various examples, the non-KNN model data corresponds to K-means model data generated by performing a K-means model training process. In various examples, the K-means model indicates a set of K-means centroids as the set of centroids, where the KNN model data is implemented as non-K-means model data. In various examples, the value of m corresponds to a K-means K value for the K-means training function (e.g. m is K-means K value 3463)

In various examples, performing the K-means model training process includes performing some or all steps of FIG. 29H and/or via performing some or all features and/or functionality of the K-means model training operators 2911 and/or K means training process 2910 of FIG. 29B.

In various examples, performing the K-means model training process includes generating a plurality of training subsets from the full training set of rows. In various examples, performing the K-means model training process includes processing the plurality of training subsets via a corresponding plurality of parallelized processes to generate a plurality of sets of centroids corresponding to a plurality of different K-means models based on performing a K-means training operation via each of the corresponding plurality of parallelized processes upon a corresponding one of the plurality of training subsets. In various examples, performing the K-means model training process includes generating a final set of centroids corresponding to a final K-means model based on performing the K-means training operation upon the plurality of sets of centroids. In various examples, the non-KNN model data indicates the final set of centroids as the set of K-means centroids.

In various examples, a function library includes a KNN model training function and a K-means model training function. IN various examples, the KNN model training function is performed via a first function call to the KNN model training function. In various examples, performing the KNN model training function includes performing the K-means model training function via a second function call to the K-means model training function. In various examples, the method further includes: determining a third query that indicates a third request to generate a K-means model; executing the third query to generate corresponding K-means model data for the K-means model based on executing the K-means model training function, where the KNN model training function is not executed when executing the third query based on the third query not indicating a request to generate a corresponding KNN model; determining a fourth query that indicates a fourth request to apply the K-means model to second input data; and/or executing the fourth query to generate model output of the K-means model for the second input data.

In various examples, performing the K-means model training process includes performing some or all steps of FIG. 29H and/or via performing some or all features and/or functionality of the K-means model training operators 2911 and/or K means training process 2910 of FIGS. 29A-29G.

In various examples, performing the KNN classification algorithm includes performing some or all steps of FIGS. 29F and/or 29G of U.S. patent application Ser. No. 16/838,459, and/or include performing some or all features and/or functionality described in FIGS. 36A-36E.

In various embodiments, any one of more of the various examples listed above are implemented in conjunction with performing some or all steps of FIG. 34J, and/or any other method described herein. In various embodiments, any set of the various examples listed above can implemented in tandem, for example, in conjunction with performing some or all steps of FIG. 34J and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34J described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34J, for example, in conjunction with further implementing any one or more of the various examples described above.

In various examples, the operational instructions, when executed by the at least one processor, cause the database system to: determine a first query that indicates a first request to generate a K nearest neighbors (KNN) model; and/or execute the first query to generate KNN model data for the KNN model. In various embodiments, executing the first query to generate the KNN model data for the KNN model is based on: determining a full training set of rows;

and/or generating a reduced dataset from the full training set of rows. In various examples, generating the reduced dataset from the full training set of rows is based on, for each iteration of a plurality of training iterations: generating a set of centroids that includes m centroids by performing a clustering algorithm upon the full training set of rows, where m has a value based on a number of iterations performed prior to the each iteration; generating a new set of rows from the set of centroid values based on identifying a centroid classification label for each of the m centroids from a discrete set of labels by performing a KNN classification algorithm to classify each of the set of centroids by applying the full training set of rows; and/or adding the new set of rows to the reduced dataset. In various embodiments, the KNN model data is set as the reduced dataset for one of the plurality of training iterations. In various examples, the operational instructions, when executed by the at least one processor, further cause the database system to: determine a second query that indicates a second request to apply the KNN model to input data; and/or execute the second query to generate model output of the KNN model for the input data. In various examples, executing the second query to generate model output of the KNN model for the input data is based on, for each row in the input data, identifying a classification label for the each row from the discrete set of labels based on performing the KNN classification algorithm to classify the each row in the input data by applying the reduced data set.

FIGS. 35A-35G illustrate embodiments of a database system 10 that generates trained model data 2620 for a Sammon mapping model type 2613.17 via performance of a Sammon mapping model training process 3510 during query execution. The database system 10 can further apply this trained model data 2620 of the Sammon mapping model type 2613.17 in other query executions to generate output for other input data. Some or all features and/or functionality of the generation and/or execution of query operator execution flow 2517 to implement generation of trained model data 2620 for a KNN model type 2613.17 of FIGS. 35A-35G can implement the execution of query requests 2601 to generate trained model data 2620 of FIG. 26A, 27A and/or any other embodiment of database system 10 described herein. Some or all features and/or functionality of the generation and/or execution of query operator execution flow 2517 to implement utilizing of trained model data 2620 for a Sammon mapping model type 2613.17 of FIGS. 35A-35H can implement the execution of query requests 2602 to apply trained model data 2620 of FIG. 26B, 27C and/or any other embodiment of database system 10 described herein.

Sammon mapping training process 3510 can be implemented as a nonlinear dimensionality reduction method. For example, similar to the PCA and/or LDA model training discussed previously, Sammon mapping can be implemented to reduce the number of dimensions. However, while PCA and LDA are implemented to produce new dimensions (e.g. new columns) as linear combinations of the existing columns, Sammon mapping can be implemented to apply a nonlinear mapping. This can be ideal in handling problems that require a nonlinear approach and/or where a nonlinear mapping to new columns otherwise renders a transformed set of columns more representative of distribution/characteristics of the original dataset. Alternatively or in addition, Sammon mapping analysis can be useful for data exploration when one is trying to understand the nature of the data and how to best build models on it.

In particular, Sammon mapping can be applied to implement in dimensionality reduction of a given dataset to maintain the geometrical structure of the original space as much as possible in the new, lower dimensional space. This can be based on utilizing a loss function that compares distances in the original space to distances in the new space. For example, the following loss function can be applied:

$$E = \frac{1}{\sum_{i<j} d^*_{ij}} \sum_{i<j} \frac{(d^*_{ij} - d_{ij})^2}{d^*_{ij}}$$

In this equation, $d^*_{ij}$ can be the distance between i and j vectors in the original space, while $d_{ij}$ can be the distance between the i and j vectors in the new lower dimensional space (e.g. based on the transformation of these vectors into the lower dimensional space via the nonlinear mapping). These distances can be computed in accordance with applying a corresponding distance function (e.g. a Euclidean distance function). The distance function can be configured via user input (e.g. as a configurable parameter of request 2610), can be predetermined, and/or can be automatically selected.

One complication in implementing Sammon mapping is that computing this loss function can require taking a cartesian product of the whole dataset. For example, if the dataset has 1 billion points, the cartesian product has 1 quintillion points, which can be beyond the compute capacity of database system 10 and/or can otherwise require processing and/or memory resources that would strain system resources.

To handle this complication, performing Sammon mapping training process 3510 can include taking two samples of the input dataset (e.g. of training row set 2633). Then, the cartesian product of these two samples can be taken (e.g. rather than the whole dataset upon itself), where a nonlinear optimization is performed to find a nonlinear mapping that minimizes the Sammon mapping error as defined in the above function (e.g. based on applying some or all features and/or functionality of the nonlinear optimization infrastructure of FIGS. 27A-27O). Given that a nonlinear mapping could essentially be any formula, the user can be required to indicate what formula to use for the nonlinear mapping (e.g. as a configurable parameter of request 2610), where the Sammon mapping training process 3510 is implemented to then find the coefficients to best fit that formula (e.g. that render minimizing of E as defined by the error function). The user can be allowed to specify any combination of polynomials and linear sums of functions and/or an explicit nonlinear formula.

Some or all features and/or functionality of Sammon mapping training process 3510 can be based on database system 10 implementing matrices as a first class SQL data type, for example, via a custom implementation and/or based on implementing non-relational functionality such as linear algebra functionality as described previously. For example, some or all features and/or functionality of Sammon mapping training process 3510 can implement some or all features and/or functionality of FIG. 25F, and/or can otherwise include generating and/or processing one or more matrix structures 2978 each having a plurality of element values 2572 in accordance with mathematically representing a corresponding matrix, where one or more covariance matrixes of the Sammon mapping training process are generated as matrix structures 2978 based on executing at least one corresponding non-relational linear algebra operator 2524.

Some or all of the Sammon mapping model training process 3510 can be implemented via some or all functionality of the nonlinear optimization 2710 of FIGS. 27A-27O, and/or can be implemented via a different process.

FIG. 35A presents an embodiment of a database system 10 that generates trained model data 2620 having tuned parameters 2622 in accordance with a Sammon mapping model. For example, the trained model data 2620 is generated based on executing a corresponding query for a query request 2601 denoting a model training request 2610 denoting the model type 2613.17 corresponding to the Sammon mapping model type. This can include performing a model training function 2621.17 corresponding to a Sammon mapping training function 2015. The Sammon mapping training function 2017 can be implemented via some or all functionality discussed in conjunction with FIG. 26K. The model training request 2610 denoting the model type 2613.17 can optionally denote user-specified values for one or more configurable arguments.

The trained model data 2620 can be generated via performing an Sammon mapping training process 3510. Some or all of the Sammon mapping training process 3510 can be implemented via some or all functionality of the nonlinear optimization 2710 of FIGS. 27A—27O, and/or can be implemented via a different process.

FIG. 35B illustrates an example embodiment of a Sammon mapping training process 3510 implemented by performing the Sammon mapping model training function 2017 to generate tuned model parameters 2622 for trained model data 2620 via model training operators 2634.

The tuned model parameters 2622 can indicate nonlinear mapping data 3515 indicating a plurality of tuned values 2623.1 2623.N of a corresponding set of coefficients c1-cN of a corresponding nonlinear formula 3532.

The nonlinear mapping data can be optionally stored as new database rows from its own corresponding table storing trained model data 2620, for example, via automatic execution of a CTAS operation.

The nonlinear formula 3532 can express transformation to a dimensionality-reduced set of columns as a function of the set of coefficients and/or some or all of a set of variables x1-xC, corresponding to the values of a set of columns col1-colC of the training set. For example, w is a vector having B elements, where the number of elements B is the number of columns in the dimensionality reduced result (e.g. B<C). The nonlinear formula 3532 can be user-defined, for example as a configurable parameter in request 2610, and/or can be automatically determined and/or predefined. The nonlinear formula 3532 can indicate the set of coefficients c1-cN requiring tuning as tuned parameters.

FIG. 35C illustrates an example where nonlinear formula 3532 indicates a set of B formulas for dimensionality reduction to B columns, where w is considered a vector having B elements w1-wB produced as output of function F, where F can be optionally broken down into/treated as B different formulas F1-FB, each corresponding to the transformation formula for generating a corresponding one of B new columns.

Each formula can be a function of its own set of coefficients (e.g. where coefficients for different functions are optionally not shared). Different formulas for different ones of the B new columns can have same or different numbers of coefficients. Each formula can be a function of some or all independent variables x1-xC corresponding to some or all columns col1-colC. Different formulas for different ones of the B new columns can involve same or different numbers/subsets of the full set of columns col1-colC. Each formula can be its own type of linear and/or nonlinear function comprised of one or more linear and/or nonlinear constructs. Different formulas for different ones of the B new columns can involve same or different types of linear and/or nonlinear constructs.

The nonlinear formula 3532 can be considered nonlinear based on at least one of the B formulas optionally includes at least one mapping and/or at least one of the B formulas is not a linear combination of the set of columns col1-colC. Alternatively, the nonlinear formula 3532 is not necessarily nonlinear (e.g. express all new columns as linear combinations of old columns) based on the user defining this mapping and electing to utilize Sammon mapping instead of or in addition to PCA and/or LDA despite the linear nature of the defined mapping structure.

FIG. 35D illustrates an embodiment of Sammon mapping model training process 3510 that includes training subset sampling step 2632; cartesian product step 3520; and/or non-linear optimization process 3511.

The training set 2633 can be processed via a training subset sampling step 2632 to produce two training subsets 3512.1 and 3512.2. Training subset 3512.1 can be generated via training subset sampling step 2632 to include S1 sampled rows 2916.1.1-2916.1.S1, for example, selected as a proper subset of S1 rows from the full set of Q rows of training set 2633. Similarly, training subset 3512.2 can be generated via training subset sampling step 2632 to include S2 sampled rows 2916.2.1-2916.2.S2, for example, selected as a proper subset of S2 rows from the full set of Q rows of training set 2633. For example, the training subsets 3512.1 and 2512.2 can be generated based on selecting their respective sets of sampled rows randomly and/or pseudo-randomly from the full training subset.

The union of training subsets 3512.1 and 3512.2 can be a proper subset of the training set 2633. For example, the number of rows included in each training subset can be substantially less than Q (e.g. S1 and/or S2 is at least one order of magnitude less than Q). Training subsets 3512.1 and 3512.2 can be mutually exclusive. Alternatively, training subsets 3512.1 and 3512.2 can optionally have a non-null intersection.

The values S1 and S2 of training subsets 3512.1 and 3512.2 can be denoted as selected numbers and/or proportions of the full training set size Q, for example, as configured based on user input, for example, as a configurable parameter of request 2610, and/or being otherwise predetermined and/or automatically selected. The values S1 and S2 can be the same or different. The values S1 and S2 can be based on a maximum number of pairs for which cartesian product data be generated (e.g. s1*s2 is configured to be strictly less or equal to this maximum). The values S1 and S2 can be optionally selected based on current memory/processing resource availability; based on an accuracy requirement; based on increasing the values S1 and S2 from a prior iteration of generating a candidate model based on this candidate model not being sufficiently accurate, and/or other reasons.

Cartesian product step 3520 can be implemented to generate cartesian product data 3521 from the training subset 3512.1 and/or 3512.2. For example, the cartesian product data 3521 indicates a plurality of row pair data, where each row pair data 3522 corresponds to one row from training subset 3512.1 and one row from training subset 3512.2 (e.g. the cartesian product data 3521 includes S1*S2 row pair data 3522, where row pair data is included for every possible pair of rows having a first row from training subset 3512.1 and a second row from training subset 3512.2.

Non-linear optimization process 3511 can be performed to generate the non-linear mapping data (e.g. select the values for the coefficients c1-cN of the nonlinear formula 3532), for example, in accordance with minimizing a corresponding loss function 3521. While the nonlinear formula 3532 is optionally user-defined, the loss function 3531 is optionally predetermined, for example, based on being a loss function corresponding to the mathematical process of Sammon mapping. Alternatively, in some embodiments, the loss function 3531 can be selected/configured/modified via user input, for example, as a configurable parameter in request 2610.

In some embodiments, the training subset sampling step 2532 is performed via a first one or more operators of query operator execution flow 2517. For example, the first one or more operators implementing training subset sampling step 2532 process the training set 2633 as input data blocks to produce the training subset 3512 0.1 and 2512.2 as output data blocks. Alternatively or in addition, the cartesian product step 3520 is performed via a second one or more operators of query operator execution flow 2517, for example, that are serially after the first subset of operators. For example, the second one or more operators implementing cartesian product step 3520 process the training subsets 3512.1 and 2512.2 as input data blocks to produce the plurality of row pair data 3522.1.1 3522.S1.S2 of cartesian product data 3521 as output data blocks. Alternatively or in addition, the non-linear optimization process 3511 is performed via a third one or more operators of query operator execution flow 2517, for example, that are serially after the second subset of operators. For example, the third one or more operators implementing non-linear optimization process 3511 process the plurality of row pair data 3522.1.1 3522.S1.S2 of cartesian product data 3521 as input data blocks to produce the non-linear mapping data as output data blocks.

FIG. 35E illustrates an example embodiment where performing non-linear optimization process 3511 includes performing a loss function evaluation step 3545. Performing the loss function evaluation step 3545 can include evaluating the loss function 3531 (e.g. by applying a current set of coefficient values being applied in a given iteration/given parallelized process as part of the optimization, where the loss function evaluation step 3545 is optionally applied multiple times to fine tune the coefficient values accordingly in accordance with further minimizing the output E of loss function 3531).

The loss function 3531 can be similar to the loss function discussed previously. However, to handle the case where the training subsets are two different subsets rather than a cartesian product having been applied across the same single set, all values i and j can be evaluated rather than only those where i is less than j (e.g. i is the ith row in set of S1 rows of training subset 3512.1, where i ranges from 1 to S1; j is the jth row in set of S1 rows of training subset 3512.1, where j ranges from 1 to S2):

$$E = \frac{1}{\sum_{i<S1,j<S2} d^*_{ij}} \sum_{i<S1,j<S2} \frac{\left(d^*_{ij} - d_{ij}\right)^2}{d^*_{ij}}$$

Loss function evaluation step 3545 can be performed based on processing each given row pair data 3522.*i.i* (e.g. corresponding to a given row 1.i and 2.j from the first training subset and second training subset, respectively). A distance function 3546 (e.g. Euclidean distance function or other configured/predefined distance function) can be applied to this row pair to compute the original distance between these given rows (e.g. their distance in the C dimensional space as defined by the C columns), for example, as the value of $d^*_{ij}$ of the loss function 3531. For example, the value of $d^*_{ij}$ is a function of the values of the set of C columns of the respective set of rows 1.i and 2.j.

Meanwhile $d_{ij}$ can be computed by applying this distance function 3546 to transformed row pair data 3549.*i*, which can correspond to/be computed as (F(row 1.i), F(row 2.j)). For example, the function F is defined by applying current coefficient values for c1-cN to nonlinear function 3532 when this loss function evaluation step 3545 is being performed, where F(row 1.i) has B columns and where F (row 2.j) has B columns. For example, the value of $d_{ij}$ is a function of the values of the set of B columns of the respective set of rows F(row 1.i) and F(row 2.j).

These values $d^*_{ij}$ and $d_{ij}$ can similarly be computed for all row pair data of the cartesian product data 3521 to enable the value of E to be computed in performing loss function evaluation step. For example, for a given row pair having row 1.i and row 2.j, the respective difference between their computed $d^*_{ij}$ and $d_{ij}$ is computed, squared, and divided by $d_{ij}$ to render a value for the respective row pair. All such values across all such row pairs (e.g. all S1*S2 row pairs) are summed. The value of this sum is multiplied by the value of $(1/d^*_{ij})$.

In some embodiments, in cases where loss function evaluation step 3545 is performed multiple times, the S1*S2 values $d_{ij}$ for all possible row pairs can be precomputed and/or can be cached/made accessible after being computed the first time, as these values are fixed (e.g. the original distances do not change). For example, in a given loss function evaluation step 3545, only the new S1*S2 values of $d_{ij}$ are generated via performing nonlinear function 3532 and distance function 3546 based on applying the current coefficients, where the precomputed values of the S1*S2 values $d^*_{ij}$ are applied rather than these values being recomputed via distance function 3546.

FIG. 35F illustrates an embodiment where the non-linear optimization process 3511 applied to the cartesian product data 3521 to tune parameters c1-cN of the nonlinear formula 3532 based on minimizing loss function 3531 is implemented based on performing the non-linear optimization process 2710, for example, based on implementing some or all features and/or functionality discussed in conjunction with FIGS. 27A-27O. For example, the nonlinear formula 3532 is implemented as the function definition 2719 of FIGS. 27A-27O (e.g. where w is implemented as y, and is optionally a vector of B elements). Alternatively or in addition, the loss function 3531 is implemented as the loss function h of FIGS. 27A-27O. Alternatively or in addition, the plurality of row pair data 3522.1.1-3522.S1.S2 of cartesian product data 3521 is implemented as the training set 2633 of FIGS. 27A-27O (e.g. each row of the training set is implemented as a pair of rows 1.i and 2.j). The set of tuned values 2623.1-2623.N for the set of parameters c1-cN can be implemented as the set of tuned values 2623.1-2623.N for the set of parameters c1-cN of FIGS. 27A-27O. The non-linear optimization process 3511 can otherwise be performed via some or all steps/functionality of one or more embodiments of non-linear optimization process 2710 described in conjunction with FIGS. 27A-27O. Alternatively or in addition, the non-linear optimization process 3511 can be implemented differently from non-linear optimization process 2710 of FIGS. 27A-27O (e.g. via applying different algorithms, applying parallelization differently, or other differences).

FIG. 35G illustrates an example of a model training request 2610 for another model type 2613. Y that is different from the Sammon mapping model type, where the model training request 2610 includes a model function call to a trained Sammon mapping model for use in generating the corresponding training set 2633. This can be useful in cases where dimensionality reduction is performed prior to training of another machine learning model. The respective query request 2601 of FIG. 35G can implement any query request 2601 having a model training request 2610 described herein, and/or can implement any query request 2602 having a model function call 2640 described herein.

The training set determination operators 2632 can be implemented via execution of model execution operators 2646 that apply the nonlinear mapping data 3515 of the tuned model parameters 2622 of the trained model data 2620. Y denoted by the model function call 2640 via the corresponding model name 2621.Y. The nonlinear mapping data 3515 is optionally read as database rows accessed from a corresponding table storing trained model data 2620.

This can include generating new columns of a dimension-reduced column set, where a number of columns included in input data 2645 (e.g. C) is greater than a number of columns of training set 2633 (e.g. B), where some or all of the resulting columns of training set 2633 are generated as nonlinear functions of the columns in input data 2645 in accordance with the nonlinear mapping data 3515. For example, for each incoming row of the input data 2645, the columns value for each given column of the dimension-reduced column set is generated by applying the nonlinear formula 3532 to produce the B columns as a nonlinear function of the tuned values of coefficients c1-cN and/or column values of some or all columns of the input data 2645.

The output of training set determination operator(s) 2632 thus optionally includes a dimensionality reduced version of input data 2645 generated via input data determination operators 2644 via performance of corresponding row reads. The output of model execution operators 2646 can be further processed and/or can be implemented as training set 2633 that is processed via model training operators 2634 to generate the trained model data 2620 of the non-Sammon mapping type model. Some or all of the operator execution flow 2517 of FIG. 35G can implement the dimensionality reduction example of model function call for the Sammon mapping type discussed in conjunction with FIG. 26K.

FIG. 35H illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 35H. In particular, a node 37 can utilize their own query execution memory resources 3045 to execute some or all of the steps of FIG. 35H, where multiple nodes 37 implement their own query processing modules 2435 to independently execute the steps of FIG. 35H for example, to facilitate execution of a query as participants in a query execution plan 2405. Some or all of the steps of FIG. 35H can optionally be performed by any other processing module of the database system 10. Some or all of the steps of FIG. 35H can be performed to implement some or all of the functionality of the database system 10 as described in conjunction with FIGS. 33A-35G, for example, by implementing some or all of the functionality of generating trained model data 2620 for a Sammon mapping model and/or applying the Sammon mapping model to generate new output for other input data. Some or all of the steps of FIG. 35H can be performed to implement some or all of the functionality regarding execution of a query via the plurality of nodes in the query execution plan 2405 as described in conjunction with some or all of FIGS. 24A-26J. Some or all of the steps of FIG. 35H can be performed to implement some or all of the functionality regarding executing non-relational operators 2524 in query execution plans as described in conjunction with some or all of FIGS. 25A-25E. Some or all steps of FIG. 35H can be performed by dataset system 10 in accordance with performing the non-linear optimization 2710 of FIGS. 27A-27O. Some or all steps of FIG. 35H can be performed by database system 10 in accordance with other embodiments of the database system 10 and/or nodes 37 discussed herein. Some or all steps of FIG. 34J can be performed in conjunction with one or more steps of FIG. 26L, FIG. 26M, and/or one or more steps of any other method described herein.

Step 3582 includes determining a first query that indicates a first request to generate a Sammon mapping model/Step 3584 includes executing the first query to generate Sammon mapping model data for the Sammon mapping model. Step 3586 includes determining a second query that indicates a second request to apply the Sammon mapping model. Step 3588 includes executing the second query to generate output of the Sammon mapping model, for example, based on applying a nonlinear mapping by utilizing a set of values selected for a set of coefficients indicated by the Sammon mapping model data.

Performing step 3584 can include performing some or all of steps 3590-3596. Step 3590 includes determining a training set of rows. Step 3592 includes selecting a first proper subset of the training set of rows as a first sample of the training set of rows. Step 3594 includes selecting a second proper subset of the training set of rows as a second sample of the training set of rows. Step 3596 includes selecting a set of values for a set of coefficients defining a nonlinear mapping based on processing the first proper subset and the second proper subset. In various examples, the Sammon mapping model data indicates the set of values for the set of coefficients defining the nonlinear mapping.

In various examples, the set of values for the set of coefficients defining the nonlinear mapping are selected based on processing only the first proper subset and the second proper subset, where a remaining proper subset of the training set of rows is not processed to select the set of values for the set of coefficients defining the nonlinear mapping. In various examples, the remaining proper subset of the training set of rows is defined as a set difference between the training set of rows and a union of the first proper subset and the second proper subset. In various examples, the first proper subset and the second proper subset are mutually exclusive.

In various examples, the method includes generating a query operator execution flow for the first query that includes a first subset of operators that include at least one relational operator and a second subset of operators that include at least one non-relational linear algebra operator. In various examples, executing the first query includes executing the query operator execution flow for the first query based on executing the first subset of operators to determine the training set of rows, to select the first proper subset of the training set of rows, and/or to select the second proper subset of the training set of rows. In various examples, executing the first query includes executing the second subset of operators to select the set of values for the set of coefficients defining the nonlinear mapping.

In various examples, executing the first query is further based on generating the training set of rows based on accessing a plurality of rows of a relational database table of a relational database. In various examples, each of the training set of rows includes a set of column values for a set of relational database columns of the relational database.

In various examples, executing the second query to generate the output of the Sammon mapping model based on applying the nonlinear mapping includes: determining an input data set that includes another plurality of rows each having corresponding column values the set of relational database columns; and/or generating new column values corresponding to a reduced set of columns for each of the plurality of rows based on applying the nonlinear mapping to the corresponding column values of the each of the plurality of rows.

In various examples, generating the new column values includes performing at least one non-relational linear algebra operator of a second query operator execution flow generator for the second query.

In various examples, executing the first query is further based on generating cartesian product data based on performing a cartesian product operation upon the first proper subset of the training set of rows and the second proper subset of the training set of rows. In various examples, the set of values for the set of coefficients are generated based on processing the cartesian product data.

In various examples, the cartesian product data is implemented via generation of at least one object having a matrix data type. In various examples, the matrix data type is implemented as a first class data type.

In various examples, the cartesian product data is generated via at least one first non-relational linear algebra operator. In various examples, the set of values for the set of coefficients is selected via at least one second non-relational linear algebra operator that is different from the at least one first non-relational linear algebra operator.

In various examples, the set of values for the set of coefficients are selected based on minimizing a loss function by performing a nonlinear optimization process.

In various examples, the loss function is evaluated based on computing a plurality of distances based on computing, for each row in the first proper subset, a set of distances corresponding to, for each row in the second proper subset, a corresponding distance of the each row in the second proper subset from the each row in the first proper subset.

In various examples, executing the first query to generate the Sammon mapping model data for the Sammon mapping model is further based on generating plurality of sets of candidate model coefficients via executing a plurality of parallelized optimization processes, wherein the set of values includes is selected as a most favorable set of candidate model coefficients is selected from the plurality of sets of candidate model coefficients.

In various examples, executing each of the plurality of parallelized optimization processes includes generating a corresponding set of candidate model coefficients of the plurality of sets of candidate model coefficients based on, independently from executing other ones of plurality of parallelized optimization processes: initializing a set of locations for a set of particles of a search space corresponding to the set of coefficients, wherein a dimension of the search space is based on a number of coefficients in the set of coefficients; and/or performing a first instance of a first algorithm phase. In various examples, performing the first instance of the first algorithm phase is based on: iteratively performing a first type of optimization algorithm independently upon each of the set of particles a plurality of times to update the set of locations and to initialize a set of best positions for the set of particles; and/or updating the set of locations and the set of best positions generated via the first type of optimization algorithm based on performing a second type of optimization algorithm that is different from the first type of optimization algorithm. In various examples. a corresponding set of candidate model coefficients is based on processing the set of best positions generated via the second type of optimization algorithm.

In various examples, performance of each of a set of iterations of the first type of optimization algorithm upon the each of the set of particles includes generating an updated location from a current location generated via a prior iteration of the first type of optimization algorithm upon the each of the set of particles based on: applying a first vector having a magnitude as an increasing function of a first predefined value and having a direction corresponding to a direction vector from the current location towards a current best location; and/or further applying a second vector having a magnitude as an increasing function of a second predefined value and having a direction corresponding to a direction vector with a randomly selected direction. In various examples, performance of each of a set of iterations of the first type of optimization algorithm upon the each of the set of particles further includes generating an updated best location from a current best location generated via a prior iteration of the first type of optimization algorithm upon the each of the set of particles based on: comparing a first value to a second value, wherein the first value is output of a function applied to the updated location as input, and wherein the second value is output of a function applied to the current best location as input; setting the updated best location as the updated location when the first value is more favorable the second value; and/or maintaining the current best location as the updated best location when the second value is more favorable the first value. In various examples, for a subsequent iteration of the set of iterations, the updated location is utilized as the current location and the updated best location is utilized as the current best location.

In various examples, performance of the second type of optimization algorithm includes, for the each of the set of particles, processing a current position and a current best position generated via a final iteration of the first type of optimization algorithm upon the each of the set of particles to generate an updated position and an updated best position based on, for each of the set of configurable coefficients, one at a time: performing a golden selection search from a first current coefficient value of the each of the set of configurable coefficients for the current best position to identify a first other coefficient value where a corresponding function in the search space begins increasing; identifying a first given coefficient value in a first region between the first current coefficient value and the first other coefficient value inducing a first minimum for the corresponding function in the first region; updating the current best position by setting the each of the set of configurable coefficients as the first given coefficient value; performing the golden selection search from a second current coefficient value of the each of the set of configurable coefficients for the current position to identify a second other coefficient value where the corresponding function in the search space begins increasing; identifying a second given coefficient value in a second region between the second current coefficient value and the second other coefficient value inducing a second minimum for the corresponding function in the second region; updating the current position by setting the each of the set of configurable coefficients as the second given coefficient value; and/or when the second minimum is less than the first minimum, updating the current best position by setting the each of the each of the set of configurable coefficients as the second given coefficient value.

In various examples, the first query is determined based on a first query expression that includes a call to a Sammon mapping model training function selecting a name for the Sammon mapping model. In various examples, the second query is determined based on a second query expression that includes a call to the Sammon mapping model by indicating the name for the Sammon mapping model.

In various examples, the Sammon mapping model training function corresponds to a Sammon mapping model type. In various examples, the second query further indicates a call to another model training function corresponding to another model type different from the Sammon mapping model type. In various examples, the call to another model training function includes a training set selection clause indicating the output of the Sammon mapping model be utilized as a second training set for training another model corresponding to the another model type.

In various examples, the method further includes determining a third query that indicates a second request to apply the another model, and/or executing the third query to generate further output of the another model on other input data based on accessing the another model.

In various examples, the other input data has a corresponding set of columns having a smaller number of columns than a number of columns included in the set of relational database columns based on the another model being generated via a reduced dimensionality applied to the set of relational database columns by applying the nonlinear mapping. In various examples, the other input data includes the smaller number of columns based on the reduced dimensionality applied to the set of relational database columns.

In various examples, the first request indicates at least one configured nonlinear formula that includes the set of coefficients as a configurable parameter of the call to the Sammon mapping model training function. In various examples, the nonlinear mapping is defined based on the configured nonlinear formula. In various examples, the configured nonlinear formula further includes column identifiers for a set of columns of the training set of rows.

In various embodiments, any one of more of the various examples listed above are implemented in conjunction with performing some or all steps of FIG. 35H, and/or any other method described herein. In various embodiments, any set of the various examples listed above can implemented in tandem, for example, in conjunction with performing some or all steps of FIG. 35H and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34J described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34J, for example, in conjunction with further implementing any one or more of the various examples described above.

In various examples, the operational instructions, when executed by the at least one processor, cause the database system to: determine a first query that indicates a first request to generate a Sammon mapping model; execute the first query to generate Sammon mapping model data for the Sammon mapping model; determine a second query that indicates a second request to apply the Sammon mapping model; and execute the second query to generate output of the Sammon mapping model based on applying the nonlinear mapping by utilizing the set of values selected for the set of coefficients. In various embodiments, executing the first query to generate Sammon mapping model data for the Sammon mapping model based on: determining a training set of rows; selecting a first proper subset of the training set of rows as a first sample of the training set of rows; selecting a second proper subset of the training set of rows as a second sample of the training set of rows; and/or selecting a set of values for a set of coefficients defining a nonlinear mapping based on processing the first proper subset and the second proper subset, wherein the Sammon mapping model data indicates the set of values for the set of coefficients defining the nonlinear mapping.

FIGS. 36A-36E illustrate embodiments of query operator execution flows 2433 that include a K Nearest Neighbors (KNN) join operator 2920 as one of the operators 2520. For example, one of the non-relational operators 2524 of the non-relational operator library 2564 is or includes the KNN-join operator 2920 of FIG. 36A-36D. The query operator execution flow 2433 can be utilized to implement the query operator execution flow 2433 of FIG. 25B or FIG. 25D, for example, based on the query operator execution flow 2517 being generated by the operator flow generator module 2514 to include the KNN-join operator 2920. In particular, the operator flow generator module 2514 can generate the query operator execution flow 2517 to include the KNN-join operator 2920 based on the query request indicating a call to a KNN-join operation and/or to a KNN classification algorithm, based on the query request indicating a machine learning construct or mathematical function that requires use of classification and/or specifically requires use of KNN-based classification, and/or based on the query request including an executable query expression of FIG. 26A that calls or requires use of the KNN-join operator 2920. In some cases, the KNN-join operator 2920 includes a set of operators, which can include the replay operator 2720 of FIGS. 27A-27D, where execution of the custom-join operator includes iteration of an ordered set of operators via the replay operator 2720 of the KNN-join operator. In some cases, the KNN-join operator 2920 corresponds to a specific example of a custom-join operator 2820, such as a custom-join operator 2820 of U.S. patent application Ser. No. 16/838,459, that is configured to implement decentralized KNN-based classification in the database system 10 via a query execution plan 2405. The other operators 2520 in the query operator execution flow 2433 can correspond to various operators 2523 and/or 2524. Some or all features and/or functionality of FIGS. 36A 36G can implement any performance of KNN classification, any training and/or applying of a KNN model, or other embodiments of KNN described herein.

KNN classification can be implemented in query operator execution flows by utilizing one or more non-relational operators 2524. For example, an optimizer of the operator flow generator module 2514 generates the resulting query operator execution flow 2517 to include the non-relational operators 2524 to implement KNN classification. This one or more one or more non-relational operators 2524 can include a KNN-specific custom-join operator 2820 that is configured as the KNN-join operator 2920. In particular, this KNN-join operator 2920 can be configured to implement KNN classification based on evaluating "closeness" of records, such as rows of the database, in the n-dimensional space. For example, a similarity value can be generated between new records to be classified and previously-classified records stored by the database system 10. This similarity value can be generated for a (new record, previously-classified record) pair based on computing a Euclidian distance, or other vector distance measurement, based on the values of some or all of their respective fields.

This mechanism is illustrated in FIG. 36A, which depicts a query operator execution flow 2433 executed by a query processing module 2435 that includes a KNN-join operator 2920. The KNN-join operator can be performed on a previously-classified data set 2952 and a new data set 2954. For example, the previously-classified data set 2952 implements the data set 2852 of U.S. patent application Ser. No. 16/838,459, and the new data set 2954 implements the data set 2854 of U.S. patent application Ser. No. 16/838,459.

The previously-classified data set 2952 can include a plurality of previously-classified records 2922. The previously-classified records can each include a set of field values 2832 for a corresponding set of fields. Each previously-classified records can additionally include and/or be mapped to classification data 2933 that classifies the corresponding previously-classified record 2922 into one of a set of distinct categories. This classification data 2933 can correspond to known truth data for the record 2922 and/or can correspond to previously generated classification data via KNN classification of the record 2922 via a previous execution of a previous query via a previous query execution plan 2405 that utilized the KNN-join operator 2920 and/or some or all other functionality of the KNN classification mechanism discussed in conjunction with FIGS. 36A-36E. The new data set 2954 includes a plurality of new records 2924.1-2924.Z. Each new record 2924 includes a set of field values 2832, which correspond to the same set of fields 2832 of the previously-classified data set 2952. However, the new records 2924 do not include classification data 2933, as these records have yet to be classified. Note that both the previously-classified records 2922 and/or the new records 2924 can be previously stored in database system 10, and can be accessed and/or retrieved from storage in database system 10 to facilitate execution of a corresponding query that includes executing KNN-join operator 2920 on these records.

As illustrated in FIG. 36A, the KNN-join operator 2920 performs a similarity function 2944 on some or all possible pairs of records, where each pair of records includes one record 2922 from the previously-classified data set 2952 and one record 2924 from the new data set 2954. For example, the similarity function 2944 is utilized to implement some or all of the non-relational function 2831. For each given record pair, a similarity score 2945 is generated to indicate a value computed as a vector distance between or other similarity metric of the given record pair. A similarity score set 2946 can include some or all of the outputted pairs with their respective similarity score, for example, as a tuple as illustrated that includes the records 2922 and 2924 of the pair and their corresponding score 2945.

A filtering operator 2947 can be applied to the similarity score set 2946 as a function of K to generate nearest neighbor output 2912. For example, the value of K is a positive integer that is fixed and/or configurable. The value of K can be determined from the query request and/or is configured in an executable query expression of FIG. 26A that calls for use of the KNN-join operator to perform KNN classification.

The KNN-join operator 2920 can utilize filtering operator 2947 to return only joined pairs, for example in accordance with a relational join, where the previously-classified record of the corresponding (new record, previously-classified record) is a record that has one of the K most favorable similarity values with the new record. For example, a given new record is paired with exactly K previously-classified records, such as the K records with greatest similarity to the new record and/or the K records with the smallest vector distance from the new record in n-dimensional space, where n denotes the number of fields in the set of fields of the new record and previously-classified records that are utilized to compute the vector distance.

The filtering operator 2947 can be utilized to implement some or all of the non-relational function 2831 and/or some or all of the conditional operator 2835 of U.S. patent application Ser. No. 16/838,459. For example, the filtering operator 2947 can be implemented by utilizing a replay operator 2720 to iterate over the entire similarity score set 2946 for a given new record 2924 after all similarity scores have been generated for the given new record 2924 based on all records 2922 in the previously-classified data set 2952, or a required proper subset of records 2922 in the previously-classified data set 2952, being paired with the given new record 2924 to generate a corresponding similarity score. Alternatively or in addition, the filtering operator 2947 can be implemented via relational operators such as an ORDER BY operator to order the tuples by their set of similarity scores generated for a particular new record 2924 from most favorable to least favorable; and/or a TOP operator to select the top K tuples from the similar score set 2946.

In some cases, the custom conditional statement 2830 for the KNN-join operator 2920 that implement a custom-join operator 2820 includes determining whether a given pair has a corresponding similarity score that falls within the most favorable similarity scores across all previously-classified records measured against the given new record 2924 in the given pair. The given pair is only included in the nearest neighbor output 2912 when this custom conditional statement 2830 evaluates to TRUE. Thus, the nearest neighbor output 2912 can implement the compliant pairs 2860 outputted by a corresponding custom-join operator 2820 configured to implement KNN classification. Note that in this case, unlike evaluating conditions for traditional relational joins, the custom conditional statement 2830 must be evaluated based on considering each possible pair relative to some or all other pairs, rather than evaluating the pair in isolation, to determine whether it can be included in set of compliant pairs 2860.

In some cases, rather than applying filtering operator 2947 as a blocking operator and/or otherwise after all pairs for a given new record have corresponding similarity scores 2945 generated, the filtering operator 2947 can be applied to every pair once their corresponding similarity score 2945 is generated to maintain a running, current set of up to K previously-classified records 2922 for each given new record 2924 based on having one of the K the most favorable similarity scores with the given new record 2924 thus far. In these cases, filtering operator 2947 can be applied to maintain the similarity score set 2946 to include only these K most similar records 2922 for each given new record 2924. For example, the conditional operator 2835 is implemented to compare the similarity score 2945 for each incoming new pair to the dynamically updated set of K pairs, or the least favorable pair in the set of K pairs, for the corresponding new record, for example, rather than comparison to a constant value 2836.

In this case where the similarity score set 2946 is dynamically updated, for a given incoming pair with a computed similarity score 2945 via similarity function 2944. As new pairs have corresponding similarity scores 2945 generated, they are evaluated against the existing least favorable one of the current K most favorable similarity scores for the corresponding new record 2924. If the corresponding new record 2924 has less than K pairs already identified in the similarity score set 2946, the new record is added to the similarity score set 2946. if the corresponding new record 2924 has K pairs already identified in the similarity score set 2946, but the new pair has a more favorable similarity score than at least one of the K existing pairs, the one of the K existing pairs with the least favorable similarity score is removed from the similarity score set 2946, and the similarity score set 2946 is updated to include the new pair, and/or the least favorable similarity score in the set of K pairs can be updated accordingly. If the corresponding new record 2924 has K pairs identified in the similarity score set 2946, and the but the new pair has a less favorable similarity score than all of the K existing pairs, the new pair is not added to the similarity score set 2946, and the existing set of K pairs for the corresponding new record 2924. After all pairs that include a given new record have been evaluated and/or after all pairs with all new records have been evaluated, the similarity score set 2946 can be outputted as the nearest neighbor output 2912.

Once the set of K previously-classified records 2922 for a given new record 2924 with corresponding similarity scores that fall within the most favorable K similarity scores of all similarity scores for all previously-classified records 2922 paired with the given new record 2924 is identified via applying filtering operator 2947, this set of K previously-classified records 2922 can be indicated in nearest neighbors output 2912. The nearest neighbors output 2912 can indicate each new record 2924 with its corresponding identified set of K previously-classified records 2922. As the KNN-join can be implemented to operating utilizing and/or to mimic functionality of a relational join, this nearest neighbors output 2912 can indicate this output as a set of paired records 2924 and 2922, for example, as distinct rows, where each record 2924 is included in exactly K output pairs with K distinct records 2922. These output rows can additionally indicate the corresponding similarity score 2945 in the output, for example, where the similarity score 2945 is included in the corresponding row with the corresponding record 2922 and/or record 2924, for example, for use in classifying each given new records in addition to the identified K records. Each output rows can further indicate the classification data 2933 for the corresponding record 2922 included in the given output row. Note that these output rows may not include all fields of record 2922 and/or record 2924, and for example, may simply include key fields and/or identifiers for each record 2922 and/or record 2924.

A classifier operator 2925 can be applied to the nearest neighbor output 2912 to generate classification output 2914. While the classifier operator 2925 is illustrated as separate from the KNN-join operator 2920, the classifier operator 2925 can alternatively be implemented within the KNN-join operator 2920, where the nearest neighbor output 2912 is intermediate output of the KNN-join operator 2920 and where the classification output 2914 is outputted by the KNN-join operator 2920 via execution of the classifier operator 2925.

Classifier operator 2925 can generate classification output 2914 by generating classification data 2933 for each given new record 2924 based on the classification data for each of the K records 2922 identified in nearest neighbor output 2912 for the given new record 2924. For example, each of the K records 2922 for a given record 2924 can be assigned an equal weight, where the one of the plurality of categories indicated in classification data of a greatest plurality of the K records is selected as the selected one of the plurality of categories indicated in classification data generated for the given new record 2924. As another example, each of the K records 2922 for a given record 2924 can be assigned weights to be equal to, to be a function of, and/or to be or otherwise based on, their similarity scores 2945. Records 2922 with more favorable similarity scores have a greater and/or more favorable corresponding weight applied. For example, as summation is computed for each category by adding the respective weights of records 2922 with classification data 2933 indicating a given category, where the category with the greatest summation is selected as the selected one of the plurality of categories indicated in classification data generated for the given new record 2924. The classification data 2933 for each given new record 2924 can otherwise be generated as a function of the classification data 2933 of the K identified records 2922 in nearest neighbor output 2912 and/or as a function of their corresponding similarity scores 2945, for example, in accordance with any KNN-based algorithm for classifying the new record.

FIG. 36B illustrates an embodiment where the KNN classification is implemented in a decentralized fashion via a plurality of nodes 37.1-37.V. For example, the plurality of nodes 37.1-37.V and node 37.W are utilized to implement the nodes 37.1-37. V and node 37.W of U.S. patent application Ser. No. 16/838,459. For example, the decentralized implementation of custom-join operator 2820 in of U.S. patent application Ser. No. 16/838,459 is implemented as the KNN-join operator 2920 utilizing some of all of the functionally discussed in conjunction with FIG. 36A.

As illustrated in FIG. 36A, each node 37.1-37. V can generate nearest neighbor output 2912 based on utilizing a distinct subset of the required set of previously-classified records 2922 in previously-classified data set 2952, denoted as one of the subsets 2952.1-2952. V. For example, the subsets 2952.1-2952.V implement the subsets 2852.1-2852.V of FIG. 28B. Some or all of this distinct subset of the required set of previously-classified records are utilized by the corresponding node 37.1-37.V to generate nearest neighbor output 2912 for every new record 2924 in the full set of new records of data set 2954. In particular, the set of new records are broadcasted and/or otherwise shared across all nodes 37.1-37.V, where the subsets 2954.1-2954. V implement the subsets 2854.1-2854. V of U.S. patent application Ser. No. 16/838,459. Thus, each nearest neighbor output 2912.1-2912. V indicated, for every new node 2924, the K records 2922 from their respective one of the plurality of subsets 2952.1-2952. V with most favorable similarity scores 2945 generated as discussed in conjunction with FIG. 36A. This case is ideal when the set of previously-classified records 2922 in the full data set 2952 is significantly larger, such as orders of magnitude larger, than the set of new records 2924 in the full data set 2954 being classified for a given query.

Thus, the union of all nearest neighbor output 2912.1-2912. V includes K×V records 2922 for each new record 2924. This set of K×V records is guaranteed to include the K records with most favorable similarity scores 2945, but also includes (K−1)×V "false positives" that are not included in the set of K records. Therefore, to render final nearest neighbor output 2913 that includes only these K records are included, the same or different filtering operator 2947 can be applied by the node 37.W, for example, as a blocking operator, to identify only the top K records 2922 for each new record 2924 with the K most favorable similarity scores 2945 from the entirety of the K×V records 2922 for each new record 2924 in the nearest neighbor output 2912.1-2912. V. In some cases, the KNN-join operator 2920 is performed by the node 37.W upon new records 2924 and records 2922 received in the nearest neighbor output 2912.1-2912.V, for example, if the similarity scores 2945 are not included in the nearest neighbor output 2912.1-2912.V, where the similarity scores 2945 are regenerated via KNN-join operator 2920. The node 37.W can utilize classifier operator 2925 upon the final nearest neighbor output 2913 to generate classification output 2914 for the new records 2924 as discussed in FIG. 36A.

In some embodiments, the data outputted in the nearest neighbor output 2912 generated and sent by each node 37.1-37. V can be sorted by each node on the new records 2924, resulting in the output data blocks of nearest neighbor output 2912 being ordered by new records 2924. For example, the node 37.W receives nearest neighbor output 2912.1 from node 37.1 as a plurality of data blocks that first include all K pairs that include a first new record 2924 in the sorting; then receive all pairs that include all K pairs that include a second new record 2924 in the sorting; and so on, until all pairs that include all K pairs that include a last new record 2924 in the sorting are ultimately received. If all nodes 37.1-37.V sort their nearest neighbor output 2912 by new records 2924 on the same criteria, the same ordering of the set of new records 2924 being utilized by all nodes 37.1-37. V is generated. As a result, the node 37.W receives nearest neighbor output 2912.1-2912. V to include data blocks in accordance with the common ordering of the common set of new records 2924, and thus, the K pairs for a given record 2924 are received in nearest neighbor output from each node at roughly similar times. In the ideal case, all K×V pairs for a given record 2924 are received sequentially based on the nearest neighbor output 2912 of each node being ordered. This mechanism can enable the node 37.W to eliminate the (K−1)×V "false positives" in a streaming fashion as the nearest neighbor output 2912.1-2912. Vis received.

FIG. 36C illustrates an embodiment of a KNN-join operator 2920 that implements a neighbor set generator 2951 based on pre-designated record grouping data 2950 to generate a neighboring search space data set 2975 for a given new record 2924. A replay operator 2720 can be implemented to re-generate the neighboring search space data set 2975 by expanding the neighboring search space data set 2975 in subsequent iterations until at least K records are identified in the neighboring search space data set 2975. Then, the resulting neighboring search space data set 2975 is outputted as a filtered previously classified data set 2956 that includes a proper subset of records from the previously classified data set 2952 and/or from the partitioned subset of the plurality of subsets 2952.1-2952. V assigned to the corresponding node. This mechanism can be useful in reducing the number of records 2922, for example, by orders of magnitude that need to be processed in the remainder of the KNN-join operator 2920 for the given new record 2924, while ensuring that the K identified records are guaranteed to be correct. The KNN-join operator 2920 can be utilized to implement the KNN-join operator of FIG. 36A or FIG. 36B. The query operator execution flow of the KNN-join operator of FIG. 36C that includes the replay operator 2720 and/or the ith order neighboring set generator 2951 can be utilized to implement the non-relational function 2831 of U.S. patent application Ser. No. 16/838,459 for a custom-join operator 2820 configured to implement the KNN-join operator of FIG. 36C.

For example, the KNN-join operator 2920 of FIG. 36C effectively operates as and/or mimics a hash-join by quickly determining a small subset of possible previously-classified records 2922 that could possibly meet the custom conditional statement 2830 of the join condition. In this case, the small subset of possible previously-classified records are identified as records that could possibly be one of the K closest points to the new record in n-dimensional space based on already having been sorted into neighborhood groupings indicating their "location" in n-dimensional space. In particular, given a point in n-dimensional space denoting the location of a given new record 2924, the K records 2922 with the top K similarity scores 2945 are located with some n-cube that can be centered at that point when the similarity function corresponds to a distance measurement in n-dimensional space, where n is the number of fields of the record 2922 and 2924 included in the set of fields utilized as vector input to a corresponding vector distance function such as a Euclidean distance function.

The embodiment of FIG. 36C therefore requires existing knowledge of the locations of previously-classified records 2922 in the n-dimensional space. Prior to computing the given query of FIG. 36C, for example, when the model is initially created and/or when the previously-classified records 2922 in previously-classified data set 2952 are added to the database system, the previously-classified records 2922 can be segregated into a plurality of predesignated record groupings, which can correspond to a plurality of n-cubes in n-dimensional space. The pre-designated record grouping data 2950 can indicate these plurality of predesignated record groupings and can be used accordingly to determine the neighboring search space data set 2975 for each iteration and corresponding expansion of the neighboring search space data set 2975.

Such an embodiment is illustrated in FIG. 36D, depicting an example embodiment of a plurality of pre-designated record groupings 2955 indicated by and/or utilized to determine the pre-designated record grouping data 2950. This example illustrates the concept of pre-designated record groupings 2955 as n-dimensional cubes in n-dimensional space by depicting the 2-dimensional example. The 2-dimensional space is characterized by a set of discrete or continuous possible field values X for a first field of records 2922 and 2924 on the horizontal axis and a set of field values discrete or continuous possible field values Y for a second field of records 2922 and 2924 on the vertical axis. Other embodiments can be similarity implemented in n-dimensional space for any value of n when additional fields of records 2922 and 2924 are present.

The plurality of pre-designated record groupings 2955 can span the entire possible n-dimensional space, where each pre-designated record grouping 2955 borders a set of $3^n-1$ neighboring pre-designated record groupings 2955, unless the pre-designated record grouping 2955 is at an edge of the entire possible n-dimensional space. The pre-designated record grouping 2955 each cover distinct portions of n-dimensional space and do not overlap. Each pre-designated record grouping 2955 can be equal in size with respect to the n-dimensional space. Each pre-designated record grouping can be characterized by a centroid point 2965, corresponding to a point in n-dimensional space centering the corresponding pre-designated record grouping 2955. In this example, each centroid point 2965 is characterized by a point (x,y) in two dimensional space.

Each record 2922 is assigned to a pre-designated record grouping 2955 based on which pre-designated record grouping 2955 a corresponding point falls within in n-dimensional space. The corresponding point is determined based on the field values of the corresponding record's fields, where each record's point in this example is a point (x,y) in two dimensional space. Thus, the record is assigned to a pre-designated record grouping 2955 with a centroid point 2965 that is closer to the record than all other centroid points 2965 for all other pre-designated record groupings 2955. In particular, the pre-designated record grouping 2955 with a centroid value that yields the most favorable similarity score 2945 if the similarity function 2944 were performed between the record 2922's point and all centroid points 2956 is selected for assignment of the record 2922.

FIG. 36D illustrates a plurality of records within one pre-designated record grouping 2955 as an illustrative example of their points in n-dimensional space with respect to the corresponding centroid point 2965 of their pre-designated record grouping 2955. However, once each record 2922 is assigned to a pre-designated record grouping 2955, this information can be stored as a record grouping assignment table, which can be implemented as a lookup table, hash table, or relational table. Each entries to the record grouping assignment table can includes an identifier of each record 2922 mapped to their respective pre-designated record grouping 2955, without necessarily being depicted in n-dimensional space within their respective pre-designated record grouping 2955, as this additional information does not need to be stored. For example, each of a plurality of (key, value) pairs stored by a hash table that implements the record grouping assignment table includes the identifier or key field value of a given record 2922 as the key and includes the identifier, such as the centroid point 2965, of the corresponding pre-designated record grouping 2955 as the value. This record grouping assignment table can be stored by the database system 10 and can be accessible by one or more nodes 37. For example, this record grouping assignment table is accessed by node 37 of FIG. 36C to determine the pre-designated record grouping data 2950. Alternatively, the node 37 otherwise receives some or all entries from the record grouping assignment table is accessed by node 37, for example, based on the new record 2924, to determine the pre-designated record grouping data 2950.

FIG. 36E illustrates how the pre-designated record groupings 2955 are utilized to generate neighboring search spaces 2975 for a given record that expand radially outward over a plurality of iterations. First, for a given new record 2924, the pre-designated record groupings 2955 that it falls within is determined, for example, in the same fashion as determining the pre-designated record groupings 2955 that each previously-classified record 2922 falls within. This is illustrated in the 2-dimensional example of FIG. 36E, where the n-dimensional point corresponding to the new record 2924 based on its field values of its n fields is determined in n-dimensional space to be closest to the centroid point 2965 one of the pre-designated record groupings 2955, for example, in accordance with similarity function 2944.

Based on identifying the pre-designated record grouping 2955 that includes record 2924, an initial neighborhood search space data set 2975 can be identified via a first iteration of execution of the ith order neighborhood set generator 2951 based on the initial value of i and based on the pre-designated record grouping 2955 of pre-designated record grouping data 2950. As used herein, an ith order neighboring search space 2975.*i* of a given new record 2924 corresponds to the $(2(i-1)+3)^n$ pre-designated record groupings 2955 that have centroid points 2965 closest to the identified pre-designated record grouping 2955 that includes the new record 2924. In the example illustrated in FIG. 36E, each ith order neighboring search space 2975.*i* of the given new record 2924 in FIG. 36E includes all labeled pre-designated record grouping 2955.0-2955.*i*, where pre-designated record grouping 2955.0 is the identified pre-designated record grouping 2955 that includes record 2924. As illustrated, a $0^{th}$ order neighboring search space 2975 includes the single identified pre-designated record grouping 2955.0; a $1^{st}$ order neighboring search space includes the single identified pre-designated record grouping 2955.0 and the eight pre-designated record groupings 2955.1 that border pre-designated record grouping 2955.0; a $2^{nd}$ order neighboring search space includes the single identified pre-designated record grouping 2955.0, the eight pre-designated record groupings 2955.1 that border pre-designated record grouping 2955.0, the 16 pre-designated record groupings 2955.2 that border pre-designated record groupings 2955.1, expanding radially outward from pre-designated record grouping 2955.0, and so on.

Note that the first iteration of the ith order neighbor set generator 2951 does not necessarily utilize an initial value of i that is equal to zero. In particular, searching pre-designated record grouping 2955.0 may not be sufficient even if it includes K records 2922, as records included in neighboring pre-designated record groupings 2955.1 may be closer to the new record if the new record is not centered within pre-designated record grouping 2955.0. In some cases, the initial value of i is equal to one, where initial search could include searching the $3^n$ pre-designated record groupings 2955, identified one of the pre-designated record grouping 2955 and its $3^n-1$ bordering neighbors. However, given that the given new record 2924 point probably won't be perfectly centered, to guarantee all the K actual closest neighbors will be included, the nearest initial search could include searching the $5^n$ pre-designated record groupings 2955 by setting the initial value of i as 2. Any initial value of i can be selected, and the initial value of i can be a fixed or configurable parameter of the KNN-join operator 2920. The value of i can increment be exactly 1 in each iteration, or can increment by the same or different positive number in subsequent iterations.

In this fashion, the search space expands radially outwards in each subsequent iteration, and this process repeats where i increments, for example, by exactly one, and the ith order neighboring set generator 2951 generates the corresponding search space accordingly based on the new value of i. For example, in the first iteration, the $5^n$ pre-designated record groupings 2955 corresponding to the $2^{nd}$ order neighboring search space 2975.2 are searched first; the $7^n$ pre-designated record groupings 2955 corresponding to the $3^{rd}$ order neighboring search space 2975.3 are searched next if K points were not identified after searching the $2^{nd}$ order neighboring search space 2975.2; the $9^n$ pre-designated record groupings 2955 corresponding to the $4^{rd}$ order neighboring search space 2975.4 are searched next if K points were still not identified after searching the $3^{rd}$ order neighboring search space 2975.3, and so on, until K records 2922 are identified in the given ith order neighboring search space 2975.*i*, where the filtered previously-classified data set 2956 includes all records 2922 included in the ith order neighboring search space 2975.*i*.

In some embodiments, exactly one additional iteration is performed immediately after at least K records are determined to be identified in the given ith order neighboring search space 2975.*i* to generate a $(i+1)^{th}$ order neighboring search space 2975.*i*+1, where the filtered previously-classified data set 2956 includes all records 2922 included in the $(i+1)^{th}$ order neighboring search space 2975.*i*+1 generated via this additional iteration. This can be utilized to ensure that the non-centering of the new record 2924 within its respective pre-designated record groupings 2955.0 is compensated for by expanding the search space past the smallest $i^{th}$ order neighboring search space 2975.*i* that includes at least K records. In particular, this handles the case where the non-centering of the new record 2924 within its respective pre-designated record groupings 2955.0 causes one of its true K nearest neighbors to be included in the $(i+1)^{th}$ order neighboring search space 2975.*i*+1, but not the $i^{th}$ order neighboring search space 2975.*i*, based on being closer to the new record's point in n-dimensional space than one or more of the record included in the $i^{th}$ order neighboring search space 2975.*i*.

Note that the sizes of pre-designated record groupings 2955 should be configured such that the previously-classified data set 2952 is dense enough with respect to the n-dimensional space to create a useful model, and/or if a reasonably small K, such as K<10 is utilized, the KNN-join can be performed for each given new record 2924 by generating similarity scores 2945 from records 2922 in a very small fraction of the previously-classified data set 2952, such as only 0.0000007% percent of the previously-classified data set 2952 for each new record 2924. In some embodiments, the sizes of pre-designated record groupings 2955 are automatically selected by the query processing system 2510 based on a distribution of field values of the previously-classified records.

In some embodiments, the records 2922 are stored in selected memory devices of a plurality of memory devices of the database system 10 in accordance with their pre-designated record groupings 2955, for example, where records 2922 in the same pre-designated record grouping 2955 are stored in a same memory device, in a same set of memory devices, in memory drives 2425 of a same node 37, and/or in memory drives 2425 of a same set of nodes 37. In some embodiments where the KNN classification is decentralized as discussed in conjunction with FIG. 36B, different nodes have access to different distinct portions of the data set 2952, for example, based on child IO level nodes that store different pre-designated record groupings 2955 on their memory drives 2425. In some cases, a node can determine it does not have access to within a predefined jth order neighboring data set of records for a given new record, and does not return nearest neighbor output for these records, and the K nearest neighbors for these records are presumably accessed and identified by other nodes that do have access to within the predefined jth order neighboring data set of records.

FIGS. 36F and 36G illustrate a method for execution by a query processing system 2510, such as the query processing system 2510 of FIG. 25A and/or FIG. 25C. Some or all of the method of FIGS. 36F and/or 36G can be performed by utilizing the operator flow generator module 2514, the execution plan generating module 2516, and/or the query execution module 2502 of the query processing system 2510 of FIG. 25A. For example, the database system 10 can utilize at least one processing module of one or more nodes 37 of one or more computing devices 18 that are utilized to implement the query execution module 2502 and/or other portions of the query processing system 2510. The one or more nodes can execute operational instructions stored in memory accessible by the one or more nodes, where the execution of the operational instructions causes the one or more nodes 37 to execute, independently or in conjunction, the steps of Figure of FIGS. 36F and/or 36G. In particular, a node 37 can utilize the query processing module 2435 to execute some or all of the steps of FIGS. 36F and/or 36G as illustrated in FIGS. 36A-36C, where multiple nodes 37 implement their own query processing modules 2435 to independently execute the steps of FIGS. 36F and/or 36G. For example, some or all nodes 37 of a query execution plan 2405 can implement query processing module 2435 to facilitate execution of a query via performing at least one operator execution utilizing a KNN-join operator 2920, the similarity function 2944, the filtering operator 2947, and/or the classifier operator 2925 of FIGS. 36A-36E. Some or all of the steps of FIGS. 36F and/or 36G can optionally be performed by any other processing module of the database system 10. Some or all of the steps of FIGS. 36F and/or 36G can performed alternatively or in addition to some or all of the steps of FIG. 25E. Some or all of the steps of FIGS. 36F and/or 36G can be performed to implement some or all of the functionality of the operator flow generator module 2514, execution plan generating module 2516, query execution module 2502, and/or of one or more individual nodes 37 as described in conjunction with FIGS. 25A-25D and/or FIGS. 36A-36E. Some or all of the steps of FIGS. 36F and/or 36G can be performed to implement some or all of the functionality regarding execution of a query via the plurality of nodes in the query execution plan 2405 as described in conjunction with FIGS. 24A-24E. Some or all steps of FIG. 26B can be performed by database system 10 in accordance with other embodiments of the database system 10 and/or nodes 37 discussed herein.

Step 3682 includes determining a query request to implement a K Nearest Neighbors (KNN) algorithm to generate classification data for a set of new records. Step 3684 includes determining a query operator execution flow for the query request that includes a KNN-join operator based on the query request. Step 3686 includes generating a query resultant that indicates classification data for the set of new records by performing a plurality of operator executions in accordance with the query operator execution flow.

In various embodiments, performing at least one operator execution in accordance with the KNN-join operator includes, for each record of the set of new records, performing some or all of the steps of FIG. 36C. Step 3692 includes generating, for each record of the set of new records, a plurality of similarity measures by performing a similarity function on the each record and each of a set of previously-classified records. In various embodiments, the similarity function utilizes a Euclidean distance function. In various embodiments, other distance functions can be utilized. Step 3694 includes identifying, for each record of the set of new records, a proper subset of the set of previously-classified records that includes exactly a predefined number of records with corresponding similarity measures that are most favorable of the plurality of similarity measures. Step 3696 includes joining, for each record of the set of new records, the each record with the proper subset of the set of previously-classified records. Classification data is generated for the each record based on classification data of each of proper subset of the set of previously-classified records.

In various examples, the method includes segregating the plurality of previously-classified records into a plurality of pre-designated groups. Each of the plurality of pre-designated groups are characterized by a corresponding centroid set of field values of a plurality of centroid sets of field values. Performing at least one operator execution in accordance with the KNN-join operator further includes, for each record of the set of new records, identifying one of the plurality of pre-designated groups with a similarity measure between the centroid set of field values of the one of the plurality of pre-designated groups and a set of field values of the each record that is more favorable than similarity measures between the centroid set of field values of all other ones of the plurality of pre-designated groups and the set of field values of the each record. Performing at least one operator execution in accordance with the KNN-join operator further includes, for each record of the set of new records, identifying a first set of neighboring pre-designated groups from the one of the plurality of pre-designated groups based on having centroid sets of field values that have similarity measure from the centroid set of field values of the one of the plurality of pre-designated groups that are within a first order similarity threshold. Performing at least one operator execution in accordance with the KNN-join operator further includes, for each record of the set of new records, determining the set of previously-classified records by identifying only records included in the one of the plurality of pre-designated groups and the first set of neighboring pre-designated groups. Each of the plurality of similarity measures are generated by performing the similarity function on the set of field values of the each record and a set of field values of a corresponding one of the set of previously-classified records.

In various examples, segregating the plurality of previously-classified records into the plurality of pre-designated groups includes determining the centroid set of field values for each of the plurality of pre-designated groups and assigning each record of the plurality of previously-classified records to one of the plurality of pre-designated groups with a centroid set of field values that are most similar to a set of field values of the each record in accordance with the similarity function.

In various examples, performing an operator execution in accordance with the KNN-join operator further includes, for each record of the set of new records, determining whether the set of previously-classified records includes at least the predefined number of records. When the set of previously-classified records includes less than the predefined number of record, a second set of neighboring pre-designated groups from the one of the plurality of pre-designated groups is identified based on having centroid sets of field values that have similarity measure from the centroid set of field values of the one of the plurality of pre-designated groups that are within a second order similarity threshold that is larger than the first order similarity threshold. The set of previously-classified records is expanded to include all records included in the second set of neighboring pre-designated groups.

In various examples, performing an operator execution in accordance with the KNN-join operator further includes, for each record of the set of new records, performing an iterative process to extend the set of neighboring pre-designated groups radially from the centroid set of field values of the one of the plurality of pre-designated groups. An $i^{th}$ iteration of the iterative process includes identifying an $i^{th}$ set of neighboring pre-designated groups from the one of the plurality of pre-designated groups based on having centroid sets of field values that have similarity measure from the centroid set of field values of the one of the plurality of pre-designated groups that are within an $i^{th}$ order similarity threshold that is larger than an $(i-1)^{th}$ order similarity threshold. The $i^{th}$ iteration of the iterative process further includes expanding the set of previously-classified records to include all records included in the $i^{th}$ set of neighboring pre-designated groups. The $i^{th}$ iteration of the iterative process further includes determining whether the set of previously-classified records includes at least the predefined number of records in response to expanding the set of previously-classified records. The $i^{th}$ iteration of the iterative process further includes terminating the iterative process when the set of previously-classified records includes at least the predefined number of records, and initiating the $(i+1)^{th}$ iteration of the iterative process when the set of previously-classified records includes less than the predefined number of records. In various embodiments, the iterative process is implemented by utilizing a replay operator of the plurality of operators in the query operator execution flow.

In various examples, the set of neighboring pre-designated groups extends radially from the centroid set of field values of the one of the plurality of pre-designated groups in accordance with a dimensionality dictated by a number of fields values in the set of field values. In various embodiments, the number of pre-designated groups identified in the $i^{th}$ set of neighboring pre-designated groups is in accordance with an exponential function. An exponent of the exponential function is equal to, or otherwise based on, a number of fields in the set of fields. A base of the exponential function is equal to, or otherwise based on x+2i, where x is equal to an initial number, such as an odd number. For example, the base is equal to, or otherwise based on, x+2i or (5+2i), for example, where i is equal to zero in a first iteration of the iterative process and is incremented by exactly one in each subsequent iteration of the iterative process.

In various examples, the plurality of centroid sets of field values correspond to a plurality of points in multi-dimensional space. The plurality of points are uniformly distributed in the multi-dimensional space, where each one of the plurality of points has a set of closest neighboring points in accordance with the similarity function that each have an equivalent similarity measure from the each one of the plurality of points.

In various examples, the query resultant of the query is generated via a set of nodes of the database system that each perform a plurality of operator executions in accordance with the query operator execution flow. A subset of the set of nodes each execute at least one operator execution corresponding to the KNN-join operator by utilizing a distinct set previously-classified records stored by the database system, wherein a plurality of distinct sets of previously-classified records utilized by the subset of the set of nodes are mutually exclusive. In various embodiments, a first node in the subset of the set of nodes generates the plurality of similarity measures for a first record of the set of new records by utilizing a first one of the plurality of distinct sets of previously-classified records. A second node in the subset of the set of nodes generates the plurality of similarity measures for the first record of the set of new records by utilizing a first one of the plurality of distinct sets of previously-classified records.

In various embodiments, the set of new records is stored in memory of the database system. Each node in the subset of the set of nodes determines the set of records by receives a distinct subset of the set of new records based on retrieval of the distinct subset of the set of new records from memory of the database system; by broadcasting the distinct subset of the set of new records to other nodes in the subset of the set of nodes; and/or by receiving a plurality of other distinct subsets of the set of new records from other nodes in the subset of the set of nodes based on each of the other nodes receiving and broadcasting one of the plurality of other distinct subsets of the set of new records. Each node in the subset of the set of nodes performs the at least one operator execution in accordance with the KNN-join operator for each record of the set of new records based on all nodes determining the set of new records as a same set of new records.

In various examples, each node in the subset of the set of nodes, for each record of the set of new records: generates a subset of the plurality of similarity measures by performing a similarity function of on the each record with each of their distinct set of previously-classified records; identifies a proper subset of their distinct set previously-classified records stored by the database system that includes exactly the predefined number of records with corresponding similarity measures that are most favorable of the subset of the plurality of similarity measures; and/or sends the proper subset of their distinct set previously-classified records to a parent node in accordance with a query execution plan. The parent node, for each record of the set of new records, determines a set of possible records for the each record that includes records included in each of a plurality of proper subsets of a corresponding one plurality of distinct sets of previously-classified records received from a corresponding one of the subset of the set of nodes. The parent node, for each record of the set of new records, identifies the proper subset of the set of previously-classified records that includes exactly the predefined number of records by selecting the predefined number of records from the set of possible records with corresponding similarity measures that are most favorable.

In various embodiments, any one of more of the various examples listed above are implemented in conjunction with performing some or all steps of FIGS. 36F and/or 36G, of FIG. 34J, and/or any other method described herein. In various embodiments, any set of the various examples listed above can implemented in tandem, for example, in conjunction with performing some or all steps of FIGS. 36F and/or 36G, FIG. 34J, and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIGS. 36F and/or 36G described above, and/or of FIG. 34J, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIGS. 36F and/or 36G, and/or of FIG. 34J, for example, in conjunction with further implementing any one or more of the various examples described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining-A matches-B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:

determining a first query that indicates a first request to generate a K nearest neighbors (KNN) model;

executing the first query to generate KNN model data for the KNN model based on:

determining a full training set of rows;

generating a reduced dataset from the full training set of rows based on, for each iteration of a plurality of training iterations:

generating a set of centroids that includes m centroids by performing a clustering algorithm upon the full training set of rows, wherein m has a value based on a number of iterations performed prior to the each iteration;

generating a new set of rows from the set of centroid values based on identifying a centroid classification label for each of the m centroids from a discrete set of labels by performing a KNN classification algorithm to classify each of the set of centroids by applying the full training set of rows; and adding the new set of rows to the reduced dataset;

wherein the KNN model data is set as the reduced dataset for one of the plurality of training iterations;

determining a second query that indicates a second request to apply the KNN model to input data; and executing the second query to generate model output of the KNN model for the input data based on, for each row in the input data, identifying a classification label for the each row from the discrete set of labels based on performing the KNN classification algorithm to classify the each row in the input data by applying the reduced data set.

2. The method of claim 1, wherein each training row of the full training set of rows includes a first set of columns corresponding to independent variables and at least one additional column corresponding to a classification label, wherein the at least one additional column includes, for the each training row, one of the discrete set of labels as a corresponding column value of the at least one additional column for the each training row.

3. The method of claim 2, wherein each training row of the full training set of rows includes a first number of column values, wherein the first set of columns includes a second number of column values, wherein the each of the m centroids is defined via a corresponding set of coordinates in d dimensional space, wherein d is equal to the second number, and wherein each new row of the new set of rows includes the first number of columns.

4. The method of claim 3, wherein each coordinate of the corresponding set of coordinates corresponds to one of the first set of columns, wherein the performing the KNN classification algorithm to classify each of the set of centroids by applying the full training set of rows includes, in the each iterations, identifying k rows of the full training set of rows closest to the each of the m centroids based on, for each centroid of the m centroids:

applying a distance function to the first set of columns of ones of the full training set of rows and to the corresponding set of coordinates of the each of the m centroids;

identifying k rows of the full training set of rows having a smallest distance with the corresponding set of coordinates of the each of the m centroids;

identifying a set of k column values based on determining the corresponding column value of the at least one additional column for the k rows of the full training set of rows; and classifying the each centroid with a label of the discrete set of labels based on the set of k column values.

5. The method of claim 4, wherein the first request indicates at least one of: a configured k parameter, a configured distance parameter, or a configured weight parameter;

wherein at least one of:

the k rows includes a number of rows equal to k based on a value of k being set as the configured k parameter;

the distance function is defined based on the configured distance parameter; or classifying the each centroid is further based on applying the configured weight parameter to the k rows of the full training set;

wherein identifying the classification label for the each row of the input data from the discrete set of labels in executing the second query is based on at least one of:

identifying another k rows of the reduced dataset having a smallest distance with the corresponding set of coordinates of the each of the m centroids based on the value of k being set as the configured k parameter;

identifying the another k rows of the reduced dataset having a smallest distance with the corresponding set of coordinates of the each of the m centroids based on applying the distance function; or identifying another set of k column values further based on applying configured weight parameter to the another k rows of the reduced dataset.

6. The method of claim 1, wherein, in a first iteration of the plurality of training iterations, the value of m is set to one, wherein the value of m in the each iteration after the first iteration increments by one from a previous one of the plurality of training iterations, and wherein the reduced dataset includes, after adding the new set of rows to the reduced dataset in the each iteration, a number of rows equal to a product of: m divided by two; and m plus one.

7. The method of claim 1, wherein the performing the KNN classification algorithm to classify each of the set of centroids for applying the full training set of rows includes, in the each iteration, identifying k rows of the full training set of rows closest to the each of the m centroids, wherein a value of k is a same value across all of the plurality of training iterations, and wherein a value of m is different across all of the of the plurality of training iterations.

8. The method of claim 1, wherein the KNN model data is set as the reduced dataset for a final one of the plurality of training iterations that includes all of a plurality of new sets of rows generated over all of the plurality of training iterations.

9. The method of claim 1, wherein a plurality of reduced dataset versions are generated over the plurality of training iterations, wherein each given reduced dataset version of the plurality of reduced dataset versions generated in a corresponding iteration of the plurality of training iterations is a superset of all prior reduced data set versions generated in all prior ones of the plurality of training iterations, and wherein the KNN model data is set as a most favorable one of the plurality of reduced dataset versions.

10. The method of claim 1, wherein a final iteration in the plurality of training iterations is determined based on at least one of:

a determined number of iterations having been performed;

a determined minimum number of rows are included in the reduced dataset; or the reduced dataset has model accuracy data comparing favorably to a determined minimum accuracy.

11. The method of claim 10, wherein at least one of:

the determined number of iterations is configured in the first request via a user-configured number of iterations parameter;

the determined minimum number of rows is configured in the first request via a user-configured threshold number of rows parameter; or the reduced dataset has model accuracy data is configured in the first request via a user-configured minimum accuracy.

12. The method of claim 1, wherein the performing the KNN classification algorithm to classify each of the set of centroids by applying the full training set of rows includes, in the each iterations, identifying k rows of the full training set of rows closest to the each of the m centroids by applying a same value of k across all of the plurality of training iterations, and wherein a value of m is different across all of the of the plurality of training iterations.

13. The method of claim 1, wherein determining the full training set of rows includes generating the full training set of rows based on accessing a plurality of rows of a relational database table of a relational database.

14. The method of claim 1, wherein the first query is determined based on a first query expression that includes a call to a KNN model training function selecting a name for the KNN model, and wherein the second query is determined based on a second query expression that includes a call to the KNN model by indicating the name for the KNN model.

15. The method of claim 1, and wherein the clustering algorithm is configured to train models of a corresponding model type having a non-KNN model type, and wherein the clustering algorithm is performed to generate non-KNN model data of the non-KNN model type indicating the set of m centroids.

16. The method of claim 15, wherein the non-KNN model type is a K-means model type, wherein the non-KNN model data corresponds to K-means model data generated by performing a K-means model training process, wherein the K-means model data indicates a set of K-means centroids as the set of centroids, and wherein the KNN model data is implemented as non-K-means model data.

17. The method of claim 16, wherein performing the K-means model training process includes:

generating a plurality of training subsets from the full training set of rows;

processing the plurality of training subsets via a corresponding plurality of parallelized processes to generate a plurality of sets of centroids corresponding to a plurality of different K-means models based on performing a K-means training operation via each of the corresponding plurality of parallelized processes upon a corresponding one of the plurality of training subsets; and generating a final set of centroids corresponding to a final K-means model based on performing the K-means training operation upon the plurality of sets of centroids, wherein the non-KNN model data indicates the final set of centroids as the set of K-means centroids.

18. The method of claim 15, wherein a function library includes a KNN model training function and a K-means model training function, wherein the KNN model training function is performed via a first function call to the KNN model training function, and wherein performing the KNN model training function includes performing the K-means model training function via a second function call to the K-means model training function, further comprising:

determining a third query that indicates a third request to generate a K-means model;

executing the third query to generate corresponding K-means model data for the K-means model based on executing the K-means model training function, wherein the KNN model training function is not executed when executing the third query based on the third query not indicating a request to generate a corresponding KNN model;

determining a fourth query that indicates a fourth request to apply the K-means model to second input data; and executing the fourth query to generate model output of the K-means model for the second input data.

19. A database system comprising:

at least one processor, and at least one memory that stores operations instructions that, when executed by the at least one processor, cause the database system to:

determine a first query that indicates a first request to generate a K nearest neighbors (KNN) model;

execute the first query to generate KNN model data for the KNN model based on:

determining a full training set of rows;

generating a reduced dataset from the full training set of rows based on, for each iteration of a plurality of training iterations:

generating a set of centroids that includes m centroids by performing a clustering algorithm upon the full training set of rows, wherein m has a value based on a number of iterations performed prior to the each iteration;

generating a new set of rows from the set of centroid values based on identifying a centroid classification label for each of the m centroids from a discrete set of labels by performing a KNN classification algorithm to classify each of the set of centroids by applying the full training set of rows; and adding the new set of rows to the reduced dataset;

wherein the KNN model data is set as the reduced dataset for one of the plurality of training iterations;

determine a second query that indicates a second request to apply the KNN model to input data; and execute the second query to generate model output of the KNN model for the input data based on, for each row in the input data, identifying a classification label for the each row from the discrete set of labels based on performing the KNN classification algorithm to classify the each row in the input data by applying the reduced data set.

20. A non-transitory computer readable storage medium comprises:

at least one memory section that stores operational instructions that, when executed by at least one processing module that includes a processor and a memory, cause the at least one processing module to:

determine a first query that indicates a first request to generate a K nearest neighbors (KNN) model;

execute the first query to generate KNN model data for the KNN model based on:

determining a full training set of rows;

generating a reduced dataset from the full training set of rows based on, for each iteration of a plurality of training iterations:

generating a set of centroids that includes m centroids by performing a clustering algorithm upon the full training set of rows, wherein m has a value based on a number of iterations performed prior to the each iteration;

generating a new set of rows from the set of centroid values based on identifying a centroid classification label for each of the m centroids from a discrete set of labels by performing a KNN classification algorithm to classify each of the set of centroids by applying the full training set of rows; and adding the new set of rows to the reduced dataset;

wherein the KNN model data is set as the reduced dataset for one of the plurality of training iterations;

determine a second query that indicates a second request to apply the KNN model to input data; and execute the second query to generate model output of the KNN model for the input data based on, for each row in the input data, identifying a classification label for the each row from the discrete set of labels based on performing the KNN classification algorithm to classify the each row in the input data by applying the reduced data set.

* * * * *